US007165091B2

(12) United States Patent
Lunenfeld

(10) Patent No.: US 7,165,091 B2
(45) **Date of Patent: *Jan. 16, 2007**

(54) METASEARCHING A PLURALITY OF QUERIES AND CONSOLIDATING RESULTS

(76) Inventor: Harvey Lunenfeld, 8 Patrician Dr., East Northport, NY (US) 11731

(*) Notice: Subject to any disclaimer, the term of this patent is extended or adjusted under 35 U.S.C. 154(b) by 0 days.

This patent is subject to a terminal disclaimer.

(21) Appl. No.: 11/023,809

(22) Filed: Dec. 28, 2004

(65) Prior Publication Data

US 2005/0198119 A1 Sep. 8, 2005

Related U.S. Application Data

(63) Continuation of application No. 09/791,264, filed on Feb. 22, 2001, now Pat. No. 6,836,769, which is a continuation-in-part of application No. 09/510,749, filed on Feb. 22, 2000, now Pat. No. 6,789,073.

(51) Int. Cl.
*G06F 13/00* (2006.01)

(52) U.S. Cl. ........................................ 709/203

(58) Field of Classification Search .................... 707/1, 707/3, 4, 6, 7, 10; 709/203; 705/26, 27
See application file for complete search history.

(56) References Cited

U.S. PATENT DOCUMENTS

| | | | | |
|---|---|---|---|---|
| 5,913,215 | A * | 6/1999 | Rubinstein et al. | 707/10 |
| 6,085,186 | A * | 7/2000 | Christianson et al. | 707/3 |
| 6,102,969 | A * | 8/2000 | Christianson et al. | 717/146 |
| 6,275,820 | B1 * | 8/2001 | Navin-Chandra et al. | 707/3 |
| 6,298,382 | B1 * | 10/2001 | Doi et al. | 709/229 |
| 6,327,590 | B1 * | 12/2001 | Chidlovskii et al. | 707/5 |
| 6,370,527 | B1 * | 4/2002 | Singhal | 707/6 |
| 6,523,023 | B1 * | 2/2003 | Sonnenberg | 707/3 |
| 6,721,736 | B1 * | 4/2004 | Krug et al. | 707/5 |
| 6,751,612 | B1 * | 6/2004 | Schuetze et al. | 707/4 |

* cited by examiner

*Primary Examiner*—Robert B. Harrell
(74) *Attorney, Agent, or Firm*—Harvey Lunenfeld

(57) ABSTRACT

A process and system for metasearching activated by a request executed by a user on a client device to request a metasearch engine to send a plurality of search queries to a plurality of search engines, the request specifying to which of the plurality of search engines each of the plurality of search queries is to be sent to, each of the plurality of search queries comprising a keyword phrase, each of the keyword phrases comprising at least one keyword specified in the request by the user, at least two of the keyword phrases being different from each other, comprising incorporating, by the metasearch engine, received search results into at least two different display lists corresponding to the at least two different keyword phrases, incorporating means for inputting at least one quantity of at least one item that may be ordered, and communicating a response to the client device.

68 Claims, 340 Drawing Sheets

FIG. 27B

Native American, Folk, Reggae and Experimental music.... ...
http://www.lafcat.com/ (altavista 4)

I) 12) The Cat's Voice
Information Exchange for people who care about cats. The Cat's Voice supports non-profit, no-kill volunteer pet rescue groups. Includes a cat naming database ... add your favorite name fo...
http://sampsondesign.com/voice/ (lycos 4)

I) 13) Bengal cat magazine ..:: bengalcat.co.uk ::..
bengalcat.co.uk provides a wealth of information, for beginners and experts alike, about the exotic Bengal cat ...
http://www.bengalcat.co.uk/ (webcrawler 5)

I) 14) The American Cat Fanciers Association
American Cat Fanciers Association. "Seraphina Taffy of Taffykats" Brown Tabby Particolor Norwegian Forest Cat Spay 1999 Best InterAmerican Alter... ...
http://www.acfacat.com/ (altavista 5)

I) 15) Cat's Cradle, The
The Cat's Cradle is an exclusive CAT HOTEL and retail shop located in Las Vegas, Nevada....
http://www.kittycamp.com (lycos 5)

I) 16) Pavlov's Cat Scratch Feeder
Pavlov's Cat Scratch Feeder: There is no comparable product Pet Product Manufacturers/Distributors: Product owner desires to transfer Product ...
http://www.mktmkt.com/pavlovscat.html (webcrawler 6)

I) 17) Cat Ring
The Original Cat Ring is a large group of sites with substantial content related to the domesticated cat.... ...
http://www.xmission.com/~emailbox/catring.html (altavista 6)

I) 18) Cat-E-Corner.com
Virtual community for cat lovers with articles on health, breeds, care, and safety....
http://www.cat-E-corner.com (lycos 6)

I) 19) Cat Fanciers' Association: Breed Profile: Maine Coon
An indepth look into the Maine Coon breed, the native American longhaired cat ...
http://www.cfainc.org/breeds/profiles/maine.html (webcrawler 7)

I) 20) Cat's Eye | Chatoyant
Cat's Eye/Chatoyant is a press for the digital age. In concert with our website production services, we design products and market them through our... ...
http://www.catseyepress.com/ (altavista 7)

I) 21) All Cat Furniture
Cats-At-Play sells some of the most exquisite cat furniture, cat scratching posts, cat condos, cat stands and cat trees for your cat's enjoyment....
http://www.catsatplay.com/Default.htm (lycos 7)

I) 22) The Cat Kingdom
Welcome to the Cat Page! Hi! My name is Jess and this is my cat web page. This is a picture of my cat, Pepper. He is a nine-year-old, black, domestic shorthair that is very spoiled. ...
http://www.voicenet.com/~billpiel/cat/ (webcrawler 8)

I) 23) Cat Tales Home Page
LATEST UPDATE: January 22, 2000. Bookmark this page now because you will want to come back often.... Ca. t Tales Zoological P. ark. As seen on... ...
http://www.cattales.org/ (altavista 8)

I) 24) Alley Cat Allies
The home page of Alley Cat Allies: promoting compassion and humane care for America's feral cat population....
http://www.alleycat.org/ (lycos 8)

I) 25) cat picture stories cat picture Pictures!
The Hardest Adult cat picture Site On The Net!!! REAL Pix, Horny Studs cat picture Videos, Live Chat Rooms, Live Stud Cam. Horny Studs Want To Make You Cum... cat picture !! ...
http://beasts.dicksucking.com/ (webcrawler 9)

I) 26) The International Bengal Cat Society
The International Bengal Cat Society presents the new breed of spotted□ domestic cat with wild Asian Leopard Cat ancestors. Pictures, breeders,... ...
http://www.bengalcat.com/ (altavista 9)

I) 27) Christine's Cat Graphics
Cat background border sets for your web site. Includes Victorian cat sets, cat photo sets, and cat silhouette sets....
http://www.geocities.com/%7ecccats/creations/ (lycos 9)

I) 28) Kitty clinic helps pet owners find remedies for their troubled Toms ...

FIG. 28B

Query: Dog

II) 1) dogs - dog training - dog behavior - dog adoption
Digitaldog offers dog training and breeding information, and provides information on adopting dogs from animal shelters. ...
http://search.excite.com/relocate/sr=webresult|ss=Dog|id=283089,h... (excite 1)

II) 2) Business and Economy > Companies > Animals > Dogs > Supplies, Equipment, and Gifts
...
http://dir.yahoo.com/Business_and_Economy/Companies/Animals/Dogs/... (yahoo 1)

II) 3) DogOwners.Com - Web Pages about Dogs
DogOwners.Com has a large variety of webpages about dogs including information on different dog breeds, puppies, dog newsgroups & chatrooms, dog health, pet supplies, dog names & dog humor. ...
http://search.excite.com/relocate/sr=webresult|ss=Dog|id=474207,h... (excite 2)

II) 4) Dog Dreams
specializes in ...
http://www.dog-dreams.com/ (yahoo 2)

II) 5) DOG-PLAY - Fun with Your Dog
All dogs welcome! Mixed breeds included. Great stuff to do with your dog. Learn about agility, animal assisted activities, flyball, pet visiting, and other activities including some that are probably n...
http://search.excite.com/relocate/sr=webresult|ss=Dog|id=81946,ht... (excite 3)

II) 6) Science > Biology > Zoology > Animals, Insects, and Pets > Mammals > Dogs > Sports and Activities
...
http://dir.yahoo.com/Science/Biology/Zoology/Animals__Insects__an... (yahoo 3)

II) 7) Dogz ONE! - Your first stop for dogs on the 'net.
Dogz One, Your first stop for dogs, on the 'net! The Breeder's Exchange and ON-LINE Magazine, designed to promote you, your dogs, your web site, your dog related products & services and educating the g...
http://search.excite.com/relocate/sr=webresult|ss=Dog|id=33377,ht... (excite 4)

63

II) 8) Business and Economy > Companies > Animals > Supplies, Equipment, and Gifts
...
http://dir.yahoo.com/Business_and_Economy/Companies/Animals/Suppl... (yahoo 4)

II) 9) A Dog's Best Friend
FREE PERSONALIZED BIRTHDAY CARD FOR YOUR DOG! Send us your dog's name, breed &, birthday, along with his or her mailing address. We will make sure your dog receives a personalized greeting on that s...
http://search.excite.com/relocate/sr=webresult|ss=Dog|id=431008,h... (excite 5)

II) 10) Party Dog
special line of ...
http://www.party-dog.com/ (yahoo 5)

II) 11) dog
See Live dog Thumbnail Gallery and dog Pics inside for free! ...
http://search.excite.com/relocate/sr=webresult|ss=Dog|id=2041349,... (excite 6)

II) 12) Dog.com
search ...
http://www.dog.com/ (yahoo 6)

II) 13) Peter Stuart Session Photos
Welcome to the new website! Update 9/15/99 REPORTS AND PICTURES FROM JAPAN: Day 1 | Day 2 Hi, I'm Peter Stuart. Some of you may have wandered over here from the Dog's Eye View site, and others may be l...
http://search.excite.com/relocate/sr=webresult|ss=Dog|id=361690,h... (excite 7)

II) 14) Recreation > Outdoors > Hunting > Bird Dogs > Magazines
...
http://dir.yahoo.com/Recreation/Outdoors/Hunting/Bird_Dogs/Magazi... (yahoo 7)

II) 15) Spring Canine : Changing the dog you have into the dog you want
Spring Canine is a where we turn the dog you have into the dog you want. By using several techniques, but focusing on Positive Reinfrocement and clicker training, we use gentle methods to gently and qu...
http://search.excite.com/relocate/sr=webresult|ss=Dog|id=419404,h... (excite 8)

II) 16) Bird Dog News
publication about bird hunting ...
http://www.Bird-Dog-News.com/ (yahoo 8)

FIG. 29B

Query: Dog

III) 1) Welcome to Dog Owner's Guide!
If you already have a dog, are considering adding one to your family or just plain like dogs, you've come to the right place for all kinds of information about dogs and how to live...
http://www.canismajor.com/dog/guide.html (hotbot 1)

III) 2) AllDirect.com
All Direct Books offers over 400,000 titles with 50% off selected bestsellers, 40% off most hardback books, 40% off most audio books, and 31-36% off most paperback books, delivered...
http://alldirect.com/book.cfm?CartID=276539390021798 (hotbot 2)

III) 3) Dogs in Canada
Order the 2000 Dogs Annual | About | Breeds Info | Features Upcoming | Webbits | Order | Subscribe | E-mail Pages authored for proper viewing with a JavaScript compliant...
http://www.dogs-in-canada.com/ (hotbot 3)

III) 4) Dogs FAQ Index
Dogs FAQ dogs-faq/acronym-list Subject: rec.pets.dogs: Complete List of Dog-Related Acronyms Maintainer: Cindy Tittle Moore rpd-info@netcom.com > FAQ Home Page:...
http://www.cis.ohio-state.edu/hypertext/faq/usenet/dogs-faq/top.h... (hotbot 4)

III) 5) Von Der Hollenburg - German Shepherd Dogs and Puppies, German Shepherd Breeder
A family owned kennel breeding QUALITY German Shepherd Dogs. We are a specialize in trained or untrained imported German Shepherd Dogs and German Shepherd Puppies....
http://www.vdhollenburg.com/ (hotbot 5)

III) 6) CyberPet - your source for pet information - dogs, cats breeders, pet products
CyberPet is your A-1 resource for pet information both on & for pet fanciers, exhibitors, breeders, dogs, cats, clubs, rescue, products, services, publications, informative...
http://www.cyberpet.com/ (hotbot 6)

III) 7) Dogs
General Dog Items Affenpinscher Afghan Hound Airedale Terrier Akita Alaskan Malamute American Eskimo American Staffordshire Terrier American Water Spaniel Anatolian Shepherd...
http://www.animalden.com/dogs.html (hotbot 7)

III) 8) dogs - dog training - dog behavior - dog adoption
Digitaldog offers dog training and breeding information, and provides information on adopting dogs from animal shelters....
http://www.digitaldog.com/index.html (hotbot 8)

III) 9) Dogs Worldwide
Dogs Worldwide - The Ultimate Showcase for the Canine World. Comprehensive guide to all things canine.Dogs Worldwide is The On-Line Magazine and Market Place for the Canine World...
http://www.dogsworldwide.com/ (hotbot 9)

III) 10) ABOUT Dogs One!/INFO REQUEST FORM
Dogz One is a dog breeder's exchange and on-line magazine for people who love dogs. First of all, we are "dog" people. We own, train, breed, show....and MOST importantly, LOVE our...
http://www.dogzone.com/aboutdz.htm (hotbot 10)

Query: Cat

III) 1) A gorgeous cat!!
Forum: alt.animals.felines
Date: 2000/02/10 Author: Patrick Old ...
http://x39.deja.com/getdoc.xp?AN=583957026&CONTEXT=950219334.1007... (dejanews 1)

III) 2) Re: Cat Berlin 2008 Box
Forum: de.rec.music.hifi
Date: 2000/02/10 Author: Michael Töpperwien ...
http://x39.deja.com/getdoc.xp?AN=583954144&CONTEXT=950219334.1007... (dejanews 2)

III) 3) Re: cat on airplane
Forum: alt.pets
Date: 2000/02/10 Author: Figgypie ...
http://x39.deja.com/getdoc.xp?AN=583932059&CONTEXT=950219334.1007... (dejanews 3)

III) 4) Re: Cat Skeleton for Gamma Rays
Forum: rec.arts.theatre.stagecraft
Date: 2000/02/10 Author: JAshby1041 ...
http://x39.deja.com/getdoc.xp?AN=584141171&CONTEXT=950219334.1007... (dejanews 4)

III) 5) Re: error catching
Forum: comp.soft-sys.matlab
Date: 2000/02/09 Author: Peter J. Acklam ...
http://x39.deja.com/getdoc.xp?AN=583653823&CONTEXT=950219334.1007... (dejanews 5)

FIG. 30B

Product owner desires to transfer Product Licensing, Manufacturing, and Marketing Rights. ...
http://www.mktmkt.com/pavlovscat.html (webcrawler 5)

Query: Dog

I) 1) Welcome to Dog Owner's Guide!
If you already have a dog, are considering adding one to your family or just plain like dogs, you've come to the right place for all kinds of information about dogs and how to live...
http://www.canismajor.com/dog/guide.html (hotbot 1)

I) 2) AllDirect.com
All Direct Books offers over 400,000 titles with 50% off selected bestsellers, 40% off most hardback books, 40% off most audio books, and 31-36% off most paperback books, delivered...
http://alldirect.com/book.cfm?CartID=276539390021798 (hotbot 2)

I) 3) Dogs FAQ Index
Dogs FAQ dogs-faq/acronym-list Subject: rec.pets.dogs: Complete List of Dog-Related Acronyms Maintainer: Cindy Tittle Moore < rpd-info@netcom.com > FAQ Home Page:...
http://www.cis.ohio-state.edu/hypertext/faq/usenet/dogs-faq/top.h... (hotbot 3)

I) 4) Dogs in Canada
Order the 1999 Dogs Annual | About | Breeds Info | Features Upcoming | Webbits | Order | Subscribe | E-mail Pages authored for proper viewing with a JavaScript compliant browser...
http://www.dogs-in-canada.com/ (hotbot 4)

I) 5) Von Der Hollenburg - German Shepherd Dogs and Puppies, German Shepherd Breeder
A family owned kennel breeding QUALITY German Shepherd Dogs. We are a specialize in trained or untrained imported German Shepherd Dogs and German Shepherd Puppies....
http://www.vdhollenburg.com/ (hotbot 5)

Look4itHere
Div. of Internet Corporation
News | Weather | Cool Sites | Shopping
Contests | Horoscopes | Classified
Visit Look4itHere2

Phone: 1-631-757-1600 · E-Mail: look4ithere@look4ithere.com ·
Internet Corporation

| Current Group: I | | | Next Group: II | | | Group: III | | |
|---|---|---|---|---|---|---|---|---|
| hotbot1 | hotbot2 | webcrawler3 | webcrawler4 | webcrawler5 | yahoo6 | looksmart7 | dejanews8 | dejanews9 |
| Cat | Dog | Cat | Mouse | Dog | Dog | Mouse | Dog | Cat |

Go to page: 1 2 3 4 5 6 7 8 9 10 Go to: [Next Page]
11 12 13 14 15 16 17 18 19 20
21 22 23 24 25 26 27 28 29 30
31 32 33 34 35 36 37 38 39 40 41 42 43 44 45 46 47 48 49
50
Search Display *(Interleaved or separately by search engine)*: [Separate]
Description or List *(Site descriptions or lists)*: [List]

FIG. 31B http://www.dogzone.com/aboutdz.htm (webcrawler 3)

Figure 31B:
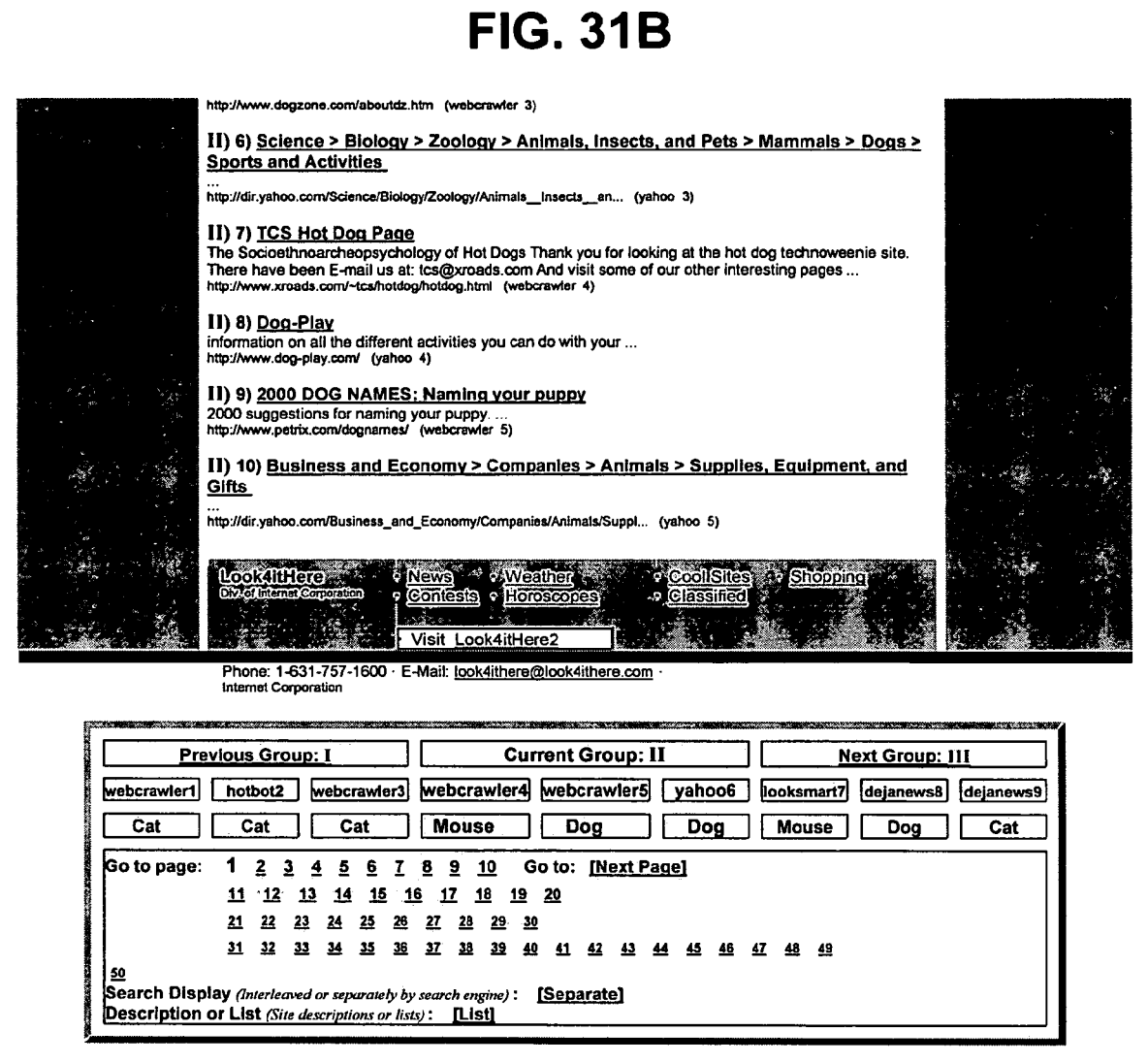

II) 6) Science > Biology > Zoology > Animals, Insects, and Pets > Mammals > Dogs > Sports and Activities
...
http://dir.yahoo.com/Science/Biology/Zoology/Animals__Insects__an... (yahoo 3)

II) 7) TCS Hot Dog Page
The Socioethnoarcheopsychology of Hot Dogs Thank you for looking at the hot dog technoweenie site. There have been E-mail us at: tcs@xroads.com And visit some of our other interesting pages ...
http://www.xroads.com/~tcs/hotdog/hotdog.html (webcrawler 4)

II) 8) Dog-Play
information on all the different activities you can do with your ...
http://www.dog-play.com/ (yahoo 4)

II) 9) 2000 DOG NAMES: Naming your puppy
2000 suggestions for naming your puppy. ...
http://www.petrix.com/dognames/ (webcrawler 5)

II) 10) Business and Economy > Companies > Animals > Supplies, Equipment, and Gifts
...
http://dir.yahoo.com/Business_and_Economy/Companies/Animals/Suppl... (yahoo 5)

Look4itHere Div. of Internet Corporation | News | Weather | CoolSites | Shopping | Contests | Horoscopes | Classified Visit Look4itHere2

Phone: 1-631-757-1600 · E-Mail: look4ithere@look4ithere.com ·
Internet Corporation

| Previous Group: I | Current Group: II | Next Group: III |
|---|---|---|

| webcrawler1 | hotbot2 | webcrawler3 | webcrawler4 | webcrawler5 | yahoo6 | looksmart7 | dejanews8 | dejanews9 |
|---|---|---|---|---|---|---|---|---|
| Cat | Cat | Cat | Mouse | Dog | Dog | Mouse | Dog | Cat |

Go to page: 1 2 3 4 5 6 7 8 9 10 Go to: [Next Page]
11 12 13 14 15 16 17 18 19 20
21 22 23 24 25 26 27 28 29 30
31 32 33 34 35 36 37 38 39 40 41 42 43 44 45 46 47 48 49
50

Search Display *(Interleaved or separately by search engine)* : [Separate]
Description or List *(Site descriptions or lists)* : [List]

FIG. 33A

Search4 it: Search your favorite search engines, all at the same time*

[ ] Search * Only 1 entry required

Webcrawler Altavista Lycos Infoseek Excite Yahoo LookSmart HotBot Dejanews

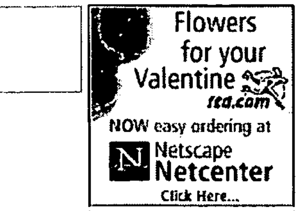

February 6, 1998
ABC NEWS Headlines

U.S. Presence Growing in Iraq

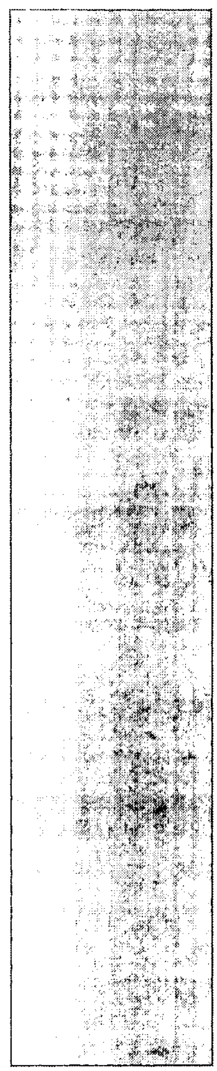

Search Engine Report
Query: Big+Elephants

I) 1) Elephant Contest Index Page
Tuskar announces By: Hannah Buschert Elephants like to play when they are young. Elephants give birth every 4 to 5 years. Elephants always stay togethe...
http://www.webcom.com/~iwcwww/volunteers/contest/index.htm (webcrawler 1)

I) 2) KD PC Download: Big Cats and Elephants- Born Free Screensaver
Big Cats and Elephants- Born Free Screensaver Published by Born Free Foundation. Age Group: Age 4 to 8, Age 8 and Up Type: Desktop Fun License: free......
http://kidsdomain.com/down/pc/bornfreecatss.html (altavista 1)

I) 3) big-lens-and-elephants-47
My FlashPix images are typically 2000x3000 pixel PhotoCD scans, converted with some JPEGing to 1.5 MB FlashPix files. If you have a Java-capable browse...
http://photo.net/photo/show-a-flashpix.tcl%3furl_stub=%252fphoto%... (lycos 1)

I) 4) The Absolut Elephant home page Elephant Consultance
FAQ: Frequently asked questions about elephants, and provided answers. Glossary: Glossary and definitions terminology explanations. Consultant: Elephan...
http://www.elephant.se/main.htm (webcrawler 2)

I) 5) Big as Elephants
... ...
http://www.big.as/elephants/ (altavista 2)

I) 6) Northern Province - animals, big five, bushveld, capricorn, cultural, elephants,
Northern Province, South Africa, offers many tourist attractions and good accommodation. Regions are Capricorn, Bushveld, Valley of the Olifants, Soutp...
http://www.tourismboard.org.za/ (lycos 2)

I) 7) Green Couch: The High Wired Web
back to archives A place where horses, ponies, and elephants are permitted to see men, women, and children acting the fool. --Ambrose Bierce Everybody ...
http://www.getwild.com/theshow/couch/119/features/circus/index.ht... (webcrawler 3)

I) 8) E! Online News - Big-Top Basinger & the Circus Elephants
sitewide search. (entire site) names. titles. news. features. products. • headlines. • first look. • the dotted line. • the e! files. • celeb... ...
http://aol.eonline.com/News/Items/0,1,2538,00.html (altavista 3)

I) 9) Business Chronicle: Big projects, white elephants
19 February 1998 Business Chronicle Big projects, white elephants WHITE ELEPHANT projects are becoming something of a worldwide phenomeno...
http://star.arabia.com/980219/EC2.html (lycos 3)

I) 10) The Elephant Information Repository
The best source on the internet for anything about elephants! This includes elephant links, elephant news, elephant conservation, and an in-depth look ...
http://elephant.elehost.com/ (webcrawler 4)

I) 11) Rainbow Tours & Safaris : See the Big Five, Lions, Elephants, Rhinos, Buffalo
Wildlife safaris, Zulu culture, adventure tours, Zululand, Kwa-Zulu Natal, Bed and Breakfast and accommodation offered.... ...
http://www.rainbowtours.co.za/ (altavista 4)

I) 12) Elephants on Hedweb: photograph of a big tusker
BLTC Logo An African Elephant photo of male African elephant "My dream is that people will come to view eating an animal as cannibalism." Henry Spira P...
http://hedweb.com/animimag/elepmale.htm (lycos 4)

I) 13) Animal Fun Facts
Find out about Elephant Appreciation Day! This is a great site with pictures, activities, and information. If you love pachyderms you should be here! ...
http://www.agirlsworld.com/amy/fun-facts/elephant-fun.html (webcrawler 5)

I) 14) Stunning Wildlife Art of Lions Tigers Warriors Eagles Hawks Elephants Big Cats
Bronze World - Bronze Sculptures of Wild Animals Lions, Tigers Eagles, Leopards, Elephants, Falcons, Tigers, Merlin,... ...
http://www.bronzeworld.freeserve.co.uk/ (altavista 5)

FIG. 33B

I) 15) Thailand's Elephants are in Big Trouble
Smithsonian Magazine September 1998 Navigation Bar Informative Links Friends of the Asian Elephant Thai Elephant Conservation Elephant Nature Park Asia...
http://smithsonianmag.com/smithsonian/issues98/sep98/thailand.htm... (lycos 5)

I) 16) Animal Welfare &bsl; Conservation Charity - Born free welf...
Born Free Foundation - a dynamic animal welfare and conservation charity with projects worlwide conserving endangered species and protecting wildlife h...
http://www.bornfree.org.uk/proj.htm (webcrawler 6)

I) 17) How Elephants Came To be So Big And Heavy - A Creation Story
THE ACADEMY OF ENVIRONMENTAL SCIENCE SECONDARY SCHOOL 410 East 100th Street New York City, NY 10029 Voice: 212 860-5979 Fax: 212 987-0279. How... ...
http://www.csd4.k12.ny.us/WWWPages/AES/Pages/CreationStoriesEleBi... (altavista 6)

I) 18) Elephants Run Amuck
After Killing Big Government, the G.o.p. Suddenly Risks Stampeding Itself to Death [TIME.com]...
http://cgi.pathfinder.com/time/magazine/archive/1996/dom/960304/e... (lycos 6)

I) 19) Elephant jokes
Q: What's grey on the inside and pink and white on the outside? A: An inside out elephant. Q: What is grey and not there. A: No elephants. Q: Why are e...
http://www.bestiary.com/moose/humour/elephant.html (webcrawler 7)

I) 20) Quillo's Online Zoo: Animals: Big and Tall (Elephants, Giraffes, etc.)
Pictures and information on Pandas! Giant and Red Pandas.... ...
http://members.tripod.com/~Quillio/bigntall.htm (altavista 7)

I) 21) Sydney to Nimbin - Big Things - 21-22 December 1996
Sydney to Nimbin - Big Things Hi-tech tourist by Tom Worthington Created: 23 December 1996 - As at 5 January 1997 Big Oyster at Taree1
http://www.acs.org.au/president/1996/atm/travel/sydnmb/ (lycos 7)

I) 22) Elephant Jokes
Bray, County Wicklow, Ireland Elephant Jokes So Far, You have been reading Elephant Jokes for this long Q: What does Tarzan say when he sees a herd of ...
http://aoife.indigo.ie/~cronews/elep.html (webcrawler 8)

I) 23) Treasurables - Elephants - Big Top Pachyderm
The Big Top is home for this pachyderm performer, all decked out in brilliant red, gold and blue trappings! 6 3/4" x 3" x 5 1/4" high. $...
http://www.treasurables.com/Items/27181.html (altavista 8)

I) 24) The Tuli Elephants - Africa's wildlife needs your help.
The Rhino and Elephant Foundation More about the Northern Tuli Game Reserve Developments in the Effort to Save the Elephants The Big Pict...
http://www.ref.org.za/tuli/links.html (lycos 8)

I) 25) Big as
Get a forwarding name for your Website. One that continually directs your guests to you, no matter where you go on the Net. Complete control of target ...
http://big.as/ (webcrawler 9)

I) 26) Discovery Online, Field Notebook: Living with Elephants - 5/18
Discovery Online, Nature... ...
http://www.discovery.com/area/nature/elephants/elephants.html (altavista 9)

I) 27) These People have helped elephants and conservation in Africa
The Rhino and Elephant Foundation More about the Northern Tuli Game Reserve Developments in the Effort to Save the Elephants The Big Pict...
http://www.ref.org.za/tuli/supporters/index.html (lycos 9)

I) 28) Untitled
Hunting Elephants MATHEMATICIANS hunt elephants by going to Africa, throwing out everything that is not an elephant, and catching one of whatever is le...
http://www.igs.net/~tril/humor/elephant.txt (webcrawler 10)

I) 29) TrackStar: Orphan Elephants: Some Big Babies.
TrackStar. Orphan Elephants: Some Big Babies. by Onecia Mercer. List of Sites. 1. Bringing up baby. Site Location:... ...
http://scrtec.org/track/tracks/t00181.html (altavista 10)

I) 30) You have been challenged to help save the elephants of Africa!
The Rhino and Elephant Foundation More about the Northern Tuli Game Reserve Developments in the Effort to Save the Elephants The Big Pict...
http://www.ref.org.za/tuli/challenge/index.html (lycos 10)

Search4 it
Div. of Internet Corporation

News · Weather · Cool Sites · Shopping
Contests · Horoscopes · Classified

Visit Search'em All

FIG. 34A

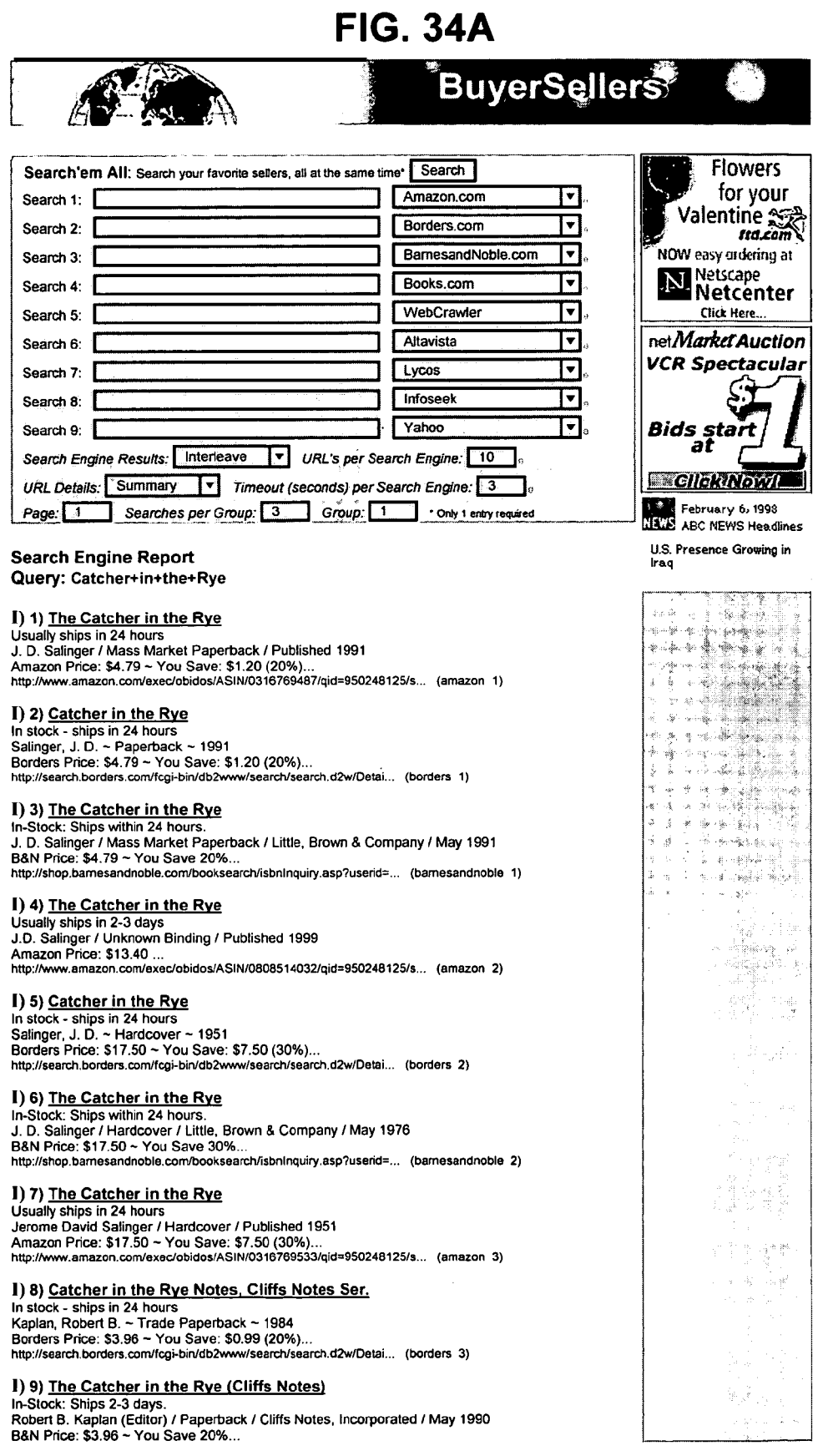

BuyerSellers

Search'em All: Search your favorite sellers, all at the same time* [Search]

| | | |
|---|---|---|
| Search 1: | [ ] | Amazon.com |
| Search 2: | [ ] | Borders.com |
| Search 3: | [ ] | BarnesandNoble.com |
| Search 4: | [ ] | Books.com |
| Search 5: | [ ] | WebCrawler |
| Search 6: | [ ] | Altavista |
| Search 7: | [ ] | Lycos |
| Search 8: | [ ] | Infoseek |
| Search 9: | [ ] | Yahoo |

*Search Engine Results:* Interleave *URL's per Search Engine:* 10

*URL Details:* Summary *Timeout (seconds) per Search Engine:* 3

*Page:* 1 *Searches per Group:* 3 *Group:* 1 * Only 1 entry required

Flowers for your Valentine ftd.com
NOW easy ordering at Netscape Netcenter
Click Here...

netMarketAuction VCR Spectacular
Bids start at $1
Click Now!

February 6, 1998
NEWS ABC NEWS Headlines

U.S. Presence Growing in Iraq

Search Engine Report
Query: Catcher+in+the+Rye

I) 1) The Catcher in the Rye
Usually ships in 24 hours
J. D. Salinger / Mass Market Paperback / Published 1991
Amazon Price: $4.79 ~ You Save: $1.20 (20%)...
http://www.amazon.com/exec/obidos/ASIN/0316769487/qid=950248125/s... (amazon 1)

I) 2) Catcher in the Rye
In stock - ships in 24 hours
Salinger, J. D. ~ Paperback ~ 1991
Borders Price: $4.79 ~ You Save: $1.20 (20%)...
http://search.borders.com/fcgi-bin/db2www/search/search.d2w/Detai... (borders 1)

I) 3) The Catcher in the Rye
In-Stock: Ships within 24 hours.
J. D. Salinger / Mass Market Paperback / Little, Brown & Company / May 1991
B&N Price: $4.79 ~ You Save 20%...
http://shop.barnesandnoble.com/booksearch/isbnInquiry.asp?userid=... (barnesandnoble 1)

I) 4) The Catcher in the Rye
Usually ships in 2-3 days
J.D. Salinger / Unknown Binding / Published 1999
Amazon Price: $13.40 ...
http://www.amazon.com/exec/obidos/ASIN/0808514032/qid=950248125/s... (amazon 2)

I) 5) Catcher in the Rye
In stock - ships in 24 hours
Salinger, J. D. ~ Hardcover ~ 1951
Borders Price: $17.50 ~ You Save: $7.50 (30%)...
http://search.borders.com/fcgi-bin/db2www/search/search.d2w/Detai... (borders 2)

I) 6) The Catcher in the Rye
In-Stock: Ships within 24 hours.
J. D. Salinger / Hardcover / Little, Brown & Company / May 1976
B&N Price: $17.50 ~ You Save 30%...
http://shop.barnesandnoble.com/booksearch/isbnInquiry.asp?userid=... (barnesandnoble 2)

I) 7) The Catcher in the Rye
Usually ships in 24 hours
Jerome David Salinger / Hardcover / Published 1951
Amazon Price: $17.50 ~ You Save: $7.50 (30%)...
http://www.amazon.com/exec/obidos/ASIN/0316769533/qid=950248125/s... (amazon 3)

I) 8) Catcher in the Rye Notes, Cliffs Notes Ser.
In stock - ships in 24 hours
Kaplan, Robert B. ~ Trade Paperback ~ 1984
Borders Price: $3.96 ~ You Save: $0.99 (20%)...
http://search.borders.com/fcgi-bin/db2www/search/search.d2w/Detai... (borders 3)

I) 9) The Catcher in the Rye (Cliffs Notes)
In-Stock: Ships 2-3 days.
Robert B. Kaplan (Editor) / Paperback / Cliffs Notes, Incorporated / May 1990
B&N Price: $3.96 ~ You Save 20%...

FIG. 34B http://shop.barnesandnoble.com/booksearch/isbnInquiry.asp?userid=... (barnesandnoble 3)

I) 10) The Catcher in the Rye (Cliffs Notes)
Usually ships in 24 hours
R. B. Kaplan(Editor) / Paperback / Published 1988
Amazon Price: $3.96 ~ You Save: $0.99 (20%)...
http://www.amazon.com/exec/obidos/ASIN/0822003015/qid=950248125/s... (amazon 4)

I) 11) Catcher in the Rye, Bloom's Reviews Ser.
In stock - ships in 24 hours
Bloom, Harold ~ Paperback ~ 1998
Borders Price: $3.96 ~ You Save: $0.99 (20%)...
http://search.borders.com/fcgi-bin/db2www/search/search.d2w/Detai... (borders 4)

I) 12) Catcher in the Rye (Monarch Notes)
In-Stock: Ships within 24 hours.
Monarch Notes,J. D. Salinger / Paperback / Marboro Books, Inc. / November 1997
B&N Price: $3.16 ~ You Save 20%...
http://shop.barnesandnoble.com/booksearch/isbnInquiry.asp?userid=... (barnesandnoble 4)

I) 13) Holden Caulfield (Major Literary Characters)
Usually ships in 24 hours
Harold Bloom(Editor), William Golding / Library Binding / Published 1991
Amazon Price: $34.95 ...
http://www.amazon.com/exec/obidos/ASIN/079100953X/qid=950248125/s... (amazon 5)

I) 14) J. D. Salinger's The Catcher in the Rye
In stock - ships in 24 hours
Bloom, Harold ~ Library Binding ~ 1995
Borders Price: $17.95 ...
http://search.borders.com/fcgi-bin/db2www/search/search.d2w/Detai... (borders 5)

I) 15) Catcher in the Rye: Reproducible Teaching Unit
Special Order: Ships 3-5 weeks.
James Scott / RINGBOUND / Prestwick House, Incorporated / January 1985
B&N Price: $29.50...
http://shop.barnesandnoble.com/booksearch/isbnInquiry.asp?userid=... (barnesandnoble 5)

I) 16) J. D. Salinger's the Catcher in the Rye (Modern Critical Interpretations)
...
http://www.amazon.com/exec/obidos/ASIN/0791056643/qid=950248125/s... (amazon 6)

I) 17) MaxNotes the Catcher in the Rye, MaxNotes Ser.
In stock - ships in 24 hours
Holzman, R. / Perkins, G. ~ Paperback ~ 1995
Borders Price: $3.16 ~ You Save: $0.79 (20%)...
http://search.borders.com/fcgi-bin/db2www/search/search.d2w/Detai... (borders 6)

I) 18) Catcher in the Rye
Special Order: Ships 3-5 weeks.
Novel Units, Inc. Staff / Hardcover / Novel Units / December 1998
B&N Price: $11.95...
http://shop.barnesandnoble.com/booksearch/isbnInquiry.asp?userid=... (barnesandnoble 6)

I) 19) J.D. Salinger's Catcher in the Rye (Barron's Book Notes)
Usually ships in 24 hours
J.D. Salinger, et al / Paperback / Published 1984
Amazon Price: $3.16 ~ You Save: $0.79 (20%)...
http://www.amazon.com/exec/obidos/ASIN/0812034074/qid=950248125/s... (amazon 7)

I) 20) New Essays on "Catcher in the Rye", American Novel Ser.
In stock - ships in 24 hours
Salzman, Jack ~ Paperback ~ 1992
Borders Price: $14.95 ...
http://search.borders.com/fcgi-bin/db2www/search/search.d2w/Detai... (borders 7)

I) 21) The J.D. Salinger's The Catcher in the Rye
In-Stock: Ships within 24 hours.
Robert Holzman,Gary L. Perkins,Karen Pica (Illustrator) / Paperback / Research & Education Association / June 1996
B&N Price: $3.95...
http://shop.barnesandnoble.com/booksearch/isbnInquiry.asp?userid=... (barnesandnoble 7)

I) 22) J.D. Salinger's Catcher in the Rye (Bloom's Notes)
...
http://www.amazon.com/exec/obidos/ASIN/0791036626/qid=950248125/s... (amazon 8)

I) 23) Catcher in the Rye
Back Order
Bloom, Harold ~ Hardcover ~ 1999
Borders Price: $34.95 ...
http://search.borders.com/fcgi-bin/db2www/search/search.d2w/Detai... (borders 8)

I) 24) Catcher in the Rye (Barron's Book Notes)
In-Stock: Ships 2-3 days.
Barron's Educational Series, Inc.,Joseph Claro / Paperback / Barron's Educational Series,

FIG. 34C

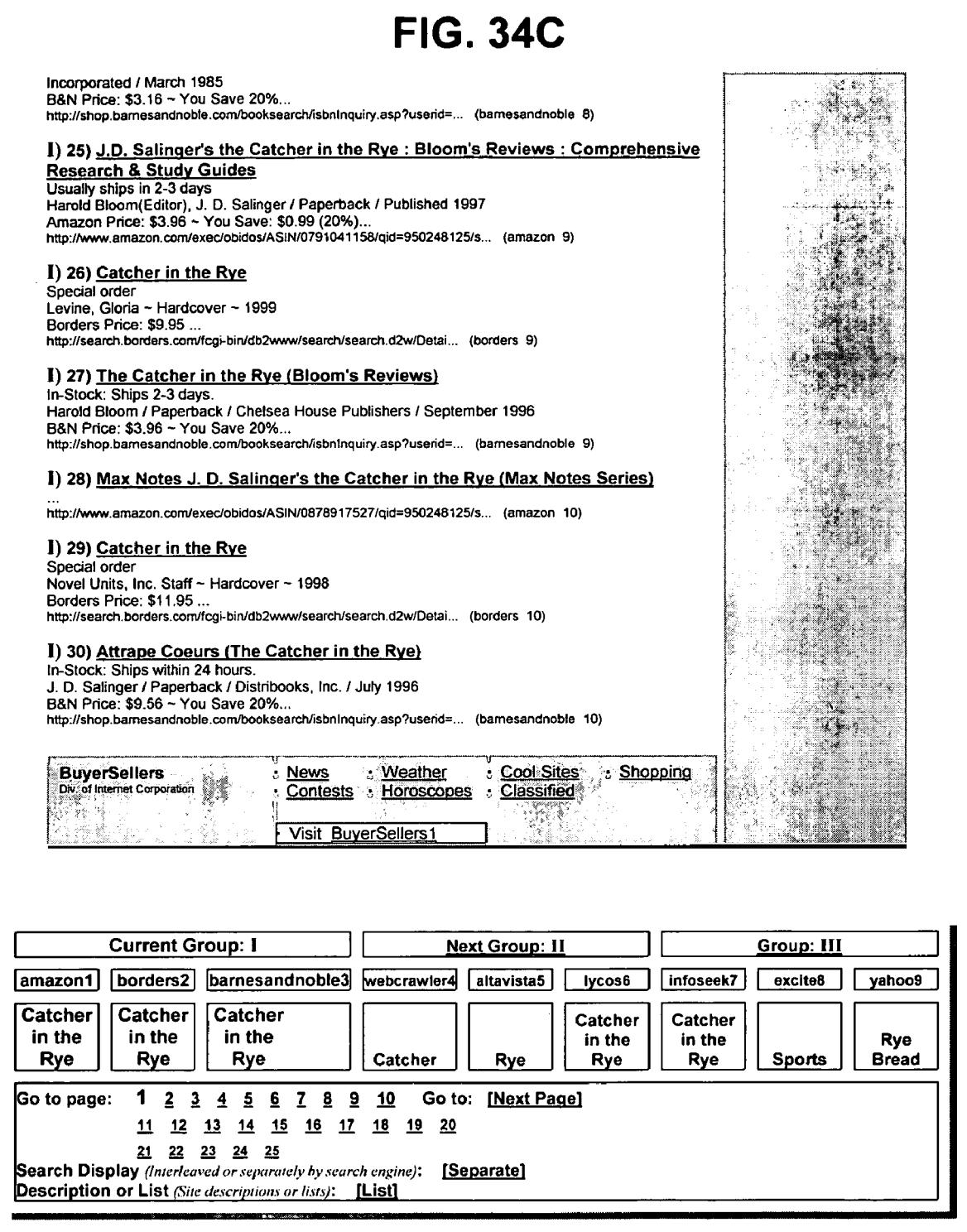

Incorporated / March 1985
B&N Price: $3.16 ~ You Save 20%...
http://shop.barnesandnoble.com/booksearch/isbnInquiry.asp?userid=... (barnesandnoble 8)

I) 25) J.D. Salinger's the Catcher in the Rye : Bloom's Reviews : Comprehensive Research & Study Guides
Usually ships in 2-3 days
Harold Bloom(Editor), J. D. Salinger / Paperback / Published 1997
Amazon Price: $3.96 ~ You Save: $0.99 (20%)...
http://www.amazon.com/exec/obidos/ASIN/0791041158/qid=950248125/s... (amazon 9)

I) 26) Catcher in the Rye
Special order
Levine, Gloria ~ Hardcover ~ 1999
Borders Price: $9.95 ...
http://search.borders.com/fcgi-bin/db2www/search/search.d2w/Detai... (borders 9)

I) 27) The Catcher in the Rye (Bloom's Reviews)
In-Stock: Ships 2-3 days.
Harold Bloom / Paperback / Chelsea House Publishers / September 1996
B&N Price: $3.96 ~ You Save 20%...
http://shop.barnesandnoble.com/booksearch/isbnInquiry.asp?userid=... (barnesandnoble 9)

I) 28) Max Notes J. D. Salinger's the Catcher in the Rye (Max Notes Series)
...
http://www.amazon.com/exec/obidos/ASIN/0878917527/qid=950248125/s... (amazon 10)

I) 29) Catcher in the Rye
Special order
Novel Units, Inc. Staff ~ Hardcover ~ 1998
Borders Price: $11.95 ...
http://search.borders.com/fcgi-bin/db2www/search/search.d2w/Detai... (borders 10)

I) 30) Attrape Coeurs (The Catcher in the Rye)
In-Stock: Ships within 24 hours.
J. D. Salinger / Paperback / Distribooks, Inc. / July 1996
B&N Price: $9.56 ~ You Save 20%...
http://shop.barnesandnoble.com/booksearch/isbnInquiry.asp?userid=... (barnesandnoble 10)

BuyerSellers
Div. of Internet Corporation
News | Weather | Cool Sites | Shopping
Contests | Horoscopes | Classified
Visit BuyerSellers1

| Current Group: I | | | Next Group: II | | | Group: III | | |
|---|---|---|---|---|---|---|---|---|
| amazon1 | borders2 | barnesandnoble3 | webcrawler4 | altavista5 | lycos6 | infoseek7 | excite8 | yahoo9 |
| Catcher in the Rye | Catcher in the Rye | Catcher in the Rye | Catcher | Rye | Catcher in the Rye | Catcher in the Rye | Sports | Rye Bread |

Go to page: 1 2 3 4 5 6 7 8 9 10 Go to: [Next Page]
11 12 13 14 15 16 17 18 19 20
21 22 23 24 25
Search Display *(Interleaved or separately by search engine)*: [Separate]
Description or List *(Site descriptions or lists)*: [List]

FIG. 35A

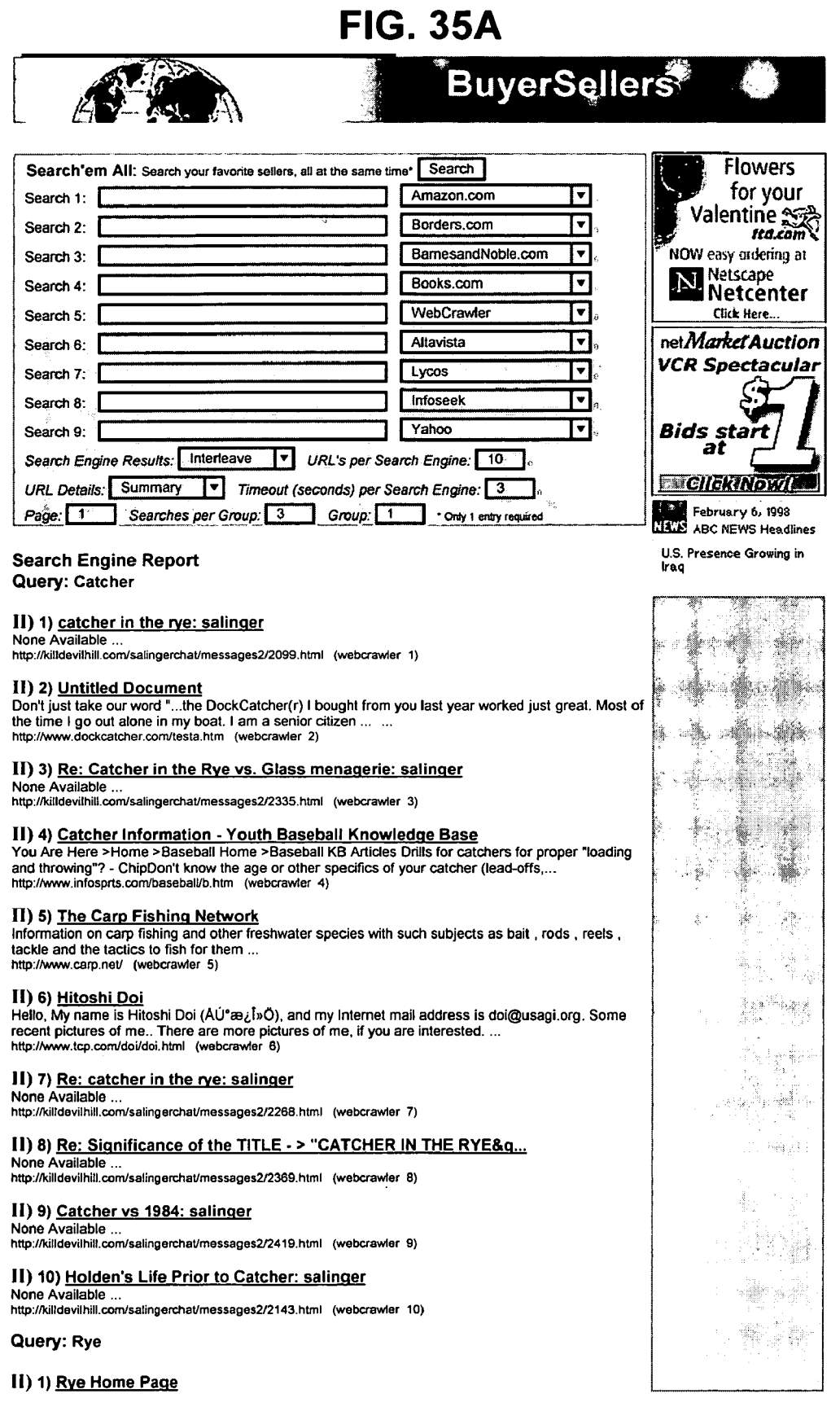

BuyerSellers

Search'em All: Search your favorite sellers, all at the same time* [Search]

| | | |
|---|---|---|
| Search 1: | | Amazon.com |
| Search 2: | | Borders.com |
| Search 3: | | BarnesandNoble.com |
| Search 4: | | Books.com |
| Search 5: | | WebCrawler |
| Search 6: | | Altavista |
| Search 7: | | Lycos |
| Search 8: | | Infoseek |
| Search 9: | | Yahoo |

*Search Engine Results:* Interleave *URL's per Search Engine:* 10

*URL Details:* Summary *Timeout (seconds) per Search Engine:* 3

*Page:* 1 *Searches per Group:* 3 *Group:* 1 * Only 1 entry required

Flowers for your Valentine ftd.com NOW easy ordering at Netscape Netcenter Click Here...

netMarketAuction VCR Spectacular Bids start at $1 Click Now!

February 6, 1998 ABC NEWS Headlines

U.S. Presence Growing in Iraq

Search Engine Report
Query: Catcher

II) 1) catcher in the rye: salinger
None Available ...
http://killdevilhill.com/salingerchat/messages2/2099.html (webcrawler 1)

II) 2) Untitled Document
Don't just take our word "...the DockCatcher(r) I bought from you last year worked just great. Most of the time I go out alone in my boat. I am a senior citizen ... ...
http://www.dockcatcher.com/testa.htm (webcrawler 2)

II) 3) Re: Catcher in the Rye vs. Glass menagerie: salinger
None Available ...
http://killdevilhill.com/salingerchat/messages2/2335.html (webcrawler 3)

II) 4) Catcher Information - Youth Baseball Knowledge Base
You Are Here >Home >Baseball Home >Baseball KB Articles Drills for catchers for proper "loading and throwing"? - ChipDon't know the age or other specifics of your catcher (lead-offs,...
http://www.infosprts.com/baseball/b.htm (webcrawler 4)

II) 5) The Carp Fishing Network
Information on carp fishing and other freshwater species with such subjects as bait , rods , reels , tackle and the tactics to fish for them ...
http://www.carp.net/ (webcrawler 5)

II) 6) Hitoshi Doi
Hello, My name is Hitoshi Doi (ÅÚ°æ¿Î»Ö), and my Internet mail address is doi@usagi.org. Some recent pictures of me.. There are more pictures of me, if you are interested. ...
http://www.tcp.com/doi/doi.html (webcrawler 6)

II) 7) Re: catcher in the rye: salinger
None Available ...
http://killdevilhill.com/salingerchat/messages2/2268.html (webcrawler 7)

II) 8) Re: Significance of the TITLE - > "CATCHER IN THE RYE&q...
None Available ...
http://killdevilhill.com/salingerchat/messages2/2369.html (webcrawler 8)

II) 9) Catcher vs 1984: salinger
None Available ...
http://killdevilhill.com/salingerchat/messages2/2419.html (webcrawler 9)

II) 10) Holden's Life Prior to Catcher: salinger
None Available ...
http://killdevilhill.com/salingerchat/messages2/2143.html (webcrawler 10)

Query: Rye

II) 1) Rye Home Page

FIG. 35B

Welcome... The Official City of Rye Internet Site. The City of Rye is located in Westchester County, New York, USA. Approximately 30 miles northeast... ...
http://www.ci.rye.ny.us/ (altavista 1)

II) 2) Rye, Man & Gor Securities
Rye, Man & Gor Securities wishes all its clients and registered users a Merry Christmas, a Happy New Year and a prosperous 2000! RMG Weekly #258... ...
http://www.rmg.ru/ (altavista 2)

II) 3) Italian Rye Publications
Italian Rye Publications. Aldrich-Markam, S. 1992. Control of annual bromes and Italian ryegrass using triallte in winter wheat with varying levels... ...
http://ianrwww.unl.edu/ianr/jgg/grasses/alrye.htm (altavista 3)

II) 4) Rye Junior High's Home Page
Rye Junior High School A Middle School. In this site you will find information about our school in Rye, NH. We belong to Supervisory Administrative... ...
http://rjh.vitts.com/ (altavista 4)

II) 5) Volunteer Rye Publications
Volunteer Rye Publications. Anderson, R. L. and D. C. Nielsen. 1993. Emergence patterns of volunteer wheat, jointed goatgrass, and downy brome. Res.... ...
http://ianrwww.unl.edu/ianr/jgg/grasses/vrpub.htm (altavista 5)

II) 6) Rye, Man & Gor Securities - RTS Daily Quotes & Indices
RTS Daily Quotes & Indices. RTS Stock Quotes as of January 6, 2000 12:00am. --> Source: RTS Statistics, RMG estimates * Average prices for BID and... ...
http://www.rmg.ru/quotes.html (altavista 6)

II) 7) Volunteer Rye Publications
Volunteer Rye Publications. Anderson, R. L. and D. C. Nielsen. 1993. Emergence patterns of volunteer wheat, jointed goatgrass, and downy brome. Res.... ...
http://www.ianr.unl.edu/jgg/grasses/vrpub.htm (altavista 7)

II) 8) Danny M. Rye
DANNY M. RYE. Professor of Geology and Geophysics. Current Research. Classes Taught. Recent Publications. Address and E-mail. Editor, American... ...
http://love.geology.yale.edu/~rye/rye.html (altavista 8)

II) 9) Rye Machinery Limited
To know more about the large range of RYE CNC machining centres and routers click on the logo. This site is best viewed at a resolution of 800x600... ...
http://www.rye.co.uk/ (altavista 9)

II) 10) Italian Rye Publications
Italian Rye Publications. Aldrich-Markam, S. 1992. Control of annual bromes and Italian ryegrass using triallte in winter wheat with varying levels... ...
http://www.ianr.unl.edu/jgg/grasses/alrye.htm (altavista 10)

Query: Catcher+in+the+Rye

II) 1) Re: cliff notes info..."Catcher in the rye"
Re: cliff notes info..."Catcher in the rye" [ Follow Ups ] [ Post Followup ] [ Great Books Voyage ] [ FAQ ] Posted by Camy on March 01, 1999 at 18:33:13: In Reply to: Re: cliff notes in...
http://www.killdevilhill.com/readingclub/odyssey/messages/7313.ht... (lycos 1)

II) 2) Discussion Group - Re: Catcher in the Rye
Directory Buttons DirectoryWriting CenterDiscussion AreaSearcj Followups Post Followup English_and_Literature discussions index Re: Catcher in the Rye Posted by jango banjo on November 11...
http://www.researchpaper.com/forums/English_and_Literature/messag... (lycos 2)

II) 3) The Catcher in the Rye
The Catcher in the Rye by Jerome David Salinger Save up to 40% - Order online from Amazon.com The Catcher in the Rye by Jerome David Salinger Usually ships in 24 hours Littl...
http://www.bestwebprice.com/catcher_in_the_rye.htm (lycos 3)

II) 4) Re: cliff notes info..."Catcher in the rye"
Re: cliff notes info..."Catcher in the rye" [ Follow Ups ] [ Post Followup ] [ Great Books Voyage ] [ FAQ ] Posted by Cleo Dalson on March 01, 1999 at 15:52:38: In Reply to: Re: cliff n...
http://www.killdevilhill.com/readingclub/odyssey/messages/7290.ht... (lycos 4)

II) 5) Book: The Catcher in the Rye - J. D. Salinger
[Home] Home Book: The Catcher in the Rye - J. D. Salinger Click Here More info about these Ads! - Click on our sponsor to help support this site! [ Bible Reading | Bible Studies | Michael...
http://www.bible-reading.com/book-0316769487.html (lycos 5)

II) 6) Re: [ncte-talk] FW: The Catcher in the Rye--tie ins
[Author Prev][Author Next][Thread Prev][Thread Next][Author Index][Thread Index ] Re: [ncte-talk] FW: The Catcher in the Rye--tie ins To: ncte-talk@serv1.ncte.org Subject: Re: [ncte-talk]...
http://www.ncte.org/lists/ncte-talk/oct98/msg01869.html (lycos 6)

FIG. 35C

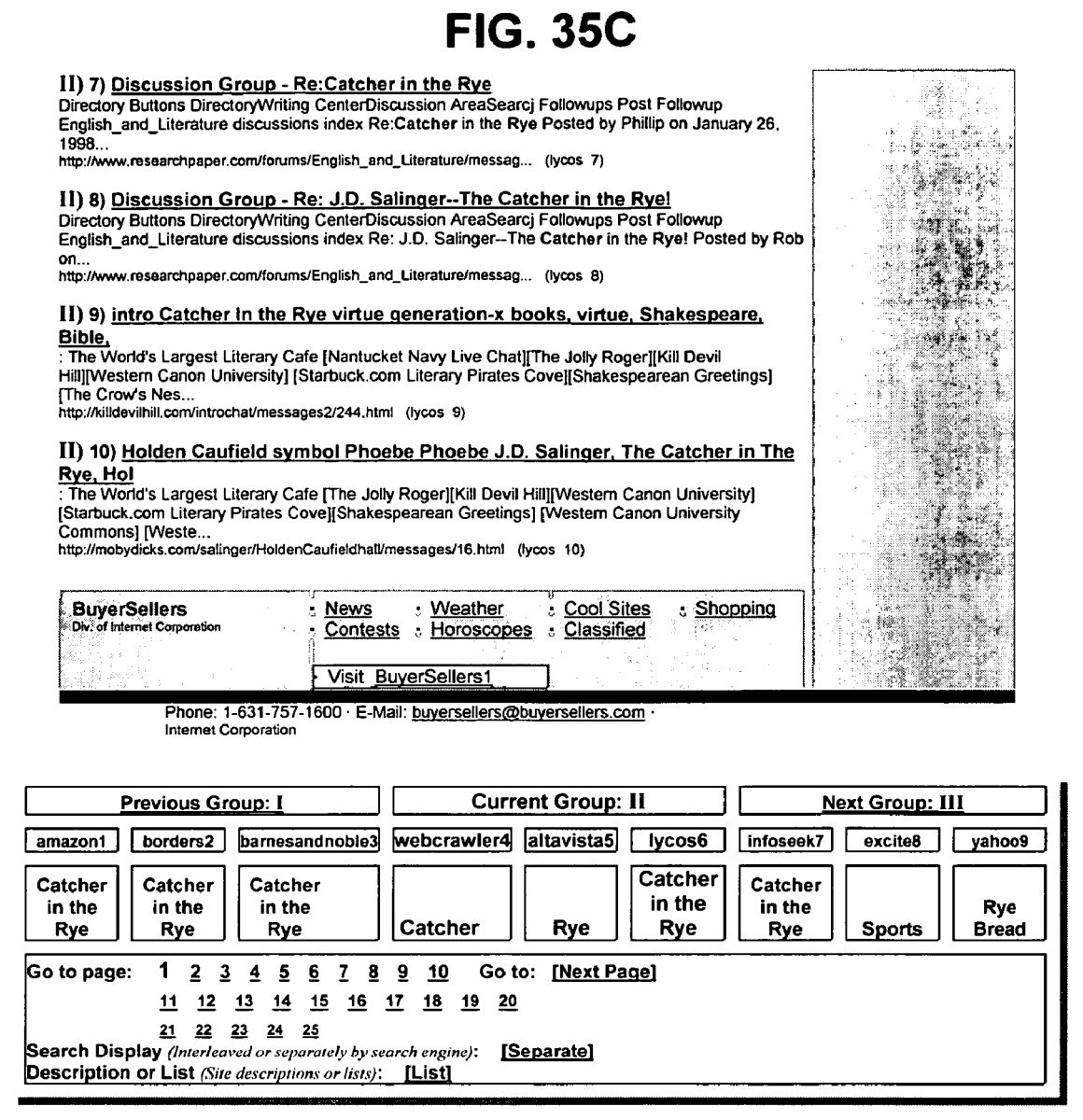

II) 7) Discussion Group - Re:Catcher in the Rye
Directory Buttons DirectoryWriting CenterDiscussion AreaSearcj Followups Post Followup English_and_Literature discussions index Re:Catcher in the Rye Posted by Phillip on January 26, 1998...
http://www.researchpaper.com/forums/English_and_Literature/messag... (lycos 7)

II) 8) Discussion Group - Re: J.D. Salinger--The Catcher in the Rye!
Directory Buttons DirectoryWriting CenterDiscussion AreaSearcj Followups Post Followup English_and_Literature discussions index Re: J.D. Salinger--The Catcher in the Rye! Posted by Rob on...
http://www.researchpaper.com/forums/English_and_Literature/messag... (lycos 8)

II) 9) intro Catcher In the Rye virtue generation-x books, virtue, Shakespeare, Bible,
: The World's Largest Literary Cafe [Nantucket Navy Live Chat][The Jolly Roger][Kill Devil Hill][Western Canon University] [Starbuck.com Literary Pirates Cove][Shakespearean Greetings] [The Crow's Nes...
http://killdevilhill.com/introchat/messages2/244.html (lycos 9)

II) 10) Holden Caufield symbol Phoebe Phoebe J.D. Salinger, The Catcher in The Rye, Hol
: The World's Largest Literary Cafe [The Jolly Roger][Kill Devil Hill][Western Canon University] [Starbuck.com Literary Pirates Cove][Shakespearean Greetings] [Western Canon University Commons] [Weste...
http://mobydicks.com/salinger/HoldenCaufieldhall/messages/16.html (lycos 10)

BuyerSellers
Div. of Internet Corporation

News · Weather · Cool Sites · Shopping
Contests · Horoscopes · Classified

Visit BuyerSellers1

Phone: 1-631-757-1600 · E-Mail: buyersellers@buyersellers.com ·
Internet Corporation

| Previous Group: I | | | Current Group: II | | | Next Group: III | | |
|---|---|---|---|---|---|---|---|---|
| amazon1 | borders2 | barnesandnoble3 | webcrawler4 | altavista5 | lycos6 | infoseek7 | excite8 | yahoo9 |
| Catcher in the Rye | Catcher in the Rye | Catcher in the Rye | Catcher | Rye | Catcher in the Rye | Catcher in the Rye | Sports | Rye Bread |

Go to page: 1 2 3 4 5 6 7 8 9 10 Go to: [Next Page]
11 12 13 14 15 16 17 18 19 20
21 22 23 24 25
Search Display *(Interleaved or separately by search engine)*: [Separate]
Description or List *(Site descriptions or lists)*: [List]

FIG. 36B

Query: Sports

III) 1) Online Sports Home Page
Browse Sports Baseball, Basketball, Football, Hockey, All Sports Browse Teams Broncos, Yankees, Spurs, Knicks, Stars, Sabres, All Teams Browse Items ...
http://search.excite.com/relocate/sr=webresult|ss=Sports|id=208,h... (excite 1)

III) 2) Don Cherry's Sports Grill - St. John's, NF
About Don Cherry's Find out a bit of our history. See pictures of the restaurant. Our Menu Browse our entire menu online, then drop by and try something! ...
http://search.excite.com/relocate/sr=webresult|ss=Sports|id=39573... (excite 2)

III) 3) Sports Illustrated For Kids - games, fantasy leagues, sports news and ...
Games, fantasy leagues, cartoons, sports news and more. ...
http://search.excite.com/relocate/sr=webresult|ss=Sports|id=14874... (excite 3)

III) 4) Sports betting - SSP International Ltd. - fully licensed bookmakers sp...
SSP International is one of world's biggest international bookmakers. Bet on-line in 16 languages. Welcome to SSP's on-line betting website. Choose your language. Free bet for new clients! ...
http://search.excite.com/relocate/sr=webresult|ss=Sports|id=14915... (excite 4)

III) 5) Dr. Bob Sports : A leader in sports betting information
Dr Bob Sports applies award winning, statistically-driven analysis of both professional and collegiate sports. Eleven years of continuous winning strategies. ...
http://search.excite.com/relocate/sr=webresult|ss=Sports|id=56155... (excite 5)

III) 6) Courtesy Sports
Courtesy Sports has just released our New R2K Racquetball Catalog! We are adding our new products to this web site, as well as updating our other pages. ...
http://search.excite.com/relocate/sr=webresult|ss=Sports|id=28315... (excite 6)

III) 7) K2 SPORTS
K2 Sports - K2 Skates, K2 Snowboards, K2 Skis, K2 Bike, K2 Footwear ...
http://search.excite.com/relocate/sr=webresult|ss=Sports|id=26858... (excite 7)

III) 8) Todays Sports - Beyond the Scoreboard
Sports news and scores. Free sports trivia contests with $1,000's in cash prizes and free 30 day full priveledges membership for fantasy baseball! ...
http://search.excite.com/relocate/sr=webresult|ss=Sports|id=10923... (excite 8)

III) 9) Sports 56 - The Sports Authority
Sports56 - The Memphis Sports Authority! Sports 56 boasts a powerful line-up of NBA, NFL, MLB, Memphis Redbird, and Ole Miss Rebel action, as well as over 7 hours of local programming. ...
http://search.excite.com/relocate/sr=webresult|ss=Sports|id=27170... (excite 9)

III) 10) Maine Sports - MaineSports.Com
The premier site for Maine sports. Maine sports week in review. Featured articles and Maine sports scores! ...
http://search.excite.com/relocate/sr=webresult|ss=Sports|id=24948... (excite 10)

Query: Rye+Bread

III) 1) Business and Economy > Companies > Food > Specialty
...
http://dir.yahoo.com/Business_and_Economy/Companies/Food/Specialt... (yahoo 1)

III) 2) Bread & Spirit
offers Danish food and specialties such as ...
http://www.bread-spirit.com (yahoo 2)

III) 3) Regional > Countries > Denmark > Business and Economy > Companies > Food
...
http://dir.yahoo.com/Regional/Countries/Denmark/Business_and_Econ... (yahoo 3)

III) 4) Business and Economy > Companies > Food > Baked Goods > Bread
...
http://dir.yahoo.com/Business_and_Economy/Companies/Food/Baked_Go... (yahoo 4)

III) 5) Beckmann & Markner Inc.
German ...
http://www.dimpfbreadex.com/ (yahoo 5)

III) 6) Business and Economy > Companies > Food > Retail
...
http://dir.yahoo.com/Business_and_Economy/Companies/Food/Retail/ (yahoo 6)

III) 7) Jack Cooper Celebrity Delicatessen
shipping overnight to USA: latkes, pastrami, ...
http://www.celebritydeli.com/ (yahoo 7)

III) 8) Business and Economy > Companies > Food > Business to Business > Baked Goods > Bread
...
http://dir.yahoo.com/Business_and_Economy/Companies/Food/Business... (yahoo 8)

FIG. 36C

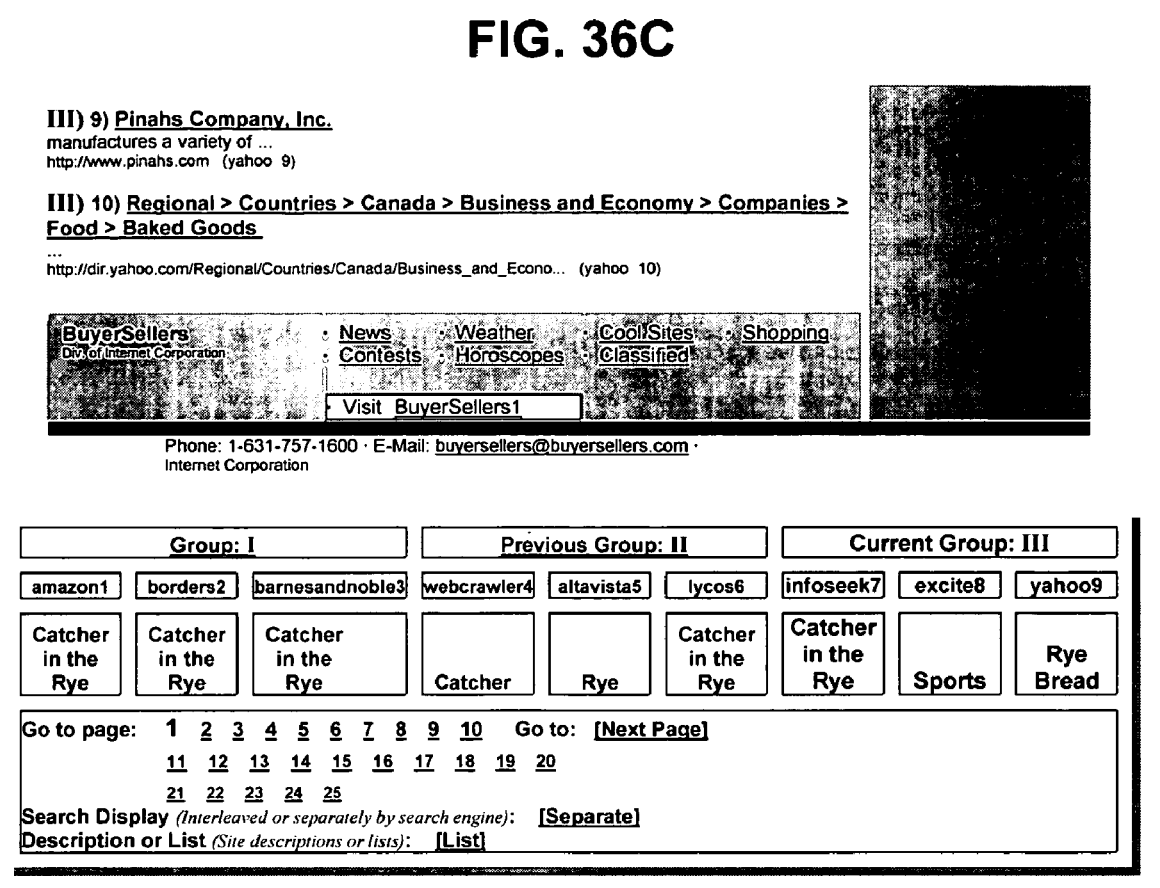

III) 9) Pinahs Company, Inc.
manufactures a variety of ...
http://www.pinahs.com (yahoo 9)

III) 10) Regional > Countries > Canada > Business and Economy > Companies > Food > Baked Goods
...
http://dir.yahoo.com/Regional/Countries/Canada/Business_and_Econo... (yahoo 10)

BuyerSellers
Div. of Internet Corporation
: News : Weather : Cool Sites : Shopping
: Contests : Horoscopes : Classified
Visit BuyerSellers1

Phone: 1-631-757-1600 · E-Mail: buyersellers@buyersellers.com ·
Internet Corporation

| Group: I | | | Previous Group: II | | | Current Group: III | | |
|---|---|---|---|---|---|---|---|---|
| amazon1 | borders2 | barnesandnoble3 | webcrawler4 | altavista5 | lycos6 | infoseek7 | excite8 | yahoo9 |
| Catcher in the Rye | Catcher in the Rye | Catcher in the Rye | Catcher | Rye | Catcher in the Rye | Catcher in the Rye | Sports | Rye Bread |

Go to page: 1 2 3 4 5 6 7 8 9 10 Go to: [Next Page]
11 12 13 14 15 16 17 18 19 20
21 22 23 24 25
Search Display *(Interleaved or separately by search engine)*: [Separate]
Description or List *(Site descriptions or lists)*: [List]

FIG. 37A

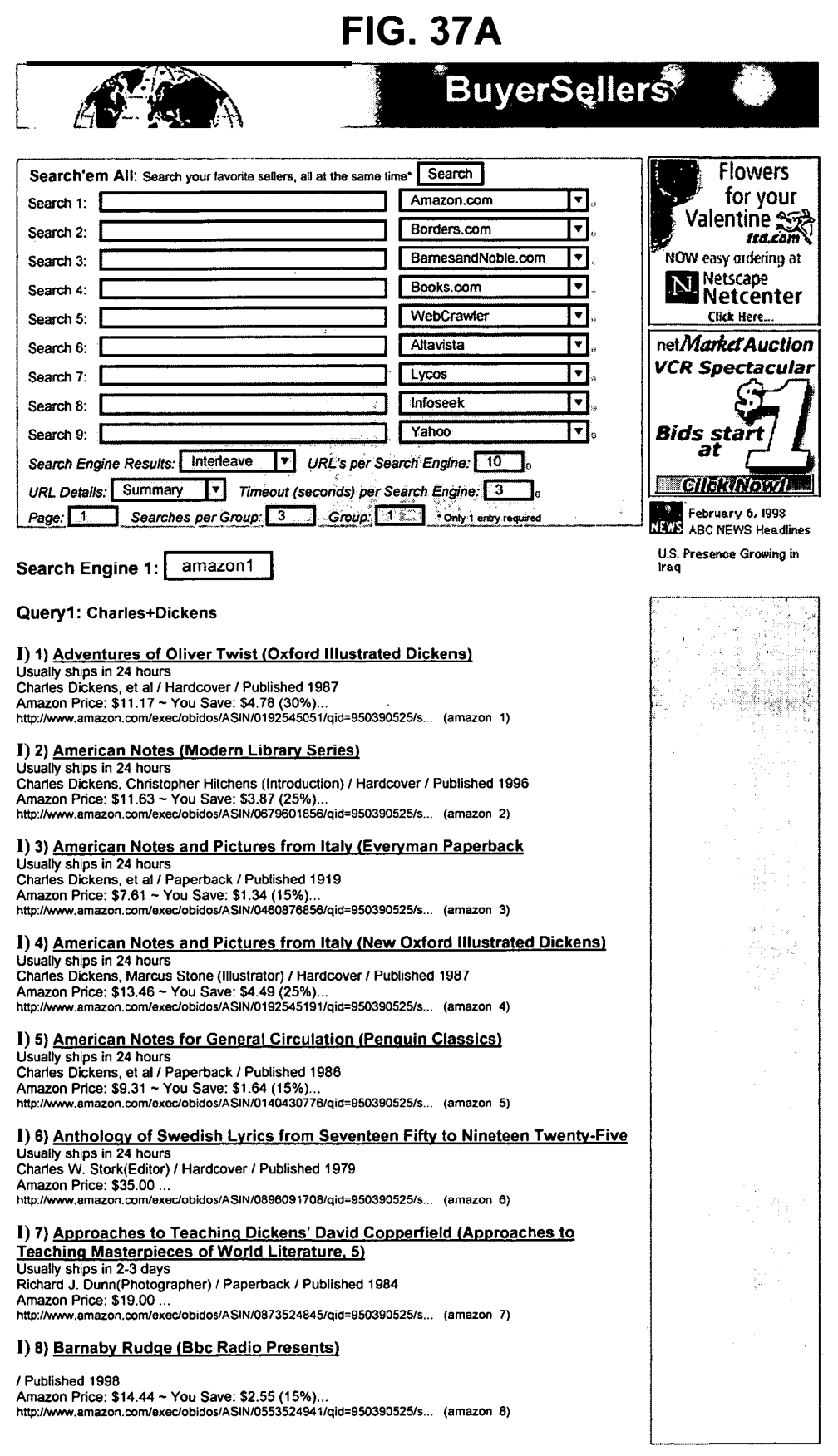

BuyerSellers

Search'em All: Search your favorite sellers, all at the same time* [Search]

Search 1: [ ] Amazon.com
Search 2: [ ] Borders.com
Search 3: [ ] BarnesandNoble.com
Search 4: [ ] Books.com
Search 5: [ ] WebCrawler
Search 6: [ ] Altavista
Search 7: [ ] Lycos
Search 8: [ ] Infoseek
Search 9: [ ] Yahoo

*Search Engine Results:* Interleave *URL's per Search Engine:* 10
*URL Details:* Summary *Timeout (seconds) per Search Engine:* 3
*Page:* 1 *Searches per Group:* 3 *Group:* 1 * Only 1 entry required Flowers for your Valentine
ftd.com
NOW easy ordering at
Netscape Netcenter
Click Here...

netMarketAuction
VCR Spectacular
Bids start at $1
Click Now!

NEWS February 6, 1998
ABC NEWS Headlines

U.S. Presence Growing in Iraq

Search Engine 1: amazon1

Query1: Charles+Dickens

I) 1) Adventures of Oliver Twist (Oxford Illustrated Dickens)
Usually ships in 24 hours
Charles Dickens, et al / Hardcover / Published 1987
Amazon Price: $11.17 ~ You Save: $4.78 (30%)...
http://www.amazon.com/exec/obidos/ASIN/0192545051/qid=950390525/s... (amazon 1)

I) 2) American Notes (Modern Library Series)
Usually ships in 24 hours
Charles Dickens, Christopher Hitchens (Introduction) / Hardcover / Published 1996
Amazon Price: $11.63 ~ You Save: $3.87 (25%)...
http://www.amazon.com/exec/obidos/ASIN/0679601856/qid=950390525/s... (amazon 2)

I) 3) American Notes and Pictures from Italy (Everyman Paperback
Usually ships in 24 hours
Charles Dickens, et al / Paperback / Published 1919
Amazon Price: $7.61 ~ You Save: $1.34 (15%)...
http://www.amazon.com/exec/obidos/ASIN/0460876856/qid=950390525/s... (amazon 3)

I) 4) American Notes and Pictures from Italy (New Oxford Illustrated Dickens)
Usually ships in 24 hours
Charles Dickens, Marcus Stone (Illustrator) / Hardcover / Published 1987
Amazon Price: $13.46 ~ You Save: $4.49 (25%)...
http://www.amazon.com/exec/obidos/ASIN/0192545191/qid=950390525/s... (amazon 4)

I) 5) American Notes for General Circulation (Penguin Classics)
Usually ships in 24 hours
Charles Dickens, et al / Paperback / Published 1986
Amazon Price: $9.31 ~ You Save: $1.64 (15%)...
http://www.amazon.com/exec/obidos/ASIN/0140430776/qid=950390525/s... (amazon 5)

I) 6) Anthology of Swedish Lyrics from Seventeen Fifty to Nineteen Twenty-Five
Usually ships in 24 hours
Charles W. Stork(Editor) / Hardcover / Published 1979
Amazon Price: $35.00 ...
http://www.amazon.com/exec/obidos/ASIN/0896091708/qid=950390525/s... (amazon 6)

I) 7) Approaches to Teaching Dickens' David Copperfield (Approaches to Teaching Masterpieces of World Literature, 5)
Usually ships in 2-3 days
Richard J. Dunn(Photographer) / Paperback / Published 1984
Amazon Price: $19.00 ...
http://www.amazon.com/exec/obidos/ASIN/0873524845/qid=950390525/s... (amazon 7)

I) 8) Barnaby Rudge (Bbc Radio Presents)

/ Published 1998
Amazon Price: $14.44 ~ You Save: $2.55 (15%)...
http://www.amazon.com/exec/obidos/ASIN/0553524941/qid=950390525/s... (amazon 8)

FIG. 37B

Search Engine 2: barnesandnoble2
Query2: Charles+Dickens

I) 1) A Midnight Carol: A Novel of how Charles Dickens Saved Christmas
In-Stock: Ships within 24 hours.
Patricia K. Davis / Hardcover / St. Martin's Press, Inc. / September 1999
B&N Price: $11.86 ~ You Save 30%...
http://shop.barnesandnoble.com/booksearch/isbnInquiry.asp?userid=... (barnesandnoble 1)

I) 2) What Jane Austen Ate and Charles Dickens Knew: From Fox Hunting to Whist-the Facts of Daily Life in Nineteenth-Century England
In-Stock: Ships within 24 hours.
Daniel Pool / Paperback / Simon & Schuster Trade / March 1994
B&N Price: $11.20 ~ You Save 20%...
http://shop.barnesandnoble.com/booksearch/isbnInquiry.asp?userid=... (barnesandnoble 2)

I) 3) The Charles Dickens Murders
In-Stock: Ships within 24 hours.
Edith Skom / Mass Market Paperback / Dell Publishing Company, Incorporated / December 1999
B&N Price: $4.79 ~ You Save 20%...
http://shop.barnesandnoble.com/booksearch/isbnInquiry.asp?userid=... (barnesandnoble 3)

I) 4) Bleak House
In-Stock: Ships within 24 hours.
Charles Dickens / Mass Market Paperback / Bantam Books, Incorporated / December 1982
B&N Price: $5.56 ~ You Save 20%...
http://shop.barnesandnoble.com/booksearch/isbnInquiry.asp?userid=... (barnesandnoble 4)

I) 5) The Charles Dickens Value Collection: The Old Curiosity Shop/Barnaby Rudge/A Tale of Two Cities
In-Stock: Ships within 24 hours.
Charles Dickens / Audio / BDD Audio Publishing / July 1999
B&N Price: $23.96 ~ You Save 20%...
http://shop.barnesandnoble.com/booksearch/isbnInquiry.asp?userid=... (barnesandnoble 5)

I) 6) Charles Dickens: Illustrated Classics: David Copperfield: A Tale of Two Cities; Oliver Twist
In-Stock: Ships within 24 hours.
Charles Dickens,Malvina G. Vogel (Editor),Ric Estrada (Illustrator),Brendan Lynch (Illustrator),Adapted by Marion Leighton / Hardcover / May 1999
B&N Pri...
http://shop.barnesandnoble.com/booksearch/isbnInquiry.asp?userid=... (barnesandnoble 6)

I) 7) 12 Classic Ghost Stories by Wilkie Collins, M.R. James, Charles Dickens and Others
In-Stock: Ships 2-3 days.
John Grafton (Editor),Wilkie Collins / Paperback / Dover Publications, Incorporated / November 1998
B&N Price: $2.00...
http://shop.barnesandnoble.com/booksearch/isbnInquiry.asp?userid=... (barnesandnoble 7)

I) 8) Works of Charles Dickens: Great Expectations/Hard Times/a Christmas Carol/a Tale of Two Cities
In-Stock: Ships 2-3 days.
Charles Dickens / Hardcover / Random House Value Publishing, Incorporated / March 1991
B&N Price: $16.99...
http://shop.barnesandnoble.com/booksearch/isbnInquiry.asp?userid=... (barnesandnoble 8)

Search Engine 3: infoseek3
Query3: Charles+Dickens

I) 1) Victorian Web: Charles Dickens
All aspects of Dickens and his society are explored....
http://www.stg.brown.edu/projects/hypertext/landow/victorian/dick... (infoseek 1)

I) 2) David Perdue's Charles Dickens Page
Fun and educational romp through the world of The Inimitable Boz...
http://www.fidnet.com/~dap1955/dickens/index.html (infoseek 2)

I) 3) Charles Dickens' A CHRISTMAS CAROL
A CHRISTMAS CAROL by Charles Dickens - The complete text from 1843...
http://www.stormfax.com/dickens.htm (infoseek 3)

I) 4) Charles Dickens Gad's Hill Place
In 1860 Charles Dickens gathered and burned his letters and notes. Why? Visit us to learn about his life, works and friends. Every day we have a different quote from the works of Dickens. Also, be sure...
http://www.perryweb.com/Dickens/ (infoseek 4)

I) 5) The Dickens Project
The Dickens Project of the University of California is a scholarly consortium devoted to promoting the study and enjoyment of the life, times, and work of Charles Dickens. Internationally recognized as...
http://humwww.ucsc.edu/dickens/index.html (infoseek 5)

FIG. 37C

I) 6) PORTSMOUTH ENGLAND - Attractions - Portsmouth Resort Guide
The Resort Guide Portsmouth Pages are being rebuilt. If you would like to be advised when the new content has been added you can register for an e mail update here. Click here for ......
http://www.resort-guide.co.uk/portsmouth/attracts.htm (infoseek 6)

I) 7) CHARLES DICKENS - PORSMOUTH - ENGLAND
The Birhplace of Charles Dickens. Visit the Birthplace Museum, 393 Old Commercial Road, where Dickens was bom in 1812. Visit the Naval Pay Office where his father, John Dickens worked. Visit the ......
http://www.port.ac.uk/adc/susan/ (infoseek 7)

I) 8) ABC.com
...
http://abc.go.com (infoseek 8)

Search Engine 4: lycos4
Query4: Charles+Dickens

I) 1) Charles Dickens Campfire
Forum devoted to discussing Charles Dickens' life and works....
http://hatteraslight.com/navy/CharlesDickenshall/mobydick.html (lycos 1)

I) 2) Charles Dickens
Resource page for Dickens information and works online....
http://www.helsinki.fi/kasv/nokol/dickens.html (lycos 2)

I) 3) AITLC: Charles Dickens
Access Indiana Teaching and Learning Center site with links to Dickens resources....
http://tlc.ai.org/dickens.htm (lycos 3)

I) 4) Charles Dickens: Tales of Victorian England
(Letsfindout.com)...
http://www.letsfindout.com/subjects/art/charles-dickens.html (lycos 4)

I) 5) Charles Dickens's A Christmas Carol on Screen
Dickens's A christmas Carol has been produced for the screen over 100 times. These are documented in the book A Christmas Carol and Its Adaptations by Fred Guida...
http://www.dickensachristmascarol.com (lycos 5)

I) 6) A Christmas Carol, Charles Dickens musical, sheet music, CD lyrics
Christmas! Songs, music, Scrooge, and all of Charles Dickens' A Christmas Carol characters come to life in a new adaptation, CD, song lyrics, sheet music....
http://www.michaelcd.com (lycos 6)

I) 7) National Art Library: Conservation of Charles Dickens' manuscripts
Article on the history of the National Art Library's collection of Dickens papers....
http://www.nal.vam.ac.uk/pubs/lowecons.html (lycos 7)

I) 8) Bibliomania: Charles Dickens
Includes "Great Expectations", "Dombey and Son", "The Pickwick Papers", "Martin Chuzzlewit", "Nicholas Nickleby" and "A Tale of Two Cities"....
http://www.bibliomania.com/Fiction/dickens/index.html (lycos 8)

Search Engine 5: webcrawler5
Query5: A+Tale+of+Two+Cities

I) 1) The Middle English Collection at the Electronic Text Center,...
You may also want to connect to the full Online Library of Electronic Texts, including over 1,000 publicly-accessible texts, many illustrated, in the Modern English Collection ...
http://etext.virginia.edu/mideng.browse.html (webcrawler 1)

I) 2) A TALE OF TWO CITIES by Charles Dickens
BLACKSTONE AUDIOBOOKS presents A TALE OF TWO CITIES by Charles Dickens ...
http://www.blackstoneaudio.com/html/books/b1019.html (webcrawler 2)

I) 3) Tale of Three Cities @ nationalgeographic.com
Tale of Three Cities ...
http://www.nationalgeographic.com/3cities/ (webcrawler 3)

I) 4) Schedule for English 306.2 (WHETS)
Note: (P)= Pullman-based performance; (TC)= Tri-Cities-based performance Tuesday, Aug. 29: Introductions. Shakespeare's life and times. Life in London and Stratford. ...
http://www.jetlink.net/~massij/shakes/sched306.html (webcrawler 4)

I) 5) Cliff Notes
Cliff Notes books starting with the letter C ...
http://cameronc.home.mindspring.com/cliffC.htm (webcrawler 5)

I) 6) Democracies Online
Table of Contents This is a pool of slides that represent multiple presentations, not just one overly long speech. Download Full Presentation - Options: ...

FIG. 38A

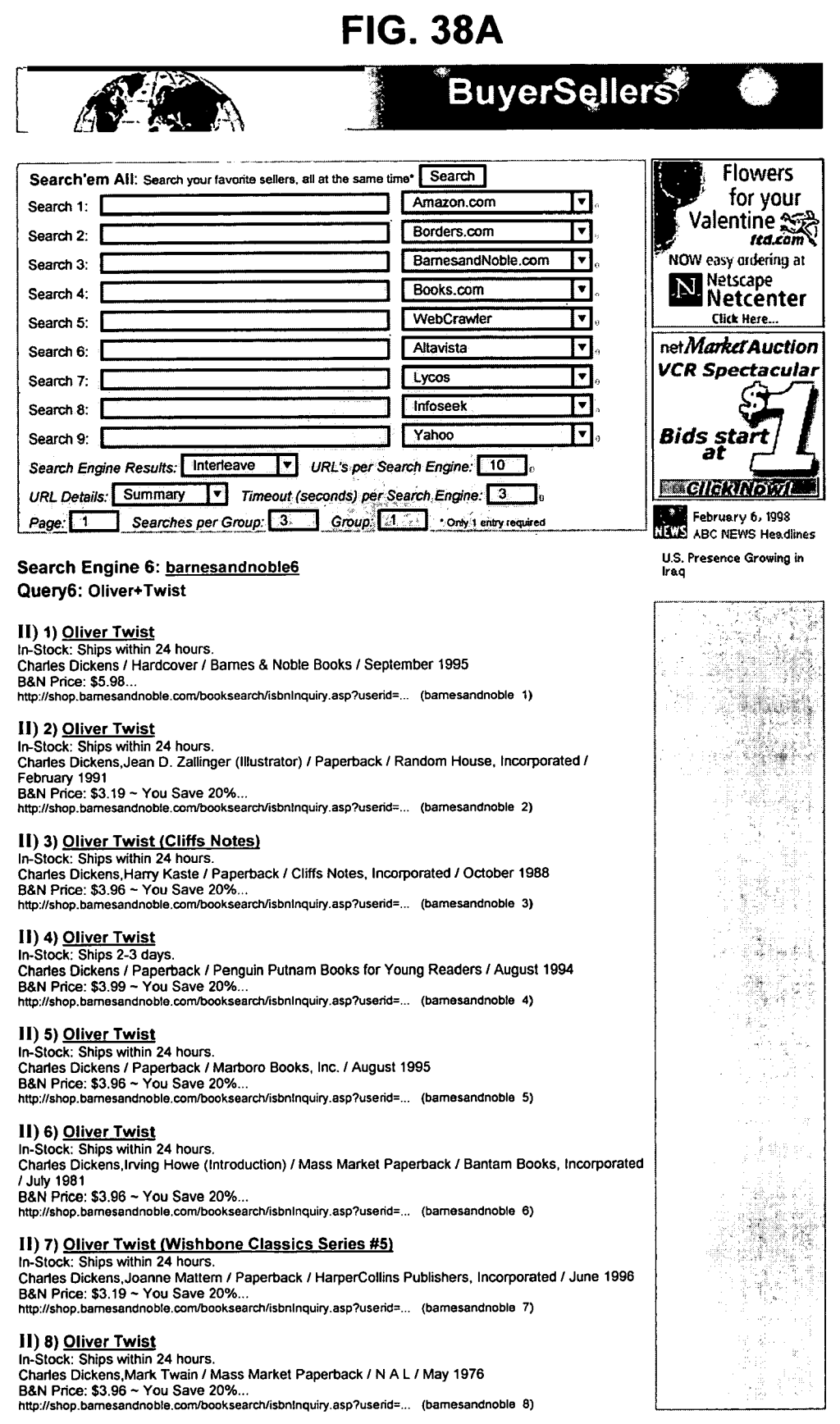

BuyerSellers

Search'em All: Search your favorite sellers, all at the same time* [Search]

| | | |
|---|---|---|
| Search 1: | | Amazon.com |
| Search 2: | | Borders.com |
| Search 3: | | BarnesandNoble.com |
| Search 4: | | Books.com |
| Search 5: | | WebCrawler |
| Search 6: | | Altavista |
| Search 7: | | Lycos |
| Search 8: | | Infoseek |
| Search 9: | | Yahoo |

*Search Engine Results:* Interleave *URL's per Search Engine:* 10
*URL Details:* Summary *Timeout (seconds) per Search Engine:* 3
*Page:* 1 *Searches per Group:* 3 *Group:* 1 * Only 1 entry required Flowers for your Valentine
ftd.com
NOW easy ordering at
Netscape Netcenter
Click Here...

netMarketAuction
VCR Spectacular
Bids start at $1
Click Now!

February 6, 1998
ABC NEWS Headlines
U.S. Presence Growing in Iraq

Search Engine 6: barnesandnoble6
Query6: Oliver+Twist

II) 1) Oliver Twist
In-Stock: Ships within 24 hours.
Charles Dickens / Hardcover / Barnes & Noble Books / September 1995
B&N Price: $5.98...
http://shop.barnesandnoble.com/booksearch/isbnInquiry.asp?userid=... (barnesandnoble 1)

II) 2) Oliver Twist
In-Stock: Ships within 24 hours.
Charles Dickens,Jean D. Zallinger (Illustrator) / Paperback / Random House, Incorporated / February 1991
B&N Price: $3.19 ~ You Save 20%...
http://shop.barnesandnoble.com/booksearch/isbnInquiry.asp?userid=... (barnesandnoble 2)

II) 3) Oliver Twist (Cliffs Notes)
In-Stock: Ships within 24 hours.
Charles Dickens,Harry Kaste / Paperback / Cliffs Notes, Incorporated / October 1988
B&N Price: $3.96 ~ You Save 20%...
http://shop.barnesandnoble.com/booksearch/isbnInquiry.asp?userid=... (barnesandnoble 3)

II) 4) Oliver Twist
In-Stock: Ships 2-3 days.
Charles Dickens / Paperback / Penguin Putnam Books for Young Readers / August 1994
B&N Price: $3.99 ~ You Save 20%...
http://shop.barnesandnoble.com/booksearch/isbnInquiry.asp?userid=... (barnesandnoble 4)

II) 5) Oliver Twist
In-Stock: Ships within 24 hours.
Charles Dickens / Paperback / Marboro Books, Inc. / August 1995
B&N Price: $3.96 ~ You Save 20%...
http://shop.barnesandnoble.com/booksearch/isbnInquiry.asp?userid=... (barnesandnoble 5)

II) 6) Oliver Twist
In-Stock: Ships within 24 hours.
Charles Dickens,Irving Howe (Introduction) / Mass Market Paperback / Bantam Books, Incorporated / July 1981
B&N Price: $3.96 ~ You Save 20%...
http://shop.barnesandnoble.com/booksearch/isbnInquiry.asp?userid=... (barnesandnoble 6)

II) 7) Oliver Twist (Wishbone Classics Series #5)
In-Stock: Ships within 24 hours.
Charles Dickens,Joanne Mattern / Paperback / HarperCollins Publishers, Incorporated / June 1996
B&N Price: $3.19 ~ You Save 20%...
http://shop.barnesandnoble.com/booksearch/isbnInquiry.asp?userid=... (barnesandnoble 7)

II) 8) Oliver Twist
In-Stock: Ships within 24 hours.
Charles Dickens,Mark Twain / Mass Market Paperback / N A L / May 1976
B&N Price: $3.96 ~ You Save 20%...
http://shop.barnesandnoble.com/booksearch/isbnInquiry.asp?userid=... (barnesandnoble 8)

FIG. 38B

Search Engine 7: amazon7

Query7: Oliver+Twist

II) 1) Adventures of Oliver Twist (Oxford Illustrated Dickens)
Usually ships in 24 hours
Charles Dickens, et al / Hardcover / Published 1987
Amazon Price: $11.17 ~ You Save: $4.78 (30%)...
http://www.amazon.com/exec/obidos/ASIN/0192545051/qid=950390665/s... (amazon 1)

II) 2) Charles Dicken's Oliver Twist (Barron's Book Notes)
Usually ships in 24 hours
Charles Dickens, Virginia B. Morris / Paperback / Published 1985
Amazon Price: $2.51 ~ You Save: $0.44 (15%)...
http://www.amazon.com/exec/obidos/ASIN/0812035321/qid=950390665/s... (amazon 2)

II) 3) The Charles Dickens Collection : Oliver Twist, a Christmas Carol, David Copperfield [ABRIDGED]

/ Published 1997
Amazon Price: $33.96 ~ You Save: $5.99 (15%)...
http://www.amazon.com/exec/obidos/ASIN/0140864768/qid=950390665/s... (amazon 3)

II) 4) Eyewitness Classics: Oliver Twist [ABRIDGED]
Usually ships in 24 hours
Charles Dickens, et al / Hardcover / Published 1999
Amazon Price: $11.21 ~ You Save: $3.74 (25%)...
http://www.amazon.com/exec/obidos/ASIN/078943959X/qid=950390665/s... (amazon 4)

II) 5) Oliver Twist
Usually ships in 24 hours
Charles Dickens, et al / Paperback / Published 1985
Amazon Price: $5.56 ~ You Save: $1.39 (20%)...
http://www.amazon.com/exec/obidos/ASIN/0140430172/qid=950390665/s... (amazon 5)

II) 6) Oliver Twist
Usually ships in 24 hours
Charles Dickens, George Cruikshank (Illustrator) / Paperback / Published 1997
Amazon Price: $9.95 ...
http://www.amazon.com/exec/obidos/ASIN/1582880085/qid=950390665/s... (amazon 6)

II) 7) Oliver Twist
Usually ships in 2-3 days
Charles Dickens / Hardcover / Published 1988
Amazon Price: $28.95 ...
http://www.amazon.com/exec/obidos/ASIN/0899663729/qid=950390665/s... (amazon 7)

II) 8) Oliver Twist
Usually ships in 2-3 days
Charles Dickens, Mark Twain / Mass Market Paperback / Published 1982
Amazon Price: $4.21 ~ You Save: $0.74 (15%)...
http://www.amazon.com/exec/obidos/ASIN/0451523512/qid=950390665/s... (amazon 8)

Search Engine 8: lycos8
Query8: Oliver+Twist

II) 1) Oliver Twist
Charles Dickens...
http://sailor.gutenberg.org/etext96/olivr10.txt (lycos 1)

II) 2) Oliver Twist: Selected Bibliography
Compiled by Jon Michael Varese for the 1998 Dickens Universe....
http://humwww.ucsc.edu/dickens/DEA/Bibliographies/Oliverbib.html (lycos 2)

II) 3) Oliver Twist
Oliver Twist (1982) (visit Movies Unlimited for this title on video) George C. Scott shines as a rapscallious Fagin in this Emmy-winning adaptation of Charles Dickens' classic story, with...
http://www.dramamovies.net/631687.htm (lycos 3)

II) 4) Oliver Twist
Oliver Twist (1997) (visit Movies Unlimited for this title on video) Charles Dickens' perennially popular orphan boy, who struggles to escape a life of hardship on the streets of Victoria...
http://www.family-animated-movies.net/112211.htm (lycos 4)

II) 5) Oliver Twist Warner Brothers Classics Tales - Video CD - Latest Video CD - Video
A Place where you can get Original Video CDs Movies at a lower price!!! Recommend

FIG. 38C

VideoCDs.com DVD Section New Arrival Top 20 Seller Best Collections By Production Universal Pictures Walt Disney By Ge...
http://www.videocds.com/cartoon/oliver_twist_animated.htm (lycos 5)

II) 6) Oliver Twist - Video CD - Latest Video CD - Video CD Movies - VCD - CD
A Place where you can get Original Video CDs Movies at a lower price!!! Recommend VideoCDs.com DVD Section New Arrival Top 20 Seller Best Collections By Production Universal Pictures Walt Disney By Ge...
http://www.videocds.com/disney/oliver_twist.htm (lycos 6)

II) 7) The adventures of Oliver Twist (in MARION)
The adventures of Oliver Twist Title: The adventures of Oliver Twist / by Charles Dickens ; with twenty-four illustrations by George Cruikshank and an introduction by Humphr...
http://spot.splib.lib.fl.us/MARION/AAN-3233 (lycos 7)

II) 8) Oliver Twist
Oliver Twist nach Charles Dickes in einer freien Bühnenfassung von Hildegard Plattner es spielt das Jugendtheater der Musik- und Kunstschule Böblingen Eigentlich kann alles nur besser wer...
http://nairda.com/INcity-STUTTGART/HEADLINES/twist.html (lycos 8)

Search Engine 9: infoseek9
Query9: Oliver+Twist

II) 1) By The Ounce
"By The Ounce" Volume One The House of Oliver Twist By Mark Loehrer Tinder Box Tucson, Arizona Oliver Twist is known to all readers as the young hero of Charles Dickens' classic English tale of rags to...
http://www.tinderbox.com/ounce1.htm (infoseek 1)

II) 2) CD-OT-Jackie
QuickTime 5.0 MB It takes the patience of angels to see Jackie Coogan's angelic face. If you don't already have QuickTime with the QuickTime Movie Player, you will need to download QuickTime for Window...
http://www.lang.nagoya-u.ac.jp/~matsuoka/CD-OT-Jackie.html (infoseek 2)

II) 3) Title: "Oliver Twist" - Topics: World/England; Literature/England
Title: "Oliver Twist" - Topics: World/England; Literature/England : Teach With Movies: A new tool for "intentional parents." "Supplement School ......
http://www.teachwithmovies.org/guides/oliver-twist.html (infoseek 3)

II) 4) The News-Times Television Richard Dreyfuss plays Fagin in Disney's `Oliver Twist'
By Ellen Gray Knight-Ridder Newspapers Richard Dreyfuss never thought of leading without the nose. The nose, which is the first thing anyone will notice about Dreyfuss' ......
http://www.newstimes.com/archive97/nov1497/tvh.htm (infoseek 4)

II) 5) Oliver Twist
Follow Ups ] [ Post Followup ] [ Book Review Forum ] [ Search ] [ FAQ ] Oliver Twist Written by Charles Dickens Illustrations by None Average number of words per page: greater than 100 Library of Congr...
http://faldo.atmos.uiuc.edu/BOOKREVIEW/REVIEWS/451.html (infoseek 5)

II) 6) Victorian Lives and Letters 1996-1998: Re: Oliver Twist
My dear Sir or Madam, The ideals of my day, I hope, were not so very different from those of today. But let me suggest you consider these topics: the family, justice, birthright, ......
http://www.youth.net/victorian/hypermail/0263.html (infoseek 6)

II) 7) TUTS Press Release: Oliver Twist
Calendar Listing: Dec. 4-21, 1997. Theatre Under The Stars presents Oliver!, Lionel Bart's musical stage adaptation of Charles Dickens' "Oliver Twist." Houston's Christopher Jones takes the title role,...
http://www.tuts.com/TUTS98/Release/TwistPR.html (infoseek 7)

II) 8) ABC.com
...
http://abc.go.com (infoseek 8)

BuyerSellers
Div. of Internet Corporation
News · Weather · CoolSites · Shopping
Contests · Horoscopes · Classified Visit BuyerSellers1

Phone: 1-631-757-1600 · E-Mail: buyersellers@buyersellers.com ·
Internet Corporation

FIG. 39A

Search'em All: Search your favorite sellers, all at the same time* [Search]

Search 1: [ ] Amazon.com
Search 2: [ ] Borders.com
Search 3: [ ] BarnesandNoble.com
Search 4: [ ] Books.com
Search 5: [ ] WebCrawler
Search 6: [ ] Altavista
Search 7: [ ] Lycos
Search 8: [ ] Infoseek
Search 9: [ ] Yahoo

*Search Engine Results:* Interleave *URL's per Search Engine:* 10
*URL Details:* Summary *Timeout (seconds) per Search Engine:* 3
*Page:* 1 *Searches per Group:* 3 *Group:* 1 * Only 1 entry required

February 6, 1998
ABC NEWS Headlines
U.S. Presence Growing in Iraq

Search Engine Report
Query: Oliver+Twist

II) 1) Oliver Twist
In-Stock: Ships within 24 hours.
Charles Dickens / Hardcover / Barnes & Noble Books / September 1995
B&N Price: $5.98...
http://shop.barnesandnoble.com/booksearch/isbnInquiry.asp?userid=... (barnesandnoble 1)

II) 2) Adventures of Oliver Twist (Oxford Illustrated Dickens)
Usually ships in 24 hours
Charles Dickens, et al / Hardcover / Published 1987
Amazon Price: $11.17 ~ You Save: $4.78 (30%)...
http://www.amazon.com/exec/obidos/ASIN/0192545051/qid=950390698/s... (amazon 1)

II) 3) Oliver Twist
Charles Dickens...
http://sailor.gutenberg.org/etext96/olivr10.txt (lycos 1)

II) 4) By The Ounce
"By The Ounce" Volume One The House of Oliver Twist By Mark Loehrer Tinder Box Tucson, Arizona Oliver Twist is known to all readers as the young hero of Charles Dickens' classic English tale of rags to...
http://www.tinderbox.com/ounce1.htm (infoseek 1)

II) 5) Oliver Twist
In-Stock: Ships within 24 hours.
Charles Dickens,Jean D. Zallinger (Illustrator) / Paperback / Random House, Incorporated / February 1991
B&N Price: $3.19 ~ You Save 20%...
http://shop.barnesandnoble.com/booksearch/isbnInquiry.asp?userid=... (barnesandnoble 2)

II) 6) Charles Dicken's Oliver Twist (Barron's Book Notes)
Usually ships in 24 hours
Charles Dickens, Virginia B. Morris / Paperback / Published 1985
Amazon Price: $2.51 ~ You Save: $0.44 (15%)...
http://www.amazon.com/exec/obidos/ASIN/0812035321/qid=950390698/s... (amazon 2)

II) 7) Oliver Twist: Selected Bibliography
Compiled by Jon Michael Varese for the 1998 Dickens Universe....
http://humwww.ucsc.edu/dickens/DEA/Bibliographies/Oliverbib.html (lycos 2)

II) 8) CD-OT-Jackie
QuickTime 5.0 MB It takes the patience of angels to see Jackie Coogan's angelic face. If you don't already have QuickTime with the QuickTime Movie Player, you will need to download QuickTime for Window...
http://www.lang.nagoya-u.ac.jp/~matsuoka/CD-OT-Jackie.html (infoseek 2)

II) 9) Oliver Twist (Cliffs Notes)
In-Stock: Ships within 24 hours.
Charles Dickens,Harry Kaste / Paperback / Cliffs Notes, Incorporated / October 1988
B&N Price: $3.96 ~ You Save 20%...
http://shop.barnesandnoble.com/booksearch/isbnInquiry.asp?userid=... (barnesandnoble 3)

FIG. 39B

II) 10) The Charles Dickens Collection : Oliver Twist, a Christmas Carol, David Copperfield [ABRIDGED]

/ Published 1997
Amazon Price: $33.96 ~ You Save: $5.99 (15%)...
http://www.amazon.com/exec/obidos/ASIN/0140864768/qid=950390698/s... (amazon 3)

II) 11) Oliver Twist
Oliver Twist (1982) (visit Movies Unlimited for this title on video) George C. Scott shines as a rapscallious Fagin in this Emmy-winning adaptation of Charles Dickens' classic story, with...
http://www.dramamovies.net/631687.htm (lycos 3)

II) 12) Title: "Oliver Twist" - Topics: World/England; Literature/England
Title: "Oliver Twist" - Topics: World/England; Literature/England : Teach With Movies: A new tool for "intentional parents." "Supplement School ......
http://www.teachwithmovies.org/guides/oliver-twist.html (infoseek 3)

II) 13) Oliver Twist
In-Stock: Ships 2-3 days.
Charles Dickens / Paperback / Penguin Putnam Books for Young Readers / August 1994
B&N Price: $3.99 ~ You Save 20%...
http://shop.barnesandnoble.com/booksearch/isbnInquiry.asp?userid=... (barnesandnoble 4)

II) 14) Eyewitness Classics: Oliver Twist [ABRIDGED]
Usually ships in 24 hours
Charles Dickens, et al / Hardcover / Published 1999
Amazon Price: $11.21 ~ You Save: $3.74 (25%)...
http://www.amazon.com/exec/obidos/ASIN/078943959X/qid=950390698/s... (amazon 4)

II) 15) Oliver Twist
Oliver Twist (1997) (visit Movies Unlimited for this title on video) Charles Dickens' perennially popular orphan boy, who struggles to escape a life of hardship on the streets of Victoria...
http://www.family-animated-movies.net/112211.htm (lycos 4)

II) 16) The News-Times Television Richard Dreyfuss plays Fagin in Disney's `Oliver Twist'
By Ellen Gray Knight-Ridder Newspapers Richard Dreyfuss never thought of leading without the nose. The nose, which is the first thing anyone will notice about Dreyfuss' ......
http://www.newstimes.com/archive97/nov1497/tvh.htm (infoseek 4)

II) 17) Oliver Twist
In-Stock: Ships within 24 hours.
Charles Dickens / Paperback / Marboro Books, Inc. / August 1995
B&N Price: $3.96 ~ You Save 20%...
http://shop.barnesandnoble.com/booksearch/isbnInquiry.asp?userid=... (barnesandnoble 5)

II) 18) Oliver Twist
Usually ships in 24 hours
Charles Dickens, et al / Paperback / Published 1985
Amazon Price: $5.56 ~ You Save: $1.39 (20%)...
http://www.amazon.com/exec/obidos/ASIN/0140430172/qid=950390698/s... (amazon 5)

II) 19) Oliver Twist Warner Brothers Classics Tales - Video.CD - Latest Video CD - Video
A Place where you can get Original Video CDs Movies at a lower price!!! Recommend VideoCDs.com DVD Section New Arrival Top 20 Seller Best Collections By Production Universal Pictures Walt Disney By Ge...
http://www.videocds.com/cartoon/oliver_twist_animated.htm (lycos 5)

II) 20) Oliver Twist
Follow Ups ] [ Post Followup ] [ Book Review Forum ] [ Search ] [ FAQ ] Oliver Twist Written by Charles Dickens Illustrations by None Average number of words per page: greater than 100 Library of Congr...
http://faldo.atmos.uiuc.edu/BOOKREVIEW/REVIEWS/451.html (infoseek 5)

II) 21) Oliver Twist
In-Stock: Ships within 24 hours.
Charles Dickens,Irving Howe (Introduction) / Mass Market Paperback / Bantam Books, Incorporated / July 1981
B&N Price: $3.96 ~ You Save 20%...
http://shop.barnesandnoble.com/booksearch/isbnInquiry.asp?userid=... (barnesandnoble 6)

II) 22) Oliver Twist
Usually ships in 24 hours
Charles Dickens, George Cruikshank (Illustrator) / Paperback / Published 1997
Amazon Price: $9.95 ...
http://www.amazon.com/exec/obidos/ASIN/1582880085/qid=950390698/s... (amazon 6)

II) 23) Oliver Twist - Video CD - Latest Video CD - Video CD Movies - VCD - CD
A Place where you can get Original Video CDs Movies at a lower price!!! Recommend VideoCDs.com DVD Section New Arrival Top 20 Seller Best Collections By Production Universal Pictures Walt Disney By Ge...
http://www.videocds.com/disney/oliver_twist.htm (lycos 6)

FIG. 39C

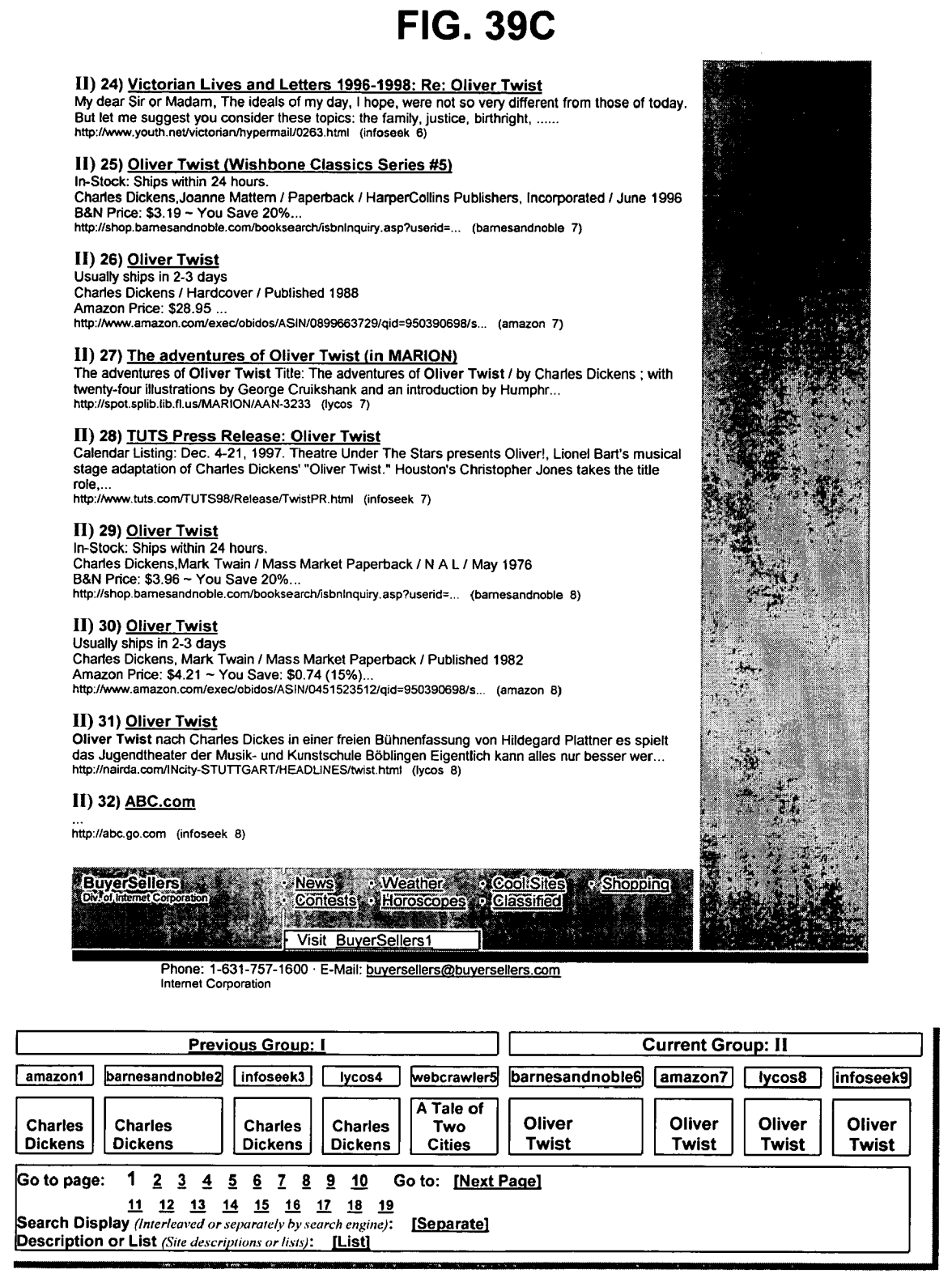

II) 24) Victorian Lives and Letters 1996-1998: Re: Oliver Twist
My dear Sir or Madam, The ideals of my day, I hope, were not so very different from those of today. But let me suggest you consider these topics: the family, justice, birthright, ......
http://www.youth.net/victorian/hypermail/0263.html (infoseek 6)

II) 25) Oliver Twist (Wishbone Classics Series #5)
In-Stock: Ships within 24 hours.
Charles Dickens,Joanne Mattern / Paperback / HarperCollins Publishers, Incorporated / June 1996
B&N Price: $3.19 ~ You Save 20%...
http://shop.barnesandnoble.com/booksearch/isbnInquiry.asp?userid=... (barnesandnoble 7)

II) 26) Oliver Twist
Usually ships in 2-3 days
Charles Dickens / Hardcover / Published 1988
Amazon Price: $28.95 ...
http://www.amazon.com/exec/obidos/ASIN/0899663729/qid=950390698/s... (amazon 7)

II) 27) The adventures of Oliver Twist (in MARION)
The adventures of Oliver Twist Title: The adventures of Oliver Twist / by Charles Dickens ; with twenty-four illustrations by George Cruikshank and an introduction by Humphr...
http://spot.splib.lib.fl.us/MARION/AAN-3233 (lycos 7)

II) 28) TUTS Press Release: Oliver Twist
Calendar Listing: Dec. 4-21, 1997. Theatre Under The Stars presents Oliver!, Lionel Bart's musical stage adaptation of Charles Dickens' "Oliver Twist." Houston's Christopher Jones takes the title role,...
http://www.tuts.com/TUTS98/Release/TwistPR.html (infoseek 7)

II) 29) Oliver Twist
In-Stock: Ships within 24 hours.
Charles Dickens,Mark Twain / Mass Market Paperback / N A L / May 1976
B&N Price: $3.96 ~ You Save 20%...
http://shop.barnesandnoble.com/booksearch/isbnInquiry.asp?userid=... (barnesandnoble 8)

II) 30) Oliver Twist
Usually ships in 2-3 days
Charles Dickens, Mark Twain / Mass Market Paperback / Published 1982
Amazon Price: $4.21 ~ You Save: $0.74 (15%)...
http://www.amazon.com/exec/obidos/ASIN/0451523512/qid=950390698/s... (amazon 8)

II) 31) Oliver Twist
Oliver Twist nach Charles Dickes in einer freien Bühnenfassung von Hildegard Plattner es spielt das Jugendtheater der Musik- und Kunstschule Böblingen Eigentlich kann alles nur besser wer...
http://nairda.com/INcity-STUTTGART/HEADLINES/twist.html (lycos 8)

II) 32) ABC.com
...
http://abc.go.com (infoseek 8)

BuyerSellers
Div. of Internet Corporation
News · Weather · Cool Sites · Shopping
Contests · Horoscopes · Classified
Visit BuyerSellers1

Phone: 1-631-757-1600 · E-Mail: buyersellers@buyersellers.com
Internet Corporation

| Previous Group: I | | | | | Current Group: II | | | |
|---|---|---|---|---|---|---|---|---|
| amazon1 | barnesandnoble2 | infoseek3 | lycos4 | webcrawler5 | barnesandnoble6 | amazon7 | lycos8 | infoseek9 |
| Charles Dickens | Charles Dickens | Charles Dickens | Charles Dickens | A Tale of Two Cities | Oliver Twist | Oliver Twist | Oliver Twist | Oliver Twist |

Go to page: 1 2 3 4 5 6 7 8 9 10 Go to: [Next Page]
11 12 13 14 15 16 17 18 19
Search Display *(Interleaved or separately by search engine)*: [Separate]
Description or List *(Site descriptions or lists)*: [List]

FIG. 40A

Search'em All: Search your favorite search engines, all at the same time* [Search]

| | | |
|---|---|---|
| Search 1: | | WebCrawler |
| Search 2: | | Altavista |
| Search 3: | | Lycos |
| Search 4: | | Infoseek |
| Search 5: | | Excite |
| Search 6: | | Yahoo |
| Search 7: | | LookSmart |
| Search 8: | | HotBot |
| Search 9: | | Dejanews |

*Search Engine Results:* Interleave *URL's per Search Engine:* 10

*URL Details:* Summary *Timeout (seconds) per Search Engine:* 3

*Page:* 1 *Searches per Group:* 3 *Group:* 1 * Only 1 entry required

February 6, 1998
ABC NEWS Headlines

U.S. Presence Growing in Iraq

Search Engine Report
Query: dogs

I) 451) Dazer Dog Deterrent Stops Dogs Instantly
...
http://www.hotgoodies.com/Dazer-a.htm (webcrawler 51)

I) 452) Australian Cattle Dogs, purebred Australian Cattle Dog puppies, Australian Cat
...
http://www.puppydogweb.com/caninebreeds/austrcatdog.htm (altavista 51)

I) 453) iVillage Pet Channel - Dogs
...
http://www.ivillage.com/pets/dogs/ (lycos 51)

I) 454) Aussie Dogs Sheepskin Boots and Footwear From Makai Promotions
...
http://www.sailorschoice.com/dogboots.html (infoseek 51)

I) 455) FILA DOGS FILAS DOGS ARE THE WORLDS FINEST NATURAL GUARDIAN DOGS
...
http://search.excite.com/relocate/sr=webresult|ss=dogs|id=2681267... (excite 51)

I) 456) Regional > U.S. States > California > Cities > Oakland > Business and Shopping > Shopping and Services > Animals
...
http://dir.yahoo.com/Regional/U_S__States/California/Cities/Oakla... (yahoo 51)

I) 457) SPCA Hearing Dog Program
...
http://www.sfspcahdp.org/ (looksmart 51)

I) 458) K-9 WORLD OF DOGS
...
http://www.cass.net/~w-dogs/ (hotbot 51)

I) 459) [POLL] Nitro vs. A bunch of well groomed dogs...
...
http://x46.deja.com/getdoc.xp?AN=583358701&CONTEXT=950411963.5082... (dejanews 51)

I) 460) Breed Specific FAQs
...
http://www.bulldog.org/dogs/breedfaq.html (webcrawler 52)

I) 461) Lineage Manager for Dogs Product Information
...
http://www.nwpsw.com/lmdmain.html (altavista 52)

I) 462) Afacan Kangal Dogs

FIG. 40B

...
http://members.aol.com/jcchappell/index.html (lycos 52)

I) 463) Red Dog Red Dog
...
http://www.reddog.com/ (infoseek 52)

I) 464) DOG-PLAY - Fun with Your Dog
...
http://search.excite.com/relocate/sr=webresult|ss=dogs|id=81948,h... (excite 52)

I) 465) It's A Dogs World
...
http://www.dogs-world.com (yahoo 52)

I) 466) Dog Lot Web Cam
...
http://www.alaska.net/%7Ebillhall/findex.html (looksmart 52)

I) 467) Sound Dogs Online Hollywood Sound Effects and Music Library
...
http://www.sounddogs.com/ (hotbot 52)

I) 468) dogs and drugs
...
http://x46.deja.com/getdoc.xp?AN=583842871&CONTEXT=950411963.5082... (dejanews 52)

I) 469) Guide Dogs for the Blind, Inc.
...
http://www.guidedogs.com/NOPICS/home.html (webcrawler 53)

I) 470) All About Show Dogs and Dog Shows
...
http://www.showdogsupersite.com/ (altavista 53)

I) 471) Phillips Command Dogs
...
http://www.geocities.com/phillipscommanddogs (lycos 53)

I) 472) Welcome To The Professional Dog Networks Home Page . . .
...
http://www.prodogs.com/index.htm (infoseek 53)

I) 473) Liberty Spirit's Australian Cattle Dogs
...
http://search.excite.com/relocate/sr=webresult|ss=dogs|id=351825,... (excite 53)

I) 474) Net Events > Science > Animals > Dogs > Chat Rooms
...
http://events.yahoo.com/Net_Events/Science/Animals/Dogs/Chat_Room... (yahoo 53)

I) 475) Akbash Dog Homepage
...
http://www.whitelands.com/akbash/ (looksmart 53)

I) 476) Mad About Dogs magazine
...
http://www.madaboutdogs.co.uk/ (hotbot 53)

I) 477) ITIN: The Love Dogs
...
http://x46.deja.com/getdoc.xp?AN=582645517&CONTEXT=950411963.5082... (dejanews 53)

I) 478) Dr. P's Dog Training: Delta Society
...
http://www.uwsp.edu/acad/psych/dog/BeyLimit.htm (webcrawler 54)

I) 479) Dogs: ThePoop.com | dogs, canine, breeds, training, rescue, health, advice
...
http://www.thepoop.com/ (altavista 54)

I) 480) Dogs in Canada: Tibetan Spaniel
...
http://www.dogs-in-canada.com/breeds/tibetan_spaniel.html (lycos 54)

I) 481) The Arizona Dog Home Page
...
http://www.primenet.com/~stacy/sv_dog/azrescue.html (infoseek 54)

I) 482) Weiner Dogs WebRing

FIG. 40C

...
http://search.excite.com/relocate/sr=webresult|ss=dogs|id=4549751... (excite 54)

I) 483) @Dogs Chat Room
...
http://sac.uky.edu/~jwwill0/dogs/misc/chat.htm (yahoo 54)

I) 484) Eye Dog Foundation
...
http://www.eyedogfoundation.org/ (looksmart 54)

I) 485) Just black women with their dogs
...
http://www.righthair.com/black_women_with_their_dogs.html (hotbot 54)

I) 486) Re: AVOID Dogs Miam POST!!
...
http://x46.deja.com/getdoc.xp?AN=582787198&CONTEXT=950411963.5082... (dejanews 54)

I) 487) Assistance Dogs International
...
http://www.assistance-dogs-intl.org/therstand.html (webcrawler 55)

I) 488) Hearing Dogs for Deaf People Home Page
...
http://www.hearing-dogs.co.uk/ (altavista 55)

I) 489) Bright and Beautiful Therapy Dogs
...
http://www.pet-therapist.com (lycos 55)

I) 490) Dog Bytes: Sea Dogs news and information from Press Herald Online
...
http://www.portland.com/seadogs/ (infoseek 55)

I) 491) Spring Canine : Changing the dog you have into the dog you want
...
http://search.excite.com/relocate/sr=webresult|ss=dogs|id=419404,... (excite 55)

I) 492) Science > Biology > Genetics > Genome Projects > Genome Databases
...
http://dir.yahoo.com/Science/Biology/Genetics/Genome_Projects/Gen... (yahoo 55)

I) 493) Finnish Hearing Dog Association
...
http://www.freenet.hut.fi/partneritomi/kuulokoirayhdistys/ (looksmart 55)

I) 494) !The free dogs and only page!
...
http://www.ukhomecams.com/hardcore-sex34/index17.html (hotbot 55)

I) 495) Re: Chocolate is toxic to dogs
...
http://x46.deja.com/getdoc.xp?AN=583342179&CONTEXT=950411963.5082... (dejanews 55)

I) 496) Dog Journals
...
http://www.rapidnet.com/~cldavies/dogs.html (webcrawler 56)

I) 497) German Shepherd Search Dogs of Washington State
...
http://www.gssd.org/ (altavista 56)

I) 498) Australian Cattle Dogs
...
http://members.xoom.com/ACDV/index.htm (lycos 56)

I) 499) Free Pet Classified Advertising at Pet Expo
...
http://www.pet-expo.com/petclass.htm (infoseek 56)

I) 500) Antelope Publishing Good for a Laugh Why Dogs Are Better
...
http://search.excite.com/relocate/sr=webresult|ss=dogs|id=4538961... (excite 56)

I) 501) Database Of Genome Sizes (DOGS)
...
http://www.cbs.dtu.dk/databases/DOGS/index.html (yahoo 56)

I) 502) Florida Dog Guides For The Deaf
...

FIG. 40D http://home1.gte.net/adogs/floridadogguides.htm (looksmart 56)

I) 503) Just dogs having sex with men
...
http://www.findother.com/dogs_having_sex_with_men.html (hotbot 56)

I) 504) Re: Do dogs fly well?
...
http://x46.deja.com/getdoc.xp?AN=585077206&CONTEXT=950411963.5082... (dejanews 56)

I) 505) 411 Pets - Special Companions - Guide Dogs, Seeing Eye Dogs,...
...
http://www.411pets.com/SPECIAL_COMPANIONS/ (webcrawler 57)

I) 506) Dogs Against Drugs
...
http://yofee.simplenet.com/ (altavista 57)

I) 507) Dogs in Canada: Berger Des Pyrenees
...
http://www.dogs-in-canada.com/breeds/berger_des_pyrenees.html (lycos 57)

I) 508) Welcome to PeopleLink!
...
http://www.peoplelink.com/comnet/thedoghouse/ (infoseek 57)

I) 509) Dogs, Obedience, Training, Vets, Groomers, Magazines, Clubs, Schools, ...
...
http://search.excite.com/relocate/sr=webresult|ss=dogs|id=1233019... (excite 57)

I) 510) Entertainment > Music > Artists > By Genre > Rock and Pop > Dogs d'Amour
...
http://dir.yahoo.com/Entertainment/Music/Artists/By_Genre/Rock_an... (yahoo 57)

I) 511) Hearing Dog Book - Lend Me an Ear
...
http://www.doralpub.com/hearing.html (looksmart 57)

I) 512) Our Dogs
...
http://www.ourdogs.co.uk/ (hotbot 57)

I) 513) Re: Do dogs fly well?
...
http://x46.deja.com/getdoc.xp?AN=585091628&CONTEXT=950411963.5082... (dejanews 57)

I) 514) Introduction to Sapir Weiss
...
http://www.digitaldog.com/sapir.html (webcrawler 58)

I) 515) 2 Stupid Dogs homepage
...
http://home.sn.no/~tbk/2stupid.html (altavista 58)

I) 516) Spanish Water Dogs / Perro de Aqua Espanol
...
http://homepages.msn.com/PetsPl/cep99/index.html (lycos 58)

I) 517) Australian Dogs Page - information for dog owners in Australia
...
http://www.pcug.org.au/~sbaker/dogs.htm (infoseek 58)

I) 518) Mexico Dogs
...
http://search.excite.com/relocate/sr=webresult|ss=dogs|id=900025,... (excite 58)

I) 519) Dogs D'amour Collection, The
...
http://village.infoweb.ne.jp/~dogs/index.html (yahoo 58)

I) 520) 2 Stupid Dogs - Wingnut
...
http://3w.nai.net/~wingnut/Two_Stupid_Dogs.html (looksmart 58)

I) 521) dog adoption, dog breeds, dogs, vet, puppy -- WELCOME TO WOOFS MAGAZINE!
...
http://www.woofs.org/ (hotbot 58)

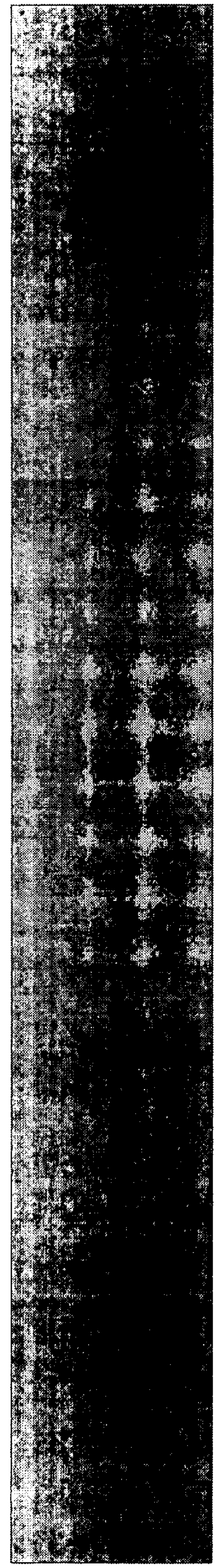

FIG. 40E

I) 522) Re: dogs and drugs
...
http://x46.deja.com/getdoc.xp?AN=583884222&CONTEXT=950411963.5082... (dejanews 58)

I) 523) Global Training Academy Welcome K-9 Drug Dog, Bomb Dog Page ...
...
http://globalcorp.com/trainingacademy/welcome.htm (webcrawler 59)

I) 524) Schooling the dogs
...
http://www.msnbc.com/onair/nbc/dateline/guides/slide1.asp (altavista 59)

I) 525) All About Dogs Breeders' Directory
...
http://www.geton.net/pets/dogs/main.htm (lycos 59)

I) 526) Jack Onofrio Dog Shows, L.L.C.
...
http://www.onofrio.com/ (infoseek 59)

I) 527) Reigning Cats & Dogs
...
http://search.excite.com/relocate/sr=webresult|ss=dogs|id=542735,... (excite 59)

I) 528) Regional > Countries > United Kingdom > Society and Culture > Disabilities > Support and Assistance
...
http://dir.yahoo.com/Regional/Countries/United_Kingdom/Society_an... (yahoo 59)

I) 529) rec.pets.dogs: Malinois Breed-FAQ
...
http://www.cis.ohio-state.edu/hypertext/faq/usenet/dogs-faq/breed... (looksmart 59)

I) 530) Healing Dogs; Golden Retriever Psychology Experts
...
http://www.healinghelp.org/ (hotbot 59)

I) 531) Re: dogs and drugs
...
http://x46.deja.com/getdoc.xp?AN=583956542&CONTEXT=950411963.5082... (dejanews 59)

I) 532) Top Dog : The Dogs
...
http://azstarnet.com/~5315top/tdp4.htm (webcrawler 60)

I) 533) Old Towne School For Dogs
...
http://www.alexandriacity.com/services/dogs.htm (altavista 60)

I) 534) Dogs in Canada: Canadian Eskimo Dog
...
http://www.dogs-in-canada.com/breeds/canadian_eskimo_dog.html (lycos 60)

I) 535) Newport Dog Shows Home Page
...
http://www.newportdogshows.com/ (infoseek 60)

I) 536) index
...
http://search.excite.com/relocate/sr=webresult|ss=dogs|id=254876,... (excite 60)

I) 537) Support Dogs
...
http://www.support-dogs.org.uk/ (yahoo 60)

I) 538) German Shepherd Dogs Breed-FAQ
...
http://www.cis.ohio-state.edu/hypertext/faq/usenet/dogs-faq/breed... (looksmart 60)

I) 539) Dogs Afield - Field Dog Supplies for the Retriever Trainer / Gundog Owner - We Also Sell Gifts and Home Accessories
...
http://www.dogsafield.com/ (hotbot 60)

I) 540) Re: Dogs or Cats?
...
http://x46.deja.com/getdoc.xp?AN=582148185&CONTEXT=950411963.5082... (dejanews 60)

I) 541) Petnet - Dog Lovers' Page
...
http://www.petnet.com.au/dogs/introdog.html (webcrawler 61)

FIG. 40F

I) 542) The All About Dogs Bulletin Board
...
http://www.alpha-omega.net/guide/board41/index.htm (altavista 61)

I) 543) Working Dogs Web Links Page
...
http://workingdogs.com/doc0007.htm%23ass (lycos 61)

I) 544) North American Versatile Hunting Dog Association Home Page
...
http://www.navhda.org/ (infoseek 61)

I) 545) FILA DOGS FILAS DOGS ARE THE WORLDS FINEST NATURAL GUARDIAN DOGS
...
http://search.excite.com/relocate/sr=webresult|ss=dogs|id=1293130... (excite 61)

I) 546) Regional > U.S. States > Idaho > Cities > Boise > Business and Shopping > Shopping and Services > Animals
...
http://dir.yahoo.com/Regional/U_S__States/Idaho/Cities/Boise/Busi... (yahoo 61)

I) 547) rec.pets.dogs Otterhounds Breed-FAQ
...
http://www.cis.ohio-state.edu/hypertext/faq/usenet/dogs-faq/breed... (looksmart 61)

I) 548) JUST DOGS DOGSTORE Home Page
...
http://www.justdogs.com/ (hotbot 61)

I) 549) [POLL] Nitro vs. A bunch of well groomed dogs...
...
http://x25.deja.com/getdoc.xp?AN=583358701&CONTEXT=950411963.1223... (dejanews 61)

I) 550) XIBALBA`S OTHER LINKS
...
http://user.tninet.se/~kmr888m/elinks.htm (webcrawler 62)

I) 551) Dogs - Accessories, Publications, Books
...
http://www.linkstoall.com/dogmain.html (altavista 62)

I) 552) An old breed of livestock guardian dogs.
...
http://www.angelfire.com/journal/tomjak (lycos 62)

I) 553) North American Police Work Dog Association
...
http://www.napwda.com/ (infoseek 62)

I) 554) New Zealand Dog Index
...
http://search.excite.com/relocate/sr=webresult|ss=dogs|id=310434,... (excite 62)

I) 555) Treborwolf Kennels
...
http://www.primenet.com/~dogs/ (yahoo 62)

I) 556) rec.pets.dogs: Harriers Breed-FAQ
...
http://www.cis.ohio-state.edu/hypertext/faq/usenet/dogs-faq/breed... (looksmart 62)

I) 557) DOGS
...
http://dogs.best-catalog.net/ (hotbot 62)

I) 558) Catahoula Leopard Dogs
...
http://x25.deja.com/getdoc.xp?AN=584577349&CONTEXT=950411963.1223... (dejanews 62)

I) 559) Siberian Husky & Alaskan Malamute Rescue
...
http://www.cheta.net/connect/canine/rescue/shrod.htm (webcrawler 63)

I) 560) CyberPet - your source for pet information - dogs, cats breeders, pet products
...
http://www.cyberpet.com/ (altavista 63)

FIG. 40G

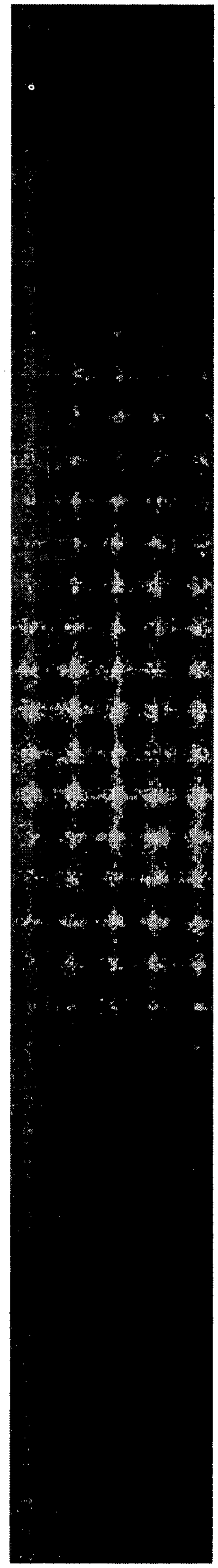

I) 561) Four Dogs Playing Poker
...
http://fourdogsplayingpoker.com (lycos 63)

I) 562) Lucky Dog Books Welcome
...
http://www.luckydogbooks.com/ (infoseek 63)

I) 563) DogFriendly.com's Travel Guide for Dogs of ALL Sizes!
...
http://search.excite.com/relocate/sr=webresult|ss=dogs|id=772928,... (excite 63)

I) 564) Science > Biology > Zoology > Animals, Insects, and Pets > Mammals > Dogs > FAQ
...
http://dir.yahoo.com/Science/Biology/Zoology/Animals__Insects__an... (yahoo 63)

I) 565) 2 Stupid Dogs - Fan Tribute
...
http://www.geocities.com/SiliconValley/5159/2stupid.html (looksmart 63)

I) 566) dogs
...
http://dogs.entertainment-bigstar.com/ (hotbot 63)

I) 567) dogs and drugs
...
http://x25.deja.com/getdoc.xp?AN=583842871&CONTEXT=950411963.1223... (dejanews 63)

I) 568) A Dog Sits Waiting
...
http://www.heartbandits.com/HBADogSitsWaiting.htm (webcrawler 64)

I) 569) Kids and Dogs
...
http://www.cbrrescue.org/kids_and_dogs.htm (altavista 64)

I) 570) Hot Dogs
...
http://www.regebro.nu/lennart/hotdogs.html (lycos 64)

I) 571) Little Dog Records, independent label offering the best Music, Pete Anderson, Scott Joss, ...
...
http://www.littledogrecords.com/ (infoseek 64)

I) 572) Color Coordinated Canine: bows,dog bows,bows for dogs,show dog bows,do...
...
http://search.excite.com/relocate/sr=webresult|ss=dogs|id=343769,... (excite 64)

I) 573) Dogs
...
http://www.cis.ohio-state.edu/hypertext/faq/usenet/dogs-faq/top.h... (yahoo 64)

I) 574) Bernese Mountain Dogs - Sunshine
...
http://www.c-zone.net/berner/ (looksmart 64)

I) 575) Dogs
...
http://lincoln.k12.mi.us/~northrop/dogs.html (hotbot 64)

I) 576) Portuguese Water Dogs and ...
...
http://x25.deja.com/getdoc.xp?AN=584399548&CONTEXT=950411963.1223... (dejanews 64)

I) 577) Big Dog's Hospitality Group Web Site, Home to the Las Vegas ...
...
http://holycowbrewery.com/ (webcrawler 65)

I) 578) 2 Stupid Dogs homepage
...
http://home.sol.no/~tbk/2stupid.html (altavista 65)

I) 579) World Wide Web of Dogs
...
http://hsc.usc.edu/%7emeville/doglinks.html (lycos 65)

I) 580) Livestock Guardian Dogs

FIG. 40H

...
http://www.lgd.org/ (infoseek 65)

I) 581) Marsland Laboratories: AMAIZE Nutritional Supplements for Dogs
...
http://search.excite.com/relocate/sr=webresult|ss=dogs|id=528545,... (excite 65)

I) 582) Regional > Countries > Canada > Provinces and Territories > Ontario > Counties and Regions > Toronto > Entertainment and Arts > Music > Artists
...
http://dir.yahoo.com/Regional/Countries/Canada/Provinces_and_Terr... (yahoo 65)

I) 583) St. Pete Mad Dogs
...
http://www.cyberscapes.com/maddog/index.html (looksmart 65)

I) 584) dogs
...
http://dogs.t1-ishophere.com/ (hotbot 65)

I) 585) Re: All about hot dogs...Paco~
...
http://x25.deja.com/getdoc.xp?AN=584562256&CONTEXT=950411963.1223... (dejanews 65)

I) 586) Origin of the Xoloitzcuintli
...
http://www.hyperweb.com/xolos/XOLO-ORIGIN.html (webcrawler 66)

I) 587) History of Search and Rescue dogs in the Netherlands
...
http://cerberus.dimes.tudelft.nl/sardogs/history.htm (altavista 66)

I) 588) Guide Dogs in Australia
...
http://www.guidedogs.com.au/mobility/dogs (lycos 66)

I) 589) Your New Dog
...
http://www.k9web.com/dog-faqs/new-dog.html (infoseek 66)

I) 590) PETsMART.com - Where pets are family
...
http://search.excite.com/relocate/sr=webresult|ss=dogs|id=1906574,... (excite 66)

I) 591) Max Woolaver and the Village Dogs
...
http://www.kapn.tap.net/dogs/ (yahoo 66)

I) 592) 2 Stupid Dogs - Linda's Page
...
http://www.geocities.com/Hollywood/Trailer/3687/2dogs.html (looksmart 66)

I) 593) Dogs Gear from PawGear.com
...
http://paws.0771.com/pawsho/index.phtml (hotbot 66)

I) 594) Re: Amyloid
...
http://x25.deja.com/getdoc.xp?AN=584515874&CONTEXT=950411963.1223... (dejanews 66)

I) 595) Dog-Play: Special Dogs and Other Animals
...
http://www.dog-play.com/special.html (webcrawler 67)

I) 596) Two-Dogs.Com: Home of Web Page Design, Baseball, and Collecting Sportscards
...
http://www.two-dogs.com/ (altavista 67)

I) 597) Dogs in Canada: Spaniel (English Cocker)
...
http://www.dogs-in-canada.com/breeds/spaniel_english_cocker.html (lycos 67)

I) 598) THE PURPOSE OF THIS SITE IS TO PROMOTE OUR DOGS AND THE ACTIVITIES WE DO WITH THEM
...
http://www.k9ads.com/ (infoseek 67)

I) 599) Benny's Reservoir Dogs HomePage
...
http://search.excite.com/relocate/sr=webresult|ss=dogs|id=3160343:... (excite 67)

FIG. 40I

I) 600) Regional > Countries > Canada > Entertainment > Music > Artists > By Genre > Rock and Pop
...
http://dir.yahoo.com/Regional/Countries/Canada/Entertainment/Musi... (yahoo 67)

I) 601) Chapel Hill - Tony Jr's Hot Dogs
...
http://www.trianglerestaurants.com:8004/tonyjr's/ (looksmart 67)

I) 602) http://www.iams.com/
...
http://www.iams.com/ (hotbot 67)

I) 603) Re: B.W. BYB's coming out of the woodwork..........
...
http://x25.deja.com/getdoc.xp?AN=584435022&CONTEXT=950411963.1223... (dejanews 67)

I) 604) Making Tracks from the Track
...
http://www.fastfriends.org/adopt-track.html (webcrawler 68)

I) 605) dogs-faq/breeds
...
http://www.cs.uu.nl/wais/html/na-dir/dogs-faq/breeds/.html (altavista 68)

I) 606) Dogs in Canada: Dandie Dinmont Terrier
...
http://www.dogs-in-canada.com/breeds/dandie_dinmont_terrier.html (lycos 68)

I) 607) Mad Dog Ranch
...
http://www.jacksonholenet.com/madog/ (infoseek 68)

I) 608) Frisbee Dog Club: National Capital Air Canines™, disc dogs
...
http://search.excite.com/relocate/sr=webresult|ss=dogs|id=44565,h... (excite 68)

I) 609) Regional > Countries > United Kingdom > Science > Biology > Zoology > Animals, Insects, and Pets > Magazines
...
http://dir.yahoo.com/Regional/Countries/United_Kingdom/Science/Bi... (yahoo 68)

I) 610) Trayko 's borzoi dogs
...
http://www.geocities.com/Heartland/Hills/7055/ (looksmart 68)

I) 611) Briar Creek Akbash Dogs
...
http://www.morgan.net/~connyh/ (hotbot 68)

I) 612) Re: Brother/sister breedings
...
http://x25.deja.com/getdoc.xp?AN=584445333&CONTEXT=950411963.1223... (dejanews 68)

I) 613) MyCemetery.com (dogs, cats, fish, birds, death, grieving, gr...
...
http://www.lavamind.com/pet.html (webcrawler 69)

I) 614) DOGS-OF-SOHO
...
http://dog-o-gram.com/ (altavista 69)

I) 615) Animations of Dogs
...
http://www.animationlover.com/cgi-bin/viewer/imageview.cgi%3ftemp... (lycos 69)

I) 616) InfoDog Dog Show, Dog Breeder, Dog Products, and Dog Services, Main Menu
...
http://www.infodog.com/main.htm (infoseek 69)

I) 617) Welcome to Wagon Wheel Pedigrees - dog pedigrees research
...
http://search.excite.com/relocate/sr=webresult|ss=dogs|id=206110,... (excite 69)

I) 618) Dogs Today
...
http://www.lightwave.co.uk/dogs-today/ (yahoo 69)

FIG. 40J

I) 619) 2 Stupid Dogs - Almost Homepage
...
http://www.geocities.com/TelevisionCity/1192/dogmain.htm (looksmart 69)

I) 620) Support Dogs, Inc.
...
http://members.aol.com/maxidog1/support.htm (hotbot 69)

I) 621) Re: Chocolate is toxic to dogs
...
http://x25.deja.com/getdoc.xp?AN=583342179&CONTEXT=950411963.1223... (dejanews 69)

I) 622) Musher's Language
...
http://users.nbn.net/~jbross/language.html (webcrawler 70)

I) 623) Portuguese Water Dogs, portuguese water dogs, portuguese water dog puppies, pu
...
http://www.puppydogweb.com/caninebreeds/prtwaterdog.htm (altavista 70)

I) 624) Free Clip Art of Dogs
...
http://www.iband.com/clip/clipartdogs.html (lycos 70)

I) 625) American Dog Trainers Network -- Your Dog Training & Behavior Resource Ctr
...
http://www.inch.com/~dogs/ (infoseek 70)

I) 626) Lame Duck Retrievers
...
http://search.excite.com/relocate/sr=webresult|ss=dogs|id=377215,... (excite 70)

I) 627) Regional > U.S. States > Indiana > Cities > Ferdinand > Business and Shopping
...
http://dir.yahoo.com/Regional/U_S__States/Indiana/Cities/Ferdinan... (yahoo 70)

I) 628) Shopping
...
http://209.185.142.203/entry.jsp?p=looksmart (looksmart 70)

I) 629) DogSaver Screen Saver
...
http://www.dogsaver.com/ (hotbot 70)

I) 630) Re: dogs and drugs
...
http://x25.deja.com/getdoc.xp?AN=583884222&CONTEXT=950411963.1223... (dejanews 70)

I) 631) Important News About Heart Disease in Dogs
...
http://www.avma.org/care4pets/b2b2.htm (webcrawler 71)

I) 632) dogs-faq
...
http://www.cs.uu.nl/wais/html/na-dir/dogs-faq/.html (altavista 71)

I) 633) SilverDust Australian Cattle Dogs
...
http://www.australiancattledog.com/silverdust.html (lycos 71)

I) 634) Authentic military ID tags! Tips - create your own dog tags. FRee dog tags!
...
http://www.id-ideas.com/tips.html (infoseek 71)

I) 635) A Dog's Best Friend
...
http://search.excite.com/relocate/sr=webresult|ss=dogs|id=431008,... (excite 71)

I) 636) Health > Emergency Services > Search and Rescue > Canine SAR Organizations
...
http://dir.yahoo.com/Health/Emergency_Services/Search_and_Rescue/... (yahoo 71)

I) 637) Discover Dogs - Cardigan Welsh Corgi
...
http://www.discover-dogs.org.uk/pastoral/p877.htm (looksmart 71)

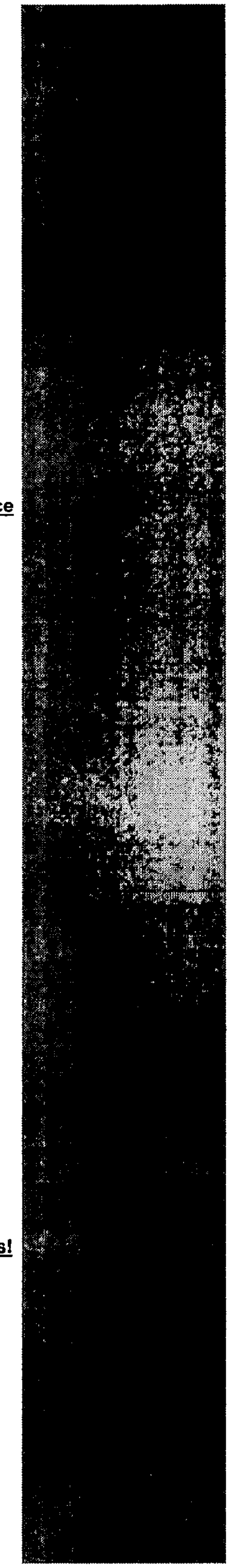

FIG. 40K

I) 638) TOP DOGS BY DESIGN
...
http://www.eaglemotors.com/td/home.htm (hotbot 71)

I) 639) Catahoula Leopard Dogs
...
http://x37.deja.com/getdoc.xp?AN=584577349&CONTEXT=950411963.1227... (dejanews 71)

I) 640) War Dogs
...
http://www.qmfound.com/k-9.htm (webcrawler 72)

I) 641) Dogs Today Online Edition - February 1998
...
http://www.lightwave.co.uk/dogs-today/contents.html (altavista 72)

I) 642) Pyrenean Mountain Dogs
...
http://www.geocities.com/Petsburgh/Zoo/9306/ (lycos 72)

I) 643) Hot Dog on a Stick Welcomes You!
...
http://www.hotdogonastick.com/ (infoseek 72)

I) 644) New Clan DOGS OF WAR!!!!!!
...
http://search.excite.com/relocate/sr=webresult|ss=dogs|id=361050,:. (excite 72)

I) 645) Avalanche Dogs!
...
http://www.drizzle.com/~danc/avalanche.html (yahoo 72)

I) 646) Lowchen - Dogs in Canada
...
http://www.dogs-in-canada.com/breeds/lowchen.html (looksmart 72)

I) 647) Marchenhaft Service Dogs
...
http://www.marchenhaft.com/ (hotbot 72)

I) 648) Catahoula Leopard Dogs
...
http://x37.deja.com/getdoc.xp?AN=584578059&CONTEXT=950411963.1227... (dejanews 72)

I) 649) DOGS-OF-SOHO
...
http://www.dogs-of-soho.com/ (webcrawler 73)

I) 650) Kombinalong Australian Cattle Dogs
...
http://www.wwwins.net.au/dog/kombinalong.html (altavista 73)

I) 651) National Education for Assistance Dogs - NEADS
...
http://chamber.worcester.ma.us/neads/INDEX.HTM (lycos 73)

I) 652) Hot Diggity Dog
...
http://www.hotdiggitydog.com/ (infoseek 73)

I) 653) I Love Dogs!!!
...
http://search.excite.com/relocate/sr=webresult|ss=dogs|id=923595,:. (excite 73)

I) 654) Health > Mental Health > Counseling and Therapy > Therapeutic Methods > Animal Assisted Therapy
...
http://dir.yahoo.com/Health/Mental_Health/Counseling_and_Therapy/... (yahoo 73)

I) 655) Carragheen Chinese Crested Dogs
...
http://www.wollongong.starway.net.au/~lbdh/ (looksmart 73)

I) 656) Day Care for Dogs - San Diego Dogs and their owners love us.
...
http://www.sdco-op.com/daycare.htm (hotbot 73)

I) 657) More new pics up! A new Khorne Demon Gallery, new Dogs of War, and...
...
http://x37.deja.com/getdoc.xp?AN=584730543&CONTEXT=950411963.1227... (dejanews 73)

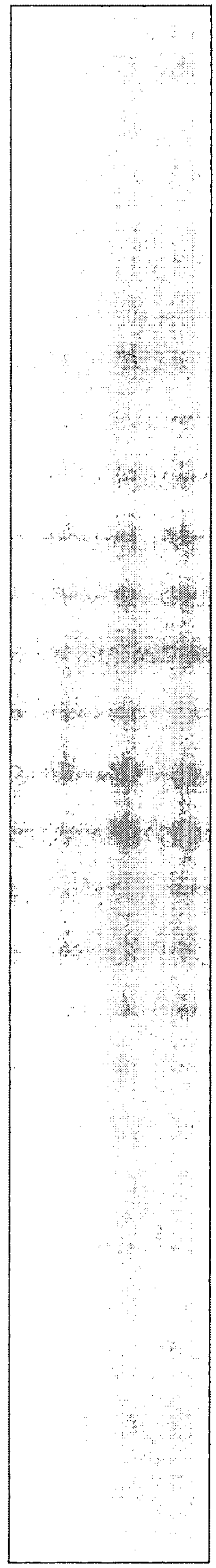

FIG. 40L

I) 658) The Official Brianna Page
...
http://www.inw.net/~wallisj/brianna.htm (webcrawler 74)

I) 659) Amazing Prehistoric dogs
...
http://freespace.virgin.net/paul.charlton1/home.htm (altavista 74)

I) 660) Karelian Bear Dogs at Work
...
http://www.gosmokies.com/letsgo/gatlinburg/news/ms042298.html (lycos 74)

I) 661) National Hot Dog And Sausage Council | www.hot-dog.org
...
http://www.hot-dog.org/ (infoseek 74)

I) 662) Tollhaus 24k Dogs
...
http://search.excite.com/relocate/sr=webresult|ss=dogs|id=1812682... (excite 74)

I) 663) Therapy Dogs of Vermont
...
http://www.therapydogs.org (yahoo 74)

I) 664) Starbourne Bernese Mountain Dogs
...
http://www.softcom.net/users/aprilr/Main.htm (looksmart 74)

I) 665) DOGS
...
http://www-scfn.thpl.lib.fl.us/menus/production/dogs.html (hotbot 74)

I) 666) Portuguese Water Dogs and ...
...
http://x37.deja.com/getdoc.xp?AN=584399548&CONTEXT=950411963.1227... (dejanews 74)

I) 667) WRPC Poodle Rescue Information
...
http://www.en.com/users/poodle/wrpcresc.htm (webcrawler 75)

I) 668) The Kids and Dogs Page
...
http://www.geocities.com/Heartland/Meadows/2344/index.html (altavista 75)

I) 669) Fiona's Reservoir Dogs Page
...
http://www.geocities.com/Hollywood/Set/6283/ (lycos 75)

I) 670) Dog Lists
...
http://www.hoflin.com/Lists/DogLists.html (infoseek 75)

I) 671) K-9 Search &, Detection, Inc.
...
http://search.excite.com/relocate/sr=webresult|ss=dogs|id=524346,... (excite 75)

I) 672) Business and Economy > Companies > Animals > Dogs > Breeders > German Shepherd Dogs
...
http://dir.yahoo.com/Business_and_Economy/Companies/Animals/Dogs/... (yahoo 75)

I) 673) 2 Stupid Dogs - Sounds
...
http://web.ukonline.co.uk/sounds/2stupiddogs.html (looksmart 75)

I) 674) Re: A very important question...
...
http://x37.deja.com/getdoc.xp?AN=584704858&CONTEXT=950411963.1227... (dejanews 75)

Search'em All
Div. of Internet Corporation
News Weather Cool Sites Shopping
Contests Horoscopes Classified
Visit Search4 it

FIG. 41A

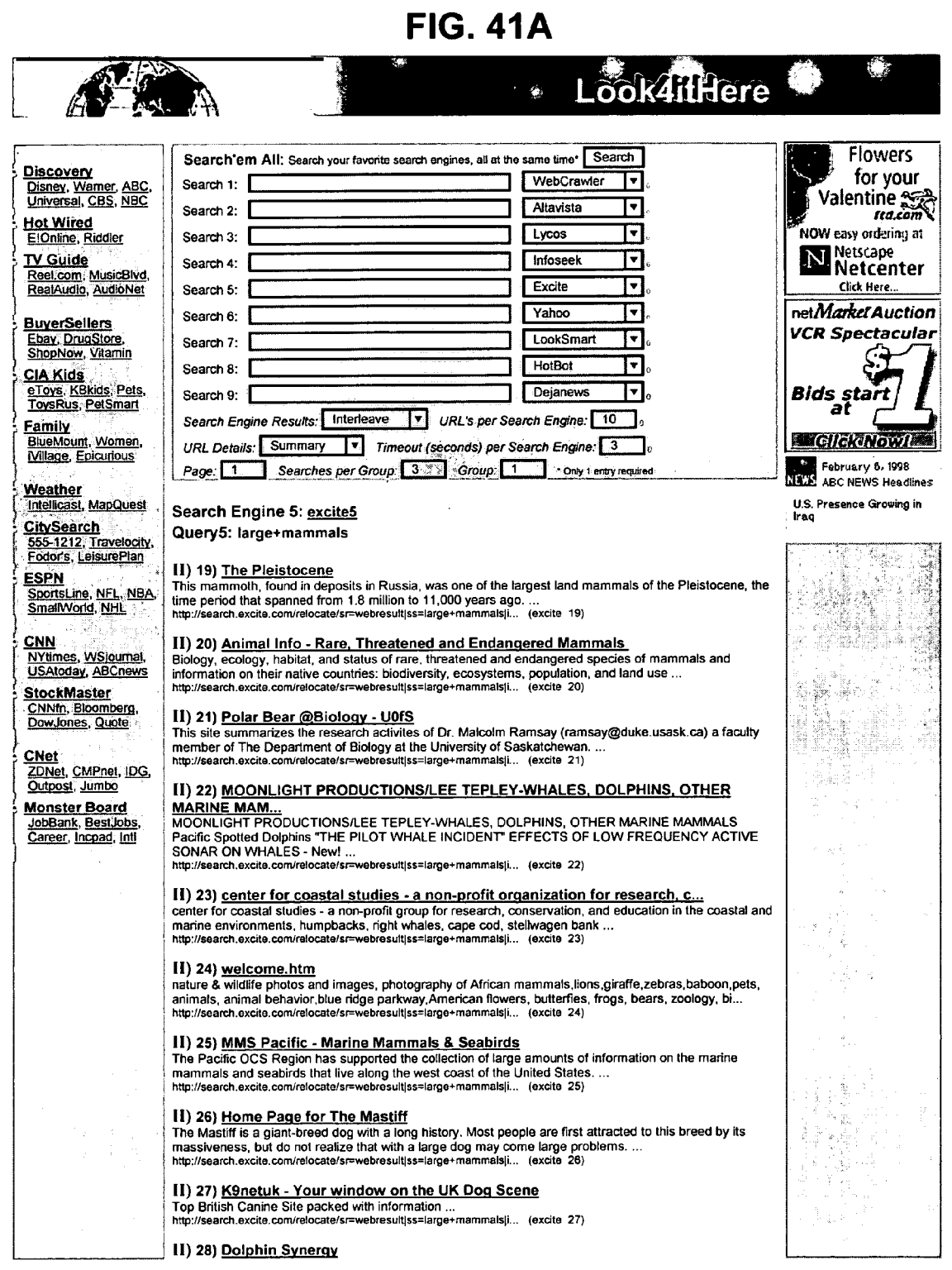

Look4itHere

Discovery
Disney, Warner, ABC, Universal, CBS, NBC
Hot Wired
E!Online, Riddler
TV Guide
Reel.com, MusicBlvd, RealAudio, AudioNet
BuyerSellers
Ebay, DrugStore, ShopNow, Vitamin
CIA Kids
eToys, KBkids, Pets, ToysRus, PetSmart
Family
BlueMount, Women, iVillage, Epicurious
Weather
Intellicast, MapQuest
CitySearch
555-1212, Travelocity, Fodor's, LeisurePlan
ESPN
SportsLine, NFL, NBA, SmallWorld, NHL
CNN
NYtimes, WSjournal, USAtoday, ABCnews
StockMaster
CNNfn, Bloomberg, DowJones, Quote
CNet
ZDNet, CMPnet, IDG, Outpost, Jumbo
Monster Board
JobBank, BestJobs, Career, Incpad, Intl

Search'em All: Search your favorite search engines, all at the same time* [Search]

Search 1: [ ] WebCrawler
Search 2: [ ] Altavista
Search 3: [ ] Lycos
Search 4: [ ] Infoseek
Search 5: [ ] Excite
Search 6: [ ] Yahoo
Search 7: [ ] LookSmart
Search 8: [ ] HotBot
Search 9: [ ] Dejanews

*Search Engine Results:* Interleave *URL's per Search Engine:* 10
*URL Details:* Summary *Timeout (seconds) per Search Engine:* 3
*Page:* 1 *Searches per Group:* 3 *Group:* 1 * Only 1 entry required

Search Engine 5: excite5
Query5: large+mammals

II) 19) The Pleistocene
This mammoth, found in deposits in Russia, was one of the largest land mammals of the Pleistocene, the time period that spanned from 1.8 million to 11,000 years ago. ...
http://search.excite.com/relocate/sr=webresult|ss=large+mammals|i... (excite 19)

II) 20) Animal Info - Rare, Threatened and Endangered Mammals
Biology, ecology, habitat, and status of rare, threatened and endangered species of mammals and information on their native countries: biodiversity, ecosystems, population, and land use ...
http://search.excite.com/relocate/sr=webresult|ss=large+mammals|i... (excite 20)

II) 21) Polar Bear @Biology - U0fS
This site summarizes the research activites of Dr. Malcolm Ramsay (ramsay@duke.usask.ca) a faculty member of The Department of Biology at the University of Saskatchewan. ...
http://search.excite.com/relocate/sr=webresult|ss=large+mammals|i... (excite 21)

II) 22) MOONLIGHT PRODUCTIONS/LEE TEPLEY-WHALES, DOLPHINS, OTHER MARINE MAM...
MOONLIGHT PRODUCTIONS/LEE TEPLEY-WHALES, DOLPHINS, OTHER MARINE MAMMALS Pacific Spotted Dolphins "THE PILOT WHALE INCIDENT" EFFECTS OF LOW FREQUENCY ACTIVE SONAR ON WHALES - New! ...
http://search.excite.com/relocate/sr=webresult|ss=large+mammals|i... (excite 22)

II) 23) center for coastal studies - a non-profit organization for research, c...
center for coastal studies - a non-profit group for research, conservation, and education in the coastal and marine environments, humpbacks, right whales, cape cod, stellwagen bank ...
http://search.excite.com/relocate/sr=webresult|ss=large+mammals|i... (excite 23)

II) 24) welcome.htm
nature & wildlife photos and images, photography of African mammals,lions,giraffe,zebras,baboon,pets, animals, animal behavior,blue ridge parkway,American flowers, butterfies, frogs, bears, zoology, bi...
http://search.excite.com/relocate/sr=webresult|ss=large+mammals|i... (excite 24)

II) 25) MMS Pacific - Marine Mammals & Seabirds
The Pacific OCS Region has supported the collection of large amounts of information on the marine mammals and seabirds that live along the west coast of the United States. ...
http://search.excite.com/relocate/sr=webresult|ss=large+mammals|i... (excite 25)

II) 26) Home Page for The Mastiff
The Mastiff is a giant-breed dog with a long history. Most people are first attracted to this breed by its massiveness, but do not realize that with a large dog may come large problems. ...
http://search.excite.com/relocate/sr=webresult|ss=large+mammals|i... (excite 26)

II) 27) K9netuk - Your window on the UK Dog Scene
Top British Canine Site packed with information ...
http://search.excite.com/relocate/sr=webresult|ss=large+mammals|i... (excite 27)

II) 28) Dolphin Synergy

Flowers for your Valentine
ftd.com
NOW easy ordering at
Netscape Netcenter
Click Here...

netMarketAuction
VCR Spectacular
Bids start at $1
Click Now!

February 6, 1998
NEWS ABC NEWS Headlines
U.S. Presence Growing in Iraq

FIG. 41B a virtual journey into Dolphin Hyperspace Virtual Galleries of the photography of Daniel McCulloch Formulated for YOU ARE HERE Are You Ready for the Gateway Plexus? ...
http://search.excite.com/relocate/sr=webresult|ss=large+mammals|i... (excite 28)

II) 29) Dave's Genuine House O Nonsense
Dave's House-O-Nonsense is the best Web Site ever. In fact, it has been known to make you popular at school and a hit with the ladies. And we all know we love that. ...
http://search.excite.com/relocate/sr=webresult|ss=large+mammals|i... (excite 29)

II) 30) Tasmanian Devil: Small but Strong
The Tasmanian devil now lives only in Tasmania's forests and scrub areas, though it was once widespread over mainland Australia. This carnivorous marsupial has an exaggerated reputation for ferocity. ...
http://search.excite.com/relocate/sr=webresult|ss=large+mammals|i... (excite 30)

II) 31) The Bear Den--All About Bears
The Bear Den--Official Web Site of the Bear Taxon Advisory Group of the American Zoo & Aquarium Society ...
http://search.excite.com/relocate/sr=webresult|ss=large+mammals|i... (excite 31)

II) 32) mammals
ZINEZONE.com - The Home for TRAILBLAZERS everywhere. News, articles, facts - find it here! mammals ... ...
http://search.excite.com/relocate/sr=webresult|ss=large+mammals|i... (excite 32)

II) 33) Welcome to Frolic.org, Home of Christopher Feyrer and his Naked Dancin...
Welcome to www.frolic.org, Home of Naked Dancing Llama (tm) and his caretaker, Christopher Feyrer The Naked Dancing Llama (tm) NEW OFFICIAL LOCATION: http://www.frolic.org/ndl.html Award-winning, advic...
http://search.excite.com/relocate/sr=webresult|ss=large+mammals|i... (excite 33)

II) 34) index
Biology of Whales Welcome to Sarah's Webpage Whales are found in all of the world's oceans and even in some of the rivers. They live in saltwater or fresh, and can be found from the Arctic Circle to An...
http://search.excite.com/relocate/sr=webresult|ss=large+mammals|i... (excite 34)

II) 35) Dr. Linzey Information
Faculty Information Page Professor of Biology Indiana Univ. of PA Direct Link to Dr. Linzey's Home Page Semester Schedule Office Hours Teaching Schedule ...
http://search.excite.com/relocate/sr=webresult|ss=large+mammals|i... (excite 35)

II) 36) Pleistocene Extinctions
by Kim Coover, ES 767, Spring '98 During the last glacial period, approximately 100,000 to 10,000 years ago, a wave of mass extinction occurred globally. ...
http://search.excite.com/relocate/sr=webresult|ss=large+mammals|i... (excite 36)

Search Engine 6: yahoo6
Query6: large+mammals

II) 19) Science > Biology > Zoology > Animals, Insects, and Pets > Mammals > Dogs > Breeds > Kangal Dog
...
http://dir.yahoo.com/Science/Biology/Zoology/Animals__Insects__an... (yahoo 19)

II) 20) Kangal Dog Page
one of several ...
http://www.sover.net/~jnnelson/KANGAL_SITE/Page1.html (yahoo 20)

II) 21) Science > Biology > Zoology > Animals, Insects, and Pets > Mammals > Cats > Wild Cats > Cougars > Eastern Cougar
...
http://dir.yahoo.com/Science/Biology/Zoology/Animals__Insects__an... (yahoo 21)

II) 22) Eastern Cougar Foundation
non-profit corporation that was established as an advocacy organization to promote the recognition and the protection of the ...
http://www.geocities.com/RainForest/Vines/1318/ecf.html (yahoo 22)

II) 23) Science > Biology > Zoology > Animals, Insects, and Pets > Mammals > Dogs > Breeds > Newfoundland
...
http://dir.yahoo.com/Science/Biology/Zoology/Animals__Insects__an... (yahoo 23)

II) 24) Newfoundland Puppy Shopping List
comprehensive list of supplies for the new or prospective Newfoundland Dog owner. Also useful for owners of other ...
http://www.pubrats.com/~nic/newfoundlanddog (yahoo 24)

II) 25) Science > Biology > Zoology > Animals, Insects, and Pets > Mammals > Dogs > Breeds > Yorkshire Terrier > Individual Dogs

FIG. 41C

...
http://dir.yahoo.com/Science/Biology/Zoology/Animals__Insects__an... (yahoo 25)

II) 26) Tas
the Yorkshire Terrorist. ...
http://members.aol.com/TasYorkie/index.htm (yahoo 26)

II) 27) Simply Servals
general information on Servals and other ...
http://www.simplyservals.com (yahoo 27)

II) 28) T&D's Cats Of The World
refuge for ...
http://www.tdscats.com/ (yahoo 28)

II) 29) Regional > U.S. States > New Hampshire > Cities > Windham > Business and Shopping > Shopping and Services
...
http://dir.yahoo.com/Regional/U_S__States/New_Hampshire/Cities/Wi... (yahoo 29)

II) 30) Willdlife Technologies
manufacturers of a technologically advanced wildlife caller, with a ...
http://www.wildlifetech.com (yahoo 30)

II) 31) Regional > U.S. States > Maine > Recreation and Sports > Outdoors > Parks and Public Lands
...
http://dir.yahoo.com/Regional/U_S__States/Maine/Recreation_and_Sp... (yahoo 31)

II) 32) Sunkhaze Meadows National Wildlife Refuge
undeveloped 9,000 acre wildlife refuge, for waterfowl, ...
http://www.mint.net/milford.motel/sunkhaze.html (yahoo 32)

II) 33) Science > Biology > Zoology > Animals, Insects, and Pets > Mammals > Dogs > Organizations > Kennel Clubs
...
http://dir.yahoo.com/Science/Biology/Zoology/Animals__Insects__an... (yahoo 33)

II) 34) United Kennel Club
second-oldest and second-...
http://www.ukcdogs.com (yahoo 34)

II) 35) Science > Biology > Zoology > Animals, Insects, and Pets > Mammals > Dogs > Breeds > Italian Pointer (Spinone Italiano) > Spinone Club of America
...
http://dir.yahoo.com/Science/Biology/Zoology/Animals__Insects__an... (yahoo 35)

II) 36) Spinone Club of America
...
http://www.Spinone.com/index.htm (yahoo 36)

Search Engine 7: looksmart7
Query7: large+mammals

II) 19) The Hall of Mammals
UCMP Hall of Mammals. Those hairy, milk-producing, warm-blooded animals that you have seen all of your life are mammals. The quagga, itself a mammal,......
http://www.ucmp.berkeley.edu/mammal/mammal.html (looksmart 19)

II) 20) MAMMALS of OREGON
MAMMALS of OREGON. This is a simple placeholder page that links to the various projects for CAB98. Complete taxonomic index of the mammal species of......
http://www.im.pdx.edu/~rueterj/CAB98/mammals.html (looksmart 20)

II) 21) Electronic Zoo / NetVet Veterinary Resources - Marine Mammals
NetVet Veterinary Resources Marine Mammal Sites......
http://netvet.wustl.edu/marine.htm (looksmart 21)

II) 22) The Mammals of Texas - Online Edition
an online guide to the 181 species of Texas mammals, based on Davis' and Schmidly's classic printed handbook.......
http://www.nsrl.ttu.edu/tmot/index.html (looksmart 22)

II) 23) Terrestrial Mammals of the Arctic
Terrestrial Mammals of the Arctic. The Arctic and Its Wildlife BRYAN SAGE Facts on File excerpts from pages 118, 121-22, 173-74. The total......
http://lynx.uio.no/jon/lynx/arctmam.html (looksmart 23)

II) 24) Mammals of Illinois

FIG. 41D

Mammals of Illinois. Phylum Chordata. Class Mammalia. Order Didelphimorphia: Opossums. Family Didelphidae: Opossums. Didelphis virginiana Kerr, 1792......
http://www.inhs.uiuc.edu/cbd/ilspecies/mammalsplist.html (looksmart 24)

II) 25) Vulnerable Mammals Lists - Endangered Species Program
an error occurred while processing this directive] ANZECC Vertebrate Lists. Vulnerable Mammals. Index. Species. Common Name. Pseudocheirus......
http://www.biodiversity.environment.gov.au/plants/threaten/lists/... (looksmart 25)

II) 26) Presumed Extinct Mammals Lists - Endangered Species Program
an error occurred while processing this directive] ANZECC Vertebrate Lists. Presumed Extinct Mammals. Index. Species. Common Name. Macrotis leucura.......
http://www.biodiversity.environment.gov.au/plants/threaten/lists/... (looksmart 26)

II) 27) Mammals Home Page
Mammals. By Robert Butinar. Peter Lalor Secondary College. Mammals are warm blooded animals that belong to the class Mammalia. They nourish their......
http://edx1.educ.monash.edu.au/~juanda/vcm/mammals.htm (looksmart 27)

II) 28) WRCF - Birds and Mammals
Birds and Mammals. American Bittern. Loggerhead Shrike. Bald Eagle. Osprey. Black Tern. Peregrine Falcon. Delmarva Fox Squirrel. Sedge Wren. Eastern......
http://www.dcnr.state.pa.us/wrcf/bandm.htm (looksmart 28)

II) 29) Mammals of Santa Barbara Backcountry
Mammals of Santa Barbara Backcountry. Return to Plants and Animals of Santa Barbara Backcountry Blacktailed Jackrabbit Black Bear Brown Bear Bobcat......
http://www.sbceo.k12.ca.us/~mcssb/sbpanda/mammals.html (looksmart 29)

II) 30) Mammals
Family. Scenery. Waterfalls. Birds. Reptiles. Amphibians. Insects. Wildflowers. Main Menu. Montgomery's Home Page......
http://members.aol.com/MIReMo/Mammals.html (looksmart 30)

II) 31) Orders of Mammals
Orders of Mammals. Mammalian Orders and Ohio Species. List created by Dr. Timothy L. Lewis, Wittenberg University. Send Me Comments!!! All mammalian......
http://blackbox1.wittenberg.edu/academics/biol/courses/mammals/or... (looksmart 31)

II) 32) The Meerkat Mpango
LOTS of info and pictures on, non other than, meerkats (we've also got lots of other mammals, as well!)......
http://www.meerkat.org/ (looksmart 32)

II) 33) A Guide to Mammals of California
A Guide to Mammals of California. by. Daniel F. Williams, Ph.D. California State University, Stanislaus. These web pages on California Mammals......
http://arnica.csustan.edu/esrpp/camammal.htm (looksmart 33)

II) 34) Alphabetic Listing of Species Entries
The Mammals of Texas - Online Edition. Alphabetic Listing of Species Entries. Common Name: Scientific Name: A. American Badger American Beaver......
http://www.nsrl.ttu.edu/tmot/alphabet.htm (looksmart 34)

II) 35) African Marine Mammals
African Marine Mammals......
http://elfi.com/csiafrica.html (looksmart 35)

II) 36) Mammals of Australia
Webster's Mammals of Australia - multimedia CD-ROM - contents......
http://www.websterpublishing.com/catalog/mammals_of_australia.sht... (looksmart 36)

Search Engine 8: hotbot8
Query8: large+mammals

II) 19) Large Mammals
Subject Large Mammals -- Page 13 of 17 -- (click on image for more information) "Black Timber- Wolves" Rosemary Millette "Broken Silence-Elk" Rosemary Millette "Broken Silence-...
http://www.wildwingsdealers.com/Subjects/Large_Mammals_12.html (hotbot 19)

II) 20) Large Mammals Stock Photo
Large Mammal Stock photography content page...
http://www.stockpix.com/stock/large/ (hotbot 20)

II) 21) Large Mammals
Large Mammals Large mammals do exist in the region, although their appearance is much less common. The two largest land mammals inhabiting the region are the white-tailed deer and the Florida panther. ...
http://www.env.duke.edu/wetland/large.htm (hotbot 21)

II) 22) Mudflows, Animal Colonizers, Large Mammals

FIG. 41E

Animal Colonizers, Large Mammals Mudflows created wide open areas where plant life is slowly returning. As a result, there is little food or protection from severe weather for large mammals such as elk...
http://volcano.und.nodak.edu/vwdocs/msh/p_a/p_aa/p_aamadm.html (hotbot 22)

II) 23) Amazon.com: buying info: Mammals in the Seas : General Papers and Large Cetaceans
Books All Products * Explore this book buying info customer reviews See more by this author all books by Food and Agriculture Organization of the U. N. Share your thoughts write a review e-mail a frien...
http://amazon.com/exec/obidos/ISBN=9251005133/naturesownbookstA (hotbot 23)

II) 24) LARGE MAMMAL PROGRAM
LARGE MAMMALS PROGRAM Program Overview The Large Mammals Program is responsible for the effective development, implementation and evaluation of management programs to maintain populations of white-tail...
http://www.gov.ns.ca/natr/WILDLIFE/lgmams/lgm.htm (hotbot 24)

II) 25) Whales are large
Whales are large Grade: Teacher School: Other Corvallis school Category: Life_Science.Oceanography Expert: The Shadow >Why do we see whales that are very large, but none that are very small? Whales ...
http://www.seps.org/oracle/oracle.archive/Expert/shadow/Life_Scie... (hotbot 25)

II) 26) Amazon.com: buying info: Large Mammals Activity Book
Search: Books All Products Browse: All Subjects Art & Architecture Audiobooks Awards Bestsellers Bargain Books Biographies Business Children's Books Christian Books Computers & Internet - Certi...
http://www.amazon.com/exec/obidos/ASIN/056501014X/hppubli00 (hotbot 26)

II) 27) ZOOM WHALES - Enchanted Learning Software
Explore whales, learn about their anatomy and behavior, study fossils and evolution, print out classroom activities, read a whale glossary, find whale links, and more....
http://www.zoomdinosaurs.com/subjects/whales (hotbot 27)

II) 28) LAND MAMMALS
Navigating the Bible Natural Sciences BISON TE'O BISON BISON Deuteronomy 14:5 The translators of the Living Torah espoused the term bison for the Hebrew te'o. Other scholars, however, suggest that the ...
http://bible.ort.org/Bible/htm/atlas/naturals/ani_biso.htm (hotbot 28)

II) 29) Dolphin Research : Gift Shop : the study of dolphins, marine mammals, cetaceans
a non-invasive photo id study of bottlenose dolphins, project pod seeks to educate the public about the species tursiops truncatus through pictures, videos, sound clips and links to other dolphin relat...
http://www.swflorida.com/dolphin/giftshop.htm (hotbot 29)

II) 30) PA MAMMALS
Mammals of Pennsylvania—Eastern Chipmunk For a larger image, click on the picture Back to Main Menu| Back to Section of Mammals Main Page Common Name: Eastern chipmunk Scientific Name: Tamias s...
http://warhol.org/cmnh/mammals/collections/PAmamm/PAmamD/chipmunk... (hotbot 30)

II) 31) Northern Natural History Large Game Taxidermy Gallery
| Entrance | Birds | Mammals | Large Game | Home | | Entrance | Birds | Mammals | Large Game | Home |...
http://www.btinternet.com/~taxidermy/galleryh.html (hotbot 31)

II) 32) What is a Mammoth?
Mammoths were large mammals with trunks that closely resembled elephants. They became extinct about 10,000 years ago....
http://www.archaeologyonline.org/mammoth/cir_elem_ccm/cir_ccm_wha... (hotbot 32)

II) 33) ANIMAL GROUPS
ANIMAL GROUPS MAMMALS ...
http://www.expage.com/page/mrsg5 (hotbot 33)

II) 34) Fossil Mammals
Fossil Mammals for Sale...
http://www.xfossil.com/page0008.htm (hotbot 34)

II) 35) NMNH Virtual Tour - Fossil Mammals
Miocene Mammals 23-25 million years old A fossil menagerie from Nebraska includes early horses, camels, rhinos, and Chalichotheres, a now-extinct clawed animal. As grasslands spread, many animals adapt...
http://www.naturalpartners.org/VirtualTour/Tour/First/FossilMamma... (hotbot 35)

II) 36) Mammals - Persian Lion
Persian Lion At one time the Persian lion roamed across much of the Middle East and southern Asia. Then, as human populations expanded, the lion population lost its territory and, as a result, dwindled...
http://www.pakcenter.com/reading/education/zoo/mammals/PersianLio... (hotbot 36)

Look4itHere
Div. of Internet Corporation
News | Weather | Cool Sites | Shopping | Contests | Horoscopes | Classified

FIG. 42B

I) 11) Cat Users' Manual
The World Famous CAT User Manual ...
http://www.andreas.com/catman.html (webcrawler 11)

I) 12) Mr. Cat Story List
The story of Mr. Cat's life and adventures ...
http://www.inil.com/users/mikeycad/catlist.html (webcrawler 12)

I) 13) Bahamas / Cat Island
The "High Land" of The Bahamas Cat Island may have derived its name from Arthur Catt, the famous British sea captain or notorious pirate (depending on whose side you were on). ...
http://www.interknowledge.com/bahamas/bsciin01.htm (webcrawler 13)

I) 14) Hakan's Miscellaneous Quiz Pages
This is a humor page. ...
http://members.tripod.com/~hakancan/miscell1.html (webcrawler 14)

I) 15) Cat-Related links
Below are a (large) number of links to cat-related documents, some on my site, others on different sites. Bad Kitty/Bad Human list Updated October 18, 1999. ...
http://geog.utoronto.ca/reynolds/pethumor/catlinks.html (webcrawler 15)

I) 16) Miss Kitty's Cat Humor Pages
A look at the lighter side of being owned by a cat! ...
http://bennyhills.fortunecity.com/billmurray/532/cats/cathumor.ht... (webcrawler 16)

I) 17) Cat Supplies from the PET SHOP - Beds, Collars, Toys & other...
Cat Supplies - Discount Pet Shop for Dog, Cat & Small Animals. Little River Pet Shop makes shopping for cat supplies easy, 24 hours a day, secure shopping for cat suppplies. ...
http://www.pet-shop.net/html/cat.html (webcrawler 17)

I) 18) The Amazing Cat Picture Page!
Pictures of Cats! A collection of cat pictures submitted by internet users. Over 250 Cats! ...
http://www.islandnet.com/~jensal/cats.html (webcrawler 18)

I) 19) Cat Gift Ideas - Gifts for Cat Lovers!
Contents... If you're looking for the "purr"fect gift for a feline "fur"iend, here are some ideas! CAT JEWELRY... Essi's Claws & Paws: This site features adorable cat related jewelry, watches, t-sh...
http://www.execulink.com/~jhdavis/sarah/giftscatlovers.html (webcrawler 19)

I) 20) CatOwner.Com - Information About Cats and Kittens
CatOwner.Com offers a large variety of resources about cats including information on different cat breeds, cat newsgroups, cat health, pet supplies, cat poetry & cat humor. If you are a cat lover, visi...
http://www.catowner.com/ (webcrawler 20)

I) 21) Western Abyssinian Cat Club
The Western Abyssinian Cat Club (est. 1968) is a Cat Fanciers Association (CFA) member club located in Northern California. Our purposes are: To promote and develop interest in and knowledge of the Aby...
http://www.abyssinians.org/wacc/ (webcrawler 21)

I) 22) Cindy's Cat Pages Extension:Cat Links
Cindy's Cat Pages Extension has recently been moved to http://www.cindydrew.com/cats/. If you have a link on your pages to this afn site, please change it. ...
http://www.afn.org/~afn32054/animal1.htm (webcrawler 22)

I) 23) Cat Care Clinic Veterinary Services for cats and felines in ...
cat care clinic is a full service feline hospital and outpatient facility for cats only felines located in the city of Orange, California. ...
http://www.catcare.com/ (webcrawler 23)

I) 24) A listing of Cat Who books
A listing of Cat Who books Inside the barn of Qwill ...
http://www.expage.com/page/cwlist (webcrawler 24)

I) 25) Cindy's Cat Pages: Home
This site has recently been moved to http://www.cindydrew.com/cats/. If you have a link on your pages to this afn site, please change it. Cindy's Cat Pages have been on afn since 1996, ages in terms of...
http://www.afn.org/~afn47757/ (webcrawler 25)

Query: mouse

I) 1) MRC HGU Mouse Atlas and Gene Expression Home page
The Mouse Atlas and Gene Expression Database Project. The UK MRC Human Genetics Unit in Edinburgh is developing a digital atlas of mouse development... ...
http://genex.hgu.mrc.ac.uk/ (altavista 1)

I) 2) Mouse Productions
Internet Site Development, Web Site Management... ...
http://www.mousenet.com/ (altavista 2)

I) 3) Mouse Genome Informatics (MGI) Home Page

FIG. 42C

The Mouse Genome Informatics (MGI) site is home to the Mouse Genome Database (MGD), Gene Expression Database (GXD) and other information resources on... ...
http://www.informatics.jax.org/ (altavista 3)

I) 4) If you could overclock a mouse....this would be the place to go to find out ho
Anything you want with Mouse-Wheels... ...
http://buzzkill.stomped.com/ (altavista 4)

I) 5) Christmas Mouse - Christmas ornaments, Christmas decorations, gifts and collec
The ChristmasMouse is a Christmas store featuring ornaments, gifts, and collectibles.... ...
http://www.christmasmouse.com/ (altavista 5)

I) 6) Quill & Mouse Studios, Inc. - Graphic Design - Typography - Websites
Quill & Mouse Studios, Inc. produces printed and electronic promotional materials, specializing in custom newsletters and website design.... ...
http://www.quillandmouse.com/ (altavista 6)

I) 7) Personalized Mouse Pads Plus - Welcome to Dante's Web Site
We will imprint your Favorite Images onto MOUSE PADS for your Visual Enjoyment. FREE Personalized Mouse Pad every fourth order.Free key tag every two ...
http://www.mousepi.com/ (altavista 7)

I) 8) Dancing Mouse Studios -- Backgrounds, Buttons, and Other Web Graphics
Free web graphics -- backgrounds, buttons, and lines... ...
http://www.dancingmouse.com/ (altavista 8)

I) 9) Microsoft Mouse - Home
All Products | Support | Search | microsoft.com Home --> Home | Select A Mouse | Download Drivers | Technical Support | The first real advance in... ...
http://www.microsoft.com/products/hardware/mouse/default.htm (altavista 9)

I) 10) A Better Mouse Surface
Overclocking and Performance hardware site. Provides motherboard support, hardware reviews including Motherboards, 3d cards, CPU's and SDRAM.... ...
http://bxboards.com/mouse.shtml (altavista 10)

I) 11) NOHANDS MOUSE
Easy-to-use, intuitive foot-operated mouse developed to eliminate carpal tunnel syndrome. ... ...
http://www.footmouse.com/ (altavista 11)

I) 12) mouse.com a Communicate.com property
COSMETICS cologne.com makeup.com perfume.com HEALTH body.com exercise.com vegetarian.com veggie.com veg.com SPORTS boxing.com cricket.com dance.com... ...
http://www.mouse.com/ (altavista 12)

I) 13) Mouse Systems Optical and Ball Mice Joysticks Trackballs Gamepads Keyboards Sc
Mouse Systems is a leading maker of computer mice (including scrolling mice and optical mice) and other computer peripheral devices.... ...
http://www.mousesystems.com/ (altavista 13)

I) 14) Roaring Mouse Entertainment
Roaring Mouse Entertainment's Interactive Network is a place where kids can find out about the exciting products of Roaring Mouse Entertainment, play ...
http://www.roaringmouse.com/ (altavista 14)

I) 15) The 3 Button Serial Mouse mini-HOWTO
The 3 Button Serial Mouse mini-HOWTO. Geoff Short, geoff@kipper.york.ac.uk. v1.33 31st May 1998. How to get a 3 button serial mouse working properly... ...
http://kipper.york.ac.uk/mouse.html (altavista 15)

I) 16) //www.rmca.org/
Rat Photos by Grove Pashley. Mouse Photo by Angela King. ... ...
http://www.rmca.org/ (altavista 16)

I) 17) Let Your Mouse Do The Walking
INTER@CTIVE WEEK. May 28, 1996. Let Your Mouse Do The Walking By Joe McGarvey Posted 1:30 PM EST. Providing another reason to send those bulky phone... ...
http://www.zdnet.com/intweek/daily/960528a.html (altavista 17)

I) 18) - Mouse Marketing Inc. -
Oct. 19, 1999. A cool gray paints New York City. Trucks, taxis and trains heave and sigh in the background. Staccato yelps of little kids in the... ...
http://www.mousemarketing.com/ (altavista 18)

I) 19) Little Mouse Graphics
Welcome to Little Mouse Graphics. Professional Illustration, Design and Web Site Services We are currently under construction. Web customers may view... ...
http://www.littlemousegraphics.com/ (altavista 19)

I) 20) Microsoft Mouse - Download Drivers

FIG. 42D

All Products | Support | Search | microsoft.com Home --> Home | Select A Mouse | Download Drivers | Technical Support | Download the IntelliPoint... ...
http://www.microsoft.com/products/hardware/mouse/driver/default.h... (altavista 20)

I) 21) Computer Mouse Cleaning kit
Computer Mouse Cleaning kit. Computer mice always get dirty! And that creates a problem. . . The mouse arrow or pointer stops tracking hand... ...
http://www.tidymouse.com/ (altavista 21)

I) 22) Violet Mouse Web Site Designers, web site designers, web site design, designer
Web Page Design and development is Violet Mouse's specialty. We create logos, banners, buttons and web graphics to fit your business needs.... ...
http://www.violetmouse.com/ (altavista 22)

I) 23) Human-Mouse Dysmorphology Database
The Dysmorphic Human-Mouse Homology Database (DHMHD) An application from the Institute of Child Health, funded by the Medical Research Council. If... ...
http://www.hgmp.mrc.ac.uk/DHMHD/dysmorph.html (altavista 23)

I) 24) mouse software for carpal tunnel, tendonitis, or any repetitive strain injury
MouseTool is a piece of ergonomic software that clicks the mouse for you, eliminating one of the main causes of repetitive stress injury. You can use... ...
http://www.mousetool.com/ (altavista 24)

I) 25) MOUSE
an Integrated Modelling Package for Urban Drainage and Sewer Systems. What is MOUSE. General MOUSE Description. HD module. RTC Module. RDII Module... ...
http://www.dhi.dk/mouse/index.htm (altavista 25)

Query: dog

I) 1) Skijoring and Dog Sledding Equipment
Sporting goods for working dogs! Skijoring,dog sledding, other equipment to get exercise with your dog! High quality custom dog products, with personal service....
http://www.chinookwind.com/skisled.htm (lycos 1)

I) 2) Dog Humor and Stories
A collection of dog jokes, humorous dog stories, and more....
http://members.xoom.com/DunveganK/doghumor.html (lycos 2)

I) 3) Dog Humor
More dog humor....
http://www.nanceestar.com/DogHumor.html (lycos 3)

I) 4) The Australian Cattle Dog
Australian Cattle Dog Breed Standard, Australian Cattle Dog History. Australian Cattle Dog free breeders directory and Links, Australian Cattle Dog medical, Australian Cattl...
http://members.xoom.com/PeterDaly/main.htm (lycos 4)

I) 5) Dog Sled Racing - Ontario
Live The Dream! Would you like to experience the excitement of entering a real dog sled race? If you can set aside 7 days from your busy schedule Raven's Watch Dog Sled Tours can help....
http://www.dog-sledding-canada.ravenswatch.on.ca (lycos 5)

I) 6) Tail Waggers Dog Humor
Dozens of dog tales neatly packaged....
http://www.ddc.com/waggers/dog_humor.html (lycos 6)

I) 7) Yeah! Dog Racing
a global dog racing community featuring free email, chats, message boards, links, shopping and more......
http://www.yeahsports.com/dir/dog_racing/ (lycos 7)

I) 8) German Shepards dog breeder humor
77 windows full of dog humor, jokes, one liners and even a song....
http://globalcorp.com/gsd/dog-humor.htm (lycos 8)

I) 9) Sagacious Dog Country
Dog park under construction west of Houston, Texas....
http://www.sagaciousdogcountry.com (lycos 9)

I) 10) Marmora Snofest and Sled Dog Races
A site dedicated to the Marmora Sled Dog Races...
http://www.twp.marmora.on.ca/snofest (lycos 10)

I) 11) Sled Dog Central Home Page
Although essentially an advertising medium, Sled Dog Central is gradually changing its look and providing more and more information in the form of interviews with mushers or links that will take...
http://www.sleddogcentral.com/ (lycos 11)

I) 12) Shooter's Dog Humor Page

FIG. 42E

Shooter's Dog Humor Page. A collection of dog jokes and quotes....
http://www.geocities.com/heartland/3350/humor.htm (lycos 12)

I) 13) Dog, Disc, and Wind - Dog Frisbee disc Multimedia CD
Dog Frisbee Training Tips and QuickTime Demonstrations. Web Pages preview the world's first Dog Frisbee CD, called Dog, Disc and Wind. Overview describes the authors, Glen Speckert...
http://www.dogdisc.com/DDW/Overview.html (lycos 13)

I) 14) A Dog Called
One page of humor....
http://www.Bird-Dog-News.com/SO96/Page18.html (lycos 14)

I) 15) Fairbanks Junior Dog Mushers' Association, Inc.
We are an organization in Fairbanks, and promote the sport of dogmushing to young people. We hold weekly races....
http://www.mosquitonet.com/%7egeehaw (lycos 15)

I) 16) Dr. P's Dog Training
Check out the Weiner Dog Art when you get to this links page....
http://www.uwsp.edu/ACAD/PSYCH/DOG/misc.htm%23humor (lycos 16)

I) 17) Digital Dog
This site is among the best dog information resources on the Internet. It includes information about dog breeds, adopting a dog, understanding dog behavior, and great storie...
http://www.digitaldog.com/ (lycos 17)

I) 18) Location of Dog Parks
U.S. map with links to dog park listings....
http://www.freeplay.org/allparks/ (lycos 18)

I) 19) Build Your Own Dog Sled
Detailed plans used by a middle school class to build their own sled....
http://www.rt66.com/%7esrlee/JUNIOR/GARAGE/k12sled.html (lycos 19)

I) 20) Alaskan Sled Dog & Racing Association
ASDRA home page, aimed at both participants and fans, with racing schedules, point standings, race results, pictures, and more....
http://www.corecom.net/%7ewhiteepp/asdra.htm (lycos 20)

I) 21) West Chelsea Dog Owners Association
Information for dog owners in West Chelsea area of New York City, focusing on a soon-to-open dog park. Useful links....
http://www.bitsworld.com/dogrun (lycos 21)

I) 22) Dog Detective
Lost a dog? Found a dog? We can help....
http://www.dogdetective.com (lycos 22)

I) 23) Dog Breeders Directory
Puppy Dog Web features over 150 different purebred dog breeds with ads from private dog breeders worldwide....
http://www.puppydogweb.com/index.html (lycos 23)

I) 24) A Guide to Dog Kisses
Check this out, yuck!...
http://www.netpet.com/humor/dog.kiss.html (lycos 24)

I) 25) Canaan Dog Standard
FCI, from ARBA....
http://www.arba.org/Canaan_Dog.htm (lycos 25)

Query: monkey

I) 1) Monkey Madness
The purpose here is not to promote primate ownership; it is to provide a forum for people with an interest in Non-human primates (monkeys and apes) to share information, advice and support in a non-jud...
http://www.monkeymaddness.com/ (infoseek 1)

I) 2) Sea-Monkey Worship Page
Everything you ever wanted to know about sea-monkeys!...
http://users.uniserve.com/~sbarclay/seamonk.htm (infoseek 2)

I) 3) Surf Monkey - Browser Download
Company Info Product Information Surf Monkey Bar Tell me more.... Download It Now! System Requirements Surf Monkey Browser: Tell me more.... ......
http://www.surfmonkey.com/free_trial/download.asp (infoseek 3)

I) 4) Monkey Search Monkey Search
Web World Network - Webmaster Union - Monkey Search - Top 25 Websites Home What's New Link to us Contact Us Add a Site Faq Search the Web: Advanced Search Arts and Humanities (8) ......
http://monkey-search.hypermart.net/ (infoseek 4)

FIG. 42F

I) 5) Monkey Play Games
...
http://www.monkeyplay.com/ (infoseek 5)

I) 6) Monkey Business Homepage
Welcome to the H O M E P A G E This is the home page of Space Monkey. The brave monkey that was sent into orbit before any human being dared to go. That was a long time ago, today Space Monkey has move...
http://www.jotto.com/menu.html (infoseek 6)

I) 7) Infinite Monkey Systems, Inc. Makers of Baseball Mogul
Problems or questions about the website? email our web manager Baseball Mogul 2000 is done! On Sale Now! Try the Demo! See the order form Download Patch for Contract Negotiation Features Baseball Mogul...
http://www.imonkey.com/ (infoseek 7)

I) 8) HotWired: Webmonkey HotWired: Webmonkey
A How-to Guide for Web Developers....
http://www.hotwired.com/webmonkey/ (infoseek 8)

I) 9) www.silly-monkey.com
Fashions and Fun for 18-inch dolls...
http://www.silly-monkey.com/ (infoseek 9)

I) 10) ABC.com
...
http://abc.go.com (infoseek 10)

I) 11) Purple Monkey Studios Interactive Media and Web Development
Purple Monkey Studios is an interactive media and web development company located in the Chicago area. It's a jungle out there. We help our customers cut their way through the undergrowth of ......
http://www.purplemonkey.com/ (infoseek 11)

I) 12) Jackson Zoo Endangered Species
ZooNet...
http://www.nol.net/~wqent/zoonet/jackson/endanger.htm (infoseek 12)

I) 13) trained monkey
you'll just have to look and see!...
http://trainedmonkey.com/ (infoseek 13)

I) 14) trained monkey
you'll just have to look and see!...
http://www.trainedmonkey.com/ (infoseek 14)

I) 15) Spider Monkey's in the House
ENTER...
http://www.spidermonkey.com/ (infoseek 15)

I) 16) monkey.org
Monkey is a project of dirt and dugsong. Stuff you might care to look at, or not. connect to monkey using SSH ann arbor take-away and delivery! monkey haus geeks list openbsd stuff our weirdo mention i...
http://www.monkey.org/ (infoseek 16)

I) 17) Million Monkeys - Quailty Software WWW page design contract programming engineering ...
NONE...
http://www.million-monkeys.com/ (infoseek 17)

I) 18) Monkey Byte Online: MAC and PC games!
NEW Soap Box Games Downloads Contact Newsletter Arcade Action 3D Puzzle Educational Online By Phone By Mail By Fax Banners Giveaways Beta Test Privacy Developers Publishing Opportunities JOIN THE CLUB!...
http://www.mbyte.com/ (infoseek 18)

I) 19) 23725 SW Lois Hillsboro, OR 97123 (503)-259-3057 Email: WWW: http://www.ece.orst. ...
23725 SW Lois Hillsboro, OR 97123 (503)-259-3057 Email: livengja@ece.orst.edu WWW: http://www.ece.orst.edu/~livengja Education Oregon State University. Corvallis, Oregon. ......
http://www.ece.orst.edu/~livengja/resume.html (infoseek 19)

I) 20) Monkey Ska Home
Monkey is the premier traditional ska band from the San Francisco Bay area. Monkey show times, recordings,and bio...
http://www.dnai.com/~soongliu/monkey_ska/home.html (infoseek 20)

I) 21) COM4
succinct...
http://www.com4.co.uk/ (infoseek 21)

FIG. 42G

I) 22) 4 Monkeys Web Design--- Specializing in whimsical and unique web page design and ...
4 Monkeys Web Design. Specializing in whimsical and unique web page design and development, we can tailor your website to reflect any style within any budget....
http://www.4-monkeys.com/ (infoseek 22)

I) 23) Trail Monkey
Free hiking and mountain biking trail information and maps....
http://www.trailmonkey.com/ (infoseek 23)

I) 24) LucasArts Entertainment Company
Sights, sounds, previews, demos and more. Designed for fast or slow connections....
http://www.lucasarts.com/ (infoseek 24)

I) 25) Scopes Trial Homepage, UMKC Law School
A presentation on the trial, the textbook in question, trial photos, and the Hollywood film, 'Inherit the Wind'....
http://www.law.umkc.edu/faculty/projects/ftrials/scopes/scopes.ht... (infoseek 25)

Query: giraffe

I) 1) The Giraffe Project
This is the territory of the Giraffe Project. We're free flacks for heroes -- finding, commending and publicizing people who stick their necks out for the common good. ...
http://search.excite.com/relocate/sr=webresult|ss=giraffe|id=2897... (excite 1)

I) 2) Giraffe Manor
This site is best viewed in Microsoft Explorer. NAIROBI, KENYA Welcome to the Giraffe Manor Web site. The Giraffe Manor, built in 1932 by Sir David Duncan, is situated on 140 acres of land just a few m...
http://search.excite.com/relocate/sr=webresult|ss=giraffe|id=1198... (excite 2)

I) 3) Giraffe
"World Famous" Animal World Greenbrier Mall, Chesapeake, Va. 23320 1-757-361-9330 (internet) www.anwo.com (email) Anwrld@aol.com Giraffe lovers mark this as a favorite page! ...
http://search.excite.com/relocate/sr=webresult|ss=giraffe|id=3255... (excite 3)

I) 4) the digital giraffe
Corinne Whitaker wants to know more about the art? about the artist? email: giraffe@giraffe.com ...
http://search.excite.com/relocate/sr=webresult|ss=giraffe|id=5625... (excite 4)

I) 5) seasick giraffe gift catalog - logonecklace
Authentic giraffe collectors gift catalog for giraffe lovers by the Seasick Giraffe, presenting giraffe jewelry, giraffe clothing, giraffe gifts and the World Wide Giraffe Club. The only giraffe lovers...
http://search.excite.com/relocate/sr=webresult|ss=giraffe|id=3851... (excite 5)

I) 6) Giraffe Software
FREE! Mulitmedia and communications software including FFT spectral analyser, winmessage, benchmarking and more.... ...
http://search.excite.com/relocate/sr=webresult|ss=giraffe|id=1831... (excite 6)

I) 7) The Living Edens "Giraffe"
The GiraffeSome animals, like an albatross, are distinguishable by a single unique body part -- in this case, wings. What stands out more than anything about a giraffe is a quality, more than any parti...
http://search.excite.com/relocate/sr=webresult|ss=giraffe|id=2557... (excite 7)

I) 8) Home Decor
...
http://search.excite.com/relocate/sr=webresult|ss=giraffe|id=1124... (excite 8)

I) 9) Why The Giraffe Can't Speak.
Once upon a time, animal language was spoken everywhere in the forest. Giraffe, because of his long neck, was King of the Animals. Taller than all the others, he would walk about with his head in the s...
http://search.excite.com/relocate/sr=webresult|ss=giraffe|id=9917... (excite 9)

I) 10) Untitled
"You again," said Giraffe. "Sorry," said Bob. "Where are we now?" "Is that another trick question, Sir?" "No, Bob" "Oh," he said looking around,"I don't know, Sir. ...
http://search.excite.com/relocate/sr=webresult|ss=giraffe|id=7785... (excite 10)

I) 11) Giraffe Cam Intro Page
GiraffeCAM, Inc.(r) Check Out the Amazing New Sport Mini Video Camera. Click Here to see the Sport. Quality &, Innovation in Video™, Now Available!!! ...
http://search.excite.com/relocate/sr=webresult|ss=giraffe|id=2442... (excite 11)

I) 12) seasick giraffe animal gift catalog order form
Authentic giraffe collectors gift catalog for giraffe lovers by the Seasick Giraffe, presenting giraffe jewelry, giraffe clothing, giraffe gifts and the World Wide Giraffe Club. The only giraffe lovers...
http://search.excite.com/relocate/sr=webresult|ss=giraffe|id=1078... (excite 12)

I) 13) Giraffe Facts.

FIG. 42H

Great Giraffe Facts Giraffes are the tallest animals on earth. Their footprints are 12 inches and 9 inches wide. You would have to run in order to keep up with a giraffe walking because every step a gi...
http://search.excite.com/relocate/sr=webresult|ss=giraffe|id=6772... (excite 13)

I) 14) Emil's very own giraffe page
Emil's Giraffe Page ...
http://search.excite.com/relocate/sr=webresult|ss=giraffe|id=3914... (excite 14)

I) 15) The Wicked Giraffe
The Wicked Giraffe written by: Every day in Mr. Giraffe's life was the same. In the morning, the sun either played on the spider web in the corner, or the rain fell like lace across the giraffe-house w...
http://search.excite.com/relocate/sr=webresult|ss=giraffe|id=2150... (excite 15)

I) 16) Giraffe fund drive goes national
Giraffe fund drive goes national By JOHN STARBUCK / Abilene Reporter-News Sticking your neck out has taken on new meaning for Leadership Abilene's giraffe fund. ...
http://search.excite.com/relocate/sr=webresult|ss=giraffe|id=4321... (excite 16)

I) 17) Home Page for Audrey Ryan
Hellllooooo...thank you for visiting my web site creation. Now let me tell you a little bit about myself. I am majoring in Dietetics at Indiana University of Pennsylvania. ...
http://search.excite.com/relocate/sr=webresult|ss=giraffe|id=2548... (excite 17)

I) 18) Shel Silverstein (Collected information by Sely Friday)
1964 Evil Eye Music, Inc. Published by HarperCollins Publishers ISBN 0-590-47164-3 A Giraffe and a Half A Giraffe and a Half, (1964), is a poem telling a hypothetical story about a Giraffe, and the man...
http://search.excite.com/relocate/sr=webresult|ss=giraffe|id=6716... (excite 18)

I) 19) Untitled
My name is John Scalzi, and I am a columnist for the Fresno Bee in Fresno, California. In the days since the unearthing of your comments about men, women, combat, and the biological drive for men to hu...
http://search.excite.com/relocate/sr=webresult|ss=giraffe|id=1746... (excite 19)

I) 20) Giraffe Miniature Zoo
Order on-line with your credit card by using our Secure Server and the 'Add To Order' link below. Giraffes are the tallest standing land animals on earth. ...
http://search.excite.com/relocate/sr=webresult|ss=giraffe|id=2269... (excite 20)

I) 21) &ob,LN&cb, Giraffe Jokes
What do you get when two giraffes collide? A giraffic jam. In the summer of 1993, Rob and Jason, worked in a Tarzan show at Silver Springs (an attraction in Florida). ...
http://search.excite.com/relocate/sr=webresult|ss=giraffe|id=3471... (excite 21)

I) 22) Giraffe
The giraffe is the world's tallest animal. Giraffes measure up to 18 feet high and can weigh over a ton. At birth they measure over 5 feet and continue to grow for about ten years. ...
http://search.excite.com/relocate/sr=webresult|ss=giraffe|id=1912... (excite 22)

I) 23) seasick giraffe gift catalog -about the seasick giraffe
Authentic giraffe collectors gift catalog for giraffe lovers by the Seasick Giraffe, presenting giraffe jewelry, giraffe clothing, giraffe gifts, and the World Wide Giraffe Club. The only giraffe lover...
http://search.excite.com/relocate/sr=webresult|ss=giraffe|id=3265... (excite 23)

I) 24) seasick giraffe gift catalog - gift certificate
Authentic giraffe collectors gift catalog for giraffe lovers by the Seasick Giraffe, presenting giraffe jewelry, giraffe clothing, giraffe gifts and the World Wide Giraffe Club. The only giraffe lovers...
http://search.excite.com/relocate/sr=webresult|ss=giraffe|id=7400... (excite 24)

I) 25) Untitled
The following is an e-mail I sent to Newt Gingrich, in the wake of the discovery of his comments on the biological urge of men to "hunt giraffes" and to wallow in ditches "like little piglets": From: S...
http://search.excite.com/relocate/sr=webresult|ss=giraffe|id=1490... (excite 25)

Query: lion

I) 1) Business and Economy > Companies > Food and Drink > Beverages > Alcohol and Spirits > Beer > Breweries and Brands
...
http://dir.yahoo.com/Business_and_Economy/Companies/Food_and_Drin... (yahoo 1)

I) 2) Lion Nathan
brewing beers in New Zealand, Australia and China....
http://www.lion-nathan.com/ (yahoo 2)

I) 3) Business and Economy > Companies > Travel > Tour Operators > Religious and Self-Discovery > Christian
...
http://dir.yahoo.com/Business_and_Economy/Companies/Travel/Tour_O... (yahoo 3)

I) 4) Lion and the Lamb Journeys
religious, recreational, and educational tours of the Holy Land, Europe, and other destinations....

FIG. 42I http://www.lion-lamb.com/ (yahoo 4)

I) 5) Business and Economy > Companies > Home and Garden > Furnishings > Lighting > Lamps
...
http://dir.yahoo.com/Business_and_Economy/Companies/Home_and_Gard... (yahoo 5)

I) 6) Lion Industries
manufacture Smartlite, a lifetime night light that replaces existing wall plate....
http://www.webcom.com/lion/ (yahoo 6)

I) 7) Business and Economy > Companies > Office Supplies and Services > Furniture > Manufacturers
...
http://dir.yahoo.com/Business_and_Economy/Companies/Office_Suppli... (yahoo 7)

I) 8) Lion Group
offering desks, cabinets, lock boxes, and more....
http://lion-seatings.asiaep.com/ (yahoo 8)

I) 9) Business and Economy > Companies > Publishing > Religion and Spirituality > Christianity
...
http://dir.yahoo.com/Business_and_Economy/Companies/Publishing/Re... (yahoo 9)

I) 10) Lion Publishing
produce CD-ROMs, software and books about the Bible, church, Christianity, religion, beliefs, philosophy for home use and schools, education, colleges and church. ...
http://www.lion-publishing.co.uk (yahoo 10)

I) 11) Regional > U.S. States > Pennsylvania > Cities > Red Lion > Business and Shopping > Business to Business
...
http://dir.yahoo.com/Regional/U_S__States/Pennsylvania/Cities/Red... (yahoo 11)

I) 12) Lion Technologies
Internet and computer consulting....
http://www.lion-tech.com/ (yahoo 12)

I) 13) Regional > Countries > Australia > Business and Economy > Companies > Food and Drink > Beverages > Alcohol and Spirits > Beer > Breweries and Brands
...
http://dir.yahoo.com/Regional/Countries/Australia/Business_and_Ec... (yahoo 13)

I) 14) Regional > U.S. States > Indiana > Cities > West Lafayette > Business and Shopping > Shopping and Services > Travel
...
http://dir.yahoo.com/Regional/U_S__States/Indiana/Cities/West_Laf... (yahoo 14)

I) 15) Science > Biology > Zoology > Animals, Insects, and Pets > Marine Life > Marine Mammals > Pinnipeds > Eared Seals > California Sea Lion
...
http://dir.yahoo.com/Science/Biology/Zoology/Animals__Insects__an... (yahoo 15)

I) 16) California Sea Lion Data Sheet
from the Lincoln Park Zoo....
http://www.lpzoo.com/animals/mammals/facts/sea_lion.html (yahoo 16)

I) 17) Regional > U.S. States > Utah > Cities > Salt Lake City > Entertainment and Arts > Restaurants
...
http://dir.yahoo.com/Regional/U_S__States/Utah/Cities/Salt_Lake_C... (yahoo 17)

I) 18) Lion House, The
restaurant, catering services, and event hosting in the historic home of Brigham Young....
http://www.lion-house.com (yahoo 18)

I) 19) Regional > Countries > Malaysia > Business and Economy > Companies > Miscellaneous
...
http://dir.yahoo.com/Regional/Countries/Malaysia/Business_and_Eco... (yahoo 19)

I) 20) Lion Group
conglomerate with interests in steel, food, education, banking, property development, and vehicles....
http://www.lion.com.my (yahoo 20)

I) 21) Regional > Countries > Singapore > Business and Economy > Companies > Entertainment > Production > Audio and Sound
...
http://dir.yahoo.com/Regional/Countries/Singapore/Business_and_Ec... (yahoo 21)

FIG. 42J

I) 22) Lion Studio
offers recording and mastering services....
http://www.angelfire.com/sd/Lion (yahoo 22)

I) 23) Regional > Countries > United Kingdom > England > Counties and Regions > Oxfordshire > Cities and Towns > Oxford > Business and Shopping > Business to Business > Publishing
...
http://dir.yahoo.com/Regional/Countries/United_Kingdom/England/Co... (yahoo 23)

I) 24) Regional > Countries > United Kingdom > Wales > Counties and Regions > Powys > Cities and Towns > Newtown > Travel and Transportation
...
http://dir.yahoo.com/Regional/Countries/United_Kingdom/Wales/Coun... (yahoo 24)

I) 25) Lion Hotel, The
only a stone's throw away from the river with views of the foothills of the Cambrian mountains....
http://www.lion-hotel.co.uk/ (yahoo 25)

Query: tiger

I) 1) Woods, Tiger - The Tiger's Lair
Tiger's Lair provides fans with statistics, photographs, animations, and chat rooms. Find a short video of Tiger's swing....
http://www.golferlink.com/tiger_lair.htm (looksmart 1)

I) 2) Tiger Mask - Puroresu Hall of Fame
Read a transcript of an interview with Satoru Sayama, who wrestled under the moniker "Tiger Mask," and read a history of his professional career....
http://www.albany.net/~hit/puroresu/newjapan/tiger/ (looksmart 2)

I) 3) Woods, Tiger - ABC
Take an inside look at one of the greatest golf sensations to hit the links. Check out a bio, Tiger's equipment, and his victories....
http://194.22.151.181/tiger/ (looksmart 3)

I) 4) Woods, Tiger - All Star Tribute to Tiger Woods
Includes a picture gallery, a biography, statistics and links to books about Tiger. Find deals on official PGA tour merchandise....
http://members.tripod.com/tigerwoods8/ (looksmart 4)

I) 5) Woods, Tiger - EWS Sports
Offers multimedia features which include audio and video clips, as well as a photo gallery. Peruse Tiger's statistics....
http://ews.simplenet.com/sports/tiger/index.html (looksmart 5)

I) 6) Woods, Tiger - Original Page
Fan page is packed with articles, news, photographs and links dedicated to Woods. Includes Tiger's email address....
http://www.geocities.com/Colosseum/2396/tiger.html (looksmart 6)

I) 7) Woods, Tiger - Wayne's Tribute
Provides links and resources, including a look at Tiger's official homepage. Browse photographs....
http://www.cen.uiuc.edu/~wloschen/tiger/index.html (looksmart 7)

I) 8) Woods, Tiger - SportsLine
Presents news, stats, audio and video clips, and photos of Woods. Link to Club Tiger, the official Woods fan club....
http://www.tigerwoods.com/ (looksmart 8)

I) 9) Tiger Mask - TRC's Pro Wrestling Hall of Fame
Wrestling resource discusses Tiger Mask's career, calling him one of the most important men in the history of the sport. Read why....
http://www.trcwrestling.com/tigerbio.html (looksmart 9)

I) 10) Woods, Tiger - Rick's Page
Devoted Tiger fan offers highlights of Woods' career, anecdotes and quotes, and a mailing list. Also includes a range of links....
http://world.std.com/~rgu/tigerwoods/ (looksmart 10)

I) 11) Woods, Tiger - Fan-Attics
Examine what this independent fan club and news magazine offers for Tiger fanatics. Includes photos, membership info, and links....
http://www.tigerfans.com/ (looksmart 11)

I) 12) Woods, Tiger - Maxman Shrine
Pays homage to this superstar of golf. Find trivia, highlights, pictures, a Tiger survey and a chat room....
http://pages.prodigy.com/maxman/ (looksmart 12)

FIG. 42K

I) 13) Tasmanian Tiger
Provides a brief description of the animal and its disappearance....
http://www.equitronics.com/tiger.htm (looksmart 13)

I) 14) Tasmanian Tiger
Find a description of the animal's history written by student Bianca Mazzarella....
http://edx1.educ.monash.edu.au/~juanda/vcm/tiger.htm (looksmart 14)

I) 15) Woods, Tiger - Tiger Woods Foundation
Foundation seeks to support people of varying backgrounds and ethnicity to succeed, while promoting parental responsibility....
http://ww1.sportsline.com/u/fans/celebrity/tiger/course/foundatio... (looksmart 15)

I) 16) Tiger, Dana - IndianMarket
Artist showcase includes a biography and photograph of this Native American painter, and scans of her work....
http://www.indianmarket.net/tiger.html (looksmart 16)

I) 17) Woods, Tiger - MaxMan's Tiger Woods Shrine
Numerous features related to the young golf star include career highlights, surveys, a discussion area, trivia, pictures and links....
http://pages.prodigy.com/maxman/shrine.htm (looksmart 17)

I) 18) Woods, Tiger - Tiger's Den
Check out tour highlights, links, movie and audio clips, chat and a screensaver....
http://www.geocities.com/Colosseum/Track/6331/index.html (looksmart 18)

I) 19) Tasmanian Tiger
View a photograph of the last known Thylacine, as it appeared at the Hobart Zoo. Gives a brief description of the species....
http://www.southcom.com.au/~wombat/photos/tiger.html (looksmart 19)

I) 20) Shopping
...
http://209.185.142.203/entry.jsp?p=looksmart (looksmart 20)

I) 21) Tour of Tasmania - Tasmanian Tiger
Read scientific information about the animal and watch a video of a captive specimen. Search the main site by keyword....
http://www.tased.edu.au/tot/fauna/tiger.html (looksmart 21)

I) 22) Woods, Tiger - Tales
Posts Woods news articles, photographs and statistics. Search the news archives....
http://texnews.com/tiger/index.html (looksmart 22)

I) 23) Tiger, Dana - Paper Palette
Find a personal and professional profile of this artist, a list of her works and relevant contact details....
http://www.paperpalette.com/danatiger/artistinfo.html (looksmart 23)

I) 24) Tiger, Dana - Creek Tribe
Study a biography and a factsheet profiling this painter with ties to Oklahoma's Muscogee Nation, and then admire samples of her productions....
http://www.artnatam.com/dtiger/ (looksmart 24)

I) 25) Tiger Mask - Shooto History
Learn about Shooto, founded by Satoru Sayama who sought to create the strongest form of martial arts in the competitive sports world....
http://members.tripod.com/rhaje/shooto.html (looksmart 25)

Query: elephant

I) 1) A Page of Information on Elephants
The elephant is probably one of the world's best-known animals; depictions of elephants in Western literature date back at least to Matthew Paris' Chronica Majora , a 13th century...
http://www.inactive.demon.co.uk/elephant.html (hotbot 1)

I) 2) African Elephants
Addo is a small bushveld town 70km to the north of South Africa's fifth-largest city, Port Elizabeth. Here, the elephant is king. A herd of ll0* dots the harsh, tangled mass of...
http://www.fl.net.au/~rodac/courteney/eles.html (hotbot 2)

I) 3) The Elephant Information Repository
The best source on the internet for anything about elephants! This includes elephant links, elephant news, elephant conservation, and an in-depth look at the Elephant....
http://elephant.elehost.com/ (hotbot 3)

I) 4) Denise's Page
This page is about elephants and their history. Also about conservation as applied toward elephants....
http://www.geocities.com/RainForest/Vines/5407/elephant.html (hotbot 4)

I) 5) The Elephants of Cameroon

FIG. 42L

Join the North Carolina Zoo and its researchers on an interactive project to track and study elephants in northern Cameroon....
http://www.nczooeletrack.org/ (hotbot 5)

I) 6) GeoZoo: Elephants! (and Extinct Relatives - order Proboscidea)
GeoZoo's report on elephants, Earth's largest land mammals!...
http://www.geobop.com/Mammals/Proboscidea/ (hotbot 6)

I) 7) Hunting Elephants
hunt elephants by going to Africa, catching gray animals at random, and stopping when any one of them weights within plus or minus 15 percent of any previously observed elephant....
http://www.asandler.com/jokes/lists/elefont.shtml (hotbot 7)

I) 8) Help save the elephants
We need to stop circuses and zoos that are mistreaing animals. Please sign our petition to help us protect the elephants. Sign our petition! E-Mail adress: Full Name: Comments:...
http://www.ziplink.net/users/tlipcon/elephants/ (hotbot 8)

I) 9) Six Flags Marine World
Closed Monday through Thursday Open Friday through Sunday ( September 10 -October 31, 1999) Friday Hours: 10/1 > (10 am - 6 pm) 10/8, 10/15, 10/22, 10/29 > (10 am - 11 pm) Saturday...
http://www.freerun.com/napavalley/outdoor/marinewo/marinewo.html (hotbot 9)

I) 10) Elephants on Hedweb: an elephant calf
A photo of a young elephant in a hurry...
http://www.hedweb.com/animimag/eleprun.htm (hotbot 10)

I) 11) Have the Memory of An Elephant
Lifetime reminder service. Never forget an important date again....
http://www.thehotpages2.com/ns/reminder1546093.htm (hotbot 11)

I) 12) Pink Elephant: The IT Service Management Company
Pink Elephant provide IT Service Delivery & Management Consultancy; Project Management Services; IT Service Delivery & Management Training & Education and IT Support Services...
http://www.pinkelephant.com (hotbot 12)

I) 13) AdventureIndia: Camel and Elephant Safaris
Camel Safaris in Rajistan, notably the Pushkar Camel Fair and Safaris in Jaisalmer. Meet the nomadic tribes of Rajasthan; Camel Safaris and the Pushkar Camel Fair; Elephant Safaris in the National Park...
http://www.adventureindia.com/camel.html (hotbot 13)

I) 14) Camping & Elephant Safaris - Zimbabwe
Matobo Hills, Hwange National Park, others....
http://www.bigfive.com/mobile.htm (hotbot 14)

I) 15) The Elephant Company
The Elephant Company, Victoria Falls, offers you the chance of a lifetime - the adventure of riding an African Elephant....
http://bookorbuy.com/elephants/ (hotbot 15)

I) 16) Elephant & Castle Restaurant Group Inc.
North American chain. Operates Alamo Grill, Elephant & Castle Restaurant and Pub, and Rainforest Cafe....
http://www.elephantcastle.com (hotbot 16)

I) 17) Elephant Black Powder
Elephant black powder gives the shooter the most accurate, consistent and cleanest burning black powder and we are continually striving to make it an even better powder....
http://www.fastlane.net/homepages/petro/Files/elephant.htm (hotbot 17)

I) 18) Arizona Elephant Garlic
A gigantic bulb of garlic with a mild delicate flavor and is available on the Internet, in retail and wholesale markets and grown in Willcox, Arizona....
http://www.azgarlic.com (hotbot 18)

I) 19) Wilcox Elephant Garlic
The mail order zone for Elephant Garlic from Will and Mary Wilcox....
http://www.jps.net/treetopw/ (hotbot 19)

I) 20) Clutch-Elephant Riders
Clutch's new site, promoting their new album "The Elephant Riders " The site has the latest news as well as new images, soundclips, tour info and a chat room...
http://www.elephantriders.com/ (hotbot 20)

I) 21) Elephant on the web
Elephant on the web Elephant on the web is an exciting venture set up to provide the means for small businesses to exploit the full potential of the Internet Web page design We will design your pages f...
http://www.eotw.co.uk/ (hotbot 21)

I) 22) The White Elephant Shop, Essex, Massachusetts
The White Elephant Shop is the largest antique and consignment shop north of Boston, Massachusetts....
http://www.cape-ann.com/white-elephant (hotbot 22)

FIG. 42M

I) 23) Kneeling Elephant Records
...
http://www.kneelingelephant.com/ (hotbot 23)

I) 24) Ivory Haven - Laura The Elephant's House on The Web
African Elephant named Laura has her own web site promoting endangered species conservation through her educational, entertaining and interactive pages. Learn more about her, her mate, Ivory Haven Farm...
http://www.geocities.com/RainForest/2248/ (hotbot 24)

I) 25) Elephant Talk has moved
Elephant Talk has moved to www.elephant-talk.com.Your browser should take you there automatically in a few seconds....
http://www.cs.man.ac.uk/aig/staff/toby/et/ (hotbot 25)

Query: animal

I) 1) Animal Gifts Galore
Forum: alt.support.grief.pet-loss
Date: 2000/02/09 Author: BrsMnky589 ...
http://x44.deja.com/getdoc.xp?AN=583805320&CONTEXT=950413820.2354... (dejanews 1)

I) 2) Animal Gifts Galore
Forum: alt.pets.pet-rights
Date: 2000/02/09 Author: BrsMnky589 ...
http://x44.deja.com/getdoc.xp?AN=583808676&CONTEXT=950413820.2354... (dejanews 2)

I) 3) Animal Gifts Galore
Forum: aus.pets
Date: 2000/02/09 Author: BrsMnky589 ...
http://x44.deja.com/getdoc.xp?AN=583808947&CONTEXT=950413820.2354... (dejanews 3)

I) 4) Animal Gifts Galore
Forum: uk.rec.pets.misc
Date: 2000/02/09 Author: BrsMnky589 ...
http://x44.deja.com/getdoc.xp?AN=583810511&CONTEXT=950413820.2354... (dejanews 4)

I) 5) ANIMAL SEX VIDEOS
Forum: alt.sex.animals
Date: 2000/02/12 Author: addhf ...
http://x44.deja.com/getdoc.xp?AN=584824065&CONTEXT=950413820.2354... (dejanews 5)

I) 6) ANIMAL SEX VIDEOS
Forum: alt.sex.bestiality
Date: 2000/02/12 Author: addhf ...
http://x44.deja.com/getdoc.xp?AN=584824067&CONTEXT=950413820.2354... (dejanews 6)

I) 7) ANIMAL SEX VIDEOS
Forum: alt.sex.bestiality.alix.piantadosi
Date: 2000/02/12 Author: addhf ...
http://x44.deja.com/getdoc.xp?AN=584824068&CONTEXT=950413820.2354... (dejanews 7)

I) 8) ANIMAL SEX VIDEOS
Forum: alt.sex.bestiality.barney
Date: 2000/02/12 Author: addhf ...
http://x44.deja.com/getdoc.xp?AN=584824069&CONTEXT=950413820.2354... (dejanews 8)

I) 9) ANIMAL SEX VIDEOS
Forum: alt.sex.bestiality.hamster.duct-tape
Date: 2000/02/11 Author: addhf ...
http://x44.deja.com/getdoc.xp?AN=584824070&CONTEXT=950413820.2354... (dejanews 9)

I) 10) Free animal movies!
Forum: alt.sex.animals
Date: 2000/02/12 Author: SWF ...
http://x44.deja.com/getdoc.xp?AN=584976671&CONTEXT=950413820.2354... (dejanews 10)

I) 11) Animal Gifts Galore
Forum: uk.politics.animals
Date: 2000/02/09 Author: BrsMnky589 ...
http://x30.deja.com/getdoc.xp?AN=583821100&CONTEXT=950413820.1742... (dejanews 11)

I) 12) Animal sex orgy Free!
Forum: uw.alt.sex.beastiality
Date: 2000/02/12 Author: SWF ...
http://x30.deja.com/getdoc.xp?AN=584982696&CONTEXT=950413820.1742... (dejanews 12)

I) 13) ANIMAL SEX VIDEOS
Forum: alt.sex.bestiality.hamster.duct-tape
Date: 2000/02/11 Author: addhf ...

FIG. 42N http://x30.deja.com/getdoc.xp?AN=584824070&CONTEXT=950413820.1742... (dejanews 13)

I) 14) animal toughness
Forum: talk.politics.animals
Date: 2000/02/07 Author: Jd Skip ...
http://x30.deja.com/getdoc.xp?AN=582772329&CONTEXT=950413820.1742... (dejanews 14)

I) 15) Free animal movies!
Forum: alt.sex.animals
Date: 2000/02/12 Author: SWF ...
http://x30.deja.com/getdoc.xp?AN=584976871&CONTEXT=950413820.1742... (dejanews 15)

I) 16) Free animal page
Forum: alt.sex.animals
Date: 2000/02/09 Author: Neo120683 ...
http://x30.deja.com/getdoc.xp?AN=583505725&CONTEXT=950413820.1742... (dejanews 16)

I) 17) Homework error message
Forum: comp.lang.scheme
Date: 2000/02/12 Author: Joe 65 Boo ...
http://x30.deja.com/getdoc.xp?AN=585068462&CONTEXT=950413820.1742... (dejanews 17)

I) 18) Hot animal for free (hs2x0049.jpg)
Forum: alt.sex.animals
Date: 2000/02/12 Author: Josie Tupello ...
http://x30.deja.com/getdoc.xp?AN=584893437&CONTEXT=950413820.1742... (dejanews 18)

I) 19) iso animal sex
Forum: vegas.bi
Date: 2000/02/11 Author: Wetnkinky2 ...
http://x30.deja.com/getdoc.xp?AN=584517840&CONTEXT=950413820.1742... (dejanews 19)

I) 20) iso animal sex movies
Forum: vegas.personals.swingers
Date: 2000/02/11 Author: Wetnkinky2 ...
http://x30.deja.com/getdoc.xp?AN=584515428&CONTEXT=950413820.1742... (dejanews 20)

I) 21) 65FR6892 New Animal Drugs; Change of Sponsor
Forum: gov.us.topic.agri.farms
Date: 2000/02/11 Author: roboposter ...
http://x30.deja.com/getdoc.xp?AN=584509686&CONTEXT=950413820.1741... (dejanews 21)

I) 22) Animal Farm (in Spanish)
Forum: soc.culture.cuba
Date: 2000/02/11 Author: nomad ...
http://x30.deja.com/getdoc.xp?AN=584408956&CONTEXT=950413820.1741... (dejanews 22)

I) 23) Animal Gifts Galore
Forum: uk.politics.animals
Date: 2000/02/09 Author: BrsMnky589 ...
http://x30.deja.com/getdoc.xp?AN=583821100&CONTEXT=950413820.1741... (dejanews 23)

I) 24) Animal sex orgy Free!
Forum: uw.alt.sex.beastiality
Date: 2000/02/12 Author: SWF ...
http://x30.deja.com/getdoc.xp?AN=584982696&CONTEXT=950413820.1741... (dejanews 24)

I) 25) Animal society (Animal farm)
Forum: soc.culture.cuba
Date: 2000/02/11 Author: tsll6767 ...
http://x30.deja.com/getdoc.xp?AN=584564580&CONTEXT=950413820.1741... (dejanews 25)

Look4itHere
Div. of Internet Corporation

- News
- Weather
- Cool Sites
- Shopping
- Contests
- Horoscopes
- Classified

Visit Look4itHere2

FIG. 43B http://www.suntimes.co.za:80/2000/02/06/arts/durban/aned10.htm (webcrawler 10)

I) 11) Cat Users' Manual
The World Famous CAT User Manual ...
http://www.andreas.com/catman.html (webcrawler 11)

I) 12) Mr. Cat Story List
The story of Mr. Cat's life and adventures ...
http://www.inil.com/users/mikeycad/catlist.html (webcrawler 12)

I) 13) Bahamas / Cat Island
The "High Land" of The Bahamas Cat Island may have derived its name from Arthur Catt, the famous British sea captain or notorious pirate (depending on whose side you were on). ...
http://www.interknowledge.com/bahamas/bsciin01.htm (webcrawler 13)

I) 14) Hakan's Miscellaneous Quiz Pages
This is a humor page. ...
http://members.tripod.com/~hakancan/miscell1.html (webcrawler 14)

I) 15) Cat-Related links
Below are a (large) number of links to cat-related documents, some on my site, others on different sites. Bad Kitty/Bad Human list Updated October 18, 1999. ...
http://geog.utoronto.ca/reynolds/pethumor/catlinks.html (webcrawler 15)

I) 16) Miss Kitty's Cat Humor Pages
A look at the lighter side of being owned by a cat! ...
http://bennyhills.fortunecity.com/billmurray/532/cats/cathumor.ht... (webcrawler 16)

I) 17) Cat Supplies from the PET SHOP - Beds, Collars, Toys & other...
Cat Supplies - Discount Pet Shop for Dog, Cat & Small Animals. Little River Pet Shop makes shopping for cat supplies easy, 24 hours a day, secure shopping for cat suppplies. ...
http://www.pet-shop.net/html/cat.html (webcrawler 17)

I) 18) The Amazing Cat Picture Page!
Pictures of Cats! A collection of cat pictures submitted by internet users. Over 250 Cats! ...
http://www.islandnet.com/~jensal/cats.html (webcrawler 18)

I) 19) Cat Gift Ideas - Gifts for Cat Lovers!
Contents... If you're looking for the "purr"fect gift for a feline "fur"iend, here are some ideas! CAT JEWELRY... Essi's Claws & Paws: This site features adorable cat related jewelry, watches, t-sh...
http://www.execulink.com/~jhdavis/sarah/giftscatlovers.html (webcrawler 19)

I) 20) CatOwner.Com - Information About Cats and Kittens
CatOwner.Com offers a large variety of resources about cats including information on different cat breeds, cat newsgroups, cat health, pet supplies, cat poetry & cat humor. If you are a cat lover, visi...
http://www.catowner.com/ (webcrawler 20)

I) 21) Western Abyssinian Cat Club
The Western Abyssinian Cat Club (est. 1968) is a Cat Fanciers Association (CFA) member club located in Northern California. Our purposes are: To promote and develop interest in and knowledge of the Aby...
http://www.abyssinians.org/wacc/ (webcrawler 21)

I) 22) Cindy's Cat Pages Extension:Cat Links
Cindy's Cat Pages Extension has recently been moved to http://www.cindydrew.com/cats/. If you have a link on your pages to this afn site, please change it. ...
http://www.afn.org/~afn32054/animal1.htm (webcrawler 22)

I) 23) Cat Care Clinic Veterinary Services for cats and felines in ...
cat care clinic is a full service feline hospital and outpatient facility for cats only felines located in the city of Orange, California. ...
http://www.catcare.com/ (webcrawler 23)

I) 24) A listing of Cat Who books
A listing of Cat Who books Inside the barn of Qwill ...
http://www.expage.com/page/cwlist (webcrawler 24)

I) 25) Cindy's Cat Pages: Home
This site has recently been moved to http://www.cindydrew.com/cats/. If you have a link on your pages to this afn site, please change it. Cindy's Cat Pages have been on afn since 1996, ages in terms of...
http://www.afn.org/~afn47757/ (webcrawler 25)

Query: mouse

I) 1) Chris Knight's Danger Mouse Page
Danger Mouse GALORE!! ...
http://www.thuntek.net/~cknight/DMpages/DMindex.htm (webcrawler 1)

I) 2) NOHANDS MOUSE
Easy-to-use, intuitive foot-operated mouse developed to eliminate carpal tunnel syndrome. ...

FIG. 43C http://www.footmouse.com/ (webcrawler 2)

I) 3) Welcome to Phoenix Public Library
To select an item, click the left mouse button while pointer is on top of any of the boxes. For help learning to use a mouse, press the PAGE DOWN key located on your keyboard until instructions appear....
http://pac.lib.ci.phoenix.az.us/enhanced/ (webcrawler 3)

I) 4) Logitech CORDLESS WHEEL MOUSE 3-BUTTON [WebShopper]
Logitech CORDLESS WHEEL MOUSE 3-BUTTON ...
http://www.idg.net/crd_99_49186.html (webcrawler 4)

I) 5) UNIVERSAL ERGONOMIC Lap Mouse Pad
Reduces tension Reduces joint & muscle stress Work for hours - pain free Eliminates upper body fatigue Reduces injury to wrist Reduces injury to elbow ...
http://houseofgoldgifts.net/lapmousepads.html (webcrawler 5)

I) 6) mouse@horns - keeping pet mice healthy and happy
Keeping pet mice happy and healthy - a huge online guide. Regularly updated - now with photos ...
http://www.horns.freeserve.co.uk/mouse.htm (webcrawler 6)

I) 7) PROVANTAGE.COM : Mouse and Related Input Devices
The Computer Products Superstore. Here are the products listed under the category Mouse and Related Input Devices. Get guaranteed lowest prices, huge inventory, easy ordering, and super fast service. ...
http://www.provantage.com/ffmouse_.htm (webcrawler 7)

I) 8) PROVANTAGE.COM : Mouse and Related Input Devices
The Computer Products Superstore. Here are the products listed under the category Mouse and Related Input Devices. Get guaranteed lowest prices, huge inventory, easy ordering, and super fast service. ...
http://www.provantage.com/FFMOUSE_.HTM (webcrawler 8)

I) 9) Personalized Mouse Pads Plus - Welcome to Dante's Web Site
We will imprint your Favorite Images (from photos or Art work) onto MOUSE PADS for your Visual Enjoyment. will add Custom Lettering for FREE. FREE Personalized Mouse Pad every fourth order. ...
http://www.mousepi.com/ (webcrawler 9)

I) 10) Mouse Systems Optical and Ball Mice Joysticks Trackballs Gam...
Mouse Systems is a leading maker of computer mice (including scrolling mice and optical mice) and other computer peripheral devices. ...
http://www.mousesystems.com/ (webcrawler 10)

I) 11) St. Charles Public Library-Welcome to the Miss Mouse Game
Welcome to the Miss Mouse Game Toddlers and preschoolers play this game during Story Time at the St. Charles Public Library. Miss Mouse is so popular we decided to introduce her to the Internet. ...
http://www.st-charles.lib.il.us/low/missmouse.htm (webcrawler 11)

I) 12) Roaring Mouse Club Permission Form
Roaring Mouse Club Permission Form Print, complete, sign and return this form within 30 days for your child under 13 to join the Roaring Mouse Club at no cost and to participate in free activities. ...
http://www.roaringmouse.com/parentsform.html (webcrawler 12)

I) 13) TV STORE
The TV Store "The Drew Carey Show" Mimi Collector Doll Forget trolls on your desk. How about a bunch of little "Mimi's" instead. Let her blind you with her charm (not to mention her colors). ...
http://www.ultimatetv.com/tvstore/products/pads/ (webcrawler 13)

I) 14) Mouse Pads Custom Printed - Online Instant Quote - 1stMouseP...
1st Mouse Pads - Get an INSTANT QUOTE. Custom Imprinted Mouse Pads for your Business, Products and Services. Guaranteed lowest prices on the Internet. Multiple Fortune 500 Customers. ...
http://www.1stmousepads.com/ (webcrawler 14)

I) 15) Untitled
Quote begins: This is an actual alert to IBM Field Engineers that went out to all IBM Branch Offices. The person who wrote it was SERIOUS! "Mouse balls are now available as FRU. ...
http://www.igs.net/~tril/humor/computer/mouse.txt (webcrawler 15)

I) 16) The Image of Mickey Mouse
Mickey Mouse From his conception as an artificial image on the animated screen Mickey Mouse has evolved and become a universal icon. His presence has been integrated into virtually every facet of our s...
http://www.modcult.brown.edu/students/DN/eleanor/hotmetal_mick.ht... (webcrawler 16)

I) 17) Custom Printed Mouse Pads
We manufacture high quality custom printed mouse pads for use as advertising specialties. They only cost $2.50 each. Call toll-free 1-800-784-PADS (7237). ...
http://www.mouse-pads.com/ (webcrawler 17)

I) 18) Radio Sweden Search
Search Radio Sweden and Swedish Radio's Website ...
http://www.sr.se/rs/search/help.htm (webcrawler 18)

FIG. 43D

I) 19) DISNEYANA - VINTAGE DISNEY COLLECTIBLES - DISNEYANA
DISNEY COLLECTIBLES - VINTAGE DISNEYANA - DISNEY COLLECTIBLES MICKEY MOUSE - GOOFY - DONALD DUCK and the GANG THE FINEST SOURCE OF DISNEYANA COLLECTIBLES ON THE PLANET DIRECT SALES, AUCTIONS, MAIL ORDE...
http://www.mouseman.com/ (webcrawler 19)

I) 20) Excite Search
...
http://www.excite.com/search.gw?search=mouse (webcrawler 20)

I) 21) Logitech Wingman Gaming Mouse Review
Logitech Wingman Gaming Mouse Review on GameSpot UK. With Logitech Wingman Gaming Mouse Screenshots Plus Hints & Tips, Links & Downloads ...
http://www.gamespot.co.uk/pc.gamespot/hardware/wingm_uk/review.ht... (webcrawler 21)

I) 22) What Is...a mouse (a definition)
This page defines 'mouse,' a device that allows a user to point to a place on a display screen and to select one or more actions to take from that position. ...
http://www.whatis.com/mouse.htm (webcrawler 22)

I) 23) Left-Handed Mouse, Ergonomic, PC Windows95
Left-Handed Mouse, Ergonomic, Effortless use for maximum performance is what you get with this contoured, left-handed ergonomic mouse. ...
http://thelefthand.com/d203.htm (webcrawler 23)

I) 24) Avoiding the Mouse Trap: Pointers for Safe Mouse Use
By Barbara Pottgen For today's computer user, a "pointing device" such as a mouse or trackball has become an essential tool of the trade. Using one that fits your hand comfortably and learning the righ...
http://www.uhs.berkeley.edu/FacStaff/Resources/HealthBeat/mousetr... (webcrawler 24)

I) 25) - Mouse Marketing Inc. -
Unusually warm in some places, unusually usual in others. A wafting of Django Reinhardt and a double-strong espresso add some bounce to the morning. ...
http://www.mousemarketing.com/index.shtml (webcrawler 25)

Query: dog

I) 1) dogs - dog training - dog behavior - dog adoption
Digitaldog offers dog training and breeding information, and provides information on adopting dogs from animal shelters. ...
http://www.digitaldog.com/index.html (webcrawler 1)

I) 2) The Dog Genome Project
The Dog Genome Project is a collaborative study involving scientists at the University of California, Berkeley, the University of Oregon, and the Fred Hutchinson Cancer Research Center. ...
http://mendel.berkeley.edu/dog.html (webcrawler 2)

I) 3) ABOUT Dogs One!/INFO REQUEST FORM
Dogz One is a dog breeder's exchange and on-line magazine for people who love dogs. First of all, we are "dog" people. We own, train, breed, show....and MOST importantly, LOVE our dogs. ...
http://www.dogzone.com/aboutdz.htm (webcrawler 3)

I) 4) TCS Hot Dog Page
The Socioethnoarcheopsychology of Hot Dogs Thank you for looking at the hot dog technoweenie site. There have been E-mail us at: tcs@xroads.com And visit some of our other interesting pages ...
http://www.xroads.com/~tcs/hotdog/hotdog.html (webcrawler 4)

I) 5) 2000 DOG NAMES: Naming your puppy
2000 suggestions for naming your puppy. ...
http://www.petrix.com/dognames/ (webcrawler 5)

I) 6) American Dog Trainers Network -- Your Dog Training & Beh...
American Dog Trainers Network -- Your Dog Training & Behavior Resource Center ...
http://www.inch.com/~dogs/ (webcrawler 6)

I) 7) WOOF!
For dog lovers and owners alike, there are many questions and few simple answers -- how to select a dog that suits your lifestyle, how to train and feed that dog, what to do if your dog seems aggressiv...
http://www.pbs.org/wgbh/woof/home.html (webcrawler 7)

I) 8) Dog Owner's Guide: Topic List
This list of Dog Owner's Guide articles is arranged alphabetically. Puppy adolescence trials and tribulations The Afghan: Ultimate elegance; Ultimate in canine elegance. ...
http://www.canismajor.com/dog/idx1.html (webcrawler 8)

I) 9) Dog Owner's Guide: Topic List
This list of Dog Owner's Guide articles is arranged by topic and subtopic. Because some material is relevent to several topics it is listed more than once. ...
http://www.canismajor.com/dog/topic1.html (webcrawler 9)

FIG. 43E

I) 10) Dog-Play: Evaluate Your Dog's Personality
The people your dog visits must be absolutely safe from your dog. The dog must be forgiving of both accidental and intentional pain that may be inflicted. ...
http://www.dog-play.com/evaluate.html (webcrawler 10)

I) 11) Dog Humor, Astrology for Pets, horoscopes and personality pr...
Astrologer, provides free astrological charts and future forecasts for pets and of course people too. Do you want to find that perfect pet? Will he be healthy, a digger, a barker, a whinner or a pet th...
http://www.nanceestar.com/DogHumor.html (webcrawler 11)

I) 12) P. Cooper - Table of Contents
Top Ten Dog Secrets, excerpted from the offbeat and informative book 277 Secrets Your Dog Wants You to Know ...
http://home.cybergrrl.com/planet/book/author/cooper/dogtoc.html (webcrawler 12)

I) 13) Dog-On-It
Dog-On-It is the premier dog related website, full of information including breeders, groomers, pet suppliers, and anything else related to the wonderful world of dogs. ...
http://www.dog-on-it.com/ (webcrawler 13)

I) 14) Online Florists: Fresh Flowers & Roses
SAVE MONEY. SAVE TIME. Order flowers Online! Same and Next Day delivery available. Check out our great prices, arrangements and gift baskets! ...
http://www.net-florist.com/ (webcrawler 14)

I) 15) Best Dog Pictures
The best dog pictures. Free Big Dog Award. See original pictures of the best dogs. Enter your dog! Free dog care info. ...
http://www.chazhound.com/pictures.html (webcrawler 15)

I) 16) DogOwners.Com - Web Pages about Dogs
DogOwners.Com has a large variety of webpages about dogs including information on different dog breeds, puppies, dog newsgroups & chatrooms, dog health, pet supplies, dog names & dog humor. ...
http://dogowners.com/ (webcrawler 16)

I) 17) Dog Infomat: Main Page
The Dog Infomat is a photojournalistic website dedicated to assisting dog owners and enthusiasts and, especially those considering dog ownership. The site's primary purpose is to provide access to the ...
http://www.doginfomat.com/ (webcrawler 17)

I) 18) #1 Dog source for quality dog toys, pet supplies, treats, ch...
Dogtoys.com is the best online source for name brand dog and puppy toys. Quality treats and accessories for your dogs and puppies. Visit DogToys.com today. ...
http://www.dogtoys.com/ (webcrawler 18)

I) 19) Adopt-A-Cyber-Dog Frequently Asked Questions
Frequently Asked Questions about Adopt-A-Cyber-Dog What is a Cyber-Dog and what does it do? A Cyber-Dog is a dog that lives on your webpage. It requires no work, it just sits on your webpage and waits ...
http://puffin.ptialaska.net/youngs/adoptfaq.htm (webcrawler 19)

I) 20) Excite Search
...
http://www.excite.com/search.gw?search=dog (webcrawler 20)

I) 21) DDEAF - Survey
Please print this out or copy and paste it into an eMail COMPLETE A SEPARATE FORM for each deaf dog you own. Also, if you owned a deaf dog who is now deceased, please fill out a separate form for that ...
http://www.deafdogs.org/Survey.html (webcrawler 21)

I) 22) Dog-Related Links
Below are a (large) number of dog-related links, some to files on my site, some to other sites. For Your Information Dogs FAQ list NetVet Dog Links list. ...
http://geog.utoronto.ca/reynolds/pethumor/doglinks.html (webcrawler 22)

I) 23) Dog Training,Schutzhund training, dog trainer training, boar...
Schutzhund training, boarding breeding and grooming. K-9, protection, search, rescue, Granite State Dog Training Center Dog Training Center. . ...
http://www.gsdtc.com/ (webcrawler 23)

I) 24) THE DOG DIAPER HOME PAGE
Now, there is a solution to the problem of dog waste: a revolutionary dog diaper that will permanently transform dog care everywhere. The problem of dog waste in urban centers as well as in households ...
http://www.dog-diaper.com/ (webcrawler 24)

I) 25) Adopt-A-Cyber-Dog
Third Edition Basset Hound adopt basset French Bulldog adopt french Dalmatian/Lab Mix adopt mixed

FIG. 43F

Weimaraner adopt weim Newfoundland adopt newf West Highland White Terrier adopt westie ...
http://puffin.ptialaska.net/youngs/adoptcyberdog.htm (webcrawler 25)

Query: monkey

I) 1) Chat @ Monkey Lounge, a real-time, interactive, online commu...
The Monkey Lounge is a real-time, interactive, online, chat community. Meet, talk, interact in a friendly, fun and loose social setting. Special features include on-line statistics and member pics. ...
http://monkey.csa.net/ (webcrawler 1)

I) 2) MunkySites
Here's a collection of Munky-Related sites for your viewing pleasure. Deceitful Monkey A hilarious game with an evil monkey carrying a big stick. Tons of fun! ...
http://www.stormloader.com/spunkymunky/munksite.html (webcrawler 2)

I) 3) Mr. Monkey's Home Page
Mr. Monkey gets in lots of trouble. He's kind of like a Curious George for grown-ups. ...
http://www.evl.uic.edu/caylor/MONKEY/monkey.html (webcrawler 3)

I) 4) The Monkey Island Webring's homepage
Image created by Ryan Howard Update - 27/12/97 Little modifications there and there: corrected the "Change site information" form and did some little corrections elsewhere, too. ...
http://wwnet.fi/users/linkola/miwebring.html (webcrawler 4)

I) 5) Sea Monkey(r) Obsession Quiz
Take this test and see if you truly are a Sea-Monkey® addict. Do you dream about Sea-Monkeys®? (Give yourself an extra point if these are particularly naughty dreams). ...
http://users.uniserve.com/~sbarclay/support.htm (webcrawler 5)

I) 6) The Primate Care Site
If you keep or are thinking about keeping primates you should read this !!! ...
http://mommensj.web2010.com/index.htm (webcrawler 6)

I) 7) The Monkey Island World
You are the person to come to The Monkey Island Mud Hut web site Welcome to the latest and biggest addition to Matt Shaw's Bits & Bobs Web Site. To visit the Home page for the Matt Shaw Bits & ...
http://members.xoom.com/xj720/monkey/index.htm (webcrawler 7)

I) 8) THE MONKEY SANCTUARY- UK
The Monkey Sanctuary Co-operative Ltd, and the Monkey Sanctuary Trust are based in Looe, Cornwall (U.K.). Both organizations are concerned mainly with the welfare of a particular species of monkey, the...
http://ourworld.compuserve.com/homepages/monkey_sanctuary_uk/ (webcrawler 8)

I) 9) kinderbo
Welcome to Ms. Boyce's Coconutty Kindergarten! We have many coconutty things to share with you! Each day is exciting! ! Enjoy your adventure into Coconut Kingdom ...
http://www.caller.com/dawson/kinderbo.htm (webcrawler 9)

I) 10) Primate Links
Heather's Wild World of Animals is currently under reconstruction. While you are waiting, the following websites should provide you with any information you are looking for. ...
http://members.primary.net/~heather/ (webcrawler 10)

I) 11) Monkey Magnet
For the moment, possibly for quite a long moment, Monkey Magnet is hibernating. But here's portions of some back issues for y'all to check out. If you're lucky, you can still get a couple of issues in ...
http://www.badmonkey.com/zine.html (webcrawler 11)

I) 12) Nate's Sock Monkey Hub
Hi everyone. Happy Halloween! My mom finally made me the costume I've been waiting for. Dad said no tights, so we compromised. Watch for me on Oct. 31, I might show up at your door! ...
http://www.mightymedia.com/sockmonkey/ (webcrawler 12)

I) 13) Monkey-Thon Archives
This is the stuff that's still available, but no longer featured at the Peabody Award Winning Web Site, The Punch Drunk Monkey-Thon ...
http://home.earthlink.net/~jenolen/archives.htm (webcrawler 13)

I) 14) Index of Famous Monkeys
Well, basically it's a list of famous monkeys. ...
http://www.evl.uic.edu/caylor/MONKEY/famousmonkeys.html (webcrawler 14)

I) 15) Stereotaxic MRI Brain Atlas of Monkey
Department of Physiology Nihon University, School of Mdicine and Laboratory for Magnetic Resonance, Imaging and Spectroscopy National Institutes for Physiological Sciences ...
http://cortex.med.nihon-u.ac.jp/department/physiol1/index.html (webcrawler 15)

I) 16) Japanese tales : The Crab and the Monkey
Once upon a time there was a crab and a monkey. One day they were wandering together when the crab

FIG. 43G happened to find a riceball in the grass. The monkey was feeling envious of the crab and wanted to fin...
http://mhtml.ulis.ac.jp/~myriam/futsu/kanigb.html (webcrawler 16)

I) 17) Home of CyberMonkey
(Due to security reasons, actual photo will be withheld) MONKEY IS BACK! Yes, that's right. After more than 2 years of seclusion, I, Monkey, am back into the swing of things. ...
http://www.cybermonkey.com/ (webcrawler 17)

I) 18) Monkey Island Helpdesk
Welcome to the Monkey Island Helpdesk. This helpdesk is dedicated to answering your specific Monkey Island questions without ruining the game with a walkthrough. ...
http://www.angelfire.com/mi/MIFans/Helpdesk.html (webcrawler 18)

I) 19) Songs of Innocence: Bad Sea Monkey(r) Poetry
The poems on this page are loving, caring poems that express a strong affection and love for Sea Monkeys(r). Any poems that are mourning Sea Monkey(r) deaths are included here. ...
http://users.uniserve.com/~sbarclay/pospoet.htm (webcrawler 19)

I) 20) Sea Monkeys(r) on the World Wide Web
I am pleasantly surprised to see all of the Sea-Monkey(r) pages and resources on the web! I have included some links that can provide you with hours of fun and intrigue! ...
http://users.uniserve.com/~sbarclay/web.htm (webcrawler 20)

I) 21) Monkey - Mini Linux
Monkey Linux can be extracted to the DOS filesystem (to the FAT32 too). This is complete small ELF distribution with latest kernel on 5 diskettes. Monkey can run on this minimal HW: 386SX, 4MB RAM, 30M...
http://www.spsselib.hiedu.cz/monkey/ (webcrawler 21)

I) 22) Monkey Lives
A private system owned and operated by steven r. loomis last updated on: jan 1st 1998 [ srl / jmast ] design by josh mast (plush productions) 800x600x16mil+ optimized | the original monkey logo webmast...
http://www.monkey.sbay.org/ (webcrawler 22)

I) 23) The Monkey
Based on the story of a classical Chinese fairy tale.It is one of famous Chinese novels.Illustrated with pictures of wonderful Chinese paintings. ...
http://www.china-on-site.com/literatu/classic/west/index.html (webcrawler 23)

I) 24) Monkey
Can you remember that dodgy cult series Here is Zombie Nations Tribute to crap but cool T.V. By Scruff S.E. The series, Monkey was actually named after this character whose name is also, Monkey. ...
http://www.zombie.dabsol.co.uk/films/monkey/monkey.htm (webcrawler 24)

I) 25) Songs of Experience: Bad Sea Monkey(r) Poetry
This page is intended for new and negative "Bad" Sea Monkey(r) Poetry.To qualify as "negative" poetry a poem must include negative images of Sea Monkeys(r), mutant and/or freakish Sea M...
http://users.uniserve.com/~sbarclay/negpoet.htm (webcrawler 25)

Query: giraffe

I) 1) The Giraffe Project
This is the territory of the Giraffe Project. We're free flacks for heroes -- finding, commending and publicizing people who stick their necks out for the common good. ...
http://www.giraffe.org/ (webcrawler 1)

I) 2) Janet LaFara's Giraffe Haven
Janet LaFara's Giraffe Haven ...
http://www.giraffehaven.com/ (webcrawler 2)

I) 3) G i r a f f e s - A World of Them
links for giraffe pages ...
http://www.personal.psu.edu/users/m/r/mrp141/wicked.html (webcrawler 3)

I) 4) A wicked wicked Mr. Giraffe!
Mr. written by Every day in Mr. Giraffe's life was the same. In the morning, the sun either played on the spider web in the corner, or the rain fell like lace across the giraffe house window where a li...
http://www.personal.psu.edu/users/m/r/mrp141/pinkpuff.html (webcrawler 4)

I) 5) National Zoo Audio Tour - Giraffe Heart
A Giraffe Heart Photo by Dr. Richard Montali, DVM STOP 10 THE GIRAFFE'S HEART The giraffe is a big-hearted animal. Huge. Look at that body and imagine a heart as big as an elephant's. ...
http://www.si.edu/organiza/museums/zoo/map/tsfiles/girhea.htm (webcrawler 5)

I) 6) G i r a f f e Test
How Much does the giraffe's heart weigh? 2 pounds 24 pounds 40 pounds How fast can a giraffe run from enemies? 35 mph 56 mph 15 mph What color is the giraffe's tounge? ...
http://www.personal.psu.edu/users/m/r/mrp141/test.html (webcrawler 6)

FIG. 43H

I) 7) G i r a f f e - Camelopardalis
THIS IS THE wicked GIRAFFE The giraffe lives in herds in Savanna and open bush country and is native to most of Africa south of the Sahara. It feeds primarily on acacia (a-kay-sha) leaves. ...
http://www.personal.psu.edu/users/m/r/mrp141/camel.html (webcrawler 7)

I) 8) Giraffes!
Giraffes are six feet tall when they're born Giraffes land on their heads when they're born No two giraffes have the same spot pattern People identify Giraffes by their spots ...
http://ourworld.compuserve.com/homepages/davelarsen/giraffes.htm (webcrawler 8)

I) 9) The Flaming Lips - This Here Giraffe singles
Warner Bros. This Here Giraffe -From the album Clouds Taste Metallic 2. Jets Part 2 -Live Peel Session Version - recorded 1992 3. Life On Mars -(written by David Bowie) Live Peel Session Version - reco...
http://www.wbr.com/flaminglips/cmp/giraffe.htm (webcrawler 9)

I) 10) Georgian Homo erectus Crania
...
http://www.he.net:80/~archaeol/0001/newsbriefs/georgia.html (webcrawler 10)

I) 11) creaturefeature
The Cheyenne Mountain Zoo currently has 11 reticulated giraffes in the collection. RETICULATED GIRAFFE INFORMATION Vernacular Name: Reticulated Giraffe (Sub-specie at the Cheyenne Mountain Zoo) ...
http://www.cmzoo.org/griaffeinfo.html (webcrawler 11)

I) 12) The Nose Pages
The Nose Pages Your source for nasal information! Nose-related stuff: History of my nose As always, if you would like your nose added to this page, feel free to email it to me. --cynsa ...
http://www.well.com/user/cynsa/nosepage.html (webcrawler 12)

I) 13) Encarta Encyclopedia giraffe info
Info from Encarta Encyclopedia Scientific classification: The giraffe belongs to the family Giraffidae. It is classified as Giraffa camelopardalis. ...
http://www.personal.psu.edu/users/m/r/mrp141/encycl.htm (webcrawler 13)

I) 14) Black Giraffe Designs - Beading Book Survey
Black Giraffe Designs Beading Book Survey Submit Your Answers here to receive your free pattern: Please help us design books that make YOU happy. ...
http://www.blackgiraffe.com/Survey/ (webcrawler 14)

I) 15) From the Land Beyond - Giraffe Photographs
Photographs of mother giraffe with new born baby in Kenya, Africa. Photographs taken by Diane C. ...
http://www.provide.net/~dianneross/giraffe.htm (webcrawler 15)

I) 16) JOKE POST! - www.jokepost.com
A unique, interactive and entertaining jokes site. Your source for jokes and laughs on the internet. Where you can post your own jokes or browse through the archives. Free email list! Totally free! ...
http://jokepost.com/ (webcrawler 16)

I) 17) What's new at the Zoo - Utah's Hogle Zoo
Home Animal Tour What's New Travel Admission Volunteer Adoption Membership On August 27, 1999 our female baringo giraffe, "Daphne" gave birth to a female calf. ...
http://www.xmission.com/~hoglezoo/new.htm (webcrawler 17)

I) 18) Giraffa camelopardalis: The Giraffe
Giraffes In Cyberspace ...
http://www.giraffes.org/ (webcrawler 18)

I) 19) 1st Intern. Collection of Tongue Twisters - Korean
The largest collection of tongue twisters in the world. More than 1000 tongue twisters in more than 50 languages with translations into English. ...
http://www.uebersetzung.at/twister/ko.htm (webcrawler 19)

I) 20) Just So Stories, Rudyard Kipling
HOW THE LEOPARD GOT HIS SPOTS N the days when everybody started fair, Best Beloved, the Leopard lived in a place called the High Veldt. 'Member it wasn't the Low Veldt, or the Bush Veldt, or the Sour V...
http://www2.shore.net/~mogget/leopard.htm (webcrawler 20)

I) 21) Schwinn giraffe wanted
I want a schwinn giraffe. Anyone want to sell one i'll buy it, name your price and i'll tell you what i think. I live in madison wisconsin. Schwinn giraffe wanted ...
http://www.unicycling.org/unicycling/wanted4.html (webcrawler 21)

I) 22) 12 Foot Giraffe For Sale
Gregory Poche is selling a 12 foot unicycle in Michigan. Act now! ...
http://www.unicycling.com/gpoche/index.htm (webcrawler 22)

I) 23) Computing and Information Technology

FIG. 43I

Internet overload (11/08/1999) As most of you are aware the access to non-UVM Internet sites is very slow during most of the day. Currently the demand for Internet access exceeds UVM's existing bandwid...
http://cit.uvm.edu/ (webcrawler 23)

I) 24) List of -R-Us Sites
The ``Buzzards "R" Us" group convinced Richard Feinberg to change the name of his company from ``Guns Are Us" to ``Guns Are We" and then to ``We Are Guns". ...
http://www.rru.com/tru/sitelist.html (webcrawler 24)

I) 25) NAIROBI CITY TOUR
NAIROBI CITY TOUR Nairobi City is the largest city between Cairo and Johannesburg. This is a very cosmopolitan place, lively, interesting, pleasantly landscaped and a good place to get essential busine...
http://www.saferidesafaris.com/Nairobi.htm (webcrawler 25)

Query: lion

I) 1) The Lion's Den!
This page is far from done, so please bear with it. Thanx! WELCOME TO You're the th Visitor! THE LION'S DEN! Not to be confused with country western line dancing, the Chinese Lion Dance is a traditiona...
http://www.geocities.com/Tokyo/3430/ (webcrawler 1)

I) 2) The Asiatic Lion Information Centre
The first Internet web site dedicated to the conservation of the Asiatic lion subspecies, supporting the European Asiatic Lion Breeding Programme ...
http://wkweb4.cableinet.co.uk/alic/ (webcrawler 2)

I) 3) TLKRing - The Lion King Ring Homepage
"Heeeeeeeey! Welcome to our humble home!" This is the Homepage of The Lion King Web Ring. This is the central headquarters for the WebRing where you can sign your page up, add a page, change the curren...
http://www.drigon.com/~richasi/LionKing/TLKRing/ (webcrawler 3)

I) 4) LION - Membership Information
FREQUENTLY ASKED QUESTIONS Close More Loans. How does LION help you do that? Testimonials. What do some of the thousands of brokers using LION say about it? ...
http://www.lioninc.com/info/membership (webcrawler 4)

I) 5) LION - Brokers Information Page
FREQUENTLY ASKED QUESTIONS Close More Loans. How does LION help you do that? Testimonials. What do some of the thousands of brokers using LION say about it? ...
http://www.lioninc.com/info/brokers (webcrawler 5)

I) 6) Liondance
This is a page about the Chinese Lion Dance ...
http://elektron.et.tudelft.nl/~wingchun/Lion.html (webcrawler 6)

I) 7) LION - Ratesheets On Demand Information
FREQUENTLY ASKED QUESTIONS Close More Loans. How does LION help you do that? Testimonials. What do some of the thousands of brokers using LION say about it? ...
http://www.lioninc.com/info/ratesheets_on_demand (webcrawler 7)

I) 8) Philip Levine - They Feed They Lion
Philip Levine Out of burlap sacks, out of bearing butter, Out of black bean and wet slate bread, Out of the acids of rage, the candor of tar, Out of creosote, gasoline, drive shafts, wooden dollies, Th...
http://metalab.unc.edu/ipa/levine/lion.html (webcrawler 8)

I) 9) LION - Whodunit
FREQUENTLY ASKED QUESTIONS Close More Loans. How does LION help you do that? Testimonials. What do some of the thousands of brokers using LION say about it? ...
http://www.lioninc.com/info/whodunit (webcrawler 9)

I) 10) LION - BYTE Software Interface Entry Page
Welcome To The BYTE User Interface For LION Members Become a LION Member Get BYTE TQS software How To Use This Interface LION Homepage BYTE Homepage ...
http://www.lioninc.com/byte (webcrawler 10)

I) 11) The Lion King Image Archive: Links
Disney's The Lion King. Best Lion King Site on the Net! ...
http://www.concentric.net/~pretoris/theme1/links.html (webcrawler 11)

I) 12) LION - News Now Information
FREQUENTLY ASKED QUESTIONS Close More Loans. How does LION help you do that? Testimonials. What do some of the thousands of brokers using LION say about it? ...
http://www.lioninc.com/info/news_now (webcrawler 12)

I) 13) LION - About LION
ABOUT LION Welcome, and thanks for visiting LION! The brief explanation below is designed to direct you to the information that would be most helpful to you. ...

FIG. 43J http://www.lioninc.com/info/about_lion (webcrawler 13)

I) 14) To Catch a Lion
Hunting lions in Africa was originally published as "A contribution to the mathematical theory of big game hunting" in the American Mathematical Monthly in 1938 by "H. ...
http://www.servtech.com/~wkimler/humor/lion/lion.html (webcrawler 14)

I) 15) Raizens' Jason Raize Page: Links
Other Sites of Interest Jason Raize Sites: Lion King on Broadway Cast Sites: John Vickery Homepage &ob;info on the original Scar&cb; Lion King on Broadway Show Sites: ...
http://locket.net/raizens/links.html (webcrawler 15)

I) 16) LION - Close More Loans
FREQUENTLY ASKED QUESTIONS Close More Loans. How does LION help you do that? Testimonials. What do some of the thousands of brokers using LION say about it? ...
http://www.lioninc.com/info/close_more_loans (webcrawler 16)

I) 17) Crockett Johnson's Books: The Ellen Series
About Ellen's Lion, and the Lion's Own Story ...
http://www.cofc.edu/~nelp/purple/books/ellen.html (webcrawler 17)

I) 18) LION - LION Loan~Link Information
FREQUENTLY ASKED QUESTIONS Close More Loans. How does LION help you do that? Testimonials. What do some of the thousands of brokers using LION say about it? ...
http://www.lioninc.com/info/lion_loan_link (webcrawler 18)

I) 19) Disney.com - The Lion King Highlights at Disney
The Lion King II: Simba's Pride ...
http://disney.go.com/StarWatch/LionKing.html (webcrawler 19)

I) 20) Leo the Lion's Great Domain
If you can hear my ROARRRR, then you must be using... Let me ROAR again... ,Please! This site best heard with . . . Crescendo PLUS from LiveUpdate! ...
http://www.lionart.com/lionhart.htm (webcrawler 20)

I) 21) Chinese Dance-Lion Dance
The traditional Chinese Liondance is usually part of festivities and it is believed to bring happiness and luck, if well-performed. The lion is a holy animal and should be seen as a spirit that has its...
http://www.public.asu.edu/~tedcheng/emc598/598proj/lion.html (webcrawler 21)

I) 22) The Lion King WWW Archive
The world's largest repository for information and downloads from the Walt Disney Company's greatest triumph ever: The Lion King. Image, sound, text, and movie archives, plus scripts, stories, artwork,...
http://www.lionking.org/ (webcrawler 22)

I) 23) Mountain Lion (DesertUSA)
All about the Mountain Lion, includes color photos, scientific names, common names, description, behavior, range, habitats and life cycle. ...
http://www.desertusa.com/may96/du_mlion.html (webcrawler 23)

I) 24) Lion Eyes Books and Publishing
About Lion Eyes Books & Publishing In the Summer of 1997, in a Summer School class at Thousand Oaks High School, English teacher Bill Csellak gave an extra-credit assignment; to write a children's ...
http://www.lioneyesbooks.com/ (webcrawler 24)

I) 25) lion of babylon's home page
Lion of Babylon Logo Designed by Thomas Blakley OUR GOAL IS TO DISPEL MYTHS AND STEREOTYPES HELD AGAINST ARABS THROUGH EXPOSURE TO AND ACCURATE EDUCATION ON THE GENTLE AND SPLENDID CULTURE OF THE ARAB ...
http://home.fuse.net/lionofbabylon/ (webcrawler 25)

Query: tiger

I) 1) Tiger Woods Official Golf Website produced by CBS SportsLine...
tiger woods, sport, golf, pga tour, celebrity, cbs sportsline, Tiger Woods, Sport, Golf, PGA Tour, Celebrity, CBS SportsLine ...
http://www.tigerwoods.com/ (webcrawler 1)

I) 2) Tigger's Triumph Tiger Page
Welcome to Tigger's Triumph Tiger Web Page! Page last updated on Wednesday, April 14, 1999 Note - This page is dedicated to the new Triumph Tiger. If you have questions or need information about a vint...
http://www.mother.com/~eastrup/tiger/ (webcrawler 2)

I) 3) Club Tiger, The Tiger Woods Official Fan Club produced by CB...
tiger woods, sport, golf, pga tour, celebrity, cbs sportsline, Tiger Woods, Sport, Golf, PGA Tour, Celebrity, CBS SportsLine ...
http://www.clubtiger.com/ (webcrawler 3)

I) 4) TigerEyes.Com, A Cyberspace Tiger Reserve

FIG. 43K

Come on in to this online Tiger Reserve where you can learn a little something about the tiger. Features include a Mailing List, Preservation Fund, discussion, and chat... ...
http://www.tigereyes.com/ (webcrawler 4)

I) 5) Tiger Information Center
The Tiger Information Center is dedicated to providing information to help preserve the remaining five subspecies of tigers. To learn more about tigers, just click on one of the topics below. ...
http://www.5tigers.org/ (webcrawler 5)

I) 6) Sunbeam Tiger: The Anglo-American Dream
Sunbeam Tiger Home Page ...
http://www.corpdemo.com/tiger/ (webcrawler 6)

I) 7) Unofficial Tiger Woods Homepage
WELCOME! This is an unofficial Tiger Woods homepage! Tiger Woods is the athlete everyone's always talking about! This young talented man is said to be the best golfer in the world! ...
http://www.ewsonline.com/sports/tiger/index.html (webcrawler 7)

I) 8) internet tiger activists home
The Internet Tiger Activist are a group of people dedicated to the cause of saving the tiger from extinction. Using the power of the Internet to campaign against the forces that are acting against the ...
http://www.savetigers.org/ (webcrawler 8)

I) 9) Features-Mascot
Christine Larned This fall, the former Tower Hill mascot, the tiger, was reintroduced. Student reactions to the tiger are very divided. Many upper school students like the tiger because they feel that ...
http://www-2.tower-hill.pvt.k12.de.us/dial/iss2/tiger.html (webcrawler 9)

I) 10) Welcome to the Home of Cub Scout Pack 610 Viking Council, BS...
Cub Scout Pack 610 ...
http://www.jenrob.net/pack610/pack610_tigers.html (webcrawler 10)

I) 11) The Official Tiger Sportscars Website
Tiger Sportscars: Manufacturers of high quality, high performance sportscars and kitcars, including the Super Six, Cub, Cat E1, Storm and D-Type replica. Tiger Racing and Tiger Cars ...
http://www.tiger-sportscars.demon.co.uk/ (webcrawler 11)

I) 12) U.S. Census Bureau - TIGER/Line®
Detailed information about the TIGER/Line File, Overview, Technical Documentation, sample files, Cartographic Boundary files and other products based on the TIGER/Line files, with links to ordering inf...
http://www.census.gov/geo/www/tiger/ (webcrawler 12)

I) 13) U.S. Census Bureau - TIGER/Line®
Detailed information about the TIGER/Line File, Overview, Technical Documentation, sample files, Cartographic Boundary files and other products based on the TIGER/Line files, with links to ordering inf...
http://www.census.gov/geo/www/tiger/index.html (webcrawler 13)

I) 14) Tiger Tees' Service
Tiger Tees is a custom T-shirt screenprinting shop located in Houston, Texas. Tiger Tees does custom screenprinting for sports teams, health clubs, schools, churches and businesses. ...
http://www.tigertees.com/service.htm (webcrawler 14)

I) 15) What's New
New on our site Your source for the most current tiger news! Press release from the Wildlife Society of India (WPSI) reporting on the International Workshop on Conservation and Control of Trade in the ...
http://www.5tigers.org/new.htm (webcrawler 15)

I) 16) Tiger Tops Mountain Travel Nepal
Jungle Lodges, Himalayan Trekking and Rafting ...
http://www.tigermountain.com/ (webcrawler 16)

I) 17) INDONESIAN MYTH
This is a Malay folktale, which is one of the ancient folktales that was "saved" from extinction. A Dutch scholar, C. Hooykaas carried out his researches into Malay culture in the end of 19th century a...
http://www.st.rim.or.jp/~cycle/MYtigerE.HTML (webcrawler 17)

I) 18) Tiger Woods Live - Features - CBS SportsLine
Tiger Woods - CBS SportsLine ...
http://chat.sportsline.com/u/golf/open97/tiger/live/index.html (webcrawler 18)

I) 19) Mr Cat and Tiger
Mr. Cat showed Tiger, the neighborhood pooch, who's turf this is ...
http://www.inil.com/users/mikeycad/Tiger.html (webcrawler 19)

I) 20) About Tiger Tees
Tiger Tees is a custom T-shirt screenprinting shop located in Houston, Texas. Tiger Tees does custom screenprinting for sports teams, health clubs, schools, churches and businesses. ...
http://www.tigertees.com/tiger.htm (webcrawler 20)

FIG. 43L

I) 21) What Kind?
Chordata - Vertabrata - Mammalia - Carnivora - Felidae - Panthera - Tigris Please have patience with these, better images are on the way, I promise... eventually... ...
http://www.tigereyes.com/what_kind.htm (webcrawler 21)

I) 22) Tiger Salamander
The salamanders within the Ambystoma tigrinum complex cover a wide range of areas extending from coast to coast across the United States and into Canada. ...
http://www.npwrc.usgs.gov/narcam/idguide/atigrin.htm (webcrawler 22)

I) 23) The Adventures of Tiger the Kitten
ONCE UPON A TIME, there was a kitten named Tiger. I met Tiger in a photobooth in Boston. Nowadays we are the best of friends. This is our story. (Every underlined word or phrase takes you to an illustr...
http://www.tigerthekitten.com/ (webcrawler 23)

I) 24) WashingtonPost.com: The U.S. Open: Eye on the Tiger
Woods Gets Lesson at Congressional AFP Photo There will be no Grand Slam for Tiger Woods in 1997, thanks to an unforgiving Congressional Country Club course that gave him fits all weekend. ...
http://www.washingtonpost.com/wp-srv/sports/golf/longterm/usopen/... (webcrawler 24)

I) 25) Download Census TIGER '95 Data
ArcData Online is ESRI's Internet Mapping and Data Site. You can use ArcData Online to make free maps and download selected data. ...
http://www.esri.com/data/online/tiger/ (webcrawler 25)

Query: elephant

I) 1) The Absolut Elephant home page Elephant Consultance
FAQ: Frequently asked questions about elephants, and provided answers. Glossary: Glossary and definitions terminology explanations. Consultant: Elephant consultant managing and training elephants. ...
http://www.elephant.se/main.htm (webcrawler 1)

I) 2) The Elephant Information Repository
The best source on the internet for anything about elephants! This includes elephant links, elephant news, elephant conservation, and an in-depth look at the Elephant. ...
http://elephant.elehost.com/ (webcrawler 2)

I) 3) Elephanteria
Welcome to WildHeart(r) Productions' Elephanteria A Smorgasbord of Elephantine Delights Please be a little patient. There are seven animations on this page to load. ...
http://www.wildheart.com/ (webcrawler 3)

I) 4) Elephant Software, Makers of Elephant Tracks, the Cure for I...
Sorry, we are no longer offering Elephant Tracks. We're leaving the rest of this page for now as a "tombstone". Do you waste a lot of time finding your way back to web pages which you've alre...
http://elephantsoftware.com/default.asp (webcrawler 4)

I) 5) More Elephant Jokes
Q: Why do elephants float down the river on their backs? A: So they won't get their tennis shoes wet. Q: How do you get an elephant out of a tree? A: Stand it on a leaf and wait until Autumn. ...
http://aoife.indigo.ie/~cronews/elep2.html (webcrawler 5)

I) 6) Elephant Jokes
Bray, County Wicklow, Ireland Elephant Jokes So Far, You have been reading Elephant Jokes for this long Q: What does Tarzan say when he sees a herd of elephants in the distance? ...
http://aoife.indigo.ie/~cronews/elep.html (webcrawler 6)

I) 7) EMOA - Elephant Management and Owners Association, Rhino and...
Elephant Management and Owners Association, EMOA incorporates elephant owners and managers into a single association that promotes, monitors and advises on the management, conservation and welfare of t...
http://www.emoa.org.za/ (webcrawler 7)

I) 8) The absolut elephant links
Reload your browser if this date is over two weeks old! General information: Links about Captiveand Wildelephants. Elephanthome pages and elephants in the human cul ture(with photos ) Report dead link ...
http://www.elephant.se/links.htm (webcrawler 8)

I) 9) Elephant jokes
Q: What's grey on the inside and pink and white on the outside? A: An inside out elephant. Q: What is grey and not there. A: No elephants. Q: Why are elephants large, grey and wrinkled? ...
http://www.bestiary.com/moose/humour/elephant.html (webcrawler 9)

I) 10) National Zoo Elephant Cam - Single Image Page
If you are watching this, please drop us a line. Just put EleCam in the Subject line. This picture is a live shot inside the Elephant House. Just hit REFRESH or RELOAD to get a new picture. ...
http://www.si.edu/organiza/museums/zoo/hilights/webcams/molerat1/... (webcrawler 10)

I) 11) National Zoo Amazing Updating JAVA Elephant Cam

FIG. 43M

Asian Elephant Artificial Insemination April 11, 12, 13 Live Elephant Demo Daily at 11:30 a.m. Eastern Time & Outdoor Elephant Cam Visit the Elephant House ...
http://www.si.edu/organiza/museums/zoo/hilights/webcams/molerat1/... (webcrawler 11)

I) 12) News of Elephants in Thailand
Elephant Nature Park, dedicated to the cultural protection and animal conservation in Thailand. ...
http://www.thaifocus.com/elephant/news/index.htm (webcrawler 12)

I) 13) National Zoo Amazing Updating Elephant Cam - Auto-Refresh Pa...
The picture should automatically reload every 20 seconds during daylight hours! If it doesn't, you probably need to change your cache settings. In Internet Explorer you go to View - Options - Advanced ...
http://www.si.edu/organiza/museums/zoo/hilights/webcams/molerat1/... (webcrawler 13)

I) 14) Glass Wings: Elephant Nouveau
Q: How can you tell if an elephant has been on the golf course? A: By the foot prints in your putter. Q: How many elephants does it take to change a lightbulb? ...
http://www.glasswings.com.au/jolly/ellies.html (webcrawler 14)

I) 15) National Zoo Audio Tour - Elephant Rumbles
Elephant Communication STOP 8 ELEPHANT RUMBLES The elephant is the largest land mammal left on the earth. And even though the association between man and elephant is nearly as long as recorded history,...
http://www.si.edu/organiza/museums/zoo/map/tsfiles/elerub.htm (webcrawler 15)

I) 16) Quotes About Elephant Tracks
"Brilliant, I want it." - B.B. "What an innovative and useful idea!" - J.F. "Your program is perfectly suited for a guy like me with virtually no -- what's the word? -- short term memory!" - T.K. ...
http://elephantsoftware.com/Quotes.htm (webcrawler 16)

I) 17) Alf Erickson's Elephant Polo Page
(Featuring the Screwy Tuskers) Every year in December I travel with my Screwy Tuskers team to the annual tournament of the World Elephant Polo Association. ...
http://www.corkscrew-balloon.com/polo/ (webcrawler 17)

I) 18) Elephant Contest Index Page
Tuskar announces By: Hannah Buschert Elephants like to play when they are young. Elephants give birth every 4 to 5 years. Elephants always stay together in a herd. ...
http://www.webcom.com/~iwcwww/volunteers/contest/index.htm (webcrawler 18)

I) 19) Bruce Clay - Specializing In Bringing New Software Products ...
Bruce Clay - Specializing In Bringing New Software Products To Market - Free Estimates ...
http://www.bruceclay.com/elephant.htm (webcrawler 19)

I) 20) National Zoo Elephant House
The National Zoo Elephant House gives you a virtual tour of our large mammal facility. You can learn more about our elephants, rhinos and giraffes. There is an audio tour, slide-illustrated audio lectu...
http://www.si.edu/organiza/museums/zoo/zooview/exhibits/elehouse/... (webcrawler 20)

I) 21) INDIA: Wildlife - elephants
Wildlife in India - Meet The Elephant Text: Sudhamai Regunathan (Discover India magazine) Looks come with a premium. Even before the majestic jumbo was domesticated, it was revered by man as one of the...
http://www.incore.com/india/wildlife.elephant.html (webcrawler 21)

I) 22) AdventureIndia: Elephant Safaris
Elephant Safaris in India and Nepal, notably the Royal Chitwan National Park and the Corbett National Park in Uttar Pradesh. Domesticated Elephants are also available for hire in many Indian Cities. Ot...
http://www.adventureindia.com/elephant.html (webcrawler 22)

I) 23) Elephant Web Ring home page
Welcome, I am Dan Koehl, ringmaster ofthe Elephant Web Ring - a webringconnecting people and home pages with the topic elephants. If you have a home page with substancial information about elephants, p...
http://www.elephant.se/webring.htm (webcrawler 23)

I) 24) African Elephant Tours - Group Travel by luxury coach in Sou...
Tour operator and consultants on group travel and individual trips through South Africa, Namibia, Botswana, Zimbabwe and Malawi. Luxury coach charter available. ...
http://www.african-elephant-tours.co.za/ (webcrawler 24)

I) 25) Dan's pub: Catching an Elephant
author unknown MATHEMATICIANS hunt elephants by going to Africa, throwing out everything that is not an elephant, and catching one of whatever is left. ...
http://www.netspace.org/~dmacks/pub/lists/catching-elephants.html (webcrawler 25)

Query: animal

I) 1) The World-Wide Web Virtual Library: Animal health, well-bein...
Outstanding animal-related pages, including focus on the armadillo, badger, bat, bear, bird, poultry, bison, cat, cheetah, cow, coyote, crocodile, alligator, dog, dolphin, elephant, elk, ferret, fish, ...
http://www.tiac.net/users/sbr/animals.html (webcrawler 1)

FIG. 43N

I) 2) Animal Planet
Animal Planet's web site includes information on your favorite tv shows, animal cams, crocodile hunter, animal stories and more! ...
http://animal.discovery.com/animal.html (webcrawler 2)

I) 3) FREE animal sex
free animal sex pictures, thousands of farm pix! ...
http://crystal.nu/ (webcrawler 3)

I) 4) World Animal Net
World Animal Net: a worldwide network of societies campaigning to improve the status and welfare of animals ...
http://www.worldanimal.net/ (webcrawler 4)

I) 5) Animal Rights Resource Site
THIS SITE UNDERWRITTEN IN PART BY: Further financial support has been provided through a grant from the International Fund for Animal Welfare. The views and opinions expressed within this page are not ...
http://arrs.envirolink.org/ (webcrawler 5)

I) 6) MIT Students for the Ethical Treatment of Animals
The purpose of the MIT Students for the Ethical Treatment of Animals (SETA) is to foster awareness of various issues related to animal rights and welfare, such as the use of animals in experiments and ...
http://www.mit.edu:8001/activities/seta/home.html (webcrawler 6)

I) 7) The Carcinogenic Potency Project (CPDB)
The Carcinogenic Potency Database (CPDB) is a widely used resource on the results of chronic, long-term animal cancer tests. It provides a single, standardized and easily accessible database that inclu...
http://potency.berkeley.edu/cpdb.html (webcrawler 7)

I) 8) Dog and cat no-kill animal shelter
The League for Animal Welfare Here are some additional animal-loving sites to visit. However, the League for Animal Welfare does not take any responsibilty for the views and opinions exressed on these ...
http://www.lfaw.org/links.htm (webcrawler 8)

I) 9) Domestic Animal Endocrinology
Abstracts / Search / Indexes Authors Editors Editorial board Electronic Submissions Instructions to authors Letter from the Editor Manuscript Review Form Papers published Reviewers Status of manuscript...
http://www.ag.auburn.edu/dae/dae.html (webcrawler 9)

I) 10) Animal Talk Sun Signes
Your pet or animal's astrological & psychological profile. " It's like having your own pet's instruction manual. It makes the job of fitting the animal to the owner ten times easier than befor...
http://www.lifeintl.com/pets%20and%20animals.htm (webcrawler 10)

I) 11) Other Animal Rights Websites
This page provides access to groups and organizations with homepages residing on remote servers or on EnviroLink. Animal Defense League Nationally active, grassroots-oriented, animal liberation organiz...
http://arrs.envirolink.org/organizations/arsites.html (webcrawler 11)

I) 12) NAPA - Exotic Animal Pet Laws/Legislation/Political Links
Legislation Exotic/Alternative Pet Links ...
http://www.altpet.net/legal.shtml (webcrawler 12)

I) 13) Animal Friends Online -- The Life Savers
A no-kill shelter in Pittsburgh, Animal Friends Online also provides information and LINKS to enhance the human-animal bond. ...
http://trfn.clpgh.org/animalfriends/ (webcrawler 13)

I) 14) Anti Links
Steve Jackson's Personal Web Portal, Jackson's Archery Hunting Page, Javascript Ballistic Calculator, Kinetic Energy, Message Board, Archery Hunting Books, Links, Cams, Digital, Cordic, HP48, guitars ...
http://home.att.net/~sajackson/archery16.html (webcrawler 14)

I) 15) Jim Powlesland's Hunting Page
Why Animals Have No Rights Carl Cohen explains membership in a moral community. Eating Meat is Natural The health and moral aspects of eating meat. ...
http://www.acs.ucalgary.ca/~powlesla/personal/hunting/rights/inde... (webcrawler 15)

I) 16) Lupie
Breed: White and Multi-colored DMH Age: 1 year Sex/Status: Neutered Male Adoption Information: $35.00 adoption fee $ 8.00 Rabies vaccination fee $43.00 TOTAL FEE ...
http://www.redsuspenders.com/~hswayne/adoptapet/lupie.htm (webcrawler 16)

I) 17) Adoption Program DUPC
How the Program Works Each year a particular animal from each species will be highlighted. For instance,

Figure 43O:
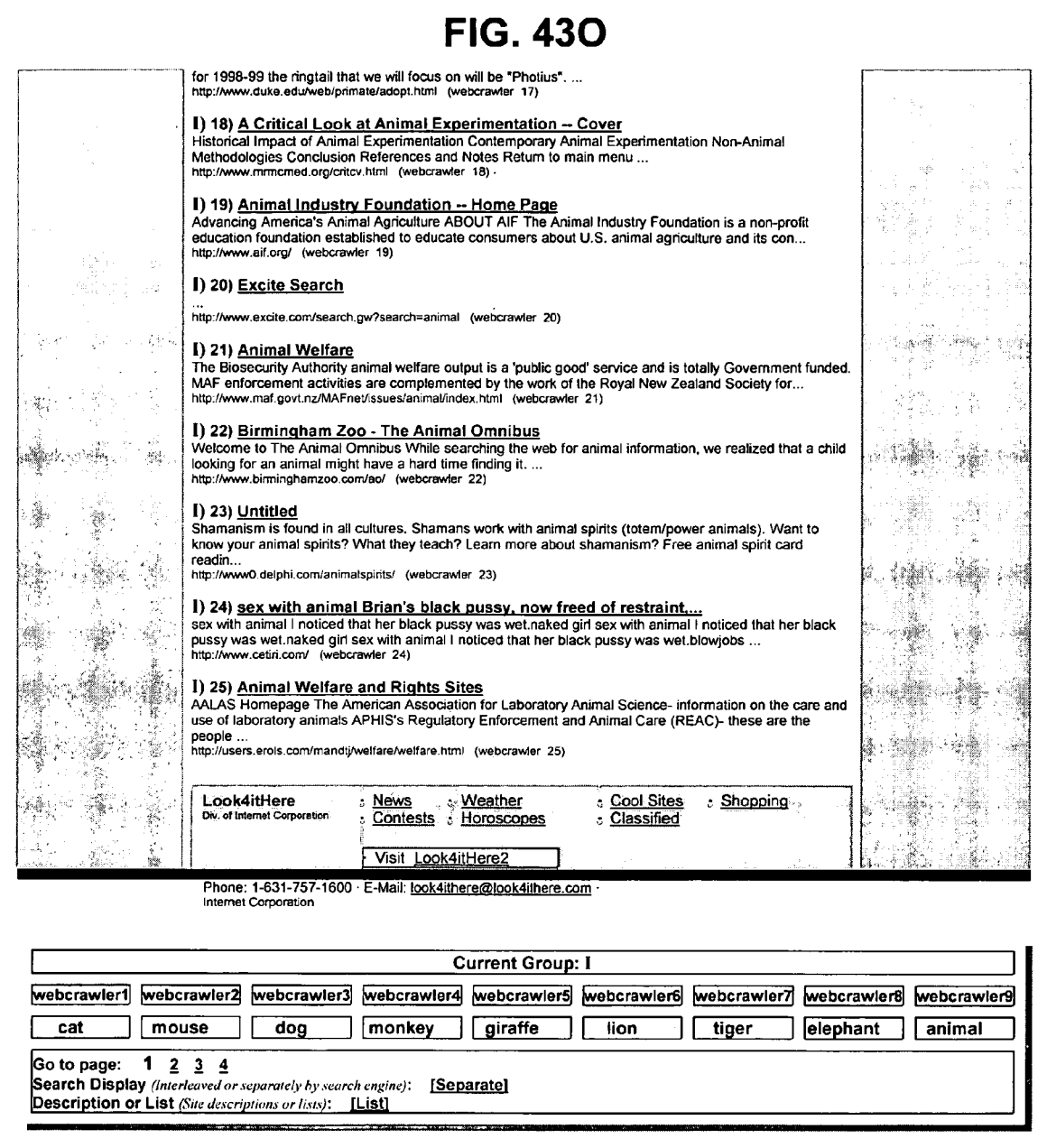

FIG. 43O for 1998-99 the ringtail that we will focus on will be "Photius". ...
http://www.duke.edu/web/primate/adopt.html (webcrawler 17)

I) 18) A Critical Look at Animal Experimentation -- Cover
Historical Impact of Animal Experimentation Contemporary Animal Experimentation Non-Animal Methodologies Conclusion References and Notes Return to main menu ...
http://www.mrmcmed.org/critcv.html (webcrawler 18)

I) 19) Animal Industry Foundation -- Home Page
Advancing America's Animal Agriculture ABOUT AIF The Animal Industry Foundation is a non-profit education foundation established to educate consumers about U.S. animal agriculture and its con...
http://www.aif.org/ (webcrawler 19)

I) 20) Excite Search
...
http://www.excite.com/search.gw?search=animal (webcrawler 20)

I) 21) Animal Welfare
The Biosecurity Authority animal welfare output is a 'public good' service and is totally Government funded. MAF enforcement activities are complemented by the work of the Royal New Zealand Society for...
http://www.maf.govt.nz/MAFnet/issues/animal/index.html (webcrawler 21)

I) 22) Birmingham Zoo - The Animal Omnibus
Welcome to The Animal Omnibus While searching the web for animal information, we realized that a child looking for an animal might have a hard time finding it. ...
http://www.birminghamzoo.com/ao/ (webcrawler 22)

I) 23) Untitled
Shamanism is found in all cultures. Shamans work with animal spirits (totem/power animals). Want to know your animal spirits? What they teach? Learn more about shamanism? Free animal spirit card readin...
http://www0.delphi.com/animalspirits/ (webcrawler 23)

I) 24) sex with animal Brian's black pussy, now freed of restraint,...
sex with animal I noticed that her black pussy was wet.naked girl sex with animal I noticed that her black pussy was wet.naked girl sex with animal I noticed that her black pussy was wet.blowjobs ...
http://www.cetiri.com/ (webcrawler 24)

I) 25) Animal Welfare and Rights Sites
AALAS Homepage The American Association for Laboratory Animal Science- information on the care and use of laboratory animals APHIS's Regulatory Enforcement and Animal Care (REAC)- these are the people ...
http://users.erols.com/mandtj/welfare/welfare.html (webcrawler 25)

Look4itHere
Div. of Internet Corporation
News Weather Cool Sites Shopping
Contests Horoscopes Classified
Visit Look4itHere2

Phone: 1-631-757-1600 · E-Mail: look4ithere@look4ithere.com ·
Internet Corporation

Current Group: I

| | | | | | | | | |
|---|---|---|---|---|---|---|---|---|
| webcrawler1 | webcrawler2 | webcrawler3 | webcrawler4 | webcrawler5 | webcrawler6 | webcrawler7 | webcrawler8 | webcrawler9 |
| cat | mouse | dog | monkey | giraffe | lion | tiger | elephant | animal |

Go to page: 1 2 3 4
Search Display *(Interleaved or separately by search engine)*: [Separate]
Description or List *(Site descriptions or lists)*: [List]

FIG. 44A

BuyerSellers

Search4 it: Search your favorite sellers, all at the same time*

[ ] Search * Only 1 entry required

Amazon Borders BarnesandNoble Books Webcrawler Altavista Lycos Infoseeknbsp Yahoo

February 6, 1998
NEWS ABC NEWS Headlines

U.S. Presence Growing in Iraq

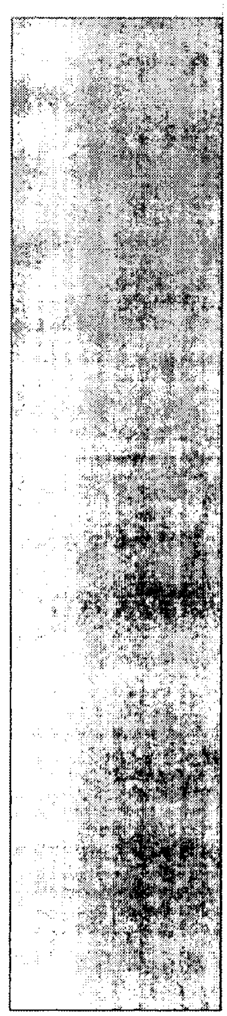

Search Engine Report
Query: sports

I) 1) 1 Hunter
Usually ships in 2-3 days
Pat Hutchins / Hardcover / Published 1982
Amazon Price: $12.75 ~ You Save: $4.25 (25%)...
http://www.amazon.com/exec/obidos/ASIN/0688006140/qid=950414125/s... (amazon 1)

I) 2) Have a Nice Day! A Tale of Blood and Sweatsocks
In-Stock: Ships within 24 hours.
Mick Foley,Mankind,Foreword by Jim Ross / Hardcover / HarperTrade / October 1999
B&N Price: $13.00 ~ You Save 50%...
http://shop.barnesandnoble.com/booksearch/isbnInquiry.asp?userid=... (barnesandnoble 1)

I) 3) 1 ° AABUU ACAMAC I OFFICIAL BLACK BELT RANK of Martial Arts Sports ALL of (12 VHS)
...
http://www.amazon.com/exec/obidos/ASIN/1587537001/qid=950414125/s... (amazon 2)

I) 4) The Rock Says...: The Most Electrifying Man in Sports-Entertainment
In-Stock: Ships within 24 hours.
The Rock,Joe Layden, the Rock / Hardcover / HarperCollins Publishers, Incorporated / January 2000
B&N Price: $13.00 ~ You Save 50%...
http://shop.barnesandnoble.com/booksearch/isbnInquiry.asp?userid=... (barnesandnoble 2)

I) 5) 1,001 Baseball Questions Your Friends Can't Answer
Usually ships in 24 hours
Dom Forker / Mass Market Paperback / Published 1997
Amazon Price: $4.79 ~ You Save: $1.20 (20%)...
http://www.amazon.com/exec/obidos/ASIN/0451191323/qid=950414125/s... (amazon 3)

I) 6) When Pride Still Mattered: A Life of Vince Lombardi
In-Stock: Ships within 24 hours.
David Maraniss / Hardcover / Simon & Schuster Trade / September 1999
B&N Price: $13.00 ~ You Save 50%...
http://shop.barnesandnoble.com/booksearch/isbnInquiry.asp?userid=... (barnesandnoble 3)

I) 7) 10 Wooden Boats You Can Build : For Sail, Motor, Paddle and Oar (The Woodenboat Series)
Usually ships in 24 hours
Peter H. Spectre(Editor) / Paperback / Published 1995
Amazon Price: $19.96 ~ You Save: $4.99 (20%)...
http://www.amazon.com/exec/obidos/ASIN/0937822345/qid=950414125/s... (amazon 4)

I) 8) And the Crowd Goes Wild
In-Stock: Ships within 24 hours.
Joe Garner,Wayne Gretzky (Afterword),Narrated by Bob Costas / Hardcover / Sourcebooks, Incorporated / September 1999
B&N Price: $34.96 ~ You Save 30%...
http://shop.barnesandnoble.com/booksearch/isbnInquiry.asp?userid=... (barnesandnoble 4)

I) 9) The 10-Minute Snook Book
Usually ships in 24 hours
John McLean / Paperback
Amazon Price: $7.95 ...
http://www.amazon.com/exec/obidos/ASIN/0967084407/qid=950414125/s... (amazon 5)

I) 10) ESPN SportsCentury
In-Stock: Ships within 24 hours.
Chris Berman,Michael MacCambridge (Editor),David Halberstam (Introduction) / Hardcover / Hyperion / February 2000
B&N Price: $28.00 ~ You Save 30%...
http://shop.barnesandnoble.com/booksearch/isbnInquiry.asp?userid=... (barnesandnoble 5)

I) 11) 100 Athletes Who Shaped Sports History
Usually ships in 24 hours
Timothy Jacobs, Vadim Vahrameev (Illustrator) / Paperback / Published 1994

FIG. 44B

Amazon Price: $7.95 ...
http://www.amazon.com/exec/obidos/ASIN/0912517131/qid=950414125/s... (amazon 6)

I) 12) Into Thin Air: A Personal Account of the Mount Everest Disaster
In-Stock: Ships within 24 hours.
Jon Krakauer / Mass Market Paperback / Doubleday & Company, Incorporated / April 1998
B&N Price: $3.99 ~ You Save 50%...
http://shop.barnesandnoble.com/booksearch/isbnInquiry.asp?userid=... (barnesandnoble 6)

I) 13) 100 Boat Designs Reviewed : Design Commentaries by the Experts (Woodenboat)
Usually ships in 2-3 days
Peter H. Spectre(Editor) / Paperback / Published 1997
Amazon Price: $19.96 ~ You Save: $4.99 (20%)...
http://www.amazon.com/exec/obidos/ASIN/0937822442/qid=950414125/s... (amazon 7)

I) 14) The Hungry Ocean: A Swordboat Captain's Journey
In-Stock: Ships within 24 hours.
Linda Greenlaw / Hardcover / Hyperion / May 1999
B&N Price: $16.06 ~ You Save 30%...
http://shop.barnesandnoble.com/booksearch/isbnInquiry.asp?userid=... (barnesandnoble 7)

I) 15) 100 Classic Backcountry Ski & Snowboard Routes in Washington
Usually ships in 24 hours
Rainer Burgdorfer, Rainer Burgdofer / Paperback / Published 1999
Amazon Price: $14.36 ~ You Save: $3.59 (20%)...
http://www.amazon.com/exec/obidos/ASIN/0898866618/qid=950414125/s... (amazon 8)

I) 16) Dave Pelz's Short Game Bible: Master the Finesse Swing and Lower Your Score
In-Stock: Ships within 24 hours.
Dave Pelz,James A. Frank / Hardcover / Broadway Books / May 1999
B&N Price: $21.00 ~ You Save 30%...
http://shop.barnesandnoble.com/booksearch/isbnInquiry.asp?userid=... (barnesandnoble 8)

I) 17) 100 Fast & Easy Boat Improvements
Usually ships in 24 hours
Don Casey / Hardcover / Published 1998
Amazon Price: $15.37 ~ You Save: $6.58 (30%)...
http://www.amazon.com/exec/obidos/ASIN/0070134022/qid=950414125/s... (amazon 9)

I) 18) River Horse: A Voyage across America
In-Stock: Ships within 24 hours.
William Least Heat-Moon,William Least Heat-Moon / Hardcover / Houghton Mifflin Company / October 1999
B&N Price: $18.20 ~ You Save 30%...
http://shop.barnesandnoble.com/booksearch/isbnInquiry.asp?userid=... (barnesandnoble 9)

I) 19) 100 Greatest Basketball Players of All Time
Usually ships in 24 hours
Alex Sachare / Paperback / Published 1997
Amazon Price: $8.49 ~ You Save: $1.50 (15%)...
http://www.amazon.com/exec/obidos/ASIN/0671011685/qid=950414125/s... (amazon 10)

I) 20) Chicken Soup for the Golfer's Soul: 101 Stories of Insight, Inspiration and Laughter on the Links
In-Stock: Ships within 24 hours.
Jack Canfield,Mark Victor Hansen,Jeff Aubery,Mark Donnelly,Chrissy Donnelly / Paperback / Health Communications, Inc. / May 1999
B&N Price: $10.36 ~ You ...
http://shop.barnesandnoble.com/booksearch/isbnInquiry.asp?userid=... (barnesandnoble 10)

No Results Found for sports in borders2 within 10 seconds!

BuyerSellers
Div. of Internet Corporation
News Weather CoolSites Shopping
Contests Horoscopes Classified
Visit BuyerSellers

FIG. 45B

...
http://www.openchannel.se/links.htm (lycos 5)

I) 16) A Base for Televisions
Resources on television sets, product reviews and tv guides. TV comparison, buying color and digital television sets online. ...
http://www.nanana.com/televisions.html (webcrawler 6)

I) 17) Homepage of Eternal Word Television Network, Global Catholic Network
Eternal Word Television Network (EWTN) featuring Catholic Q and A, a Catholic Document Library, an Audio Library, Catholic News, programming... ...
http://www.ewtn.com/ (altavista 6)

I) 18) Project Television
Film, television, and video production company in Australia....
http://www.ozemail.com.au/%7eprojectv/ (lycos 6)

I) 19) Independent Television Service ITVS Films Programs Public TV...
Independent Television Service ITVS provides funding, production & promotion of independent filmmaking for public television documentaries, narratives, interstitial & childrenÕs programming. ...
http://www.itvs.org/ (webcrawler 7)

I) 20) Alabama Public Television - Your Place for the Best Music and Drama, Children
Text only. Austin City Limits 6 Sunday at 6:00pm. Masterpiece Theatre! – Madame Bovary 6 Sunday at 9:00pm. The Greeks: Crucible of Civilization 9... ...
http://www.aptv.org/ (altavista 7)

I) 21) Canadian Television Fund
Set up by Government and Cable Industry...
http://www.canadiantelevisionfund.ca/eng/index.htm (lycos 7)

I) 22) History of Film, Video, and Television
Brief History of Film, Video, and Television Technology Eadweard Muybridge shoots a series of motion photographs, which can be viewed by mounting them to a stroboscopic disc. ...
http://www.soundsite.com/history/filmhis.html (webcrawler 8)

I) 23) Academy of Television Arts & Sciences
No Frames or Java Index. Full Site Index. It is recommended that you set your monitor's resolution at 800 x 600 and the color depth at thousands (16... ...
http://www.emmys.org/ (altavista 8)

I) 24) Television Commercials
World's largest television commercials library. View and order online....
http://televisioncommercials.com/ (lycos 8)

I) 25) History Television
Welcome to History Television Online, the web site of Canada's History Television network. This site offers detailed information about programs and movies on the channel, an extensive library of histor...
http://www.historytelevision.ca/ (webcrawler 9)

I) 26) Jordan Radio and Television Corp. Official Web Site
Check out the pictorial site of the Jordanian nature 7:30 Every Day, a New Comedy on Channel 2. 8:30 Every Day, a New Drama on Channel 2. New Morning... ...
http://www.jrtv.com/ (altavista 9)

I) 27) Classic Film and Television
Reviews of classic movies and television shows....
http://members.aol.com/MG4273/film.htm (lycos 9)

I) 28) Katz Television GroupKatz Television Group
Jim Beloyianis Michael Hugger Katz Television Group is composed of three separate sales companies, strategically structured to meet the different needs of our client television stations and to ensure K...
http://www.katz-media.com/tv/tv.htm (webcrawler 10)

I) 29) Channel 2 (KTCA-TV) Twin Cities Public Television, Inc.
Find information on all of your favorite PBS shows, as well as our local productions and outreach for parents, teachers and kids.... ...
http://www.ktca.org/ (altavista 10)

I) 30) Second opinion? Try searching for "television" at
...
http://www.lycos.com/hotbot-redirect.html?query=television (lycos 10)

Look4itHere
Div. of Internet Corporation

News | Weather | Cool Sites | Shopping
Contests | Horoscopes | Classified

Visit Look4itHere

FIG. 46B

I) 11) Wayne State Univ. - Graduate Program in Sports Admin.
Check the entrance requirements of this Detroit school's graduate sports administration program, and review the curriculum highlights....
http://www.hpr.wayne.edu/Sports%20Administration%20.html (looksmart 6)

I) 12) Sports Fans of America
Site dedicated to improving the quality of sports fan issues through media presence, petitions and calls to appropriate parties....
http://www.sportsfansofamerica.com/ (infoseek 6)

I) 13) Nando Sports Server
Sports resource provides news, features and columns on sports worldwide. Includes statistics and photographs updated daily....
http://www.SportServer.com/ (looksmart 7)

I) 14) Nando SportServer
Top stories, scores, photos, team info, commentary, predictions, and live sports chat....
http://www.sportserver.com/ (infoseek 7)

I) 15) Sports Illustrated For Kids
Online edition of the popular kids magazine includes games, stories, interviews with sports personalities, polls, and lots more....
http://www.sikids.com/ (looksmart 8)

I) 16) Sports Betting Games
Registration for betting on line, free play areas and links to other casinos and Java games....
http://www.sportsbettinggames.com/ (infoseek 8)

I) 17) Shopping
...
http://209.185.142.203/entry.jsp?p=looksmart (looksmart 9)

I) 18) Sports Medicine and Orthopedic Surgery with Dr. Stuart Zeman
Read about some of the most common orthopedic complaints, or directly discuss your specific problem with Dr. Zeman for a fee....
http://www.sports-medicine.com/ (infoseek 9)

I) 19) Sports Schedules As You Like 'Em
Customizable schedules for pro sports including hockey, football, soccer, baseball, basketball, and indoor lacrosse....
http://www.cs.rochester.edu/u/ferguson/schedules/ (looksmart 10)

I) 20) ABC.com
...
http://abc.go.com (infoseek 10)

I) 21) Disabled Sports USA
Access sports details, programs, legal information, as well as position statements and Update newsletter....
http://www.dsusa.org/~dsusa/ (looksmart 11)

I) 22) Sports Gaming Network
News, cheats, demos, articles, forums, interviews, patches and polls....
http://www.sports-gaming.com/ (infoseek 11)

I) 23) Sports Media Challenge
Consulting firm offers marketing services and advice to athletes, coaches, and administrators. Peruse news updates, case studies, and products....
http://sports.mediachallenge.com/ (looksmart 12)

I) 24) Sporting News
The online version of the print publication. Includes scores, stories, experts, chat, and trivia....
http://www.sportingnews.com/ (infoseek 12)

I) 25) Cleveland State University - Sports Management
Provides an overview of the master's degree programs in sports management and/or exercise science. Includes course descriptions....
http://www.csuohio.edu/sport_management/csu_homepage.html (looksmart 13)

I) 26) Spanish Sport Online
A site for sports in Spain....
http://www.sport.es/ (infoseek 13)

I) 27) Q Sports International
Agency performs sports marketing services for Olympic athletes. Read its athlete updates, and check out its sponsorship FAQs....
http://www.execpc.com/qsportsinternational (looksmart 14)

I) 28) Silly Sports Pro Football News
Free picks, handicapping advice, stats, power ratings and links....
http://www.sillysports.com/ (infoseek 14)

FIG. 46C

I) 29) San Francisco Gate: Sports
Live results, stats, games, headline stories and featured sportswriters from the San Francisco Chronicle and Examiner....
http://www.sfgate.com/sports/ (infoseek 15)

Query: television

I) 1) Television Broadcast Online Weekly
News and developments in the broadcast/television industry, coming out every Monday. Covering technology and production....
http://www.tvbroadcast.com/ (looksmart 1)

I) 2) Thinking Allowed
TV series and video collection featuring some of the world's leading teachers, writers....
http://www.thinking-allowed.com/ (infoseek 1)

I) 3) JVC Color Televisions
13 Inch Screens | 20 Inch Screens | 27 Inch Screens | 32 Inch Screens | 36 Inch Screens | TV/VCR Combination | D-Series 1998 Product Archive A/V Receivers | Cassette Decks | CD...
http://www.jvc-america.com/color_televisions/color_televisions.ht... (hotbot 1)

I) 4) Antelope Valley Television Magazine
Find subscription details for this local television listings guide. Divided into sections titled Sports Week, Movie Week, and Soap Opera Review....
http://www.avpress.com/vp/tv.htm (looksmart 2)

I) 5) UCLA School of Theatre, Film and Television
Information about the school and its facilities....
http://www.tft.ucla.edu/ (infoseek 2)

I) 6) Wholesale Sony televisions, wholesale Sony camcorders, wholesale Sony projection
We show you wholesale (dealer cost) on Sony televisions, Sony camcorders, Sony projection televisions, Sony big screens, Sony vcrs, Sony dvds, Sony stereos and Sony xbr. We then...
http://www.4cost.com/text/sony/sony.htm (hotbot 2)

I) 7) Classic Television
Pays tribute to cult and cartoon classic television shows, runs a fanclub directory, and lists links to old shows. Join the discussion forum....
http://www.classictelevision.com/ClassicHome.html (looksmart 3)

I) 8) Sony
Behemoth boasts everything from music and movies, to technologies of tomorrow....
http://www.sony.com/ (infoseek 3)

I) 9) NASA Television on CU-SeeMe
NASA Television Coverage on CU-SeeMe NASA TV CU-SeeMe feed into the Internet - NASA Glenn Research Center In North America, the NTV reflectors are: 192.149.89.23 at the NASA...
http://btree.lerc.nasa.gov/NASA_TV/NASA_TV.html (hotbot 3)

I) 10) Dutch Cable Television
View live images from 20 broadcast stations serving the Netherlands and Europe. Includes a control panel....
http://www.casema.nl/radioentv/frame_tvnu.htm (looksmart 4)

I) 11) SoccerTV.com
Guide to televised soccer worldwide....
http://www.soccertv.com/ (infoseek 4)

I) 12) The Museum of Television & Radio: Here you can watch and listen to over 100,000
A nonprofit museum founded by William S. Paley to collect and preserve television and radio programs and to make them available to the public....
http://www.mtr.org/ (hotbot 4)

I) 13) Columbia Community Television
Follow the links to public access television stations around Oregon from this Columbia county community television center....
http://cctv.columbia-center.org/ (looksmart 5)

I) 14) Society of Motion Picture & TV Engineers
Membership based society that holds conferences, publishes journals, and has discussions on what impacts motion picture and TV engineers....
http://www.smpte.org/ (infoseek 5)

I) 15) Television Stations
ABC News Asian Newswatch BBC News About Science CBS News Up To The Minute Headlines CBS - TV WCVB News WHDH News C-SPAN Court TV Law Center Discovery Channel ESPN Fox News Fox...
http://apocalypse.berkshire.net/~quaboag/tv.html (hotbot 5)

FIG. 46D

I) 16) Television Chat
Join the Television Community by chatting about favorite shows. Check out the weekly schedule....
http://communities.msn.com/television/chat.asp (looksmart 6)

I) 17) PBS Online
Learning services, program listings, the PBS store, and the home pages of many PBS series, including Masterpiece Theatre, Reading Rainbow, Nova, and Frontline. Special section for kids....
http://www.pbs.org/ (infoseek 6)

I) 18) Television Pointers
Here are some pointers to information/data about television that I have found interesting. It is not meant to be definitive in any way. If you know of any other general sites (as...
http://www.cs.cmu.edu/afs/cs.cmu.edu/user/clamen/misc/tv/README.h... (hotbot 6)

I) 19) Fenn, Sherilyn - TVNow's Television Listings
Television addicts can get the monthly lowdown on Sherilyn's television appearances. Features a program review, plus time and network schedules....
http://www.tv-now.com/stars/fenn.html (looksmart 7)

I) 20) Parents Television Council
Group that aims "to (deliver) America s demand for positive, family-oriented television programming to the entertainment industry."...
http://www.parentstv.org/ (infoseek 7)

I) 21) Television Schedules of the World
site, which contains schedules, program information, people on TV and much more! CLICK HERE to go to TV SHOW...
http://www.buttle.com/tv/schedule.htm (hotbot 7)

I) 22) Independent Television Service
Bring independently produced programs that involve creative risks or advanced issues to television. Browse shows, a press room, and awards....
http://www.itvs.org/home/index.html (looksmart 8)

I) 23) Guinea Pig TeleVision
This live cam is focused on a couple of guinea pigs and is updated every thirty minutes....
http://www.olywa.net/jandrews/beta.htm (infoseek 8)

I) 24) Orbit Satellite Television and Radio Network - home page
The entry page to Orbit Communication's Web site. The Orbit Satellite Television and Radio Network offers you over 40 services of premier programming including Hollywood...
http://www.orbit.net/ (hotbot 8)

I) 25) Independent Television Service
Solicits and finances proposals from independent producers with ideas for innovative public television programs....
http://www.actwin.com/ITVS/index.html (looksmart 9)

I) 26) National Museum Of Photography, Film And Television
Nearly a million visitors each year come to this visual media museum in Bradford, England....
http://www.nmsi.ac.uk/nmpft/ (infoseek 9)

I) 27) Buy Name Brand Electronics Wholesale - Televisions. No Gimmicks. Check it Out!
B&R Wholesale is the Nation's Premier Online Store. Computers/Office Equipment, Electronics, Sporting Goods, Tools, and Miscellaneous sections! Shipped to your front door with full...
http://brwholesaleproducts.com/elect2.htm (hotbot 9)

I) 28) Jones Mobile Television
Arkansas company offers a mobile television truck for location shooting and productions. View a ground plan and pictures of the truck....
http://www.jmtv.com/ (looksmart 10)

I) 29) ABCNEWS.com
...
http://abcnews.go.com (infoseek 10)

I) 30) Royal Philips Electronics
How about Royal Philips Electronics...
http://www.philips.com/ (hotbot 10)

I) 31) New York Television
Producing television and video projects for clients such as MTV, HBO, and the Olympics. Read a newsletter, search the site, and find contacts....
http://www.nytv.com/ (looksmart 11)

I) 32) National Cable Television Institute
Large independent provider of broadband communications training....
http://www.ncti.com/ (infoseek 11)

I) 33) Blair Broadcast Designs Scenery for Television

FIG. 46E

Portfolio of designs for television....
http://www.blairbroadcastdesigns.com (hotbot 11)

I) 34) Paper Tiger Television
Public access television show and video producers offer a full catalog to order from. Gives news and events updates....
http://www.papertiger.org/ (looksmart 12)

I) 35) National Cable Television Association
Tour the site and learn all about Cable Technology, Cable Programming and New Developments in the Industry....
http://www.ncta.com/ (infoseek 12)

I) 36) Live Television from around the world
Live television broadcasts are available from a number of countries including Belgium, Croatia, Canada, France, Germany, United States and the UK from this site....
http://broadcast-live.com/television/ (hotbot 12)

I) 37) Paramount Television
Provides links to official sites for its leading television programs, plus links to members of the Paramount Stations Group....
http://www.paramount.com/hometv.html (looksmart 13)

I) 38) FIAT/IFTA - International Federation of Television Archives
83-member nonprofit association of television archives heads; based in Rome, Italy....
http://www.nbr.no/fiat/fiat.html (infoseek 13)

I) 39) Artists' Television Access
Non-profit media access facility in San Francisco....
http://www.atasite.org (hotbot 13)

I) 40) Port Angeles Television Productions
Provider of broadcast quality professional video services for film and television. Get contact information and a list of recent clients....
http://www.patv.com/ (looksmart 14)

I) 41) NBC.com
NBC TV's Home on the Web. Broadcast schedules, plus show and star information....
http://www.nbc.com/ (infoseek 14)

I) 42) AllExperts Guide to Television
Ask a volunter expert about most television programs. Site lists a lot of other subjects as well...
http://www.allexperts.com/default.asp?heading=22 (hotbot 14)

I) 43) Television Antenna Factory
See photographs of this southern Chinese company whose speciality is manufacturing television antenna....
http://www.qiaohua.com.cn/html/pro01.html (looksmart 15)

I) 44) NASA Television
Real-time coverage of agency activities and missions. Links to schedule and World Wide Web broadcast sources. ...
http://www.nasa.gov/ntv/ (infoseek 15)

I) 45) DanceSportAmerica: Ballroom & DanceSport on Television
DanceSport America's mission is to develop and manage the sport of competitive ballroom dancing into a dominant sports/entertainment franchise....
http://www.dancesportamerica.com/index1.html (hotbot 15)

Look4itHere
Div. of Internet Corporation

News | Weather | Cool Sites | Shopping
Contests | Horoscopes | Classified

Visit Look4itHere2

Phone: 1-631-757-1600 · E-Mail: look4ithere@look4ithere.com ·
Internet Corporation

| Current Group: I | | | | | Next Group: II | | | |
|---|---|---|---|---|---|---|---|---|
| looksmart1 | infoseek2 | looksmart3 | infoseek4 | hotbot5 | yahoo6 | excite7 | dejanews8 | webcrawler9 |
| sports | sports | television | television | television | television | television | television | television |

Go to page: 1 2 3 4 5 6 7 8 9 10
Search Display *(Interleaved or separately by search engine)*: [Separate]
Description or List *(Site descriptions or lists)*: [List]

FIG. 47B

Find the Weather for any City, State or Zipcode, or Country. Language. English. Afrikaans. Bulgarian. Byelorussian. Chinese (Simp) Chinese (Trad)... ...
http://wunderground.dogpile.com/ (altavista 3)

I) 9) ABC Weather
Covers US, Canadian weather, and international weather. Features include forcast, current conditions, summary, national radar, and weather warnings....
http://www.abc.net/cgi-bin/hw/hamweather.cgi (lycos 3)

I) 10) Connecticut Weather
Back To Connecticut CT Links: Business Listings Classifieds News Town USA National Preferred Customers Featured State Connecticut USA Maps Town USA USA Weather Town USA Advertisers Arcade Domain Hostin...
http://www.town-usa.com/connecticut/ctweather.html (webcrawler 4)

I) 11) The Sioux City Journal - Weather
The Sioux City Journal Online provides complete local coverage of news, sports, entertainment, weather and more for the tri-state area including... ...
http://www.siouxcityjournal.com/weather.html (altavista 4)

I) 12) The Weather Channel - Home & Garden
...
http://www.weather.com/gardening/ (lycos 4)

I) 13) COLA/IGES Weather & Climate Images
Current Analyses and Forecasts from the NCEP (NWS) provided by COLA/IGES. GIF files of all current maps are available by anonymous FTP. COLA and IGES make no guarantees about and bear no responsibility...
http://grads.iges.org/pix/head.html (webcrawler 5)

I) 14) Taipei TW Weather Forecast
Taipei TW Weather Forecast... ...
http://weather.yahoo.com/forecast/Taipei_TW_c.html (altavista 5)

I) 15) Weather For You
Forecasts for over 9,000 U.S. locations. Also informative weather resources, information on independent weather stations, weather by e-mail, current conditions and more....
http://www.weatherforyou.com (lycos 5)

I) 16) Hotlist: Weather Science
Online Exhibits Weather Right Now World Weather Watch -- Interactive Weather Project, register your class Background Information National Weather Service Office Descriptions and Addresses of Department...
http://sln.fi.edu/tfi/hotlists/weather.html (webcrawler 6)

I) 17) Landings: Every Weather Link Known... Aviation Weather for Pilots and Weather
LANDINGS - aviation meeting place featuring: aviation news, up to date aviation databases (FAA Regulations, AIM, SDRs, NTSB Briefs, N Numbers and... ...
http://www.landings.com/_landings/pages/weather.html (altavista 6)

I) 18) Weather Advisory Browser
Weather Advisory Browser allows access to all the current National Weather Server advisories, watches, and warnings....
http://weather.terrapin.com/ (lycos 6)

I) 19) Weather Links
Here you can find the general forecast for your vicinity to in-depth meteorological analyses of weather conditions across Pennsylvania and elsewhere. ...
http://www.psu.edu/weather/weather.html (webcrawler 7)

I) 20) Cape Cod Times | Weather
Weather and marine forecasts for Cape Cod & the Islands, including satellite images and weather maps.... ...
http://www.capecodonline.com/weather.htm (altavista 7)

I) 21) Weather Map Symbols
...
http://weather.unisys.com/info/wxp_legend.gif (lycos 7)

I) 22) Weather
This weather gateway is back online with some modifications to more efficiently use the studlier weather server at the University of Michigan (which we have been using since October 1995). ...
http://www.mit.edu:8001/weather (webcrawler 8)

I) 23) GLACIER: Weather- -- Meetamet
Dr. David Bromwich wears many hats. He heads the Polar Meteorology Group of the Byrd Polar Research Center at The Ohio State University and is an... ...
http://www.glacier.rice.edu/weather/3_meetamet.html (altavista 8)

I) 24) Scato Search Weather
Get a local or international weather forecast in realtime here today, just by entering your zip code....

FIG. 47C http://www.scato.com/weather/ (lycos 8)

Figure 47C:
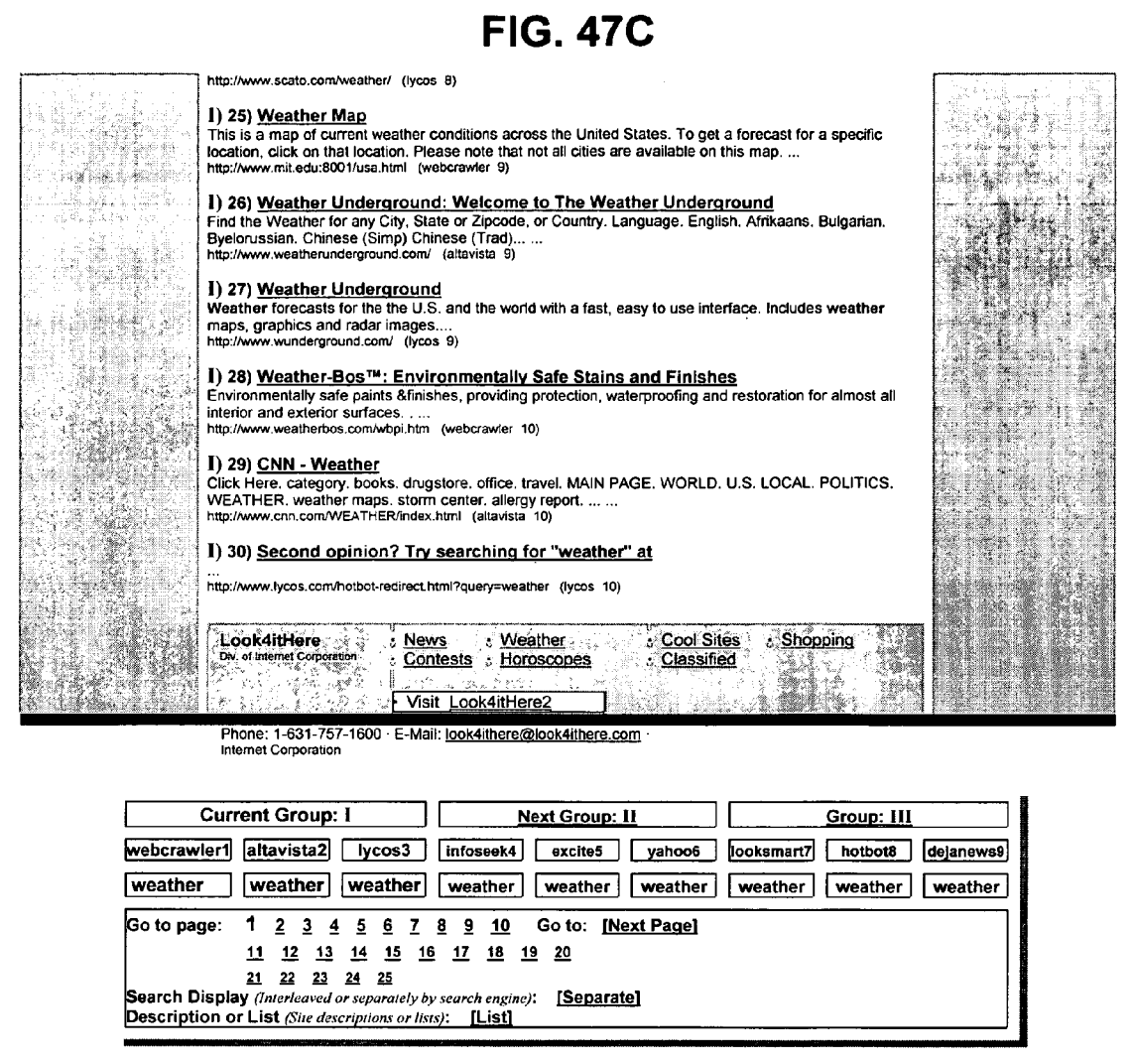

I) 25) Weather Map
This is a map of current weather conditions across the United States. To get a forecast for a specific location, click on that location. Please note that not all cities are available on this map. ...
http://www.mit.edu:8001/usa.html (webcrawler 9)

I) 26) Weather Underground: Welcome to The Weather Underground
Find the Weather for any City, State or Zipcode, or Country. Language. English. Afrikaans. Bulgarian. Byelorussian. Chinese (Simp) Chinese (Trad)... ...
http://www.weatherunderground.com/ (altavista 9)

I) 27) Weather Underground
Weather forecasts for the the U.S. and the world with a fast, easy to use interface. Includes weather maps, graphics and radar images....
http://www.wunderground.com/ (lycos 9)

I) 28) Weather-Bos™: Environmentally Safe Stains and Finishes
Environmentally safe paints &finishes, providing protection, waterproofing and restoration for almost all interior and exterior surfaces. . ...
http://www.weatherbos.com/wbpi.htm (webcrawler 10)

I) 29) CNN - Weather
Click Here. category. books. drugstore. office. travel. MAIN PAGE. WORLD. U.S. LOCAL. POLITICS. WEATHER. weather maps. storm center. allergy report. ... ...
http://www.cnn.com/WEATHER/index.html (altavista 10)

I) 30) Second opinion? Try searching for "weather" at
...
http://www.lycos.com/hotbot-redirect.html?query=weather (lycos 10)

Look4itHere
Div. of Internet Corporation

News · Weather · Cool Sites · Shopping
Contests · Horoscopes · Classified

Visit Look4itHere2

Phone: 1-631-757-1600 · E-Mail: look4ithere@look4ithere.com ·
Internet Corporation

| Current Group: I | | | Next Group: II | | | Group: III | | |
|---|---|---|---|---|---|---|---|---|
| webcrawler1 | altavista2 | lycos3 | infoseek4 | excite5 | yahoo6 | looksmart7 | hotbot8 | dejanews9 |
| weather | weather | weather | weather | weather | weather | weather | weather | weather |

Go to page: 1 2 3 4 5 6 7 8 9 10 Go to: [Next Page]
11 12 13 14 15 16 17 18 19 20
21 22 23 24 25
Search Display *(Interleaved or separately by search engine)*: [Separate]
Description or List *(Site descriptions or lists)*: [List]

FIG. 48B complete Lycos Web catalog Keyword Author Title News > WeatherReference > Searchable Databases > News > WeatherRecr...
http://www.lycos.com/srch/more.html?lpv=1&type=websites&query=weather&first=1

I) 1) UM Weather
Welcome to UM Weather, the Internet's premier source of weather information. Providing access to thousands of forecasts, images, and the Net's largest collection of weather links, UM Weather is the mos...
http://cirrus.sprl.umich.edu/wxnet/ (webcrawler 1)

I) 2) Weather Page
Forecast for Tuesday, August 10, 1999. Updated 21:14 ET August 10, 1999. MSNBC Weather is provided by AccuWeather. Find other cities. United States.... ...
http://www.msnbc.com/news/WEA_Front.asp (altavista 1)

I) 3) CNN Weather
Comprehensive weather news from around the world, updated frequently....
http://www.cnn.com/WEATHER/ (lycos 1)

I) 4) The Weather Page
Department of Commerce National Oceanic and Atmospheric Administration NOAA Sources of Weather Information: General information on NOAA programs and offices ...
http://www.esdim.noaa.gov/weather_page.html (webcrawler 2)

I) 5) @marillo Globe-News: Weather
... ...
http://weather.amarillonet.com/weather/weather.html (altavista 2)

I) 6) InfoBrand Weather Service
provides custom weather information to portal sites, ISPs and wireless devices...
http://www.infobrand.com/weather (lycos 2)

I) 7) Interactive Weather Information Network
Get your Weather from the source – The National Weather Service's (NWS) Internet data source....Weather.GOV ....Bookmark address is: http://weather.gov ...
http://iwin.nws.noaa.gov/iwin/main.html (webcrawler 3)

I) 8) Welcome to tahoe.com | Visitor Info | Weather
Vistor Guide • General Info • Reservations • Gallery • Weddings. Area Guides • South Lake Tahoe • Tahoe City • Incline Village • Truckee • Carson. ...
http://www.tahoe.com/weather/index.html (altavista 3)

I) 9) Weather at eTopix
Links to sites for weather forecasts, severe weather news and information, marine weather, and aviation weather and information, primarily for the US and Canada....
http://www.etopix.com/html/weather.html (lycos 3)

I) 10) Connecticut Weather
Back To Connecticut CT Links: Business Listings Classifieds News Town USA National Preferred Customers Featured State Connecticut USA Maps Town USA USA Weather Town USA Advertisers Arcade Domain Hostin...
http://www.town-usa.com/connecticut/ctweather.html (webcrawler 4)

I) 11) Weather Underground: Welcome to The Weather Underground
Find the Weather for any City, State or Zipcode, or Country. Language. English. Afrikaans. Bulgarian. Byelorussian. Chinese (Simp) Chinese (Trad)... ...
http://wunderground.dogpile.com/ (altavista 4)

I) 12) ABC Weather
Covers US, Canadian weather, and international weather. Features include forcast, current conditions, summary, national radar, and weather warnings....
http://www.abc.net/cgi-bin/hw/hamweather.cgi (lycos 4)

I) 13) COLA/IGES Weather & Climate Images
Current Analyses and Forecasts from the NCEP (NWS) provided by COLA/IGES. GIF files of all current maps are available by anonymous FTP. COLA and IGES make no guarantees about and bear no responsibility...
http://grads.iges.org/pix/head.html (webcrawler 5)

I) 14) KWTV 9 - The Weather Center
Our staff... Gary England, Chief Meteorologist. Susan Ghere, Assistant to Gary England. Paul Bouchereau, Staff Meteorologist. Brady Brus, Staff... ...
http://9online.com/wx/wxcenter.htm (altavista 5)

I) 15) The Weather Channel - Home & Garden
...
http://www.weather.com/gardening/ (lycos 5)

FIG. 48C

I) 16) Hotlist: Weather Science
Online Exhibits Weather Right Now World Weather Watch -- Interactive Weather Project, register your class Background Information National Weather Service Office Descriptions and Addresses of Department...
http://sln.fi.edu/tfi/hotlists/weather.html (webcrawler 6)

I) 17) The Sioux City Journal - Weather
The Sioux City Journal Online provides complete local coverage of news, sports, entertainment, weather and more for the tri-state area including... ...
http://www.siouxcityjournal.com/weather.html (altavista 6)

I) 18) Weather For You
.Forecasts for over 9,000 U.S. locations. Also informative weather resources, information on independent weather stations, weather by e-mail, current conditions and more....
http://www.weatherforyou.com (lycos 6)

I) 19) Weather Links
Here you can find the general forecast for your vicinity to in-depth meteorological analyses of weather conditions across Pennsylvania and elsewhere. ...
http://www.psu.edu/weather/weather.html (webcrawler 7)

I) 20) Taipei TW Weather Forecast
Taipei TW Weather Forecast... ...
http://weather.yahoo.com/forecast/Taipei_TW_c.html (altavista 7)

I) 21) Weather Advisory Browser
Weather Advisory Browser allows access to all the current National Weather Server advisories, watches, and warnings....
http://weather.terrapin.com/ (lycos 7)

I) 22) Weather
This weather gateway is back online with some modifications to more efficiently use the studlier weather server at the University of Michigan (which we have been using since October 1995). ...
http://www.mit.edu:8001/weather (webcrawler 8)

I) 23) Landings: Every Weather Link Known... Aviation Weather for Pilots and Weather
LANDINGS - aviation meeting place featuring: aviation news, up to date aviation databases (FAA Regulations, AIM, SDRs, NTSB Briefs, N Numbers and... ...
http://www.landings.com/_landings/pages/weather.html (altavista 8)

I) 24) Weather Map Symbols
...
http://weather.unisys.com/info/wxp_legend.gif (lycos 8)

I) 25) Weather Map
This is a map of current weather conditions across the United States. To get a forecast for a specific location, click on that location. Please note that not all cities are available on this map. ...
http://www.mit.edu:8001/usa.html (webcrawler 9)

I) 26) CNN - Weather - Big Rapids, MI
4 day weather forecast for Big Rapids, MI.... ...
http://cnn.com/WEATHER/html/BigRapidsMI.html (altavista 9)

I) 27) Scato Search Weather
Get a local or international weather forecast in realtime here today, just by entering your zip code....
http://www.scato.com/weather/ (lycos 9)

I) 28) Weather-Bos™: Environmentally Safe Stains and Finishes
Environmentally safe paints &finishes, providing protection, waterproofing and restoration for almost all interior and exterior surfaces. . ...
http://www.weatherbos.com/wbpl.htm (webcrawler 10)

I) 29) $2^{40}$ Teragram Corporation
...
http://www.teragram.com/ (altavista 10)

I) 30) Weather Underground
Weather forecasts for the the U.S. and the world with a fast, easy to use interface. Includes weather maps, graphics and radar images....
http://www.wunderground.com/ (lycos 10)

Look4itHere
Div. of Internet Corporation

News | Weather | Cool Sites | Shopping
Contests | Horoscopes | Classified

Visit Look4itHere2

FIG. 49B

Query: universities

I) 1) Associated Universities, Inc. (AUI)
Associated Universities, Inc. (AUI) Associated Universities, Inc., (AUI) is a not-for-profit corporation based in Washington, DC. It was founded in... ...
http://www.aui.edu/ (altavista 1)

I) 2) Find Universties and Colleges at Universities.com
An index of international college and university school resources on the web. Includes links to the web pages of over 4,000 college and university... ...
http://www.universities.com/ (altavista 2)

I) 3) Universities Space Research Association
USRA Internal Page -- For internal use only. NEW. USRA Ethics and Compliance Policy. USRA Membership Information. USRA Scholarship Program. USRA... ...
http://www.usra.edu/ (altavista 3)

I) 4) Yorkshire and Humberside Universities Association
Yorkshire and Humberside Universities Association YHUA promotes collaboration among higher education providers in the Yorkshire and Humberside Region ...
http://www.yhua.ac.uk/ (altavista 4)

I) 5) UCAS(Universities and Colleges Admissions Service) Homepage
UCAS is the UK central organisation through which applications are processed for entry to higher education, providing information and services to... ...
http://www.ucas.ac.uk/ (altavista 5)

I) 6) Association of American Colleges and Universities
Association of American Colleges and Universities: the national higher education association committed to making the aims of liberal learning a... ...
http://www.aacu-edu.org/ (altavista 6)

I) 7) Colleges and Universities - Canada
Colleges and Universities - Canada. Christina DeMello. Reproduction and distribution are permissible for non-profit purposes... ...
http://www.mit.edu:8001/people/cdemello/ca.html (altavista 7)

I) 8) State Universities Retirement System of Illinois [SURS]
State Universities Retirement System of Illinois. Mission Statement. The mission of the State Universities Retirement System (SURS) is to: (1)... ...
http://www.surs.com/ (altavista 8)

I) 9) Egyptian Universities Network (EUN)
The Egyptian Universities Network (EUN) acts as the Internet service provider since 1993, concentrating mainly on the Egyptian Universities and the... ...
http://www.frcu.eun.eg/ (altavista 9)

I) 10) $2^{40}$ Teragram Corporation
...
http://www.teragram.com/ (altavista 10)

Query: training

I) 1) Training & Motivational Consulting Co.
Motivational training, sales training and recruiting....
http://trainingmotivation.com/ (lycos 1)

I) 2) Training and Professional Development
Communication training, software training and training products by The Woodham Group, Inc. in Georgia....
http://TheWoodhamGroup.com/ (lycos 2)

I) 3) Scuba Training and Equipment Sales
Thorough and informative site about scuba training....
http://www.underwatered.com (lycos 3)

I) 4) Pact Training
Interactive training in conflict management, stress management and managing diversity. Drama-based training in leadership development and human dynamics....
http://www.Pact-Training.com (lycos 4)

I) 5) The Sporting Eye - Sports Vision Training Solutions
The Sporting Eye offers sports vision training for athletes. Choose from one of four Vision Training Packages or our Eye Aerobics At-Home Sports Vision Training Program....
http://www.sportingeye.com (lycos 5)

I) 6) Eastern Training Seminars, Inc.
Corporate training programs....
http://www.etsinternet.com/ (lycos 6)

I) 7) Extant Training Group

FIG. 49C

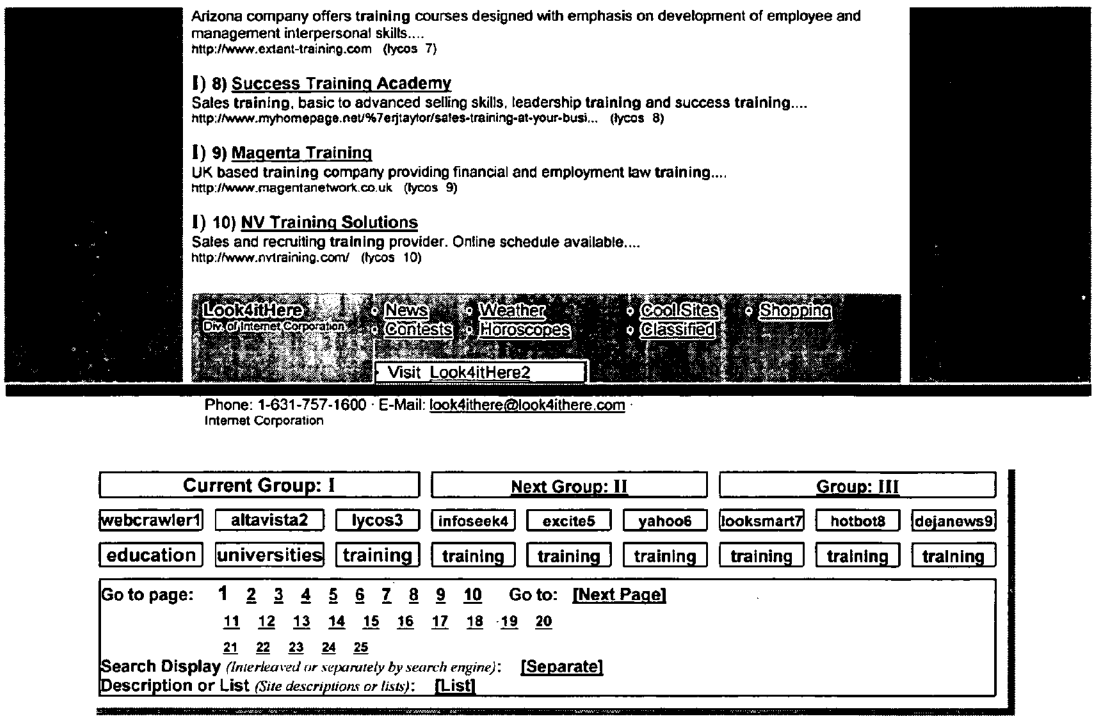

```
http://galaxy.einet.net/galaxy/Social-Sciences/Education.html
  File Not Found!

http://putwest.boces.org/Standards.html

It has taken the Internet Corporation On-Line Spider 0.872 seconds to spider http://putwest.boces.org

     Shortened Title (125 Characters)=Developing Educational Standards: Overview

     Full Title=Developing Educational Standards: Overview

     Short Body (First 1000 Characters)= Standards What's New? By state By subject area US Government

     Body (First 10000 Characters)= Standards What's New? By state By subject area US Government Othe

     Subdirectory=/database/p for putwest.boces.org/Standards.html.html

http://www.uwex.edu/disted/home.html

It has taken the Internet Corporation On-Line Spider 3.216 seconds to spider http://www.uwex.edu/dist

     Shortened Title (125 Characters)=Developing Educational Standards: Overview

     Full Title=Developing Educational Standards: Overview

     Short Body (First 1000 Characters)=

     Body (First 10000 Characters)=
```

FIG. 49D

```
     Subdirectory=/database/u for www.uwex.edu/disted/home.html.html

http://scitsc.wlv.ac.uk/ukinfo/uk.map.html

It has taken the Internet Corporation On-Line Spider 2.628 seconds to spider http://scitsc.wlv.ac.uk/

     Shortened Title (125 Characters)= UK Sensitive Map Universities Version 5

     Full Title= UK Sensitive Map Universities Version 5

     Short Body (First 1000 Characters)= University of Wolverhampton UK Sensitive Maps Universities H

     Body (First 10000 Characters)= University of Wolverhampton UK Sensitive Maps Universities HE Col

     Subdirectory=/database/s for scitsc.wlv.ac.uk/ukinfo/uk.map.html.html

http://education.indiana.edu/cas/adol/adol.html

It has taken the Internet Corporation On-Line Spider 0.548 seconds to spider http://education.indiana

     Shortened Title (125 Characters)=ADOL

     Full Title=ADOL

     Short Body (First 1000 Characters)= Adolescence Directory OnLine (ADOL) is an electronic guide t

     Body (First 10000 Characters)= Adolescence Directory OnLine (ADOL) is an electronic guide to inf

     Subdirectory=/database/e for education.indiana.edu/cas/adol/adol.html.html

http://www.chem.vt.edu/chem-ed/vt-chem-ed.html
  File Not Found!

http://www-hpcc.astro.washington.edu/scied/physics.html
  File Not Found!

http://www.hood.edu/seri/serihome.htm

It has taken the Internet Corporation On-Line Spider 3.550 seconds to spider http://www.hood.edu/seri

     Shortened Title (125 Characters)=SERI Special Education Resources on the Internet

     Full Title=SERI Special Education Resources on the Internet

     Short Body (First 1000 Characters)= Special Education Resources on the Internet Special Educatio

     Body (First 10000 Characters)= Special Education Resources on the Internet Special Education Res

     Subdirectory=/database/h for www.hood.edu/seri/serihome.htm.html

http://www.scit.wlv.ac.uk/ukinfo/uk.map.html

It has taken the Internet Corporation On-Line Spider 0.589 seconds to spider http://www.scit.wlv.ac.u

     Shortened Title (125 Characters)= UK Sensitive Map Universities Version 5

     Full Title= UK Sensitive Map Universities Version 5

     Short Body (First 1000 Characters)= University of Wolverhampton UK Sensitive Maps Universities H

     Body (First 10000 Characters)= University of Wolverhampton UK Sensitive Maps Universities HE Col

     Subdirectory=/database/s for www.scit.wlv.ac.uk/ukinfo/uk.map.html.html
```

FIG. 49E http://www.mayo.edu/education/education.html

It has taken the Internet Corporation On-Line Spider 0.570 seconds to spider http://www.mayo.edu/educ Shortened Title (125 Characters)=Mayo Clinic Education Full Title=Mayo Clinic Education Short Body (First 1000 Characters)= Mayo Education Medical School Graduate School of Medicine Gr Body (First 10000 Characters)= Mayo Education Medical School Graduate School of Medicine Graduat Subdirectory=/database/m for www.mayo.edu/education/education.html.html http://www.aui.edu/

It has taken the Internet Corporation On-Line Spider 0.231 seconds to spider http://www.aui.edu/.

Shortened Title (125 Characters)=Associated Universities, Inc. (AUI)

Full Title=Associated Universities, Inc. (AUI)

Short Body (First 1000 Characters)= Associated Universities, Inc. (AUI) Associated Universities, Body (First 10000 Characters)= Associated Universities, Inc. (AUI) Associated Universities, Inc.

Subdirectory=/database/a for www.aui.edu/.html http://www.universities.com/

It has taken the Internet Corporation On-Line Spider 1.628 seconds to spider http://www.universities.

Shortened Title (125 Characters)=Find Universties and Colleges at Universities.com Full Title=Find Universties and Colleges at Universities.com Short Body (First 1000 Characters)= Universities.com Home|Search|Login|Communicate|View Links Un Body (First 10000 Characters)= Universities.com Home|Search|Login|Communicate|View Links Univers Subdirectory=/database/u for www.universities.com/.html http://www.usra.edu/

It has taken the Internet Corporation On-Line Spider 0.390 seconds to spider http://www.usra.edu/.

Shortened Title (125 Characters)=Universities Space Research Association

Full Title=Universities Space Research Association

Short Body (First 1000 Characters)= USRA Internal Page For internal use only. NEW USRA Ethics an Body (First 10000 Characters)= USRA Internal Page For internal use only. NEW USRA Ethics and Com Subdirectory=/database/u for www.usra.edu/.html http://www.yhua.ac.uk/

It has taken the Internet Corporation On-Line Spider 0.710 seconds to spider http://www.yhua.ac.uk/.

Shortened Title (125 Characters)=Yorkshire and Humberside Universities Association

FIG. 49F

Full Title=Yorkshire and Humberside Universities Association

Short Body (First 1000 Characters)= The Yorkshire and Humberside Universities' Association provi Body (First 10000 Characters)= The Yorkshire and Humberside Universities' Association provides a Subdirectory=/database/y for www.yhua.ac.uk/.html http://www.ucas.ac.uk/

It has taken the Internet Corporation On-Line Spider 1.142 seconds to spider http://www.ucas.ac.uk/.

Shortened Title (125 Characters)=UCAS(Universities and Colleges Admissions Service) Homepage Full Title=UCAS(Universities and Colleges Admissions Service) Homepage Short Body (First 1000 Characters)= Universities, colleges courses Advice centre Facts and figur Body (First 10000 Characters)= Universities, colleges courses Advice centre Facts and figures st Subdirectory=/database/u for www.ucas.ac.uk/.html http://www.aacu-edu.org/

It has taken the Internet Corporation On-Line Spider 3.371 seconds to spider http://www.aacu-edu.org/

Shortened Title (125 Characters)=UCAS(Universities and Colleges Admissions Service) Homepage Full Title=UCAS(Universities and Colleges Admissions Service) Homepage Short Body (First 1000 Characters)=

Body (First 10000 Characters)=

Subdirectory=/database/a for www.aacu-edu.org/.html http://www.mit.edu:8001/people/cdemello/ca.html It has taken the Internet Corporation On-Line Spider 0.337 seconds to spider http://www.mit.edu:8001/

Shortened Title (125 Characters)=Colleges and Universities Canada

Full Title=Colleges and Universities Canada

Short Body (First 1000 Characters)=Colleges and Universities Canada Please give me a few days t Body (First 10000 Characters)=Colleges and Universities Canada Academy Canada Acadia University Subdirectory=/database/m for www.mit.edu:8001/people/cdemello/ca.html.html http://www.surs.com/

It has taken the Internet Corporation On-Line Spider 0.477 seconds to spider http://www.surs.com/.

Shortened Title (125 Characters)=State Universities Retirement System of Illinois /[SURS/]

Full Title=State Universities Retirement System of Illinois /[SURS/]

Short Body (First 1000 Characters)= State Universities Retirement System of Illinois Mission Sta Body (First 10000 Characters)= State Universities Retirement System of Illinois Mission Statemen Subdirectory=/database/s for www.surs.com/.html

FIG. 49G http://www.frcu.eun.eg/

It has taken the Internet Corporation On-Line Spider 1.083 seconds to spider http://www.frcu.eun.eg/.

Shortened Title (125 Characters)=Egyptian Universities Network (EUN)

Full Title=Egyptian Universities Network (EUN)

Short Body (First 1000 Characters)= The Egyptian Universities Network (EUN) acts as the Internet Body (First 10000 Characters)= The Egyptian Universities Network (EUN) acts as the Internet serv Subdirectory=/database/f for www.frcu.eun.eg/.html http://www.teragram.com/

It has taken the Internet Corporation On-Line Spider 0.205 seconds to spider http://www.teragram.com/

Shortened Title (125 Characters)=Egyptian Universities Network (EUN)

Full Title=Egyptian Universities Network (EUN)

Short Body (First 1000 Characters)=

Body (First 10000 Characters)=

Subdirectory=/database/t for www.teragram.com/.html http://trainingmotivation.com/

It has taken the Internet Corporation On-Line Spider 0.165 seconds to spider http://trainingmotivatio Shortened Title (125 Characters)=Training Motivation Full Title=Training Motivation Short Body (First 1000 Characters)= TMCC, INC. Training Motivation Consulting Co. PMB: #101, 167

Body (First 10000 Characters)= TMCC, INC. Training Motivation Consulting Co. PMB: #101, 1670 So.

Subdirectory=/database/t for trainingmotivation.com/.html http://TheWoodhamGroup.com/

It has taken the Internet Corporation On-Line Spider 2.909 seconds to spider http://TheWoodhamGroup.c Shortened Title (125 Characters)=VanDerGraff has 1001 ways to get you on line.

Full Title=VanDerGraff has 1001 ways to get you on line.

Short Body (First 1000 Characters)= The URL you requested is currently under construction. Pleas Body (First 10000 Characters)= The URL you requested is currently under construction. Please boo Subdirectory=/database/t for TheWoodhamGroup.com/.html http://www.underwatered.com It has taken the Internet Corporation On-Line Spider 0.956 seconds to spider http://www.underwatered.

FIG. 49H

Shortened Title (125 Characters)=VanDerGraff has 1001 ways to get you on line.

Full Title=VanDerGraff has 1001 ways to get you on line.

Short Body (First 1000 Characters)= The URL you requested is currently under construction. Pleas Body (First 10000 Characters)= The URL you requested is currently under construction. Please boo Subdirectory=/database/u for www.underwatered.com.html http://www.Pact-Training.com It has taken the Internet Corporation On-Line Spider 1.409 seconds to spider http://www.Pact-Training Shortened Title (125 Characters)=VanDerGraff has 1001 ways to get you on line.

Full Title=VanDerGraff has 1001 ways to get you on line.

Short Body (First 1000 Characters)= The URL you requested is currently under construction. Pleas Body (First 10000 Characters)= The URL you requested is currently under construction. Please boo Subdirectory=/database/p for www.Pact-Training.com.html http://www.sportingeye.com It has taken the Internet Corporation On-Line Spider 1.573 seconds to spider http://www.sportingeye.c Shortened Title (125 Characters)=VanDerGraff has 1001 ways to get you on line.

Full Title=VanDerGraff has 1001 ways to get you on line.

Short Body (First 1000 Characters)= The URL you requested is currently under construction. Pleas Body (First 10000 Characters)= The URL you requested is currently under construction. Please boo Subdirectory=/database/s for www.sportingeye.com.html http://www.etsinternet.com/

It has taken the Internet Corporation On-Line Spider 3.731 seconds to spider http://www.etsinternet.c Shortened Title (125 Characters)=Untitled Normal Page Full Title=Untitled Normal Page Short Body (First 1000 Characters)= We're Sorry The domain you are trying to reach is having tec Body (First 10000 Characters)= We're Sorry The domain you are trying to reach is having technica Subdirectory=/database/e for www.etsinternet.com/.html http://www.extant-training.com It has taken the Internet Corporation On-Line Spider 0.163 seconds to spider http://www.extant-traini Shortened Title (125 Characters)=Untitled Normal Page Full Title=Untitled Normal Page Short Body (First 1000 Characters)= We're Sorry The domain you are trying to reach is having tec Body (First 10000 Characters)= We're Sorry The domain you are trying to reach is having technica

FIG. 49I

Subdirectory=/database/e for www.extant-training.com.html http://www.myhomepage.net/%7erjtaylor/sales-training-at-your-business.htm
File Not Found!

http://www.magentanetwork.co.uk
File Not Found!

http://www.nvtraining.com/
File Not Found!

FIG. 50B

I) 6) Hotlist: Weather Science
Online Exhibits Weather Right Now World Weather Watch -- Interactive Weather Project, register your class Background Information National Weather Service Office Descriptions and Addresses of Department...
http://sln.fi.edu/tfi/hotlists/weather.html (webcrawler 6)

I) 7) Weather Links
Here you can find the general forecast for your vicinity to in-depth meteorological analyses of weather conditions across Pennsylvania and elsewhere. ...
http://www.psu.edu/weather/weather.html (webcrawler 7)

I) 8) Weather
This weather gateway is back online with some modifications to more efficiently use the studlier weather server at the University of Michigan (which we have been using since October 1995). ...
http://www.mit.edu:8001/weather (webcrawler 8)

I) 9) Weather Map
This is a map of current weather conditions across the United States. To get a forecast for a specific location, click on that location. Please note that not all cities are available on this map. ...
http://www.mit.edu:8001/usa.html (webcrawler 9)

I) 10) Weather-Bos™: Environmentally Safe Stains and Finishes
Environmentally safe paints &finishes, providing protection, waterproofing and restoration for almost all interior and exterior surfaces. . ...
http://www.weatherbos.com/wbpi.htm (webcrawler 10)

Query: climate

I) 1) The Climate Diagnostics Center
Advancing Understanding and Predictions of Climate Variability. The mission of CDC is to identify the nature and causes of climate variations on time... ...
http://www.cdc.noaa.gov/ (altavista 1)

I) 2) UNITED NATIONS FRAMEWORK CONVENTION ON CLIMATE CHANGE, UNFCCC
WHAT'S NEW? THE SECRETARIAT. PROGRAMMES. RESOURCES. SESSIONS. MEDIA ROOM. SITE INFO. HOME. ADVANCED SEARCH. CONTACT US. SHORTCUT. WHAT'S NEW? THE... ...
http://www.unfccc.de/ (altavista 2)

I) 3) Climate Monitoring & Diagnostics Laboratory
The Climate Monitoring and Diagnostics Laboratory (CMDL) in Boulder, Colorado, conducts research related to atmospheric constituents that are capable ...
http://www.cmdl.noaa.gov/ (altavista 3)

I) 4) Western Regional Climate Center WWW Server
WRCC supports a three-tiered national climate services support program - the partners include: National Climatic Data Center (NCDC), Regional Climate... ...
http://www.wrcc.dri.edu/ (altavista 4)

I) 5) [CRD] Climate Research Division
... ...
http://meteora.ucsd.edu/ (altavista 5)

I) 6) NASA-Goddard Climate and Radiation Branch
Jump to: |NASA |Goddard |DAAC |EOS |GOES |HPC |I3RC |Lidar |MODIS |TRMM |ZZZ | Click on the words, or the equivalent image: Climate and Radiation.... ...
http://climate.gsfc.nasa.gov/ (altavista 6)

I) 7) High Plains Climate Center Home Page
HPCC supports a three-tiered national climate services support program.The partners include: National Climatic Data Center, Regional Climate Centers,... ...
http://hpccsun.unl.edu/ (altavista 7)

FIG. 50C

I) 8) Intergovernmental Panel on Climate Change
IPCC web sites. IPCC Home. Working Group I. Working Group II. Working Group III. NGGIP. Data Distribution Centre. Now download IPCC Summaries for... ...
http://www.ipcc.ch/ (altavista 8)

I) 9) Online Weather: Climate Statistics for England, Wales, Scotland, Ireland, UK,
Annual average rainfall and temperature information for Scotland, England, Ireland, Wales, the UK, and Britain providing a round about of climate... ...
http://www.onlineweather.com/BritishIsles/climate.html (altavista 9)

I) 10) Midwestern Climate Center
MIDWESTERN CLIMATE CENTER. ******** SPECIAL ANNOUNCEMENT ******** Due to hardware and software upgrades, users may experience some difficulties.... ...
http://mcc.sws.uiuc.edu/ (altavista 10)

Query: environment

I) 1) Environment at Harvard
Includes a library of research materials for the study of the environment, as well as archives for several environmental science list-serves....
http://environment.harvard.edu/ (lycos 1)

I) 2) Environment Issues from About.com
A new type of environmental community. News, links, bulletin board, chat....
http://environment.about.com (lycos 2)

I) 3) Environment Online
International Network for the Environment - A new online networking center & internet resources directory for the environment....
http://www.environmentonline.org (lycos 3)

I) 4) Cleaner and Greener Environment Program
Makes it easy for consumers and businesses to help clean up the environment....
http://www.cleanerandgreener.org (lycos 4)

I) 5) The Environment (from About.com Guide)
Not just links to other sites, but news, discussion groups + more......
http://environment.about.com/ (lycos 5)

I) 6) The World-Wide Web Virtual Library: Environment
Over 1000 entries listed alphabetically and by subject...
http://earthsystems.org/Environment.shtml (lycos 6)

I) 7) IBM Environment
corporate environmental programs, ISO 140001, more...
http://www.ibm.com/ibm/environment/ (lycos 7)

I) 8) Krislyn's Environment Sites
Annotated list of links to content-rich web sites in the area of the environment, particularly for use by businesses....
http://sites.krislyn.com/env.htm (lycos 8)

I) 9) Environment News Service
(Lycos version.)...
http://ens.lycos.com/index.html (lycos 9)

I) 10) Second opinion? Try searching for "environment" at
...
http://www.lycos.com/hotbot-redirect.html?query=environment (lycos 10)

FIG. 50D

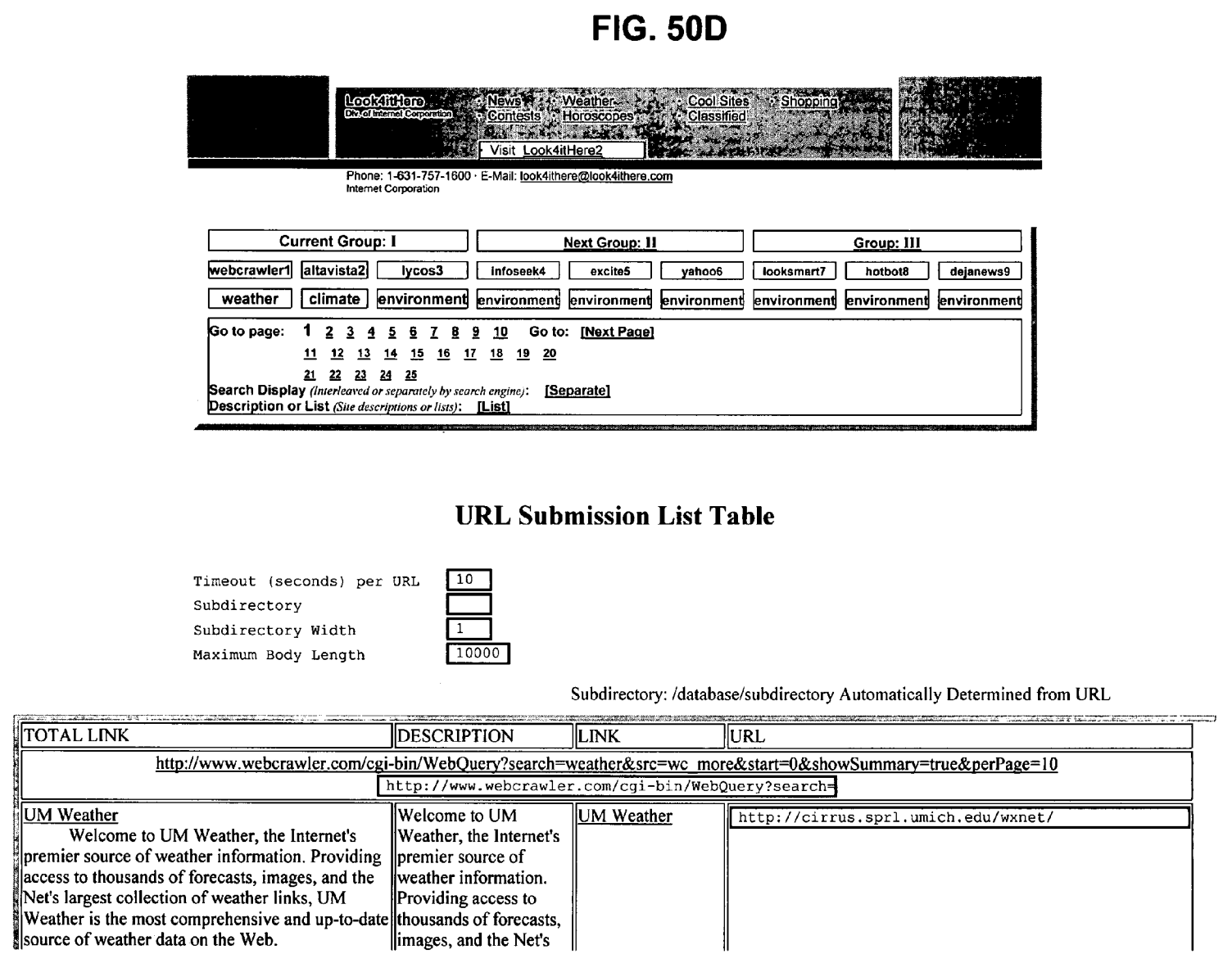

Look4itHere Div. of Internet Corporation · News · Weather · Cool Sites · Shopping · Contests · Horoscopes · Classified Visit Look4itHere2

Phone: 1-631-757-1600 · E-Mail: look4ithere@look4ithere.com
Internet Corporation

| Current Group: I | | | Next Group: II | | | Group: III | | |
|---|---|---|---|---|---|---|---|---|
| webcrawler1 | altavista2 | lycos3 | infoseek4 | excite5 | yahoo6 | looksmart7 | hotbot8 | dejanews9 |
| weather | climate | environment | environment | environment | environment | environment | environment | environment |

Go to page: 1 2 3 4 5 6 7 8 9 10 Go to: [Next Page]
11 12 13 14 15 16 17 18 19 20
21 22 23 24 25

Search Display *(Interleaved or separately by search engine)*: [Separate]
Description or List *(Site descriptions or lists)*: [List]

URL Submission List Table

Timeout (seconds) per URL [10]
Subdirectory [ ]
Subdirectory Width [1]
Maximum Body Length [10000]

Subdirectory: /database/subdirectory Automatically Determined from URL

| TOTAL LINK | DESCRIPTION | LINK | URL |
|---|---|---|---|
| http://www.webcrawler.com/cgi-bin/WebQuery?search=weather&src=wc_more&start=0&showSummary=true&perPage=10<br>http://www.webcrawler.com/cgi-bin/WebQuery?search= | | | |
| UM Weather<br>Welcome to UM Weather, the Internet's premier source of weather information. Providing access to thousands of forecasts, images, and the Net's largest collection of weather links, UM Weather is the most comprehensive and up-to-date source of weather data on the Web. | Welcome to UM Weather, the Internet's premier source of weather information. Providing access to thousands of forecasts, images, and the Net's | UM Weather | http://cirrus.sprl.umich.edu/wxnet/ |

FIG. 50E

| | | | |
|---|---|---|---|
| | largest collection of weather links, UM Weather is the most comprehensive and up-to-date source of weather data on the Web. | | |
| The Weather Page Department of Commerce National Oceanic and Atmospheric Administration NOAA Sources of Weather Information: General information on NOAA programs and offices | Department of Commerce National Oceanic and Atmospheric Administration NOAA Sources of Weather Information: General information on NOAA programs and offices | The Weather Page | http://www.esdim.noaa.gov/weather_page.html |
| Interactive Weather Information Network Get your Weather from the source -- The National Weather Service's (NWS) Internet data source....Weather.GOV ....Bookmark address is: http://weather.gov | Get your Weather from the source -- The National Weather Service's (NWS) Internet data source....Weather.GOV ....Bookmark address is: http://weather.gov | Interactive Weather Information Network | http://iwin.nws.noaa.gov/iwin/main.html |
| Connecticut Weather Back To Connecticut CT Links: Business Listings Classifieds News Town USA National Preferred Customers Featured State Connecticut USA Maps Town USA USA Weather Town USA Advertisers Arcade Domain Hosting General Store Get Listed Go Links Help Home Business Information Press Releases Search Sponsors Town USA Town USA Mail What's New | Back To Connecticut CT Links: Business Listings Classifieds News Town USA National Preferred Customers Featured State Connecticut USA Maps Town USA USA Weather Town USA Advertisers Arcade Domain Hosting General Store Get Listed Go Links Help Home Business Information Press Releases Search Sponsors Town USA | Connecticut Weather | http://www.town-usa.com/connecticut/ctweather.html |

FIG. 50F

| | | | |
|---|---|---|---|
| | Town USA Mail What's New | | |
| COLA/IGES Weather & Climate Images<br>Current Analyses and Forecasts from the NCEP (NWS) provided by COLA/IGES. GIF files of all current maps are available by anonymous FTP. COLA and IGES make no guarantees about and bear no responsibility or liability concerning the accuracy or timeliness of the images being published on the World Wide Web. | Current Analyses and Forecasts from the NCEP (NWS) provided by COLA/IGES. GIF files of all current maps are available by anonymous FTP. COLA and IGES make no guarantees about and bear no responsibility or liability concerning the accuracy or timeliness of the images being published on the World Wide Web. | COLA/IGES Weather & Climate Images | http://grads.iges.org/pix/head.html |
| Hotlist: Weather Science<br>Online Exhibits Weather Right Now World Weather Watch -- Interactive Weather Project, register your class Background Information National Weather Service Office Descriptions and Addresses of Departments | Online Exhibits Weather Right Now World Weather Watch -- Interactive Weather Project, register your class Background Information National Weather Service Office Descriptions and Addresses of Departments | Hotlist: Weather Science | http://sln.fi.edu/tfi/hotlists/weather.html |
| Weather Links<br>Here you can find the general forecast for your vicinity to in-depth meteorological analyses of weather conditions across Pennsylvania and elsewhere. | Here you can find the general forecast for your vicinity to in-depth meteorological analyses of weather conditions across Pennsylvania and elsewhere. | Weather Links | http://www.psu.edu/weather/weather.html |
| Weather<br>This weather gateway is back online with some modifications to more efficiently use the studlier weather server at the University of Michigan (which we have been using since | This weather gateway is back online with some modifications to more efficiently use the studlier weather server | Weather | http://www.mit.edu:8001/weather |

FIG. 50G

| | | | |
|---|---|---|---|
| October 1995). | at the University of Michigan (which we have been using since October 1995). | | |
| Weather Map<br>This is a map of current weather conditions across the United States. To get a forecast for a specific location, click on that location. Please note that not all cities are available on this map. | This is a map of current weather conditions across the United States. To get a forecast for a specific location, click on that location. Please note that not all cities are available on this map. | Weather Map | http://www.mit.edu:8001/usa.html |
| Weather-Bos™: Environmentally Safe Stains and Finishes<br>Environmentally safe paints &finishes, providing protection, waterproofing and restoration for almost all interior and exterior surfaces. . | Environmentally safe paints &finishes, providing protection, waterproofing and restoration for almost all interior and exterior surfaces. . | Weather-Bos™: Environmentally Safe Stains and Finishes | http://www.weatherbos.com/wbpi.htm |
| http://altavista.digital.com/cgi-bin/query?pg=q&stq=0&what=web&kl=XX&q=climate&navig0<br>http://altavista.digital.com/cgi-bin/query?pg=q&st | | | |
| **The Climate Diagnostics Center**<br>Advancing Understanding and Predictions of Climate Variability. The mission of CDC is to identify the nature and causes of climate variations on time...<br>**URL:** www.cdc.noaa.gov/<br>Last modified on: 2-Feb-2000 - 9K bytes - in English<br>[ | Advancing Understanding and Predictions of Climate Variability. The mission of CDC is to identify the nature and causes of climate variations on time... | **The Climate Diagnostics Center** | http://www.cdc.noaa.gov/ |
| **UNITED NATIONS FRAMEWORK CONVENTION ON CLIMATE CHANGE,** | WHAT'S NEW? THE SECRETARIAT. | **UNITED NATIONS** | http://www.unfccc.de/ |

FIG. 50H

| | | | |
|---|---|---|---|
| **UNFCCC**<br>WHAT'S NEW? THE SECRETARIAT. PROGRAMMES. RESOURCES. SESSIONS. MEDIA ROOM. SITE INFO. HOME. ADVANCED SEARCH. CONTACT US. SHORTCUT. WHAT'S NEW? THE...<br>**URL:** www.unfccc.de/<br>Last modified on: 1-Sep-1999 - 10K bytes - in English<br>[ | PROGRAMMES. RESOURCES. SESSIONS. MEDIA ROOM. SITE INFO. HOME. ADVANCED SEARCH. CONTACT US. SHORTCUT. WHAT'S NEW? THE... | **FRAMEWORK CONVENTION ON CLIMATE CHANGE, UNFCCC** | |
| **Climate Monitoring & Diagnostics Laboratory**<br>The Climate Monitoring and Diagnostics Laboratory (CMDL) in Boulder, Colorado, conducts research related to atmospheric constituents that are capable<br>**URL:** www.cmdl.noaa.gov/<br>Last modified on: 21-Jan-2000 - 9K bytes - in English<br>[ | The Climate Monitoring and Diagnostics Laboratory (CMDL) in Boulder, Colorado, conducts research related to atmospheric constituents that are capable | **Climate Monitoring & Diagnostics Laboratory** | http://www.cmdl.noaa.gov/ |
| **Western Regional Climate Center WWW Server**<br>WRCC supports a three-tiered national climate services support program - the partners include: National Climatic Data Center (NCDC), Regional Climate...<br>**URL:** www.wrcc.dri.edu/<br>Last modified on: 20-Jan-2000 - 6K bytes - in English<br>[ | WRCC supports a three-tiered national climate services support program - the partners include: National Climatic Data Center (NCDC), Regional Climate... | **Western Regional Climate Center WWW Server** | http://www.wrcc.dri.edu/ |
| **[CRD] Climate Research Division**<br>...<br>**URL:** meteora.ucsd.edu/<br>Last modified on: 22-Sep-1999 - 7K bytes - in English<br>[ | ... | **[CRD] Climate Research Division** | http://meteora.ucsd.edu/ |

FIG. 50I

| | | | |
|---|---|---|---|
| **NASA-Goddard Climate and Radiation Branch**<br>Jump to: \|NASA \|Goddard \|DAAC \|EOS \|GOES \|HPC \|I3RC \|Lidar \|MODIS \|TRMM \|ZZZ \| Click on the words, or the equivalent image: Climate and Radiation....<br>**URL:** climate.gsfc.nasa.gov/<br>Last modified on: 2-Feb-2000 - 3K bytes - in English<br>[ | Jump to: \|NASA \|Goddard \|DAAC \|EOS \|GOES \|HPC \|I3RC \|Lidar \|MODIS \|TRMM \|ZZZ \| Click on the words, or the equivalent image: Climate and Radiation.... | **NASA-Goddard Climate and Radiation Branch** | http://climate.gsfc.nasa.gov/ |
| **High Plains Climate Center Home Page**<br>HPCC supports a three-tiered national climate services support program.The partners include: National Climatic Data Center, Regional Climate Centers,...<br>**URL:** hpccsun.unl.edu/<br>Last modified on: 6-Jan-2000 - 7K bytes - in English<br>[ | HPCC supports a three-tiered national climate services support program.The partners include: National Climatic Data Center, Regional Climate Centers,... | **High Plains Climate Center Home Page** | http://hpccsun.unl.edu/ |
| **Intergovernmental Panel on Climate Change**<br>IPCC web sites. IPCC Home. Working Group I. Working Group II. Working Group III. NGGIP. Data Distribution Centre. Now download IPCC Summaries for...<br>**URL:** www.ipcc.ch/<br>Last modified on: 6-Jan-2000 - 6K bytes - in English<br>[ | IPCC web sites. IPCC Home. Working Group I. Working Group II. Working Group III. NGGIP. Data Distribution Centre. Now download IPCC Summaries for... | **Intergovernmental Panel on Climate Change** | http://www.ipcc.ch/ |
| **Online Weather: Climate Statistics for England, Wales, Scotland, Ireland, UK,**<br>Annual average rainfall and temperature information for Scotland, England, Ireland, Wales, the UK, and Britain providing a round about of climate...<br>**URL:** www.onlineweather.com/BritishIsles/climate.html<br>Last modified on: 17-Apr-1999 - 17K bytes - in English<br>[ | Annual average rainfall and temperature information for Scotland, England, Ireland, Wales, the UK, and Britain providing a round about of climate... | **Online Weather: Climate Statistics for England, Wales, Scotland, Ireland, UK,** | http://www.onlineweather.com/BritishIsles/climate. |

FIG. 50J

| | | | |
|---|---|---|---|
| **Midwestern Climate Center** MIDWESTERN CLIMATE CENTER. ********** SPECIAL ANNOUNCEMENT ********** Due to hardware and software upgrades, users may experience some difficulties.... **URL:** mcc.sws.uiuc.edu/ Last modified on: 6-Jan-2000 - 5K bytes - in English [ | MIDWESTERN CLIMATE CENTER. ********** SPECIAL ANNOUNCEMENT ********** Due to hardware and software upgrades, users may experience some difficulties.... | **Midwestern Climate Center** | http://mcc.sws.uiuc.edu/ |
| http://www.lycos.com/srch/more.html?lpv=1&type=websites&query=environment&first=1 http://www.lycos.com/srch/more.html?lpv=1&type=web | | | |
| **Environment** at Harvard - Includes a library of research materials for the study of the **environment**, as well as archives for several environmental science list-serves. *Science > Environment >* | Includes a library of research materials for the study of the **environment**, as well as archives for several environmental science list-serves. | **Environment** at Harvard | http://environment.harvard.edu/ |
| **Environment** Issues from About.com - A new type of environmental community. News, links, bulletin board, chat. *Society > Issues >* | A new type of environmental community. News, links, bulletin board, chat. | **Environment** Issues from About.com | http://environment.about.com |
| **Environment** Online - International Network for the **Environment** - A new online networking center & internet resources directory for the **environment**. *Society > Issues >* | International Network for the **Environment** - A new online networking center & internet resources directory for the **environment**. | **Environment** Online | http://www.environmentonline.org |
| Cleaner and Greener **Environment** Program - Makes it easy for consumers and businesses to help clean up the **environment**. *Society > Issues >* | Makes it easy for consumers and businesses to help clean up the **environment**. | Cleaner and Greener **Environment** Program | http://www.cleanerandgreener.org |
| The **Environment** (from About.com Guide) - Not just links to other sites, but news, discussion groups + more... *Society > Issues > Environment >* | Not just links to other sites, but news, discussion groups + more... | The **Environment** (from About.com Guide) | http://environment.about.com/ |

FIG. 50K

| | | | | |
|---|---|---|---|---|
| The World-Wide Web Virtual Library: **Environment** - Over 1000 entries listed alphabetically and by subject<br>*Science > Environment >* | Over 1000 entries listed alphabetically and by subject | The World-Wide Web Virtual Library: **Environment** | http://earthsystems.org/Environment.shtml | |
| IBM **Environment** - corporate environmental programs, ISO 140001, more<br>*Science > Environment > Organizations >* | corporate environmental programs, ISO 140001, more | IBM **Environment** | http://www.ibm.com/ibm/environment/ | |
| Krislyn's **Environment** Sites - Annotated list of links to content-rich web sites in the area of the **environment**, particularly for use by businesses.<br>*Science > Environment >* | Annotated list of links to content-rich web sites in the area of the **environment**, particularly for use by businesses. | Krislyn's **Environment** Sites | http://sites.krislyn.com/env.htm | |
| **Environment** News Service - (Lycos version.)<br>*News >* | (Lycos version.) | **Environment** News Service | http://ens.lycos.com/index.html | |
| Second opinion? Try searching for "**environment**" at | | | Second opinion? Try searching for "**environment**" at | h |

Click Here to Add Sites

Reset

* Enter Your Selections Above

* Next, Click Above to Add Sites

* Subdirectory: /database/subdirectory Automatically Determined from URL

* Subdirectory Width=Number of Characters in Name of Subdirectory

* Maximum Body Length of Body Prior to Truncating

* Typical Site Address (http://inter-net.com/internet)

FIG. 51A

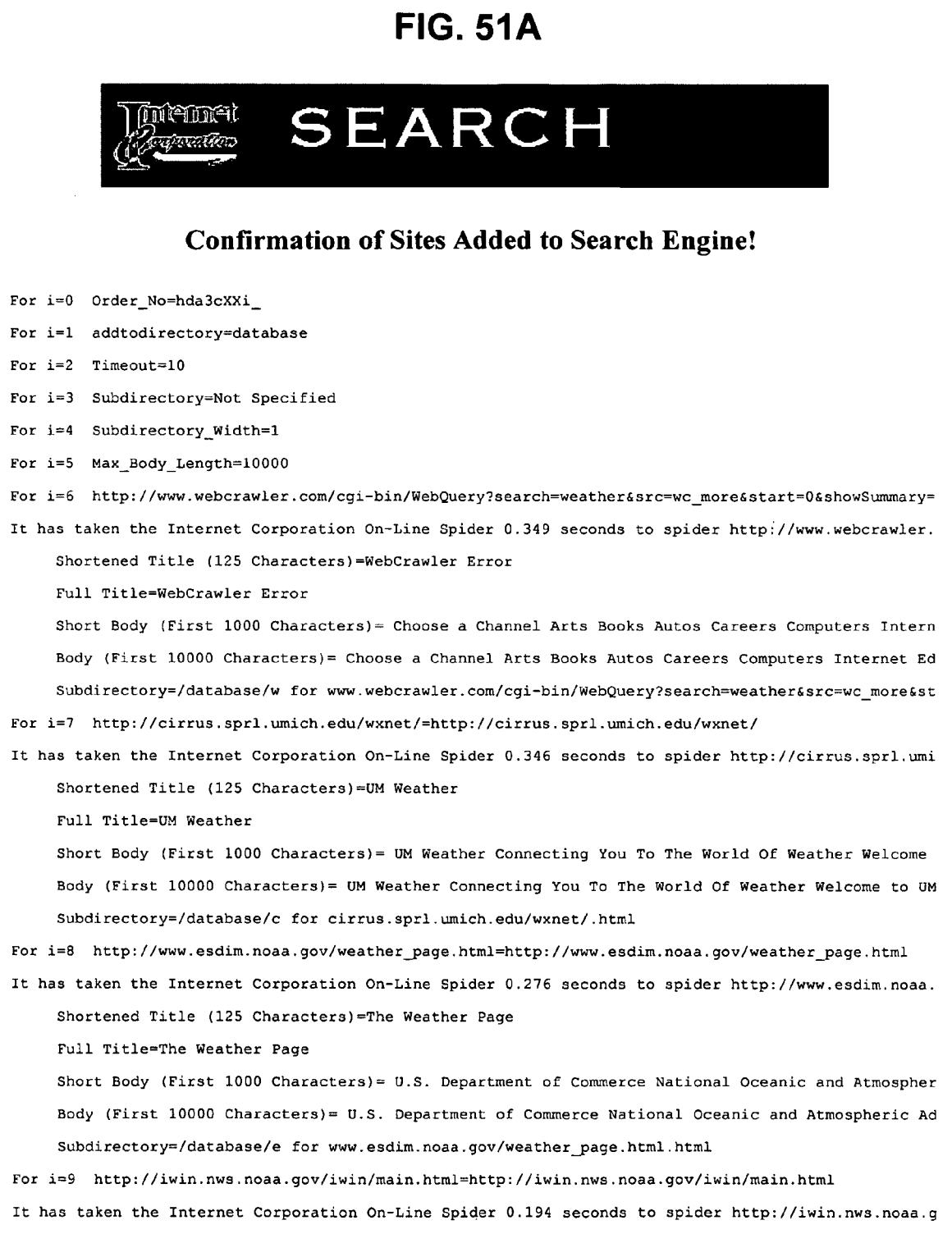

Internet Corporation SEARCH

Confirmation of Sites Added to Search Engine!

For i=0 Order_No=hda3cXXi_

For i=1 addtodirectory=database

For i=2 Timeout=10

For i=3 Subdirectory=Not Specified

For i=4 Subdirectory_Width=1

For i=5 Max_Body_Length=10000

For i=6 http://www.webcrawler.com/cgi-bin/WebQuery?search=weather&src=wc_more&start=0&showSummary=

It has taken the Internet Corporation On-Line Spider 0.349 seconds to spider http://www.webcrawler.

Shortened Title (125 Characters)=WebCrawler Error

Full Title=WebCrawler Error

Short Body (First 1000 Characters)= Choose a Channel Arts Books Autos Careers Computers Intern Body (First 10000 Characters)= Choose a Channel Arts Books Autos Careers Computers Internet Ed Subdirectory=/database/w for www.webcrawler.com/cgi-bin/WebQuery?search=weather&src=wc_more&st For i=7 http://cirrus.sprl.umich.edu/wxnet/=http://cirrus.sprl.umich.edu/wxnet/

It has taken the Internet Corporation On-Line Spider 0.346 seconds to spider http://cirrus.sprl.umi Shortened Title (125 Characters)=UM Weather Full Title=UM Weather Short Body (First 1000 Characters)= UM Weather Connecting You To The World Of Weather Welcome Body (First 10000 Characters)= UM Weather Connecting You To The World Of Weather Welcome to UM Subdirectory=/database/c for cirrus.sprl.umich.edu/wxnet/.html For i=8 http://www.esdim.noaa.gov/weather_page.html=http://www.esdim.noaa.gov/weather_page.html It has taken the Internet Corporation On-Line Spider 0.276 seconds to spider http://www.esdim.noaa.

Shortened Title (125 Characters)=The Weather Page

Full Title=The Weather Page

Short Body (First 1000 Characters)= U.S. Department of Commerce National Oceanic and Atmospher Body (First 10000 Characters)= U.S. Department of Commerce National Oceanic and Atmospheric Ad Subdirectory=/database/e for www.esdim.noaa.gov/weather_page.html.html For i=9 http://iwin.nws.noaa.gov/iwin/main.html=http://iwin.nws.noaa.gov/iwin/main.html It has taken the Internet Corporation On-Line Spider 0.194 seconds to spider http://iwin.nws.noaa.g

FIG. 51B

Shortened Title (125 Characters)=Interactive Weather Information Network

Full Title=Interactive Weather Information Network

Short Body (First 1000 Characters)= Get your Weather from the source The National Weather Serv Body (First 10000 Characters)= Get your Weather from the source The National Weather Service's Subdirectory=/database/i for iwin.nws.noaa.gov/iwin/main.html.html For i=10 http://www.town-usa.com/connecticut/ctweather.html=http://www.town-usa.com/connecticut/ct It has taken the Internet Corporation On-Line Spider 0.008 seconds to spider http://www.town-usa.co Shortened Title (125 Characters)=Interactive Weather Information Network Full Title=Interactive Weather Information Network Short Body (First 1000 Characters)=

Body (First 10000 Characters)=

Subdirectory=/database/t for www.town-usa.com/connecticut/ctweather.html.html

For i=11 http://grads.iges.org/pix/head.html=http://grads.iges.org/pix/head.html It has taken the Internet Corporation On-Line Spider 0.247 seconds to spider http://grads.iges.org/

Shortened Title (125 Characters)=COLA/IGES Weather & Climate Images

Full Title=COLA/IGES Weather & Climate Images

Short Body (First 1000 Characters)= Current Analyses and Forecasts from the NCEP (NWS) provide Body (First 10000 Characters)= Current Analyses and Forecasts from the NCEP (NWS) provided by Subdirectory=/database/g for grads.iges.org/pix/head.html.html For i=12 http://sln.fi.edu/tfi/hotlists/weather.html=http://sln.fi.edu/tfi/hotlists/weather.html It has taken the Internet Corporation On-Line Spider 6.231 seconds to spider http://sln.fi.edu/tfi/

Shortened Title (125 Characters)=Hotlist: Weather Science

Full Title=Hotlist: Weather Science

Short Body (First 1000 Characters)= Weather Science Hotlist Online Exhibits Franklin's Forecas Body (First 10000 Characters)= Weather Science Hotlist Online Exhibits Franklin's Forecast El Subdirectory=/database/s for sln.fi.edu/tfi/hotlists/weather.html.html For i=13 http://www.psu.edu/weather/weather.html=http://www.psu.edu/weather/weather.html It has taken the Internet Corporation On-Line Spider 1.296 seconds to spider http://www.psu.edu/wea Shortened Title (125 Characters)=Weather Links Full Title=Weather Links Short Body (First 1000 Characters)= Here you can find the general forecast for your vicinity t Body (First 10000 Characters)= Here you can find the general forecast for your vicinity to ind Subdirectory=/database/p for www.psu.edu/weather/weather.html.html For i=14 http://www.mit.edu:8001/weather=http://www.mit.edu:8001/weather It has taken the Internet Corporation On-Line Spider 10.027 seconds to spider http://www.mit.edu:80

FIG. 51C

```
     Shortened Title (125 Characters)=Weather Links
     Full Title=Weather Links
     Short Body (First 1000 Characters)=
     Body (First 10000 Characters)=
     Subdirectory=/database/m for www.mit.edu:8001/weather.html
For i=15  http://www.mit.edu:8001/usa.html=http://www.mit.edu:8001/usa.html
It has taken the Internet Corporation On-Line Spider 0.155 seconds to spider http://www.mit.edu:800
     Shortened Title (125 Characters)=Weather Map
     Full Title=Weather Map
     Short Body (First 1000 Characters)= Current US Weather This is a map of current weather condit
     Body (First 10000 Characters)= Current US Weather This is a map of current weather conditions
     Subdirectory=/database/m for www.mit.edu:8001/usa.html.html
For i=16  http://www.weatherbos.com/wbpi.htm=http://www.weatherbos.com/wbpi.htm
It has taken the Internet Corporation On-Line Spider 0.632 seconds to spider http://www.weatherbos.
     Shortened Title (125 Characters)=WeatherBos™: Environmentally Safe Stains and Finishes
     Full Title=WeatherBos™: Environmentally Safe Stains and Finishes
     Short Body (First 1000 Characters)= The History of WeatherBos Why use WeatherBos? Comparisons
     Body (First 10000 Characters)= The History of WeatherBos Why use WeatherBos? Comparisons Custo
     Subdirectory=/database/w for www.weatherbos.com/wbpi.htm.html
For i=17  http://altavista.digital.com/cgi-bin/query?pg=q&stq=0&what=web&kl=XX&q=climate&navig0=htt
It has taken the Internet Corporation On-Line Spider 0.654 seconds to spider http://altavista.digit
     Shortened Title (125 Characters)=AltaVista Web Results
     Full Title=AltaVista Web Results
     Short Body (First 1000 Characters)= Search Live! Shopping Raging Bull Free Internet Access Ema
     Body (First 10000 Characters)= Search Live! Shopping Raging Bull Free Internet Access Email We
     Subdirectory=/database/a for altavista.digital.com/cgi-bin/query?pg=q&stq=0&what=web&kl=XX&q=c
For i=18  http://www.cdc.noaa.gov/=http://www.cdc.noaa.gov/
It has taken the Internet Corporation On-Line Spider 0.540 seconds to spider http://www.cdc.noaa.go
     Shortened Title (125 Characters)=The Climate Diagnostics Center
     Full Title=The Climate Diagnostics Center
     Short Body (First 1000 Characters)= version = 0; browserName = navigator.appName; browserVer =
     Body (First 10000 Characters)= version = 0; browserName = navigator.appName; browserVer = pars
     Subdirectory=/database/c for www.cdc.noaa.gov/.html
For i=19  http://www.unfccc.de/=http://www.unfccc.de/
It has taken the Internet Corporation On-Line Spider 3.710 seconds to spider http://www.unfccc.de/.
     Shortened Title (125 Characters)=UNITED NATIONS FRAMEWORK CONVENTION ON CLIMATE CHANGE, UNFCCC
```

FIG. 51D

Full Title=UNITED NATIONS FRAMEWORK CONVENTION ON CLIMATE CHANGE, UNFCCC

Short Body (First 1000 Characters)= WHAT'S NEW? THE SECRETARIAT PROGRAMMES RESOURCES SESSIONS Body (First 10000 Characters)= WHAT'S NEW? THE SECRETARIAT PROGRAMMES RESOURCES SESSIONS MEDIA Subdirectory=/database/u for www.unfccc.de/.html For i=20 http://www.cmdl.noaa.gov/=http://www.cmdl.noaa.gov/

It has taken the Internet Corporation On-Line Spider 0.344 seconds to spider http://www.cmdl.noaa.g Shortened Title (125 Characters)=Climate Monitoring & Diagnostics Laboratory Full Title=Climate Monitoring & Diagnostics Laboratory Short Body (First 1000 Characters)= National Oceanic Atmospheric Administration Climate Monito Body (First 10000 Characters)= National Oceanic Atmospheric Administration Climate Monitoring Subdirectory=/database/c for www.cmdl.noaa.gov/.html For i=21 http://www.wrcc.dri.edu/=http://www.wrcc.dri.edu/

It has taken the Internet Corporation On-Line Spider 0.553 seconds to spider http://www.wrcc.dri.ed Shortened Title (125 Characters)=Western Regional Climate Center WWW Server Full Title=Western Regional Climate Center WWW Server Short Body (First 1000 Characters)= WRCC supports a threetiered national climate services supp Body (First 10000 Characters)= WRCC supports a threetiered national climate services support p Subdirectory=/database/w for www.wrcc.dri.edu/.html For i=22 http://meteora.ucsd.edu/=http://meteora.ucsd.edu/

It has taken the Internet Corporation On-Line Spider 1.271 seconds to spider http://meteora.ucsd.ed Shortened Title (125 Characters)= /[CRD/] Climate Research Division Full Title= /[CRD/] Climate Research Division Short Body (First 1000 Characters)= > //> > //> Climate Research Division Scripps Institution Body (First 10000 Characters)= > //> > //> Climate Research Division Scripps Institution of Oc Subdirectory=/database/m for meteora.ucsd.edu/.html For i=23 http://climate.gsfc.nasa.gov/=http://climate.gsfc.nasa.gov/

It has taken the Internet Corporation On-Line Spider 0.125 seconds to spider http://climate.gsfc.na Shortened Title (125 Characters)=NASAGoddard Climate and Radiation Branch Full Title=NASAGoddard Climate and Radiation Branch Short Body (First 1000 Characters)= Jump to: |NASA |Goddard |DAAC |EOS |GOES |HPC |I3RC |Lidar Body (First 10000 Characters)= Jump to: |NASA |Goddard |DAAC |EOS |GOES |HPC |I3RC |Lidar |MOD Subdirectory=/database/c for climate.gsfc.nasa.gov/.html For i=24 http://hpccsun.unl.edu/=http://hpccsun.unl.edu/

It has taken the Internet Corporation On-Line Spider 0.373 seconds to spider http://hpccsun.unl.edu Shortened Title (125 Characters)= High Plains Climate Center Home Page

FIG. 51E

Full Title= High Plains Climate Center Home Page

Short Body (First 1000 Characters)= > HPCC supports a threetiered national climate services su Body (First 10000 Characters)= > HPCC supports a threetiered national climate services support Subdirectory=/database/h for hpccsun.unl.edu/.html For i=25 http://www.ipcc.ch/=http://www.ipcc.ch/

It has taken the Internet Corporation On-Line Spider 0.537 seconds to spider http://www.ipcc.ch/.

Shortened Title (125 Characters)=Intergovernmental Panel on Climate Change

Full Title=Intergovernmental Panel on Climate Change

Short Body (First 1000 Characters)= IPCC web sites IPCC Home Working Group I Working Group II Body (First 10000 Characters)= IPCC web sites IPCC Home Working Group I Working Group II Worki Subdirectory=/database/i for www.ipcc.ch/.html For i=26 http://www.onlineweather.com/BritishIsles/climate.html=http://www.onlineweather.com/Briti For i=27 http://mcc.sws.uiuc.edu/=http://mcc.sws.uiuc.edu/

It has taken the Internet Corporation On-Line Spider 0.190 seconds to spider http://mcc.sws.uiuc.ed Shortened Title (125 Characters)= Midwestern Regional Climate Center Full Title= Midwestern Regional Climate Center Short Body (First 1000 Characters)= MIDWESTERN REGIONAL CLIMATE CENTER The Midwestern Regional Body (First 10000 Characters)= MIDWESTERN REGIONAL CLIMATE CENTER The Midwestern Regional Clim Subdirectory=/database/m for mcc.sws.uiuc.edu/.html For i=28 http://www.lycos.com/srch/more.html?lpv=1&type=websites&query=environment&first=1=http://

It has taken the Internet Corporation On-Line Spider 0.896 seconds to spider http://www.lycos.com/s Shortened Title (125 Characters)=Search for: "environment"

Full Title=Search for: "environment"

Short Body (First 1000 Characters)= Find it Talk about it Shop for it The Information Source f Body (First 10000 Characters)= Find it Talk about it Shop for it The Information Source for th Subdirectory=/database/l for www.lycos.com/srch/more.html?lpv=1&type=websites&query=environmen For i=29 http://environment.harvard.edu/=http://environment.harvard.edu/

It has taken the Internet Corporation On-Line Spider 0.352 seconds to spider http://environment.har Shortened Title (125 Characters)=Environment at Harvard (19992000 edition)

Full Title=Environment at Harvard (19992000 edition)

Short Body (First 1000 Characters)= ENVIRONMENT AT HARVARD (19992000) Gateway to Harvard Unive Body (First 10000 Characters)= ENVIRONMENT AT HARVARD (19992000) Gateway to Harvard University Subdirectory=/database/e for environment.harvard.edu/.html For i=30 http://environment.about.com=http://environment.about.com It has taken the Internet Corporation On-Line Spider 0.262 seconds to spider http://environment.abo Shortened Title (125 Characters)=Environment at Harvard (19992000 edition)

FIG. 51F

Full Title=Environment at Harvard (19992000 edition)

Short Body (First 1000 Characters)= ENVIRONMENT AT HARVARD (19992000) Gateway to Harvard Unive Body (First 10000 Characters)= ENVIRONMENT AT HARVARD (19992000) Gateway to Harvard University Subdirectory=/database/e for environment.about.com.html For i=31 http://www.environmentonline.org=http://www.environmentonline.org It has taken the Internet Corporation On-Line Spider 0.265 seconds to spider http://www.environment Shortened Title (125 Characters)=Environment at Harvard (19992000 edition)

Full Title=Environment at Harvard (19992000 edition)

Short Body (First 1000 Characters)= ENVIRONMENT AT HARVARD (19992000) Gateway to Harvard Unive Body (First 10000 Characters)= ENVIRONMENT AT HARVARD (19992000) Gateway to Harvard University Subdirectory=/database/e for www.environmentonline.org.html For i=32 http://www.cleanerandgreener.org=http://www.cleanerandgreener.org It has taken the Internet Corporation On-Line Spider 0.263 seconds to spider http://www.cleanerandg Shortened Title (125 Characters)=Environment at Harvard (19992000 edition)

Full Title=Environment at Harvard (19992000 edition)

Short Body (First 1000 Characters)= ENVIRONMENT AT HARVARD (19992000) Gateway to Harvard Unive Body (First 10000 Characters)= ENVIRONMENT AT HARVARD (19992000) Gateway to Harvard University Subdirectory=/database/c for www.cleanerandgreener.org.html For i=33 http://environment.about.com/=http://environment.about.com/

It has taken the Internet Corporation On-Line Spider 0.315 seconds to spider http://environment.abo Shortened Title (125 Characters)=About.com The network of sites led by expert guides.

Full Title=About.com The network of sites led by expert guides.

Short Body (First 1000 Characters)= Only 2 days left until Valentine's DaySend a card! Sunday, Body (First 10000 Characters)= Only 2 days left until Valentine's DaySend a card! Sunday,Febru Subdirectory=/database/e for environment.about.com/.html For i=34 http://earthsystems.org/Environment.shtml=http://earthsystems.org/Environment.shtml It has taken the Internet Corporation On-Line Spider 0.390 seconds to spider http://earthsystems.or Shortened Title (125 Characters)= The WorldWide Web Virtual Library: Environment Full Title= The WorldWide Web Virtual Library: Environment Short Body (First 1000 Characters)= WWW Virtual Library Environment An awardwinning, searchabl Body (First 10000 Characters)= WWW Virtual Library Environment An awardwinning, searchable ind Subdirectory=/database/e for earthsystems.org/Environment.shtml.html For i=35 http://www.ibm.com/ibm/environment/=http://www.ibm.com/ibm/environment/

It has taken the Internet Corporation On-Line Spider 0.445 seconds to spider http://www.ibm.com/ibm Shortened Title (125 Characters)=IBM Environment Overview

FIG. 51G

Full Title=IBM Environment Overview

Short Body (First 1000 Characters)= Search Environment Overview Environmental Affairs Policy E Body (First 10000 Characters)= Search Environment Overview Environmental Affairs Policy Enviro Subdirectory=/database/i for www.ibm.com/ibm/environment/.html For i=36 http://sites.krislyn.com/env.htm=http://sites.krislyn.com/env.htm File Not Found!

For i=37 http://ens.lycos.com/index.html=http://ens.lycos.com/index.html

It has taken the Internet Corporation On-Line Spider 0.883 seconds to spider http://ens.lycos.com/i Shortened Title (125 Characters)=Lycos Environment News Full Title=Lycos Environment News Short Body (First 1000 Characters)= Search for: Click here to visit site Lycos Home>News> Top Body (First 10000 Characters)= Search for: Click here to visit site Lycos Home>News> Top News Subdirectory=/database/e for ens.lycos.com/index.html.html For i=38 http://www.lycos.com/hotbot-redirect.html?query=environment=http://www.lycos.com/hotbot-r Internet Corporation E-Mail: internet@inter-net.com

FIG. 52A

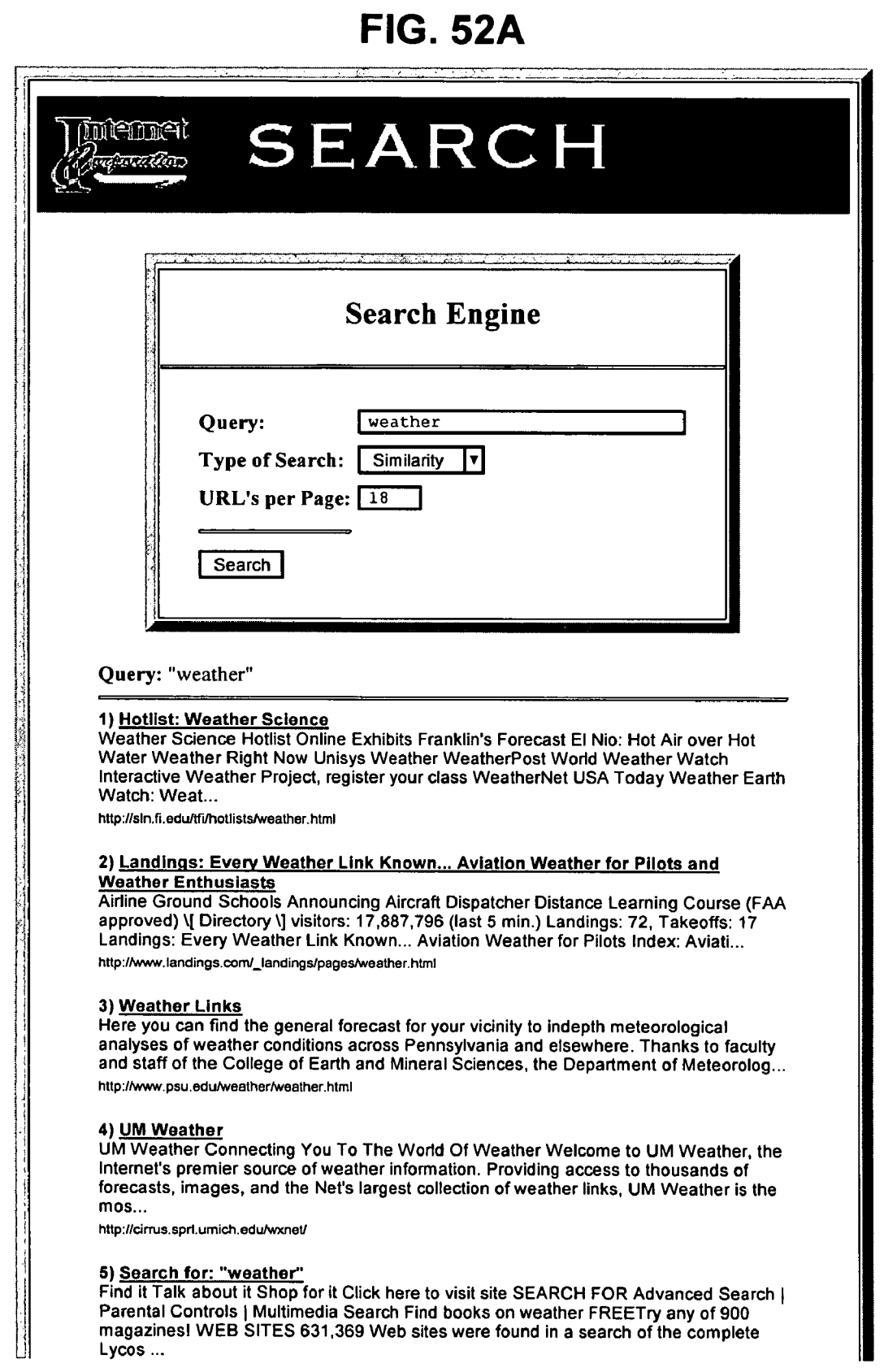

SEARCH

Search Engine

Query: weather

Type of Search: Similarity

URL's per Page: 18

Search

Query: "weather"

---

1) Hotlist: Weather Science
Weather Science Hotlist Online Exhibits Franklin's Forecast El Nio: Hot Air over Hot Water Weather Right Now Unisys Weather WeatherPost World Weather Watch Interactive Weather Project, register your class WeatherNet USA Today Weather Earth Watch: Weat...
http://sln.fi.edu/tfi/hotlists/weather.html

2) Landings: Every Weather Link Known... Aviation Weather for Pilots and Weather Enthusiasts
Airline Ground Schools Announcing Aircraft Dispatcher Distance Learning Course (FAA approved) \[ Directory \] visitors: 17,887,796 (last 5 min.) Landings: 72, Takeoffs: 17 Landings: Every Weather Link Known... Aviation Weather for Pilots Index: Aviati...
http://www.landings.com/_landings/pages/weather.html

3) Weather Links
Here you can find the general forecast for your vicinity to indepth meteorological analyses of weather conditions across Pennsylvania and elsewhere. Thanks to faculty and staff of the College of Earth and Mineral Sciences, the Department of Meteorolog...
http://www.psu.edu/weather/weather.html

4) UM Weather
UM Weather Connecting You To The World Of Weather Welcome to UM Weather, the Internet's premier source of weather information. Providing access to thousands of forecasts, images, and the Net's largest collection of weather links, UM Weather is the mos...
http://cirrus.sprl.umich.edu/wxnet/

5) Search for: "weather"
Find it Talk about it Shop for it Click here to visit site SEARCH FOR Advanced Search | Parental Controls | Multimedia Search Find books on weather FREETry any of 900 magazines! WEB SITES 631,369 Web sites were found in a search of the complete Lycos ...

FIG. 52B http://www.lycos.com/srch/more.html?lpv=1&type=websites&query=weather&first=1

6) AltaVista Web Results
Search Live! Shopping Raging Bull Free Internet Access Email Web Results Find this: Help Family Filter Language Settings Tip: Use a minus sign to exclude a keyword. Language: any language EnglishChineseCzechDanishDutchEstonianFinnishFrenchGermanGreekH...
http://altavista.digital.com/cgi//-bin/query?pg=q&stq=0&what=web&kl=XX&q=weather&navig0

7) Home & Garden Welcome
Go Shopping | Interact | Inbox Weather | Wireless Weather | Weather on Your Site | Audio/Video Forecast Customize My Weather Local Weather Any City or US Zip Home Garden Home Tips Maps Bookshelf Home Garden Store Weather Information Weather Maps US Ci...
http://www.weather.com/gardening/

8) Home & Garden Welcome
Go Shopping | Interact | Inbox Weather | Wireless Weather | Weather on Your Site | Audio/Video Forecast Customize My Weather Local Weather Any City or US Zip Home Garden Home Tips Maps Bookshelf Home Garden Store Weather Information Weather Maps US Ci...
http://www.weatherforyou.com

9) @marillo GlobeNews: Weather
30, *"> Click on your browsers back button to return to this page. Conditions and Forecast Amarillo Current Conditions Amarillo Forecast Amarillo Extended Forecast Foreign Cities U.S. Weather Summary Weather Almanac Weather Maps Forecasted Highs Forec...
http://weather.amarillonet.com/weather/weather.html

10) Interactive Weather Information Network
Get your Weather from the source The National Weather Service's (NWS) Internet data source....Weather.GOV ....Bookmark address is: http://weather.gov Interactive Weather Information Network (IWIN) interfaces: Animated Graphics version (High speed Inte...
http://iwin.nws.noaa.gov/iwin/main.html

11) Weather Map
Current US Weather This is a map of current weather conditions across the United States. To get a forecast for a specific location, click on that location. Please note that not all cities are available on this map. Use the weather city code interface ...
http://www.mit.edu:8001/usa.html

12) Taipei TW Weather Forecast
Home Yahoo! > Home Yahoo! Help Select A City Atlanta, GA Boston, MA Chicago, IL Honolulu, HI Las Vegas, NV Los Angeles, CA Miami, FL New York City, NY Orlando, FL San Diego, CA San Francisco, CA Washington DC More Cities... Yahoo! Weather Taipei Add t...
http://weather.yahoo.com/forecast/Taipei_TW_c.html

13) Cape Cod Times | Weather
Click here to support our sponsor! news | sports | business | arts | outdoors | community | classifieds Hyannis Falmouth Chatham Provincetown Martha's Vineyard Nantucket Plymouth Boston Springfield Worcester Allergy maps Historical SATELLITE & RADAR I...
http://www.capecodonline.com/weather.htm

14) Scato Search Weather
National Information National Forecast National Summary National Radar National Warnings Ultraviolet Index Current Conditions Other Information International Information Current Conditions Canadian Forecasts Other Information My Weather Get Forecast: ...
http://www.scato.com/weather/

FIG. 52C

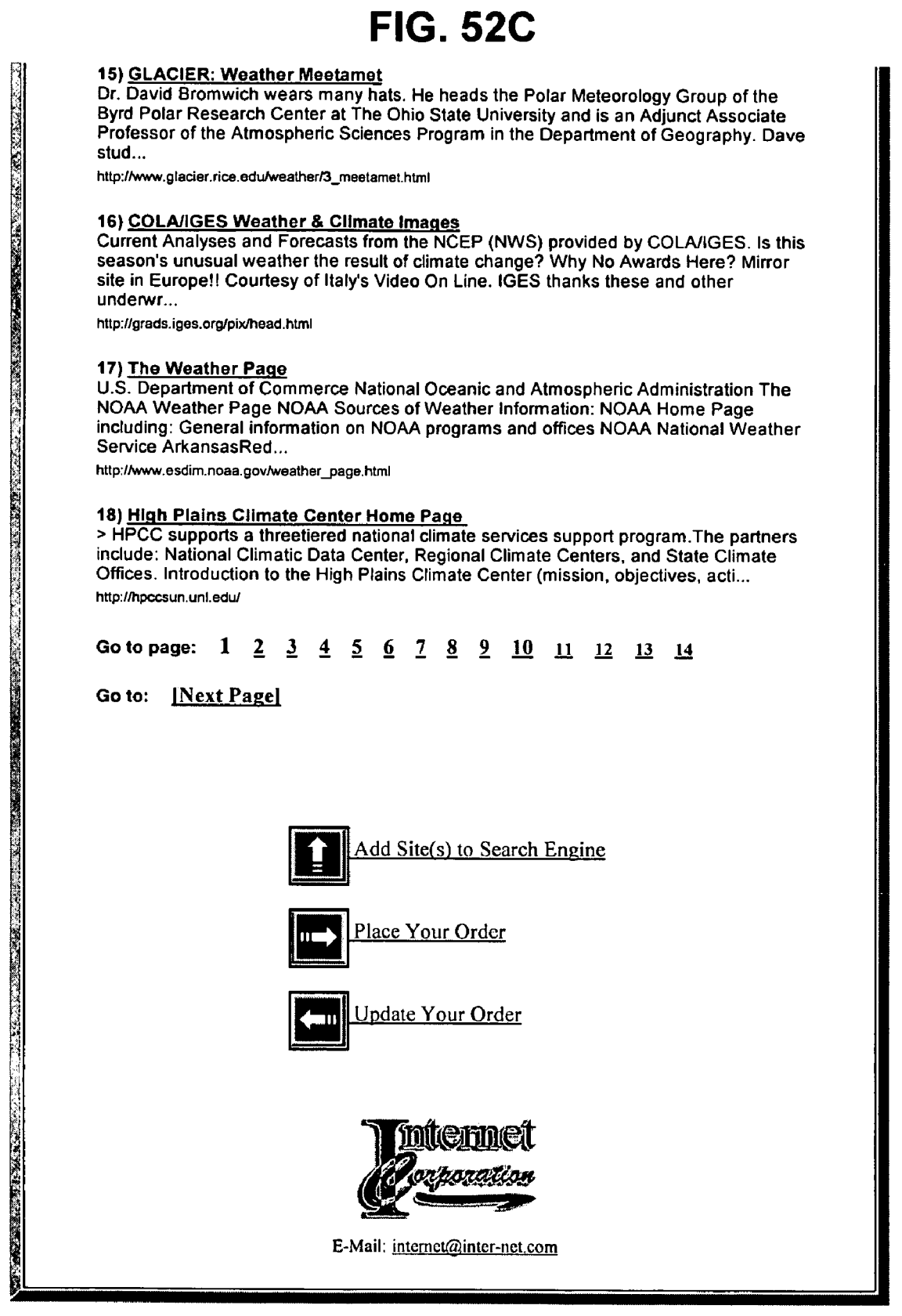

15) GLACIER: Weather Meetamet
Dr. David Bromwich wears many hats. He heads the Polar Meteorology Group of the Byrd Polar Research Center at The Ohio State University and is an Adjunct Associate Professor of the Atmospheric Sciences Program in the Department of Geography. Dave stud...
http://www.glacier.rice.edu/weather/3_meetamet.html

16) COLA/IGES Weather & Climate Images
Current Analyses and Forecasts from the NCEP (NWS) provided by COLA/IGES. Is this season's unusual weather the result of climate change? Why No Awards Here? Mirror site in Europe!! Courtesy of Italy's Video On Line. IGES thanks these and other underwr...
http://grads.iges.org/pix/head.html

17) The Weather Page
U.S. Department of Commerce National Oceanic and Atmospheric Administration The NOAA Weather Page NOAA Sources of Weather Information: NOAA Home Page including: General information on NOAA programs and offices NOAA National Weather Service ArkansasRed...
http://www.esdim.noaa.gov/weather_page.html

18) High Plains Climate Center Home Page
> HPCC supports a threetiered national climate services support program.The partners include: National Climatic Data Center, Regional Climate Centers, and State Climate Offices. Introduction to the High Plains Climate Center (mission, objectives, acti...
http://hpccsun.unl.edu/

Go to page: 1 2 3 4 5 6 7 8 9 10 11 12 13 14

Go to: [Next Page]

Add Site(s) to Search Engine

Place Your Order

Update Your Order

Internet Corporation

E-Mail: internet@inter-net.com

FIG. 112B

Foreign Correspondent
Usually ships in 24 hours
by Christopher S. Wren(Hardcover - November 2000)
Amazon Price: $16.80...
http://www.amazon.com/exec/obidos/ASIN/0684871009/qid=981919552/s... (amazon 3)

I) 10) Accreditation of Teacher Education: The Story of CATE 1984-1989
In stock - ships in 24 hours
MacIntyre, Gordon ~ Trade Paperback ~ 1991
Borders Price: $34.95 ...
http://search.borders.com/fcgi-bin/db2www/search/search.d2w/Detai... (borders 3)

I) 11) 2001 Hello Kitty Wall Calendar
In Stock: 24 hours.
Cal 2001' (Illustrator) / Wall Calendar / Abrams,Harry N Inc / June 2000
B&N Price: $4.97 ~ You Save 50%...
http://shop.barnesandnoble.com/booksearch/isbnInquiry.asp?userid=... (barnesandnoble 3)

I) 12) Feral Cat Coalition
Feral Cat Coalition. San Diego, California. Please follow these links for more information on the subject: Feral Cat Coalition Documents. ...
http://www.feralcat.com/ (google 3)

I) 13) Cracking the Gmat 2001 (Cracking the Gmat Cat With Sample Tests on Cd-Rom)
Usually ships in 24 hours
by Martz, Geoff Martz(Paperback - June 2000)
Amazon Price: $27.96...
http://www.amazon.com/exec/obidos/ASIN/0375756248/qid=981919552/s... (amazon 4)

I) 14) Adopting Cats & Kittens: A Care & Training Guide
Ships within 2-3 days
Jankowski, Connie ~ Trade Paperback ~ 1993
Borders Price: $7.20 ~ You Save: $0.80 (10%)...
http://search.borders.com/fcgi-bin/db2www/search/search.d2w/Detai... (borders 4)

I) 15) The Cat Who Smelled a Rat
In Stock: 24 hours (Same Day).
Lilian Jackson Braun / Hardcover / Penguin Putnam / January 2001
B&N Price: $19.16 ~ You Save 20%...
http://shop.barnesandnoble.com/booksearch/isbnInquiry.asp?userid=... (barnesandnoble 4)

I) 16) Cat Fancy
or killed playing with toy mice distributed in packages of Fresh Step cat litter, Clorox Co., Oakland, Calif., warned pet owners the toys could strangle or cut ...
http://www.animalnetwork.com/cats/default.asp (google 4)

I) 17) Eating the Cheshire Cat
Usually ships in 24 hours
by Helen Ellis(Paperback - February 2001)
Amazon Price: $10.40...
http://www.amazon.com/exec/obidos/ASIN/068486441X/qid=981919552/s... (amazon 5)

I) 18) Alfie & the Birthday Surprise
In stock - ships in 24 hours
Hughes, Shirley ~ Hardcover ~ 1998
Borders Price: $12.80 ~ You Save: $3.20 (20%)...
http://search.borders.com/fcgi-bin/db2www/search/search.d2w/Detai... (borders 5)

I) 19) The Cat in the Hat (Classic Gift Seuss Series)
In Stock: 24 hours (Same Day).
Dr. Seuss / Hardcover / Random House, Incorporated / May 1976
B&N Price: $6.39 ~ You Save 20%...
http://shop.barnesandnoble.com/booksearch/isbnInquiry.asp?userid=... (barnesandnoble 5)

I) 20) Cat Tales Zoological Park
LATEST UPDATE: October 20, 2000. Ca t Tales Zoological P ark. Do you have what it takes to become a zookeeper? Cat Tales Zoological Training Center. ...
http://www.cattales.org/ (google 5)

I) 21) Cat Heaven
Usually ships in 24 hours
by Cynthia Rylant(Illustrator)(School & Library Binding - September 1997)
Amazon Price: $12.76...
http://www.amazon.com/exec/obidos/ASIN/0590100548/qid=981919552/s... (amazon 6)

I) 22) All about Himalayan Cats
In stock - ships in 24 hours
Bearley, Joan M. ~ Hardcover ~ 1989
Borders Price: $14.36 ~ You Save: $3.59 (20%)...
http://search.borders.com/fcgi-bin/db2www/search/search.d2w/Detai... (borders 6)

FIG. 112C

I) 23) How to Live with a Neurotic Cat
In Stock: 24 hours (Same Day).
Stephen Baker / Hardcover / Random House Value Publishing, Incorporated / September 1999
B&N Price: $7.99...
http://shop.barnesandnoble.com/booksearch/isbnInquiry.asp?userid=... (barnesandnoble 6)

I) 24) Beware of Cat! HUGE Cat Graphics Collection & Virtual Cat ...
Cat Postcards! Send an electronic Cat Postcard Now! Hundreds of cute cat cards to choose from! Holidays, Kittens, Cartoons, Love & More! Add Music, Backgrounds ...
http://www.geocities.com/Heartland/Meadows/6485/ (google 6)

I) 25) Master the Gre Cat 2001 (Master the Gre, 2001)
Usually ships in 2-3 days
by Thomas H. Martinson(Paperback - November 2000)
Amazon Price: $11.16...
http://www.amazon.com/exec/obidos/ASIN/0764561197/qid=981919552/s... (amazon 7)

I) 26) Aloha, Dolores
In stock - ships in 24 hours
Samuels, Barbara ~ Hardcover ~ 2000
Borders Price: $12.76 ~ You Save: $3.19 (20%)...
http://search.borders.com/fcgi-bin/db2www/search/search.d2w/Detai... (borders 7)

I) 27) 2001 Classic Cats Wall Calendar
In Stock: 24 hours.
Cal 2001 / Wall Calendar / June 2000
B&N Price: $5.97 ~ You Save 50%...
http://shop.barnesandnoble.com/booksearch/isbnInquiry.asp?userid=... (barnesandnoble 7)

I) 28) Arctic Cat > What Drives You to the Great Outdoors?
Arctic Cat. Snowmobile ATV Watercraft Generators Catalogs. What's new on the site? Click ...
http://www.arctic-cat.com/ (google 7)

I) 29) Pawing Through the Past (Age of Unreason)
Usually ships in 24 hours
by Rita Mae Brown, Sneaky Pie Brown(Mass Market Paperback - January 2001)
Amazon Price: $6.29...
http://www.amazon.com/exec/obidos/ASIN/0553580256/qid=981919552/s... (amazon 8)

I) 30) Animal Clinic for Cats
In stock - ships in 24 hours
Humphries, Jim ~ Hardcover ~ 1998
Borders Price: $6.39 ~ You Save: $1.60 (20%)...
http://search.borders.com/fcgi-bin/db2www/search/search.d2w/Detai... (borders 8)

I) 31) Cracking the GMAT CAT with CD-ROM, 2001 Edition
In-Stock: Ships 2-3 days.
Geoff Martz / Paperback / Princeton Review Publishing Corporation / June 2000
B&N Price: $27.96 ~ You Save 20%...
http://shop.barnesandnoble.com/booksearch/isbnInquiry.asp?userid=... (barnesandnoble 8)

I) 32) Cat-Scan.Com - The Cover Page
Welcome to CliffyB's Cat-Scan! Cat-Scan is home to people who love art as much as their cats. So much so, they combine the two! Every weekday we'll bring you ...
http://www.cat-scan.com/ (google 8)

I) 33) The Cat Who Smelled a Rat [ABRIDGED]
Usually ships in 24 hours
by Lilian Jackson Braun(Audio Cassette - January 2001)
Amazon Price: $16.15...
http://www.amazon.com/exec/obidos/ASIN/0399146814/qid=981919552/s... (amazon 9)

I) 34) Arthur's World of Cats
In stock - ships in 24 hours
Head, Ann ~ Hardcover ~ 1997
Borders Price: $18.36 ~ You Save: $4.59 (20%)...
http://search.borders.com/fcgi-bin/db2www/search/search.d2w/Detai... (borders 9)

I) 35) Cracking the GRE CAT with CD-ROM, 2001 Edition
In Stock: 24 hours (Same Day).
Karen Lurie / Paperback / Princeton Review Publishing Corporation / June 2000
B&N Price: $24.80 ~ You Save 20%...
http://shop.barnesandnoble.com/booksearch/isbnInquiry.asp?userid=... (barnesandnoble 9)

I) 36) TICA Website
WELCOME TO THE WEB SITE OF THE INTERNATIONAL CAT ASSOCIATION To Navigate the Site Frames No Frames Please See this page as a Shockwave movie. ...
http://www.tica.org/ (google 9)

FIG. 112D

I) 37) Textbook of Veterinary Internal Medicine: Diseases of the Dog and Cat (2-Volume Set)
Usually ships in 24 hours
by Stephen J. Ettinger(Editor), Edward C. Feldman(Editor)(Hardcover)
Amazon Price: $195.00...
http://www.amazon.com/exec/obidos/ASIN/0721672566/qid=981919552/s... (amazon 10)

I) 38) Bedtime Stories for Cats
In stock - ships in 24 hours
Jasheway, Leigh A. ~ Hardcover ~ 1997
Borders Price: $7.96 ~ You Save: $1.99 (20%)...
http://search.borders.com/fcgi-bin/db2www/search/search.d2w/Detai... (borders 10)

I) 39) Cat's Letters to Santa
In Stock: 24 hours (Same Day).
Bill Adler (Editor),Paul Bacon (Illustrator) / Hardcover / Galahad Books / September 1997
B&N Price: $2.99 ~ You Save 50%...
http://shop.barnesandnoble.com/booksearch/isbnInquiry.asp?userid=... (barnesandnoble 10)

I) 40) Alley Cat Allies
Alley Cat Allies Has a Better Idea. M odeled after successful programs in the United Kingdom and parts of Africa and Europe, Alley Cat Allies (ACA) advocates a ...
http://www.alleycat.org/ (google 10)

Query: Mouse

I) 1) If You Give a Mouse a Cookie
Usually ships in 24 hours
by Felicia Bond(Illustrator), Laura Joffe Numeroff(Hardcover - May 1985)
Amazon Price: $12.76...
http://www.amazon.com/exec/obidos/ASIN/0060245867/qid=981919552/s... (amazon 1)

I) 2) If You Take a Mouse to the Movies
In Stock: 24 hours.
Laura Joffe Numeroff,Felicia Bond (Illustrator) / Hardcover / HarperCollins Children's Books / September 2000
B&N Price: $12.76 ~ You Save 20%...
http://shop.barnesandnoble.com/booksearch/isbnInquiry.asp?userid=... (barnesandnoble 1)

I) 3) If You Take a Mouse to the Movies
Usually ships in 24 hours
by Felicia Bond(Illustrator), Laura Joffe Numeroff(Hardcover - October 2000)
Amazon Price: $12.76...
http://www.amazon.com/exec/obidos/ASIN/0060278676/qid=981919552/s... (amazon 2)

I) 4) Santa Mouse
In Stock: 24 hours (Same Day).
Michael Brown,Elfrieda DeWitt (Illustrator) / Hardcover / Barnes & Noble Books / August 1996
B&N Price: $2.49 ~ You Save 50%...
http://shop.barnesandnoble.com/booksearch/isbnInquiry.asp?userid=... (barnesandnoble 2)

I) 5) What's Wrong with My Mouse?: Behavioral Phenotyping of Transgenic and Knockout Mice
Usually ships in 24 hours
by Jacqueline N., Phd Crawley(Hardcover)
Amazon Price: $79.95...
http://www.amazon.com/exec/obidos/ASIN/0471316393/qid=981919552/s... (amazon 3)

I) 6) If You Give a Mouse a Cookie
In Stock: 24 hours (Same Day).
Laura Joffe Numeroff,Felicia Bond (Illustrator) / Hardcover / HarperCollins Children's Books / January 1985
B&N Price: $11.96 ~ You Save 20%...
http://shop.barnesandnoble.com/booksearch/isbnInquiry.asp?userid=... (barnesandnoble 3)

I) 7) The Atlas of the Mouse Development
Usually ships in 24 hours
by Matthew H. Kaufman(Hardcover - October 1997)
Amazon Price: $225.00...
http://www.amazon.com/exec/obidos/ASIN/0124020356/qid=981919552/s... (amazon 4)

I) 8) Santa Mouse Where Are You
In Stock: 24 hours (Same Day).
Michael Brown,Elfrieda DeWitt (Illustrator) / Hardcover / Barnes & Noble Books / August 1997
B&N Price: $2.49 ~ You Save 50%...
http://shop.barnesandnoble.com/booksearch/isbnInquiry.asp?userid=... (barnesandnoble 4)

FIG. 112E

I) 9) The Mouse of Amherst
Usually ships in 24 hours
by Elizabeth Spires, Claire A. Nivola(Illustrator)(Hardcover - March 1999)
Amazon Price: $12.00...
http://www.amazon.com/exec/obidos/ASIN/0374350833/qid=981919552/s... (amazon 5)

I) 10) Santa Mouse Coloring and Pencil Puzzle Book
In Stock: 24 hours (Same Day).
Michael Brown / Paperback / Barnes & Noble Books / July 1999
B&N Price: $1.49 ~ You Save 50%...
http://shop.barnesandnoble.com/booksearch/isbnInquiry.asp?userid=... (barnesandnoble 5)

I) 11) Cat & Mouse
Usually ships in 24 hours
by James Patterson(Mass Market Paperback - October 2000)
Amazon Price: $7.19...
http://www.amazon.com/exec/obidos/ASIN/0446606189/qid=981919552/s... (amazon 6)

I) 12) The Mouse and the Motorcycle
In Stock: 24 hours (Same Day).
Beverly Cleary,Louis Darling (Illustrator) / Paperback / Morrow,William & Co / August 1990
B&N Price: $4.45 ~ You Save 10%...
http://shop.barnesandnoble.com/booksearch/isbnInquiry.asp?userid=... (barnesandnoble 6)

I) 13) The Anatomical Basis of Mouse Development
Usually ships in 24 hours
by Matthew H. Kaufman, Jonathan B. L. Bard(Hardcover - March 1999)
Amazon Price: $99.95...
http://www.amazon.com/exec/obidos/ASIN/0124020607/qid=981919552/s... (amazon 7)

I) 14) Cat & Mouse
In Stock: 24 hours (Same Day).
James Patterson / Mass Market Paperback / Warner Books, Incorporated / October 1998
B&N Price: $7.19 ~ You Save 10%...
http://shop.barnesandnoble.com/booksearch/isbnInquiry.asp?userid=... (barnesandnoble 7)

I) 15) Mouse Count
Usually ships in 24 hours
by Ellen Stoll Walsh(Paperback - March 1995)
Amazon Price: $4.95...
http://www.amazon.com/exec/obidos/ASIN/0152002235/qid=981919552/s... (amazon 8)

I) 16) If You Give a Mouse a Cookie Mini Book and Ornament
In Stock: 24 hours.
Laura Joffe Numeroff,Felicia Bond (Illustrator) / Hardcover / HarperCollins Children's Books / September 2000
B&N Price: $7.96 ~ You Save 20%...
http://shop.barnesandnoble.com/booksearch/isbnInquiry.asp?userid=... (barnesandnoble 8)

I) 17) Mouse Count
Usually ships in 1-2 weeks
by Ellen Stoll Walsh, Diane D'Andrade(Editor)(School & Library Binding - March 1991)
Amazon Price: $10.40...
http://www.amazon.com/exec/obidos/ASIN/0152560238/qid=981919552/s... (amazon 9)

I) 18) Craft Lessons: Teaching Writing K through 8
In Stock: 24 hours.
Ralph J. Fletcher,Joann Portalupi / Paperback / Stenhouse Publishers / September 1998
B&N Price: $17.50...
http://shop.barnesandnoble.com/booksearch/isbnInquiry.asp?userid=... (barnesandnoble 9)

I) 19) Ben and Me : A New and Astonishing Life of Benjamin Franklin As Written by His Good Mouse Amos
Usually ships in 24 hours
by Robert Lawson(Illustrator)(Paperback - April 1988)
Amazon Price: $5.35...
http://www.amazon.com/exec/obidos/ASIN/0316517305/qid=981919552/s... (amazon 10)

I) 20) Disney's Toy Story: Movie Storybook
In Stock: 24 hours (Same Day).
Mouse Works Staff / Hardcover / Disney Enterprises, Incorporated / May 2000
B&N Price: $3.98 ~ You Save 42%...
http://shop.barnesandnoble.com/booksearch/isbnInquiry.asp?userid=... (barnesandnoble 10)

Query: Dog

I) 1) The Stray Dog
Usually ships in 24 hours
by Marc Simont(Illustrator), Reiko Sassa(Hardcover - January 2001)
Amazon Price: $12.76...
http://www.amazon.com/exec/obidos/ASIN/0060289333/qid=981919552/s... (amazon 1)

FIG. 112F

I) 2) Clifford's First Valentine's Day
In-Stock: Ships 2-3 days.
Norman Bridwell / Paperback / Scholastic, Inc. / November 1996
B&N Price: $2.69 ~ You Save 10%...
http://shop.barnesandnoble.com/booksearch/isbnInquiry.asp?userid=... (barnesandnoble 1)

I) 3) A-Z of Dog Diseases & Health Problems
In stock - ships in 24 hours
Lane, Dick ~ Trade Paperback ~ 1997
Borders Price: $22.46 ~ You Save: $2.49 (10%)...
http://search.borders.com/fcgi-bin/db2www/search/search.d2w/Detai... (borders 1)

I) 4) Going for the Blue: Inside the World of Show Dogs and Dog Shows
Usually ships in 24 hours
by Roger A. Caras(Hardcover - February 2001)
Amazon Price: $20.76...
http://www.amazon.com/exec/obidos/ASIN/0446526444/qid=981919552/s... (amazon 2)

I) 5) 2001 William Wegman Puppies Wall Calendar
In Stock: 24 hours.
Cal 2001 / Wall Calendar / Abrams,Harry N Inc / June 2000
B&N Price: $5.47 ~ You Save 50%...
http://shop.barnesandnoble.com/booksearch/isbnInquiry.asp?userid=... (barnesandnoble 2)

I) 6) Adopting the Racing Greyhound
In stock - ships in 24 hours
Branigan, Cynthia A. ~ Trade Paperback ~ 1998
Borders Price: $11.66 ~ You Save: $1.29 (10%)...
http://search.borders.com/fcgi-bin/db2www/search/search.d2w/Detai... (borders 2)

I) 7) Let the Big Dog Eat : A Dictionary of the Secret Language of Golf
Usually ships in 24 hours
by Hubert Pedroli, et al(Hardcover - June 2000)
Amazon Price: $14.40...
http://www.amazon.com/exec/obidos/ASIN/0688175767/qid=981919552/s... (amazon 3)

I) 8) Where the Red Fern Grows
In Stock: 24 hours (Same Day).
Wilson Rawls / Mass Market Paperback / Bantam Books, Incorporated / May 1981
B&N Price: $5.39 ~ You Save 10%...
http://shop.barnesandnoble.com/booksearch/isbnInquiry.asp?userid=... (barnesandnoble 3)

I) 9) Advanced Gundog Training: Practical Fieldwork & Competition
In stock - ships in 24 hours
Deeley, Martin ~ Hardcover ~ 1994
Borders Price: $27.96 ~ You Save: $6.99 (20%)...
http://search.borders.com/fcgi-bin/db2www/search/search.d2w/Detai... (borders 3)

I) 10) Dog Heaven
Usually ships in 24 hours
by Cynthia Rylant(Illustrator)(School & Library Binding - September 1995)
Amazon Price: $12.76...
http://www.amazon.com/exec/obidos/ASIN/0590417010/qid=981919552/s... (amazon 4)

I) 11) How to Live with a Neurotic Dog
In Stock: 24 hours (Same Day).
Stephen Baker,Fred Hilliard (Illustrator) / Hardcover / Random House, Incorporated / February 1995
B&N Price: $7.99...
http://shop.barnesandnoble.com/booksearch/isbnInquiry.asp?userid=... (barnesandnoble 4)

I) 12) Agility Training: The Fun Sport for All Dogs
In stock - ships in 24 hours
Simmons-Moake, Jane ~ Trade Paperback ~ 1992
Borders Price: $23.36 ~ You Save: $2.59 (10%)...
http://search.borders.com/fcgi-bin/db2www/search/search.d2w/Detai... (borders 4)

I) 13) Family Dog : 16 Weeks to a Well-Mannered Dog-A Simple and Time-Proven Method
Usually ships in 24 hours
by Richard A. Wolters, Red Smith(Introduction)(Hardcover - February 1999)
Amazon Price: $22.36...
http://www.amazon.com/exec/obidos/ASIN/0525944729/qid=981919552/s... (amazon 5)

I) 14) 2001 Original 365 Dogs Page-A-Day Calendar
In Stock: 24 hours.
Cal 2001 / Box Calendar / Workman Publishing Company, Inc. / August 2000
B&N Price: $5.47 ~ You Save 50%...
http://shop.barnesandnoble.com/booksearch/isbnInquiry.asp?userid=... (barnesandnoble 5)

FIG. 112G

I) 15) American Staffordshire Terrier: Gamester & Guardian
In stock - ships in 24 hours
Foster, Sarah ~ Trade Paperback ~ 1998
Borders Price: $22.46 ~ You Save: $2.49 (10%)...
http://search.borders.com/fcgi-bin/db2www/search/search.d2w/Detai... (borders 5)

I) 16) Dog Training for Dummies (For Dummies)
Usually ships in 24 hours
by John Volhard, et al(Paperback - January 2001)
Amazon Price: $17.59...
http://www.amazon.com/exec/obidos/ASIN/0764552864/qid=981919552/s... (amazon 6)

I) 17) 2001 Man's Best Friend Wall Calendar
In Stock: 24 hours.
Cal 2001,William Wegman (Photographer) / Wall Calendar / Abrams,Harry N Inc / June 2000
B&N Price: $6.47 ~ You Save 50%...
http://shop.barnesandnoble.com/booksearch/isbnInquiry.asp?userid=... (barnesandnoble 6)

I) 18) Anastasia, Absolutely
In stock - ships in 24 hours
Lowry, Lois ~ Hardcover ~ 1995
Borders Price: $12.80 ~ You Save: $3.20 (20%)...
http://search.borders.com/fcgi-bin/db2www/search/search.d2w/Detai... (borders 6)

I) 19) Stone Fox (Harper Trophy Book)
Usually ships in 24 hours
by John Reynolds Gardiner, Marcia Sewall(Illustrator)(Paperback - February 1988)
Amazon Price: $4.45...
http://www.amazon.com/exec/obidos/ASIN/0064401324/qid=981919552/s... (amazon 7)

I) 20) Tigers at Twilight: (Magic Tree House Series #19)
In Stock: 24 hours (Same Day).
Mary Pope Osborne,Sal Murdocca (Illustrator) / Paperback / Random House Books for Young Readers / August 1999
B&N Price: $3.59 ~ You Save 10%...
http://shop.barnesandnoble.com/booksearch/isbnInquiry.asp?userid=... (barnesandnoble 7)

I) 21) Animal Clinic for Dogs
In stock - ships in 24 hours
Humphries, Jim ~ Hardcover ~ 1998
Borders Price: $6.39 ~ You Save: $1.60 (20%)...
http://search.borders.com/fcgi-bin/db2www/search/search.d2w/Detai... (borders 7)

I) 22) How to Be Your Dog's Best Friend : A Training Manual for Dog Owners
Usually ships in 24 hours
by New Skete Monks, et al(Hardcover - October 1978)
Amazon Price: $19.16...
http://www.amazon.com/exec/obidos/ASIN/0316604917/qid=981919552/s... (amazon 8)

I) 23) Clifford: The Big Red Dog
In Stock: 24 hours (Same Day).
Norman Bridwell / Board Book / Scholastic, Inc. / July 1997
B&N Price: $4.79 ~ You Save 20%...
http://shop.barnesandnoble.com/booksearch/isbnInquiry.asp?userid=... (barnesandnoble 8)

I) 24) Baby Animals: Puppies
In stock - ships in 24 hours
Petty, Kate ~ Trade Paperback ~ 1992
Borders Price: $3.56 ~ You Save: $0.39 (10%)...
http://search.borders.com/fcgi-bin/db2www/search/search.d2w/Detai... (borders 8)

I) 25) The Dog Owners Home Veterinary Handbook
Usually ships in 2-3 days
by James M. Giffin, et al(Hardcover - November 1999)
Amazon Price: $22.36...
http://www.amazon.com/exec/obidos/ASIN/0876052014/qid=981919552/s... (amazon 9)

I) 26) Ginger Pye
In Stock: 24 hours (Same Day).
Eleanor Estes / Paperback / Harcourt / September 2000
B&N Price: $5.40 ~ You Save 10%...
http://shop.barnesandnoble.com/booksearch/isbnInquiry.asp?userid=... (barnesandnoble 9)

I) 27) Baby's Memory Book: A Baby Record Book
In stock - ships in 24 hours
Nister, Ernest ~ Hardcover ~ 1986
Borders Price: $15.99 ~ You Save: $4.00 (20%)...
http://search.borders.com/fcgi-bin/db2www/search/search.d2w/Detai... (borders 9)

I) 28) How to Housebreak Your Dog in 7 Days

FIG. 114B

I) 9) The Cat in the Hat (Classic Gift Seuss Series)
In Stock: 24 hours (Same Day).
Dr. Seuss / Hardcover / Random House, Incorporated / May 1976
B&N Price: $6.39 ~ You Save 20%...
http://shop.barnesandnoble.com/booksearch/isbnInquiry.asp?userid=... (barnesandnoble)

I) 10) Adopting Cats & Kittens: A Care & Training Guide
Ships within 2-3 days
Jankowski, Connie ~ Trade Paperback ~ 1993
Borders Price: $7.20 ~ You Save: $0.80 (10%)...
http://search.borders.com/fcgi-bin/db2www/search/search.d2w/Detai... (borders)

I) 11) Bedtime Stories for Cats
In stock - ships in 24 hours
Jasheway, Leigh A. ~ Hardcover ~ 1997
Borders Price: $7.96 ~ You Save: $1.99 (20%)...
http://search.borders.com/fcgi-bin/db2www/search/search.d2w/Detai... (borders)

I) 12) How to Live with a Neurotic Cat
In Stock: 24 hours (Same Day).
Stephen Baker / Hardcover / Random House Value Publishing, Incorporated / September 1999
B&N Price: $7.99...
http://shop.barnesandnoble.com/booksearch/isbnInquiry.asp?userid=... (barnesandnoble)

I) 13) 250 Things You Can Do to Make Your Cat Adore You
In stock - ships in 24 hours
Newkirk, Ingrid ~ Trade Paperback ~ 1998
Borders Price: $9.90 ~ You Save: $1.10 (10%)...
http://search.borders.com/fcgi-bin/db2www/search/search.d2w/Detai... (borders)

I) 14) Eating the Cheshire Cat
Usually ships in 24 hours
by Helen Ellis(Paperback - February 2001)
Amazon Price: $10.40...
http://www.amazon.com/exec/obidos/ASIN/068486441X/qid=981919741/s... (amazon)

I) 15) Master the Gre Cat 2001 (Master the Gre, 2001)
Usually ships in 2-3 days
by Thomas H. Martinson(Paperback - November 2000)
Amazon Price: $11.16...
http://www.amazon.com/exec/obidos/ASIN/0764561197/qid=981919741/s... (amazon)

I) 16) Aloha, Dolores
In stock - ships in 24 hours
Samuels, Barbara ~ Hardcover ~ 2000
Borders Price: $12.76 ~ You Save: $3.19 (20%)...
http://search.borders.com/fcgi-bin/db2www/search/search.d2w/Detai... (borders)

I) 17) Cat Heaven
Usually ships in 24 hours
by Cynthia Rylant(Illustrator)(School & Library Binding - September 1997)
Amazon Price: $12.76...
http://www.amazon.com/exec/obidos/ASIN/0590100548/qid=981919741/s... (amazon)

I) 18) Alfie & the Birthday Surprise
In stock - ships in 24 hours
Hughes, Shirley ~ Hardcover ~ 1998
Borders Price: $12.80 ~ You Save: $3.20 (20%)...
http://search.borders.com/fcgi-bin/db2www/search/search.d2w/Detai... (borders)

I) 19) All about Himalayan Cats
In stock - ships in 24 hours
Bearley, Joan M. ~ Hardcover ~ 1989
Borders Price: $14.36 ~ You Save: $3.59 (20%)...
http://search.borders.com/fcgi-bin/db2www/search/search.d2w/Detai... (borders)

I) 20) The Cat Who Smelled a Rat [ABRIDGED]
Usually ships in 24 hours
by Lilian Jackson Braun(Audio Cassette - January 2001)
Amazon Price: $16.15...
http://www.amazon.com/exec/obidos/ASIN/0399146814/qid=981919741/s... (amazon)

I) 21) The Cat Who Covered the World : The Adventures of Henrietta and Her Foreign Correspondent
Usually ships in 24 hours
by Christopher S. Wren(Hardcover - November 2000)
Amazon Price: $16.80...
http://www.amazon.com/exec/obidos/ASIN/0684871009/qid=981919741/s... (amazon)

FIG. 114C

I) 22) Arthur's World of Cats
In stock - ships in 24 hours
Head, Ann ~ Hardcover ~ 1997
Borders Price: $18.36 ~ You Save: $4.59 (20%)...
http://search.borders.com/fcgi-bin/db2www/search/search.d2w/Detai... (borders)

I) 23) The Cat Who Smelled a Rat
In Stock: 24 hours (Same Day).
Lilian Jackson Braun / Hardcover / Penguin Putnam / January 2001
B&N Price: $19.16 ~ You Save 20%...
http://shop.barnesandnoble.com/booksearch/isbnInquiry.asp?userid=... (barnesandnoble)

I) 24) The Cat Who Smelled a Rat
Usually ships in 24 hours
by Lilian Jackson Braun(Hardcover - January 2001)
Amazon Price: $19.16...
http://www.amazon.com/exec/obidos/ASIN/0399146652/qid=981919741/s... (amazon)

I) 25) Cracking the GRE CAT with CD-ROM, 2001 Edition
In Stock: 24 hours (Same Day).
Karen Lurie / Paperback / Princeton Review Publishing Corporation / June 2000
B&N Price: $24.80 ~ You Save 20%...
http://shop.barnesandnoble.com/booksearch/isbnInquiry.asp?userid=... (barnesandnoble)

I) 26) Cracking the Gmat 2001 (Cracking the Gmat Cat With Sample Tests on Cd-Rom)
Usually ships in 24 hours
by Martz, Geoff Martz(Paperback - June 2000)
Amazon Price: $27.96...
http://www.amazon.com/exec/obidos/ASIN/0375756248/qid=981919741/s... (amazon)

I) 27) Cracking the GMAT CAT with CD-ROM, 2001 Edition
In-Stock: Ships 2-3 days.
Geoff Martz / Paperback / Princeton Review Publishing Corporation / June 2000
B&N Price: $27.96 ~ You Save 20%...
http://shop.barnesandnoble.com/booksearch/isbnInquiry.asp?userid=... (barnesandnoble)

I) 28) Gmat 2000-2001 (Gmat Cat (Kaplan)(Book & Cd-Rom))
Usually ships in 24 hours
(Paperback - March 2000)
Amazon Price: $29.60...
http://www.amazon.com/exec/obidos/ASIN/0684870088/qid=981919741/s... (amazon)

I) 29) Accreditation of Teacher Education: The Story of CATE 1984-1989
In stock - ships in 24 hours
MacIntyre, Gordon ~ Trade Paperback ~ 1991
Borders Price: $34.95 ...
http://search.borders.com/fcgi-bin/db2www/search/search.d2w/Detai... (borders)

I) 30) Textbook of Veterinary Internal Medicine: Diseases of the Dog and Cat (2-Volume Set)
Usually ships in 24 hours
by Stephen J. Ettinger(Editor), Edward C. Feldman(Editor)(Hardcover)
Amazon Price: $195.00...
http://www.amazon.com/exec/obidos/ASIN/0721672566/qid=981919741/s... (amazon)

I) 31) Alley Cat Allies
Alley Cat Allies Has a Better Idea. M odeled after successful programs in the United Kingdom and parts of Africa and Europe, Alley Cat Allies (ACA) advocates a ...
http://www.alleycat.org/ (google)

I) 32) Arctic Cat > What Drives You to the Great Outdoors?
Arctic Cat. Snowmobile ATV Watercraft Generators Catalogs. What's new on the site? Click ...
http://www.arctic-cat.com/ (google)

I) 33) Beware of Cat! HUGE Cat Graphics Collection & Virtual Cat ...
Cat Postcards! Send an electronic Cat Postcard Now! Hundreds of cute cat cards to choose from! Holidays, Kittens, Cartoons, Love & More! Add Music, Backgrounds ...
http://www.geocities.com/Heartland/Meadows/6485/ (google)

I) 34) Cat-Scan.Com - The Cover Page
Welcome to CliffyB's Cat-Scan! Cat-Scan is home to people who love art as much as their cats. So much so, they combine the two! Every weekday we'll bring you ...
http://www.cat-scan.com/ (google)

I) 35) Cat Fanciers Web Site
Welcome to the Cat Fanciers Web Site! We offer General Information about Cats and Cat Care,. Cat Breed Descriptions from Abyssinian to Turkish Van,. ...
http://www.fanciers.com/ (google)

FIG. 114D

I) 36) Cat Fancy
or killed playing with toy mice distributed in packages of Fresh Step cat litter, Clorox Co., Oakland, Calif., warned pet owners the toys could strangle or cut ...
http://www.animalnetwork.com/cats/default.asp (google)

I) 37) Cat Tales Zoological Park
LATEST UPDATE: October 20, 2000. Ca t Tales Zoological P ark. Do you have what it takes to become a zookeeper? Cat Tales Zoological Training Center. ...
http://www.cattales.org/ (google)

I) 38) Feral Cat Coalition
Feral Cat Coalition. San Diego, California. Please follow these links for more information on the subject: Feral Cat Coalition Documents. ...
http://www.feralcat.com/ (google)

I) 39) The Cat Fanciers' Association (CFA)
Welcome to the Cat Fanciers' Association, the world's largest registry of pedigreed cats! ...
http://www.cfainc.org/ (google)

I) 40) TICA Website
WELCOME TO THE WEB SITE OF THE INTERNATIONAL CAT ASSOCIATION To Navigate the Site Frames No Frames Please See this page as a Shockwave movie. ...
http://www.tica.org/ (google)

Query: Mouse

I) 1) Santa Mouse Coloring and Pencil Puzzle Book
In Stock: 24 hours (Same Day).
Michael Brown / Paperback / Barnes & Noble Books / July 1999
B&N Price: $1.49 ~ You Save 50%...
http://shop.barnesandnoble.com/booksearch/isbnInquiry.asp?userid=... (barnesandnoble)

I) 2) Santa Mouse
In Stock: 24 hours (Same Day).
Michael Brown,Elfrieda DeWitt (Illustrator) / Hardcover / Barnes & Noble Books / August 1996
B&N Price: $2.49 ~ You Save 50%...
http://shop.barnesandnoble.com/booksearch/isbnInquiry.asp?userid=... (barnesandnoble)

I) 3) Santa Mouse Where Are You
In Stock: 24 hours (Same Day).
Michael Brown,Elfrieda DeWitt (Illustrator) / Hardcover / Barnes & Noble Books / August 1997
B&N Price: $2.49 ~ You Save 50%...
http://shop.barnesandnoble.com/booksearch/isbnInquiry.asp?userid=... (barnesandnoble)

I) 4) Disney's Toy Story: Movie Storybook
In Stock: 24 hours (Same Day).
Mouse Works Staff / Hardcover / Disney Enterprises, Incorporated / May 2000
B&N Price: $3.98 ~ You Save 42%...
http://shop.barnesandnoble.com/booksearch/isbnInquiry.asp?userid=... (barnesandnoble)

I) 5) The Mouse and the Motorcycle
In Stock: 24 hours (Same Day).
Beverly Cleary,Louis Darling (Illustrator) / Paperback / Morrow,William & Co / August 1990
B&N Price: $4.45 ~ You Save 10%...
http://shop.barnesandnoble.com/booksearch/isbnInquiry.asp?userid=... (barnesandnoble)

I) 6) Mouse Count
Usually ships in 24 hours
by Ellen Stoll Walsh(Paperback - March 1995)
Amazon Price: $4.95...
http://www.amazon.com/exec/obidos/ASIN/0152002235/qid=981919741/s... (amazon)

I) 7) Ben and Me : A New and Astonishing Life of Benjamin Franklin As Written by His Good Mouse Amos
Usually ships in 24 hours
by Robert Lawson(Illustrator)(Paperback - April 1988)
Amazon Price: $5.35...
http://www.amazon.com/exec/obidos/ASIN/0316517305/qid=981919741/s... (amazon)

I) 8) Cat & Mouse
Usually ships in 24 hours
by James Patterson(Mass Market Paperback - October 2000)
Amazon Price: $7.19...
http://www.amazon.com/exec/obidos/ASIN/0446606189/qid=981919741/s... (amazon)

I) 9) Cat & Mouse

FIG. 114E

In Stock: 24 hours (Same Day).
James Patterson / Mass Market Paperback / Warner Books, Incorporated / October 1998
B&N Price: $7.19 ~ You Save 10%...
http://shop.barnesandnoble.com/booksearch/isbnInquiry.asp?userid=... (barnesandnoble)

I) 10) If You Give a Mouse a Cookie Mini Book and Ornament
In Stock: 24 hours.
Laura Joffe Numeroff,Felicia Bond (Illustrator) / Hardcover / HarperCollins Children's Books / September 2000
B&N Price: $7.96 ~ You Save 20%...
http://shop.barnesandnoble.com/booksearch/isbnInquiry.asp?userid=... (barnesandnoble)

I) 11) Mouse Count
Usually ships in 1-2 weeks
by Ellen Stoll Walsh, Diane D'Andrade(Editor)(School & Library Binding - March 1991)
Amazon Price: $10.40...
http://www.amazon.com/exec/obidos/ASIN/0152560238/qid=981919741/s... (amazon)

I) 12) If You Give a Mouse a Cookie
In Stock: 24 hours (Same Day).
Laura Joffe Numeroff,Felicia Bond (Illustrator) / Hardcover / HarperCollins Children's Books / January 1985
B&N Price: $11.96 ~ You Save 20%...
http://shop.barnesandnoble.com/booksearch/isbnInquiry.asp?userid=... (barnesandnoble)

I) 13) The Mouse of Amherst
Usually ships in 24 hours
by Elizabeth Spires, Claire A. Nivola(Illustrator)(Hardcover - March 1999)
Amazon Price: $12.00...
http://www.amazon.com/exec/obidos/ASIN/0374350833/qid=981919741/s... (amazon)

I) 14) If You Give a Mouse a Cookie
Usually ships in 24 hours
by Felicia Bond(Illustrator), Laura Joffe Numeroff(Hardcover - May 1985)
Amazon Price: $12.76...
http://www.amazon.com/exec/obidos/ASIN/0060245867/qid=981919741/s... (amazon)

I) 15) If You Take a Mouse to the Movies
Usually ships in 24 hours
by Felicia Bond(Illustrator), Laura Joffe Numeroff(Hardcover - October 2000)
Amazon Price: $12.76...
http://www.amazon.com/exec/obidos/ASIN/0060278676/qid=981919741/s... (amazon)

I) 16) If You Take a Mouse to the Movies
In Stock: 24 hours.
Laura Joffe Numeroff,Felicia Bond (Illustrator) / Hardcover / HarperCollins Children's Books / September 2000
B&N Price: $12.76 ~ You Save 20%...
http://shop.barnesandnoble.com/booksearch/isbnInquiry.asp?userid=... (barnesandnoble)

I) 17) Craft Lessons: Teaching Writing K through 8
In Stock: 24 hours.
Ralph J. Fletcher,Joann Portalupi / Paperback / Stenhouse Publishers / September 1998
B&N Price: $17.50...
http://shop.barnesandnoble.com/booksearch/isbnInquiry.asp?userid=... (barnesandnoble)

I) 18) What's Wrong with My Mouse?: Behavioral Phenotyping of Transgenic and Knockout Mice
Usually ships in 24 hours
by Jacqueline N., Phd Crawley(Hardcover)
Amazon Price: $79.95...
http://www.amazon.com/exec/obidos/ASIN/0471316393/qid=981919741/s... (amazon)

I) 19) The Anatomical Basis of Mouse Development
Usually ships in 24 hours
by Matthew H. Kaufman, Jonathan B. L. Bard(Hardcover - March 1999)
Amazon Price: $99.95...
http://www.amazon.com/exec/obidos/ASIN/0124020607/qid=981919741/s... (amazon)

I) 20) The Atlas of the Mouse Development
Usually ships in 24 hours
by Matthew H. Kaufman(Hardcover - October 1997)
Amazon Price: $225.00...
http://www.amazon.com/exec/obidos/ASIN/0124020356/qid=981919741/s... (amazon)

Query: Dog

I) 1) Clifford's First Valentine's Day
In-Stock: Ships 2-3 days.
Norman Bridwell / Paperback / Scholastic, Inc. / November 1996
B&N Price: $2.69 ~ You Save 10%...

FIG. 114F http://shop.barnesandnoble.com/booksearch/isbnInquiry.asp?userid=... (barnesandnoble)

I) 2) Baby Animals: Puppies
In stock - ships in 24 hours
Petty, Kate ~ Trade Paperback ~ 1992
Borders Price: $3.56 ~ You Save: $0.39 (10%)...
http://search.borders.com/fcgi-bin/db2www/search/search.d2w/Detai... (borders)

I) 3) Tigers at Twilight: (Magic Tree House Series #19)
In Stock: 24 hours (Same Day).
Mary Pope Osborne,Sal Murdocca (Illustrator) / Paperback / Random House Books for Young Readers / August 1999
B&N Price: $3.59 ~ You Save 10%...
http://shop.barnesandnoble.com/booksearch/isbnInquiry.asp?userid=... (barnesandnoble)

I) 4) Stone Fox (Harper Trophy Book)
Usually ships in 24 hours
by John Reynolds Gardiner, Marcia Sewall(Illustrator)(Paperback - February 1988)
Amazon Price: $4.45...
http://www.amazon.com/exec/obidos/ASIN/0064401324/qid=981919741/s... (amazon)

I) 5) Clifford: The Big Red Dog
In Stock: 24 hours (Same Day).
Norman Bridwell / Board Book / Scholastic, Inc. / July 1997
B&N Price: $4.79 ~ You Save 20%...
http://shop.barnesandnoble.com/booksearch/isbnInquiry.asp?userid=... (barnesandnoble)

I) 6) Where the Red Fern Grows
In Stock: 24 hours (Same Day).
Wilson Rawls / Mass Market Paperback / Bantam Books, Incorporated / May 1981
B&N Price: $5.39 ~ You Save 10%...
http://shop.barnesandnoble.com/booksearch/isbnInquiry.asp?userid=... (barnesandnoble)

I) 7) Ginger Pye
In Stock: 24 hours (Same Day).
Eleanor Estes / Paperback / Harcourt / September 2000
B&N Price: $5.40 ~ You Save 10%...
http://shop.barnesandnoble.com/booksearch/isbnInquiry.asp?userid=... (barnesandnoble)

I) 8) 2001 Original 365 Dogs Page-A-Day Calendar
In Stock: 24 hours.
Cal 2001 / Box Calendar / Workman Publishing Company, Inc. / August 2000
B&N Price: $5.47 ~ You Save 50%...
http://shop.barnesandnoble.com/booksearch/isbnInquiry.asp?userid=... (barnesandnoble)

I) 9) 2001 William Wegman Puppies Wall Calendar
In Stock: 24 hours.
Cal 2001 / Wall Calendar / Abrams,Harry N Inc / June 2000
B&N Price: $5.47 ~ You Save 50%...
http://shop.barnesandnoble.com/booksearch/isbnInquiry.asp?userid=... (barnesandnoble)

I) 10) How to Housebreak Your Dog in 7 Days
Usually ships in 24 hours
by Shirlee Kalstone(Paperback - April 1991)
Amazon Price: $6.29...
http://www.amazon.com/exec/obidos/ASIN/0553346156/qid=981919741/s... (amazon)

I) 11) Animal Clinic for Dogs
In stock - ships in 24 hours
Humphries, Jim ~ Hardcover ~ 1998
Borders Price: $6.39 ~ You Save: $1.60 (20%)...
http://search.borders.com/fcgi-bin/db2www/search/search.d2w/Detai... (borders)

I) 12) 2001 Man's Best Friend Wall Calendar
In Stock: 24 hours.
Cal 2001,William Wegman (Photographer) / Wall Calendar / Abrams,Harry N Inc / June 2000
B&N Price: $6.47 ~ You Save 50%...
http://shop.barnesandnoble.com/booksearch/isbnInquiry.asp?userid=... (barnesandnoble)

I) 13) How to Live with a Neurotic Dog
In Stock: 24 hours (Same Day).
Stephen Baker,Fred Hilliard (Illustrator) / Hardcover / Random House, Incorporated / February 1995
B&N Price: $7.99...
http://shop.barnesandnoble.com/booksearch/isbnInquiry.asp?userid=... (barnesandnoble)

I) 14) Adopting the Racing Greyhound
In stock - ships in 24 hours
Branigan, Cynthia A. ~ Trade Paperback ~ 1998
Borders Price: $11.66 ~ You Save: $1.29 (10%)...
http://search.borders.com/fcgi-bin/db2www/search/search.d2w/Detai... (borders)

FIG. 114G

I) 15) Bark Busters: Solving Your Dog's Behavioral Problems
In stock - ships in 24 hours
Wilson, Sylvia ~ Trade Paperback ~ 1997
Borders Price: $11.66 ~ You Save: $1.29 (10%)...
http://search.borders.com/fcgi-bin/db2www/search/search.d2w/Detai... (borders)

I) 16) Dog Heaven
Usually ships in 24 hours
by Cynthia Rylant(Illustrator)(School & Library Binding - September 1995)
Amazon Price: $12.76...
http://www.amazon.com/exec/obidos/ASIN/0590417010/qid=981919741/s... (amazon)

I) 17) The Stray Dog
Usually ships in 24 hours
by Marc Simont(Illustrator), Reiko Sassa(Hardcover - January 2001)
Amazon Price: $12.76...
http://www.amazon.com/exec/obidos/ASIN/0060289333/qid=981919741/s... (amazon)

I) 18) Anastasia, Absolutely
In stock - ships in 24 hours
Lowry, Lois ~ Hardcover ~ 1995
Borders Price: $12.80 ~ You Save: $3.20 (20%)...
http://search.borders.com/fcgi-bin/db2www/search/search.d2w/Detai... (borders)

I) 19) Let the Big Dog Eat : A Dictionary of the Secret Language of Golf
Usually ships in 24 hours
by Hubert Pedroli, et al(Hardcover - June 2000)
Amazon Price: $14.40...
http://www.amazon.com/exec/obidos/ASIN/0688175767/qid=981919741/s... (amazon)

I) 20) Dog: The Complete Guide
In Stock: 24 hours (Same Day).
Sarah Whitehead / Hardcover / Barnes & Noble Books / August 1999
B&N Price: $14.98...
http://shop.barnesandnoble.com/booksearch/isbnInquiry.asp?userid=... (barnesandnoble)

I) 21) Baby's Memory Book: A Baby Record Book
In stock - ships in 24 hours
Nister, Ernest ~ Hardcover ~ 1986
Borders Price: $15.99 ~ You Save: $4.00 (20%)...
http://search.borders.com/fcgi-bin/db2www/search/search.d2w/Detai... (borders)

I) 22) Dog Training for Dummies (For Dummies)
Usually ships in 24 hours
by John Volhard, et al(Paperback - January 2001)
Amazon Price: $17.59...
http://www.amazon.com/exec/obidos/ASIN/0764552864/qid=981919741/s... (amazon)

I) 23) How to Be Your Dog's Best Friend : A Training Manual for Dog Owners
Usually ships in 24 hours
by New Skete Monks, et al(Hardcover - October 1978)
Amazon Price: $19.16...
http://www.amazon.com/exec/obidos/ASIN/0316604917/qid=981919741/s... (amazon)

I) 24) Going for the Blue: Inside the World of Show Dogs and Dog Shows
Usually ships in 24 hours
by Roger A. Caras(Hardcover - February 2001)
Amazon Price: $20.76...
http://www.amazon.com/exec/obidos/ASIN/0446526444/qid=981919741/s... (amazon)

I) 25) Family Dog : 16 Weeks to a Well-Mannered Dog-A Simple and Time-Proven Method
Usually ships in 24 hours
by Richard A. Wolters, Red Smith(Introduction)(Hardcover - February 1999)
Amazon Price: $22.36...
http://www.amazon.com/exec/obidos/ASIN/0525944729/qid=981919741/s... (amazon)

I) 26) The Dog Owners Home Veterinary Handbook
Usually ships in 2-3 days
by James M. Giffin, et al(Hardcover - November 1999)
Amazon Price: $22.36...
http://www.amazon.com/exec/obidos/ASIN/0876052014/qid=981919741/s... (amazon)

I) 27) A-Z of Dog Diseases & Health Problems
In stock - ships in 24 hours
Lane, Dick ~ Trade Paperback ~ 1997
Borders Price: $22.46 ~ You Save: $2.49 (10%)...
http://search.borders.com/fcgi-bin/db2www/search/search.d2w/Detai... (borders)

FIG. 116B

I) 11) Textbook of Veterinary Internal Medicine: Diseases of the Dog and Cat (2-Volume Set)
Usually ships in 24 hours
by Stephen J. Ettinger(Editor), Edward C. Feldman(Editor)(Hardcover)
Amazon Price: $195.00...
http://www.amazon.com/exec/obidos/ASIN/0721672566/qid=981919816/s... (amazon)

I) 12) Accreditation of Teacher Education: The Story of CATE 1984-1989
In stock - ships in 24 hours
MacIntyre, Gordon ~ Trade Paperback ~ 1991
Borders Price: $34.95 ...
http://search.borders.com/fcgi-bin/db2www/search/search.d2w/Detai... (borders)

I) 13) Gmat 2000-2001 (Gmat Cat (Kaplan)(Book & Cd-Rom))
Usually ships in 24 hours
(Paperback - March 2000)
Amazon Price: $29.60...
http://www.amazon.com/exec/obidos/ASIN/0684870088/qid=981919816/s... (amazon)

I) 14) Cracking the GMAT CAT with CD-ROM, 2001 Edition
In-Stock: Ships 2-3 days.
Geoff Martz / Paperback / Princeton Review Publishing Corporation / June 2000
B&N Price: $27.96 ~ You Save 20%...
http://shop.barnesandnoble.com/booksearch/isbnInquiry.asp?userid=... (barnesandnoble)

I) 15) Cracking the Gmat 2001 (Cracking the Gmat Cat With Sample Tests on Cd-Rom)
Usually ships in 24 hours
by Martz, Geoff Martz(Paperback - June 2000)
Amazon Price: $27.96...
http://www.amazon.com/exec/obidos/ASIN/0375756248/qid=981919816/s... (amazon)

I) 16) Cracking the GRE CAT with CD-ROM, 2001 Edition
In Stock: 24 hours (Same Day).
Karen Lurie / Paperback / Princeton Review Publishing Corporation / June 2000
B&N Price: $24.80 ~ You Save 20%...
http://shop.barnesandnoble.com/booksearch/isbnInquiry.asp?userid=... (barnesandnoble)

I) 17) The Cat Who Smelled a Rat
In Stock: 24 hours (Same Day).
Lilian Jackson Braun / Hardcover / Penguin Putnam / January 2001
B&N Price: $19.16 ~ You Save 20%...
http://shop.barnesandnoble.com/booksearch/isbnInquiry.asp?userid=... (barnesandnoble)

I) 18) The Cat Who Smelled a Rat
Usually ships in 24 hours
by Lilian Jackson Braun(Hardcover - January 2001)
Amazon Price: $19.16...
http://www.amazon.com/exec/obidos/ASIN/0399146652/qid=981919816/s... (amazon)

I) 19) Arthur's World of Cats
In stock - ships in 24 hours
Head, Ann ~ Hardcover ~ 1997
Borders Price: $18.36 ~ You Save: $4.59 (20%)...
http://search.borders.com/fcgi-bin/db2www/search/search.d2w/Detai... (borders)

I) 20) The Cat Who Covered the World : The Adventures of Henrietta and Her Foreign Correspondent
Usually ships in 24 hours
by Christopher S. Wren(Hardcover - November 2000)
Amazon Price: $16.80...
http://www.amazon.com/exec/obidos/ASIN/0684871009/qid=981919816/s... (amazon)

I) 21) The Cat Who Smelled a Rat [ABRIDGED]
Usually ships in 24 hours
by Lilian Jackson Braun(Audio Cassette - January 2001)
Amazon Price: $16.15...
http://www.amazon.com/exec/obidos/ASIN/0399146814/qid=981919816/s... (amazon)

I) 22) All about Himalayan Cats
In stock - ships in 24 hours
Bearley, Joan M. ~ Hardcover ~ 1989
Borders Price: $14.36 ~ You Save: $3.59 (20%)...
http://search.borders.com/fcgi-bin/db2www/search/search.d2w/Detai... (borders)

I) 23) Alfie & the Birthday Surprise
In stock - ships in 24 hours
Hughes, Shirley ~ Hardcover ~ 1998
Borders Price: $12.80 ~ You Save: $3.20 (20%)...
http://search.borders.com/fcgi-bin/db2www/search/search.d2w/Detai... (borders)

FIG. 116C

I) 24) Cat Heaven
Usually ships in 24 hours
by Cynthia Rylant(Illustrator)(School & Library Binding - September 1997)
Amazon Price: $12.76...
http://www.amazon.com/exec/obidos/ASIN/0590100548/qid=981919816/s... (amazon)

I) 25) Aloha, Dolores
In stock - ships in 24 hours
Samuels, Barbara ~ Hardcover ~ 2000
Borders Price: $12.76 ~ You Save: $3.19 (20%)...
http://search.borders.com/fcgi-bin/db2www/search/search.d2w/Detai... (borders)

I) 26) Master the Gre Cat 2001 (Master the Gre, 2001)
Usually ships in 2-3 days
by Thomas H. Martinson(Paperback - November 2000)
Amazon Price: $11.16...
http://www.amazon.com/exec/obidos/ASIN/0764561197/qid=981919816/s... (amazon)

I) 27) Eating the Cheshire Cat
Usually ships in 24 hours
by Helen Ellis(Paperback - February 2001)
Amazon Price: $10.40...
http://www.amazon.com/exec/obidos/ASIN/068486441X/qid=981919816/s... (amazon)

I) 28) 250 Things You Can Do to Make Your Cat Adore You
In stock - ships in 24 hours
Newkirk, Ingrid ~ Trade Paperback ~ 1998
Borders Price: $9.90 ~ You Save: $1.10 (10%)...
http://search.borders.com/fcgi-bin/db2www/search/search.d2w/Detai... (borders)

I) 29) How to Live with a Neurotic Cat
In Stock: 24 hours (Same Day).
Stephen Baker / Hardcover / Random House Value Publishing, Incorporated / September 1999
B&N Price: $7.99...
http://shop.barnesandnoble.com/booksearch/isbnInquiry.asp?userid=... (barnesandnoble)

I) 30) Bedtime Stories for Cats
In stock - ships in 24 hours
Jasheway, Leigh A. ~ Hardcover ~ 1997
Borders Price: $7.96 ~ You Save: $1.99 (20%)...
http://search.borders.com/fcgi-bin/db2www/search/search.d2w/Detai... (borders)

I) 31) Adopting Cats & Kittens: A Care & Training Guide
Ships within 2-3 days
Jankowski, Connie ~ Trade Paperback ~ 1993
Borders Price: $7.20 ~ You Save: $0.80 (10%)...
http://search.borders.com/fcgi-bin/db2www/search/search.d2w/Detai... (borders)

I) 32) The Cat in the Hat (Classic Gift Seuss Series)
In Stock: 24 hours (Same Day).
Dr. Seuss / Hardcover / Random House, Incorporated / May 1976
B&N Price: $6.39 ~ You Save 20%...
http://shop.barnesandnoble.com/booksearch/isbnInquiry.asp?userid=... (barnesandnoble)

I) 33) Animal Clinic for Cats
In stock - ships in 24 hours
Humphries, Jim ~ Hardcover ~ 1998
Borders Price: $6.39 ~ You Save: $1.60 (20%)...
http://search.borders.com/fcgi-bin/db2www/search/search.d2w/Detai... (borders)

I) 34) The Cat Who Robbed a Bank
In Stock: 24 hours (Same Day).
Lilian Jackson Braun / Paperback / Berkley Publishing Group / January 2001
B&N Price: $6.29 ~ You Save 10%...
http://shop.barnesandnoble.com/booksearch/isbnInquiry.asp?userid=... (barnesandnoble)

I) 35) Pawing Through the Past (Age of Unreason)
Usually ships in 24 hours
by Rita Mae Brown, Sneaky Pie Brown(Mass Market Paperback - January 2001)
Amazon Price: $6.29...
http://www.amazon.com/exec/obidos/ASIN/0553580256/qid=981919816/s... (amazon)

I) 36) Abyssinian Cats: Everything about Acquisition, Care, Nutrition, Behavoir, Health Care, & Breeding
In stock - ships in 24 hours
Hauppauge, J. Anne ~ Trade Paperback ~ 1995
Borders Price: $6.26 ~ You Save: $0.69 (10%)...
http://search.borders.com/fcgi-bin/db2www/search/search.d2w/Detai... (borders)

FIG. 116D

I) 37) 2001 Classic Cats Wall Calendar
In Stock: 24 hours.
Cal 2001 / Wall Calendar / June 2000
B&N Price: $5.97 ~ You Save 50%...
http://shop.barnesandnoble.com/booksearch/isbnInquiry.asp?userid=... (barnesandnoble)

I) 38) 2001 Original 365 Cats Page-A-Day Calendar
In Stock: 24 hours.
Cal 2001 / Box Calendar / Workman Publishing Company, Inc. / June 2000
B&N Price: $5.47 ~ You Save 50%...
http://shop.barnesandnoble.com/booksearch/isbnInquiry.asp?userid=... (barnesandnoble)

I) 39) 2001 Hello Kitty Wall Calendar
In Stock: 24 hours.
Cal 2001` (Illustrator) / Wall Calendar / Abrams,Harry N Inc / June 2000
B&N Price: $4.97 ~ You Save 50%...
http://shop.barnesandnoble.com/booksearch/isbnInquiry.asp?userid=... (barnesandnoble)

I) 40) Cat's Letters to Santa
In Stock: 24 hours (Same Day).
Bill Adler (Editor),Paul Bacon (Illustrator) / Hardcover / Galahad Books / September 1997
B&N Price: $2.99 ~ You Save 50%...
http://shop.barnesandnoble.com/booksearch/isbnInquiry.asp?userid=... (barnesandnoble)

Query: Mouse

I) 1) The Atlas of the Mouse Development
Usually ships in 24 hours
by Matthew H. Kaufman(Hardcover - October 1997)
Amazon Price: $225.00...
http://www.amazon.com/exec/obidos/ASIN/0124020356/qid=981919816/s... (amazon)

I) 2) The Anatomical Basis of Mouse Development
Usually ships in 24 hours
by Matthew H. Kaufman, Jonathan B. L. Bard(Hardcover - March 1999)
Amazon Price: $99.95...
http://www.amazon.com/exec/obidos/ASIN/0124020607/qid=981919816/s... (amazon)

I) 3) What's Wrong with My Mouse?: Behavioral Phenotyping of Transgenic and Knockout Mice
Usually ships in 24 hours
by Jacqueline N., Phd Crawley(Hardcover)
Amazon Price: $79.95...
http://www.amazon.com/exec/obidos/ASIN/0471316393/qid=981919816/s... (amazon)

I) 4) Craft Lessons: Teaching Writing K through 8
In Stock: 24 hours.
Ralph J. Fletcher,Joann Portalupi / Paperback / Stenhouse Publishers / September 1998
B&N Price: $17.50...
http://shop.barnesandnoble.com/booksearch/isbnInquiry.asp?userid=... (barnesandnoble)

I) 5) If You Take a Mouse to the Movies
In Stock: 24 hours.
Laura Joffe Numeroff,Felicia Bond (Illustrator) / Hardcover / HarperCollins Children's Books / September 2000
B&N Price: $12.76 ~ You Save 20%...
http://shop.barnesandnoble.com/booksearch/isbnInquiry.asp?userid=... (barnesandnoble)

I) 6) If You Take a Mouse to the Movies
Usually ships in 24 hours
by Felicia Bond(Illustrator), Laura Joffe Numeroff(Hardcover - October 2000)
Amazon Price: $12.76...
http://www.amazon.com/exec/obidos/ASIN/0060278676/qid=981919816/s... (amazon)

I) 7) If You Give a Mouse a Cookie
Usually ships in 24 hours
by Felicia Bond(Illustrator), Laura Joffe Numeroff(Hardcover - May 1985)
Amazon Price: $12.76...
http://www.amazon.com/exec/obidos/ASIN/0060245867/qid=981919816/s... (amazon)

I) 8) The Mouse of Amherst
Usually ships in 24 hours
by Elizabeth Spires, Claire A. Nivola(Illustrator)(Hardcover - March 1999)
Amazon Price: $12.00...
http://www.amazon.com/exec/obidos/ASIN/0374350833/qid=981919816/s... (amazon)

I) 9) If You Give a Mouse a Cookie
In Stock: 24 hours (Same Day).
Laura Joffe Numeroff,Felicia Bond (Illustrator) / Hardcover / HarperCollins Children's Books / January 1985

FIG. 116E

B&N Price: $11.96 ~ You Save 20%...
http://shop.barnesandnoble.com/booksearch/isbnInquiry.asp?userid=... (barnesandnoble)

I) 10) Mouse Count
Usually ships in 1-2 weeks
by Ellen Stoll Walsh, Diane D'Andrade(Editor)(School & Library Binding - March 1991)
Amazon Price: $10.40...
http://www.amazon.com/exec/obidos/ASIN/0152560238/qid=981919816/s... (amazon)

I) 11) If You Give a Mouse a Cookie Mini Book and Ornament
In Stock: 24 hours.
Laura Joffe Numeroff,Felicia Bond (Illustrator) / Hardcover / HarperCollins Children's Books / September 2000
B&N Price: $7.96 ~ You Save 20%...
http://shop.barnesandnoble.com/booksearch/isbnInquiry.asp?userid=... (barnesandnoble)

I) 12) Cat & Mouse
In Stock: 24 hours (Same Day).
James Patterson / Mass Market Paperback / Warner Books, Incorporated / October 1998
B&N Price: $7.19 ~ You Save 10%...
http://shop.barnesandnoble.com/booksearch/isbnInquiry.asp?userid=... (barnesandnoble)

I) 13) Cat & Mouse
Usually ships in 24 hours
by James Patterson(Mass Market Paperback - October 2000)
Amazon Price: $7.19...
http://www.amazon.com/exec/obidos/ASIN/0446606189/qid=981919816/s... (amazon)

I) 14) Ben and Me : A New and Astonishing Life of Benjamin Franklin As Written by His Good Mouse Amos
Usually ships in 24 hours
by Robert Lawson(Illustrator)(Paperback - April 1988)
Amazon Price: $5.35...
http://www.amazon.com/exec/obidos/ASIN/0316517305/qid=981919816/s... (amazon)

I) 15) Mouse Count
Usually ships in 24 hours
by Ellen Stoll Walsh(Paperback - March 1995)
Amazon Price: $4.95...
http://www.amazon.com/exec/obidos/ASIN/0152002235/qid=981919816/s... (amazon)

I) 16) The Mouse and the Motorcycle
In Stock: 24 hours (Same Day).
Beverly Cleary,Louis Darling (Illustrator) / Paperback / Morrow,William & Co / August 1990
B&N Price: $4.45 ~ You Save 10%...
http://shop.barnesandnoble.com/booksearch/isbnInquiry.asp?userid=... (barnesandnoble)

I) 17) Disney's Toy Story: Movie Storybook
In Stock: 24 hours (Same Day).
Mouse Works Staff / Hardcover / Disney Enterprises, Incorporated / May 2000
B&N Price: $3.98 ~ You Save 42%...
http://shop.barnesandnoble.com/booksearch/isbnInquiry.asp?userid=... (barnesandnoble)

I) 18) Santa Mouse Where Are You
In Stock: 24 hours (Same Day).
Michael Brown,Elfrieda DeWitt (Illustrator) / Hardcover / Barnes & Noble Books / August 1997
B&N Price: $2.49 ~ You Save 50%...
http://shop.barnesandnoble.com/booksearch/isbnInquiry.asp?userid=... (barnesandnoble)

I) 19) Santa Mouse
In Stock: 24 hours (Same Day).
Michael Brown,Elfrieda DeWitt (Illustrator) / Hardcover / Barnes & Noble Books / August 1996
B&N Price: $2.49 ~ You Save 50%...
http://shop.barnesandnoble.com/booksearch/isbnInquiry.asp?userid=... (barnesandnoble)

I) 20) Santa Mouse Coloring and Pencil Puzzle Book
In Stock: 24 hours (Same Day).
Michael Brown / Paperback / Barnes & Noble Books / July 1999
B&N Price: $1.49 ~ You Save 50%...
http://shop.barnesandnoble.com/booksearch/isbnInquiry.asp?userid=... (barnesandnoble)

Query: Dog

I) 1) Advanced Gundog Training: Practical Fieldwork & Competition
In stock - ships in 24 hours
Deeley, Martin ~ Hardcover ~ 1994
Borders Price: $27.96 ~ You Save: $6.99 (20%)...
http://search.borders.com/fcgi-bin/db2www/search/search.d2w/Detai... (borders)

FIG. 116F

I) 2) Agility Training: The Fun Sport for All Dogs
In stock - ships in 24 hours
Simmons-Moake, Jane ~ Trade Paperback ~ 1992
Borders Price: $23.36 ~ You Save: $2.59 (10%)...
http://search.borders.com/fcgi-bin/db2www/search/search.d2w/Detai... (borders)

I) 3) American Staffordshire Terrier: Gamester & Guardian
In stock - ships in 24 hours
Foster, Sarah ~ Trade Paperback ~ 1998
Borders Price: $22.46 ~ You Save: $2.49 (10%)...
http://search.borders.com/fcgi-bin/db2www/search/search.d2w/Detai... (borders)

I) 4) A-Z of Dog Diseases & Health Problems
In stock - ships in 24 hours
Lane, Dick ~ Trade Paperback ~ 1997
Borders Price: $22.46 ~ You Save: $2.49 (10%)...
http://search.borders.com/fcgi-bin/db2www/search/search.d2w/Detai... (borders)

I) 5) The Dog Owners Home Veterinary Handbook
Usually ships in 2-3 days
by James M. Giffin, et al(Hardcover - November 1999)
Amazon Price: $22.36...
http://www.amazon.com/exec/obidos/ASIN/0876052014/qid=981919816/s... (amazon)

I) 6) Family Dog : 16 Weeks to a Well-Mannered Dog-A Simple and Time-Proven Method
Usually ships in 24 hours
by Richard A. Wolters, Red Smith(Introduction)(Hardcover - February 1999)
Amazon Price: $22.36...
http://www.amazon.com/exec/obidos/ASIN/0525944729/qid=981919816/s... (amazon)

I) 7) Going for the Blue: Inside the World of Show Dogs and Dog Shows
Usually ships in 24 hours
by Roger A. Caras(Hardcover - February 2001)
Amazon Price: $20.76...
http://www.amazon.com/exec/obidos/ASIN/0446526444/qid=981919816/s... (amazon)

I) 8) How to Be Your Dog's Best Friend : A Training Manual for Dog Owners
Usually ships in 24 hours
by New Skete Monks, et al(Hardcover - October 1978)
Amazon Price: $19.16...
http://www.amazon.com/exec/obidos/ASIN/0316604917/qid=981919816/s... (amazon)

I) 9) Dog Training for Dummies (For Dummies)
Usually ships in 24 hours
by John Volhard, et al(Paperback - January 2001)
Amazon Price: $17.59...
http://www.amazon.com/exec/obidos/ASIN/0764552864/qid=981919816/s... (amazon)

I) 10) Baby's Memory Book: A Baby Record Book
In stock - ships in 24 hours
Nister, Ernest ~ Hardcover ~ 1986
Borders Price: $15.99 ~ You Save: $4.00 (20%)...
http://search.borders.com/fcgi-bin/db2www/search/search.d2w/Detai... (borders)

I) 11) Dog: The Complete Guide
In Stock: 24 hours (Same Day).
Sarah Whitehead / Hardcover / Barnes & Noble Books / August 1999
B&N Price: $14.98...
http://shop.barnesandnoble.com/booksearch/isbnInquiry.asp?userid=... (barnesandnoble)

I) 12) Let the Big Dog Eat : A Dictionary of the Secret Language of Golf
Usually ships in 24 hours
by Hubert Pedroli, et al(Hardcover - June 2000)
Amazon Price: $14.40...
http://www.amazon.com/exec/obidos/ASIN/0688175767/qid=981919816/s... (amazon)

I) 13) Anastasia, Absolutely
In stock - ships in 24 hours
Lowry, Lois ~ Hardcover ~ 1995
Borders Price: $12.80 ~ You Save: $3.20 (20%)...
http://search.borders.com/fcgi-bin/db2www/search/search.d2w/Detai... (borders)

I) 14) The Stray Dog
Usually ships in 24 hours
by Marc Simont(Illustrator), Reiko Sassa(Hardcover - January 2001)
Amazon Price: $12.76...
http://www.amazon.com/exec/obidos/ASIN/0060289333/qid=981919816/s... (amazon)

I) 15) Dog Heaven

FIG. 116G

Usually ships in 24 hours
by Cynthia Rylant(Illustrator)(School & Library Binding - September 1995)
Amazon Price: $12.76...
http://www.amazon.com/exec/obidos/ASIN/0590417010/qid=981919816/s... (amazon)

I) 16) Bark Busters: Solving Your Dog's Behavioral Problems
In stock - ships in 24 hours
Wilson, Sylvia ~ Trade Paperback ~ 1997
Borders Price: $11.66 ~ You Save: $1.29 (10%)...
http://search.borders.com/fcgi-bin/db2www/search/search.d2w/Detai... (borders)

I) 17) Adopting the Racing Greyhound
In stock - ships in 24 hours
Branigan, Cynthia A. ~ Trade Paperback ~ 1998
Borders Price: $11.66 ~ You Save: $1.29 (10%)...
http://search.borders.com/fcgi-bin/db2www/search/search.d2w/Detai... (borders)

I) 18) How to Live with a Neurotic Dog
In Stock: 24 hours (Same Day).
Stephen Baker,Fred Hilliard (Illustrator) / Hardcover / Random House, Incorporated / February 1995
B&N Price: $7.99...
http://shop.barnesandnoble.com/booksearch/isbnInquiry.asp?userid=... (barnesandnoble)

I) 19) 2001 Man's Best Friend Wall Calendar
In Stock: 24 hours.
Cal 2001,William Wegman (Photographer) / Wall Calendar / Abrams,Harry N Inc / June 2000
B&N Price: $6.47 ~ You Save 50%...
http://shop.barnesandnoble.com/booksearch/isbnInquiry.asp?userid=... (barnesandnoble)

I) 20) Animal Clinic for Dogs
In stock - ships in 24 hours
Humphries, Jim ~ Hardcover ~ 1998
Borders Price: $6.39 ~ You Save: $1.60 (20%)...
http://search.borders.com/fcgi-bin/db2www/search/search.d2w/Detai... (borders)

I) 21) How to Housebreak Your Dog in 7 Days
Usually ships in 24 hours
by Shirlee Kalstone(Paperback - April 1991)
Amazon Price: $6.29...
http://www.amazon.com/exec/obidos/ASIN/0553346156/qid=981919816/s... (amazon)

I) 22) 2001 William Wegman Puppies Wall Calendar
In Stock: 24 hours.
Cal 2001 / Wall Calendar / Abrams,Harry N Inc / June 2000
B&N Price: $5.47 ~ You Save 50%...
http://shop.barnesandnoble.com/booksearch/isbnInquiry.asp?userid=... (barnesandnoble)

I) 23) 2001 Original 365 Dogs Page-A-Day Calendar
In Stock: 24 hours.
Cal 2001 / Box Calendar / Workman Publishing Company, Inc. / August 2000
B&N Price: $5.47 ~ You Save 50%...
http://shop.barnesandnoble.com/booksearch/isbnInquiry.asp?userid=... (barnesandnoble)

I) 24) Ginger Pye
In Stock: 24 hours (Same Day).
Eleanor Estes / Paperback / Harcourt / September 2000
B&N Price: $5.40 ~ You Save 10%...
http://shop.barnesandnoble.com/booksearch/isbnInquiry.asp?userid=... (barnesandnoble)

I) 25) Where the Red Fern Grows
In Stock: 24 hours (Same Day).
Wilson Rawls / Mass Market Paperback / Bantam Books, Incorporated / May 1981
B&N Price: $5.39 ~ You Save 10%...
http://shop.barnesandnoble.com/booksearch/isbnInquiry.asp?userid=... (barnesandnoble)

I) 26) Clifford: The Big Red Dog
In Stock: 24 hours (Same Day).
Norman Bridwell / Board Book / Scholastic, Inc. / July 1997
B&N Price: $4.79 ~ You Save 20%...
http://shop.barnesandnoble.com/booksearch/isbnInquiry.asp?userid=... (barnesandnoble)

I) 27) Stone Fox (Harper Trophy Book)
Usually ships in 24 hours
by John Reynolds Gardiner, Marcia Sewall(Illustrator)(Paperback - February 1988)
Amazon Price: $4.45...
http://www.amazon.com/exec/obidos/ASIN/0064401324/qid=981919816/s... (amazon)

I) 28) Tigers at Twilight: (Magic Tree House Series #19)
In Stock: 24 hours (Same Day).

FIG. 118B

Usually ships in 24 hours
by Rita Mae Brown, Sneaky Pie Brown(Mass Market Paperback - January 2001)
Amazon Price: $6.29...
http://www.amazon.com/exec/obidos/ASIN/0553580256/qid=981919679/s... (amazon 8)

I) 9) The Cat Who Smelled a Rat [ABRIDGED]
Usually ships in 24 hours
by Lilian Jackson Braun(Audio Cassette - January 2001)
Amazon Price: $16.15...
http://www.amazon.com/exec/obidos/ASIN/0399146814/qid=981919679/s... (amazon 9)

I) 10) Textbook of Veterinary Internal Medicine: Diseases of the Dog and Cat (2-Volume Set)
Usually ships in 24 hours
by Stephen J. Ettinger(Editor), Edward C. Feldman(Editor)(Hardcover)
Amazon Price: $195.00...
http://www.amazon.com/exec/obidos/ASIN/0721672566/qid=981919679/s... (amazon 10)

Search Engine 2: borders2
Query2: Cat

I) 1) 250 Things You Can Do to Make Your Cat Adore You
In stock - ships in 24 hours
Newkirk, Ingrid ~ Trade Paperback ~ 1998
Borders Price: $9.90 ~ You Save: $1.10 (10%)...
http://search.borders.com/fcgi-bin/db2www/search/search.d2w/Detai... (borders 1)

I) 2) Abyssinian Cats: Everything about Acquisition, Care, Nutrition, Behavoir, Health Care, & Breeding
In stock - ships in 24 hours
Hauppauge, J. Anne ~ Trade Paperback ~ 1995
Borders Price: $6.26 ~ You Save: $0.69 (10%)...
http://search.borders.com/fcgi-bin/db2www/search/search.d2w/Detai... (borders 2)

I) 3) Accreditation of Teacher Education: The Story of CATE 1984-1989
In stock - ships in 24 hours
MacIntyre, Gordon ~ Trade Paperback ~ 1991
Borders Price: $34.95 ...
http://search.borders.com/fcgi-bin/db2www/search/search.d2w/Detai... (borders 3)

I) 4) Adopting Cats & Kittens: A Care & Training Guide
Ships within 2-3 days
Jankowski, Connie ~ Trade Paperback ~ 1993
Borders Price: $7.20 ~ You Save: $0.80 (10%)...
http://search.borders.com/fcgi-bin/db2www/search/search.d2w/Detai... (borders 4)

I) 5) Alfie & the Birthday Surprise
In stock - ships in 24 hours
Hughes, Shirley ~ Hardcover ~ 1998
Borders Price: $12.80 ~ You Save: $3.20 (20%)...
http://search.borders.com/fcgi-bin/db2www/search/search.d2w/Detai... (borders 5)

I) 6) All about Himalayan Cats
In stock - ships in 24 hours
Bearley, Joan M. ~ Hardcover ~ 1989
Borders Price: $14.36 ~ You Save: $3.59 (20%)...
http://search.borders.com/fcgi-bin/db2www/search/search.d2w/Detai... (borders 6)

I) 7) Aloha, Dolores
In stock - ships in 24 hours
Samuels, Barbara ~ Hardcover ~ 2000
Borders Price: $12.76 ~ You Save: $3.19 (20%)...
http://search.borders.com/fcgi-bin/db2www/search/search.d2w/Detai... (borders 7)

I) 8) Animal Clinic for Cats
In stock - ships in 24 hours
Humphries, Jim ~ Hardcover ~ 1998
Borders Price: $6.39 ~ You Save: $1.60 (20%)...
http://search.borders.com/fcgi-bin/db2www/search/search.d2w/Detai... (borders 8)

I) 9) Arthur's World of Cats
In stock - ships in 24 hours
Head, Ann ~ Hardcover ~ 1997
Borders Price: $18.36 ~ You Save: $4.59 (20%)...
http://search.borders.com/fcgi-bin/db2www/search/search.d2w/Detai... (borders 9)

I) 10) Bedtime Stories for Cats
In stock - ships in 24 hours
Jasheway, Leigh A. ~ Hardcover ~ 1997
Borders Price: $7.96 ~ You Save: $1.99 (20%)...

FIG. 118C http://search.borders.com/fcgi-bin/db2www/search/search.d2w/Detai... (borders 10)

Search Engine 3: barnesandnoble3
Query3: Cat

I) 1) The Cat Who Robbed a Bank
In Stock: 24 hours (Same Day).
Lilian Jackson Braun / Paperback / Berkley Publishing Group / January 2001
B&N Price: $6.29 ~ You Save 10%...
http://shop.barnesandnoble.com/booksearch/isbnInquiry.asp?userid=... (barnesandnoble 1)

I) 2) 2001 Original 365 Cats Page-A-Day Calendar
In Stock: 24 hours.
Cal 2001 / Box Calendar / Workman Publishing Company, Inc. / June 2000
B&N Price: $5.47 ~ You Save 50%...
http://shop.barnesandnoble.com/booksearch/isbnInquiry.asp?userid=... (barnesandnoble 2)

I) 3) 2001 Hello Kitty Wall Calendar
In Stock: 24 hours.
Cal 2001' (Illustrator) / Wall Calendar / Abrams,Harry N Inc / June 2000
B&N Price: $4.97 ~ You Save 50%...
http://shop.barnesandnoble.com/booksearch/isbnInquiry.asp?userid=... (barnesandnoble 3)

I) 4) The Cat Who Smelled a Rat
In Stock: 24 hours (Same Day).
Lilian Jackson Braun / Hardcover / Penguin Putnam / January 2001
B&N Price: $19.16 ~ You Save 20%...
http://shop.barnesandnoble.com/booksearch/isbnInquiry.asp?userid=... (barnesandnoble 4)

I) 5) The Cat in the Hat (Classic Gift Seuss Series)
In Stock: 24 hours (Same Day).
Dr. Seuss / Hardcover / Random House, Incorporated / May 1976
B&N Price: $6.39 ~ You Save 20%...
http://shop.barnesandnoble.com/booksearch/isbnInquiry.asp?userid=... (barnesandnoble 5)

I) 6) How to Live with a Neurotic Cat
In Stock: 24 hours (Same Day).
Stephen Baker / Hardcover / Random House Value Publishing, Incorporated / September 1999
B&N Price: $7.99...
http://shop.barnesandnoble.com/booksearch/isbnInquiry.asp?userid=... (barnesandnoble 6)

I) 7) 2001 Classic Cats Wall Calendar
In Stock: 24 hours.
Cal 2001 / Wall Calendar / June 2000
B&N Price: $5.97 ~ You Save 50%...
http://shop.barnesandnoble.com/booksearch/isbnInquiry.asp?userid=... (barnesandnoble 7)

I) 8) Cracking the GMAT CAT with CD-ROM, 2001 Edition
In-Stock: Ships 2-3 days.
Geoff Martz / Paperback / Princeton Review Publishing Corporation / June 2000
B&N Price: $27.96 ~ You Save 20%...
http://shop.barnesandnoble.com/booksearch/isbnInquiry.asp?userid=... (barnesandnoble 8)

I) 9) Cracking the GRE CAT with CD-ROM, 2001 Edition
In Stock: 24 hours (Same Day).
Karen Lurie / Paperback / Princeton Review Publishing Corporation / June 2000
B&N Price: $24.80 ~ You Save 20%...
http://shop.barnesandnoble.com/booksearch/isbnInquiry.asp?userid=... (barnesandnoble 9)

I) 10) Cat's Letters to Santa
In Stock: 24 hours (Same Day).
Bill Adler (Editor),Paul Bacon (Illustrator) / Hardcover / Galahad Books / September 1997
B&N Price: $2.99 ~ You Save 50%...
http://shop.barnesandnoble.com/booksearch/isbnInquiry.asp?userid=... (barnesandnoble 10)

Search Engine 4: amazon4
Query4: Mouse

I) 1) If You Give a Mouse a Cookie
Usually ships in 24 hours
by Felicia Bond(Illustrator), Laura Joffe Numeroff(Hardcover - May 1985)
Amazon Price: $12.76...
http://www.amazon.com/exec/obidos/ASIN/0060245867/qid=981919679/s... (amazon 1)

I) 2) If You Take a Mouse to the Movies
Usually ships in 24 hours
by Felicia Bond(Illustrator), Laura Joffe Numeroff(Hardcover - October 2000)
Amazon Price: $12.76...
http://www.amazon.com/exec/obidos/ASIN/0060278676/qid=981919679/s... (amazon 2)

FIG. 118D

I) 3) What's Wrong with My Mouse?: Behavioral Phenotyping of Transgenic and Knockout Mice
Usually ships in 24 hours
by Jacqueline N., Phd Crawley(Hardcover)
Amazon Price: $79.95...
http://www.amazon.com/exec/obidos/ASIN/0471316393/qid=981919679/s... (amazon 3)

I) 4) The Atlas of the Mouse Development
Usually ships in 24 hours
by Matthew H. Kaufman(Hardcover - October 1997)
Amazon Price: $225.00...
http://www.amazon.com/exec/obidos/ASIN/0124020356/qid=981919679/s... (amazon 4)

I) 5) The Mouse of Amherst
Usually ships in 24 hours
by Elizabeth Spires, Claire A. Nivola(Illustrator)(Hardcover - March 1999)
Amazon Price: $12.00...
http://www.amazon.com/exec/obidos/ASIN/0374350833/qid=981919679/s... (amazon 5)

I) 6) Cat & Mouse
Usually ships in 24 hours
by James Patterson(Mass Market Paperback - October 2000)
Amazon Price: $7.19...
http://www.amazon.com/exec/obidos/ASIN/0446606189/qid=981919679/s... (amazon 6)

I) 7) The Anatomical Basis of Mouse Development
Usually ships in 24 hours
by Matthew H. Kaufman, Jonathan B. L. Bard(Hardcover - March 1999)
Amazon Price: $99.95...
http://www.amazon.com/exec/obidos/ASIN/0124020607/qid=981919679/s... (amazon 7)

I) 8) Mouse Count
Usually ships in 24 hours
by Ellen Stoll Walsh(Paperback - March 1995)
Amazon Price: $4.95...
http://www.amazon.com/exec/obidos/ASIN/0152002235/qid=981919679/s... (amazon 8)

I) 9) Mouse Count
Usually ships in 1-2 weeks
by Ellen Stoll Walsh, Diane D'Andrade(Editor)(School & Library Binding - March 1991)
Amazon Price: $10.40...
http://www.amazon.com/exec/obidos/ASIN/0152560238/qid=981919679/s... (amazon 9)

I) 10) Ben and Me : A New and Astonishing Life of Benjamin Franklin As Written by His Good Mouse Amos
Usually ships in 24 hours
by Robert Lawson(Illustrator)(Paperback - April 1988)
Amazon Price: $5.35...
http://www.amazon.com/exec/obidos/ASIN/0316517305/qid=981919679/s... (amazon 10)

Search Engine 5: amazon5
Query5: Dog

I) 1) The Stray Dog
Usually ships in 24 hours
by Marc Simont(Illustrator), Reiko Sassa(Hardcover - January 2001)
Amazon Price: $12.76...
http://www.amazon.com/exec/obidos/ASIN/0060289333/qid=981919679/s... (amazon 1)

I) 2) Going for the Blue: Inside the World of Show Dogs and Dog Shows
Usually ships in 24 hours
by Roger A. Caras(Hardcover - February 2001)
Amazon Price: $20.76...
http://www.amazon.com/exec/obidos/ASIN/0446526444/qid=981919679/s... (amazon 2)

I) 3) Let the Big Dog Eat ; A Dictionary of the Secret Language of Golf
Usually ships in 24 hours
by Hubert Pedroli, et al(Hardcover - June 2000)
Amazon Price: $14.40...
http://www.amazon.com/exec/obidos/ASIN/0688175767/qid=981919679/s... (amazon 3)

I) 4) Dog Heaven
Usually ships in 24 hours
by Cynthia Rylant(Illustrator)(School & Library Binding - September 1995)
Amazon Price: $12.76...
http://www.amazon.com/exec/obidos/ASIN/0590417010/qid=981919679/s... (amazon 4)

I) 5) Family Dog : 16 Weeks to a Well-Mannered Dog-A Simple and Time-Proven Method

FIG. 118E

Usually ships in 24 hours
by Richard A. Wolters, Red Smith(Introduction)(Hardcover - February 1999)
Amazon Price: $22.36...
http://www.amazon.com/exec/obidos/ASIN/0525944729/qid=981919679/s... (amazon 5)

I) 6) Dog Training for Dummies (For Dummies)
Usually ships in 24 hours
by John Volhard, et al(Paperback - January 2001)
Amazon Price: $17.59...
http://www.amazon.com/exec/obidos/ASIN/0764552864/qid=981919679/s... (amazon 6)

I) 7) Stone Fox (Harper Trophy Book)
Usually ships in 24 hours
by John Reynolds Gardiner, Marcia Sewall(Illustrator)(Paperback - February 1988)
Amazon Price: $4.45...
http://www.amazon.com/exec/obidos/ASIN/0064401324/qid=981919679/s... (amazon 7)

I) 8) How to Be Your Dog's Best Friend : A Training Manual for Dog Owners
Usually ships in 24 hours
by New Skete Monks, et al(Hardcover - October 1978)
Amazon Price: $19.16...
http://www.amazon.com/exec/obidos/ASIN/0316604917/qid=981919679/s... (amazon 8)

I) 9) The Dog Owners Home Veterinary Handbook
Usually ships in 2-3 days
by James M. Giffin, et al(Hardcover - November 1999)
Amazon Price: $22.36...
http://www.amazon.com/exec/obidos/ASIN/0876052014/qid=981919679/s... (amazon 9)

I) 10) How to Housebreak Your Dog in 7 Days
Usually ships in 24 hours
by Shirlee Kalstone(Paperback - April 1991)
Amazon Price: $6.29...
http://www.amazon.com/exec/obidos/ASIN/0553346156/qid=981919679/s... (amazon 10)

Search Engine 6: barnesandnoble6
Query6: Dog

I) 1) Clifford's First Valentine's Day
In-Stock: Ships 2-3 days.
Norman Bridwell / Paperback / Scholastic, Inc. / November 1996
B&N Price: $2.69 ~ You Save 10%...
http://shop.barnesandnoble.com/booksearch/isbnInquiry.asp?userid=... (barnesandnoble 1)

I) 2) 2001 William Wegman Puppies Wall Calendar
In Stock: 24 hours.
Cal 2001 / Wall Calendar / Abrams,Harry N Inc / June 2000
B&N Price: $5.47 ~ You Save 50%...
http://shop.barnesandnoble.com/booksearch/isbnInquiry.asp?userid=... (barnesandnoble 2)

I) 3) Where the Red Fern Grows
In Stock: 24 hours (Same Day).
Wilson Rawls / Mass Market Paperback / Bantam Books, Incorporated / May 1981
B&N Price: $5.39 ~ You Save 10%...
http://shop.barnesandnoble.com/booksearch/isbnInquiry.asp?userid=... (barnesandnoble 3)

I) 4) How to Live with a Neurotic Dog
In Stock: 24 hours (Same Day).
Stephen Baker,Fred Hilliard (Illustrator) / Hardcover / Random House, Incorporated / February 1995
B&N Price: $7.99...
http://shop.barnesandnoble.com/booksearch/isbnInquiry.asp?userid=... (barnesandnoble 4)

I) 5) 2001 Original 365 Dogs Page-A-Day Calendar
In Stock: 24 hours.
Cal 2001 / Box Calendar / Workman Publishing Company, Inc. / August 2000
B&N Price: $5.47 ~ You Save 50%...
http://shop.barnesandnoble.com/booksearch/isbnInquiry.asp?userid=... (barnesandnoble 5)

I) 6) 2001 Man's Best Friend Wall Calendar
In Stock: 24 hours.
Cal 2001,William Wegman (Photographer) / Wall Calendar / Abrams,Harry N Inc / June 2000
B&N Price: $6.47 ~ You Save 50%...
http://shop.barnesandnoble.com/booksearch/isbnInquiry.asp?userid=... (barnesandnoble 6)

I) 7) Tigers at Twilight: (Magic Tree House Series #19)
In Stock: 24 hours (Same Day).
Mary Pope Osborne,Sal Murdocca (Illustrator) / Paperback / Random House Books for Young Readers / August 1999
B&N Price: $3.59 ~ You Save 10%...
http://shop.barnesandnoble.com/booksearch/isbnInquiry.asp?userid=... (barnesandnoble 7)

FIG. 118F

I) 8) Clifford: The Big Red Dog
In Stock: 24 hours (Same Day).
Norman Bridwell / Board Book / Scholastic, Inc. / July 1997
B&N Price: $4.79 ~ You Save 20%...
http://shop.barnesandnoble.com/booksearch/isbnInquiry.asp?userid=... (barnesandnoble 8)

I) 9) Ginger Pye
In Stock: 24 hours (Same Day).
Eleanor Estes / Paperback / Harcourt / September 2000
B&N Price: $5.40 ~ You Save 10%...
http://shop.barnesandnoble.com/booksearch/isbnInquiry.asp?userid=... (barnesandnoble 9)

I) 10) Dog: The Complete Guide
In Stock: 24 hours (Same Day).
Sarah Whitehead / Hardcover / Barnes & Noble Books / August 1999
B&N Price: $14.98...
http://shop.barnesandnoble.com/booksearch/isbnInquiry.asp?userid=... (barnesandnoble 10)

Search Engine 7: barnesandnoble7
Query7: Mouse

I) 1) If You Take a Mouse to the Movies
In Stock: 24 hours.
Laura Joffe Numeroff,Felicia Bond (Illustrator) / Hardcover / HarperCollins Children's Books / September 2000
B&N Price: $12.76 ~ You Save 20%...
http://shop.barnesandnoble.com/booksearch/isbnInquiry.asp?userid=... (barnesandnoble 1)

I) 2) Santa Mouse
In Stock: 24 hours (Same Day).
Michael Brown,Elfrieda DeWitt (Illustrator) / Hardcover / Barnes & Noble Books / August 1996
B&N Price: $2.49 ~ You Save 50%...
http://shop.barnesandnoble.com/booksearch/isbnInquiry.asp?userid=... (barnesandnoble 2)

I) 3) If You Give a Mouse a Cookie
In Stock: 24 hours (Same Day).
Laura Joffe Numeroff,Felicia Bond (Illustrator) / Hardcover / HarperCollins Children's Books / January 1985
B&N Price: $11.96 ~ You Save 20%...
http://shop.barnesandnoble.com/booksearch/isbnInquiry.asp?userid=... (barnesandnoble 3)

I) 4) Santa Mouse Where Are You
In Stock: 24 hours (Same Day).
Michael Brown,Elfrieda DeWitt (Illustrator) / Hardcover / Barnes & Noble Books / August 1997
B&N Price: $2.49 ~ You Save 50%...
http://shop.barnesandnoble.com/booksearch/isbnInquiry.asp?userid=... (barnesandnoble 4)

I) 5) Santa Mouse Coloring and Pencil Puzzle Book
In Stock: 24 hours (Same Day).
Michael Brown / Paperback / Barnes & Noble Books / July 1999
B&N Price: $1.49 ~ You Save 50%...
http://shop.barnesandnoble.com/booksearch/isbnInquiry.asp?userid=... (barnesandnoble 5)

I) 6) The Mouse and the Motorcycle
In Stock: 24 hours (Same Day).
Beverly Cleary,Louis Darling (Illustrator) / Paperback / Morrow,William & Co / August 1990
B&N Price: $4.45 ~ You Save 10%...
http://shop.barnesandnoble.com/booksearch/isbnInquiry.asp?userid=... (barnesandnoble 6)

I) 7) Cat & Mouse
In Stock: 24 hours (Same Day).
James Patterson / Mass Market Paperback / Warner Books, Incorporated / October 1998
B&N Price: $7.19 ~ You Save 10%...
http://shop.barnesandnoble.com/booksearch/isbnInquiry.asp?userid=... (barnesandnoble 7)

I) 8) If You Give a Mouse a Cookie Mini Book and Ornament
In Stock: 24 hours.
Laura Joffe Numeroff,Felicia Bond (Illustrator) / Hardcover / HarperCollins Children's Books / September 2000
B&N Price: $7.96 ~ You Save 20%...
http://shop.barnesandnoble.com/booksearch/isbnInquiry.asp?userid=... (barnesandnoble 8)

I) 9) Craft Lessons: Teaching Writing K through 8
In Stock: 24 hours.
Ralph J. Fletcher,Joann Portalupi / Paperback / Stenhouse Publishers / September 1998
B&N Price: $17.50...
http://shop.barnesandnoble.com/booksearch/isbnInquiry.asp?userid=... (barnesandnoble 9)

FIG. 118G

I) 10) Disney's Toy Story: Movie Storybook
In Stock: 24 hours (Same Day).
Mouse Works Staff / Hardcover / Disney Enterprises, Incorporated / May 2000
B&N Price: $3.98 ~ You Save 42%...
http://shop.barnesandnoble.com/booksearch/isbnInquiry.asp?userid=... (barnesandnoble 10)

Search Engine 8: borders8
Query8: Dog

I) 1) A-Z of Dog Diseases & Health Problems
In stock - ships in 24 hours
Lane, Dick ~ Trade Paperback ~ 1997
Borders Price: $22.46 ~ You Save: $2.49 (10%)...
http://search.borders.com/fcgi-bin/db2www/search/search.d2w/Detai... (borders 1)

I) 2) Adopting the Racing Greyhound
In stock - ships in 24 hours
Branigan, Cynthia A. ~ Trade Paperback ~ 1998
Borders Price: $11.66 ~ You Save: $1.29 (10%)...
http://search.borders.com/fcgi-bin/db2www/search/search.d2w/Detai... (borders 2)

I) 3) Advanced Gundog Training: Practical Fieldwork & Competition
In stock - ships in 24 hours
Deeley, Martin ~ Hardcover ~ 1994
Borders Price: $27.96 ~ You Save: $6.99 (20%)...
http://search.borders.com/fcgi-bin/db2www/search/search.d2w/Detai... (borders 3)

I) 4) Agility Training: The Fun Sport for All Dogs
In stock - ships in 24 hours
Simmons-Moake, Jane ~ Trade Paperback ~ 1992
Borders Price: $23.36 ~ You Save: $2.59 (10%)...
http://search.borders.com/fcgi-bin/db2www/search/search.d2w/Detai... (borders 4)

I) 5) American Staffordshire Terrier: Gamester & Guardian
In stock - ships in 24 hours
Foster, Sarah ~ Trade Paperback ~ 1998
Borders Price: $22.46 ~ You Save: $2.49 (10%)...
http://search.borders.com/fcgi-bin/db2www/search/search.d2w/Detai... (borders 5)

I) 6) Anastasia, Absolutely
In stock - ships in 24 hours
Lowry, Lois ~ Hardcover ~ 1995
Borders Price: $12.80 ~ You Save: $3.20 (20%)...
http://search.borders.com/fcgi-bin/db2www/search/search.d2w/Detai... (borders 6)

I) 7) Animal Clinic for Dogs
In stock - ships in 24 hours
Humphries, Jim ~ Hardcover ~ 1998
Borders Price: $6.39 ~ You Save: $1.60 (20%)...
http://search.borders.com/fcgi-bin/db2www/search/search.d2w/Detai... (borders 7)

I) 8) Baby Animals: Puppies
In stock - ships in 24 hours
Petty, Kate ~ Trade Paperback ~ 1992
Borders Price: $3.56 ~ You Save: $0.39 (10%)...
http://search.borders.com/fcgi-bin/db2www/search/search.d2w/Detai... (borders 8)

I) 9) Baby's Memory Book: A Baby Record Book
In stock - ships in 24 hours
Nister, Ernest ~ Hardcover ~ 1986
Borders Price: $15.99 ~ You Save: $4.00 (20%)...
http://search.borders.com/fcgi-bin/db2www/search/search.d2w/Detai... (borders 9)

I) 10) Bark Busters: Solving Your Dog's Behavioral Problems
In stock - ships in 24 hours
Wilson, Sylvia ~ Trade Paperback ~ 1997
Borders Price: $11.66 ~ You Save: $1.29 (10%)...
http://search.borders.com/fcgi-bin/db2www/search/search.d2w/Detai... (borders 10)

Search Engine 9: google9
Query9: Cat

I) 1) The Cat Fanciers' Association (CFA)
Welcome to the Cat Fanciers' Association, the world's largest registry of pedigreed cats! ...
http://www.cfainc.org/ (google 1)

I) 2) Cat Fanciers Web Site
Welcome to the Cat Fanciers Web Site! We offer General Information about Cats and Cat Care,. Cat Breed Descriptions from Abyssinian to Turkish Van,. ...

FIG. 118H http://www.fanciers.com/ (google 2)

Figure 118H:
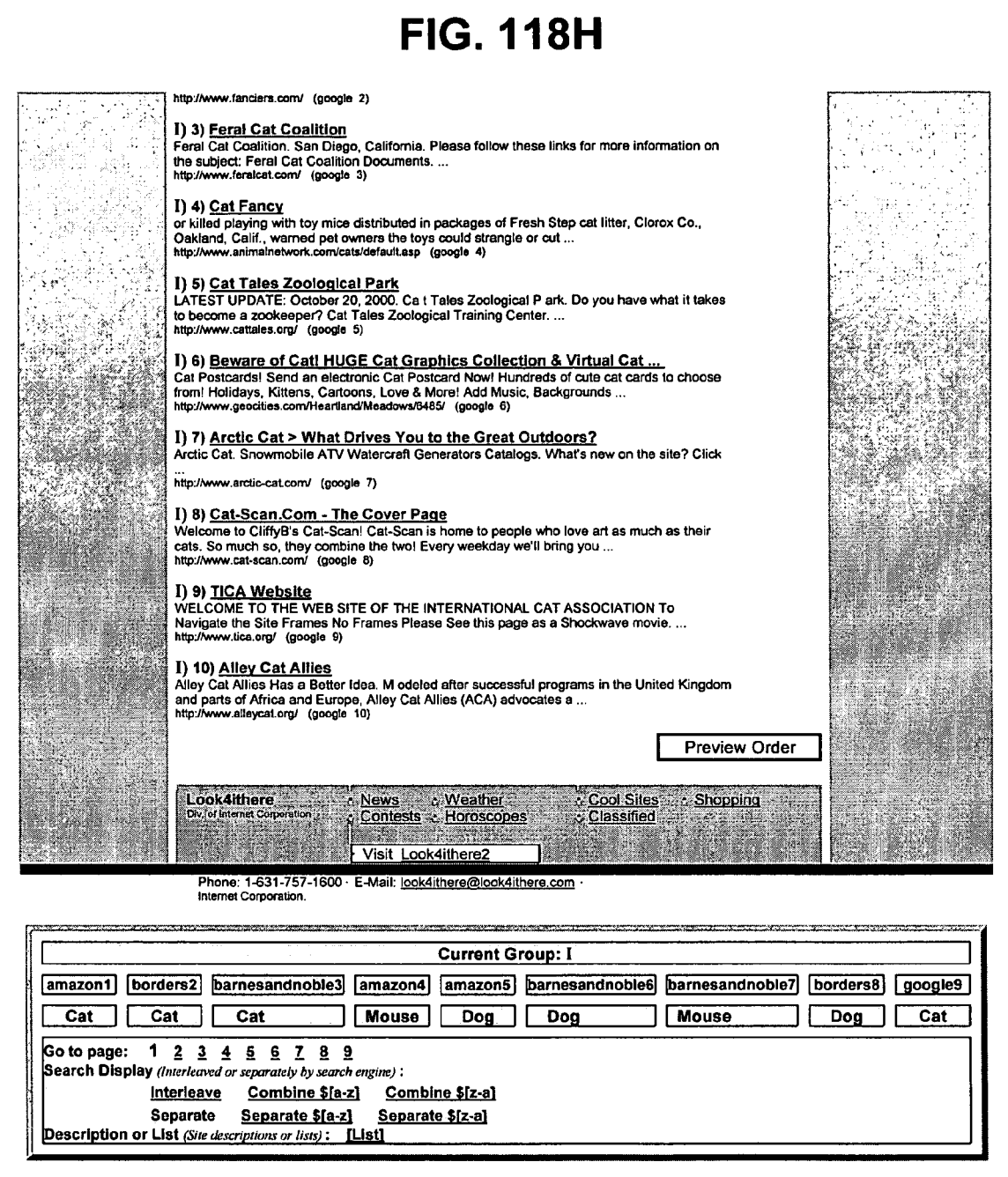

I) 3) Feral Cat Coalition
Feral Cat Coalition. San Diego, California. Please follow these links for more information on the subject: Feral Cat Coalition Documents. ...
http://www.feralcat.com/ (google 3)

I) 4) Cat Fancy
or killed playing with toy mice distributed in packages of Fresh Step cat litter, Clorox Co., Oakland, Calif., warned pet owners the toys could strangle or cut ...
http://www.animalnetwork.com/cats/default.asp (google 4)

I) 5) Cat Tales Zoological Park
LATEST UPDATE: October 20, 2000. Ca t Tales Zoological P ark. Do you have what it takes to become a zookeeper? Cat Tales Zoological Training Center. ...
http://www.cattales.org/ (google 5)

I) 6) Beware of Cat! HUGE Cat Graphics Collection & Virtual Cat ...
Cat Postcards! Send an electronic Cat Postcard Now! Hundreds of cute cat cards to choose from! Holidays, Kittens, Cartoons, Love & More! Add Music, Backgrounds ...
http://www.geocities.com/Heartland/Meadows/6485/ (google 6)

I) 7) Arctic Cat > What Drives You to the Great Outdoors?
Arctic Cat. Snowmobile ATV Watercraft Generators Catalogs. What's new on the site? Click ...
http://www.arctic-cat.com/ (google 7)

I) 8) Cat-Scan.Com - The Cover Page
Welcome to CliffyB's Cat-Scan! Cat-Scan is home to people who love art as much as their cats. So much so, they combine the two! Every weekday we'll bring you ...
http://www.cat-scan.com/ (google 8)

I) 9) TICA Website
WELCOME TO THE WEB SITE OF THE INTERNATIONAL CAT ASSOCIATION To Navigate the Site Frames No Frames Please See this page as a Shockwave movie. ...
http://www.tica.org/ (google 9)

I) 10) Alley Cat Allies
Alley Cat Allies Has a Better Idea. M odeled after successful programs in the United Kingdom and parts of Africa and Europe, Alley Cat Allies (ACA) advocates a ...
http://www.alleycat.org/ (google 10)

Preview Order

Look4ithere Div. of Internet Corporation · News · Weather · Cool Sites · Shopping · Contests · Horoscopes · Classified Visit Look4ithere2

Phone: 1-631-757-1600 · E-Mail: look4ithere@look4ithere.com · Internet Corporation.

Current Group: I

| amazon1 | borders2 | barnesandnoble3 | amazon4 | amazon5 | barnesandnoble6 | barnesandnoble7 | borders8 | google9 |
|---|---|---|---|---|---|---|---|---|
| Cat | Cat | Cat | Mouse | Dog | Dog | Mouse | Dog | Cat |

Go to page: 1 2 3 4 5 6 7 8 9
Search Display *(Interleaved or separately by search engine)* :
Interleave Combine $[a-z] Combine $[z-a]
Separate Separate $[a-z] Separate $[z-a]
Description or List *(Site descriptions or lists)* : [List]

FIG. 120B

Usually ships in 24 hours
by Martz, Geoff Martz(Paperback - June 2000)
Amazon Price: $27.96...
http://www.amazon.com/exec/obidos/ASIN/0375756248/qid=981919875/s... (amazon)

I) 9) Gmat 2000-2001 (Gmat Cat (Kaplan)(Book & Cd-Rom))
Usually ships in 24 hours
(Paperback - March 2000)
Amazon Price: $29.60...
http://www.amazon.com/exec/obidos/ASIN/0684870088/qid=981919875/s... (amazon)

I) 10) Textbook of Veterinary Internal Medicine: Diseases of the Dog and Cat (2-Volume Set)
Usually ships in 24 hours
by Stephen J. Ettinger(Editor), Edward C. Feldman(Editor)(Hardcover)
Amazon Price: $195.00...
http://www.amazon.com/exec/obidos/ASIN/0721672566/qid=981919875/s... (amazon)

Search Engine 2: borders2
Query2: Cat

I) 1) Abyssinian Cats: Everything about Acquisition, Care, Nutrition, Behavoir, Health Care, & Breeding
In stock - ships in 24 hours
Hauppauge, J. Anne ~ Trade Paperback ~ 1995
Borders Price: $6.26 ~ You Save: $0.69 (10%)...
http://search.borders.com/fcgi-bin/db2www/search/search.d2w/Detai... (borders)

I) 2) Animal Clinic for Cats
In stock - ships in 24 hours
Humphries, Jim ~ Hardcover ~ 1998
Borders Price: $6.39 ~ You Save: $1.60 (20%)...
http://search.borders.com/fcgi-bin/db2www/search/search.d2w/Detai... (borders)

I) 3) Adopting Cats & Kittens: A Care & Training Guide
Ships within 2-3 days
Jankowski, Connie ~ Trade Paperback ~ 1993
Borders Price: $7.20 ~ You Save: $0.80 (10%)...
http://search.borders.com/fcgi-bin/db2www/search/search.d2w/Detai... (borders)

I) 4) Bedtime Stories for Cats
In stock - ships in 24 hours
Jasheway, Leigh A. ~ Hardcover ~ 1997
Borders Price: $7.96 ~ You Save: $1.99 (20%)...
http://search.borders.com/fcgi-bin/db2www/search/search.d2w/Detai... (borders)

I) 5) 250 Things You Can Do to Make Your Cat Adore You
In stock - ships in 24 hours
Newkirk, Ingrid ~ Trade Paperback ~ 1998
Borders Price: $9.90 ~ You Save: $1.10 (10%)...
http://search.borders.com/fcgi-bin/db2www/search/search.d2w/Detai... (borders)

I) 6) Aloha, Dolores
In stock - ships in 24 hours
Samuels, Barbara ~ Hardcover ~ 2000
Borders Price: $12.76 ~ You Save: $3.19 (20%)...
http://search.borders.com/fcgi-bin/db2www/search/search.d2w/Detai... (borders)

I) 7) Alfie & the Birthday Surprise
In stock - ships in 24 hours
Hughes, Shirley ~ Hardcover ~ 1998
Borders Price: $12.80 ~ You Save: $3.20 (20%)...
http://search.borders.com/fcgi-bin/db2www/search/search.d2w/Detai... (borders)

I) 8) All about Himalayan Cats
In stock - ships in 24 hours
Bearley, Joan M. ~ Hardcover ~ 1989
Borders Price: $14.36 ~ You Save: $3.59 (20%)...
http://search.borders.com/fcgi-bin/db2www/search/search.d2w/Detai... (borders)

I) 9) Arthur's World of Cats
In stock - ships in 24 hours
Head, Ann ~ Hardcover ~ 1997
Borders Price: $18.36 ~ You Save: $4.59 (20%)...
http://search.borders.com/fcgi-bin/db2www/search/search.d2w/Detai... (borders)

I) 10) Accreditation of Teacher Education: The Story of CATE 1984-1989
In stock - ships in 24 hours
MacIntyre, Gordon ~ Trade Paperback ~ 1991
Borders Price: $34.95 ...

FIG. 120C http://search.borders.com/fcgi-bin/db2www/search/search.d2w/Detai... (borders)

Search Engine 3: barnesandnoble3
Query3: Cat

I) 1) Cat's Letters to Santa
In Stock: 24 hours (Same Day).
Bill Adler (Editor),Paul Bacon (Illustrator) / Hardcover / Galahad Books / September 1997
B&N Price: $2.99 ~ You Save 50%...
http://shop.barnesandnoble.com/booksearch/isbnInquiry.asp?userid=... (barnesandnoble)

I) 2) 2001 Hello Kitty Wall Calendar
In Stock: 24 hours.
Cal 2001' (Illustrator) / Wall Calendar / Abrams,Harry N Inc / June 2000
B&N Price: $4.97 ~ You Save 50%...
http://shop.barnesandnoble.com/booksearch/isbnInquiry.asp?userid=... (barnesandnoble)

I) 3) 2001 Original 365 Cats Page-A-Day Calendar
In Stock: 24 hours.
Cal 2001 / Box Calendar / Workman Publishing Company, Inc. / June 2000
B&N Price: $5.47 ~ You Save 50%...
http://shop.barnesandnoble.com/booksearch/isbnInquiry.asp?userid=... (barnesandnoble)

I) 4) 2001 Classic Cats Wall Calendar
In Stock: 24 hours.
Cal 2001 / Wall Calendar / June 2000
B&N Price: $5.97 ~ You Save 50%...
http://shop.barnesandnoble.com/booksearch/isbnInquiry.asp?userid=... (barnesandnoble)

I) 5) The Cat Who Robbed a Bank
In Stock: 24 hours (Same Day).
Lilian Jackson Braun / Paperback / Berkley Publishing Group / January 2001
B&N Price: $6.29 ~ You Save 10%...
http://shop.barnesandnoble.com/booksearch/isbnInquiry.asp?userid=... (barnesandnoble)

I) 6) The Cat in the Hat (Classic Gift Seuss Series)
In Stock: 24 hours (Same Day).
Dr. Seuss / Hardcover / Random House, Incorporated / May 1976
B&N Price: $6.39 ~ You Save 20%...
http://shop.barnesandnoble.com/booksearch/isbnInquiry.asp?userid=... (barnesandnoble)

I) 7) How to Live with a Neurotic Cat
In Stock: 24 hours (Same Day).
Stephen Baker / Hardcover / Random House Value Publishing, Incorporated / September 1999
B&N Price: $7.99...
http://shop.barnesandnoble.com/booksearch/isbnInquiry.asp?userid=... (barnesandnoble)

I) 8) The Cat Who Smelled a Rat
In Stock: 24 hours (Same Day).
Lilian Jackson Braun / Hardcover / Penguin Putnam / January 2001
B&N Price: $19.16 ~ You Save 20%...
http://shop.barnesandnoble.com/booksearch/isbnInquiry.asp?userid=... (barnesandnoble)

I) 9) Cracking the GRE CAT with CD-ROM, 2001 Edition
In Stock: 24 hours (Same Day).
Karen Lurie / Paperback / Princeton Review Publishing Corporation / June 2000
B&N Price: $24.80 ~ You Save 20%...
http://shop.barnesandnoble.com/booksearch/isbnInquiry.asp?userid=... (barnesandnoble)

I) 10) Cracking the GMAT CAT with CD-ROM, 2001 Edition
In-Stock: Ships 2-3 days.
Geoff Martz / Paperback / Princeton Review Publishing Corporation / June 2000
B&N Price: $27.96 ~ You Save 20%...
http://shop.barnesandnoble.com/booksearch/isbnInquiry.asp?userid=... (barnesandnoble)

Search Engine 4: amazon4
Query4: Mouse

I) 1) Mouse Count
Usually ships in 24 hours
by Ellen Stoll Walsh(Paperback - March 1995)
Amazon Price: $4.95...
http://www.amazon.com/exec/obidos/ASIN/0152002235/qid=981919875/s... (amazon)

I) 2) Ben and Me ; A New and Astonishing Life of Benjamin Franklin As Written by His Good Mouse Amos
Usually ships in 24 hours
by Robert Lawson(Illustrator)(Paperback - April 1988)

FIG. 120D

Amazon Price: $5.35...
http://www.amazon.com/exec/obidos/ASIN/0316517305/qid=981919875/s... (amazon)

I) 3) Cat & Mouse
Usually ships in 24 hours
by James Patterson(Mass Market Paperback - October 2000)
Amazon Price: $7.19...
http://www.amazon.com/exec/obidos/ASIN/0446606189/qid=981919875/s... (amazon)

I) 4) Mouse Count
Usually ships in 1-2 weeks
by Ellen Stoll Walsh, Diane D'Andrade(Editor)(School & Library Binding - March 1991)
Amazon Price: $10.40...
http://www.amazon.com/exec/obidos/ASIN/0152560238/qid=981919875/s... (amazon)

I) 5) The Mouse of Amherst
Usually ships in 24 hours
by Elizabeth Spires, Claire A. Nivola(Illustrator)(Hardcover - March 1999)
Amazon Price: $12.00...
http://www.amazon.com/exec/obidos/ASIN/0374350833/qid=981919875/s... (amazon)

I) 6) If You Give a Mouse a Cookie
Usually ships in 24 hours
by Felicia Bond(Illustrator), Laura Joffe Numeroff(Hardcover - May 1985)
Amazon Price: $12.76...
http://www.amazon.com/exec/obidos/ASIN/0060245867/qid=981919875/s... (amazon)

I) 7) If You Take a Mouse to the Movies
Usually ships in 24 hours
by Felicia Bond(Illustrator), Laura Joffe Numeroff(Hardcover - October 2000)
Amazon Price: $12.76...
http://www.amazon.com/exec/obidos/ASIN/0060278676/qid=981919875/s... (amazon)

I) 8) What's Wrong with My Mouse?: Behavioral Phenotyping of Transgenic and Knockout Mice
Usually ships in 24 hours
by Jacqueline N., Phd Crawley(Hardcover)
Amazon Price: $79.95...
http://www.amazon.com/exec/obidos/ASIN/0471316393/qid=981919875/s... (amazon)

I) 9) The Anatomical Basis of Mouse Development
Usually ships in 24 hours
by Matthew H. Kaufman, Jonathan B. L. Bard(Hardcover - March 1999)
Amazon Price: $99.95...
http://www.amazon.com/exec/obidos/ASIN/0124020607/qid=981919875/s... (amazon)

I) 10) The Atlas of the Mouse Development
Usually ships in 24 hours
by Matthew H. Kaufman(Hardcover - October 1997)
Amazon Price: $225.00...
http://www.amazon.com/exec/obidos/ASIN/0124020356/qid=981919875/s... (amazon)

Search Engine 5: amazon5
Query5: Dog

I) 1) Stone Fox (Harper Trophy Book)
Usually ships in 24 hours
by John Reynolds Gardiner, Marcia Sewall(Illustrator)(Paperback - February 1988)
Amazon Price: $4.45...
http://www.amazon.com/exec/obidos/ASIN/0064401324/qid=981919875/s... (amazon)

I) 2) How to Housebreak Your Dog in 7 Days
Usually ships in 24 hours
by Shirlee Kalstone(Paperback - April 1991)
Amazon Price: $6.29...
http://www.amazon.com/exec/obidos/ASIN/0553346156/qid=981919875/s... (amazon)

I) 3) Dog Heaven
Usually ships in 24 hours
by Cynthia Rylant(Illustrator)(School & Library Binding - September 1995)
Amazon Price: $12.76...
http://www.amazon.com/exec/obidos/ASIN/0590417010/qid=981919875/s... (amazon)

I) 4) The Stray Dog
Usually ships in 24 hours
by Marc Simont(Illustrator), Reiko Sassa(Hardcover - January 2001)
Amazon Price: $12.76...
http://www.amazon.com/exec/obidos/ASIN/0060289333/qid=981919875/s... (amazon)

I) 5) Let the Big Dog Eat : A Dictionary of the Secret Language of Golf

FIG. 120E

Usually ships in 24 hours
by Hubert Pedroli, et al(Hardcover - June 2000)
Amazon Price: $14.40...
http://www.amazon.com/exec/obidos/ASIN/0688175767/qid=981919875/s... (amazon)

I) 6) Dog Training for Dummies (For Dummies)
Usually ships in 24 hours
by John Volhard, et al(Paperback - January 2001)
Amazon Price: $17.59...
http://www.amazon.com/exec/obidos/ASIN/0764552864/qid=981919875/s... (amazon)

I) 7) How to Be Your Dog's Best Friend : A Training Manual for Dog Owners
Usually ships in 24 hours
by New Skete Monks, et al(Hardcover - October 1978)
Amazon Price: $19.16...
http://www.amazon.com/exec/obidos/ASIN/0316604917/qid=981919875/s... (amazon)

I) 8) Going for the Blue: Inside the World of Show Dogs and Dog Shows
Usually ships in 24 hours
by Roger A. Caras(Hardcover - February 2001)
Amazon Price: $20.76...
http://www.amazon.com/exec/obidos/ASIN/0446526444/qid=981919875/s... (amazon)

I) 9) Family Dog : 16 Weeks to a Well-Mannered Dog-A Simple and Time-Proven Method
Usually ships in 24 hours
by Richard A. Wolters, Red Smith(Introduction)(Hardcover - February 1999)
Amazon Price: $22.36...
http://www.amazon.com/exec/obidos/ASIN/0525944729/qid=981919875/s... (amazon)

I) 10) The Dog Owners Home Veterinary Handbook
Usually ships in 2-3 days
by James M. Giffin, et al(Hardcover - November 1999)
Amazon Price: $22.36...
http://www.amazon.com/exec/obidos/ASIN/0876052014/qid=981919875/s... (amazon)

Search Engine 6: barnesandnoble6
Query6: Dog

I) 1) Clifford's First Valentine's Day
In-Stock: Ships 2-3 days.
Norman Bridwell / Paperback / Scholastic, Inc. / November 1996
B&N Price: $2.69 ~ You Save 10%...
http://shop.barnesandnoble.com/booksearch/isbnInquiry.asp?userid=... (barnesandnoble)

I) 2) Tigers at Twilight: (Magic Tree House Series #19)
In Stock: 24 hours (Same Day).
Mary Pope Osborne,Sal Murdocca (Illustrator) / Paperback / Random House Books for Young Readers / August 1999
B&N Price: $3.59 ~ You Save 10%...
http://shop.barnesandnoble.com/booksearch/isbnInquiry.asp?userid=... (barnesandnoble)

I) 3) Clifford: The Big Red Dog
In Stock: 24 hours (Same Day).
Norman Bridwell / Board Book / Scholastic, Inc. / July 1997
B&N Price: $4.79 ~ You Save 20%...
http://shop.barnesandnoble.com/booksearch/isbnInquiry.asp?userid=... (barnesandnoble)

I) 4) Where the Red Fern Grows
In Stock: 24 hours (Same Day).
Wilson Rawls / Mass Market Paperback / Bantam Books, Incorporated / May 1981
B&N Price: $5.39 ~ You Save 10%...
http://shop.barnesandnoble.com/booksearch/isbnInquiry.asp?userid=... (barnesandnoble)

I) 5) Ginger Pye
In Stock: 24 hours (Same Day).
Eleanor Estes / Paperback / Harcourt / September 2000
B&N Price: $5.40 ~ You Save 10%...
http://shop.barnesandnoble.com/booksearch/isbnInquiry.asp?userid=... (barnesandnoble)

I) 6) 2001 Original 365 Dogs Page-A-Day Calendar
In Stock: 24 hours.
Cal 2001 / Box Calendar / Workman Publishing Company, Inc. / August 2000
B&N Price: $5.47 ~ You Save 50%...
http://shop.barnesandnoble.com/booksearch/isbnInquiry.asp?userid=... (barnesandnoble)

I) 7) 2001 William Wegman Puppies Wall Calendar
In Stock: 24 hours.
Cal 2001 / Wall Calendar / Abrams,Harry N Inc / June 2000
B&N Price: $5.47 ~ You Save 50%...

FIG. 120F http://shop.barnesandnoble.com/booksearch/isbninquiry.asp?userid=... (barnesandnoble)

I) 8) 2001 Man's Best Friend Wall Calendar
In Stock: 24 hours.
Cal 2001,William Wegman (Photographer) / Wall Calendar / Abrams,Harry N Inc / June 2000
B&N Price: $6.47 ~ You Save 50%...
http://shop.barnesandnoble.com/booksearch/isbninquiry.asp?userid=... (barnesandnoble)

I) 9) How to Live with a Neurotic Dog
In Stock: 24 hours (Same Day).
Stephen Baker,Fred Hilliard (Illustrator) / Hardcover / Random House, Incorporated / February 1995
B&N Price: $7.99...
http://shop.barnesandnoble.com/booksearch/isbninquiry.asp?userid=... (barnesandnoble)

I) 10) Dog: The Complete Guide
In Stock: 24 hours (Same Day).
Sarah Whitehead / Hardcover / Barnes & Noble Books / August 1999
B&N Price: $14.98...
http://shop.barnesandnoble.com/booksearch/isbninquiry.asp?userid=... (barnesandnoble)

Search Engine 7: barnesandnoble7

Query7: Mouse

I) 1) Santa Mouse Coloring and Pencil Puzzle Book
In Stock: 24 hours (Same Day).
Michael Brown / Paperback / Barnes & Noble Books / July 1999
B&N Price: $1.49 ~ You Save 50%...
http://shop.barnesandnoble.com/booksearch/isbninquiry.asp?userid=... (barnesandnoble)

I) 2) Santa Mouse
In Stock: 24 hours (Same Day).
Michael Brown,Elfrieda DeWitt (Illustrator) / Hardcover / Barnes & Noble Books / August 1996
B&N Price: $2.49 ~ You Save 50%...
http://shop.barnesandnoble.com/booksearch/isbninquiry.asp?userid=... (barnesandnoble)

I) 3) Santa Mouse Where Are You
In Stock: 24 hours (Same Day).
Michael Brown,Elfrieda DeWitt (Illustrator) / Hardcover / Barnes & Noble Books / August 1997
B&N Price: $2.49 ~ You Save 50%...
http://shop.barnesandnoble.com/booksearch/isbninquiry.asp?userid=... (barnesandnoble)

I) 4) Disney's Toy Story: Movie Storybook
In Stock: 24 hours (Same Day).
Mouse Works Staff / Hardcover / Disney Enterprises, Incorporated / May 2000
B&N Price: $3.98 ~ You Save 42%...
http://shop.barnesandnoble.com/booksearch/isbninquiry.asp?userid=... (barnesandnoble)

I) 5) The Mouse and the Motorcycle
In Stock: 24 hours (Same Day).
Beverly Cleary,Louis Darling (Illustrator) / Paperback / Morrow,William & Co / August 1990
B&N Price: $4.45 ~ You Save 10%...
http://shop.barnesandnoble.com/booksearch/isbninquiry.asp?userid=... (barnesandnoble)

I) 6) Cat & Mouse
In Stock: 24 hours (Same Day).
James Patterson / Mass Market Paperback / Warner Books, Incorporated / October 1998
B&N Price: $7.19 ~ You Save 10%...
http://shop.barnesandnoble.com/booksearch/isbninquiry.asp?userid=... (barnesandnoble)

I) 7) If You Give a Mouse a Cookie Mini Book and Ornament
In Stock: 24 hours.
Laura Joffe Numeroff,Felicia Bond (Illustrator) / Hardcover / HarperCollins Children's Books / September 2000
B&N Price: $7.96 ~ You Save 20%...
http://shop.barnesandnoble.com/booksearch/isbninquiry.asp?userid=... (barnesandnoble)

I) 8) If You Give a Mouse a Cookie
In Stock: 24 hours (Same Day).
Laura Joffe Numeroff,Felicia Bond (Illustrator) / Hardcover / HarperCollins Children's Books / January 1985
B&N Price: $11.96 ~ You Save 20%...
http://shop.barnesandnoble.com/booksearch/isbninquiry.asp?userid=... (barnesandnoble)

I) 9) If You Take a Mouse to the Movies
In Stock: 24 hours.
Laura Joffe Numeroff,Felicia Bond (Illustrator) / Hardcover / HarperCollins Children's Books / September 2000

FIG. 120G

B&N Price: $12.76 ~ You Save 20%...
http://shop.barnesandnoble.com/booksearch/isbnInquiry.asp?userid=... (barnesandnoble)

I) 10) Craft Lessons: Teaching Writing K through 8
In Stock: 24 hours.
Ralph J. Fletcher,Joann Portalupi / Paperback / Stenhouse Publishers / September 1998
B&N Price: $17.50...
http://shop.barnesandnoble.com/booksearch/isbnInquiry.asp?userid=... (barnesandnoble)

Search Engine 8: borders8
Query8: Dog

I) 1) Baby Animals: Puppies
In stock - ships in 24 hours
Petty, Kate ~ Trade Paperback ~ 1992
Borders Price: $3.56 ~ You Save: $0.39 (10%)...
http://search.borders.com/fcgi-bin/db2www/search/search.d2w/Detai... (borders)

I) 2) Animal Clinic for Dogs
In stock - ships in 24 hours
Humphries, Jim ~ Hardcover ~ 1998
Borders Price: $6.39 ~ You Save: $1.60 (20%)...
http://search.borders.com/fcgi-bin/db2www/search/search.d2w/Detai... (borders)

I) 3) Adopting the Racing Greyhound
In stock - ships in 24 hours
Branigan, Cynthia A. ~ Trade Paperback ~ 1998
Borders Price: $11.66 ~ You Save: $1.29 (10%)...
http://search.borders.com/fcgi-bin/db2www/search/search.d2w/Detai... (borders)

I) 4) Bark Busters: Solving Your Dog's Behavioral Problems
In stock - ships in 24 hours
Wilson, Sylvia ~ Trade Paperback ~ 1997
Borders Price: $11.66 ~ You Save: $1.29 (10%)...
http://search.borders.com/fcgi-bin/db2www/search/search.d2w/Detai... (borders)

I) 5) Anastasia, Absolutely
In stock - ships in 24 hours
Lowry, Lois ~ Hardcover ~ 1995
Borders Price: $12.80 ~ You Save: $3.20 (20%)...
http://search.borders.com/fcgi-bin/db2www/search/search.d2w/Detai... (borders)

I) 6) Baby's Memory Book: A Baby Record Book
In stock - ships in 24 hours
Nister, Ernest ~ Hardcover ~ 1986
Borders Price: $15.99 ~ You Save: $4.00 (20%)...
http://search.borders.com/fcgi-bin/db2www/search/search.d2w/Detai... (borders)

I) 7) A-Z of Dog Diseases & Health Problems
In stock - ships in 24 hours
Lane, Dick ~ Trade Paperback ~ 1997
Borders Price: $22.46 ~ You Save: $2.49 (10%)...
http://search.borders.com/fcgi-bin/db2www/search/search.d2w/Detai... (borders)

I) 8) American Staffordshire Terrier: Gamester & Guardian
In stock - ships in 24 hours
Foster, Sarah ~ Trade Paperback ~ 1998
Borders Price: $22.46 ~ You Save: $2.49 (10%)...
http://search.borders.com/fcgi-bin/db2www/search/search.d2w/Detai... (borders)

I) 9) Agility Training: The Fun Sport for All Dogs
In stock - ships in 24 hours
Simmons-Moake, Jane ~ Trade Paperback ~ 1992
Borders Price: $23.36 ~ You Save: $2.59 (10%)...
http://search.borders.com/fcgi-bin/db2www/search/search.d2w/Detai... (borders)

I) 10) Advanced Gundog Training: Practical Fieldwork & Competition
In stock - ships in 24 hours
Deeley, Martin ~ Hardcover ~ 1994
Borders Price: $27.96 ~ You Save: $6.99 (20%)...
http://search.borders.com/fcgi-bin/db2www/search/search.d2w/Detai... (borders)

Search Engine 9: google9
Query9: Cat

I) 1) Alley Cat Allies
Alley Cat Allies Has a Better Idea. M odeled after successful programs in the United Kingdom and parts of Africa and Europe, Alley Cat Allies (ACA) advocates a ...
http://www.alleycat.org/ (google)

FIG. 120H

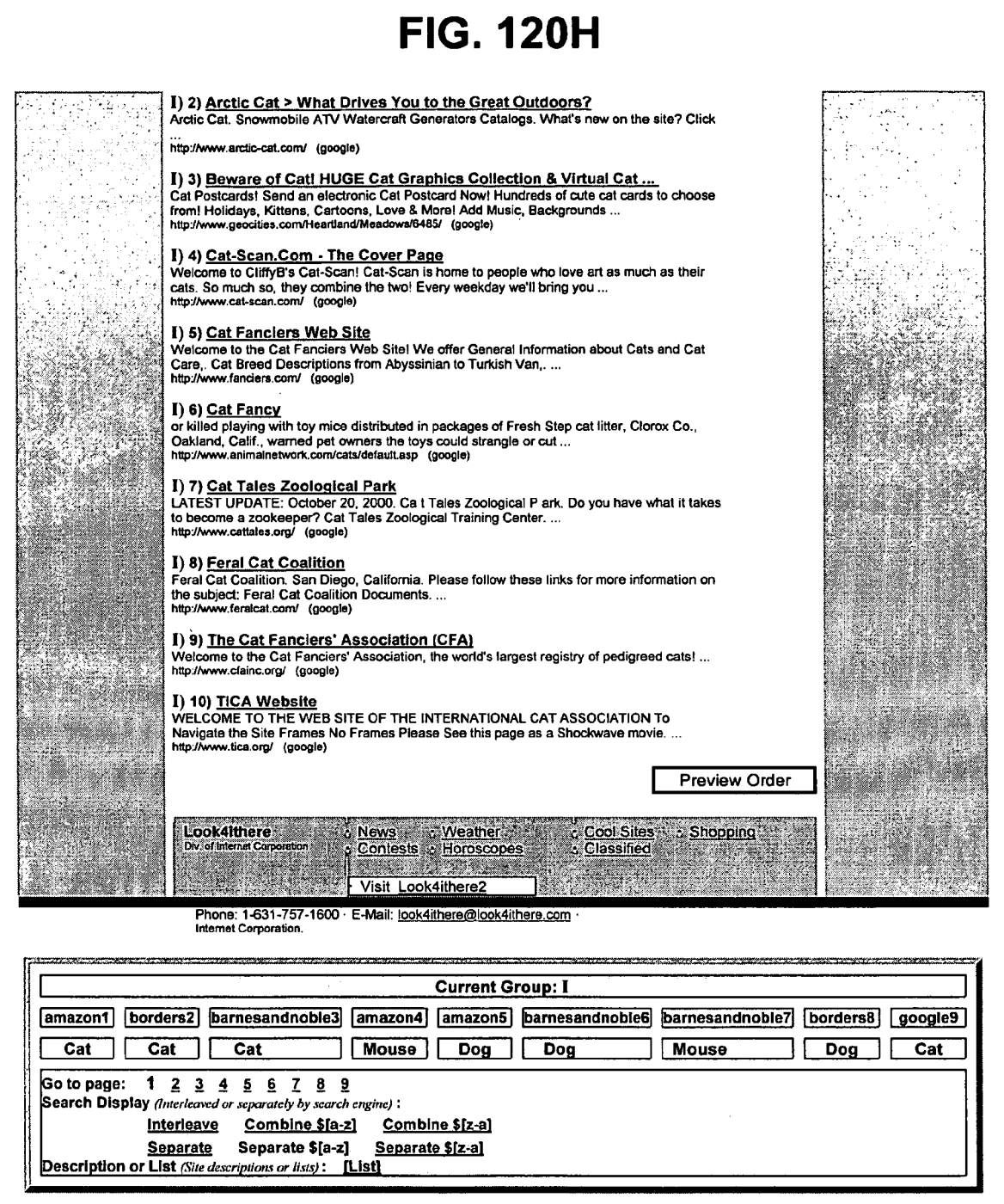

I) 2) Arctic Cat > What Drives You to the Great Outdoors?
Arctic Cat. Snowmobile ATV Watercraft Generators Catalogs. What's new on the site? Click ...
http://www.arctic-cat.com/ (google)

I) 3) Beware of Cat! HUGE Cat Graphics Collection & Virtual Cat ...
Cat Postcards! Send an electronic Cat Postcard Now! Hundreds of cute cat cards to choose from! Holidays, Kittens, Cartoons, Love & More! Add Music, Backgrounds ...
http://www.geocities.com/Heartland/Meadows/6485/ (google)

I) 4) Cat-Scan.Com - The Cover Page
Welcome to CliffyB's Cat-Scan! Cat-Scan is home to people who love art as much as their cats. So much so, they combine the two! Every weekday we'll bring you ...
http://www.cat-scan.com/ (google)

I) 5) Cat Fanciers Web Site
Welcome to the Cat Fanciers Web Site! We offer General Information about Cats and Cat Care,. Cat Breed Descriptions from Abyssinian to Turkish Van,. ...
http://www.fanciers.com/ (google)

I) 6) Cat Fancy
or killed playing with toy mice distributed in packages of Fresh Step cat litter, Clorox Co., Oakland, Calif., warned pet owners the toys could strangle or cut ...
http://www.animalnetwork.com/cats/default.asp (google)

I) 7) Cat Tales Zoological Park
LATEST UPDATE: October 20, 2000. Ca t Tales Zoological P ark. Do you have what it takes to become a zookeeper? Cat Tales Zoological Training Center. ...
http://www.cattales.org/ (google)

I) 8) Feral Cat Coalition
Feral Cat Coalition. San Diego, California. Please follow these links for more information on the subject: Feral Cat Coalition Documents. ...
http://www.feralcat.com/ (google)

I) 9) The Cat Fanciers' Association (CFA)
Welcome to the Cat Fanciers' Association, the world's largest registry of pedigreed cats! ...
http://www.cfainc.org/ (google)

I) 10) TICA Website
WELCOME TO THE WEB SITE OF THE INTERNATIONAL CAT ASSOCIATION To Navigate the Site Frames No Frames Please See this page as a Shockwave movie. ...
http://www.tica.org/ (google)

Preview Order

Look4ithere
Div. of Internet Corporation
News Weather Cool Sites Shopping
Contests Horoscopes Classified Visit Look4ithere2

Phone: 1-631-757-1600 · E-Mail: look4ithere@look4ithere.com ·
Internet Corporation.

Current Group: I

| amazon1 | borders2 | barnesandnoble3 | amazon4 | amazon5 | barnesandnoble6 | barnesandnoble7 | borders8 | google9 |
|---|---|---|---|---|---|---|---|---|
| Cat | Cat | Cat | Mouse | Dog | Dog | Mouse | Dog | Cat |

Go to page: 1 2 3 4 5 6 7 8 9
Search Display *(Interleaved or separately by search engine)* :
Interleave Combine $[a-z] Combine $[z-a]
Separate Separate $[a-z] Separate $[z-a]
Description or List *(Site descriptions or lists)* : [List]

FIG. 122B

Usually ships in 2-3 days
by Thomas H. Martinson(Paperback - November 2000)
Amazon Price: $11.16...
http://www.amazon.com/exec/obidos/ASIN/0764561197/qid=981919922/s... (amazon)

I) 9) Eating the Cheshire Cat
Usually ships in 24 hours
by Helen Ellis(Paperback - February 2001)
Amazon Price: $10.40...
http://www.amazon.com/exec/obidos/ASIN/068486441X/qid=981919922/s... (amazon)

I) 10) Pawing Through the Past (Age of Unreason)
Usually ships in 24 hours
by Rita Mae Brown, Sneaky Pie Brown(Mass Market Paperback - January 2001)
Amazon Price: $6.29...
http://www.amazon.com/exec/obidos/ASIN/0553580256/qid=981919922/s... (amazon)

Search Engine 2: borders2
Query2: Cat

I) 1) Accreditation of Teacher Education: The Story of CATE 1984-1989
In stock - ships in 24 hours
MacIntyre, Gordon ~ Trade Paperback ~ 1991
Borders Price: $34.95 ...
http://search.borders.com/fcgi-bin/db2www/search/search.d2w/Detai... (borders)

I) 2) Arthur's World of Cats
In stock - ships in 24 hours
Head, Ann ~ Hardcover ~ 1997
Borders Price: $18.36 ~ You Save: $4.59 (20%)...
http://search.borders.com/fcgi-bin/db2www/search/search.d2w/Detai... (borders)

I) 3) All about Himalayan Cats
In stock - ships in 24 hours
Bearley, Joan M. ~ Hardcover ~ 1989
Borders Price: $14.36 ~ You Save: $3.59 (20%)...
http://search.borders.com/fcgi-bin/db2www/search/search.d2w/Detai... (borders)

I) 4) Alfie & the Birthday Surprise
In stock - ships in 24 hours
Hughes, Shirley ~ Hardcover ~ 1998
Borders Price: $12.80 ~ You Save: $3.20 (20%)...
http://search.borders.com/fcgi-bin/db2www/search/search.d2w/Detai... (borders)

I) 5) Aloha, Dolores
In stock - ships in 24 hours
Samuels, Barbara ~ Hardcover ~ 2000
Borders Price: $12.76 ~ You Save: $3.19 (20%)...
http://search.borders.com/fcgi-bin/db2www/search/search.d2w/Detai... (borders)

I) 6) 250 Things You Can Do to Make Your Cat Adore You
In stock - ships in 24 hours
Newkirk, Ingrid ~ Trade Paperback ~ 1998
Borders Price: $9.90 ~ You Save: $1.10 (10%)...
http://search.borders.com/fcgi-bin/db2www/search/search.d2w/Detai... (borders)

I) 7) Bedtime Stories for Cats
In stock - ships in 24 hours
Jasheway, Leigh A. ~ Hardcover ~ 1997
Borders Price: $7.96 ~ You Save: $1.99 (20%)...
http://search.borders.com/fcgi-bin/db2www/search/search.d2w/Detai... (borders)

I) 8) Adopting Cats & Kittens: A Care & Training Guide
Ships within 2-3 days
Jankowski, Connie ~ Trade Paperback ~ 1993
Borders Price: $7.20 ~ You Save: $0.80 (10%)...
http://search.borders.com/fcgi-bin/db2www/search/search.d2w/Detai... (borders)

I) 9) Animal Clinic for Cats
In stock - ships in 24 hours
Humphries, Jim ~ Hardcover ~ 1998
Borders Price: $6.39 ~ You Save: $1.60 (20%)...
http://search.borders.com/fcgi-bin/db2www/search/search.d2w/Detai... (borders)

I) 10) Abyssinian Cats: Everything about Acquisition, Care, Nutrition, Behavoir, Health Care, & Breeding
In stock - ships in 24 hours
Hauppauge, J. Anne ~ Trade Paperback ~ 1995
Borders Price: $6.26 ~ You Save: $0.69 (10%)...
http://search.borders.com/fcgi-bin/db2www/search/search.d2w/Detai... (borders)

FIG. 122C

Search Engine 3: barnesandnoble3
Query3: Cat

I) 1) Cracking the GMAT CAT with CD-ROM, 2001 Edition
In-Stock: Ships 2-3 days.
Geoff Martz / Paperback / Princeton Review Publishing Corporation / June 2000
B&N Price: $27.96 ~ You Save 20%...
http://shop.barnesandnoble.com/booksearch/isbnInquiry.asp?userid=... (barnesandnoble)

I) 2) Cracking the GRE CAT with CD-ROM, 2001 Edition
In Stock: 24 hours (Same Day).
Karen Lurie / Paperback / Princeton Review Publishing Corporation / June 2000
B&N Price: $24.80 ~ You Save 20%...
http://shop.barnesandnoble.com/booksearch/isbnInquiry.asp?userid=... (barnesandnoble)

I) 3) The Cat Who Smelled a Rat
In Stock: 24 hours (Same Day).
Lilian Jackson Braun / Hardcover / Penguin Putnam / January 2001
B&N Price: $19.16 ~ You Save 20%...
http://shop.barnesandnoble.com/booksearch/isbnInquiry.asp?userid=... (barnesandnoble)

I) 4) How to Live with a Neurotic Cat
In Stock: 24 hours (Same Day).
Stephen Baker / Hardcover / Random House Value Publishing, Incorporated / September 1999
B&N Price: $7.99...
http://shop.barnesandnoble.com/booksearch/isbnInquiry.asp?userid=... (barnesandnoble)

I) 5) The Cat in the Hat (Classic Gift Seuss Series)
In Stock: 24 hours (Same Day).
Dr. Seuss / Hardcover / Random House, Incorporated / May 1976
B&N Price: $6.39 ~ You Save 20%...
http://shop.barnesandnoble.com/booksearch/isbnInquiry.asp?userid=... (barnesandnoble)

I) 6) The Cat Who Robbed a Bank
In Stock: 24 hours (Same Day).
Lilian Jackson Braun / Paperback / Berkley Publishing Group / January 2001
B&N Price: $6.29 ~ You Save 10%...
http://shop.barnesandnoble.com/booksearch/isbnInquiry.asp?userid=... (barnesandnoble)

I) 7) 2001 Classic Cats Wall Calendar
In Stock: 24 hours.
Cal 2001 / Wall Calendar / June 2000
B&N Price: $5.97 ~ You Save 50%...
http://shop.barnesandnoble.com/booksearch/isbnInquiry.asp?userid=... (barnesandnoble)

I) 8) 2001 Original 365 Cats Page-A-Day Calendar
In Stock: 24 hours.
Cal 2001 / Box Calendar / Workman Publishing Company, Inc. / June 2000
B&N Price: $5.47 ~ You Save 50%...
http://shop.barnesandnoble.com/booksearch/isbnInquiry.asp?userid=... (barnesandnoble)

I) 9) 2001 Hello Kitty Wall Calendar
In Stock: 24 hours.
Cal 2001` (Illustrator) / Wall Calendar / Abrams,Harry N Inc / June 2000
B&N Price: $4.97 ~ You Save 50%...
http://shop.barnesandnoble.com/booksearch/isbnInquiry.asp?userid=... (barnesandnoble)

I) 10) Cat's Letters to Santa
In Stock: 24 hours (Same Day).
Bill Adler (Editor),Paul Bacon (Illustrator) / Hardcover / Galahad Books / September 1997
B&N Price: $2.99 ~ You Save 50%...
http://shop.barnesandnoble.com/booksearch/isbnInquiry.asp?userid=... (barnesandnoble)

Search Engine 4: amazon4
Query4: Mouse

I) 1) The Atlas of the Mouse Development
Usually ships in 24 hours
by Matthew H. Kaufman(Hardcover - October 1997)
Amazon Price: $225.00...
http://www.amazon.com/exec/obidos/ASIN/0124020356/qid=981919922/s... (amazon)

I) 2) The Anatomical Basis of Mouse Development
Usually ships in 24 hours
by Matthew H. Kaufman, Jonathan B. L. Bard(Hardcover - March 1999)
Amazon Price: $99.95...
http://www.amazon.com/exec/obidos/ASIN/0124020607/qid=981919922/s... (amazon)

FIG. 122D

I) 3) What's Wrong with My Mouse?: Behavioral Phenotyping of Transgenic and Knockout Mice
Usually ships in 24 hours
by Jacqueline N., Phd Crawley(Hardcover)
Amazon Price: $79.95...
http://www.amazon.com/exec/obidos/ASIN/0471316393/qid=981919922/s... (amazon)

I) 4) If You Take a Mouse to the Movies
Usually ships in 24 hours
by Felicia Bond(Illustrator), Laura Joffe Numeroff(Hardcover - October 2000)
Amazon Price: $12.76...
http://www.amazon.com/exec/obidos/ASIN/0060278676/qid=981919922/s... (amazon)

I) 5) If You Give a Mouse a Cookie
Usually ships in 24 hours
by Felicia Bond(Illustrator), Laura Joffe Numeroff(Hardcover - May 1985)
Amazon Price: $12.76...
http://www.amazon.com/exec/obidos/ASIN/0060245867/qid=981919922/s... (amazon)

I) 6) The Mouse of Amherst
Usually ships in 24 hours
by Elizabeth Spires, Claire A. Nivola(Illustrator)(Hardcover - March 1999)
Amazon Price: $12.00...
http://www.amazon.com/exec/obidos/ASIN/0374350833/qid=981919922/s... (amazon)

I) 7) Mouse Count
Usually ships in 1-2 weeks
by Ellen Stoll Walsh, Diane D'Andrade(Editor)(School & Library Binding - March 1991)
Amazon Price: $10.40...
http://www.amazon.com/exec/obidos/ASIN/0152560238/qid=981919922/s... (amazon)

I) 8) Cat & Mouse
Usually ships in 24 hours
by James Patterson(Mass Market Paperback - October 2000)
Amazon Price: $7.19...
http://www.amazon.com/exec/obidos/ASIN/0446606189/qid=981919922/s... (amazon)

I) 9) Ben and Me : A New and Astonishing Life of Benjamin Franklin As Written by His Good Mouse Amos
Usually ships in 24 hours
by Robert Lawson(Illustrator)(Paperback - April 1988)
Amazon Price: $5.35...
http://www.amazon.com/exec/obidos/ASIN/0316517305/qid=981919922/s... (amazon)

I) 10) Mouse Count
Usually ships in 24 hours
by Ellen Stoll Walsh(Paperback - March 1995)
Amazon Price: $4.95...
http://www.amazon.com/exec/obidos/ASIN/0152002235/qid=981919922/s... (amazon)

Search Engine 5: amazon5
Query5: Dog

I) 1) The Dog Owners Home Veterinary Handbook
Usually ships in 2-3 days
by James M. Giffin, et al(Hardcover - November 1999)
Amazon Price: $22.36...
http://www.amazon.com/exec/obidos/ASIN/0876052014/qid=981919922/s... (amazon)

I) 2) Family Dog : 16 Weeks to a Well-Mannered Dog-A Simple and Time-Proven Method
Usually ships in 24 hours
by Richard A. Wolters, Red Smith(Introduction)(Hardcover - February 1999)
Amazon Price: $22.36...
http://www.amazon.com/exec/obidos/ASIN/0525944729/qid=981919922/s... (amazon)

I) 3) Going for the Blue: Inside the World of Show Dogs and Dog Shows
Usually ships in 24 hours
by Roger A. Caras(Hardcover - February 2001)
Amazon Price: $20.76...
http://www.amazon.com/exec/obidos/ASIN/0446526444/qid=981919922/s... (amazon)

I) 4) How to Be Your Dog's Best Friend : A Training Manual for Dog Owners
Usually ships in 24 hours
by New Skete Monks, et al(Hardcover - October 1978)
Amazon Price: $19.16...
http://www.amazon.com/exec/obidos/ASIN/0316604917/qid=981919922/s... (amazon)

I) 5) Dog Training for Dummies (For Dummies)

FIG. 122E

Usually ships in 24 hours
by John Volhard, et al(Paperback - January 2001)
Amazon Price: $17.59...
http://www.amazon.com/exec/obidos/ASIN/0764552884/qid=981919922/s... (amazon)

I) 6) Let the Big Dog Eat : A Dictionary of the Secret Language of Golf
Usually ships in 24 hours
by Hubert Pedroli, et al(Hardcover - June 2000)
Amazon Price: $14.40...
http://www.amazon.com/exec/obidos/ASIN/0688175767/qid=981919922/s... (amazon)

I) 7) The Stray Dog
Usually ships in 24 hours
by Marc Simont(Illustrator), Reiko Sassa(Hardcover - January 2001)
Amazon Price: $12.76...
http://www.amazon.com/exec/obidos/ASIN/0060289333/qid=981919922/s... (amazon)

I) 8) Dog Heaven
Usually ships in 24 hours
by Cynthia Rylant(Illustrator)(School & Library Binding - September 1995)
Amazon Price: $12.76...
http://www.amazon.com/exec/obidos/ASIN/0590417010/qid=981919922/s... (amazon)

I) 9) How to Housebreak Your Dog in 7 Days
Usually ships in 24 hours
by Shirlee Kalstone(Paperback - April 1991)
Amazon Price: $6.29...
http://www.amazon.com/exec/obidos/ASIN/0553346156/qid=981919922/s... (amazon)

I) 10) Stone Fox (Harper Trophy Book)
Usually ships in 24 hours
by John Reynolds Gardiner, Marcia Sewall(Illustrator)(Paperback - February 1988)
Amazon Price: $4.45...
http://www.amazon.com/exec/obidos/ASIN/0064401324/qid=981919922/s... (amazon)

Search Engine 6: barnesandnoble6
Query6: Dog

I) 1) Dog: The Complete Guide
In Stock: 24 hours (Same Day).
Sarah Whitehead / Hardcover / Barnes & Noble Books / August 1999
B&N Price: $14.98...
http://shop.barnesandnoble.com/booksearch/isbnInquiry.asp?userid=... (barnesandnoble)

I) 2) How to Live with a Neurotic Dog
In Stock: 24 hours (Same Day).
Stephen Baker,Fred Hilliard (Illustrator) / Hardcover / Random House, Incorporated / February 1995
B&N Price: $7.99...
http://shop.barnesandnoble.com/booksearch/isbnInquiry.asp?userid=... (barnesandnoble)

I) 3) 2001 Man's Best Friend Wall Calendar
In Stock: 24 hours.
Cal 2001,William Wegman (Photographer) / Wall Calendar / Abrams,Harry N Inc / June 2000
B&N Price: $6.47 ~ You Save 50%...
http://shop.barnesandnoble.com/booksearch/isbnInquiry.asp?userid=... (barnesandnoble)

I) 4) 2001 William Wegman Puppies Wall Calendar
In Stock: 24 hours.
Cal 2001 / Wall Calendar / Abrams,Harry N Inc / June 2000
B&N Price: $5.47 ~ You Save 50%...
http://shop.barnesandnoble.com/booksearch/isbnInquiry.asp?userid=... (barnesandnoble)

I) 5) 2001 Original 365 Dogs Page-A-Day Calendar
In Stock: 24 hours.
Cal 2001 / Box Calendar / Workman Publishing Company, Inc. / August 2000
B&N Price: $5.47 ~ You Save 50%...
http://shop.barnesandnoble.com/booksearch/isbnInquiry.asp?userid=... (barnesandnoble)

I) 6) Ginger Pye
In Stock: 24 hours (Same Day).
Eleanor Estes / Paperback / Harcourt / September 2000
B&N Price: $5.40 ~ You Save 10%...
http://shop.barnesandnoble.com/booksearch/isbnInquiry.asp?userid=... (barnesandnoble)

I) 7) Where the Red Fern Grows
In Stock: 24 hours (Same Day).
Wilson Rawls / Mass Market Paperback / Bantam Books, Incorporated / May 1981
B&N Price: $5.39 ~ You Save 10%...
http://shop.barnesandnoble.com/booksearch/isbnInquiry.asp?userid=... (barnesandnoble)

FIG. 122F

I) 8) Clifford: The Big Red Dog
In Stock: 24 hours (Same Day).
Norman Bridwell / Board Book / Scholastic, Inc. / July 1997
B&N Price: $4.79 ~ You Save 20%...
http://shop.barnesandnoble.com/booksearch/isbninquiry.asp?userid=... (barnesandnoble)

I) 9) Tigers at Twilight: (Magic Tree House Series #19)
In Stock: 24 hours (Same Day).
Mary Pope Osborne,Sal Murdocca (Illustrator) / Paperback / Random House Books for Young Readers / August 1999
B&N Price: $3.59 ~ You Save 10%...
http://shop.barnesandnoble.com/booksearch/isbninquiry.asp?userid=... (barnesandnoble)

I) 10) Clifford's First Valentine's Day
In-Stock: Ships 2-3 days.
Norman Bridwell / Paperback / Scholastic, Inc. / November 1996
B&N Price: $2.69 ~ You Save 10%...
http://shop.barnesandnoble.com/booksearch/isbninquiry.asp?userid=... (barnesandnoble)

Search Engine 7: barnesandnoble7

Query7: Mouse

I) 1) Craft Lessons: Teaching Writing K through 8
In Stock: 24 hours.
Ralph J. Fletcher,Joann Portalupi / Paperback / Stenhouse Publishers / September 1998
B&N Price: $17.50...
http://shop.barnesandnoble.com/booksearch/isbninquiry.asp?userid=... (barnesandnoble)

I) 2) If You Take a Mouse to the Movies
In Stock: 24 hours.
Laura Joffe Numeroff,Felicia Bond (Illustrator) / Hardcover / HarperCollins Children's Books / September 2000
B&N Price: $12.76 ~ You Save 20%...
http://shop.barnesandnoble.com/booksearch/isbninquiry.asp?userid=... (barnesandnoble)

I) 3) If You Give a Mouse a Cookie
In Stock: 24 hours (Same Day).
Laura Joffe Numeroff,Felicia Bond (Illustrator) / Hardcover / HarperCollins Children's Books / January 1985
B&N Price: $11.96 ~ You Save 20%...
http://shop.barnesandnoble.com/booksearch/isbninquiry.asp?userid=... (barnesandnoble)

I) 4) If You Give a Mouse a Cookie Mini Book and Ornament
In Stock: 24 hours.
Laura Joffe Numeroff,Felicia Bond (Illustrator) / Hardcover / HarperCollins Children's Books / September 2000
B&N Price: $7.96 ~ You Save 20%...
http://shop.barnesandnoble.com/booksearch/isbninquiry.asp?userid=... (barnesandnoble)

I) 5) Cat & Mouse
In Stock: 24 hours (Same Day).
James Patterson / Mass Market Paperback / Warner Books, Incorporated / October 1998
B&N Price: $7.19 ~ You Save 10%...
http://shop.barnesandnoble.com/booksearch/isbninquiry.asp?userid=... (barnesandnoble)

I) 6) The Mouse and the Motorcycle
In Stock: 24 hours (Same Day).
Beverly Cleary,Louis Darling (Illustrator) / Paperback / Morrow,William & Co / August 1990
B&N Price: $4.45 ~ You Save 10%...
http://shop.barnesandnoble.com/booksearch/isbninquiry.asp?userid=... (barnesandnoble)

I) 7) Disney's Toy Story: Movie Storybook
In Stock: 24 hours (Same Day).
Mouse Works Staff / Hardcover / Disney Enterprises, Incorporated / May 2000
B&N Price: $3.98 ~ You Save 42%...
http://shop.barnesandnoble.com/booksearch/isbninquiry.asp?userid=... (barnesandnoble)

I) 8) Santa Mouse Where Are You
In Stock: 24 hours (Same Day).
Michael Brown,Elfrieda DeWitt (Illustrator) / Hardcover / Barnes & Noble Books / August 1997
B&N Price: $2.49 ~ You Save 50%...
http://shop.barnesandnoble.com/booksearch/isbninquiry.asp?userid=... (barnesandnoble)

I) 9) Santa Mouse
In Stock: 24 hours (Same Day).
Michael Brown,Elfrieda DeWitt (Illustrator) / Hardcover / Barnes & Noble Books / August 1996
B&N Price: $2.49 ~ You Save 50%...
http://shop.barnesandnoble.com/booksearch/isbninquiry.asp?userid=... (barnesandnoble)

FIG. 122G

I) 10) Santa Mouse Coloring and Pencil Puzzle Book
In Stock: 24 hours (Same Day).
Michael Brown / Paperback / Barnes & Noble Books / July 1999
B&N Price: $1.49 ~ You Save 50%...
http://shop.barnesandnoble.com/booksearch/isbnInquiry.asp?userid=... (barnesandnoble)

Search Engine 8: borders8
Query8: Dog

I) 1) Advanced Gundog Training: Practical Fieldwork & Competition
In stock - ships in 24 hours
Deeley, Martin ~ Hardcover ~ 1994
Borders Price: $27.96 ~ You Save: $6.99 (20%)...
http://search.borders.com/fcgi-bin/db2www/search/search.d2w/Detai... (borders)

I) 2) Agility Training: The Fun Sport for All Dogs
In stock - ships in 24 hours
Simmons-Moake, Jane ~ Trade Paperback ~ 1992
Borders Price: $23.36 ~ You Save: $2.59 (10%)...
http://search.borders.com/fcgi-bin/db2www/search/search.d2w/Detai... (borders)

I) 3) American Staffordshire Terrier: Gamester & Guardian
In stock - ships in 24 hours
Foster, Sarah ~ Trade Paperback ~ 1998
Borders Price: $22.46 ~ You Save: $2.49 (10%)...
http://search.borders.com/fcgi-bin/db2www/search/search.d2w/Detai... (borders)

I) 4) A-Z of Dog Diseases & Health Problems
In stock - ships in 24 hours
Lane, Dick ~ Trade Paperback ~ 1997
Borders Price: $22.46 ~ You Save: $2.49 (10%)...
http://search.borders.com/fcgi-bin/db2www/search/search.d2w/Detai... (borders)

I) 5) Baby's Memory Book: A Baby Record Book
In stock - ships in 24 hours
Nister, Ernest ~ Hardcover ~ 1986
Borders Price: $15.99 ~ You Save: $4.00 (20%)...
http://search.borders.com/fcgi-bin/db2www/search/search.d2w/Detai... (borders)

I) 6) Anastasia, Absolutely
In stock - ships in 24 hours
Lowry, Lois ~ Hardcover ~ 1995
Borders Price: $12.80 ~ You Save: $3.20 (20%)...
http://search.borders.com/fcgi-bin/db2www/search/search.d2w/Detai... (borders)

I) 7) Bark Busters: Solving Your Dog's Behavioral Problems
In stock - ships in 24 hours
Wilson, Sylvia ~ Trade Paperback ~ 1997
Borders Price: $11.66 ~ You Save: $1.29 (10%)...
http://search.borders.com/fcgi-bin/db2www/search/search.d2w/Detai... (borders)

I) 8) Adopting the Racing Greyhound
In stock - ships in 24 hours
Branigan, Cynthia A. ~ Trade Paperback ~ 1998
Borders Price: $11.66 ~ You Save: $1.29 (10%)...
http://search.borders.com/fcgi-bin/db2www/search/search.d2w/Detai... (borders)

I) 9) Animal Clinic for Dogs
In stock - ships in 24 hours
Humphries, Jim ~ Hardcover ~ 1998
Borders Price: $6.39 ~ You Save: $1.60 (20%)...
http://search.borders.com/fcgi-bin/db2www/search/search.d2w/Detai... (borders)

I) 10) Baby Animals: Puppies
In stock - ships in 24 hours
Petty, Kate ~ Trade Paperback ~ 1992
Borders Price: $3.56 ~ You Save: $0.39 (10%)...
http://search.borders.com/fcgi-bin/db2www/search/search.d2w/Detai... (borders)

Search Engine 9: google9
Query9: Cat

I) 1) TICA Website
WELCOME TO THE WEB SITE OF THE INTERNATIONAL CAT ASSOCIATION To Navigate the Site Frames No Frames Please See this page as a Shockwave movie. ...
http://www.tica.org/ (google)

I) 2) The Cat Fanciers' Association (CFA)

FIG. 122H

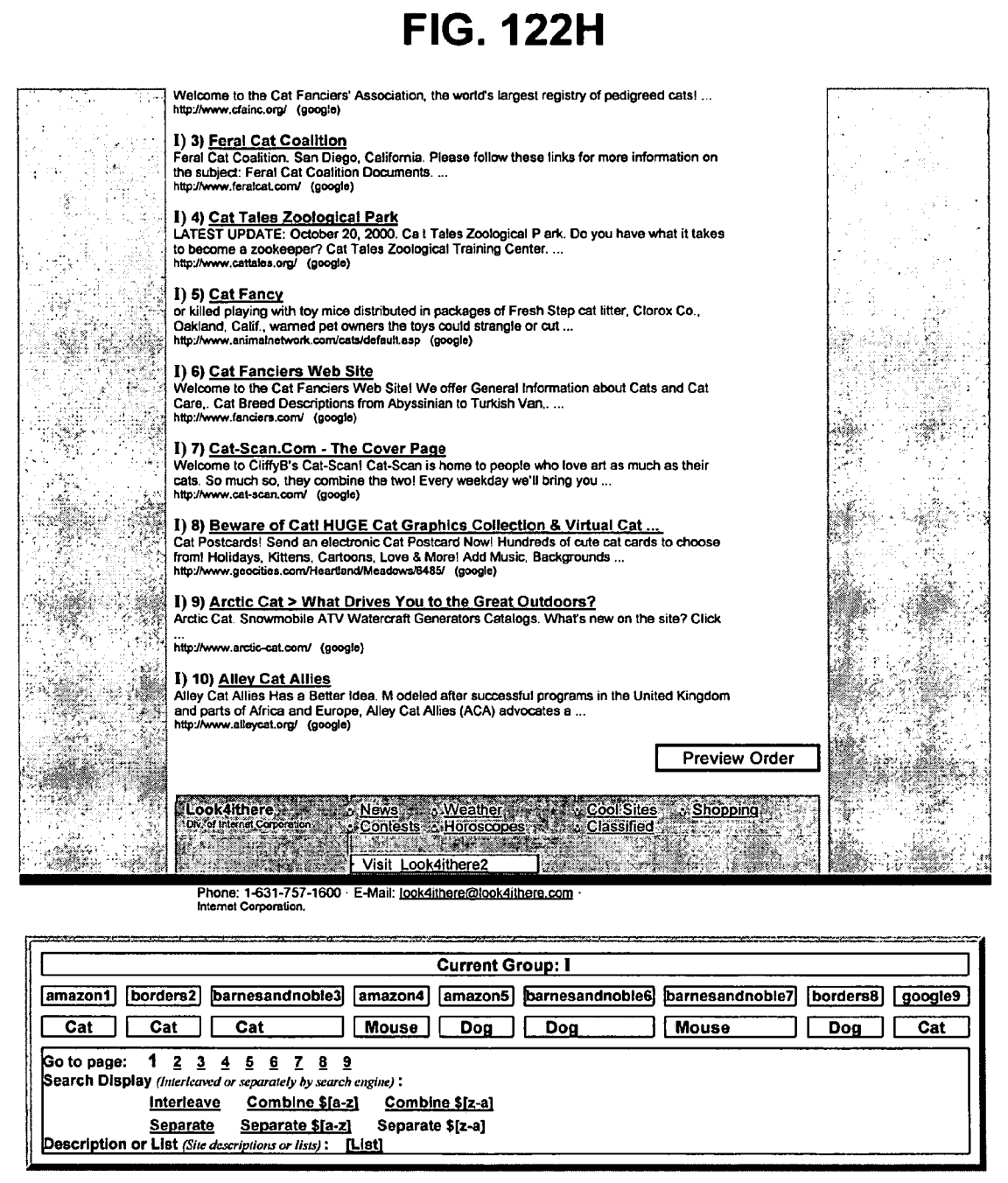

Welcome to the Cat Fanciers' Association, the world's largest registry of pedigreed cats! ...
http://www.cfainc.org/ (google)

I) 3) Feral Cat Coalition
Feral Cat Coalition. San Diego, California. Please follow these links for more information on the subject: Feral Cat Coalition Documents. ...
http://www.feralcat.com/ (google)

I) 4) Cat Tales Zoological Park
LATEST UPDATE: October 20, 2000. Ca t Tales Zoological P ark. Do you have what it takes to become a zookeeper? Cat Tales Zoological Training Center. ...
http://www.cattales.org/ (google)

I) 5) Cat Fancy
or killed playing with toy mice distributed in packages of Fresh Step cat litter, Clorox Co., Oakland, Calif., warned pet owners the toys could strangle or cut ...
http://www.animalnetwork.com/cats/default.asp (google)

I) 6) Cat Fanciers Web Site
Welcome to the Cat Fanciers Web Site! We offer General Information about Cats and Cat Care,. Cat Breed Descriptions from Abyssinian to Turkish Van.. ...
http://www.fanciers.com/ (google)

I) 7) Cat-Scan.Com - The Cover Page
Welcome to CliffyB's Cat-Scan! Cat-Scan is home to people who love art as much as their cats. So much so, they combine the two! Every weekday we'll bring you ...
http://www.cat-scan.com/ (google)

I) 8) Beware of Cat! HUGE Cat Graphics Collection & Virtual Cat ...
Cat Postcards! Send an electronic Cat Postcard Now! Hundreds of cute cat cards to choose from! Holidays, Kittens, Cartoons, Love & More! Add Music, Backgrounds ...
http://www.geocities.com/Heartland/Meadows/8485/ (google)

I) 9) Arctic Cat > What Drives You to the Great Outdoors?
Arctic Cat. Snowmobile ATV Watercraft Generators Catalogs. What's new on the site? Click ...
http://www.arctic-cat.com/ (google)

I) 10) Alley Cat Allies
Alley Cat Allies Has a Better Idea. M odeled after successful programs in the United Kingdom and parts of Africa and Europe, Alley Cat Allies (ACA) advocates a ...
http://www.alleycat.org/ (google)

Preview Order

Look4ithere
Div. of Internet Corporation
News Weather Cool Sites Shopping
Contests Horoscopes Classified
Visit Look4ithere2

Phone: 1-631-757-1600 · E-Mail: look4ithere@look4ithere.com ·
Internet Corporation.

Current Group: I

| | | | | | | | | |
|---|---|---|---|---|---|---|---|---|
| amazon1 | borders2 | barnesandnoble3 | amazon4 | amazon5 | barnesandnoble6 | barnesandnoble7 | borders8 | google9 |
| Cat | Cat | Cat | Mouse | Dog | Dog | Mouse | Dog | Cat |

Go to page: 1 2 3 4 5 6 7 8 9
Search Display *(Interleaved or separately by search engine)*:
Interleave Combine $[a-z] Combine $[z-a]
Separate Separate $[a-z] Separate $[z-a]
Description or List *(Site descriptions or lists)*: [List]

FIG. 123B

I) 9) The Cat in the Hat (Classic Gift Seuss Series)
In Stock: 24 hours (Same Day).
Dr. Seuss / Hardcover / Random House, Incorporated / May 1976
B&N Price: $6.39 ~ You Save 20%...
http://shop.barnesandnoble.com/booksearch/isbnInquiry.asp?userid=... (barnesandnoble)

I) 10) Adopting Cats & Kittens: A Care & Training Guide
Ships within 2-3 days
Jankowski, Connie ~ Trade Paperback ~ 1993
Borders Price: $7.20 ~ You Save: $0.80 (10%)...
http://search.borders.com/fcgi-bin/db2www/search/search.d2w/Detai... (borders)

I) 11) Bedtime Stories for Cats
In stock - ships in 24 hours
Jasheway, Leigh A. ~ Hardcover ~ 1997
Borders Price: $7.96 ~ You Save: $1.99 (20%)...
http://search.borders.com/fcgi-bin/db2www/search/search.d2w/Detai... (borders)

I) 12) How to Live with a Neurotic Cat
In Stock: 24 hours (Same Day).
Stephen Baker / Hardcover / Random House Value Publishing, Incorporated / September 1999
B&N Price: $7.99...
http://shop.barnesandnoble.com/booksearch/isbnInquiry.asp?userid=... (barnesandnoble)

I) 13) 250 Things You Can Do to Make Your Cat Adore You
In stock - ships in 24 hours
Newkirk, Ingrid ~ Trade Paperback ~ 1998
Borders Price: $9.90 ~ You Save: $1.10 (10%)...
http://search.borders.com/fcgi-bin/db2www/search/search.d2w/Detai... (borders)

I) 14) Eating the Cheshire Cat
Usually ships in 24 hours
by Helen Ellis(Paperback - February 2001)
Amazon Price: $10.40...
http://www.amazon.com/exec/obidos/ASIN/068486441X/qid=981919741/s... (amazon)

I) 15) Master the Gre Cat 2001 (Master the Gre, 2001)
Usually ships in 2-3 days
by Thomas H. Martinson(Paperback - November 2000)
Amazon Price: $11.16...
http://www.amazon.com/exec/obidos/ASIN/0764561197/qid=981919741/s... (amazon)

I) 16) Aloha, Dolores
In stock - ships in 24 hours
Samuels, Barbara ~ Hardcover ~ 2000
Borders Price: $12.76 ~ You Save: $3.19 (20%)...
http://search.borders.com/fcgi-bin/db2www/search/search.d2w/Detai... (borders)

I) 17) Cat Heaven
Usually ships in 24 hours
by Cynthia Rylant(Illustrator)(School & Library Binding - September 1997)
Amazon Price: $12.76...
http://www.amazon.com/exec/obidos/ASIN/0590100548/qid=981919741/s... (amazon)

I) 18) Alfie & the Birthday Surprise
In stock - ships in 24 hours
Hughes, Shirley ~ Hardcover ~ 1998
Borders Price: $12.80 ~ You Save: $3.20 (20%)...
http://search.borders.com/fcgi-bin/db2www/search/search.d2w/Detai... (borders)

I) 19) All about Himalayan Cats
In stock - ships in 24 hours
Bearley, Joan M. ~ Hardcover ~ 1989
Borders Price: $14.36 ~ You Save: $3.59 (20%)...
http://search.borders.com/fcgi-bin/db2www/search/search.d2w/Detai... (borders)

I) 20) The Cat Who Smelled a Rat [ABRIDGED]
Usually ships in 24 hours
by Lilian Jackson Braun(Audio Cassette - January 2001)
Amazon Price: $16.15...
http://www.amazon.com/exec/obidos/ASIN/0399146814/qid=981919741/s... (amazon)

I) 21) The Cat Who Covered the World : The Adventures of Henrietta and Her Foreign Correspondent
Usually ships in 24 hours
by Christopher S. Wren(Hardcover - November 2000)
Amazon Price: $16.80...
http://www.amazon.com/exec/obidos/ASIN/0684871009/qid=981919741/s... (amazon)

FIG. 123C

I) 22) Arthur's World of Cats
In stock - ships in 24 hours
Head, Ann ~ Hardcover ~ 1997
Borders Price: $18.36 ~ You Save: $4.59 (20%)...
http://search.borders.com/fcgi-bin/db2www/search/search.d2w/Detai... (borders)

I) 23) The Cat Who Smelled a Rat
In Stock: 24 hours (Same Day).
Lilian Jackson Braun / Hardcover / Penguin Putnam / January 2001
B&N Price: $19.16 ~ You Save 20%...
http://shop.barnesandnoble.com/booksearch/isbnInquiry.asp?userid=... (barnesandnoble)

I) 24) The Cat Who Smelled a Rat
Usually ships in 24 hours
by Lilian Jackson Braun(Hardcover - January 2001)
Amazon Price: $19.16...
http://www.amazon.com/exec/obidos/ASIN/0399146652/qid=981919741/s... (amazon)

I) 25) Cracking the GRE CAT with CD-ROM, 2001 Edition
In Stock: 24 hours (Same Day).
Karen Lurie / Paperback / Princeton Review Publishing Corporation / June 2000
B&N Price: $24.80 ~ You Save 20%...
http://shop.barnesandnoble.com/booksearch/isbnInquiry.asp?userid=... (barnesandnoble)

I) 26) Cracking the Gmat 2001 (Cracking the Gmat Cat With Sample Tests on Cd-Rom)
Usually ships in 24 hours
by Martz, Geoff Martz(Paperback - June 2000)
Amazon Price: $27.96...
http://www.amazon.com/exec/obidos/ASIN/0375756248/qid=981919741/s... (amazon)

I) 27) Cracking the GMAT CAT with CD-ROM, 2001 Edition
In-Stock: Ships 2-3 days.
Geoff Martz / Paperback / Princeton Review Publishing Corporation / June 2000
B&N Price: $27.96 ~ You Save 20%...
http://shop.barnesandnoble.com/booksearch/isbnInquiry.asp?userid=... (barnesandnoble)

I) 28) Gmat 2000-2001 (Gmat Cat (Kaplan)(Book & Cd-Rom))
Usually ships in 24 hours
(Paperback - March 2000)
Amazon Price: $29.60...
http://www.amazon.com/exec/obidos/ASIN/0684870088/qid=981919741/s... (amazon)

I) 29) Accreditation of Teacher Education: The Story of CATE 1984-1989
In stock - ships in 24 hours
MacIntyre, Gordon ~ Trade Paperback ~ 1991
Borders Price: $34.95 ...
http://search.borders.com/fcgi-bin/db2www/search/search.d2w/Detai... (borders)

I) 30) Textbook of Veterinary Internal Medicine: Diseases of the Dog and Cat (2-Volume Set)
Usually ships in 24 hours
by Stephen J. Ettinger(Editor), Edward C. Feldman(Editor)(Hardcover)
Amazon Price: $195.00...
http://www.amazon.com/exec/obidos/ASIN/0721672566/qid=981919741/s... (amazon)

I) 31) Alley Cat Allies
Alley Cat Allies Has a Better Idea. M odeled after successful programs in the United Kingdom and parts of Africa and Europe, Alley Cat Allies (ACA) advocates a ...
http://www.alleycat.org/ (google)

I) 32) Arctic Cat > What Drives You to the Great Outdoors?
Arctic Cat. Snowmobile ATV Watercraft Generators Catalogs. What's new on the site? Click ...
http://www.arctic-cat.com/ (google)

I) 33) Beware of Cat! HUGE Cat Graphics Collection & Virtual Cat ...
Cat Postcards! Send an electronic Cat Postcard Now! Hundreds of cute cat cards to choose from! Holidays, Kittens, Cartoons, Love & More! Add Music, Backgrounds ...
http://www.geocities.com/Heartland/Meadows/6485/ (google)

I) 34) Cat-Scan.Com - The Cover Page
Welcome to CliffyB's Cat-Scan! Cat-Scan is home to people who love art as much as their cats. So much so, they combine the two! Every weekday we'll bring you ...
http://www.cat-scan.com/ (google)

I) 35) Cat Fanciers Web Site
Welcome to the Cat Fanciers Web Site! We offer General Information about Cats and Cat Care,. Cat Breed Descriptions from Abyssinian to Turkish Van,. ...
http://www.fanciers.com/ (google)

FIG. 123D

I) 36) Cat Fancy
or killed playing with toy mice distributed in packages of Fresh Step cat litter. Clorox Co., Oakland, Calif., warned pet owners the toys could strangle or cut ...
http://www.animalnetwork.com/cats/default.asp (google)

I) 37) Cat Tales Zoological Park
LATEST UPDATE: October 20, 2000. Ca t Tales Zoological P ark. Do you have what it takes to become a zookeeper? Cat Tales Zoological Training Center. ...
http://www.cattales.org/ (google)

I) 38) Feral Cat Coalition
Feral Cat Coalition. San Diego, California. Please follow these links for more information on the subject: Feral Cat Coalition Documents. ...
http://www.feralcat.com/ (google)

I) 39) The Cat Fanciers' Association (CFA)
Welcome to the Cat Fanciers' Association, the world's largest registry of pedigreed cats! ...
http://www.cfainc.org/ (google)

I) 40) TICA Website
WELCOME TO THE WEB SITE OF THE INTERNATIONAL CAT ASSOCIATION To Navigate the Site Frames No Frames Please See this page as a Shockwave movie. ...
http://www.tica.org/ (google)

Query: Mouse

I) 1) Santa Mouse Coloring and Pencil Puzzle Book
In Stock: 24 hours (Same Day).
Michael Brown / Paperback / Barnes & Noble Books / July 1999
B&N Price: $1.49 ~ You Save 50%...
http://shop.barnesandnoble.com/booksearch/isbnInquiry.asp?userid=... (barnesandnoble)

I) 2) Santa Mouse
In Stock: 24 hours (Same Day).
Michael Brown,Elfrieda DeWitt (Illustrator) / Hardcover / Barnes & Noble Books / August 1996
B&N Price: $2.49 ~ You Save 50%...
http://shop.barnesandnoble.com/booksearch/isbnInquiry.asp?userid=... (barnesandnoble)

I) 3) Santa Mouse Where Are You
In Stock: 24 hours (Same Day).
Michael Brown,Elfrieda DeWitt (Illustrator) / Hardcover / Barnes & Noble Books / August 1997
B&N Price: $2.49 ~ You Save 50%...
http://shop.barnesandnoble.com/booksearch/isbnInquiry.asp?userid=... (barnesandnoble)

I) 4) Disney's Toy Story: Movie Storybook
In Stock: 24 hours (Same Day).
Mouse Works Staff / Hardcover / Disney Enterprises, Incorporated / May 2000
B&N Price: $3.98 ~ You Save 42%...
http://shop.barnesandnoble.com/booksearch/isbnInquiry.asp?userid=... (barnesandnoble)

I) 5) The Mouse and the Motorcycle
In Stock: 24 hours (Same Day).
Beverly Cleary,Louis Darling (Illustrator) / Paperback / Morrow,William & Co / August 1990
B&N Price: $4.45 ~ You Save 10%...
http://shop.barnesandnoble.com/booksearch/isbnInquiry.asp?userid=... (barnesandnoble)

I) 6) Mouse Count
Usually ships in 24 hours
by Ellen Stoll Walsh(Paperback - March 1995)
Amazon Price: $4.95...
http://www.amazon.com/exec/obidos/ASIN/0152002235/qid=981919741/s... (amazon)

2

I) 7) Ben and Me : A New and Astonishing Life of Benjamin Franklin As Written by His Good Mouse Amos
Usually ships in 24 hours
by Robert Lawson(Illustrator)(Paperback - April 1988)
Amazon Price: $5.35...
http://www.amazon.com/exec/obidos/ASIN/0316517305/qid=981919741/s... (amazon)

I) 8) Cat & Mouse
Usually ships in 24 hours
by James Patterson(Mass Market Paperback - October 2000)
Amazon Price: $7.19...
http://www.amazon.com/exec/obidos/ASIN/0446606189/qid=981919741/s... (amazon)

I) 9) Cat & Mouse

FIG. 123E

In Stock: 24 hours (Same Day).
James Patterson / Mass Market Paperback / Warner Books, Incorporated / October 1998
B&N Price: $7.19 ~ You Save 10%...
http://shop.barnesandnoble.com/booksearch/isbnInquiry.asp?userid=... (barnesandnoble)

I) 10) If You Give a Mouse a Cookie Mini Book and Ornament
In Stock: 24 hours.
Laura Joffe Numeroff,Felicia Bond (Illustrator) / Hardcover / HarperCollins Children's Books / September 2000
B&N Price: $7.96 ~ You Save 20%...
http://shop.barnesandnoble.com/booksearch/isbnInquiry.asp?userid=... (barnesandnoble)

7

I) 11) Mouse Count
Usually ships in 1-2 weeks
by Ellen Stoll Walsh, Diane D'Andrade(Editor)(School & Library Binding - March 1991)
Amazon Price: $10.40...
http://www.amazon.com/exec/obidos/ASIN/0152560238/qid=981919741/s... (amazon)

I) 12) If You Give a Mouse a Cookie
In Stock: 24 hours (Same Day).
Laura Joffe Numeroff,Felicia Bond (Illustrator) / Hardcover / HarperCollins Children's Books / January 1985
B&N Price: $11.96 ~ You Save 20%...
http://shop.barnesandnoble.com/booksearch/isbnInquiry.asp?userid=... (barnesandnoble)

I) 13) The Mouse of Amherst
Usually ships in 24 hours
by Elizabeth Spires, Claire A. Nivola(Illustrator)(Hardcover - March 1999)
Amazon Price: $12.00...
http://www.amazon.com/exec/obidos/ASIN/0374350833/qid=981919741/s... (amazon)

I) 14) If You Give a Mouse a Cookie
Usually ships in 24 hours
by Felicia Bond(Illustrator), Laura Joffe Numeroff(Hardcover - May 1985)
Amazon Price: $12.76...
http://www.amazon.com/exec/obidos/ASIN/0060245867/qid=981919741/s... (amazon)

I) 15) If You Take a Mouse to the Movies
Usually ships in 24 hours
by Felicia Bond(Illustrator), Laura Joffe Numeroff(Hardcover - October 2000)
Amazon Price: $12.76...
http://www.amazon.com/exec/obidos/ASIN/0060278676/qid=981919741/s... (amazon)

I) 16) If You Take a Mouse to the Movies
In Stock: 24 hours.
Laura Joffe Numeroff,Felicia Bond (Illustrator) / Hardcover / HarperCollins Children's Books / September 2000
B&N Price: $12.76 ~ You Save 20%...
http://shop.barnesandnoble.com/booksearch/isbnInquiry.asp?userid=... (barnesandnoble)

I) 17) Craft Lessons: Teaching Writing K through 8
In Stock: 24 hours.
Ralph J. Fletcher,Joann Portalupi / Paperback / Stenhouse Publishers / September 1998
B&N Price: $17.50...
http://shop.barnesandnoble.com/booksearch/isbnInquiry.asp?userid=... (barnesandnoble)

I) 18) What's Wrong with My Mouse?: Behavioral Phenotyping of Transgenic and Knockout Mice
Usually ships in 24 hours
by Jacqueline N., Phd Crawley(Hardcover)
Amazon Price: $79.95...
http://www.amazon.com/exec/obidos/ASIN/0471316393/qid=981919741/s... (amazon)

I) 19) The Anatomical Basis of Mouse Development
Usually ships in 24 hours
by Matthew H. Kaufman, Jonathan B. L. Bard(Hardcover - March 1999)
Amazon Price: $99.95...
http://www.amazon.com/exec/obidos/ASIN/0124020607/qid=981919741/s... (amazon)

I) 20) The Atlas of the Mouse Development
Usually ships in 24 hours
by Matthew H. Kaufman(Hardcover - October 1997)
Amazon Price: $225.00...
http://www.amazon.com/exec/obidos/ASIN/0124020356/qid=981919741/s... (amazon)

Query: Dog

I) 1) Clifford's First Valentine's Day
In-Stock: Ships 2-3 days.
Norman Bridwell / Paperback / Scholastic, Inc. / November 1996
B&N Price: $2.69 ~ You Save 10%...

FIG. 123F http://shop.barnesandnoble.com/booksearch/isbnInquiry.asp?userid=... (barnesandnoble)

I) 2) Baby Animals: Puppies
In stock - ships in 24 hours
Petty, Kate ~ Trade Paperback ~ 1992
Borders Price: $3.56 ~ You Save: $0.39 (10%)...
http://search.borders.com/fcgi-bin/db2www/search/search.d2w/Detai... (borders)

I) 3) Tigers at Twilight: (Magic Tree House Series #19)
In Stock: 24 hours (Same Day).
Mary Pope Osborne,Sal Murdocca (Illustrator) / Paperback / Random House Books for Young Readers / August 1999
B&N Price: $3.59 ~ You Save 10%...
http://shop.barnesandnoble.com/booksearch/isbnInquiry.asp?userid=... (barnesandnoble)

I) 4) Stone Fox (Harper Trophy Book)
Usually ships in 24 hours
by John Reynolds Gardiner, Marcia Sewall(Illustrator)(Paperback - February 1988)
Amazon Price: $4.45...
http://www.amazon.com/exec/obidos/ASIN/0064401324/qid=981919741/s... (amazon)

I) 5) Clifford: The Big Red Dog
In Stock: 24 hours (Same Day).
Norman Bridwell / Board Book / Scholastic, Inc. / July 1997
B&N Price: $4.79 ~ You Save 20%...
http://shop.barnesandnoble.com/booksearch/isbnInquiry.asp?userid=... (barnesandnoble)

I) 6) Where the Red Fern Grows
In Stock: 24 hours (Same Day).
Wilson Rawls / Mass Market Paperback / Bantam Books, Incorporated / May 1981
B&N Price: $5.39 ~ You Save 10%...
http://shop.barnesandnoble.com/booksearch/isbnInquiry.asp?userid=... (barnesandnoble)

I) 7) Ginger Pye
In Stock: 24 hours (Same Day).
Eleanor Estes / Paperback / Harcourt / September 2000
B&N Price: $5.40 ~ You Save 10%...
http://shop.barnesandnoble.com/booksearch/isbnInquiry.asp?userid=... (barnesandnoble)

I) 8) 2001 Original 365 Dogs Page-A-Day Calendar
In Stock: 24 hours.
Cal 2001 / Box Calendar / Workman Publishing Company, Inc. / August 2000 [10]
B&N Price: $5.47 ~ You Save 50%...
http://shop.barnesandnoble.com/booksearch/isbnInquiry.asp?userid=... (barnesandnoble)

I) 9) 2001 William Wegman Puppies Wall Calendar
In Stock: 24 hours.
Cal 2001 / Wall Calendar / Abrams,Harry N Inc / June 2000
B&N Price: $5.47 ~ You Save 50%...
http://shop.barnesandnoble.com/booksearch/isbnInquiry.asp?userid=... (barnesandnoble)

I) 10) How to Housebreak Your Dog in 7 Days
Usually ships in 24 hours
by Shirlee Kalstone(Paperback - April 1991) [6]
Amazon Price: $6.29...
http://www.amazon.com/exec/obidos/ASIN/0553346156/qid=981919741/s... (amazon)

I) 11) Animal Clinic for Dogs
In stock - ships in 24 hours
Humphries, Jim ~ Hardcover ~ 1998 [5]
Borders Price: $6.39 ~ You Save: $1.60 (20%)...
http://search.borders.com/fcgi-bin/db2www/search/search.d2w/Detai... (borders)

I) 12) 2001 Man's Best Friend Wall Calendar
In Stock: 24 hours.
Cal 2001,William Wegman (Photographer) / Wall Calendar / Abrams,Harry N Inc / June 2000
B&N Price: $6.47 ~ You Save 50%...
http://shop.barnesandnoble.com/booksearch/isbnInquiry.asp?userid=... (barnesandnoble)

I) 13) How to Live with a Neurotic Dog
In Stock: 24 hours (Same Day).
Stephen Baker,Fred Hilliard (Illustrator) / Hardcover / Random House, Incorporated / February 1995
B&N Price: $7.99...
http://shop.barnesandnoble.com/booksearch/isbnInquiry.asp?userid=... (barnesandnoble)

I) 14) Adopting the Racing Greyhound
In stock - ships in 24 hours
Branigan, Cynthia A. ~ Trade Paperback ~ 1998
Borders Price: $11.66 ~ You Save: $1.29 (10%)...
http://search.borders.com/fcgi-bin/db2www/search/search.d2w/Detai... (borders)

FIG. 123G

I) 15) Bark Busters: Solving Your Dog's Behavioral Problems
In stock - ships in 24 hours
Wilson, Sylvia ~ Trade Paperback ~ 1997
Borders Price: $11.66 ~ You Save: $1.29 (10%)...
http://search.borders.com/fcgi-bin/db2www/search/search.d2w/Detai... (borders)

4

I) 16) Dog Heaven
Usually ships in 24 hours
by Cynthia Rylant(Illustrator)(School & Library Binding - September 1995)
Amazon Price: $12.76...
http://www.amazon.com/exec/obidos/ASIN/0590417010/qid=981919741/s... (amazon)

I) 17) The Stray Dog
Usually ships in 24 hours
by Marc Simont(Illustrator), Reiko Sassa(Hardcover - January 2001)
Amazon Price: $12.76...
http://www.amazon.com/exec/obidos/ASIN/0060289333/qid=981919741/s... (amazon)

I) 18) Anastasia, Absolutely
In stock - ships in 24 hours
Lowry, Lois ~ Hardcover ~ 1995
Borders Price: $12.80 ~ You Save: $3.20 (20%)...
http://search.borders.com/fcgi-bin/db2www/search/search.d2w/Detai... (borders)

I) 19) Let the Big Dog Eat : A Dictionary of the Secret Language of Golf
Usually ships in 24 hours
by Hubert Pedroli, et al(Hardcover - June 2000)
Amazon Price: $14.40...
http://www.amazon.com/exec/obidos/ASIN/0688175767/qid=981919741/s... (amazon)

I) 20) Dog: The Complete Guide
In Stock: 24 hours (Same Day).
Sarah Whitehead / Hardcover / Barnes & Noble Books / August 1999
B&N Price: $14.98...
http://shop.barnesandnoble.com/booksearch/isbnInquiry.asp?userid=... (barnesandnoble)

8

I) 21) Baby's Memory Book: A Baby Record Book
In stock - ships in 24 hours
Nister, Ernest ~ Hardcover ~ 1986
Borders Price: $15.99 ~ You Save: $4.00 (20%)...
http://search.borders.com/fcgi-bin/db2www/search/search.d2w/Detai... (borders)

I) 22) Dog Training for Dummies (For Dummies)
Usually ships in 24 hours
by John Volhard, et al(Paperback - January 2001)
Amazon Price: $17.59...
http://www.amazon.com/exec/obidos/ASIN/0764552864/qid=981919741/s... (amazon)

I) 23) How to Be Your Dog's Best Friend : A Training Manual for Dog Owners
Usually ships in 24 hours
by New Skete Monks, et al(Hardcover - October 1978)
Amazon Price: $19.16...
http://www.amazon.com/exec/obidos/ASIN/0316604917/qid=981919741/s... (amazon)

I) 24) Going for the Blue: Inside the World of Show Dogs and Dog Shows
Usually ships in 24 hours
by Roger A. Caras(Hardcover - February 2001)
Amazon Price: $20.76...
http://www.amazon.com/exec/obidos/ASIN/0446526444/qid=981919741/s... (amazon)

I) 25) Family Dog : 16 Weeks to a Well-Mannered Dog-A Simple and Time-Proven Method
Usually ships in 24 hours
by Richard A. Wolters, Red Smith(Introduction)(Hardcover - February 1999)
Amazon Price: $22.36...
http://www.amazon.com/exec/obidos/ASIN/0525944729/qid=981919741/s... (amazon)

I) 26) The Dog Owners Home Veterinary Handbook
Usually ships in 2-3 days
by James M. Giffin, et al(Hardcover - November 1999)
Amazon Price: $22.36...
http://www.amazon.com/exec/obidos/ASIN/0876052014/qid=981919741/s... (amazon)

9

I) 27) A-Z of Dog Diseases & Health Problems
In stock - ships in 24 hours
Lane, Dick ~ Trade Paperback ~ 1997
Borders Price: $22.46 ~ You Save: $2.49 (10%)...
http://search.borders.com/fcgi-bin/db2www/search/search.d2w/Detai... (borders)

FIG. 123H

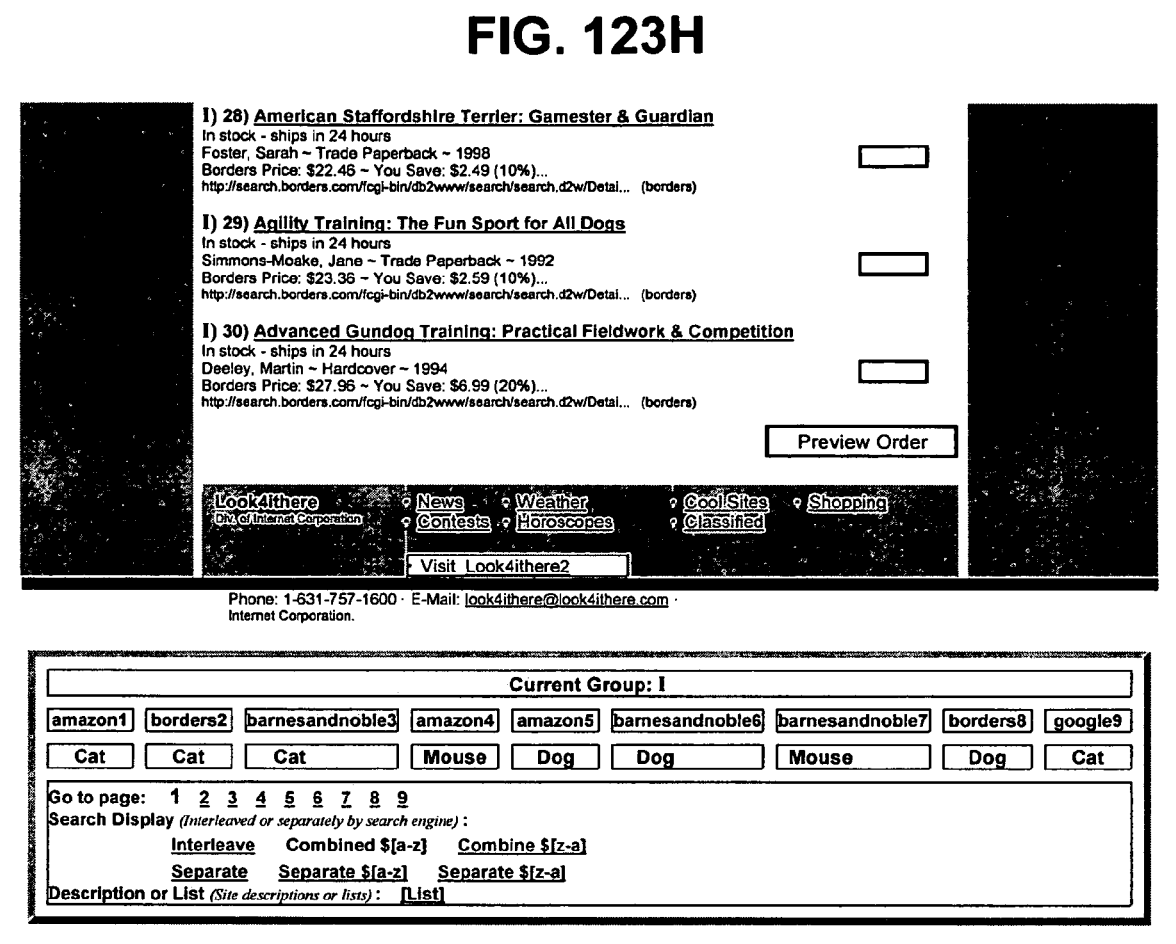

I) 28) American Staffordshire Terrier: Gamester & Guardian
In stock - ships in 24 hours
Foster, Sarah ~ Trade Paperback ~ 1998
Borders Price: $22.46 ~ You Save: $2.49 (10%)...
http://search.borders.com/fcgi-bin/db2www/search/search.d2w/Detai... (borders)

I) 29) Agility Training: The Fun Sport for All Dogs
In stock - ships in 24 hours
Simmons-Moake, Jane ~ Trade Paperback ~ 1992
Borders Price: $23.36 ~ You Save: $2.59 (10%)...
http://search.borders.com/fcgi-bin/db2www/search/search.d2w/Detai... (borders)

I) 30) Advanced Gundog Training: Practical Fieldwork & Competition
In stock - ships in 24 hours
Deeley, Martin ~ Hardcover ~ 1994
Borders Price: $27.96 ~ You Save: $6.99 (20%)...
http://search.borders.com/fcgi-bin/db2www/search/search.d2w/Detai... (borders)

Preview Order

Look4ithere Div. of Internet Corporation · News · Weather · Cool Sites · Shopping · Contests · Horoscopes · Classified Visit Look4ithere2

Phone: 1-631-757-1600 · E-Mail: look4ithere@look4ithere.com ·
Internet Corporation.

Current Group: I

| amazon1 | borders2 | barnesandnoble3 | amazon4 | amazon5 | barnesandnoble6 | barnesandnoble7 | borders8 | google9 |
|---|---|---|---|---|---|---|---|---|
| Cat | Cat | Cat | Mouse | Dog | Dog | Mouse | Dog | Cat |

Go to page: 1 2 3 4 5 6 7 8 9
Search Display *(Interleaved or separately by search engine)* :
Interleave Combined $[a-z] Combine $[z-a]
Separate Separate $[a-z] Separate $[z-a]
Description or List *(Site descriptions or lists)* : [List]

FIG. 127A

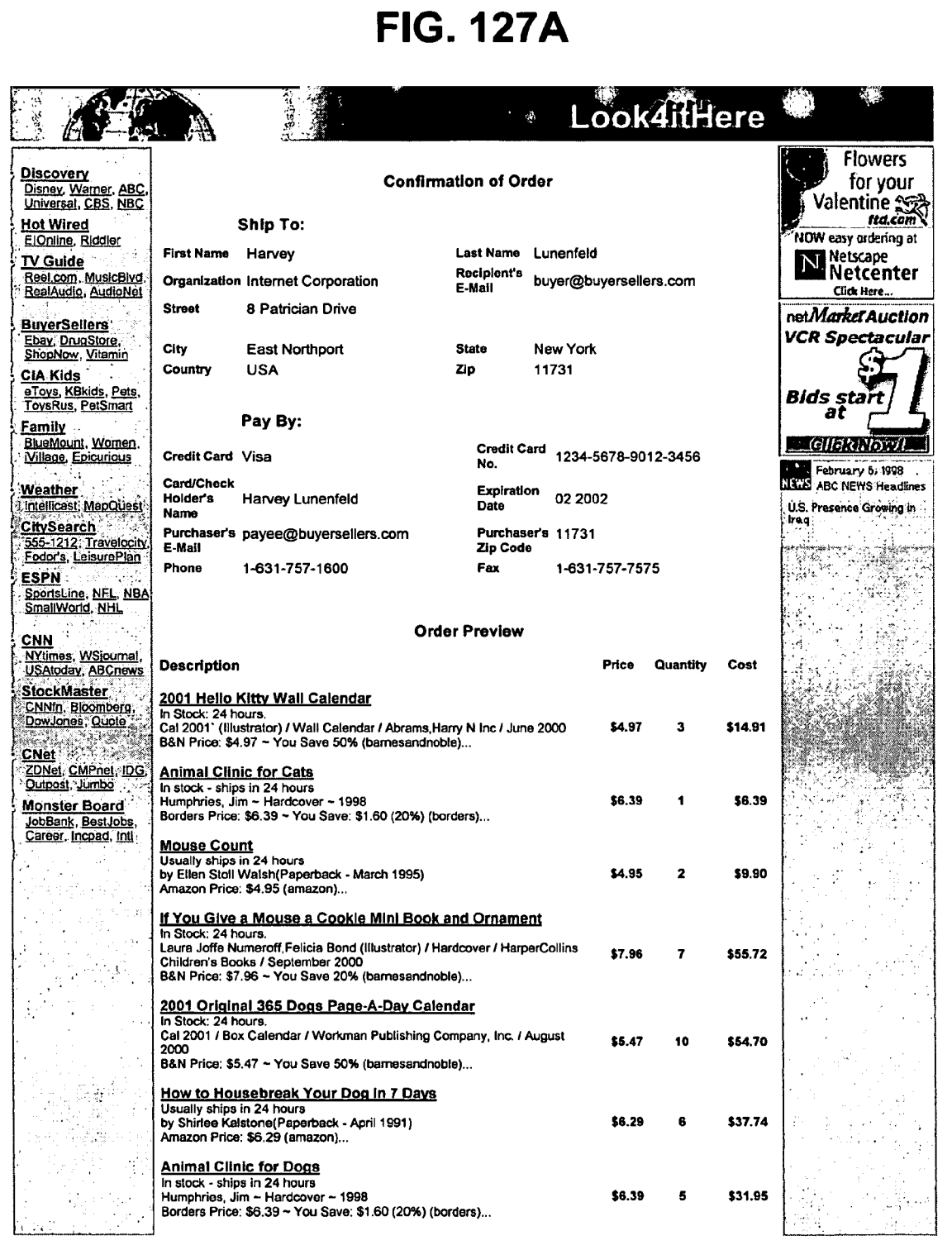

Look4itHere

Discovery
Disney, Warner, ABC, Universal, CBS, NBC
Hot Wired
E!Online, Riddler
TV Guide
Reel.com, MusicBlvd, RealAudio, AudioNet
BuyerSellers
Ebay, DrugStore, ShopNow, Vitamin
CIA Kids
eToys, KBkids, Pets, ToysRus, PetSmart
Family
BlueMount, Women, iVillage, Epicurious
Weather
Intellicast, MapQuest
CitySearch
555-1212, Travelocity, Fodor's, LeisurePlan
ESPN
SportsLine, NFL, NBA, SmallWorld, NHL
CNN
NYtimes, WSjournal, USAtoday, ABCnews
StockMaster
CNNfn, Bloomberg, DowJones, Quote
CNet
ZDNet, CMPnet, IDG, Outpost, Jumbo
Monster Board
JobBank, BestJobs, Career, Incpad, Intl

Confirmation of Order

Ship To:

| | | | |
|---|---|---|---|
| First Name | Harvey | Last Name | Lunenfeld |
| Organization | Internet Corporation | Recipient's E-Mail | buyer@buyersellers.com |
| Street | 8 Patrician Drive | | |
| City | East Northport | State | New York |
| Country | USA | Zip | 11731 |

Pay By:

| | | | |
|---|---|---|---|
| Credit Card | Visa | Credit Card No. | 1234-5678-9012-3456 |
| Card/Check Holder's Name | Harvey Lunenfeld | Expiration Date | 02 2002 |
| Purchaser's E-Mail | payee@buyersellers.com | Purchaser's Zip Code | 11731 |
| Phone | 1-631-757-1600 | Fax | 1-631-757-7575 |

Order Preview

| Description | Price | Quantity | Cost |
|---|---|---|---|
| **2001 Hello Kitty Wall Calendar**<br>In Stock: 24 hours.<br>Cal 2001` (Illustrator) / Wall Calendar / Abrams,Harry N Inc / June 2000<br>B&N Price: $4.97 ~ You Save 50% (barnesandnoble)... | $4.97 | 3 | $14.91 |
| **Animal Clinic for Cats**<br>In stock - ships in 24 hours<br>Humphries, Jim ~ Hardcover ~ 1998<br>Borders Price: $6.39 ~ You Save: $1.60 (20%) (borders)... | $6.39 | 1 | $6.39 |
| **Mouse Count**<br>Usually ships in 24 hours<br>by Ellen Stoll Walsh(Paperback - March 1995)<br>Amazon Price: $4.95 (amazon)... | $4.95 | 2 | $9.90 |
| **If You Give a Mouse a Cookie Mini Book and Ornament**<br>In Stock: 24 hours.<br>Laura Joffe Numeroff,Felicia Bond (Illustrator) / Hardcover / HarperCollins Children's Books / September 2000<br>B&N Price: $7.96 ~ You Save 20% (barnesandnoble)... | $7.96 | 7 | $55.72 |
| **2001 Original 365 Dogs Page-A-Day Calendar**<br>In Stock: 24 hours.<br>Cal 2001 / Box Calendar / Workman Publishing Company, Inc. / August 2000<br>B&N Price: $5.47 ~ You Save 50% (barnesandnoble)... | $5.47 | 10 | $54.70 |
| **How to Housebreak Your Dog in 7 Days**<br>Usually ships in 24 hours<br>by Shirlee Kalstone(Paperback - April 1991)<br>Amazon Price: $6.29 (amazon)... | $6.29 | 6 | $37.74 |
| **Animal Clinic for Dogs**<br>In stock - ships in 24 hours<br>Humphries, Jim ~ Hardcover ~ 1998<br>Borders Price: $6.39 ~ You Save: $1.60 (20%) (borders)... | $6.39 | 5 | $31.95 |

Flowers for your Valentine
ftd.com
NOW easy ordering at Netscape Netcenter
Click Here...
netMarketAuction VCR Spectacular
Bids start at $1
Click Now!

February 5, 1998
ABC NEWS Headlines
U.S. Presence Growing in Iraq

FIG. 128A

Subject: Placement of Order
Date: Tue, 13 Feb 2001 18:26:16 -0500 (EST)
From: payee@buyersellers.com
To: Sales@Look4ithere.com
bcc: Orders@MainWarehouse.com

Confirmation.

The following order has been placed with Sales@Look4ithere.com, and a copy has been sent to MainWarehouse.com for processing and fulfillment on 02/13/01 at 06:26:16 PM Tue.

Please fulfill this order within 24 hours.

Order No: azb0dV6lh

Ship To:
First Name: Harvey
Last Name: Lunenfeld
Organization: Internet Corporation
Recipient's E-Mail: buyer@buyersellers.com
Street 1: 8 Patrician Drive
Street 2:
City: East Northport
State: New York
Country: USA
Zip: 11731

Pay By: Credit Card
Credit Card Issuer: Visa
Credit Card No: 1234-5678-9012-3456
Card/Check Holder's Name: Harvey Lunenfeld
Credit Card Expiration Date: 02 2002
Purchaser's E-Mail: payee@buyersellers.com
Purchaser's Zip Code: 11731
Phone: 1-631-757-1600
Fax: 1-631-757-7575

In Stock: 24 hours.
Cal 2001` (Illustrator) / Wall Calendar / Abrams,Harry N Inc / June 2000
B&N Price: $4.97 ~ You Save 50% (barnesandnoble)...
Price: $4.97
Quantity: 3
Cost: $14.91

In stock - ships in 24 hours
Humphries, Jim ~ Hardcover ~ 1998
Borders Price: $6.39 ~ You Save: $1.60 (20%) (borders)...
Price: $6.39
Quantity: 1
Cost: $6.39

FIG. 128B

Usually ships in 24 hours
by Ellen Stoll Walsh(Paperback - March 1995)
Amazon Price: $4.95 (amazon)...
Price: $4.95
Quantity: 2
Cost: $9.90

In Stock: 24 hours.
Laura Joffe Numeroff,Felicia Bond (Illustrator) / Hardcover / HarperCollins Children's Books / September 2000
B&N Price: $7.96 ~ You Save 20% (barnesandnoble)...
Price: $7.96
Quantity: 7
Cost: $55.72

In Stock: 24 hours.
Cal 2001 / Box Calendar / Workman Publishing Company, Inc. / August 2000
B&N Price: $5.47 ~ You Save 50% (barnesandnoble)...
Price: $5.47
Quantity: 10
Cost: $54.70

Usually ships in 24 hours
by Shirlee Kalstone(Paperback - April 1991)
Amazon Price: $6.29 (amazon)...
Price: $6.29
Quantity: 6
Cost: $37.74

In stock - ships in 24 hours
Humphries, Jim ~ Hardcover ~ 1998
Borders Price: $6.39 ~ You Save: $1.60 (20%) (borders)...
Price: $6.39
Quantity: 5
Cost: $31.95

In stock - ships in 24 hours
Wilson, Sylvia ~ Trade Paperback ~ 1997
Borders Price: $11.66 ~ You Save: $1.29 (10%) (borders)...
Price: $11.66
Quantity: 4
Cost: $46.64

In Stock: 24 hours (Same Day).
Sarah Whitehead / Hardcover / Barnes & Noble Books / August 1999
B&N Price: $14.98 (barnesandnoble)...
Price: $14.98
Quantity: 8
Cost: $119.84

FIG. 128C

Usually ships in 2-3 days
by James M. Giffin, et al(Hardcover - November 1999)
Amazon Price: $22.36 (amazon)...
Price: $22.36
Quantity: 9
Cost: $201.24

Subtotal: $579.03
Shipping & Handling: $63.35
Total: $642.38

FIG. 129A

Subject: Confirmation of Receipt of Order
Date: Tue, 13 Feb 2001 18:26:16 -0500 (EST)
From: Sales@Look4ithere.com
To: payee@buyersellers.com
bcc: Orders@MainWarehouse.com

Confirmation.

The following order has been placed with Sales@Look4ithere.com, and a copy has been sent to MainWarehouse.com for processing and fulfillment on 02/13/01 at 06:26:16 PM Tue.

Order No: azb0dV6lh

Ship To:
First Name: Harvey
Last Name: Lunenfeld
Organization: Internet Corporation
Recipient's E-Mail: buyer@buyersellers.com
Street 1: 8 Patrician Drive
Street 2:
City: East Northport
State: New York
Country: USA
Zip: 11731

Pay By: Credit Card
Credit Card Issuer: Visa
Credit Card No: 1234-5678-9012-3456
Card/Check Holder's Name: Harvey Lunenfeld
Credit Card Expiration Date: 02 2002
Purchaser's E-Mail: payee@buyersellers.com
Purchaser's Zip Code: 11731
Phone: 1-631-757-1600
Fax: 1-631-757-7575

In Stock: 24 hours.
Cal 2001` (Illustrator) / Wall Calendar / Abrams,Harry N Inc / June 2000
B&N Price: $4.97 ~ You Save 50% (barnesandnoble)...
Price: $4.97
Quantity: 3
Cost: $14.91

In stock - ships in 24 hours
Humphries, Jim ~ Hardcover ~ 1998
Borders Price: $6.39 ~ You Save: $1.60 (20%) (borders)...
Price: $6.39
Quantity: 1
Cost: $6.39

FIG. 129B

Usually ships in 24 hours
by Ellen Stoll Walsh(Paperback - March 1995)
Amazon Price: $4.95 (amazon)...
Price: $4.95
Quantity: 2
Cost: $9.90

In Stock: 24 hours.
Laura Joffe Numeroff,Felicia Bond (Illustrator) / Hardcover / HarperCollins Children's Books / September 2000
B&N Price: $7.96 ~ You Save 20% (barnesandnoble)...
Price: $7.96
Quantity: 7
Cost: $55.72

In Stock: 24 hours.
Cal 2001 / Box Calendar / Workman Publishing Company, Inc. / August 2000
B&N Price: $5.47 ~ You Save 50% (barnesandnoble)...
Price: $5.47
Quantity: 10
Cost: $54.70

Usually ships in 24 hours
by Shirlee Kalstone(Paperback - April 1991)
Amazon Price: $6.29 (amazon)...
Price: $6.29
Quantity: 6
Cost: $37.74

In stock - ships in 24 hours
Humphries, Jim ~ Hardcover ~ 1998
Borders Price: $6.39 ~ You Save: $1.60 (20%) (borders)...
Price: $6.39
Quantity: 5
Cost: $31.95

In stock - ships in 24 hours
Wilson, Sylvia ~ Trade Paperback ~ 1997
Borders Price: $11.66 ~ You Save: $1.29 (10%) (borders)...
Price: $11.66
Quantity: 4
Cost: $46.64

In Stock: 24 hours (Same Day).
Sarah Whitehead / Hardcover / Barnes & Noble Books / August 1999
B&N Price: $14.98 (barnesandnoble)...
Price: $14.98
Quantity: 8
Cost: $119.84

FIG. 129C

Usually ships in 2-3 days
by James M. Giffin, et al(Hardcover - November 1999)
Amazon Price: $22.36 (amazon)...
Price: $22.36
Quantity: 9
Cost: $201.24

Subtotal: $579.03
Shipping & Handling: $63.35
Total: $642.38

FIG. 130A

Subject: Placement of Order
Date: Tue, 13 Feb 2001 18:26:16 -0500 (EST)
From: payee@buyersellers.com
To: Amazon@MainPostOffice.com
bcc: Sales@Look4ithere.com
bcc: Orders@MainWarehouse.com

Confirmation.

The following order has been placed with Sales@Look4ithere.com, and a copy has been sent to MainWarehouse.com for processing and fulfillment on 02/13/01 at 06:26:16 PM Tue.

Please fulfill this order within 24 hours.

Order No: azb0dV6lh

Ship To:
First Name: Harvey
Last Name: Lunenfeld
Organization: Internet Corporation
Recipient's E-Mail: buyer@buyersellers.com
Street 1: 8 Patrician Drive
Street 2:
City: East Northport
State: New York
Country: USA
Zip: 11731

Pay By: Credit Card
Credit Card Issuer: Visa
Credit Card No: 1234-5678-9012-3456
Card/Check Holder's Name: Harvey Lunenfeld
Credit Card Expiration Date: 02 2002
Purchaser's E-Mail: payee@buyersellers.com
Purchaser's Zip Code: 11731
Phone: 1-631-757-1600
Fax: 1-631-757-7575

Usually ships in 24 hours
by Ellen Stoll Walsh(Paperback - March 1995)
Amazon Price: $4.95 (amazon)...
Price: $4.95
Quantity: 2
Cost: $9.90

Usually ships in 24 hours
by Shirlee Kalstone(Paperback - April 1991)
Amazon Price: $6.29 (amazon)...
Price: $6.29
Quantity: 6
Cost: $37.74

FIG. 130B

Usually ships in 2-3 days
by James M. Giffin, et al(Hardcover - November 1999)
Amazon Price: $22.36 (amazon)...
Price: $22.36
Quantity: 9
Cost: $201.24

Subtotal: $248.88
Shipping & Handling: $20.13
Total: $269.01

FIG. 131A

Subject: Placement of Order
Date: Tue, 13 Feb 2001 18:26:16 -0500 (EST)
From: payee@buyersellers.com
To: Borders@MainPostOffice.com
bcc: Sales@Look4ithere.com
bcc: Orders@MainWarehouse.com

Confirmation.

The following order has been placed with Sales@Look4ithere.com, and a copy has been sent to MainWarehouse.com for processing and fulfillment on 02/13/01 at 06:26:16 PM Tue.

Please fulfill this order within 24 hours.

Order No: azb0dV6lh

Ship To:
First Name: Harvey
Last Name: Lunenfeld
Organization: Internet Corporation
Recipient's E-Mail: buyer@buyersellers.com
Street 1: 8 Patrician Drive
Street 2:
City: East Northport
State: New York
Country: USA
Zip: 11731

Pay By: Credit Card
Credit Card Issuer: Visa
Credit Card No: 1234-5678-9012-3456
Card/Check Holder's Name: Harvey Lunenfeld
Credit Card Expiration Date: 02 2002
Purchaser's E-Mail: payee@buyersellers.com
Purchaser's Zip Code: 11731
Phone: 1-631-757-1600
Fax: 1-631-757-7575

In stock - ships in 24 hours
Humphries, Jim ~ Hardcover ~ 1998
Borders Price: $6.39 ~ You Save: $1.60 (20%) (borders)...
Price: $6.39
Quantity: 1
Cost: $6.39

FIG. 131B

In stock - ships in 24 hours
Humphries, Jim ~ Hardcover ~ 1998
Borders Price: $6.39 ~ You Save: $1.60 (20%) (borders)...
Price: $6.39
Quantity: 5
Cost: $31.95

In stock - ships in 24 hours
Wilson, Sylvia ~ Trade Paperback ~ 1997
Borders Price: $11.66 ~ You Save: $1.29 (10%) (borders)...
Price: $11.66
Quantity: 4
Cost: $46.64

Subtotal: $84.98
Shipping & Handling: $12.50
Total: $97.48

FIG. 132A

Subject: Placement of Order
Date: Tue, 13 Feb 2001 18:26:16 -0500 (EST)
From: payee@buyersellers.com
To: BarnesandNoble@MainPostOffice.com
bcc: Sales@Look4ithere.com
bcc: Orders@MainWarehouse.com

Confirmation.

The following order has been placed with Sales@Look4ithere.com, and a copy has been sent to MainWarehouse.com for processing and fulfillment on 02/13/01 at 06:26:16 PM Tue.

Please fulfill this order within 24 hours.

Order No: azb0dV6lh

Ship To:
First Name: Harvey
Last Name: Lunenfeld
Organization: Internet Corporation
Recipient's E-Mail: buyer@buyersellers.com
Street 1: 8 Patrician Drive
Street 2:
City: East Northport
State: New York
Country: USA
Zip: 11731

Pay By: Credit Card
Credit Card Issuer: Visa
Credit Card No: 1234-5678-9012-3456
Card/Check Holder's Name: Harvey Lunenfeld
Credit Card Expiration Date: 02 2002
Purchaser's E-Mail: payee@buyersellers.com
Purchaser's Zip Code: 11731
Phone: 1-631-757-1600
Fax: 1-631-757-7575

In Stock: 24 hours.
Cal 2001` (Illustrator) / Wall Calendar / Abrams,Harry N Inc / June 2000
B&N Price: $4.97 ~ You Save 50% (barnesandnoble)...
Price: $4.97
Quantity: 3
Cost: $14.91

FIG. 132B

In Stock: 24 hours.
Laura Joffe Numeroff,Felicia Bond (Illustrator) / Hardcover / HarperCollins Children's Books / September 2000
B&N Price: $7.96 ~ You Save 20% (barnesandnoble)...
Price: $7.96
Quantity: 7
Cost: $55.72

In Stock: 24 hours.
Cal 2001 / Box Calendar / Workman Publishing Company, Inc. / August 2000
B&N Price: $5.47 ~ You Save 50% (barnesandnoble)...
Price: $5.47
Quantity: 10
Cost: $54.70

In Stock: 24 hours (Same Day).
Sarah Whitehead / Hardcover / Barnes & Noble Books / August 1999
B&N Price: $14.98 (barnesandnoble)...
Price: $14.98
Quantity: 8
Cost: $119.84

Subtotal: $245.17
Shipping & Handling: $30.72
Total: $275.89

FIG. 143B

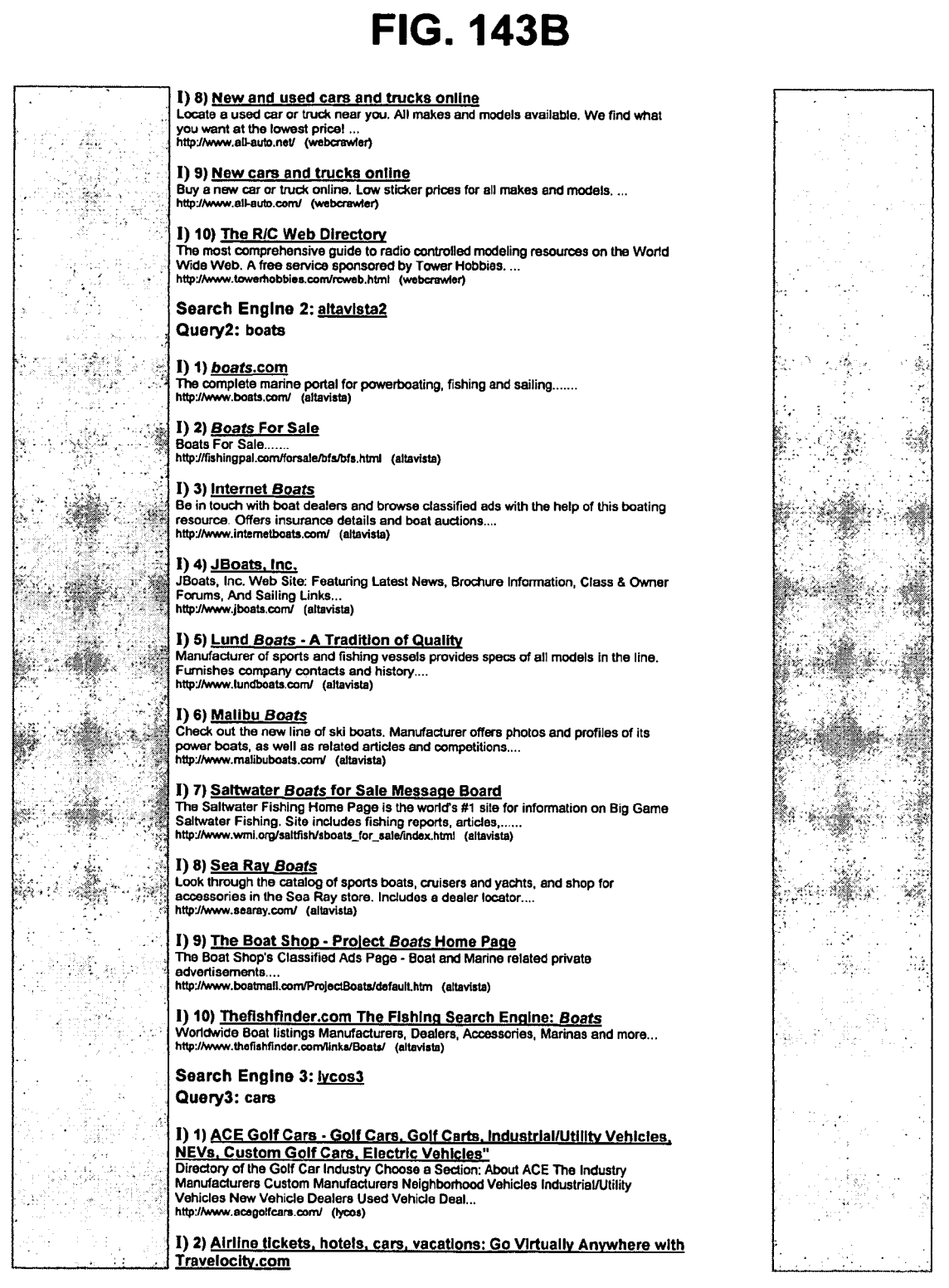

I) 8) New and used cars and trucks online
Locate a used car or truck near you. All makes and models available. We find what you want at the lowest price! ...
http://www.all-auto.net/ (webcrawler)

I) 9) New cars and trucks online
Buy a new car or truck online. Low sticker prices for all makes and models. ...
http://www.all-auto.com/ (webcrawler)

I) 10) The R/C Web Directory
The most comprehensive guide to radio controlled modeling resources on the World Wide Web. A free service sponsored by Tower Hobbies. ...
http://www.towerhobbies.com/rcweb.html (webcrawler)

Search Engine 2: altavista2
Query2: boats

**I) 1) *boats*.com**
The complete marine portal for powerboating, fishing and sailing.......
http://www.boats.com/ (altavista)

**I) 2) *Boats* For Sale**
Boats For Sale.......
http://fishingpal.com/forsale/bfs/bfs.html (altavista)

**I) 3) Internet *Boats***
Be in touch with boat dealers and browse classified ads with the help of this boating resource. Offers insurance details and boat auctions....
http://www.internetboats.com/ (altavista)

I) 4) JBoats, Inc.
JBoats, Inc. Web Site: Featuring Latest News, Brochure Information, Class & Owner Forums, And Sailing Links...
http://www.jboats.com/ (altavista)

**I) 5) Lund *Boats* - A Tradition of Quality**
Manufacturer of sports and fishing vessels provides specs of all models in the line. Furnishes company contacts and history....
http://www.lundboats.com/ (altavista)

**I) 6) Malibu *Boats***
Check out the new line of ski boats. Manufacturer offers photos and profiles of its power boats, as well as related articles and competitions....
http://www.malibuboats.com/ (altavista)

**I) 7) Saltwater *Boats* for Sale Message Board**
The Saltwater Fishing Home Page is the world's #1 site for information on Big Game Saltwater Fishing. Site includes fishing reports, articles,......
http://www.wmi.org/saltfish/sboats_for_sale/index.html (altavista)

**I) 8) Sea Ray *Boats***
Look through the catalog of sports boats, cruisers and yachts, and shop for accessories in the Sea Ray store. Includes a dealer locator....
http://www.searay.com/ (altavista)

**I) 9) The Boat Shop - Project *Boats* Home Page**
The Boat Shop's Classified Ads Page - Boat and Marine related private advertisements....
http://www.boatmall.com/ProjectBoats/default.htm (altavista)

**I) 10) Thefishfinder.com The Fishing Search Engine: *Boats***
Worldwide Boat listings Manufacturers, Dealers, Accessories, Marinas and more...
http://www.thefishfinder.com/links/Boats/ (altavista)

Search Engine 3: lycos3
Query3: cars

I) 1) ACE Golf Cars - Golf Cars, Golf Carts, Industrial/Utility Vehicles, NEVs, Custom Golf Cars, Electric Vehicles"
Directory of the Golf Car Industry Choose a Section: About ACE The Industry Manufacturers Custom Manufacturers Neighborhood Vehicles Industrial/Utility Vehicles New Vehicle Dealers Used Vehicle Deal...
http://www.acegolfcars.com/ (lycos)

I) 2) Airline tickets, hotels, cars, vacations: Go Virtually Anywhere with Travelocity.com

FIG. 143C

Welcome to Travelocity.com! Already a member? Click here to log in My Trips | My Account Site Shortcuts - My Trips Customer Service - Travel Menu VIA Rail Canada -...
http://www.travelocity.com/ (lycos)

I) 3) Cars-Rentals-Discounts.com "The Ultimate Car Rentals Reservation Service"
1/19/2001 Car-Rentals-Discounts.com is a comprehensive web site designed for the consumer to compare prices for the major car rental companies. Allowing you to get the best deals searching all compani...
http://www.cars-rentals-discounts.com/ (lycos)

I) 4) cars.com
...
http://www.cars.com/ (lycos)

I) 5) Click For The Online Auto Scorecard
...
http://r.hotbot.com/r/ly_res_GT_inline/http://www.goto.com/d/sr?x... (lycos)

I) 6) Cool Cars
Brake for these cars. Make a puzzle or picture of a Ferrari, Porsche, Dodge or many other cars. You'll feel almost ready to drive after going here!...
http://bonus.lycos.com/bonus/card/scs_workshop_cars.html (lycos)

I) 7) Fast, Low Price Quotes on a New Car
...
http://r.hotbot.com/r/ly_res_GT_inline/http://www.goto.com/d/sr?x... (lycos)

I) 8) Fish4: News and sport, cars, homes, jobs, business search, shopping, entertainment and travel
Around Fish4 - Fish4Homepage About Fish4 Cars Directory Local Sites Entertainment Homes Jobs Shopping Travel Contact Us Cars Homes Jobs Directory Local Sites Entertainment Shopping Travel Contact Us H...
http://www.fish4.co.uk/ (lycos)

I) 9) Searchwho.com - Auto Racing page featuring tons of NASCAR links and info but also with links for drag racing, indy formula one cars, sprint cars, and
even the women of racing plus information on business, music, sports, travel, news, health December 27, 2000 13:13 The best of the web for auto racing/nascar Welcome to the top web sites for auto raci...
http://nascar.searchwho.com/ (lycos)

I) 10) Used Cars, Sell Your Car, Auto Financing Insurance - AutoTrader.com Home
Search the largest inventory of cars and trucks on the Internet. More than 1.5 million listings, updated daily. Used Cars New Cars Select Make Acura Alfa Romeo AMC AM General Aston Martin Asuna Auburn...
http://www.autotrader.com/ (lycos)

Search Engine 4: google4
Query4: airplanes

I) 1) 50 fold-em-up paper airplanes, The Greatest Paper Airplanes
Ordering. Support. The Greatest Paper Airplanes 50 traditional fold-em-up paper airplanes Software for Windows and Macintosh. ...
http://www.khs.com/aboutgpa.htm (google)

I) 2) Airplanes and Aircraft at GreatVehicles.com
Click Here Logo for Airplanes and Aircraft site, Airplanes - Helicopters - Jets - Aircraft. ...
http://www.internetairplanes.com/ (google)

I) 3) Alex's paper airplanes
Free paper airplanes, paper helicopters and gliders, LEARN TO FLY paperairplanes.co.uk - Alex's Paper Airplanes, Alex 17 th December 2000. Paper Airplanes. ...
http://www.paperairplanes.co.uk/ (google)

I) 4) Boeing: Military Aircraft
Tests. Boeing Home | Military Airplanes Copyright (c) 2000 The Boeing Company - All rights reserved ...
http://www.boeing.com/defense-space/military/ (google)

I) 5) HOME PAGE
This page uses frames, but your browser doesn't support them. ...

FIG. 143D http://www.geocities.com/CapeCanaveral/1817/ (google)

I) 6) Howstuffworks.com's "How Airplanes Work"
I happen to fly a lot on business. For me, personally, airplanes are one of the most amazing things that I see on a daily basis. When I get on a 747, I am ...
http://www.howstuffworks.com/airplane.htm (google)

I) 7) Jline Paper Airplanes
Judson Lee, Designer and editor Copyright (c) 1999-2000 jline Paper Airplanes. All rights reserved. Revised: December 11, 2000 . ...
http://www.freehomepages.com/jline/ (google)

I) 8) Kool Paper Airplanes
Spain) Brainshare.com "HotSite of the Day" (Philippines), Welcome to the Kool Paper Airplanes! .Please bookmark this page and try folding some of our cool paper ...
http://koolpaperairplanes.hypermart.net/ (google)

I) 9) PAPER AIRPLANES
The Edutainment Catalog. PAPER AIRPLANES - QUICK AND SIMPLE! To make your airplanes really special, you can paint a picture on the paper before you fold it ...
http://www.onenorthpole.com/ToyShop/Paperairplanes.html (google)

I) 10) World War II Airplanes Home Page
Airplanes of the Second World War. A Small History and Information Page. This page is a tribute ...
http://www.tznet.com/mader/ (google)

Search Engine 5: excite5
Query5: cars

I) 1) Autorow
...
http://www.autorow.com/ (excite)

I) 2) AutoVantage - Home
...
http://www.autovantage.com/ (excite)

I) 3) Autoweb.com
...
http://www.autoweb.com/ (excite)

I) 4) CarSmart: Home Page
Click Centers >, Click Below CarSmart and the CarSmart logos are registered trademarks of A.I.N. Designed by A.I.N. •, Insurance Center •, Finance Center ...
http://www.carsmart.com/ (excite)

I) 5) Did you get your AutoSite Report?
...
http://www.autosite.com/ (excite)

I) 6) Excite Autos
Shop Excite Excite, @Home, and the Excite and @Home logos are service marks or registered service marks of At Home in the U.S. and other countries. Click Here! ...
http://autos.excite.com/ (excite)

I) 7) Kelley Blue Book - New Car Pricing, Used Car Bluebook Values
...
http://www.kbb.com/ (excite)

I) 8) Rental Cars & Car Rentals, Rental Cars @ Airports
...
http://www.bnm.com/rcar.htm (excite)

I) 9) www.carlist.com-New Cars,Car Financing,Auto Insurance,New Car Price Quote,Carclubs,Classifieds,Used Cars for Sale
www.carlist.com-Get a new car price quote, car insurance, auto financing and extended warranties. Look for a used car.Locate a carclub from around the world or list your carclub for free. ...
http://navigation.realnames.com/resolver.dll?action=navigation&pr... (excite)

Search Engine 6: barnesandnoble6
Query6: trains

I) 1) Thomas and the Magic Railroad: Diesel 10 Means Trouble
In Stock: 24 hours (Same Day).

FIG. 143E

Britt Allcroft,Richard Courtney (Illustrator) / Paperback / Random House Books for Young Readers / May 2000
B&N Price: $2.92 ~ You Save 10%...
http://shop.barnesandnoble.com/booksearch/isbnInquiry.asp?userid=... (barnesandnoble)

I) 2) On Becoming Baby Wise: How 100,000 New Parents Trained their Babies to Sleep through the Night the Natural Way
In Stock: 24 hours (Same Day).
Gary Ezzo,Robert Bucknam / Paperback / Multnomah Publishers, Inc. / February 1996
B&N Price: $3.98 ~ You Save 60%...
http://shop.barnesandnoble.com/booksearch/isbnInquiry.asp?userid=... (barnesandnoble)

I) 3) 2001 Classic Trains Wall Calendar
In Stock: 24 hours (Same Day).
Cal 2001 / Wall Calendar / Barnes & Noble Books / June 2000
B&N Price: $5.47 ~ You Save 50%...
http://shop.barnesandnoble.com/booksearch/isbnInquiry.asp?userid=... (barnesandnoble)

I) 4) On Becoming Babywise: Learn how over 500,000 Babies Were Trained to Sleep through the Night the Natural Way
In Stock: 24 hours (Same Day).
Gary Ezzo,Foreword by Robert Bucknam / Paperback / Multnomah Publishers, Inc. / May 1998
B&N Price: $10.79 ~ You Save 10%...
http://shop.barnesandnoble.com/booksearch/isbnInquiry.asp?userid=... (barnesandnoble)

I) 5) Selling to Vito: The Very Important Top Officer
In Stock: 24 hours (Same Day).
Anthony Parinello,Foreword by Denis Waitley / Paperback / Adams Media Corporation / August 1999
B&N Price: $11.65 ~ You Save 10%...
http://shop.barnesandnoble.com/booksearch/isbnInquiry.asp?userid=... (barnesandnoble)

I) 6) The Art of Raising a Puppy
In Stock: 24 hours (Same Day).
The Monks of New Skete / Hardcover / Little, Brown & Company / March 1991
B&N Price: $19.16 ~ You Save 20%...
http://shop.barnesandnoble.com/booksearch/isbnInquiry.asp?userid=... (barnesandnoble)

I) 7) The New Encyclopedia of Modern Bodybuilding
In Stock: 24 hours (Same Day).
Arnold Schwarzenegger,Bill Dobbins / Paperback / Simon & Schuster Trade Paperbacks / October 1999
B&N Price: $20.00 ~ You Save 20%...
http://shop.barnesandnoble.com/booksearch/isbnInquiry.asp?userid=... (barnesandnoble)

I) 8) Topgrading: How Leading Companies Win by Hiring, Coaching and Keeping the Best People
In Stock: 24 hours (Same Day).
Bradford D. Smart / Hardcover / Prentice Hall Press / January 1999
B&N Price: $20.80 ~ You Save 20%...
http://shop.barnesandnoble.com/booksearch/isbnInquiry.asp?userid=... (barnesandnoble)

I) 9) Dreamweaver 3 Hands-On Training
In Stock: 24 hours (Same Day).
Lynda Weinman,Garo Green / Paperback / Peachpit Press / July 2000
B&N Price: $31.99 ~ You Save 20%...
http://shop.barnesandnoble.com/booksearch/isbnInquiry.asp?userid=... (barnesandnoble)

I) 10) MCSE Training Kit Microsoft Windows 2000 Core Requirements with Cdrom and Book
In Stock: 24 hours (Same Day).
Microsoft Corporation / Paperback / Microsoft Press / June 2000
B&N Price: $159.99 ~ You Save 20%...
http://shop.barnesandnoble.com/booksearch/isbnInquiry.asp?userid=... (barnesandnoble)

Search Engine 7: looksmart7
Query7: trains

I) 1) America's Railroads on Parade
Check out this collection of over 4,000 square feet of automated trains, hands-on exhibits and train-related art. Find directions....
http://www.trains.ontheline.com/ (looksmart)

I) 2) Amtrak and Freight Trains
Peruse a collection of photographs and .wav files dedicated to Amtrak trains. Also find information about Amtrak models and train related links....
http://trainweb.com/mdamtrak199/ (looksmart)

FIG. 143F

I) 3) Dollhouses, Trains & More
Choose a department and shop for Thomas the Tank Engine, doll houses, radio control toys, trains or miniatures....
http://www.dollhouses-trains-more.com/ (looksmart)

I) 4) Internet Model Trains
Find more than 13,000 different model trains and railroading products, including Lionel, toy trains, train sets, books, videos and software....
http://www.internettrains.com/ (looksmart)

I) 5) trains.com
Covers trains both big and small, including model trains, railroads, rail travel and trains for kids....
http://www.trains.com/ (looksmart)

Search Engine 8: hotbot8
Query8: cars

I) 1) AuHo? The Automobiles Homepage!
AuHo,autoinfo,thiscar,Alfa,Romeo,Autobianchini, Acura,Aston Martin,AUDI,BMW,Cadillac,Chevrolet,Chrysler,Citroen, Daewoo,Dodge,Fiat,Ford,General...
http://www.auho.com/ (hotbot)

I) 2) Auto.com - Daily news and reviews
Auto.com is the Web's premier site for information on the auto industry, motor sports and consumer news about motor vehicles. It is a daily publication by the Detroit Free Press...
http://www.auto.com/ (hotbot)

I) 3) car crazy
San Diego Magazine, the nation's first city magazine, also has one of the first city websites. San Diego OnLine is complete with information about San Diego and content from the...
http://www.sandiego-online.com/carcrazy/ (hotbot)

I) 4) Cars On Line Photo Ads
Cars On Line Photo Ads, classic cars for sale, for sale by owner cars...
http://www.cars-on-line.com/ (hotbot)

I) 5) ClassicCar.com - 'Where Car Lovers Click' classic cars, chats, forums, articles,
The oldest and largest online community for classic car hobbyists, featuring realtime chats, forums, clubs & museums, news articles, searchable databases and tech tips with Ted...
http://www.classicar.com/home.htm (hotbot)

I) 6) Motor Trend: World's #1 Automotive Authority
The World's Automotive Authority offers 1999 buyer's guide, performance database, road tests, auto news, BBS, chat, MT TV schedules, money-saving buying features, and a fun-filled...
http://www.motortrend.com/ (hotbot)

I) 7) MSN CarPoint - Home
MSN CarPoint is the best way to research for and buy new or used cars, autos, automobiles, trucks and other vehicles on the Internet. It features invoice prices, car reviews, auto...
http://carpoint.msn.com/ (hotbot)

I) 8) The Auto Channel's MAIN STUDIO
Welcome to The Auto Channel studio. From here you have access to the entire site, including the latest news articles and live coverage of motorsports events....
http://www.theautochannel.com/ (hotbot)

I) 9) Trader Online Classified Ads
TraderOnline is the leader in online classifieds for used and new cars, trucks, boats, RVs, cycles, big trucks, aircraft, and general merchandise....
http://www.traderonline.com/ (hotbot)

Search Engine 9: borders9
Query9: trains

I) 1) Adopting Cats & Kittens: A Care & Training Guide
Ships within 2-3 days
Jankowski, Connie ~ Trade Paperback ~ 1993
Borders Price: $7.20 ~ You Save: $0.80 (10%)...

FIG. 143G http://search.borders.com/fcgi-bin/db2www/search/search.d2w/Detai... (borders)

I) 2) 3-Minute Abs: Achieving the Look You've Always Wanted in Only 3 Minutes a Day
In stock - ships in 24 hours
Brungardt, Kurt ~ Trade Paperback ~ 1998
Borders Price: $10.80 ~ You Save: $1.20 (10%)...
http://search.borders.com/fcgi-bin/db2www/search/search.d2w/Detai... (borders)

I) 3) ACLS: Quick Review Study Guide
In stock - ships in 24 hours
Aehlert, Barbara ~ Paperback ~ 1993
Borders Price: $13.95 ...
http://search.borders.com/fcgi-bin/db2www/search/search.d2w/Detai... (borders)

I) 4) Abdominal Training
Ships within 2-3 days
Norris, Christopher ~ Trade Paperback ~ 1997
Borders Price: $19.95 ...
http://search.borders.com/fcgi-bin/db2www/search/search.d2w/Detai... (borders)

I) 5) Agility Training: The Fun Sport for All Dogs
In stock - ships in 24 hours
Simmons-Moake, Jane ~ Trade Paperback ~ 1992
Borders Price: $23.36 ~ You Save: $2.59 (10%)...
http://search.borders.com/fcgi-bin/db2www/search/search.d2w/Detai... (borders)

I) 6) A-Train: Memoirs of a Tuskegee Airman
In stock - ships in 24 hours
Dryden, Charles W. ~ Hardcover ~ 1997
Borders Price: $23.96 ~ You Save: $5.99 (20%)...
http://search.borders.com/fcgi-bin/db2www/search/search.d2w/Detai... (borders)

I) 7) Aids to Postgraduate Medicine
In stock - ships in 24 hours
Burton, J. L. ~ Paperback ~ 1994
Borders Price: $24.00 ...
http://search.borders.com/fcgi-bin/db2www/search/search.d2w/Detai... (borders)

I) 8) Aircrew Unlimited: The Commonwealth Air Training Plan during WWII
In stock - ships in 24 hours
Golley, John ~ Hardcover ~ 1994
Borders Price: $26.36 ~ You Save: $6.59 (20%)...
http://search.borders.com/fcgi-bin/db2www/search/search.d2w/Detai... (borders)

I) 9) Advanced Gundog Training: Practical Fieldwork & Competition
In stock - ships in 24 hours
Deeley, Martin ~ Hardcover ~ 1994
Borders Price: $27.96 ~ You Save: $6.99 (20%)...
http://search.borders.com/fcgi-bin/db2www/search/search.d2w/Detai... (borders)

I) 10) Advanced Sightsinging & Ear Training: Strategies & Applications
In stock - ships in 24 hours
Benward, Bruce ~ Spiral Bound ~ 1989
Borders Price: $32.50 ...
http://search.borders.com/fcgi-bin/db2www/search/search.d2w/Detai... (borders)

Search Engine 10: amazon10

Query10: trains

I) 1) The Little Engine That Could
Usually ships in 24 hours
by Watty Piper, et al(Hardcover - June 1978)
Amazon Price: $6.39...
http://www.amazon.com/exec/obidos/ASIN/0448405202/qid=982118306/s... (amazon)

I) 2) Greenberg Guides Lionel Trains : Pocket Price Guide (Greenberg's Pocket Price Guide to Lionel Trains, 2001)
Usually ships in 2-3 days
by Kent J. Johnson(Editor)(Paperback - October 2000)
Amazon Price: $9.56...
http://www.amazon.com/exec/obidos/ASIN/0897784685/qid=982118306/s... (amazon)

I) 3) Thomas the Tank Engine's Big Lift-And-Look Book : Based on the Railway Series by the Rev. W. Awdry (Great Big Flap Books)

FIG. 143H

CHOOSE YOUR NEXT CAR:
Isuzu Hombre
Cadillac Catera
Pontiac Sunfire
Car shopping made easy.
cars.com

Usually ships in 24 hours
by Owen Bell(Illustrator), W. Awdry(Editor)(Hardcover - November 1996)
Amazon Price: $9.59...
http://www.amazon.com/exec/obidos/ASIN/0679880720/qid=982118306/s... (amazon)

I) 4) Chugga-Chugga Choo-Choo
Usually ships in 24 hours
by Kevin Lewis, Daniel Kirk(Illustrator)(Hardcover - May 1999)
Amazon Price: $10.39...
http://www.amazon.com/exec/obidos/ASIN/0786804297/qid=982118306/s... (amazon)

I) 5) Harley Davidson 2001 Wall Calendar
Usually ships in 2-3 days
(Paperback)
Amazon Price: $12.76...
http://www.amazon.com/exec/obidos/ASIN/0811827372/qid=982118306/s... (amazon)

I) 6) Full Steam Ahead : The Race to Build a Transcontinental Railroad
Usually ships in 24 hours
by Rhoda Blumberg, Rhonda Blumberg(Hardcover - May 1996)
Amazon Price: $15.16...
http://www.amazon.com/exec/obidos/ASIN/0792227158/qid=982118306/s... (amazon)

I) 7) Complete Service Manual for Lionel Trains
Usually ships in 1-2 weeks
by Maury D. Klein(Hardcover)
Amazon Price: $19.95...
http://www.amazon.com/exec/obidos/ASIN/0934580049/qid=982118306/s... (amazon)

I) 8) The Orphan Trains : The Story of Charles Loring Brace and the Children He Saved and Failed
Usually ships in 24 hours
by Stephen O'Connor(Hardcover)
Amazon Price: $20.80...
http://www.amazon.com/exec/obidos/ASIN/0395841739/qid=982118306/s... (amazon)

I) 9) The Digitrax Big Book of DCC
Usually ships in 24 hours
by John Palmer(Paperback)
Amazon Price: $24.95...
http://www.amazon.com/exec/obidos/ASIN/096748300X/qid=982118306/s... (amazon)

I) 10) Thomas the Tank Engine : The Complete Collection
by Wilbert Vere Awdry, Brian Sibley(Afterword)(Hardcover - September 1997) Usually ships in 24 hours ...
http://www.amazon.com/exec/obidos/ASIN/0517187868/qid=982118306/s... (amazon)

Preview Order

Phone: 1-631-757-1600 · E-Mail: internet2@internet2.com ·
Internet Corporation.

Current Group: I

| webcrawler1 | altavista2 | lycos3 | google4 | excite5 | barnesandnoble6 | looksmart7 | hotbot8 | borders9 | amazon10 |
|---|---|---|---|---|---|---|---|---|---|
| cars | boats | cars | airplanes | cars | trains | trains | cars | trains | trains |

Go to page: 1 2 3 4 5 6 7 8
Search Display *(Interleaved or separately by search engine)*:
Interleave Combine $[a-z] Combine $[z-a]
Separate Separate $[a-z] Separate $[z-a]
Description or List *(Site descriptions or lists)*: [List]

FIG. 145B

I) 11) Cars-Rentals-Discounts.com "The Ultimate Car Rentals Reservation Service"
1/19/2001 Car-Rentals-Discounts.com is a comprehensive web site designed for the consumer to compare prices for the major car rental companies. Allowing you to get the best deals searching all compani...
http://www.cars-rentals-discounts.com/ (lycos)

I) 12) cars.com
...
http://www.cars.com/ (lycos)

I) 13) CarSmart: Home Page
Click Centers >, Click Below CarSmart and the CarSmart logos are registered trademarks of A.I.N. Designed by A.I.N. •, Insurance Center •, Finance Center ...
http://www.carsmart.com/ (excite)

I) 14) Cars On Line Photo Ads
Cars On Line Photo Ads, classic cars for sale, for sale by owner cars...
http://www.cars-on-line.com/ (hotbot)

I) 15) Classic Auto Registry Service
Buy, sell, trade and locate antique, classic and collectible automobiles around the world. ...
http://www.kars.com/ (webcrawler)

I) 16) ClassicCar.com - 'Where Car Lovers Click' classic cars, chats, forums, articles,
The oldest and largest online community for classic car hobbyists, featuring realtime chats, forums, clubs & museums, news articles, searchable databases and tech tips with Ted...
http://www.classicar.com/home.htm (hotbot)

I) 17) Click For The Online Auto Scorecard
...
http://r.hotbot.com/r/fy_res_GT_inline/http://www.goto.com/d/sr?x... (lycos)

I) 18) Cool Cars
Brake for these cars. Make a puzzle or picture of a Ferrari, Porsche, Dodge or many other cars. You'll feel almost ready to drive after going here!...
http://bonus.lycos.com/bonus/card/scs_workshop_cars.html (lycos)

I) 19) Did you get your AutoSite Report?
...
http://www.autosite.com/ (excite)

I) 20) Excite Autos
Shop Excite Excite, @Home, and the Excite and @Home logos are service marks or registered service marks of At Home in the U.S. and other countries. Click Here! ...
http://autos.excite.com/ (excite)

I) 21) Fast, Low Price Quotes on a New Car
...
http://r.hotbot.com/r/fy_res_GT_inline/http://www.goto.com/d/sr?x... (lycos)

I) 22) Fish4: News and sport, cars, homes, jobs, business search, shopping, entertainment and travel
Around Fish4 - Fish4Homepage About Fish4 Cars Directory Local Sites Entertainment Homes Jobs Shopping Travel Contact Us Cars Homes Jobs Directory Local Sites Entertainment Shopping Travel Contact Us H...
http://www.fish4.co.uk/ (lycos)

I) 23) Kelley Blue Book - New Car Pricing, Used Car Bluebook Values
...
http://www.kbb.com/ (excite)

I) 24) Lycos RoadMaps
car buying info Lycos® is a registered trademark of Carnegie Mellon University. Our Privacy Vow Terms and Conditions Standard Advertising Terms and Conditions ...
http://www.lycos.com/roadmap.html (webcrawler)

I) 25) Microsoft CarPoint - cars, autos, automobiles, trucks, miniv...
New cars, autos, and automobiles and more are available for at the New Car Buying Service from Microsoft CarPoint. Use this free online car buying service to get a great price on your next new car with...
http://www.carpoint.msn.com/ (webcrawler)

I) 26) Money & Investing by Quicken.com
Shopping Home · Autos · Travel · Auctions · Where to Shop · Reviews · Compare Prices Where to Shop Product Reviews ...
http://quicken.webcrawler.com/shopping/best_bets/autos/ (webcrawler)

I) 27) MotoMall Lobby
Welcome to the MotoMall The automotive enthusiast's playground Enter the Mall Autoconnect High Octane Award AEA Award Site ...

FIG. 145C http://www.motomall.com/ (webcrawler)

I) 28) Motor Trend: World's #1 Automotive Authority
The World's Automotive Authority offers 1999 buyer's guide, performance database, road tests, auto news, BBS, chat, MT TV schedules, money-saving buying features, and a fun-filled...
http://www.motortrend.com/ (hotbot)

I) 29) MSN CarPoint - Home
MSN CarPoint is the best way to research for and buy new or used cars, autos, automobiles, trucks and other vehicles on the Internet. It features invoice prices, car reviews, auto...
http://carpoint.msn.com/ (hotbot)

I) 30) New and used cars and trucks online
Locate a used car or truck near you. All makes and models available. We find what you want at the lowest price! ...
http://www.all-auto.net/ (webcrawler)

I) 31) New cars and trucks online
Buy a new car or truck online. Low sticker prices for all makes and models. ...
http://www.all-auto.com/ (webcrawler)

I) 32) Rental Cars & Car Rentals, Rental Cars @ Airports
...
http://www.bnm.com/rcar.htm (excite)

I) 33) Searchwho.com - Auto Racing page featuring tons of NASCAR links and info but also with links for drag racing, indy formula one cars, sprint cars, and
even the women of racing plus information on business, music, sports, travel, news, health December 27, 2000 13:13 The best of the web for auto racing/nascar Welcome to the top web sites for auto raci...
http://nascar.searchwho.com/ (lycos)

I) 34) The Auto Channel's MAIN STUDIO
Welcome to The Auto Channel studio. From here you have access to the entire site, including the latest news articles and live coverage of motorsports events....
http://www.theautochannel.com/ (hotbot)

I) 35) The R/C Web Directory
The most comprehensive guide to radio controlled modeling resources on the World Wide Web. A free service sponsored by Tower Hobbies. ...
http://www.towerhobbies.com/rcweb.html (webcrawler)

I) 36) Trader Online Classified Ads
TraderOnline is the leader in online classifieds for used and new cars, trucks, boats, RVs, cycles, big trucks, aircraft, and general merchandise....
http://www.traderonline.com/ (hotbot)

I) 37) Used Cars, Sell Your Car, Auto Financing Insurance - AutoTrader.com Home
Search the largest inventory of cars and trucks on the Internet. More than 1.5 million listings, updated daily. Used Cars New Cars Select Make Acura Alfa Romeo AMC AM General Aston Martin Asuna Auburn...
http://www.autotrader.com/ (lycos)

I) 38) www.carlist.com-New Cars,Car Financing,Auto Insurance,New Car Price Quote,Carclubs,Classifieds,Used Cars for Sale
www.carlist.com-Get a new car price quote, car insurance, auto financing and extended warranties. Look for a used car.Locate a carclub from around the world or list your carclub for free. ...
http://navigation.realnames.com/resolver.dll?action=navigation&pr... (excite)

Query: boats

I) 1) *boats*.com
The complete marine portal for powerboating, fishing and sailing.......
http://www.boats.com/ (altavista)

I) 2) *Boats* For Sale
Boats For Sale.......
http://fishingpal.com/forsale/bfs/bfs.html (altavista)

I) 3) Internet *Boats*
Be in touch with boat dealers and browse classified ads with the help of this boating resource. Offers insurance details and boat auctions....
http://www.internetboats.com/ (altavista)

I) 4) JBoats, Inc.
JBoats, Inc. Web Site: Featuring Latest News, Brochure Information, Class & Owner Forums, And Sailing Links...
http://www.jboats.com/ (altavista)

FIG. 145D

I) 5) Lund *Boats* - A Tradition of Quality
Manufacturer of sports and fishing vessels provides specs of all models in the line. Furnishes company contacts and history....
http://www.lundboats.com/ (altavista)

I) 6) Malibu *Boats*
Check out the new line of ski boats. Manufacturer offers photos and profiles of its power boats, as well as related articles and competitions....
http://www.malibuboats.com/ (altavista)

I) 7) Saltwater *Boats* for Sale Message Board
The Saltwater Fishing Home Page is the world's #1 site for information on Big Game Saltwater Fishing. Site includes fishing reports, articles,......
http://www.wmi.org/saltfish/sboats_for_sale/index.html (altavista)

I) 8) Sea Ray *Boats*
Look through the catalog of sports boats, cruisers and yachts, and shop for accessories in the Sea Ray store. Includes a dealer locator....
http://www.searay.com/ (altavista)

I) 9) The Boat Shop - Project *Boats* Home Page
The Boat Shop's Classified Ads Page - Boat and Marine related private advertisements....
http://www.boatmall.com/ProjectBoats/default.htm (altavista)

I) 10) Thefishfinder.com The Fishing Search Engine: *Boats*
Worldwide Boat listings Manufacturers, Dealers, Accessories, Marinas and more...
http://www.thefishfinder.com/links/Boats/ (altavista)

Query: airplanes

I) 1) 50 fold-em-up paper airplanes, The Greatest Paper Airplanes
Ordering. Support. The Greatest Paper Airplanes 50 traditional fold-em-up paper airplanes Software for Windows and Macintosh. ...
http://www.khs.com/aboutgpa.htm (google)

I) 2) Alex's paper airplanes
Free paper airplanes, paper helicopters and gliders, LEARN TO FLY paperairplanes.co.uk - Alex's Paper Airplanes, Alex 17 th December 2000. Paper Airplanes. ...
http://www.paperairplanes.co.uk/ (google)

I) 3) Boeing: Military Aircraft
Tests. Boeing Home | Military Airplanes Copyright (c) 2000 The Boeing Company - All rights reserved ...
http://www.boeing.com/defense-space/military/ (google)

I) 4) HOME PAGE
This page uses frames, but your browser doesn't support them. ...
http://www.geocities.com/CapeCanaveral/1817/ (google)

I) 5) Howstuffworks.com's "How Airplanes Work"
I happen to fly a lot on business. For me, personally, airplanes are one of the most amazing things that I see on a daily basis. When I get on a 747, I am ...
http://www.howstuffworks.com/airplane.htm (google)

I) 6) Jline Paper Airplanes
Judson Lee, Designer and editor Copyright (c) 1999-2000 jline Paper Airplanes. All rights reserved. Revised: December 11, 2000. ...
http://www.freehomepages.com/jline/ (google)

I) 7) Kool Paper Airplanes
Spain) Brainshare.com "HotSite of the Day" (Philippines), Welcome to the Kool Paper Airplanes! .Please bookmark this page and try folding some of our cool paper ...
http://koolpaperairplanes.hypermart.net/ (google)

I) 8) PAPER AIRPLANES
The Edutainment Catalog. PAPER AIRPLANES - QUICK AND SIMPLE! To make your airplanes really special, you can paint a picture on the paper before you fold it ...
http://www.onenorthpole.com/ToyShop/Paperairplanes.html (google)

I) 9) Radio Control Airplanes
Radio Control Airplanes. - by Michael Myers. Contents: Scroll down to see: Scale models I've built ...
http://www.netaxs.com/~mhmyers/rc.tn.html (google)

I) 10) World War II Airplanes Home Page
Airplanes of the Second World War. A Small History and Information Page. This page is a tribute ...
http://www.tznet.com/mader/ (google)

Query: trains

I) 1) Thomas and the Magic Railroad: Diesel 10 Means Trouble

FIG. 145E

In Stock: 24 hours (Same Day).
Britt Allcroft,Richard Courtney (Illustrator) / Paperback / Random House Books for Young Readers / May 2000
B&N Price: $2.92 ~ You Save 10%...
http://shop.barnesandnoble.com/booksearch/isbninquiry.asp?userid=... (barnesandnoble)

I) 2) On Becoming Baby Wise: How 100,000 New Parents Trained their Babies to Sleep through the Night the Natural Way
In Stock: 24 hours (Same Day).
Gary Ezzo,Robert Bucknam / Paperback / Multnomah Publishers, Inc. / February 1996
B&N Price: $3.98 ~ You Save 60%...
http://shop.barnesandnoble.com/booksearch/isbninquiry.asp?userid=... (barnesandnoble)

I) 3) 2001 Classic Trains Wall Calendar
In Stock: 24 hours (Same Day).
Cal 2001 / Wall Calendar / Barnes & Noble Books / June 2000
B&N Price: $5.47 ~ You Save 50%...
http://shop.barnesandnoble.com/booksearch/isbninquiry.asp?userid=... (barnesandnoble)

I) 4) The Little Engine That Could
Usually ships in 24 hours
by Watty Piper, et al(Hardcover - June 1978)
Amazon Price: $6.39...
http://www.amazon.com/exec/obidos/ASIN/0448405202/qid=982169113/s... (amazon)

I) 5) Adopting Cats & Kittens: A Care & Training Guide
Ships within 2-3 days
Jankowski, Connie ~ Trade Paperback ~ 1993
Borders Price: $7.20 ~ You Save: $0.80 (10%)...
http://search.borders.com/fcgi-bin/db2www/search/search.d2w/Detai... (borders)

I) 6) Inside Freight Train
Usually ships in 2-3 days
by Donald Crews(Illustrator)(Hardcover - January 2001)
Amazon Price: $7.96...
http://www.amazon.com/exec/obidos/ASIN/0688170870/qid=982169113/s... (amazon)

I) 7) Greenberg Guides Lionel Trains : Pocket Price Guide (Greenberg's Pocket Price Guide to Lionel Trains, 2001)
Usually ships in 2-3 days
by Kent J. Johnson(Editor)(Paperback - October 2000)
Amazon Price: $9.56...
http://www.amazon.com/exec/obidos/ASIN/0897784685/qid=982169113/s... (amazon)

I) 8) Chugga-Chugga Choo-Choo
Usually ships in 24 hours
by Kevin Lewis, Daniel Kirk(Illustrator)(Hardcover - May 1999)
Amazon Price: $10.39...
http://www.amazon.com/exec/obidos/ASIN/0786804297/qid=982169113/s... (amazon)

I) 9) On Becoming Babywise: Learn how over 500,000 Babies Were Trained to Sleep through the Night the Natural Way
In Stock: 24 hours.
Gary Ezzo,Foreword by Robert Bucknam / Paperback / Multnomah Publishers, Inc. / May 1998
B&N Price: $10.79 ~ You Save 10%...
http://shop.barnesandnoble.com/booksearch/isbninquiry.asp?userid=... (barnesandnoble)

I) 10) 3-Minute Abs: Achieving the Look You've Always Wanted in Only 3 Minutes a Day
In stock - ships in 24 hours
Brungardt, Kurt ~ Trade Paperback ~ 1998
Borders Price: $10.80 ~ You Save: $1.20 (10%)...
http://search.borders.com/fcgi-bin/db2www/search/search.d2w/Detai... (borders)

I) 11) Selling to Vito: The Very Important Top Officer
In Stock: 24 hours (Same Day).
Anthony Parinello,Foreword by Denis Waitley / Paperback / Adams Media Corporation / August 1999
B&N Price: $11.65 ~ You Save 10%...
http://shop.barnesandnoble.com/booksearch/isbninquiry.asp?userid=... (barnesandnoble)

I) 12) ACLS: Quick Review Study Guide
In stock - ships in 24 hours
Aehlert, Barbara ~ Paperback ~ 1993
Borders Price: $13.95 ...
http://search.borders.com/fcgi-bin/db2www/search/search.d2w/Detai... (borders)

I) 13) Full Steam Ahead : The Race to Build a Transcontinental Railroad
Usually ships in 24 hours
by Rhoda Blumberg, Rhonda Blumberg(Hardcover - May 1996)
Amazon Price: $15.16...
http://www.amazon.com/exec/obidos/ASIN/0792227158/qid=982169113/s... (amazon)

FIG. 145F

I) 14) The Art of Raising a Puppy
In Stock: 24 hours.
The Monks of New Skete / Hardcover / Little, Brown & Company / March 1991
B&N Price: $19.16 ~ You Save 20%...
http://shop.barnesandnoble.com/booksearch/isbnInquiry.asp?userid=... (barnesandnoble)

I) 15) Abdominal Training
Ships within 2-3 days
Norris, Christopher ~ Trade Paperback ~ 1997
Borders Price: $19.95 ...
http://search.borders.com/fcgi-bin/db2www/search/search.d2w/Detai... (borders)

I) 16) Complete Service Manual for Lionel Trains
Usually ships in 1-2 weeks
by Maury D. Klein(Hardcover)
Amazon Price: $19.95...
http://www.amazon.com/exec/obidos/ASIN/0934580049/qid=982169113/s... (amazon)

I) 17) The New Encyclopedia of Modern Bodybuilding
In Stock: 24 hours (Same Day).
Arnold Schwarzenegger,Bill Dobbins / Paperback / Simon & Schuster Trade Paperbacks / October 1999
B&N Price: $20.00 ~ You Save 20%...
http://shop.barnesandnoble.com/booksearch/isbnInquiry.asp?userid=... (barnesandnoble)

I) 18) The Orphan Trains : The Story of Charles Loring Brace and the Children He Saved and Failed
Usually ships in 24 hours
by Stephen O'Connor(Hardcover)
Amazon Price: $20.80...
http://www.amazon.com/exec/obidos/ASIN/0395841739/qid=982169113/s... (amazon)

I) 19) Topgrading: How Leading Companies Win by Hiring, Coaching and Keeping the Best People
In-Stock: Ships 2-3 days.
Bradford D. Smart / Hardcover / Prentice Hall Press / January 1999
B&N Price: $20.80 ~ You Save 20%...
http://shop.barnesandnoble.com/booksearch/isbnInquiry.asp?userid=... (barnesandnoble)

I) 20) Agility Training: The Fun Sport for All Dogs
In stock - ships in 24 hours
Simmons-Moake, Jane ~ Trade Paperback ~ 1992
Borders Price: $23.36 ~ You Save: $2.59 (10%)...
http://search.borders.com/fcgi-bin/db2www/search/search.d2w/Detai... (borders)

I) 21) A-Train: Memoirs of a Tuskegee Airman
In stock - ships in 24 hours
Dryden, Charles W. ~ Hardcover ~ 1997
Borders Price: $23.96 ~ You Save: $5.99 (20%)...
http://search.borders.com/fcgi-bin/db2www/search/search.d2w/Detai... (borders)

I) 22) Lionel: America's Favorite Toy Trains
Usually ships in 24 hours
by Gerry Souter, Janet Souter(Hardcover - October 2000)
Amazon Price: $23.96...
http://www.amazon.com/exec/obidos/ASIN/0760305056/qid=982169113/s... (amazon)

I) 23) Aids to Postgraduate Medicine
In stock - ships in 24 hours
Burton, J. L. ~ Paperback ~ 1994
Borders Price: $24.00 ...
http://search.borders.com/fcgi-bin/db2www/search/search.d2w/Detai... (borders)

I) 24) Aircrew Unlimited: The Commonwealth Air Training Plan during WWII
In stock - ships in 24 hours
Golley, John ~ Hardcover ~ 1994
Borders Price: $26.36 ~ You Save: $6.59 (20%)...
http://search.borders.com/fcgi-bin/db2www/search/search.d2w/Detai... (borders)

I) 25) Advanced Gundog Training: Practical Fieldwork & Competition
In stock - ships in 24 hours
Deeley, Martin ~ Hardcover ~ 1994
Borders Price: $27.96 ~ You Save: $6.99 (20%)...
http://search.borders.com/fcgi-bin/db2www/search/search.d2w/Detai... (borders)

I) 26) Complete Service Manual for American Flyer Trains
Usually ships in 24 hours
by Maury Klein(Hardcover)
Amazon Price: $29.95...
http://www.amazon.com/exec/obidos/ASIN/0934580065/qid=982169113/s... (amazon)

I) 27) Dreamweaver 3 Hands-On Training

FIG. 145G

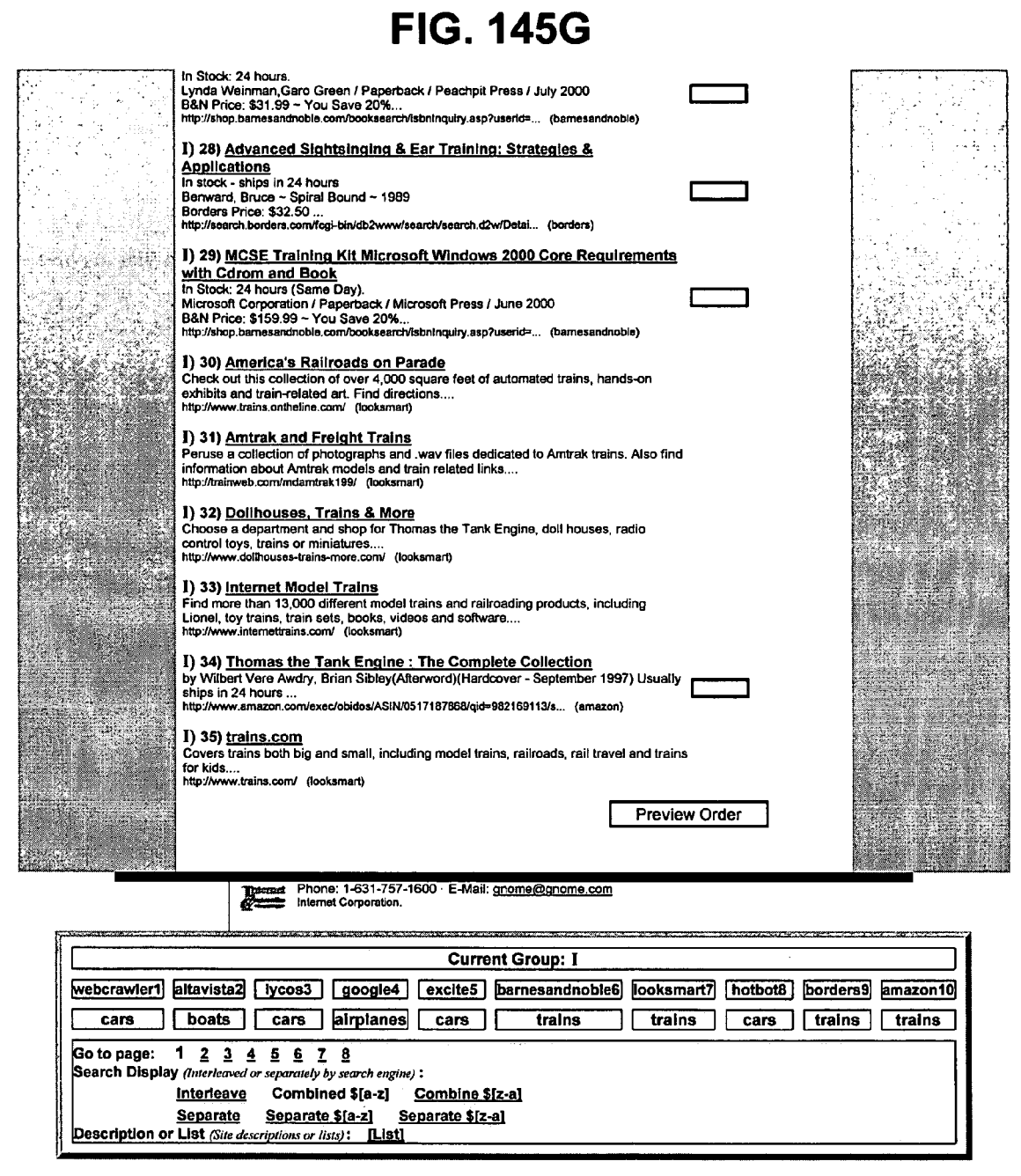

In Stock: 24 hours.
Lynda Weinman,Garo Green / Paperback / Peachpit Press / July 2000
B&N Price: $31.99 ~ You Save 20%...
http://shop.barnesandnoble.com/booksearch/isbnInquiry.asp?userid=... (barnesandnoble)

I) 28) Advanced Sightsinging & Ear Training: Strategies & Applications
In stock - ships in 24 hours
Benward, Bruce ~ Spiral Bound ~ 1989
Borders Price: $32.50 ...
http://search.borders.com/fcgi-bin/db2www/search/search.d2w/Detai... (borders)

I) 29) MCSE Training Kit Microsoft Windows 2000 Core Requirements with Cdrom and Book
In Stock: 24 hours (Same Day).
Microsoft Corporation / Paperback / Microsoft Press / June 2000
B&N Price: $159.99 ~ You Save 20%...
http://shop.barnesandnoble.com/booksearch/isbnInquiry.asp?userid=... (barnesandnoble)

I) 30) America's Railroads on Parade
Check out this collection of over 4,000 square feet of automated trains, hands-on exhibits and train-related art. Find directions....
http://www.trains.ontheline.com/ (looksmart)

I) 31) Amtrak and Freight Trains
Peruse a collection of photographs and .wav files dedicated to Amtrak trains. Also find information about Amtrak models and train related links....
http://trainweb.com/mdamtrak199/ (looksmart)

I) 32) Dollhouses, Trains & More
Choose a department and shop for Thomas the Tank Engine, doll houses, radio control toys, trains or miniatures....
http://www.dollhouses-trains-more.com/ (looksmart)

I) 33) Internet Model Trains
Find more than 13,000 different model trains and railroading products, including Lionel, toy trains, train sets, books, videos and software....
http://www.internettrains.com/ (looksmart)

I) 34) Thomas the Tank Engine : The Complete Collection
by Wilbert Vere Awdry, Brian Sibley(Afterword)(Hardcover - September 1997) Usually ships in 24 hours ...
http://www.amazon.com/exec/obidos/ASIN/0517187868/qid=982169113/s... (amazon)

I) 35) trains.com
Covers trains both big and small, including model trains, railroads, rail travel and trains for kids....
http://www.trains.com/ (looksmart)

Preview Order

Phone: 1-631-757-1600 · E-Mail: gnome@gnome.com
Internet Corporation.

Current Group: I

| webcrawler1 | altavista2 | lycos3 | google4 | excite5 | barnesandnoble6 | looksmart7 | hotbot8 | borders9 | amazon10 |
|---|---|---|---|---|---|---|---|---|---|
| cars | boats | cars | airplanes | cars | trains | trains | cars | trains | trains |

Go to page: 1 2 3 4 5 6 7 8
Search Display *(Interleaved or separately by search engine)* :
Interleave Combined $[a-z] Combine $[z-a]
Separate Separate $[a-z] Separate $[z-a]
Description or List *(Site descriptions or lists)*: [List]

FIG. 147B

I) 12) 1-2-3 Magic: Effective Discipline for Children 2-12
In stock - ships in 24 hours
Phelan, Thomas W. ~ Revised, Revised, Trade Paperback ~ 1996
Borders Price: $11.66 ~ You Save: $1.29 (10%)...
http://search.borders.com/fcgi-bin/db2www/search/search.d2w/Detai... (borders)

I) 13) 10 Most Common Mistakes Good Parents Make: And How to Avoid Them
In stock - ships in 24 hours
Steede, Kevin ~ Trade Paperback ~ 1999
Borders Price: $11.66 ~ You Save: $1.29 (10%)...
http://search.borders.com/fcgi-bin/db2www/search/search.d2w/Detai... (borders)

I) 14) Car Talk Fathers : Why You Should Never Listen to Your Father When It Comes to Cars
Usually ships in 24 hours
by Tom Magliozzi, Ray Magliozzi(Audio Cassette - October 1999)
Amazon Price: $11.95...
http://www.amazon.com/exec/obidos/ASIN/1559353201/qid=982170788/s... (amazon)

I) 15) The 36-Hour Day: A Family Guide to Caring for Persons with Alzheimer Disease, Related Dementing Illnesses, and Memory Loss in Later Life
In Stock: 24 hours (Same Day).
Nancy L. Mace,Peter V. Rabins,Foreword by Paul R. McHugh / Paperback / Johns Hopkins University Press / April 1999
B&N Price: $12.55 ~ You Save 10%...
http://shop.barnesandnoble.com/booksearch/isbnInquiry.asp?userid=... (barnesandnoble)

I) 16) 101 Ways to Bug Your Parents
In stock - ships in 24 hours
Wardlaw, Lee ~ Hardcover ~ 1996
Borders Price: $12.79 ~ You Save: $3.20 (20%)...
http://search.borders.com/fcgi-bin/db2www/search/search.d2w/Detai... (borders)

I) 17) Dumpy the Dump Truck (Dumpy)
Usually ships in 24 hours
by Julie Andrews Edwards, et al(Hardcover - October 2000)
Amazon Price: $12.79...
http://www.amazon.com/exec/obidos/ASIN/0786806095/qid=982170788/s... (amazon)

I) 18) My Little Police Car Electronic Read-And-Play Book
In Stock: 24 hours (Same Day).
Doris Tomaselli,Cathy Beylon (Illustrator) / Book and Toy / Barnes & Noble Books / July 1999
B&N Price: $12.98...
http://shop.barnesandnoble.com/booksearch/isbnInquiry.asp?userid=... (barnesandnoble)

I) 19) Codependent No More: How to Stop Controlling Others and Start Caring for Yourself
In Stock: 24 hours.
Melody Beattie / Paperback / Hazelden Information & Educational Services / April 1987
B&N Price: $13.50 ~ You Save 10%...
http://shop.barnesandnoble.com/booksearch/isbnInquiry.asp?userid=... (barnesandnoble)

I) 20) 100 Best Careers in Crime Fighting
In stock - ships in 24 hours
Lee, Mary P. ~ Trade Paperback ~ 1998
Borders Price: $14.36 ~ You Save: $1.59 (10%)...
http://search.borders.com/fcgi-bin/db2www/search/search.d2w/Detai... (borders)

I) 21) How to Draw Cars Like a Pro
Usually ships in 24 hours
by Thom Taylor, et al(Paperback - November 1996)
Amazon Price: $15.96...
http://www.amazon.com/exec/obidos/ASIN/0760300100/qid=982170788/s... (amazon)

I) 22) Caring for Your Baby and Young Child Birth to Age 5
In Stock: 24 hours (Same Day).
Steven P. Shelov (Editor),Robert E. Hannemann (Editor) / Paperback / Bantam Books, Incorporated / June 1998
B&N Price: $16.15 ~ You Save 10%...
http://shop.barnesandnoble.com/booksearch/isbnInquiry.asp?userid=... (barnesandnoble)

I) 23) How Cars Work
Usually ships in 24 hours
by Tom Newton(Paperback)
Amazon Price: $17.95...
http://www.amazon.com/exec/obidos/ASIN/0966862309/qid=982170788/s... (amazon)

I) 24) How to Turn Cars Into Cash
Usually ships in 1-2 weeks
by Timothy Johnson(Paperback)
Amazon Price: $17.95...
http://www.amazon.com/exec/obidos/ASIN/1880782367/qid=982170788/s... (amazon)

I) 25) Catalog of Chevy V8 Engine Casting Numbers 1955-93 and Stamped Numbers (Matching Numbers Series)
Usually ships in 24 hours
by Cars, Parts Magazine(Paperback - January 1995)
Amazon Price: $19.95...
http://www.amazon.com/exec/obidos/ASIN/1880524139/qid=982170788/s... (amazon)

I) 26) 100 ECG Problems
Ships within 2-3 days
Hampton, John R. ~ Paperback ~ 1997
Borders Price: $25.75 ...
http://search.borders.com/fcgi-bin/db2www/search/search.d2w/Detai... (borders)

I) 27) 101 Arena Exercises: A Ringside Guide for Horse & Rider
In stock - ships in 24 hours
Hill, Cherry ~ Trade Paperback ~ 1995
Borders Price: $26.96 ~ You Save: $2.99 (10%)...
http://search.borders.com/fcgi-bin/db2www/search/search.d2w/Detai... (borders)

FIG. 147C

I) 28) The Speed Merchants ; The Drivers-The Cars-The Tracks ; A Journey Through the World of Motor Racing ; 1969-1972
Usually ships in 2-3 days
by Michael Keyser, Brian Redman(Hardcover)
Amazon Price: $55.96...
http://www.amazon.com/exec/obidos/ASIN/0837602327/qid=982170788/s... (amazon)

I) 29)
...
http://shop.barnesandnoble.com/booksearch/isbnInquiry.asp?userid=... (barnesandnoble)

I) 30)
...
http://shop.barnesandnoble.com/booksearch/isbnInquiry.asp?userid=... (barnesandnoble)

I) 31) Airline tickets, hotels, cars, vacations: Go Virtually Anywhere with Travelocity.com
Welcome to Travelocity.com! Already a member? Click here to log in My Trips | My Account Site Shortcuts - My Trips Customer Service - Travel Menu VIA Rail Canada -...
http://www.travelocity.com/ (lycos)

I) 32) Autobytel.com - Changing the way America buys cars... Again. Autobytel.com
Site Shortcuts Buy a vehicle Sell my vehicle Owning my vehicle Customer Survey Pressroom - New vehicles Used vehicle Maintenance Financing Insurance Warranty My Garage For Her Resources -...
http://www.autobytel.com/ (lycos)

I) 33) Autorow
...
http://www.autorow.com/ (excite)

I) 34) AutoVantage - Home
...
http://www.autovantage.com/ (excite)

I) 35) Autoweb.com
...
http://www.autoweb.com/ (excite)

I) 36) BMW Automobile Enthusiasts Page.
Not affiliated with any company (like BMW NA or BMW AG). This server provides info gathered from many sources, mostly the e-mail list. No checking for accuracy is done, use at your own risk. ...
http://cbsgi1.bu.edu/bmw/bmw.html (webcrawler)

I) 37) British Cars Web - Scions of Lucas
The Scions of Lucas is the oldest & largest collection of British Car related e-mail lists, Marque & Model web lists, club listing, parts sources, tech information, events, and anything else re...
http://www.team.net/sol/ (webcrawler)

I) 38) Cars-Rentals-Discounts.com "The Ultimate Car Rentals Reservation Service"
1/19/2001 Car-Rentals-Discounts.com is a comprehensive web site designed for the consumer to compare prices for the major car rental companies. Allowing you to get the best deals searching all compani...
http://www.cars-rentals-discounts.com/ (lycos)

I) 39) cars.com
...
http://www.cars.com/ (lycos)

I) 40) CarSmart: Home Page
Click Centers >, Click Below CarSmart and the CarSmart logos are registered trademarks of A.I.N. Designed by A.I.N. •, Insurance Center •, Finance Center ...
http://www.carsmart.com/ (excite)

I) 41) Classic Auto Registry Service
Buy, sell, trade and locate antique, classic and collectible automobiles around the world. ...
http://www.kars.com/ (webcrawler)

I) 42) Click For The Online Auto Scorecard
...
http://r.hotbot.com/r/ly_res_GT_inline/http://www.goto.com/d/sr?x... (lycos)

I) 43) Cool Cars
Brake for these cars. Make a puzzle or picture of a Ferrari, Porsche, Dodge or many other cars. You'll feel almost ready to drive after going here!...
http://bonus.lycos.com/bonus/card/scs_workshop_cars.html (lycos)

I) 44) Did you get your AutoSite Report?
...
http://www.autosite.com/ (excite)

I) 45) Excite Autos
Shop Excite Excite, @Home, and the Excite and @Home logos are service marks or registered service marks of At Home in the U.S. and other countries. Click Here! ...
http://autos.excite.com/ (excite)

I) 46) Fast, Low Price Quotes on a New Car
...
http://r.hotbot.com/r/ly_res_GT_inline/http://www.goto.com/d/sr?x... (lycos)

I) 47) Fish4: News and sport, cars, homes, jobs, business search, shopping, entertainment and travel
Around Fish4 - Fish4Homepage About Fish4 Cars Directory Local Sites Entertainment Homes Jobs Shopping Travel Contact Us Cars Homes Jobs Directory Local Sites Entertainment Shopping Travel Contact Us H...
http://www.fish4.co.uk/ (lycos)

I) 48) Kelley Blue Book - New Car Pricing, Used Car Bluebook Values
...
http://www.kbb.com/ (excite)

I) 49) Lycos RoadMaps
car buying info Lycos® is a registered trademark of Carnegie Mellon University. Our Privacy Vow Terms and

FIG. 147D

Conditions Standard Advertising Terms and Conditions ...
http://www.lycos.com/roadmap.html (webcrawler)

I) 50) Microsoft CarPoint - cars, autos, automobiles, trucks, miniv...
New cars, autos, and automobiles and more are available for at the New Car Buying Service from Microsoft CarPoint. Use this free online car buying service to get a great price on your next new car with...
http://www.carpoint.msn.com/ (webcrawler)

I) 51) Money & Investing by Quicken.com
Shopping Home · Autos · Travel · Auctions · Where to Shop · Reviews · Compare Prices Where to Shop Product Reviews ...
http://quicken.webcrawler.com/shopping/best_bets/autos/ (webcrawler)

I) 52) MotoMall Lobby
Welcome to the MotoMall The automotive enthusiast's playground Enter the Mall Autoconnect High Octane Award AEA Award Site ...
http://www.motomall.com/ (webcrawler)

I) 53) New and used cars and trucks online
Locate a used car or truck near you. All makes and models available. We find what you want at the lowest price! ...
http://www.all-auto.net/ (webcrawler)

I) 54) New cars and trucks online
Buy a new car or truck online. Low sticker prices for all makes and models. ...
http://www.all-auto.com/ (webcrawler)

I) 55) Rental Cars & Car Rentals, Rental Cars @ Airports
...
http://www.bnm.com/rcar.htm (excite)

I) 56) Searchwho.com - Auto Racing page featuring tons of NASCAR links and info but also with links for drag racing, indy formula one cars, sprint cars, and
even the women of racing plus information on business, music, sports, travel, news, health December 27, 2000 13:13 The best of the web for auto racing/nascar Welcome to the top web sites for auto raci...
http://nascar.searchwho.com/ (lycos)

I) 57) The R/C Web Directory
The most comprehensive guide to radio controlled modeling resources on the World Wide Web. A free service sponsored by Tower Hobbies. ...
http://www.towerhobbies.com/rcweb.html (webcrawler)

I) 58) Used Cars, Sell Your Car, Auto Financing Insurance - AutoTrader.com Home
Search the largest inventory of cars and trucks on the Internet. More than 1.5 million listings, updated daily. Used Cars New Cars Select Make Acura Alfa Romeo AMC AM General Aston Martin Asuna Auburn...
http://www.autotrader.com/ (lycos)

I) 59) www.carlist.com-New Cars,Car Financing,Auto Insurance,New Car Price Quote,Carclubs,Classifieds,Used Cars for Sale
www.carlist.com-Get a new car price quote, car insurance, auto financing and extended warranties. Look for a used car.Locate a carclub from around the world or list your carclub for free. ...
http://navigation.realnames.com/resolver.dll?action=navigation&pr... (excite)

Query: boats

I) 1) *boats*.com
The complete marine portal for powerboating, fishing and sailing.......
http://www.boats.com/ (altavista)

I) 2) *Boats* For Sale
Boats For Sale.......
http://fishingpal.com/forsale/bfs/bfs.html (altavista)

I) 3) Internet *Boats*
Be in touch with boat dealers and browse classified ads with the help of this boating resource. Offers insurance details and boat auctions....
http://www.internetboats.com/ (altavista)

I) 4) JBoats, Inc.
JBoats, Inc. Web Site: Featuring Latest News, Brochure Information, Class & Owner Forums, And Sailing Links...
http://www.jboats.com/ (altavista)

I) 5) Lund *Boats* - A Tradition of Quality
Manufacturer of sports and fishing vessels provides specs of all models in the line. Furnishes company contacts and history....
http://www.lundboats.com/ (altavista)

I) 6) Malibu *Boats*
Check out the new line of ski boats. Manufacturer offers photos and profiles of its power boats, as well as related articles and competitions....
http://www.malibuboats.com/ (altavista)

I) 7) Saltwater *Boats* for Sale Message Board
The Saltwater Fishing Home Page is the world's #1 site for information on Big Game Saltwater Fishing. Site includes fishing reports, articles,......
http://www.wmi.org/saltfish/sboats_for_sale/index.html (altavista)

I) 8) Sea Ray *Boats*
Look through the catalog of sports boats, cruisers and yachts, and shop for accessories in the Sea Ray store. Includes a dealer locator....
http://www.searay.com/ (altavista)

I) 9) The Boat Shop - Project *Boats* Home Page
The Boat Shop's Classified Ads Page - Boat and Marine related private advertisements....
http://www.boatmall.com/ProjectBoats/default.htm (altavista)

I) 10) Thefishfinder.com The Fishing Search Engine: *Boats*
Worldwide Boat listings Manufacturers, Dealers, Accessories, Marinas and more...
http://www.thefishfinder.com/links/Boats/ (altavista)

FIG. 147E

Query: airplanes

I) 1) 50 fold-em-up paper airplanes, The Greatest Paper Airplanes
Ordering. Support. The Greatest Paper Airplanes 50 traditional fold-em-up paper airplanes Software for Windows and Macintosh. ...
http://www.khs.com/aboutgpa.htm (google)

I) 2) Alex's paper airplanes
Free paper airplanes, paper helicopters and gliders, LEARN TO FLY paperairplanes.co.uk - Alex's Paper Airplanes, Alex 17 th December 2000. Paper Airplanes. ...
http://www.paperairplanes.co.uk/ (google)

I) 3) Boeing: Military Aircraft
Tests. Boeing Home | Military Airplanes Copyright (c) 2000 The Boeing Company - All rights reserved ...
http://www.boeing.com/defense-space/military/ (google)

I) 4) HOME PAGE
This page uses frames, but your browser doesn't support them. ...
http://www.geocities.com/CapeCanaveral/1817/ (google)

I) 5) Howstuffworks.com's "How Airplanes Work"
I happen to fly a lot on business. For me, personally, airplanes are one of the most amazing things that I see on a daily basis. When I get on a 747, I am ...
http://www.howstuffworks.com/airplane.htm (google)

I) 6) Jline Paper Airplanes
Judson Lee, Designer and editor Copyright (c) 1999-2000 jline Paper Airplanes. All rights reserved. Revised: December 11, 2000 . ...
http://www.freehomepages.com/jline/ (google)

I) 7) Kool Paper Airplanes
Spain) Brainshare.com "HotSite of the Day" (Philippines), Welcome to the Kool Paper Airplanes! .Please bookmark this page and try folding some of our cool paper ...
http://koolpaperairplanes.hypermart.net/ (google)

I) 8) PAPER AIRPLANES
The Edutainment Catalog. PAPER AIRPLANES - QUICK AND SIMPLE! To make your airplanes really special, you can paint a picture on the paper before you fold it ...
http://www.onenorthpole.com/ToyShop/Paperairplanes.html (google)

I) 9) Radio Control Airplanes
Radio Control Airplanes. - by Michael Myers. Contents: Scroll down to see: Scale models I've built ...
http://www.netaxs.com/~mhmyers/rc.tn.html (google)

I) 10) World War II Airplanes Home Page
Airplanes of the Second World War. A Small History and Information Page. This page is a tribute ...
http://www.tznet.com/mader/ (google)

Query: trains

I) 1) Thomas and the Magic Railroad: Diesel 10 Means Trouble
In Stock: 24 hours (Same Day).
Britt Allcroft,Richard Courtney (Illustrator) / Paperback / Random House Books for Young Readers / May 2000
B&N Price: $2.92 ~ You Save 10%...
http://shop.barnesandnoble.com/booksearch/isbninquiry.asp?userid=... (barnesandnoble)

I) 2) On Becoming Baby Wise: How 100,000 New Parents Trained their Babies to Sleep through the Night the Natural Way
In Stock: 24 hours (Same Day).
Gary Ezzo,Robert Bucknam / Paperback / Multnomah Publishers, Inc. / February 1998
B&N Price: $3.98 ~ You Save 60%...
http://shop.barnesandnoble.com/booksearch/isbninquiry.asp?userid=... (barnesandnoble)

I) 3) 2001 Classic Trains Wall Calendar
In Stock: 24 hours (Same Day).
Cal 2001 / Wall Calendar / Barnes & Noble Books / June 2000
B&N Price: $5.47 ~ You Save 50%...
http://shop.barnesandnoble.com/booksearch/isbninquiry.asp?userid=... (barnesandnoble)

I) 4) The Little Engine That Could
Usually ships in 24 hours
by Watty Piper, et al(Hardcover - June 1978)
Amazon Price: $6.39...
http://www.amazon.com/exec/obidos/ASIN/0448405202/qid=982170788/s... (amazon)

I) 5) Adopting Cats & Kittens: A Care & Training Guide
Ships within 2-3 days
Jankowski, Connie ~ Trade Paperback ~ 1993
Borders Price: $7.20 ~ You Save: $0.80 (10%)...
http://search.borders.com/fcgi-bin/db2www/search/search.d2w/Detail... (borders)

I) 6) Inside Freight Train
Usually ships in 2-3 days
by Donald Crews(Illustrator)(Hardcover - January 2001)
Amazon Price: $7.96...
http://www.amazon.com/exec/obidos/ASIN/0688170870/qid=982170788/s... (amazon)

I) 7) Greenberg Guides Lionel Trains : Pocket Price Guide (Greenberg's Pocket Price Guide to Lionel Trains, 2001)
Usually ships in 2-3 days
by Kent J. Johnson(Editor)(Paperback - October 2000)
Amazon Price: $9.56...
http://www.amazon.com/exec/obidos/ASIN/0897784685/qid=982170788/s... (amazon)

I) 8) Chugga-Chugga Choo-Choo
Usually ships in 24 hours
by Kevin Lewis, Daniel Kirk(Illustrator)(Hardcover - May 1999)
Amazon Price: $10.39...
http://www.amazon.com/exec/obidos/ASIN/0786804297/qid=982170788/s... (amazon)

FIG. 147F

I) 9) On Becoming Babywise: Learn how over 500,000 Babies Were Trained to Sleep through the Night the Natural Way
In Stock: 24 hours.
Gary Ezzo,Foreword by Robert Bucknam / Paperback / Multnomah Publishers, Inc. / May 1998
B&N Price: $10.79 ~ You Save 10%...
http://shop.barnesandnoble.com/booksearch/isbnInquiry.asp?userid=... (barnesandnoble)

I) 10) 3-Minute Abs: Achieving the Look You've Always Wanted in Only 3 Minutes a Day
In stock - ships in 24 hours
Brungardt, Kurt ~ Trade Paperback ~ 1998
Borders Price: $10.80 ~ You Save: $1.20 (10%)...
http://search.borders.com/fcgi-bin/db2www/search/search.d2w/Detai... (borders)

I) 11) Selling to Vito: The Very Important Top Officer
In Stock: 24 hours (Same Day).
Anthony Parinello,Foreword by Denis Waitley / Paperback / Adams Media Corporation / August 1999
B&N Price: $11.65 ~ You Save 10%...
http://shop.barnesandnoble.com/booksearch/isbnInquiry.asp?userid=... (barnesandnoble)

I) 12) ACLS: Quick Review Study Guide
In stock - ships in 24 hours
Aehlert, Barbara ~ Paperback ~ 1993
Borders Price: $13.95 ...
http://search.borders.com/fcgi-bin/db2www/search/search.d2w/Detai... (borders)

I) 13) Full Steam Ahead : The Race to Build a Transcontinental Railroad
Usually ships in 24 hours
by Rhoda Blumberg, Rhonda Blumberg(Hardcover - May 1996)
Amazon Price: $15.16...
http://www.amazon.com/exec/obidos/ASIN/0792227158/qid=982170788/s... (amazon)

I) 14) The Art of Raising a Puppy
In Stock: 24 hours.
The Monks of New Skete / Hardcover / Little, Brown & Company / March 1991
B&N Price: $19.16 ~ You Save 20%...
http://shop.barnesandnoble.com/booksearch/isbnInquiry.asp?userid=... (barnesandnoble)

I) 15) Abdominal Training
Ships within 2-3 days
Norris, Christopher ~ Trade Paperback ~ 1997
Borders Price: $19.95 ...
http://search.borders.com/fcgi-bin/db2www/search/search.d2w/Detai... (borders)

I) 16) Complete Service Manual for Lionel Trains
Usually ships in 1-2 weeks
by Maury D. Klein(Hardcover)
Amazon Price: $19.95...
http://www.amazon.com/exec/obidos/ASIN/0934580049/qid=982170788/s... (amazon)

I) 17) The New Encyclopedia of Modern Bodybuilding
In Stock: 24 hours (Same Day).
Arnold Schwarzenegger,Bill Dobbins / Paperback / Simon & Schuster Trade Paperbacks / October 1999
B&N Price: $20.00 ~ You Save 20%...
http://shop.barnesandnoble.com/booksearch/isbnInquiry.asp?userid=... (barnesandnoble)

I) 18) The Orphan Trains : The Story of Charles Loring Brace and the Children He Saved and Failed
Usually ships in 24 hours
by Stephen O'Connor(Hardcover)
Amazon Price: $20.80...
http://www.amazon.com/exec/obidos/ASIN/0395841739/qid=982170788/s... (amazon)

I) 19) Topgrading: How Leading Companies Win by Hiring, Coaching and Keeping the Best People
In-Stock: Ships 2-3 days.
Bradford D. Smart / Hardcover / Prentice Hall Press / January 1999
B&N Price: $20.80 ~ You Save 20%...
http://shop.barnesandnoble.com/booksearch/isbnInquiry.asp?userid=... (barnesandnoble)

I) 20) Agility Training: The Fun Sport for All Dogs
In stock - ships in 24 hours
Simmons-Moake, Jane ~ Trade Paperback ~ 1992
Borders Price: $23.36 ~ You Save: $2.59 (10%)...
http://search.borders.com/fcgi-bin/db2www/search/search.d2w/Detai... (borders)

I) 21) A-Train: Memoirs of a Tuskegee Airman
In stock - ships in 24 hours
Dryden, Charles W. ~ Hardcover ~ 1997
Borders Price: $23.96 ~ You Save: $5.99 (20%)...
http://search.borders.com/fcgi-bin/db2www/search/search.d2w/Detai... (borders)

I) 22) Lionel: America's Favorite Toy Trains
Usually ships in 24 hours
by Gerry Souter, Janet Souter(Hardcover - October 2000)
Amazon Price: $23.96...
http://www.amazon.com/exec/obidos/ASIN/0760305056/qid=982170788/s... (amazon)

I) 23) Aids to Postgraduate Medicine
In stock - ships in 24 hours
Burton, J. L. ~ Paperback ~ 1994
Borders Price: $24.00 ...
http://search.borders.com/fcgi-bin/db2www/search/search.d2w/Detai... (borders)

I) 24) Aircrew Unlimited: The Commonwealth Air Training Plan during WWII
In stock - ships in 24 hours
Golley, John ~ Hardcover ~ 1994
Borders Price: $26.36 ~ You Save: $6.59 (20%)...
http://search.borders.com/fcgi-bin/db2www/search/search.d2w/Detai... (borders)

FIG. 147G

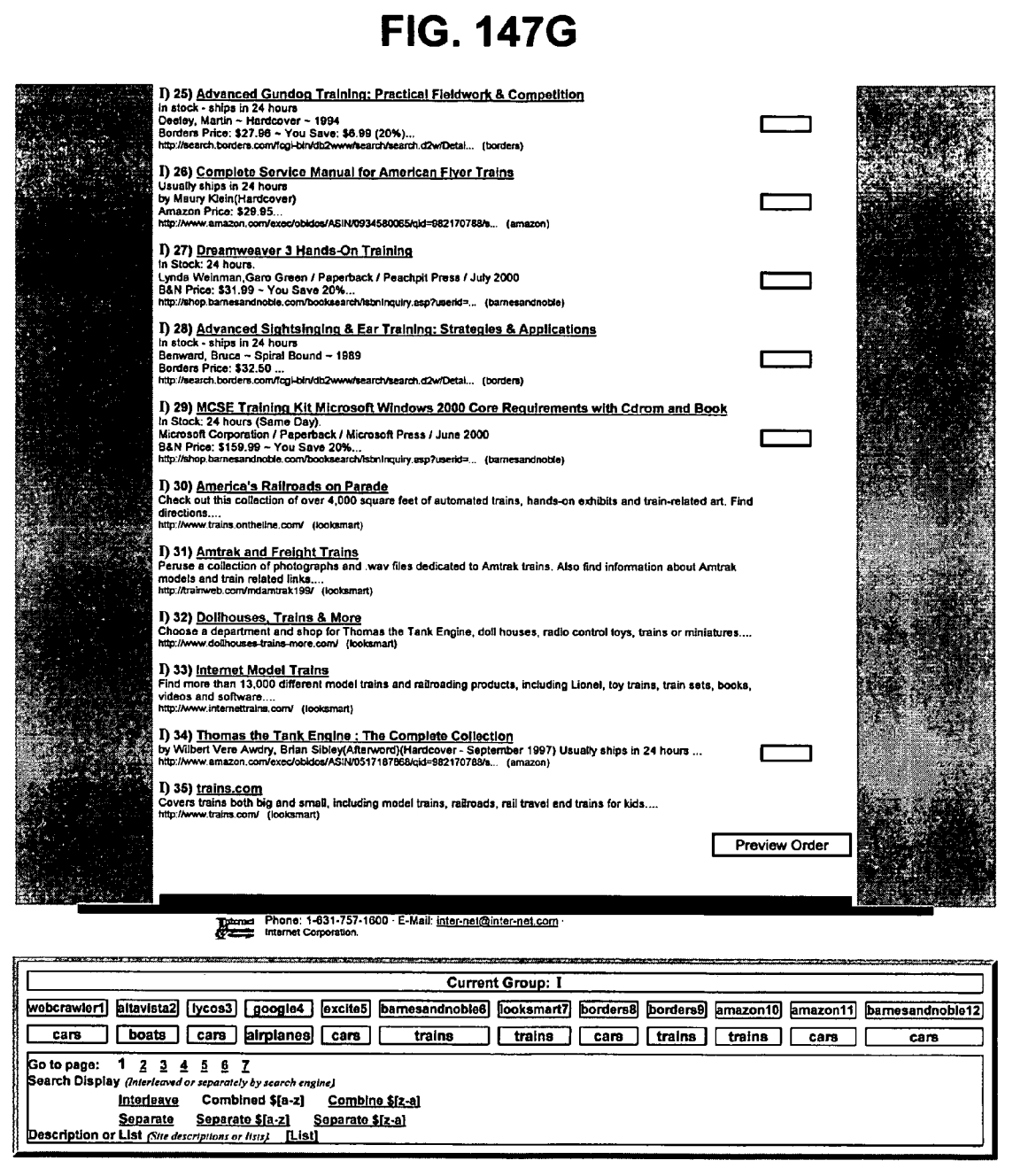

I) 25) Advanced Gundog Training: Practical Fieldwork & Competition
In stock - ships in 24 hours
Deeley, Martin ~ Hardcover ~ 1994
Borders Price: $27.96 ~ You Save: $6.99 (20%)...
http://search.borders.com/fcgi-bin/db2www/search/search.d2w/Detai... (borders)

I) 26) Complete Service Manual for American Flyer Trains
Usually ships in 24 hours
by Maury Klein(Hardcover)
Amazon Price: $29.95...
http://www.amazon.com/exec/obidos/ASIN/0934580065/qid=982170788/s... (amazon)

I) 27) Dreamweaver 3 Hands-On Training
In Stock: 24 hours.
Lynda Weinman,Garo Green / Paperback / Peachpit Press / July 2000
B&N Price: $31.99 ~ You Save 20%...
http://shop.barnesandnoble.com/booksearch/isbnInquiry.asp?userid=... (barnesandnoble)

I) 28) Advanced Sightsinging & Ear Training: Strategies & Applications
In stock - ships in 24 hours
Benward, Bruce ~ Spiral Bound ~ 1989
Borders Price: $32.50 ...
http://search.borders.com/fcgi-bin/db2www/search/search.d2w/Detai... (borders)

I) 29) MCSE Training Kit Microsoft Windows 2000 Core Requirements with Cdrom and Book
In Stock: 24 hours (Same Day).
Microsoft Corporation / Paperback / Microsoft Press / June 2000
B&N Price: $159.99 ~ You Save 20%...
http://shop.barnesandnoble.com/booksearch/isbnInquiry.asp?userid=... (barnesandnoble)

I) 30) America's Railroads on Parade
Check out this collection of over 4,000 square feet of automated trains, hands-on exhibits and train-related art. Find directions....
http://www.trains.ontheline.com/ (looksmart)

I) 31) Amtrak and Freight Trains
Peruse a collection of photographs and .wav files dedicated to Amtrak trains. Also find information about Amtrak models and train related links....
http://trainweb.com/mdamtrak199/ (looksmart)

I) 32) Dollhouses, Trains & More
Choose a department and shop for Thomas the Tank Engine, doll houses, radio control toys, trains or miniatures....
http://www.dollhouses-trains-more.com/ (looksmart)

I) 33) Internet Model Trains
Find more than 13,000 different model trains and railroading products, including Lionel, toy trains, train sets, books, videos and software....
http://www.internettrains.com/ (looksmart)

I) 34) Thomas the Tank Engine ; The Complete Collection
by Wilbert Vere Awdry, Brian Sibley(Afterword)(Hardcover - September 1997) Usually ships in 24 hours ...
http://www.amazon.com/exec/obidos/ASIN/0517187868/qid=982170788/s... (amazon)

I) 35) trains.com
Covers trains both big and small, including model trains, railroads, rail travel and trains for kids....
http://www.trains.com/ (looksmart)

Preview Order

Phone: 1-631-757-1600 · E-Mail: inter-net@inter-net.com ·
Internet Corporation.

Current Group: I

| webcrawler1 | altavista2 | lycos3 | google4 | excite5 | barnesandnoble6 | looksmart7 | borders8 | borders9 | amazon10 | amazon11 | barnesandnoble12 |
|---|---|---|---|---|---|---|---|---|---|---|---|
| cars | boats | cars | airplanes | cars | trains | trains | cars | trains | trains | cars | cars |

Go to page: 1 2 3 4 5 6 7
Search Display *(Interleaved or separately by search engine)*
Interleave Combined $[a-z] Combine $[z-a]
Separate Separate $[a-z] Separate $[z-a]
Description or List *(Site descriptions or lists)* [List]

METASEARCHING A PLURALITY OF QUERIES AND CONSOLIDATING RESULTS

CROSS-REFERENCES

This application is a continuation of U.S. patent application Ser. No. 09/791,264, filed Feb. 22, 2001, now U.S. Pat. No. 6,836,769, which is a continuation-in-part of U.S. patent application Ser. No. 09/510,749, filed Feb. 22, 2000, now U.S. Pat. No. 6,789,073.

The present application is related to copending U.S. patent application Ser. No. 10/934,627, filed Sep. 3, 2004, which is a continuation of U.S. patent application Ser. No. 09/510,749, filed Feb. 22, 2000, now U.S. Pat. No. 6,789,073. The present application is also related to copending U.S. patent application Ser. No. 10/451,128, filed Aug. 21, 2002, which is the National Stage Application of International Application No. PCT/US01/05926, filed Feb. 22, 2001, which is a continuation-in-part of U.S. patent application Ser. No. 09/510,749, filed Feb. 22, 2000, now U.S. Pat. No. 6,789,073. The present application is also related to Canadian Patent Application No. 2,400,926, filed Aug. 20, 2002, now Canadian Patent No. CA 2,400,926, which is the Canadian National Stage Application of International Application No. PCT/US01/05926, filed Feb. 22, 2001, which claims the benefit of priority to U.S. patent application Ser. No. 09/510,749, filed Feb. 22, 2000, now U.S. Pat. No. 6,789,073. The present application is also related to copending Australian Patent Application No. 2001241718, filed Sep. 19, 2002, which is the Australian National Stage Application of International Application No. PCT/US01/05926, filed Feb. 22, 2001, which claims the benefit of priority to U.S. patent application Ser. No. 09/510,749, filed Feb. 22, 2000, now U.S. Pat. No. 6,789,073. The present application is also related to copending European Patent Application No. EP20010912999, filed Sep. 16, 2002, which is the European Regional Stage Application of International Application No. PCT/US01/05926, filed Feb. 22, 2001, which claims the benefit of priority to U.S. patent application Ser. No. 09/510,749, filed Feb. 22, 2000, now U.S. Pat. No. 6,789,073. The above referenced documents are not admitted to be prior art with respect to the present invention by their mention herein.

BACKGROUND OF THE INVENTION

1. Field of the Invention

The present invention relates generally to clients and servers and more particularly to client-server multitasking.

2. Background Art

Clients, servers, and client-server systems have been known. However, there is a need for client-server multitasking. A client-server multitasking system and process are needed, which are capable of information and/or service retrieval from the same and/or different ones of servers substantially simultaneously and on-the-fly, using the same and/or different ones of queries, and sorting, grouping, and/or organizing responses therefrom substantially on-the-fly.

A requestor and/or user should be capable of making substantially multiple simultaneous same and/or different requests of the same and/or different servers. The client server-multitasking system and process should be capable of organizing responses from the servers into service and/or information responses, and communicating the service and/or information responses to the requestors and/or users substantially simultaneously, and on-the-fly.

The requestors and/or users should be capable of making substantially simultaneous service and/or information requests of the same and/or different ones of servers and/or clients, using the same and/or different queries, and/or the same and/or different instructions. The client-server multitasking system and process should be capable of retrieving substantially multiple simultaneous services and/or information having the same and/or different criteria from the same and/or different servers, sorting, grouping, and/or organizing the responses from the servers and/or the clients into information and/or services responses, and communicating the service and/or information responses to the requestors and/or the users substantially simultaneously. The same and/or different ones of uniform resource locators, target resources, and/or paths may be used.

The requestors and/or the users should be capable of making multiple simultaneous searches. The searches should be capable of having at least one or a plurality of same or different queries of the same and/or different servers and/or clients. The responses from the servers and/or the clients should be capable of being organized into the service and/or information response in a variety of formats. It should be possible to sort the responses within the service and/or information response, such as, for example, by category, query, group, page, order of importance, ascending and/or descending order, alphabetically and/or numerically, or other characteristics, as determined by the requestor, and/or the user, and/or the client-server multitasking system, or to combine the responses within the service and/or information response, such as, for example, interleaving the responses one with the other, such as, for example, by order of relevance or other parameters. The responses should be capable of being grouped by search criteria, server, order of importance, or by numerical factors such as value, price, or other numerical quantifier. The responses should be presentable, for example, in ascending or descending order in the interleaved format, such as top ones, twos, threes, and so on, or presentable separately to the requestor and/or the user. The order may be order of importance or relevance related, or, for example, numerically valued, such as price or stock market value.

The client-server multitasking system and process should be capable of information and/or service retrieval from the same and/or different ones of the servers substantially simultaneously and on-the-fly, using the same and/or different ones of the queries, and sorting, grouping, and/or organizing responses therefrom substantially on-the-fly.

The client-server multitasking system and process should be capable of substantially multiple simultaneous searching, using the same and/or different ones of queries of the same and/or different ones of the clients and/or servers, which may be search engines, and/or sites, and/or servers, and/or locations on the network, and additionally and/or alternatively building a client-server multitasking search engine and/or database. The client-server multitasking search engine and/or database should be capable of storing the information and/or services retrieved from the search engines, and/or sites, and/or servers, and/or locations being queried on the network, and building the client-server search engine and/or database. The client-server multitasking search engine should also be capable of being queried either directly and/or in combination with the substantially simultaneous searching, using the same and/or different queries of the same and/or different search engines, sites, servers, and/or databases. The client-server multitasking search engine and/or database should also be capable of updating information and/or services stored therein by querying sites, servers, search engines, and/or databases containing information and/or services referenced in the client-server multitasking search engine and/or database.

The client-server multitasking system and process should also be capable of use on a variety of networks, such as global area networks, and in particular, the internet, metropolitan area networks, wide area networks, and local area networks.

The client-server multitasking system and process should be capable of substantially simultaneous searching of the same and/or different ones of search engines and/or sites on the network substantially on-the-fly, with the same and/or different ones of the queries, and sorting, grouping, and/or organizing responses therefrom substantially on-the-fly.

The client-server multitasking system and process should also be capable of sorting, grouping, and/or organizing results from the servers, search engines, and/or sites, in accordance with instructions from the requestors, and/or the users, and/or instructions resident within the client-server multitasking system and/or process. The client-server multitasking system and process should also be capable of drilling down and/or up to different levels within the search engines, sites, and/or servers being queried.

The client-server multitasking system and process should be capable of providing manual and/or timed updates. Such timed updates should allow for motion related presentation to the requestor and/or the user.

The client-server multitasking system and process should be capable of incorporating information and/or services into a variety of user interfaces at different locations in the user interfaces, grouping, and/or organizing the information and/or services, and optionally eliminating duplicate information and/or services.

The client-server multitasking system and process should be capable of incorporating links, graphics, video, text, and audio, and/or combinations thereof, and selective advertising, according to selectable search, query, sorting, and/or grouping criteria, and/or combinations thereof into the information and/or services to be delivered to the user interfaces. The user should also be capable of placing orders, such as purchases, and/or other types of orders, payments, confirmations thereof, and/or combinations thereof, either directly and/or through servers and/or sites on the network.

The client-server multitasking system should be capable of use in a variety of applications, and be capable of information comparison and/or trend analysis of information from the same and/or different sources substantially simultaneously. The client-server multitasking system should be capable of, for example, determining best query results, with respect to a plurality of search engine results; purchasing and/or price comparisons, viewing and/or reviewing prices/values and trends for different sites, determining lowest costs and lowest cost analyses for wholesale and retail purposes; product availability, e.g., airline tickets, pricing, and ticket availability, from different airlines to the same and/or different locations; purchasing of commodities and/or stocks form the same and/or different sites with updates every few seconds and/or minutes; obtaining prices and/or values in different stock markets substantially simultaneously; and searching for jobs on the same and/or different job sites, using the same and/or different job criteria, for example, on a daily basis, the job sites having changing job availability; and/or a combination thereof, all substantially simultaneously. The client-server multitasking system should be capable of presenting information and/or services for review and/or updating from the same and/or different ones of sites, servers, and/or applications substantially simultaneously, and trend analysis thereof, using a variety of sorting, grouping and/or organizing criteria, according to the needs of the requestor, and/or the user, and/or resident within the client-server multitasking system.

A client server-multitasking system and process are needed, which are capable of service and/or information retrieval from at least one server, organization, communication, and presentation of such services and/or information to at least one requestor, and/or the user, and/or optional storage, and/or retrieval of such services and/or information from the optional storage. The client-server multitasking system and process should be capable of building a client-server multitasking system search engine and/or database from responses returned from the servers, search engines, and/or sites being queried and/or searched, and/or having requests made thereof. The client-server multitasking system search engine and/or database having stored information and/or services therein should also be searchable, be capable of full text searches thereof, and be searchable by the servers and/or the clients on the network, either separately and/or in combination with the substantially simultaneous multiple same and/or different searches and/or queries of the same and/or different servers on the network. Information in the client-server multitasking system search engine and/or database should also be searchable and/or retrievable, and should be capable of being incorporated into the service and/or information responses delivered to the user interfaces, according to search criteria, selectively and/or automatically, by the requestor, and/or the user. The client-server multitasking system search engine and/or database should also be capable of spidering, and/or roboting, and/or querying sites, services and/or information to be stored therein and/or stored in the client-server multitasking system search engine and/or database, and updating the services and/or information to be stored and/or stored in the client-server multitasking system search engine and/or database.

The client-server multitasking system and process should be capable of retrieving, parsing, processing, formatting, organizing, grouping, sorting, and consolidating services and/or information from the same and/or different ones of the servers and/or clients having the same and/or different structures, formats, organizations, groupings, and/or data structures, and incorporating the parsed, processed, formatted, organized, grouped, sorted, and consolidated services and/or information into user responses for delivery to and use by the requestors and/or users.

The client-server multitasking system and process should be capable of performing as a multiple query search engine, which performs multiple queries of multiple sites, and performing as a single point of sale for purchasing multiple products from multiple sources.

For the foregoing reasons, there is a need for a client-server multitasking system and process capable of information and/or service retrieval from the same and/or different ones of servers substantially simultaneously and on-the-fly, using the same and/or different ones of queries of the same and/or different ones of the servers, and sorting, grouping, and/or organizing responses therefrom substantially on-the-fly, and communicating service and/or information responses to the requestors and/or users substantially simultaneously and on-the-fly. The client-server multitasking system and process should be capable of use on a variety of networks, such as global area networks, and in particular, the internet, metropolitan area networks, wide area networks, and local area networks, and be capable of searching search engines and/or other sites substantially simultaneously and on-the-fly. The client-server multitasking system and process should be capable of sorting, grouping, and/or organizing results from the servers, search engines, and/or sites, in accordance with instructions from the requestors, and/or the users, and/or instructions resident within the client-server multitasking system and/or process. The client-server multitasking system should also be capable of use in a variety of applications, and be capable of information comparison and/or trend analysis of information from the same and/or different sources substantially simultaneously. The client-server multitasking system and process should also be capable of building a client-server multitasking system search engine and/or database from responses returned from the servers, search engines, and/or sites being queried and/or searched, and/or having requests made thereof, be capable of being searched and/or queried, querying sites referenced in the client-server multitasking system search engine and/or database, and updating information and/or services stored therein. The client-server multitasking system and process should be capable of retrieving, parsing, processing, formatting, organizing, grouping, sorting, and consolidating services and/or information from the same and/or different ones of the servers and/or clients having the same and/or different structures, formats, organizations, groupings, and/or data structures, and incorporating the parsed, processed, formatted, organized, grouped, sorted, and consolidated services and/or information into user responses for delivery to and use by the requestors and/or users.

SUMMARY

The present invention is directed to a client-server multitasking system and process capable of information and/or service retrieval from the same and/or different ones of servers substantially simultaneously and on-the-fly, using the same and/or different ones of queries of the same and/or different ones of the servers, and sorting, grouping, and/or organizing responses therefrom substantially on-the-fly, and communicating service and/or information responses to the requestors and/or users substantially simultaneously and on-the-fly. The client-server multitasking system and process are capable of use on a variety of networks, such as global area networks, and in particular, the internet, metropolitan area networks, wide area networks, and local area networks, and are capable of searching search engines and/or other sites substantially simultaneously and on-the-fly.

The client-server multitasking system and process are capable of retrieving substantially multiple simultaneous services and/or information having the same and/or different criteria from the same and/or different servers, sorting, grouping, and/or organizing the responses from the servers and/or the clients into information and/or services responses, and communicating the service and/or information responses to the requestors and/or the users substantially simultaneously. The requestors and/or the users may make substantially simultaneous service and/or information requests of servers and clients, using the same and/or different queries, and/or the same and/or different instructions. The same and/or different uniform resource locators, target resources, and/or paths may be used.

The client-server multitasking system and process are capable of making multiple substantially simultaneous same and/or different requests of the same and/or different servers, organizing responses from the servers into service and/or information responses, and communicating the service and/or information responses to the requestors and/or the users substantially simultaneously.

The client-server multitasking system and process are also capable of sorting, grouping, and/or organizing results therefrom the servers, search engines, and/or sites, in accordance with instructions from the requestors and/or the users, and/or instructions resident within the client-server multitasking system and/or process. The client-server multitasking system is capable of use in a variety of applications, and is capable of information comparison and/or trend analysis of information from the same and/or different sources substantially simultaneously. The client-server multitasking system and process are also capable of building a client-server multitasking system search engine and/or database from responses returned from the servers, search engines, and/or sites being queried and/or searched, and/or having requests made thereof, are capable of being searched and/or queried, querying sites referenced in the client-server multitasking system search engine and/or database, and updating information and/or services stored therein.

The client-server multitasking system and process are capable of information and/or service retrieval from the same and/or different ones of servers substantially simultaneously and on-the-fly, using the same and/or different ones of queries, and sorting, grouping, and/or organizing responses therefrom substantially on-the-fly.

A requestor and/or user is capable of making substantially multiple simultaneous same and/or different requests of the same and/or different servers. The client server-multitasking system and process are capable of organizing responses from the servers into service and/or information responses, and communicating the service and/or information responses to the requestors and/or the users substantially simultaneously, and on-the-fly.

The requestors and/or users are capable of making substantially simultaneous service and/or information requests of the same and/or different ones of servers and/or clients, using the same and/or different queries, and/or the same and/or different instructions. The client-server multitasking system and process are capable of retrieving substantially multiple simultaneous services and/or information having the same and/or different criteria from the same and/or different servers, sorting, grouping, and/or organizing the responses from the servers and/or the clients into information and/or services responses, and communicating the service and/or information responses to the requestors and/or the users substantially simultaneously. The same and/or different ones of uniform resource locators, target resources, and/or paths may be used.

The requestors and/or users are capable of making multiple simultaneous searches. The searches may have at least one or a plurality of same or different queries of the same and/or different servers and/or clients. The responses from the servers and/or the clients may be of being organized into the service and/or information response in a variety of formats, The responses may be sorted within the service and/or information response, such as, for example, by category, query, group, page, order of importance, ascending and/or descending order, alphabetically and/or numerically, or other characteristics, as determined by the requestor, and/or the user, and/or the client-server multitasking system, and/or the responses may be combined within the service and/or information response, such as, for example, interleaving the responses one with the other, such as, for example, by order of relevance or other parameters. The responses may also be capable of being grouped by search criteria, server, order of importance, or by numerical factors such as value, price, or other numerical quantifier. The responses may be presentable, for example, in ascending or descending order in interleaved format, such as top ones, twos, threes, and so on, or presentable separately to the requestor and/or the user. The order may be order of importance or relevance related, or, for example, numerically valued, such as price or stock market value.

The client-server multitasking system and process are capable of information and/or service retrieval from the same and/or different ones of the servers substantially simultaneously and on-the-fly, using the same and/or different ones of the queries, and sorting, grouping, and/or organizing responses therefrom substantially on-the-fly.

The client-server multitasking system and process are capable of substantially multiple simultaneous searching, using the same and/or different ones of queries of the same and/or different ones of the clients and/or servers, which may be search engines, and/or sites, and/or servers, and/or locations on the network, and additionally and/or alternatively building a client-server multitasking search engine and/or database. The client-server multitasking search engine and/or database are capable of storing the information and/or services retrieved from the search engines, and/or sites, and/or servers, and/or locations being queried on the network, and building the client-server search engine and/or database. The client-server multitasking search engine is also capable of being queried either directly and/or in combination with the substantially simultaneous searching, using the same and/or different queries of the same and/or different search engines, sites, servers, and/or databases. The client-server multitasking search engine and/or database are also capable of updating information and/or services stored therein by querying sites, servers, search engines, and/or databases containing information and/or services referenced in the client-server multitasking search engine and/or database.

The client-server multitasking system and process are also capable of use on a variety of networks, such as global area networks, and in particular, the internet, metropolitan area networks, wide area networks, and local area networks.

The client-server multitasking system and process are capable of substantially simultaneous searching of the same and/or different ones of search engines and/or sites on the network substantially on-the-fly, with the same and/or different ones of the queries, and sorting, grouping, and/or organizing responses therefrom substantially on-the-fly.

The client-server multitasking system and process are also capable of sorting, grouping, and/or organizing results from the servers, search engines, and/or sites, in accordance with instructions from the requestors, and/or instructions resident within the client-server multitasking system and/or process. The client server multitasking system and process are also capable of drilling down and/or up to different levels within the search engines, sites, and/or servers being queried.

The client-server multitasking system and process are capable of providing manual and/or timed updates. Such timed updates allow for motion related presentation to the requestor and/or the user.

The client-server multitasking system and process are capable of incorporating information and/or services into a variety of user interfaces at different locations in the user interfaces, grouping, and/or organizing the information and/or services, and optionally eliminating duplicate information and/or services.

The client-server multitasking system and process are capable of incorporating links, graphics, video, text, and audio, and/or combinations thereof, and selective advertising, according to selectable search, query, sorting, and/or grouping criteria, and/or combinations thereof into the information and/or services to be delivered to the user interfaces. The requestor and/or the user may place orders, such as purchases, and/or other types of orders, payments, confirmations thereof, and/or combinations thereof, either directly and/or through servers and/or sites on the network.

The client-server multitasking system is capable of use in a variety of applications, and is capable of information comparison and/or trend analysis of information from the same and/or different sources substantially simultaneously. The client-server multitasking system is capable of, for example, determining best query results, with respect to a plurality of search engine results; purchasing and/or price comparisons, viewing and/or reviewing prices/values and trends for different sites, determining lowest costs and lowest cost analyses for wholesale and retail purposes; product availability, e.g., airline tickets, pricing, and ticket availability, from different airlines to the same and/or different locations; purchasing of commodities and/or stocks form the same and/or different sites with updates every few seconds and/or minutes; obtaining prices and/or values in different stock markets substantially simultaneously; and searching for jobs on the same and/or different job sites, using the same and/or different job criteria, for example, on a daily basis, the job sites having changing job availability; and/or a combination thereof, all substantially simultaneously. The client-server multitasking system is capable of presenting information and/or services for review and/or updating from the same and/or different ones of sites, servers, and/or applications substantially simultaneously, and trend analysis thereof, using a variety of sorting, grouping and/or organizing criteria, according to the needs of the requestor, and/or the user, and/or resident within the client-server multitasking system.

The client server-multitasking system and process are capable of service and/or information retrieval from at least one server, organization, communication, and presentation of such services and/or information to at least one requestor and/or user, and/or optional storage, and/or retrieval of such service and/or information from the optional storage. The client-server multitasking system and process are capable of building a client-server multitasking system search engine and/or database from responses returned from the servers, search engines, and/or sites being queried and/or searched, and/or having requests made thereof. The client-server multitasking system search engine and/or database having stored information and/or services therein are also searchable, are capable of full text searches thereof, and are searchable by the servers and/or the clients on the network, either separately and/or in combination with the substantially simultaneous multiple same and/or different searches and/or queries of the same and/or different servers on the network. Information in the client-server multitasking system search engine and/or database are also searchable and/or retrievable, and are capable of being incorporated into the service and/or information responses delivered to the user interface, according to search criteria, selectively and/or automatically, by the requestor and/or the user. The client-server multitasking system search engine and/or database are capable of spidering, and/or roboting, and/or querying sites, services and/or information to be stored therein and/or stored in the client-server multitasking system search engine and/or database, and updating the services and/or information to be stored and/or stored in the client-server multitasking system search engine and/or database.

The client-server multitasking system and process are capable of retrieving, parsing, processing, formatting, organizing, grouping, sorting, and consolidating services and/or information from the same and/or different ones of the servers and/or clients having the same and/or different structures, formats, organization, groupings, and/or data structures, and incorporating the parsed, processed, formatted, organized, grouped, sorted, and consolidated services and/or information into user responses for delivery to and use by the requestors and/or users.

The client-server multitasking system and process, then, are capable of information and/or service retrieval from the same and/or different ones of servers substantially simultaneously and on-the-fly, using the same and/or different ones of queries of the same and/or different ones of the servers, and sorting, grouping, and/or organizing responses therefrom substantially on-the-fly, and communicating service and/or information responses to the requestors and/or users substantially simultaneously and on-the-fly. The client-server multitasking system and process are capable of use on a variety of networks, such as global area networks, and in particular, the internet, metropolitan area networks, wide area networks, and local area networks, and are capable of searching search engines and/or other sites substantially simultaneously and on-the-fly. The client-server multitasking system and process are capable of sorting, grouping, and/or organizing results from the servers, search engines, and/or sites, in accordance with instructions from the requestors, and/or users, and/or instructions resident within the client-server multitasking system and/or process. The client-server multitasking system is capable of use in a variety of applications, and is capable of information comparison and/or trend analysis of information from the same and/or different sources substantially simultaneously. The client-server multitasking system and process are capable of building a client-server multitasking system search engine and/or database from responses returned from the servers, search engines, and/or sites being queried and/or searched, and/or having requests made thereof, is capable of being searched and/or queried, querying sites referenced in the client-server multitasking system search engine and/or database, and updating information and/or services stored therein. The client-server multitasking system and process are capable of retrieving, parsing, processing, formatting, organizing, grouping, sorting, and consolidating services and/or information from the same and/or different ones of the servers and/or clients having the same and/or different structures, formats, organizations, groupings, and/or data structures, and incorporating the parsed, processed, formatted, organized, grouped, sorted, and consolidated services and/or information into user responses for delivery to and use by the requestors and/or users.

The client-server multitasking system and process are also capable of performing as a multiple query search engine, which performs multiple queries of multiple sites, and performing as a single point of sale for purchasing multiple products from multiple sources.

A multitasking process having features of the present invention comprises: parsing, processing and/or formatting a service and/or information request into a current request group; opening connections with and making at least one request of at least one server; parsing, processing, formatting, grouping, and/or organizing at least one response from the at least one server into at least one addressable response information group; formulating information from the current request group into a request pointer/address group having at least one pointer/address; formulating at least one addressable query pointer/address group having at least one other pointer/address; incorporating information and/or services from the at least one addressable response information group into at least one addressable query information group; and incorporating the at least one addressable query information group into a service and/or information response.

A client-server multitasking system having features of the present invention comprises: means for parsing, processing, and/or formatting a service and/or information request into a current request group; means for opening connections with and making at least one request of at least one server; means for parsing, processing, formatting, grouping, and/or organizing at least one response from the at least one server into at least one addressable response information group; means for formulating information from the current request group into a request pointer/address group having at least one pointer/address; means for formulating at least one addressable query pointer/address group having at least one other pointer/address; means for incorporating information and/or services from the at least one addressable response information group into at least one addressable query information group; and means for incorporating the at least one addressable query information group into a service and/or information response.

DRAWINGS

These and other features, aspects, and advantages of the present invention will become better understood with regard to the following description, appended claims, and accompanying drawings where:

Figure 1:
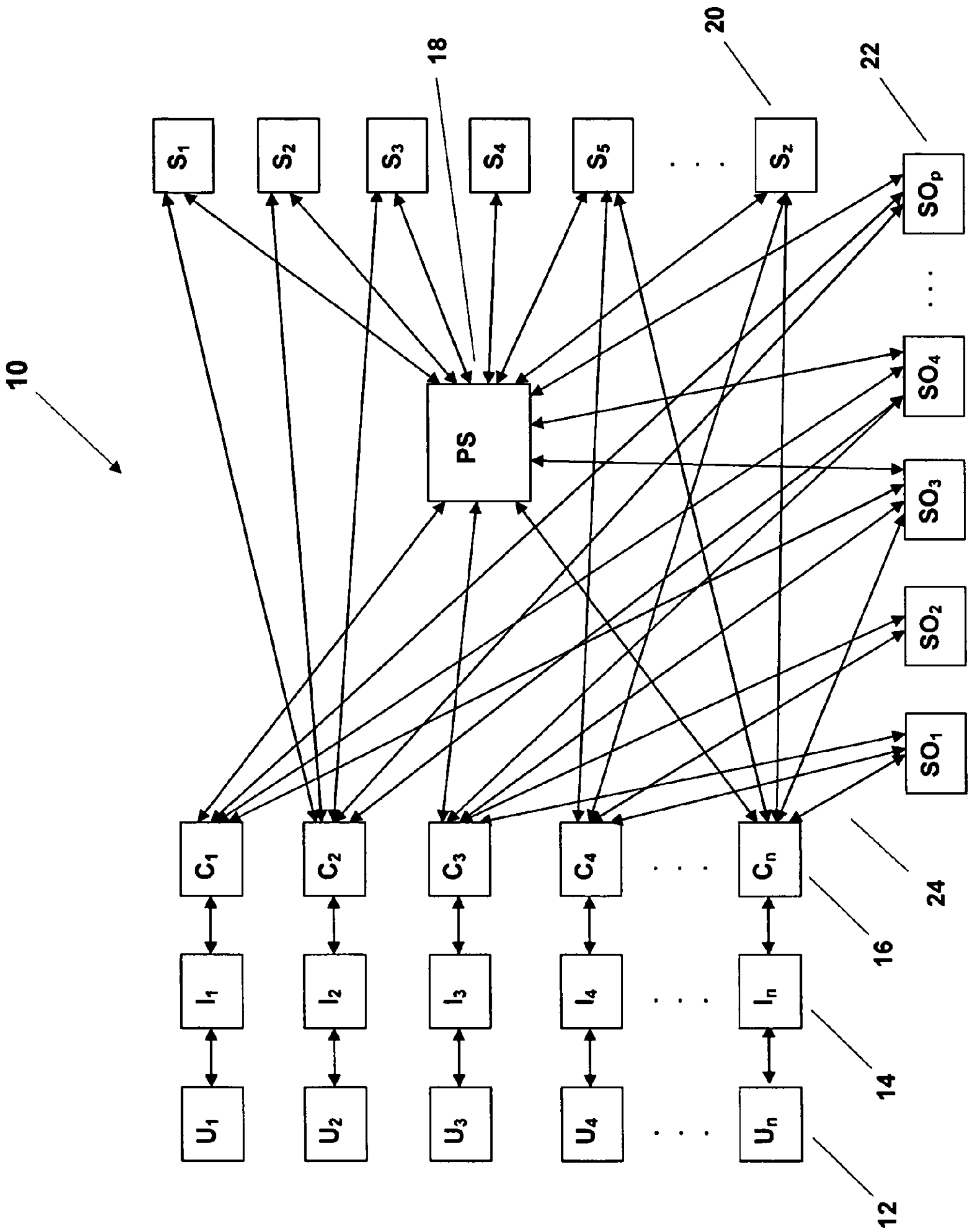
FIG. 1 is a schematic representation of a client-server multitasking system, constructed in accordance with the present invention.
Figure 27A:
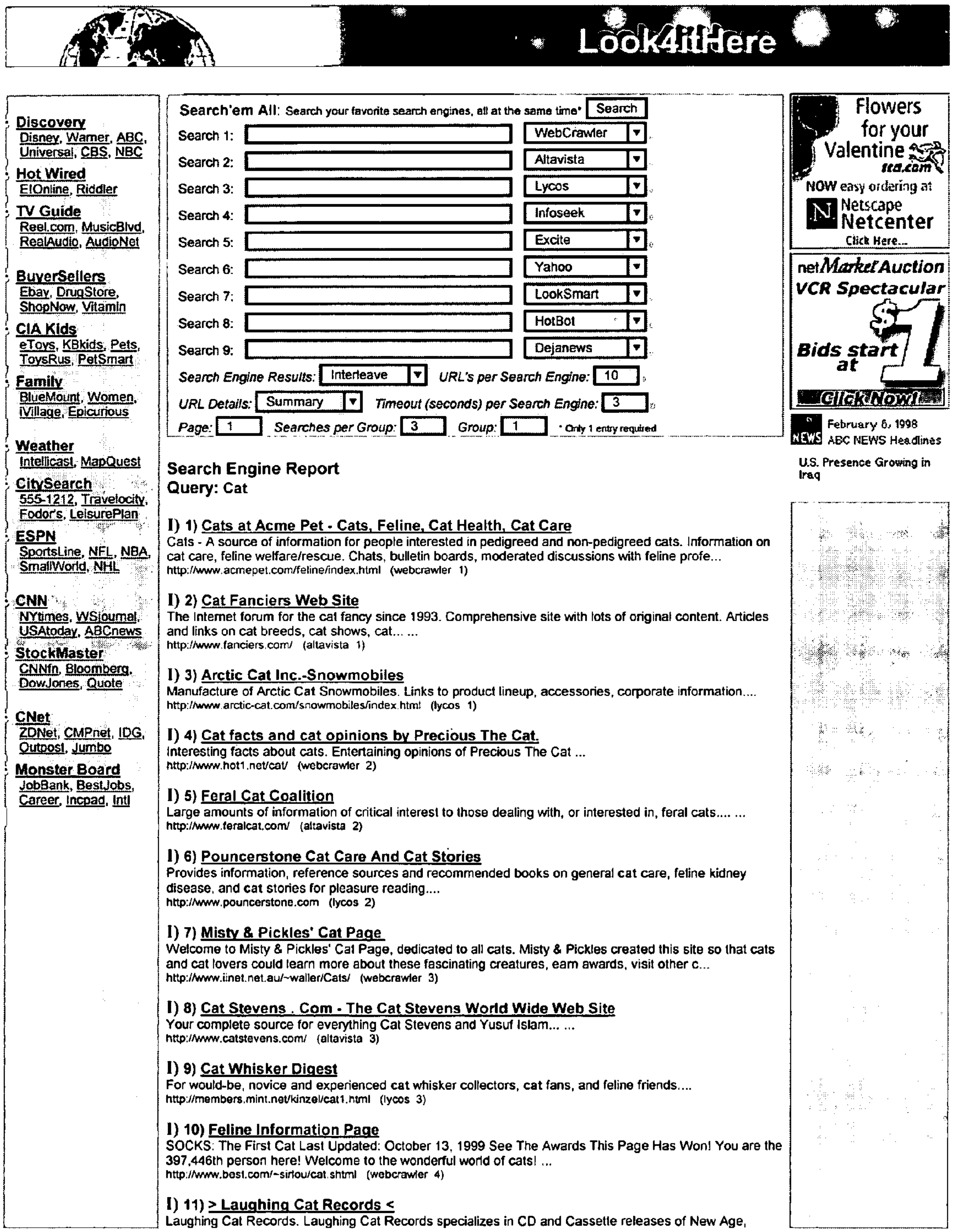
Figure 27C:
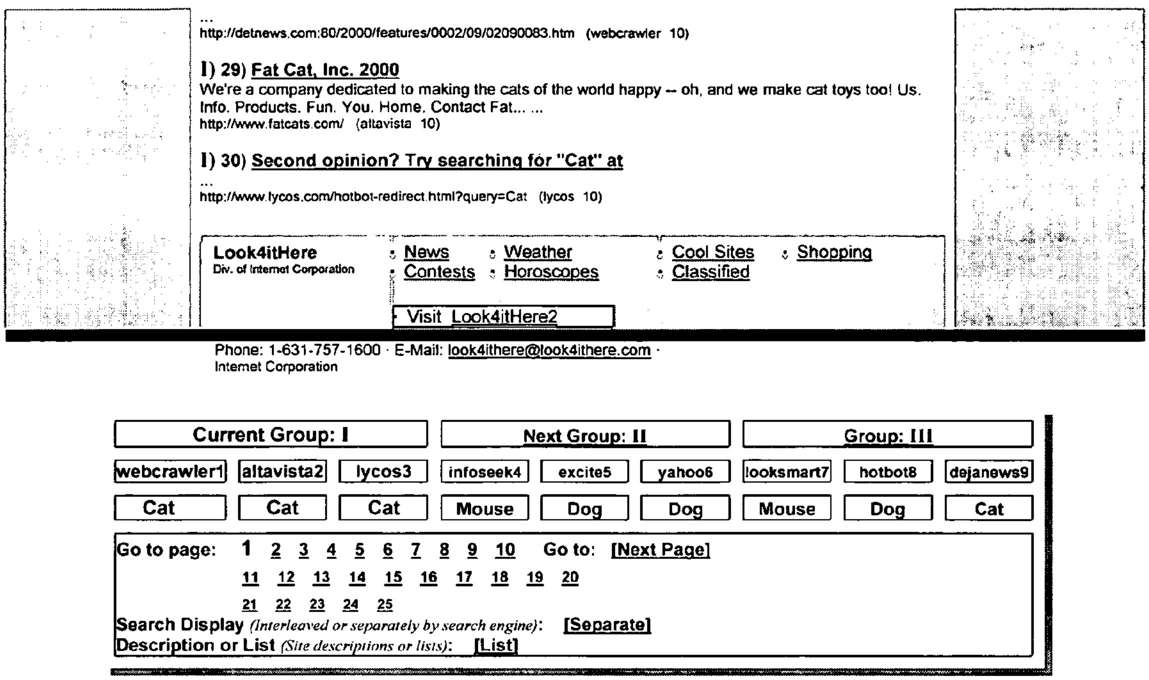
Figure 28A:
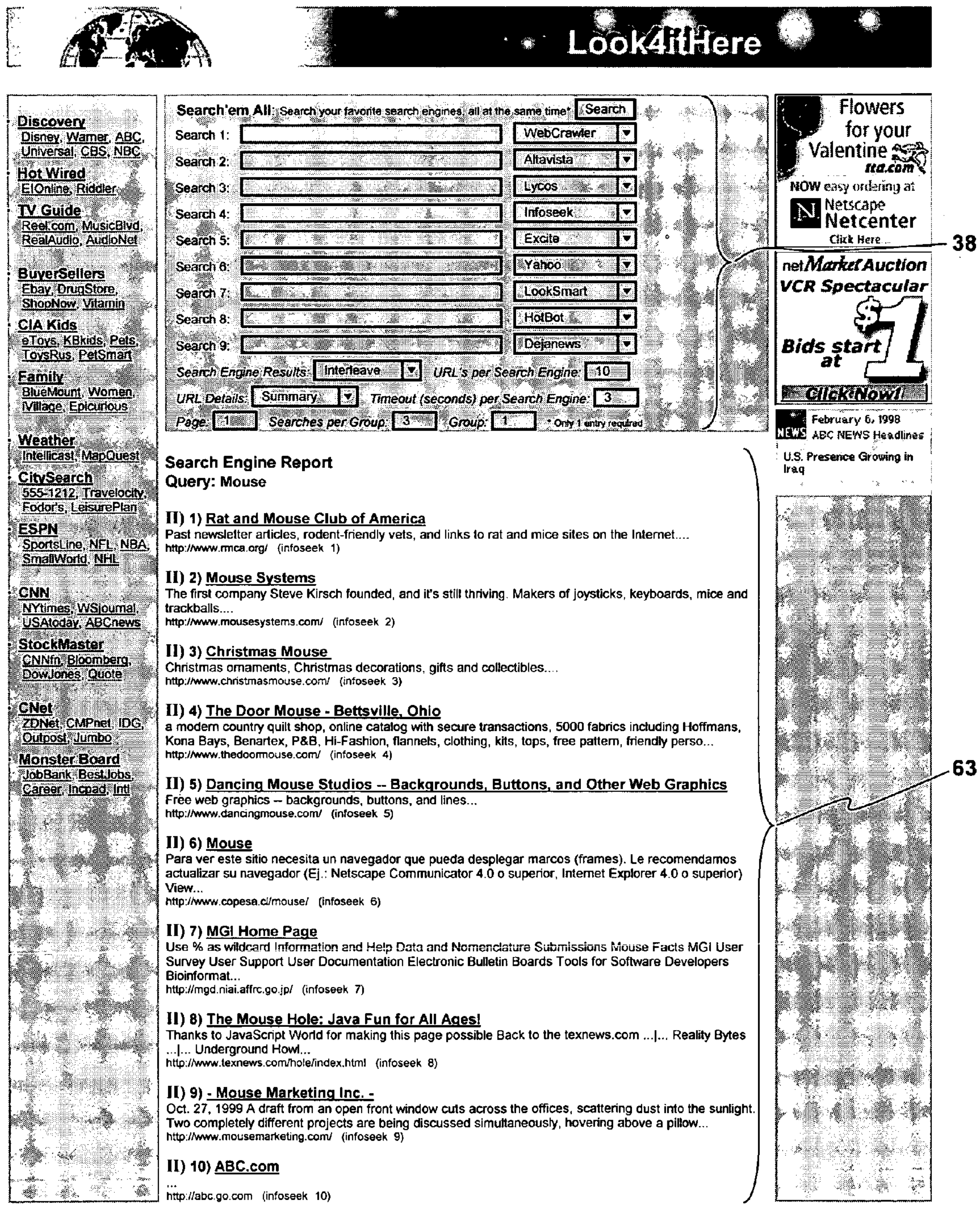
Figure 28C:
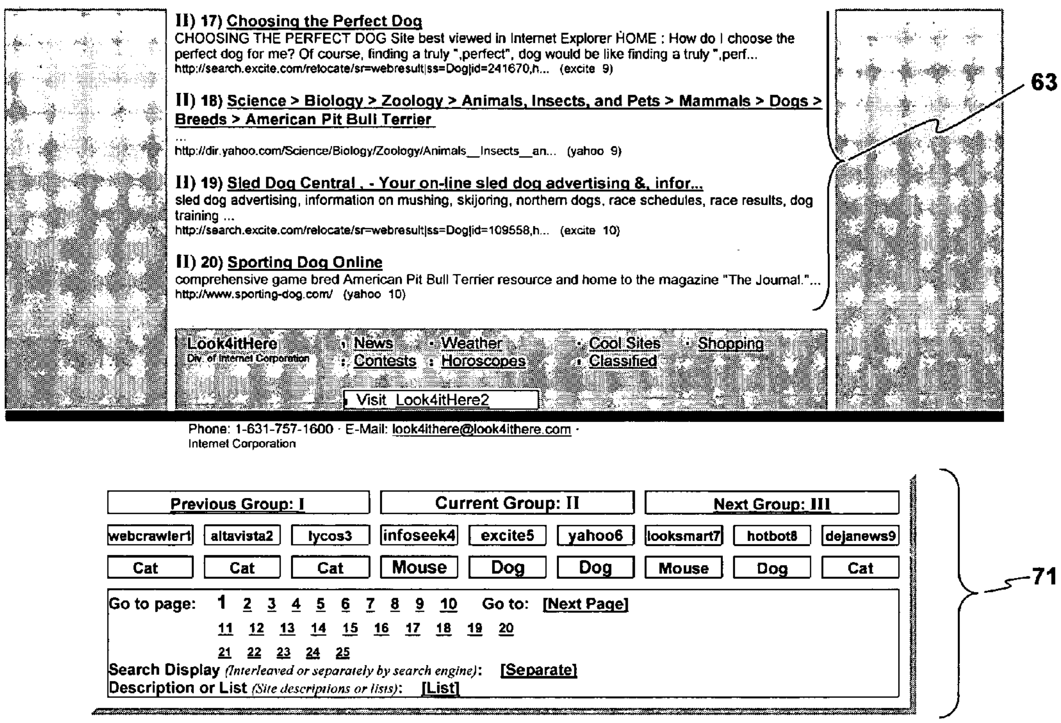
Figure 29A:
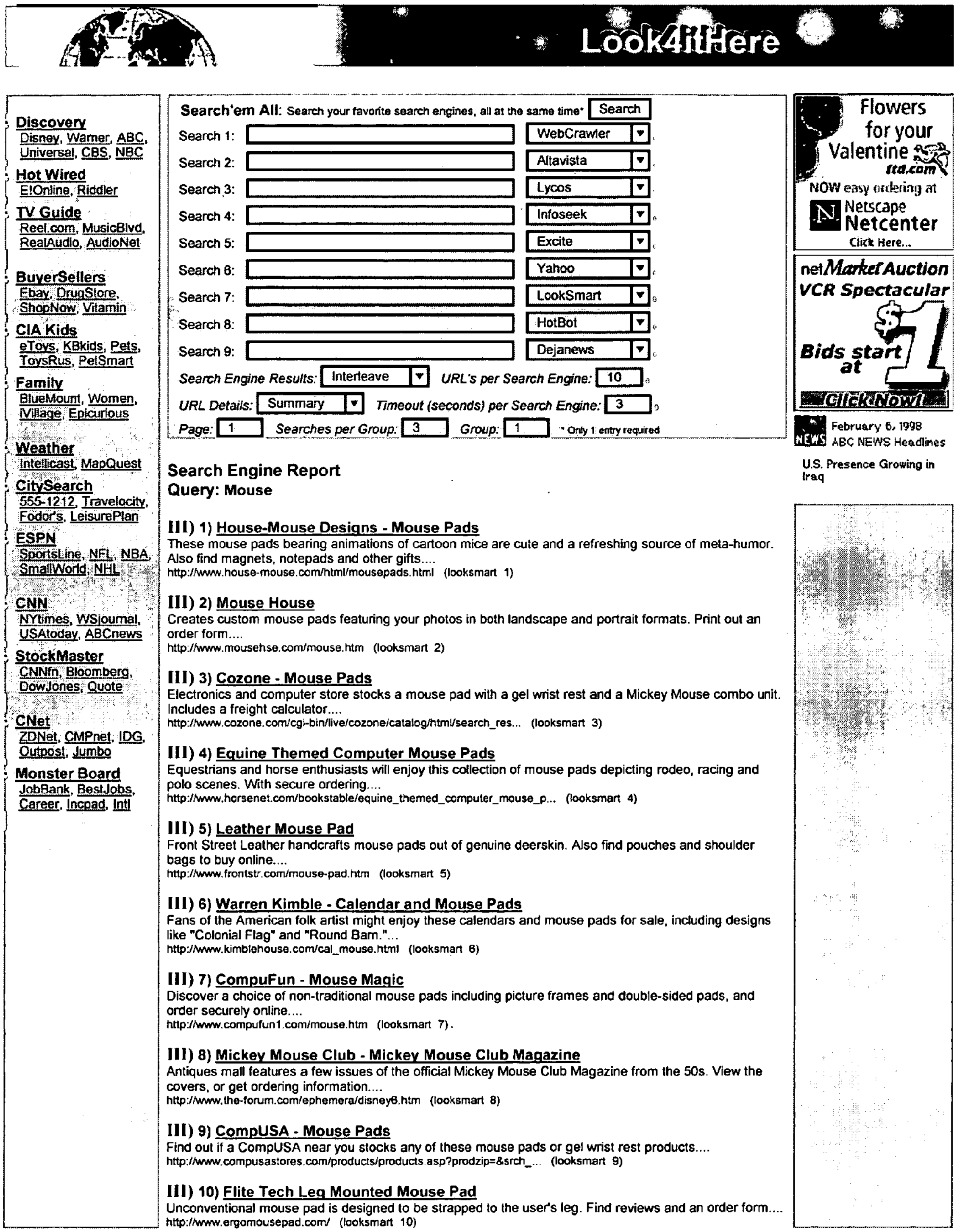
Figure 29C:
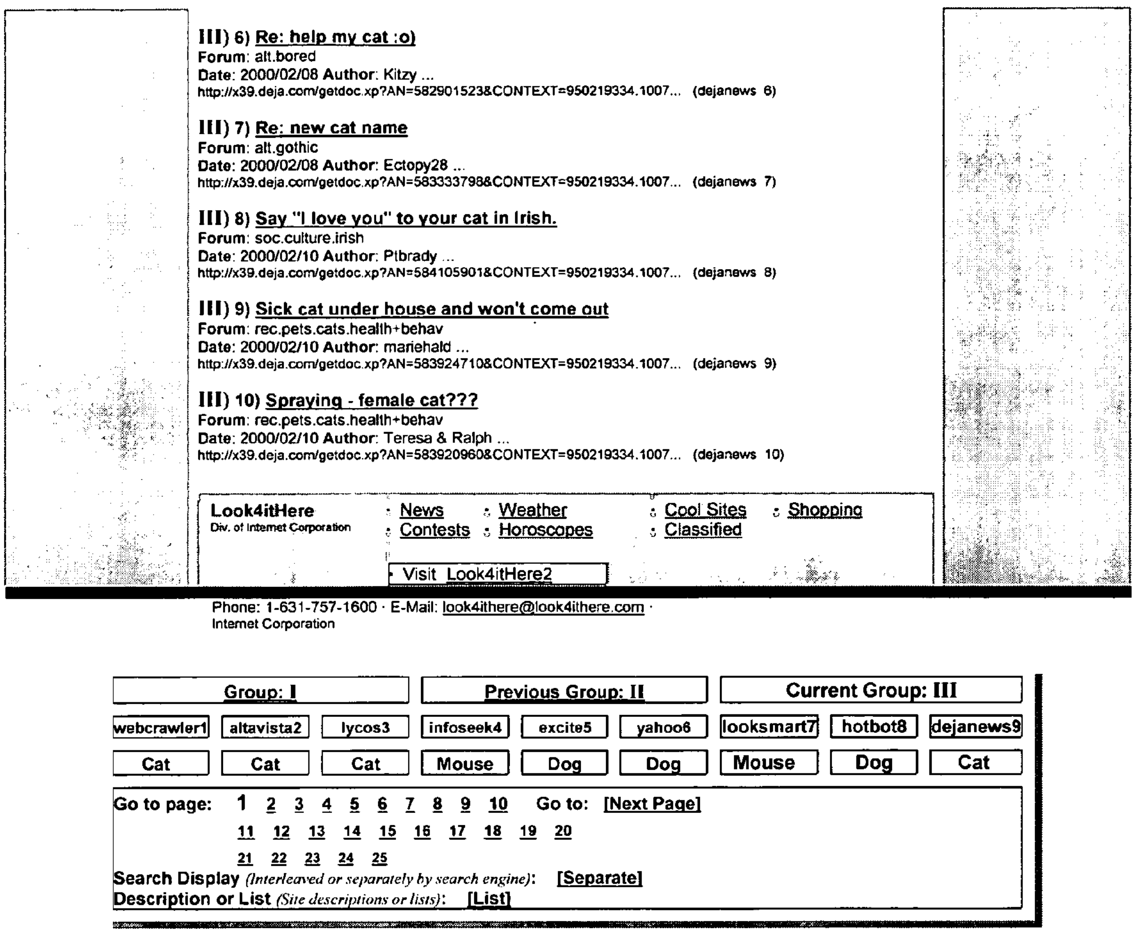
Figure 30A:
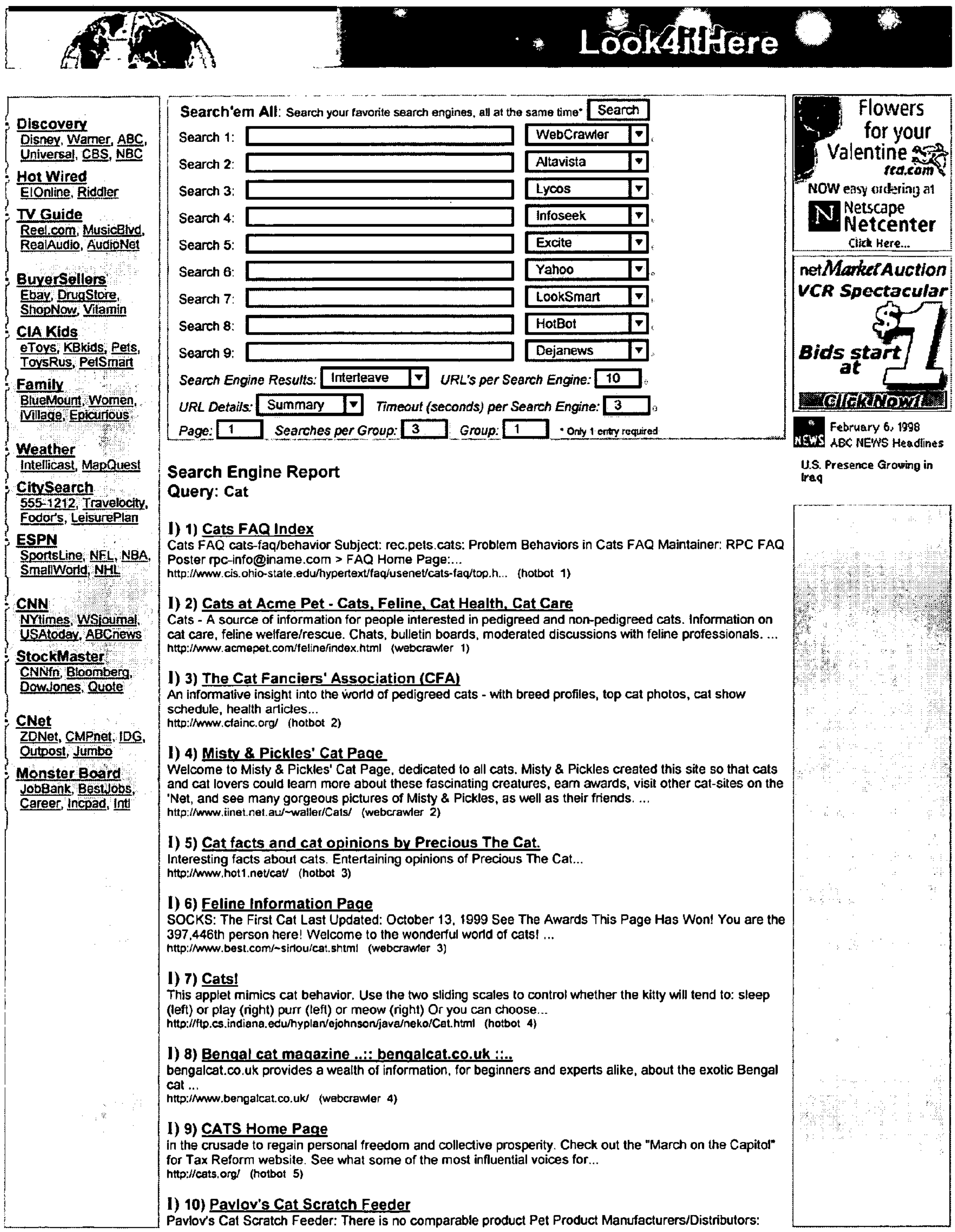
Figure 31A:
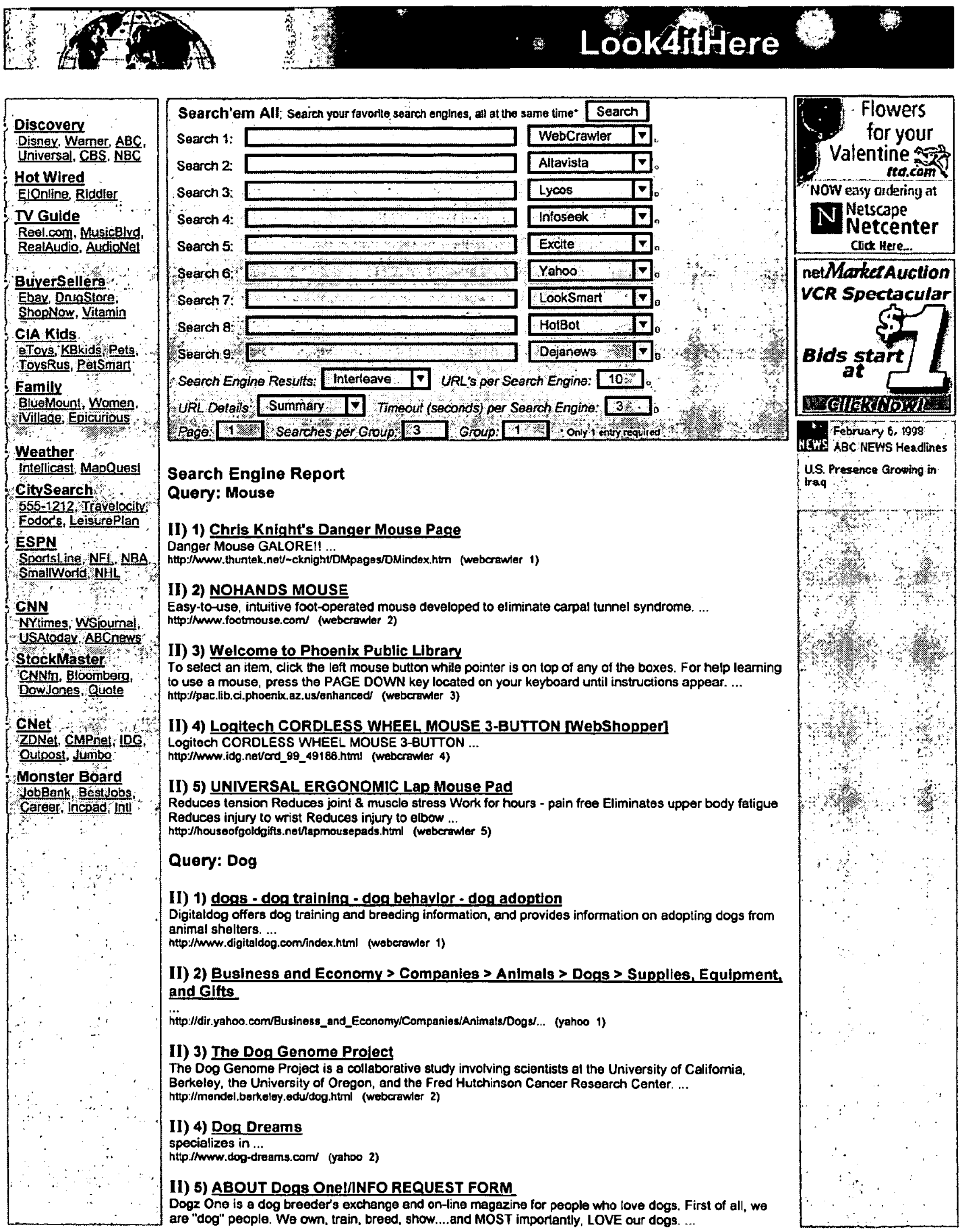
Figure 32A:
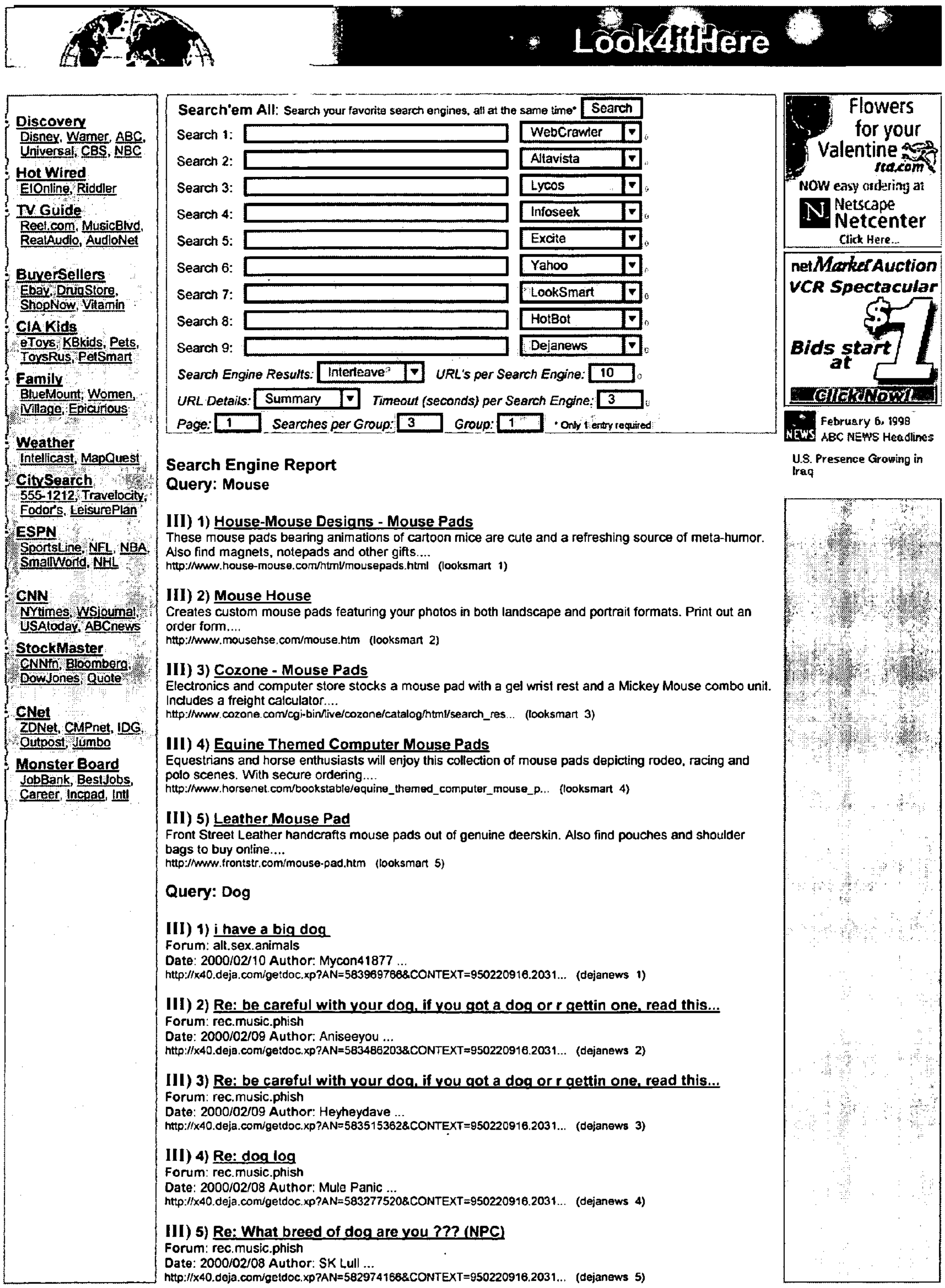
Figure 32B:
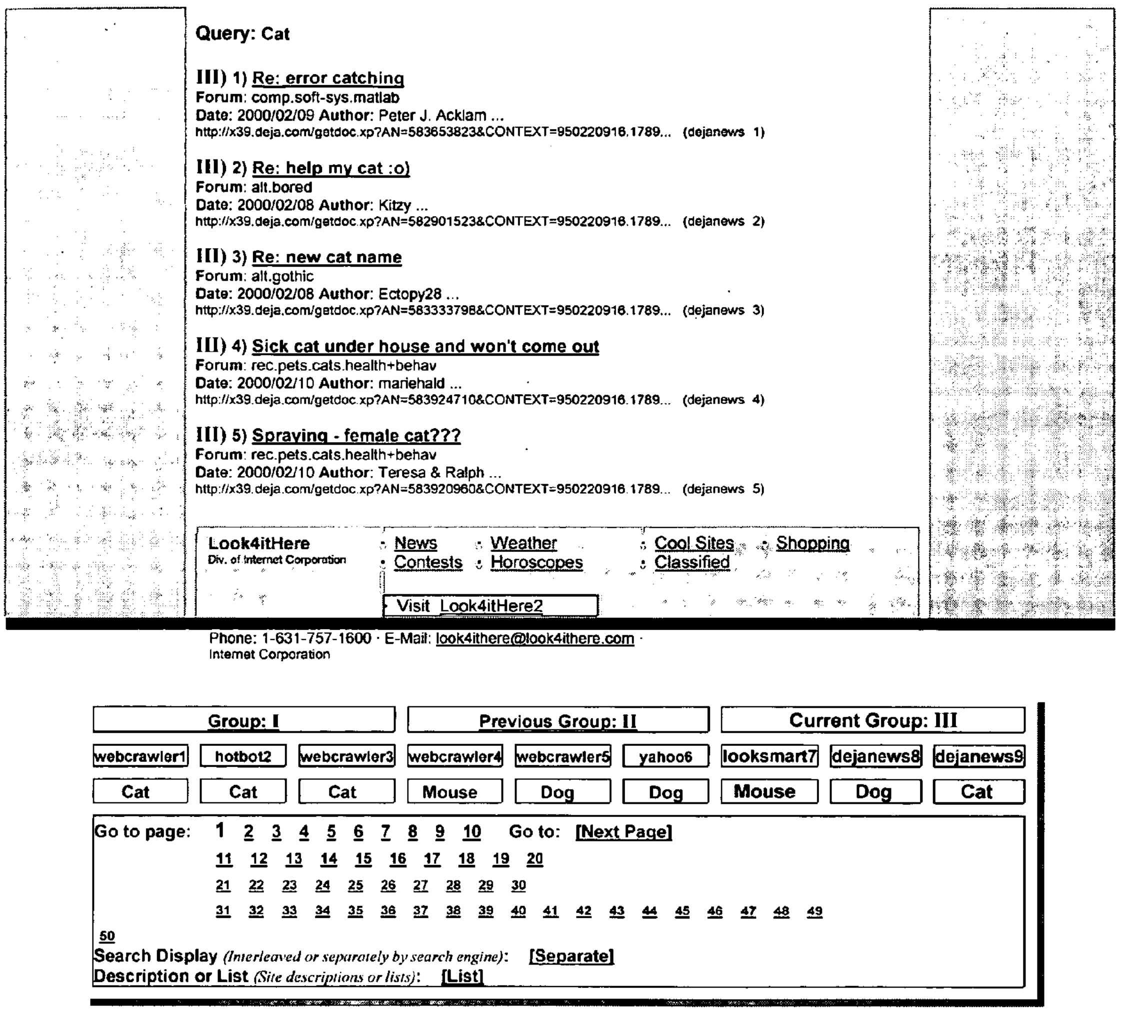
Figure 33C:
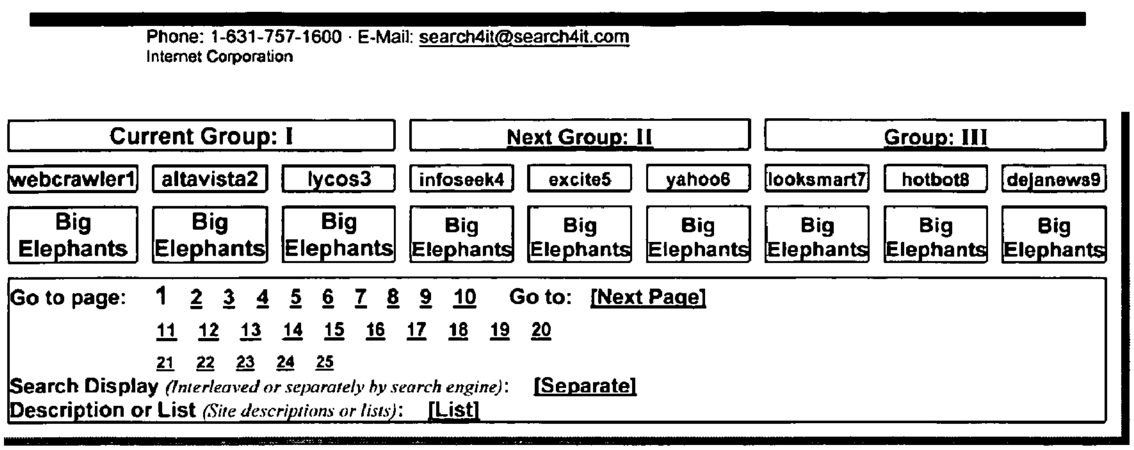
Figure 36A:
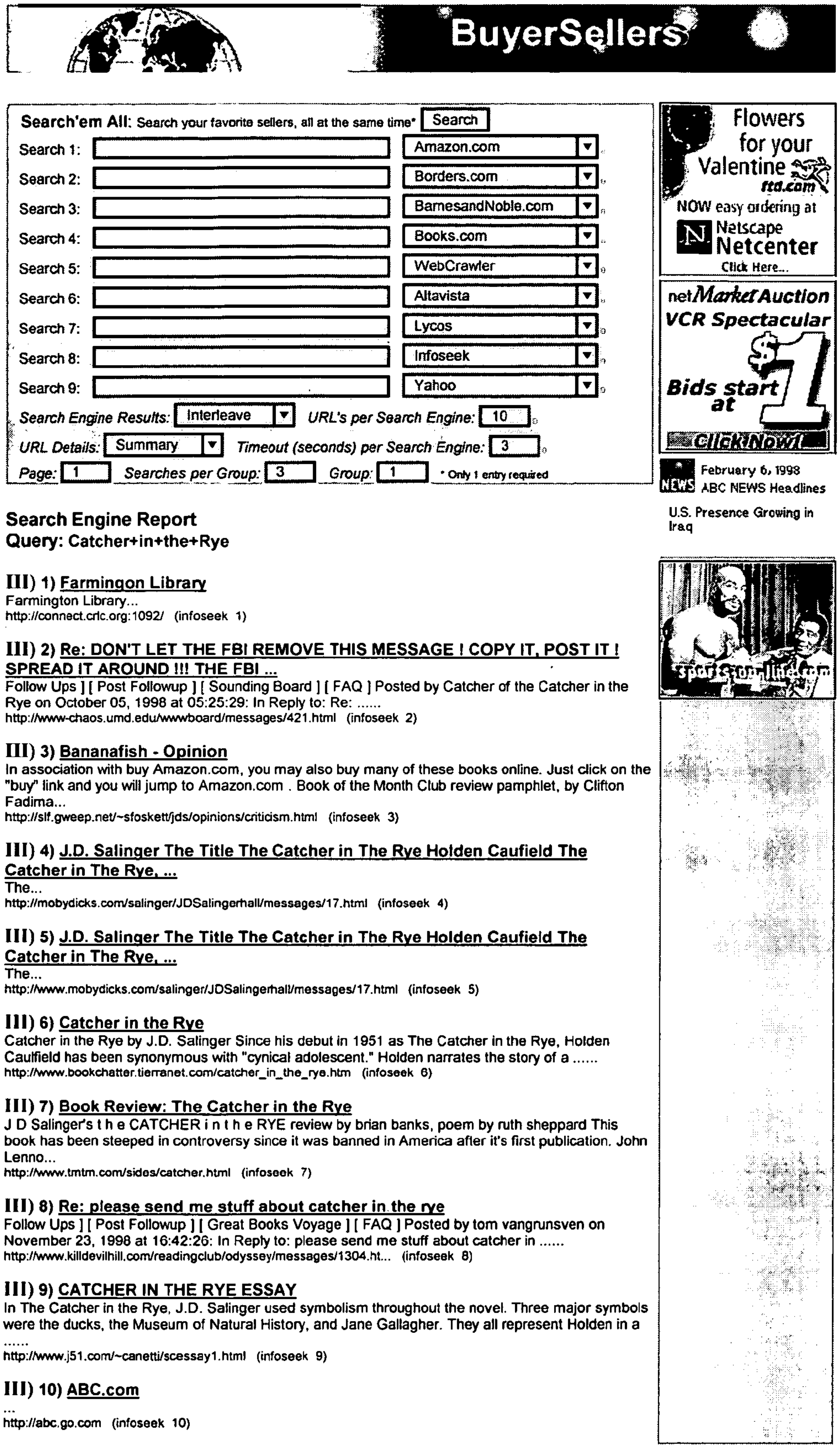
Figure 37D:
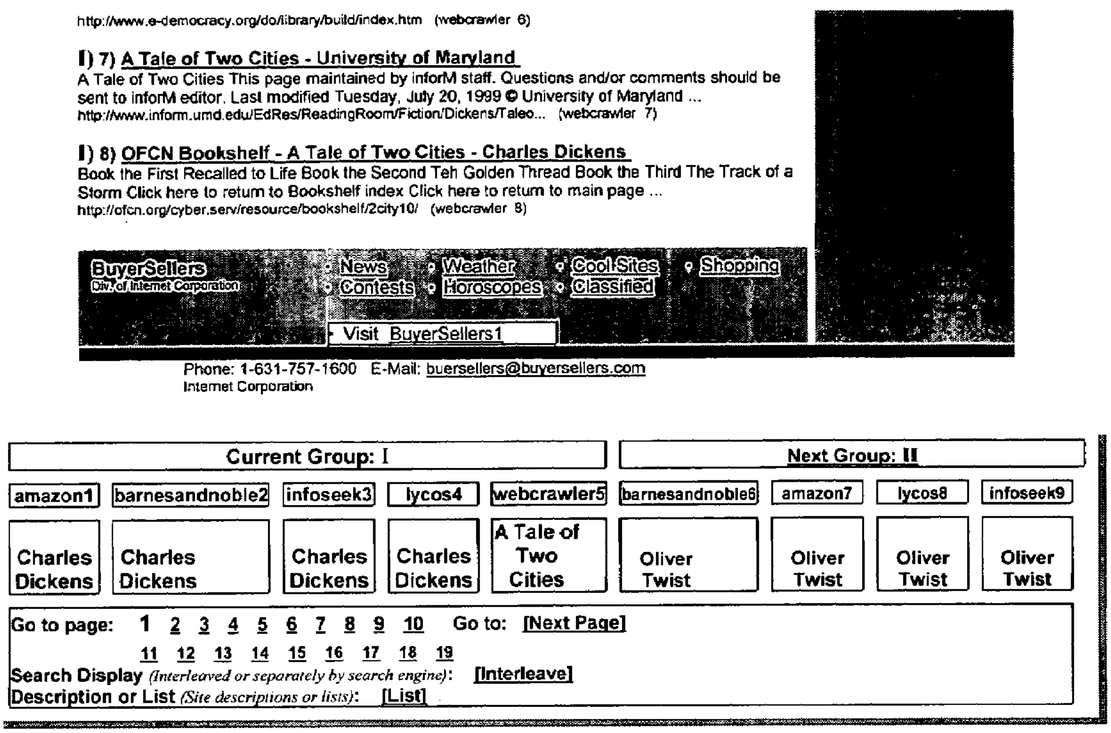
Figure 38D:
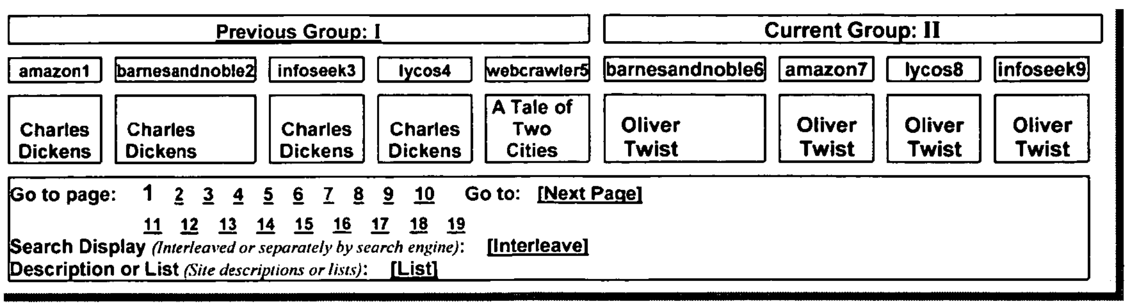
Figure 40M:
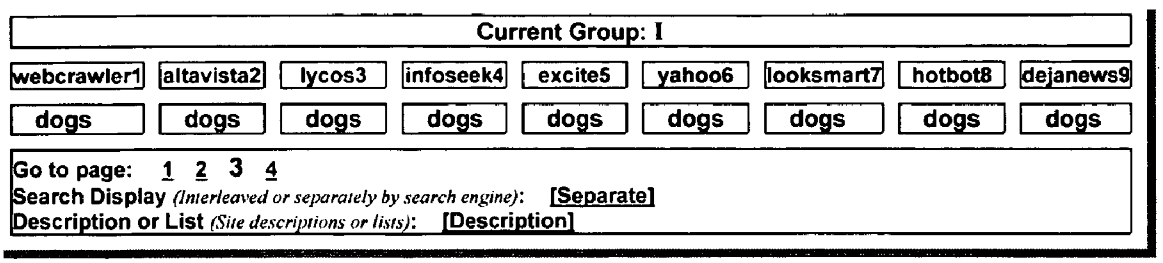
Figure 41F:
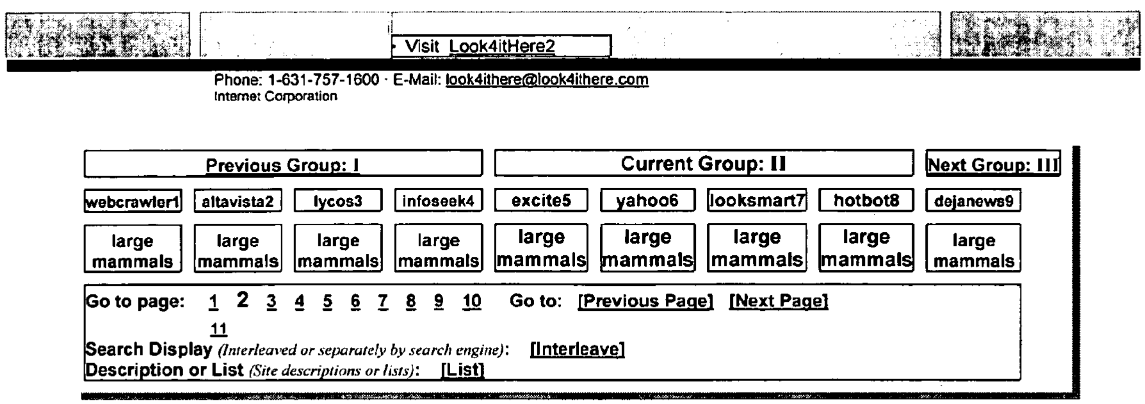
Figure 44C:
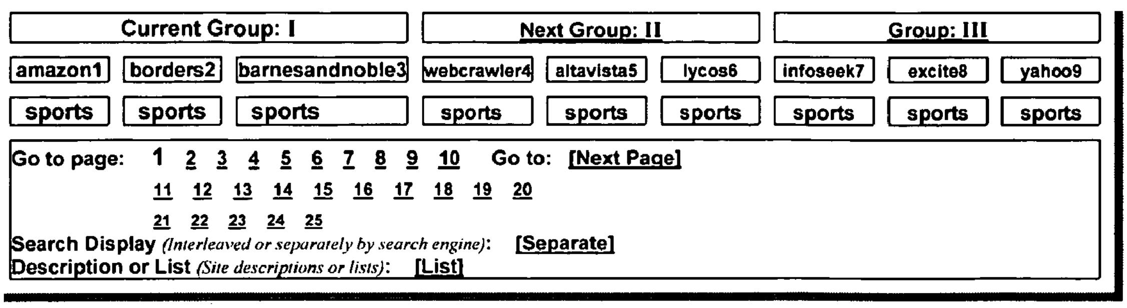
Figure 45A:
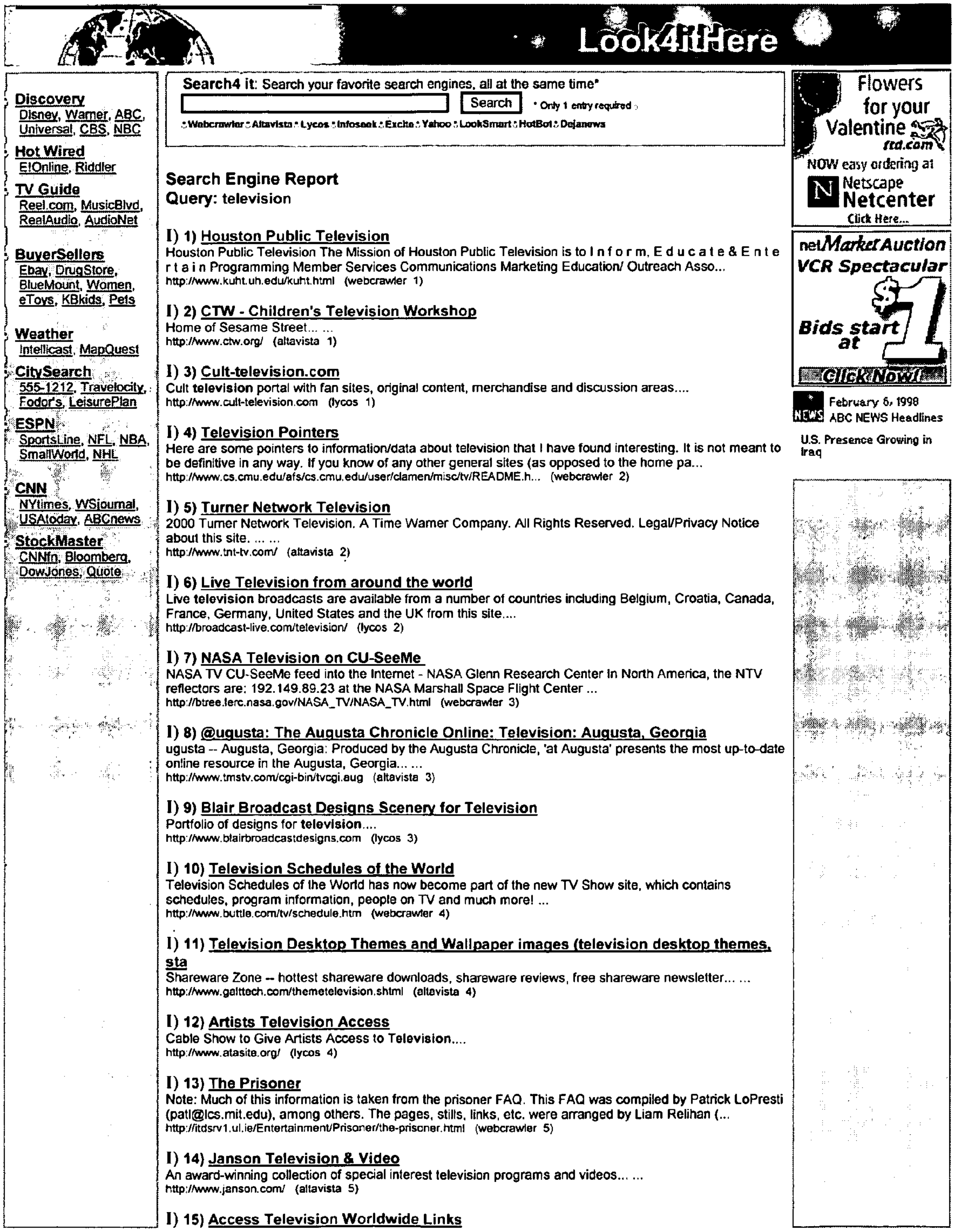
Figure 45C:
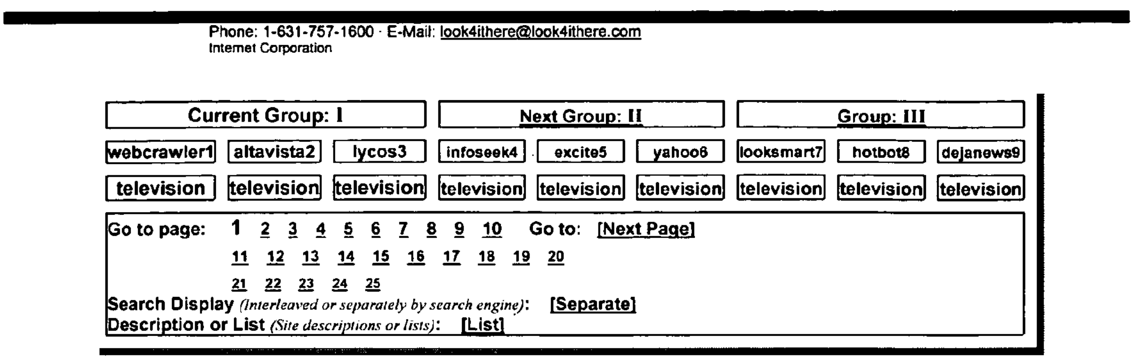
Figure 46A:
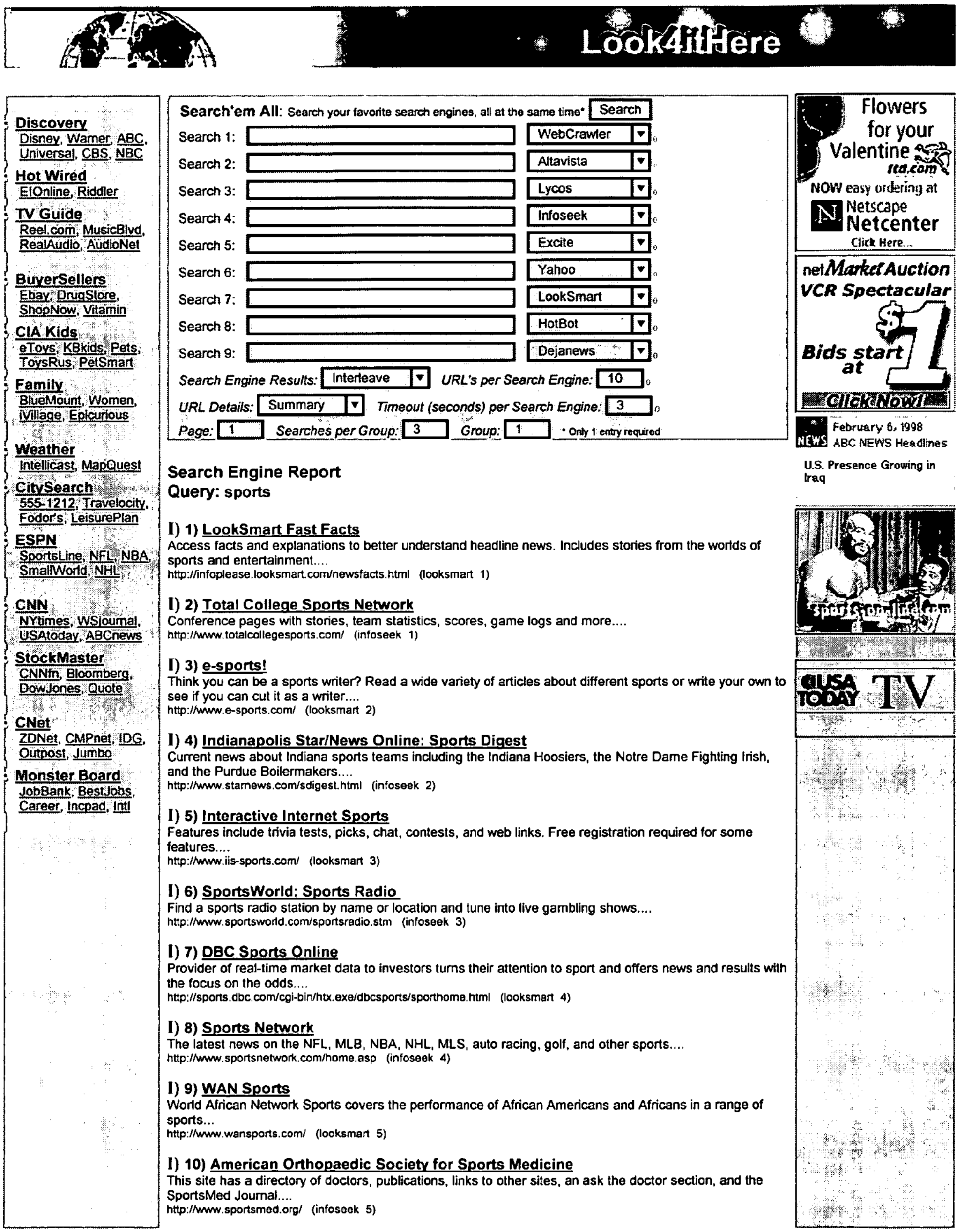
Figure 47A:
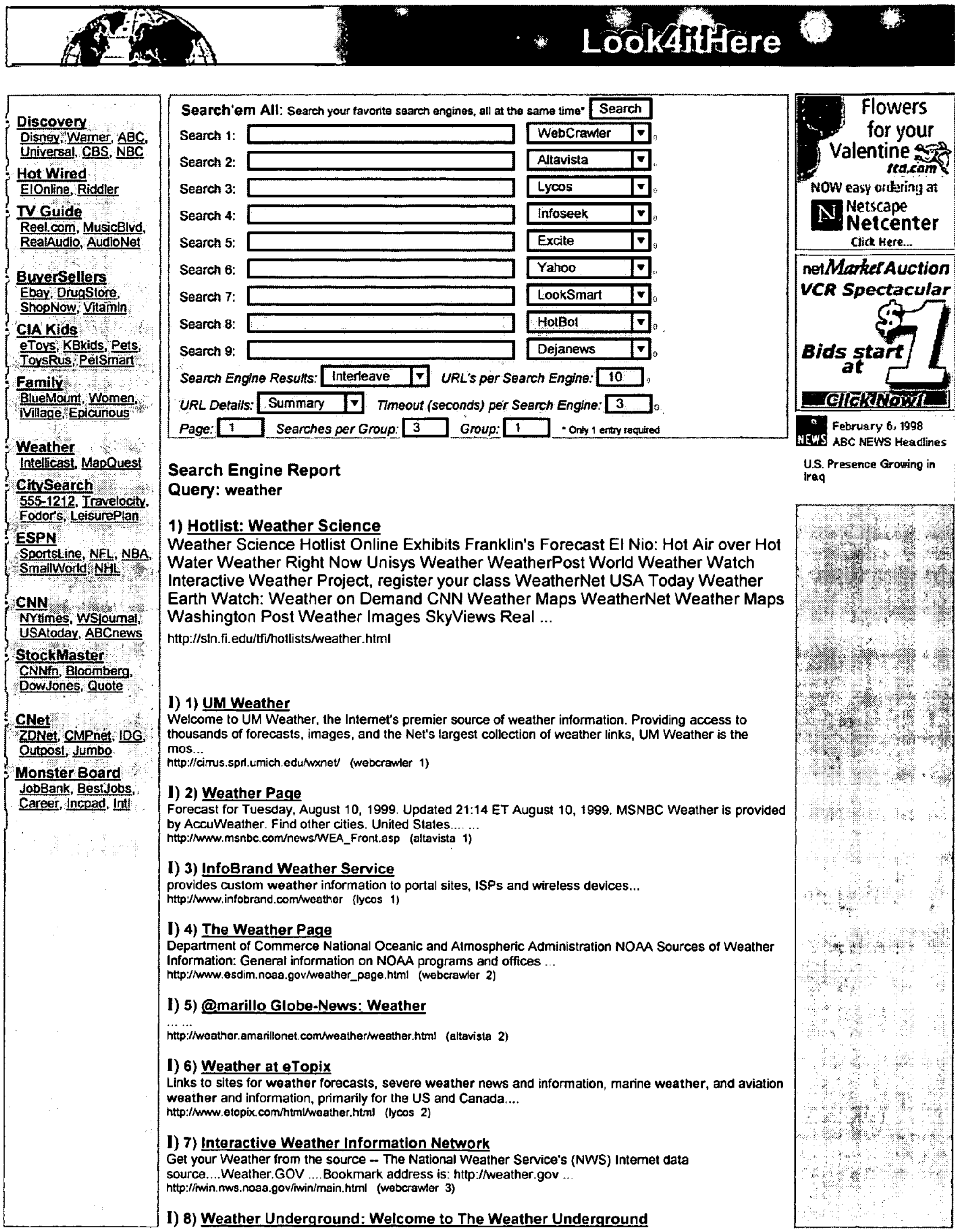
Figure 48A:
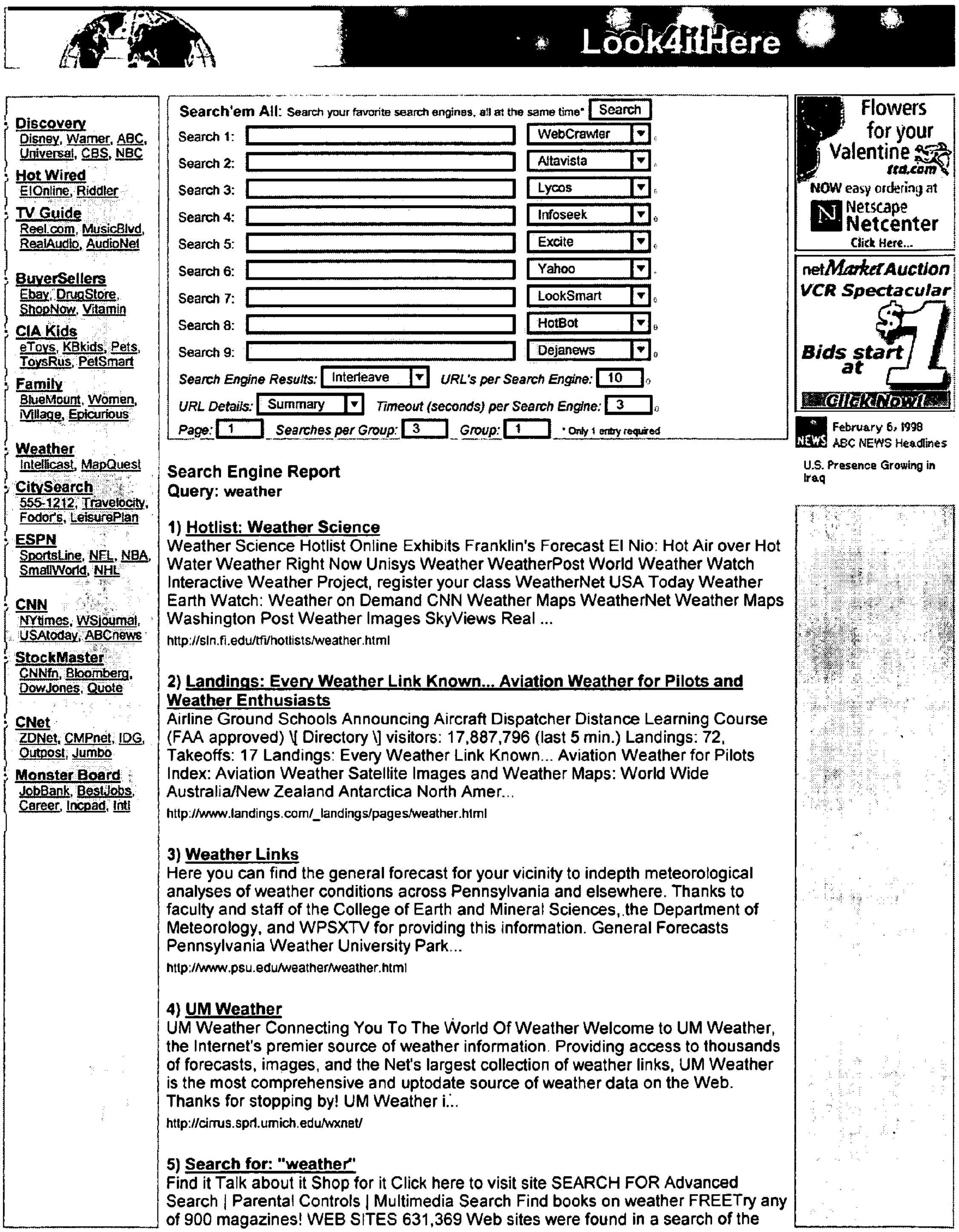
Figure 48D:
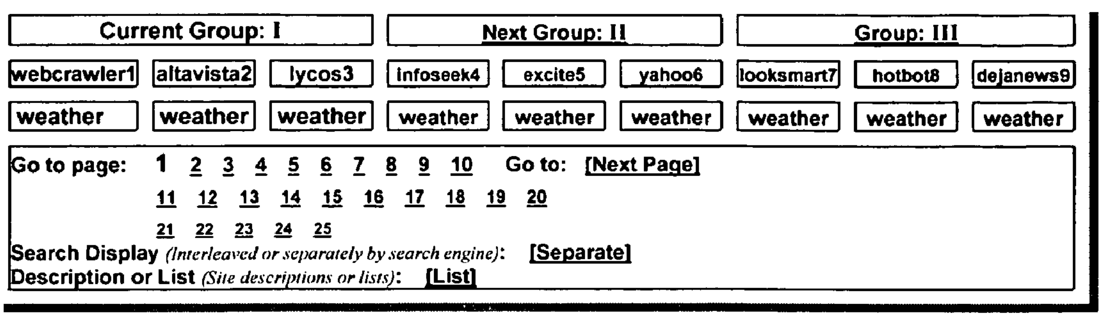
Figure 49A:
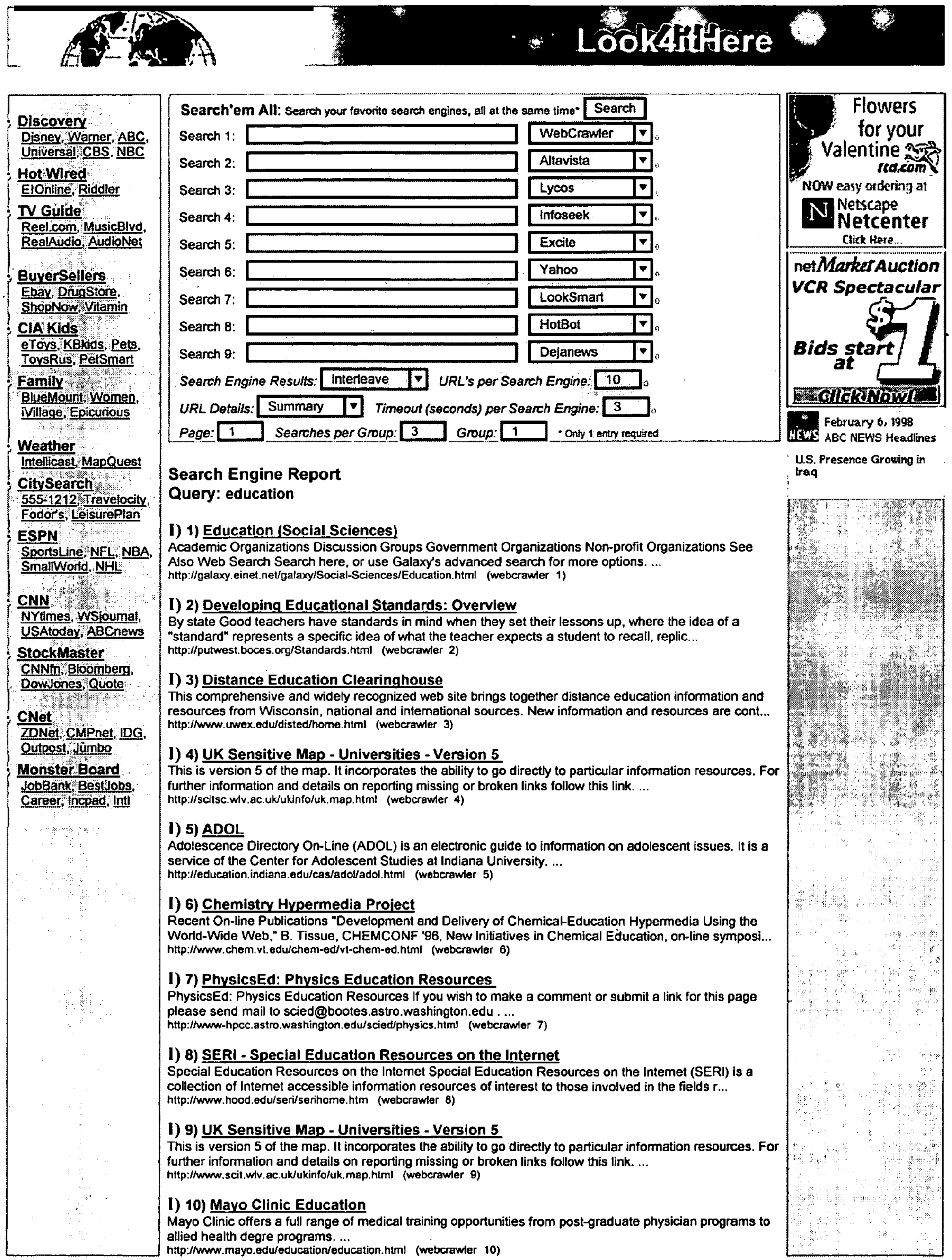
Figure 50A:
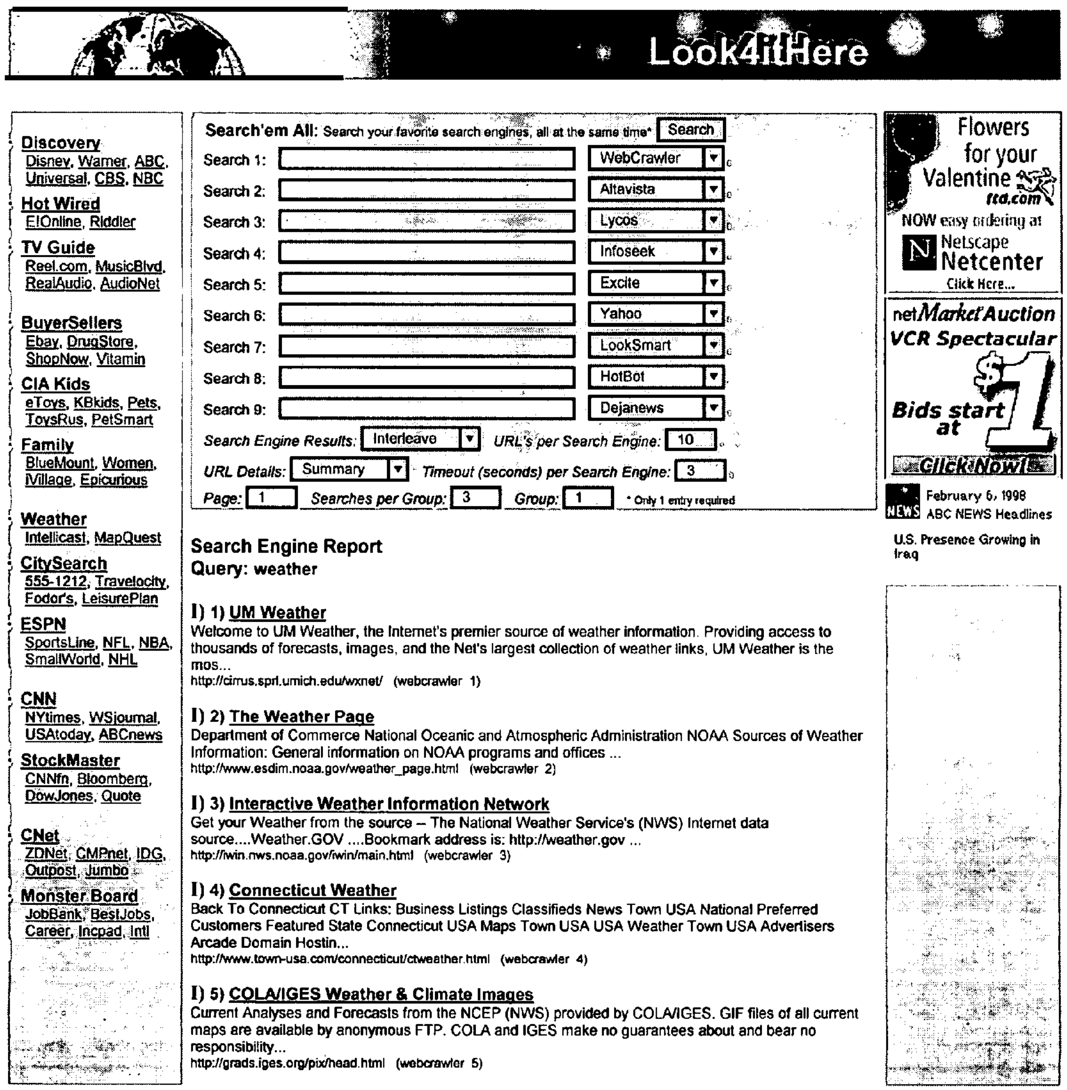
Figure 53A:
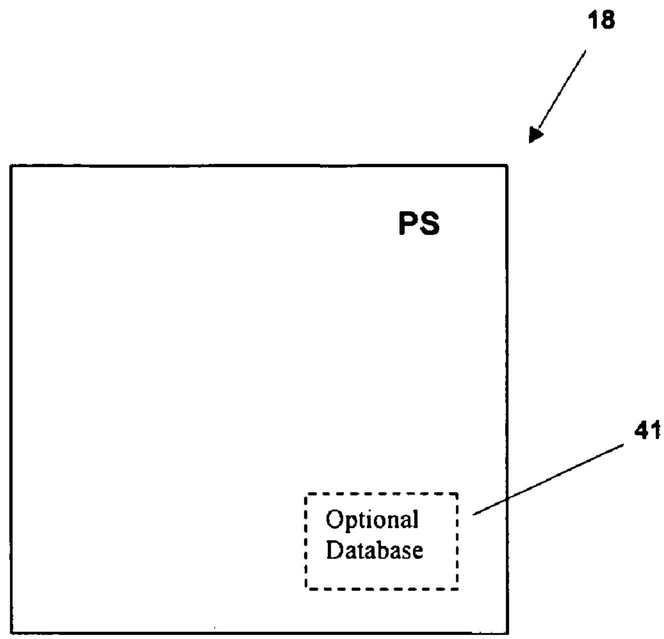
Figure 53B:
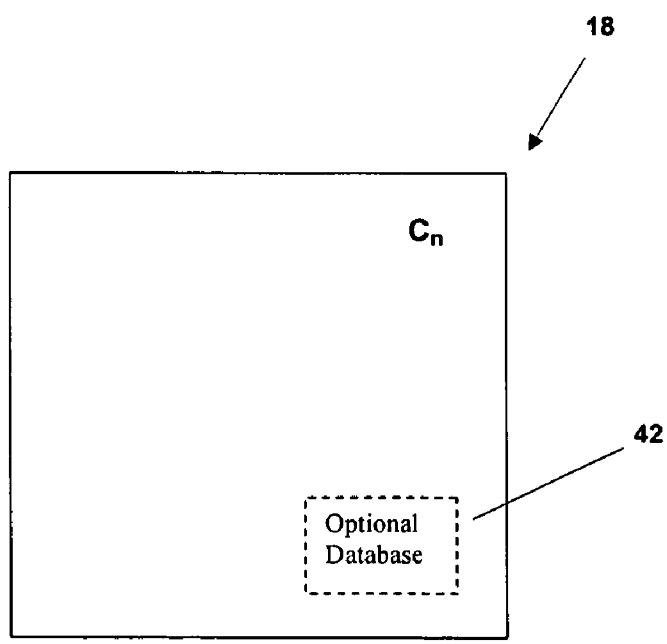
Figure 54:
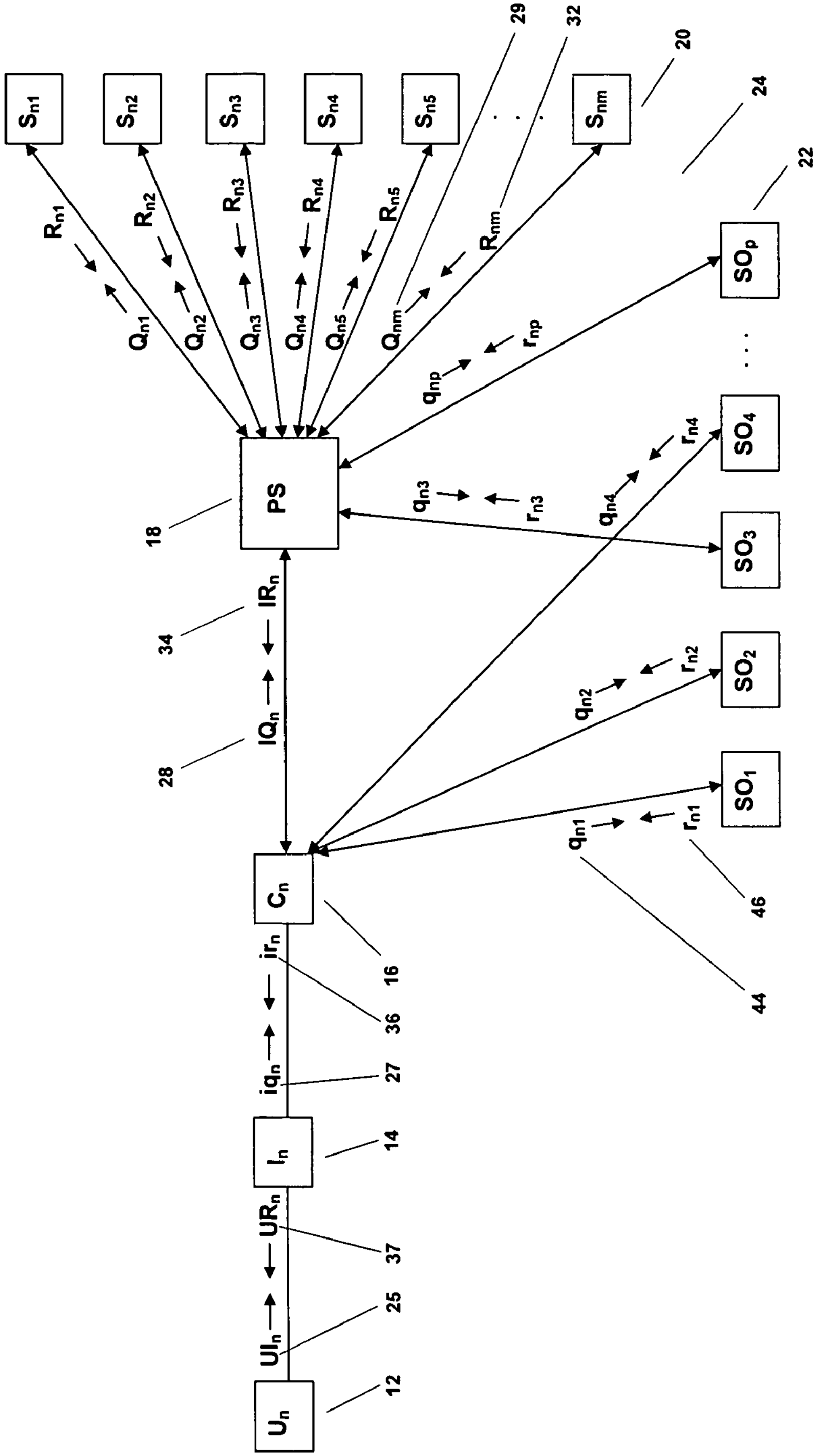
Figure 55:
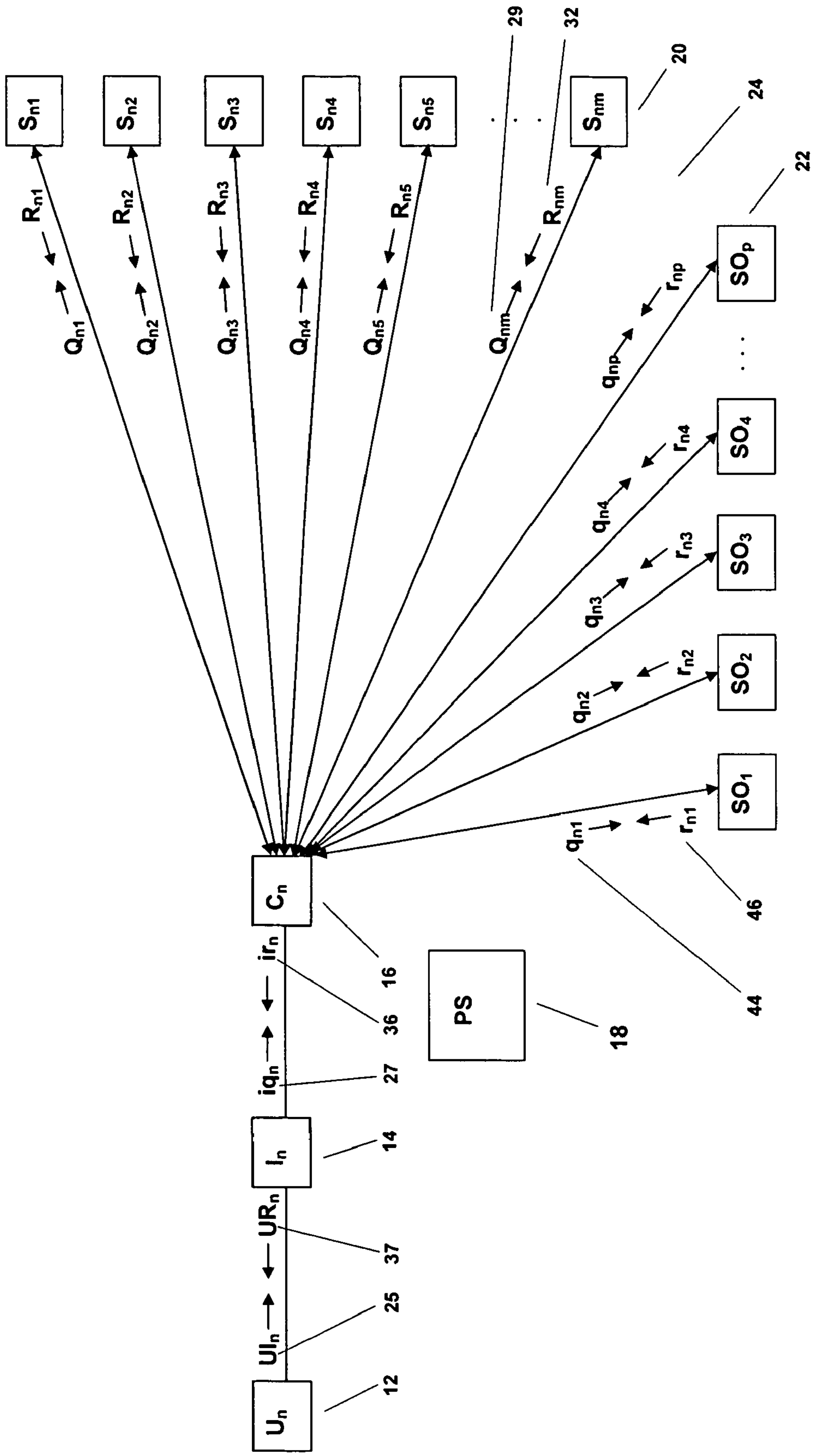
Figure 56:
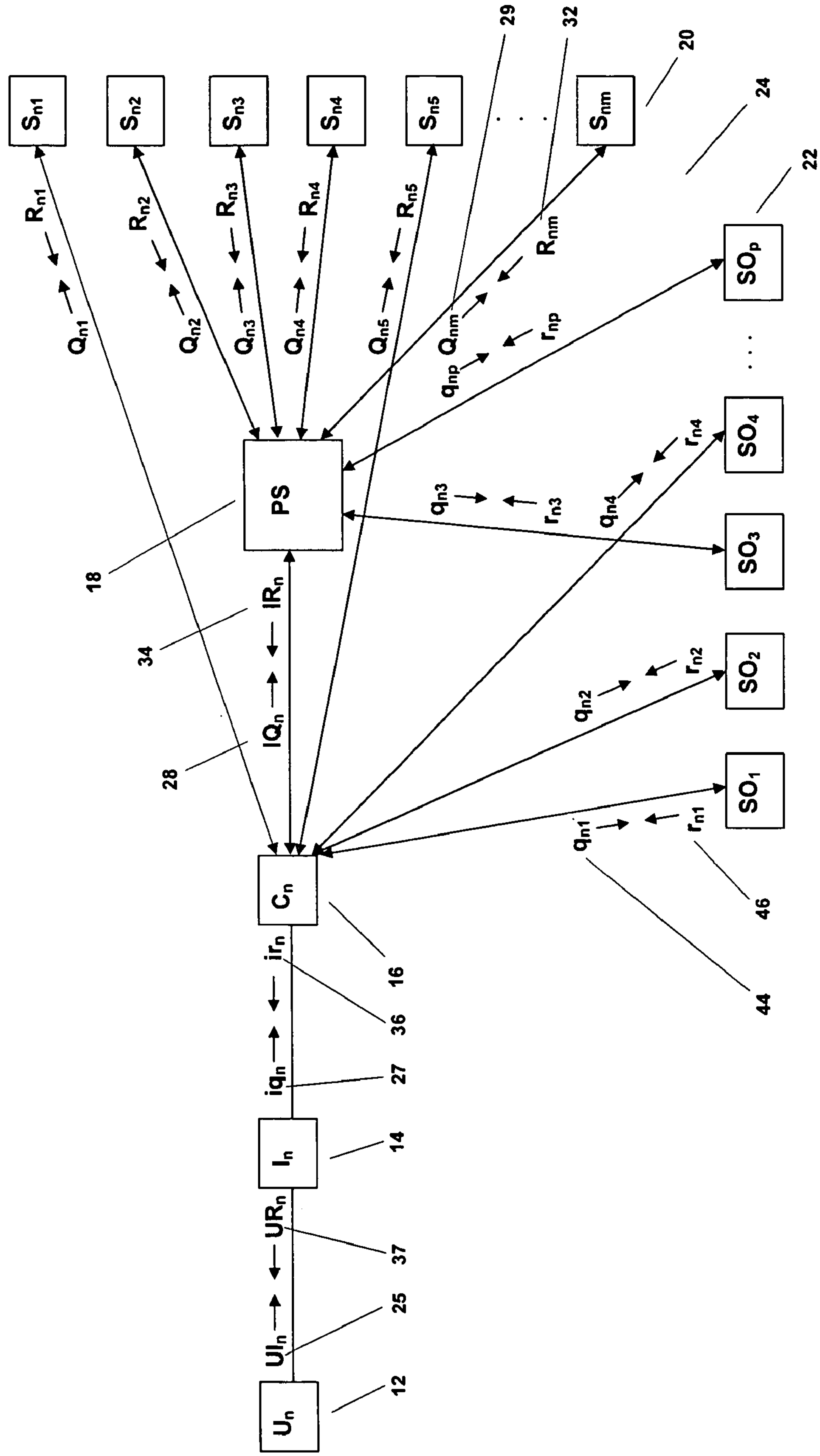
Figure 57:
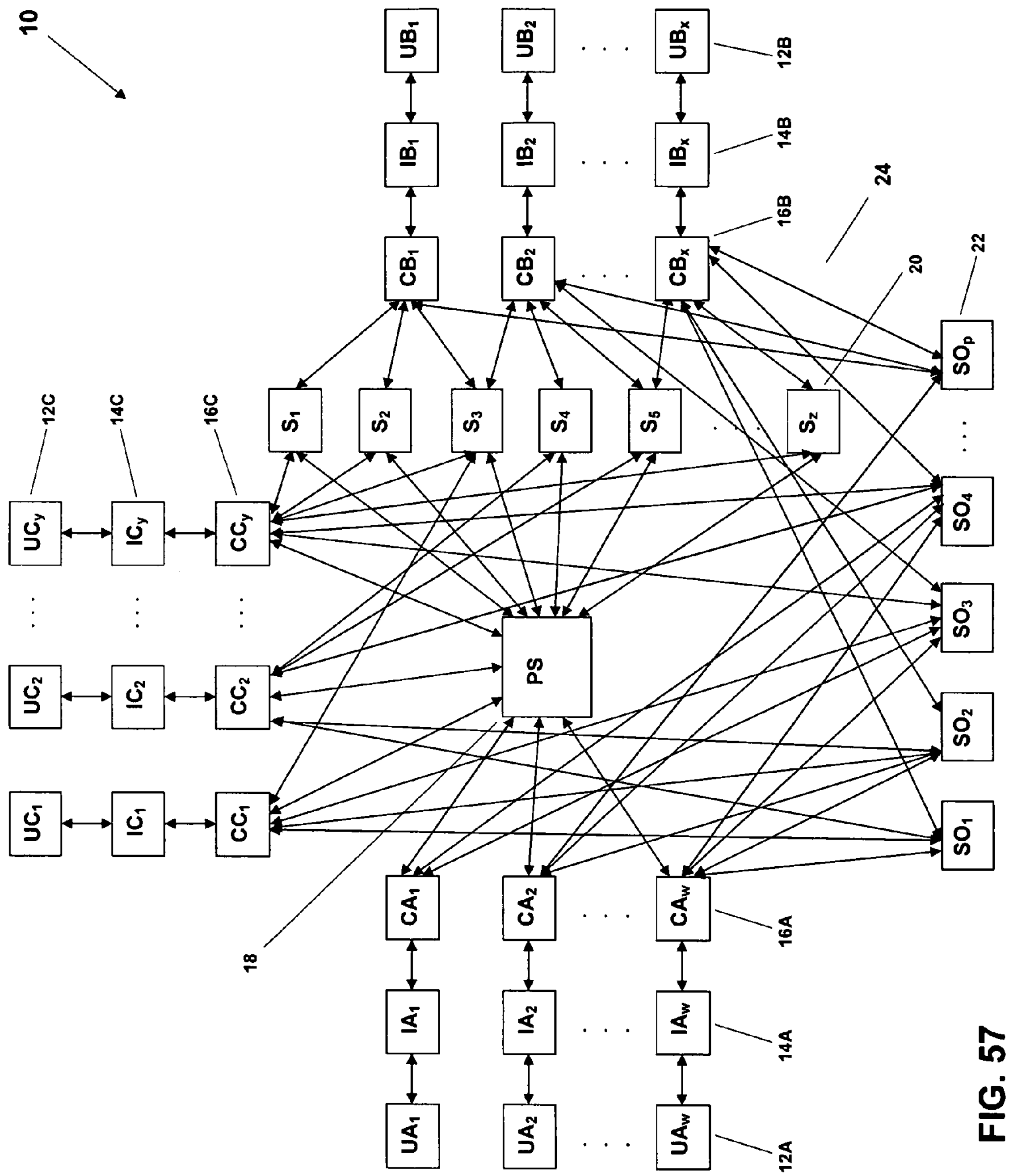
Figure 58:
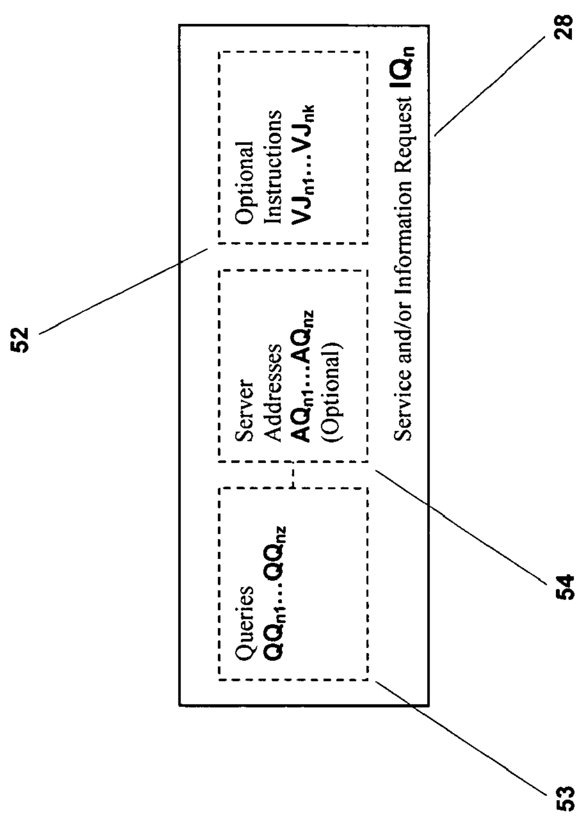
Figure 59:
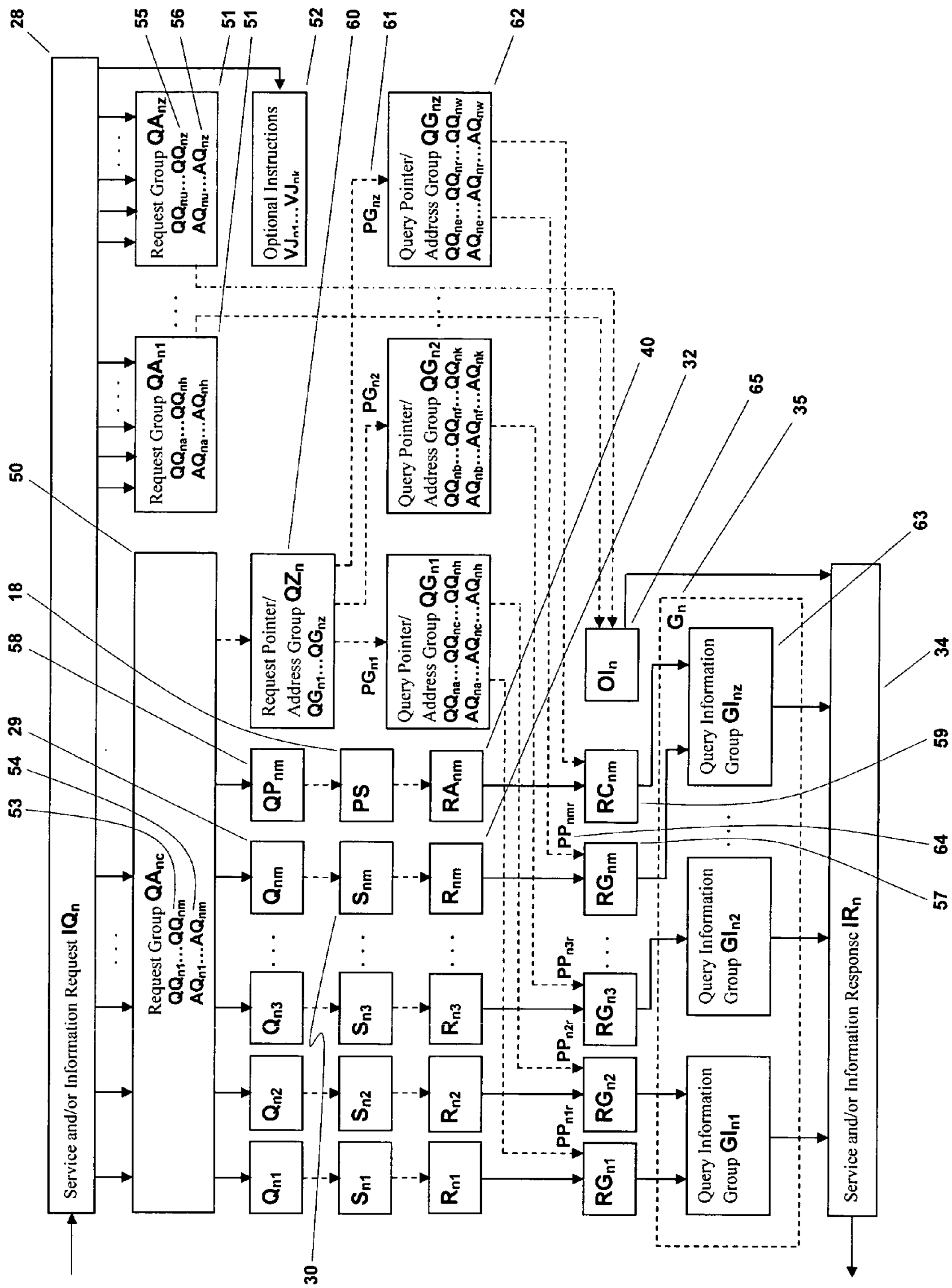
Figure 60:
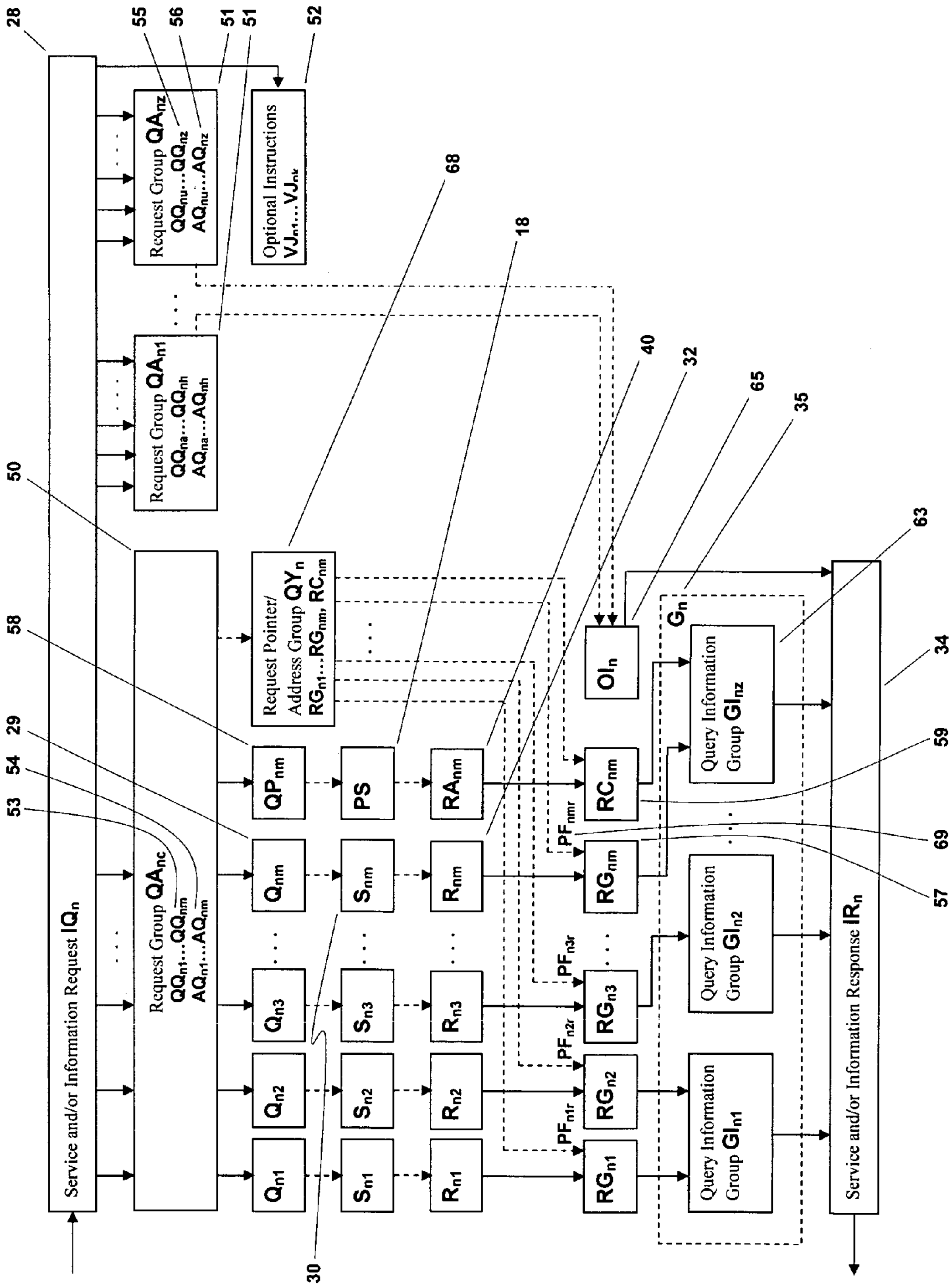
Figure 61:
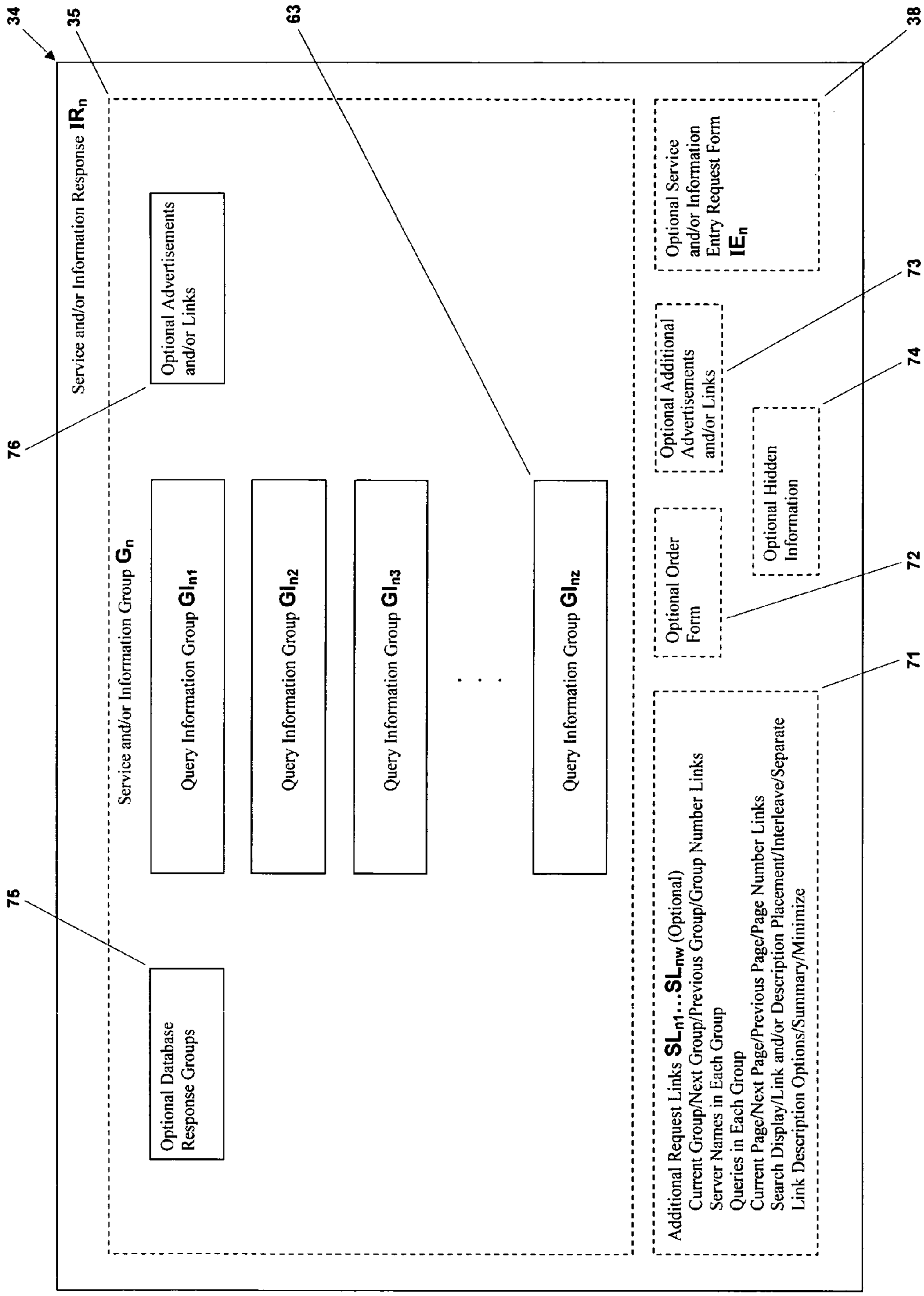
Figure 62:
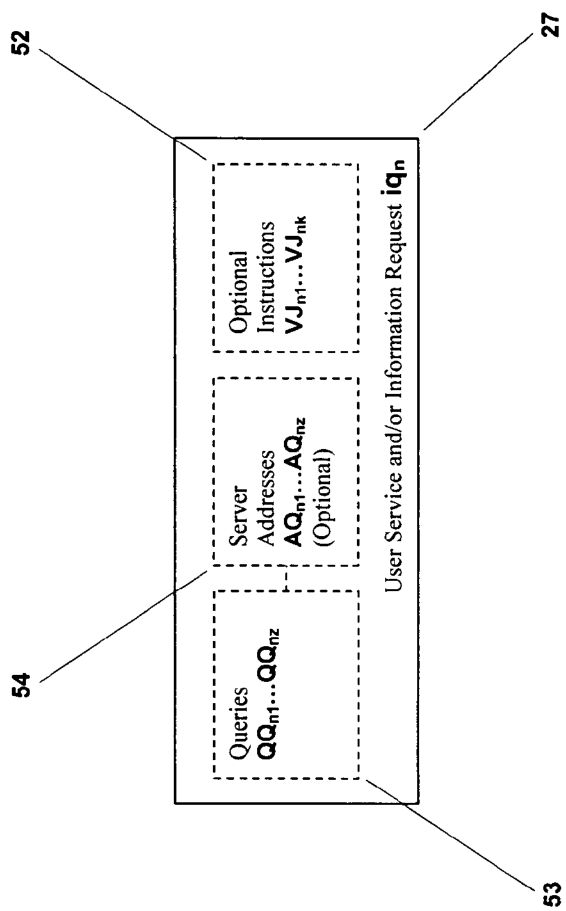
Figure 63:
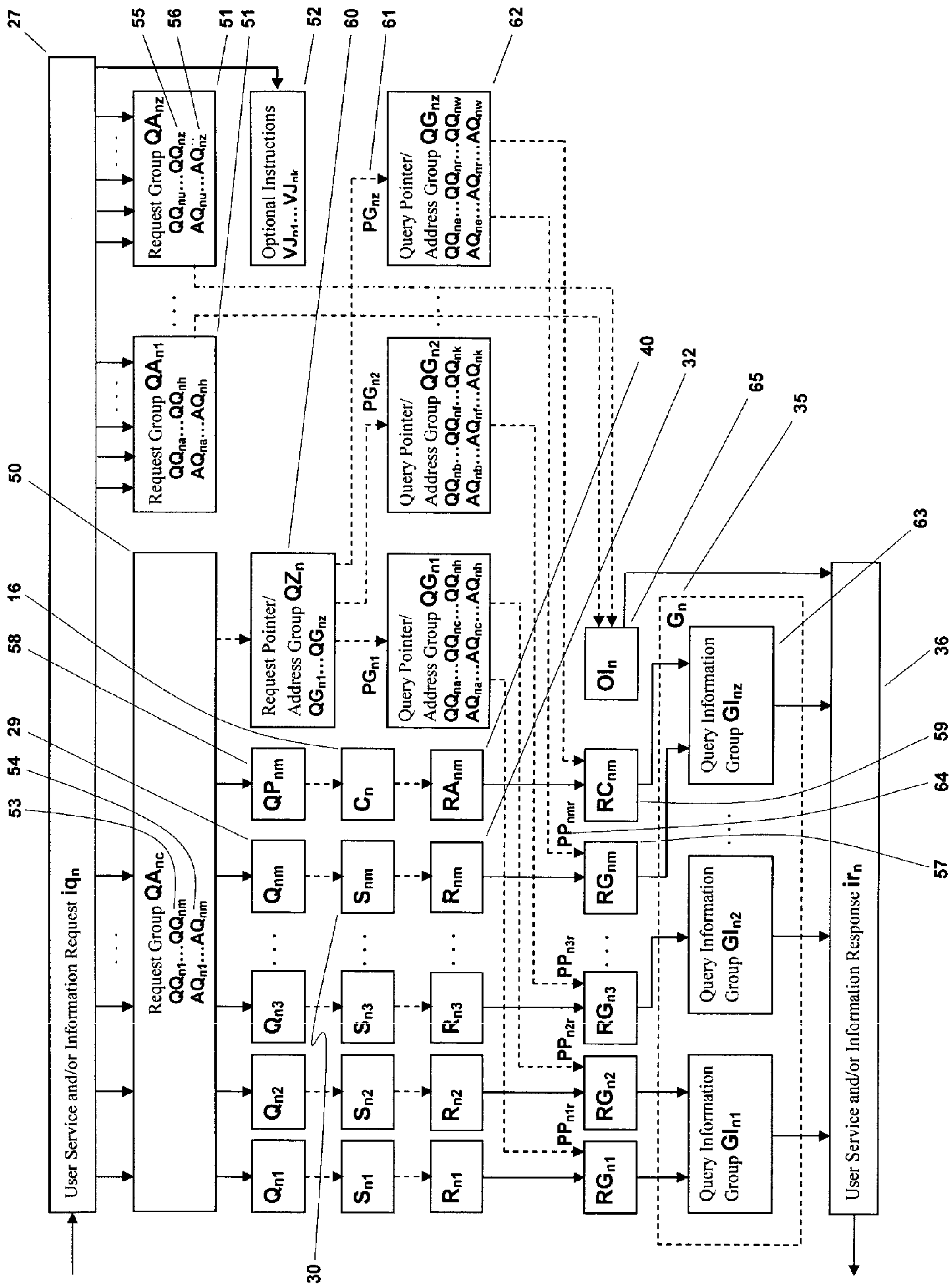
Figure 64:
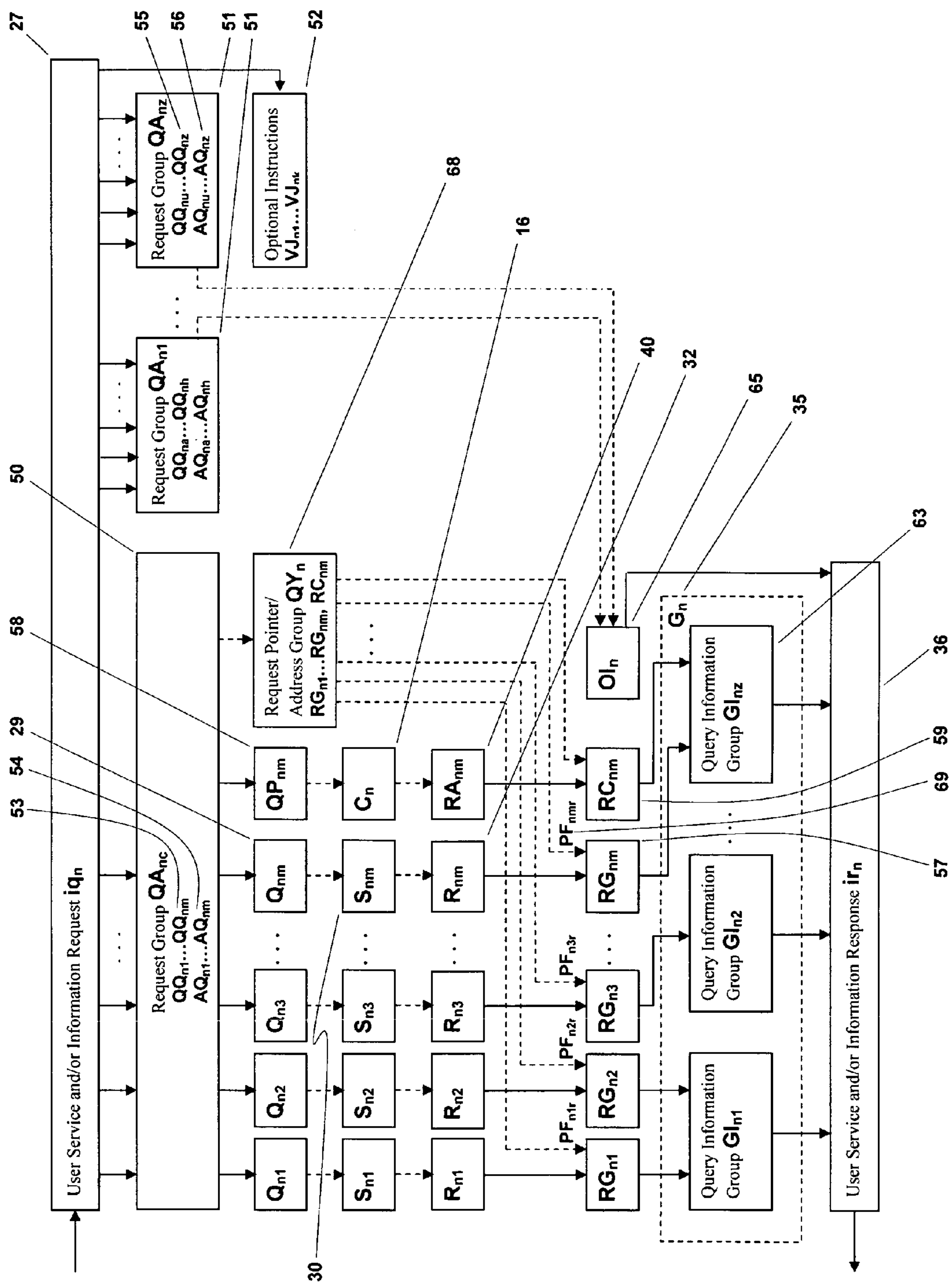
Figure 65:
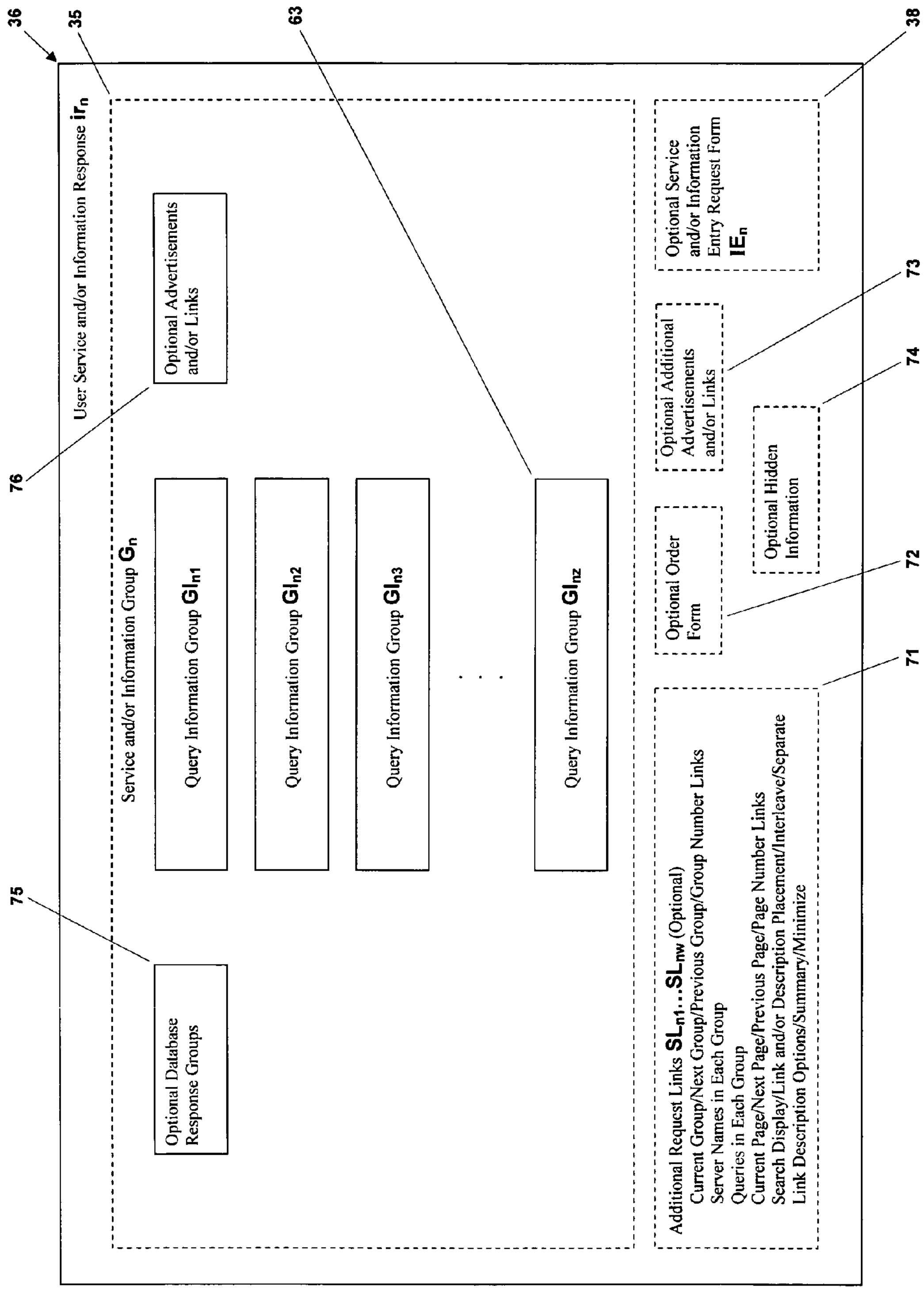
Figure 66A:
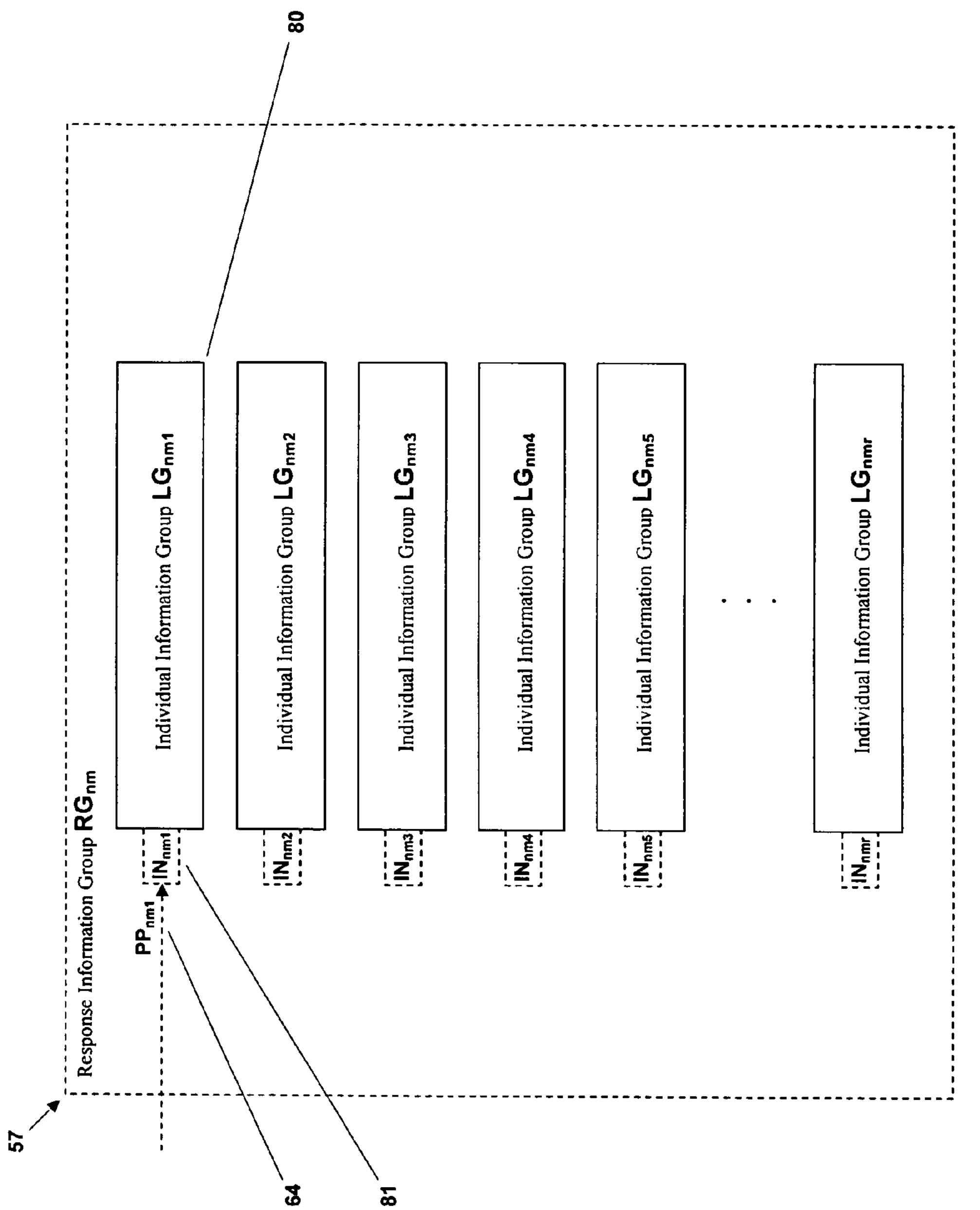
Figure 66B:
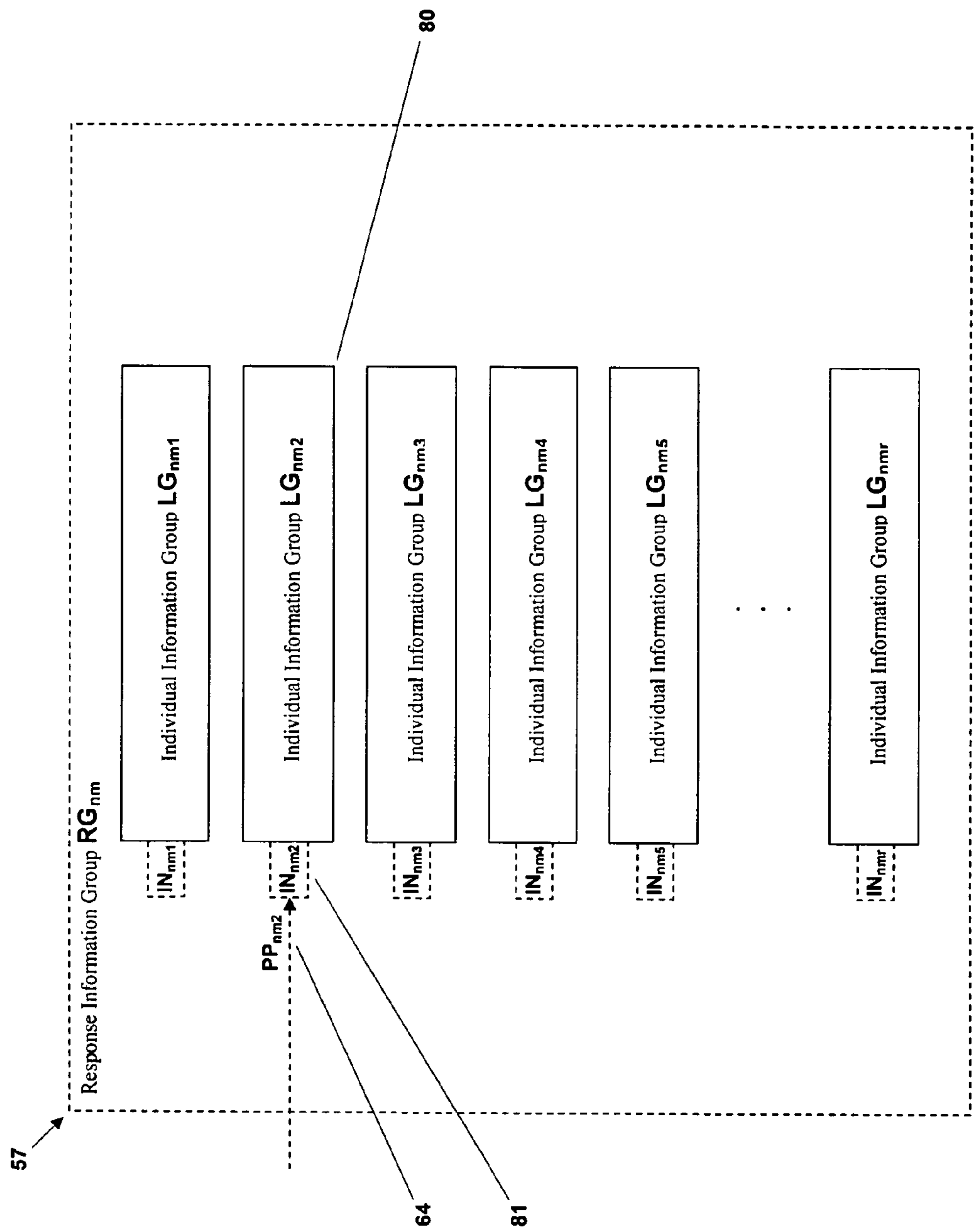
Figure 66C:
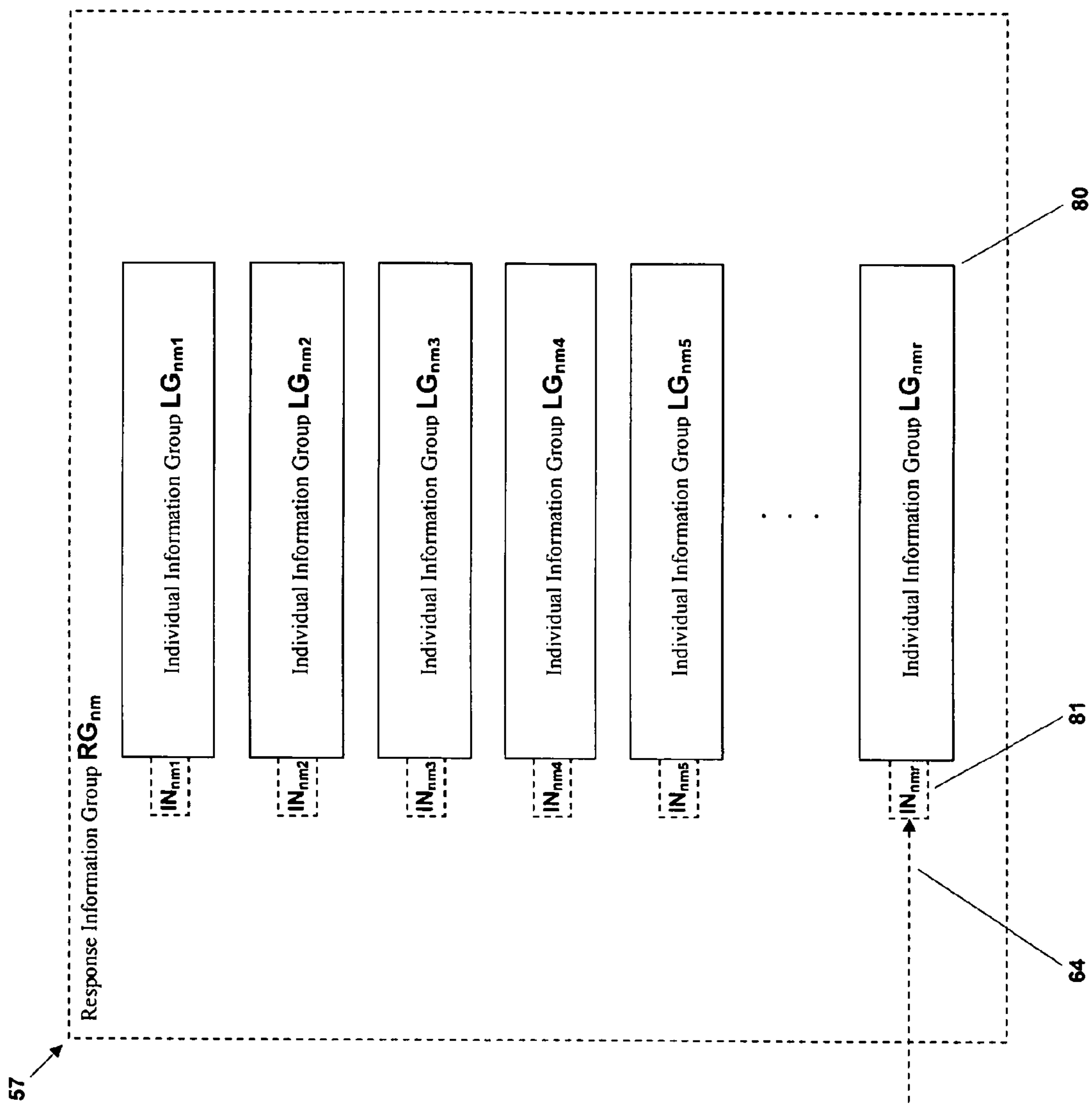
Figure 67:
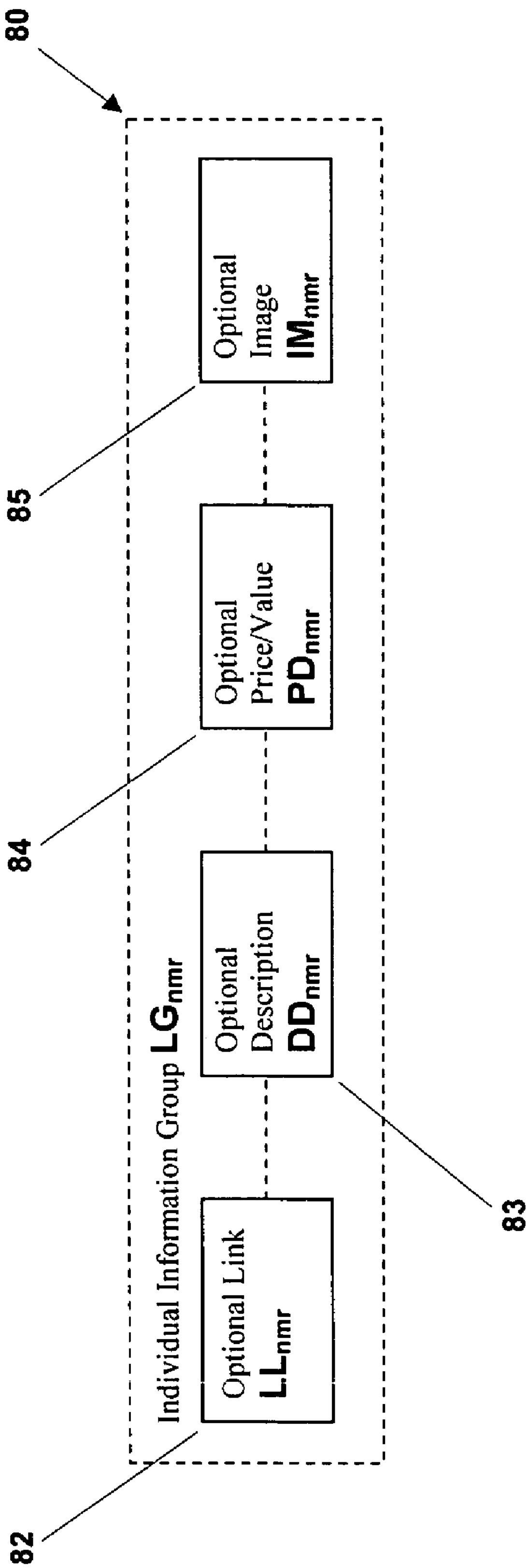
Figure 68:
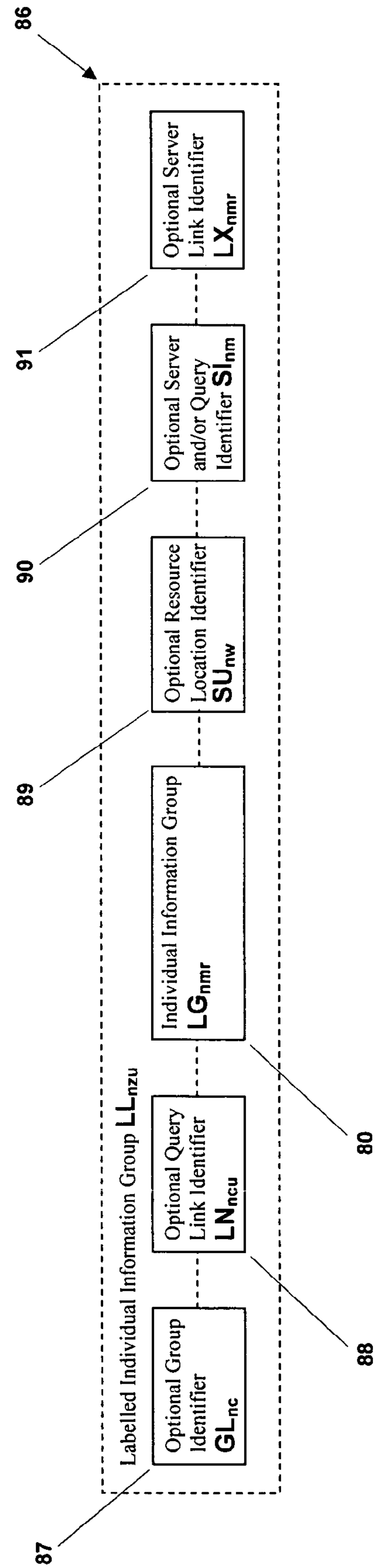
Figure 69:
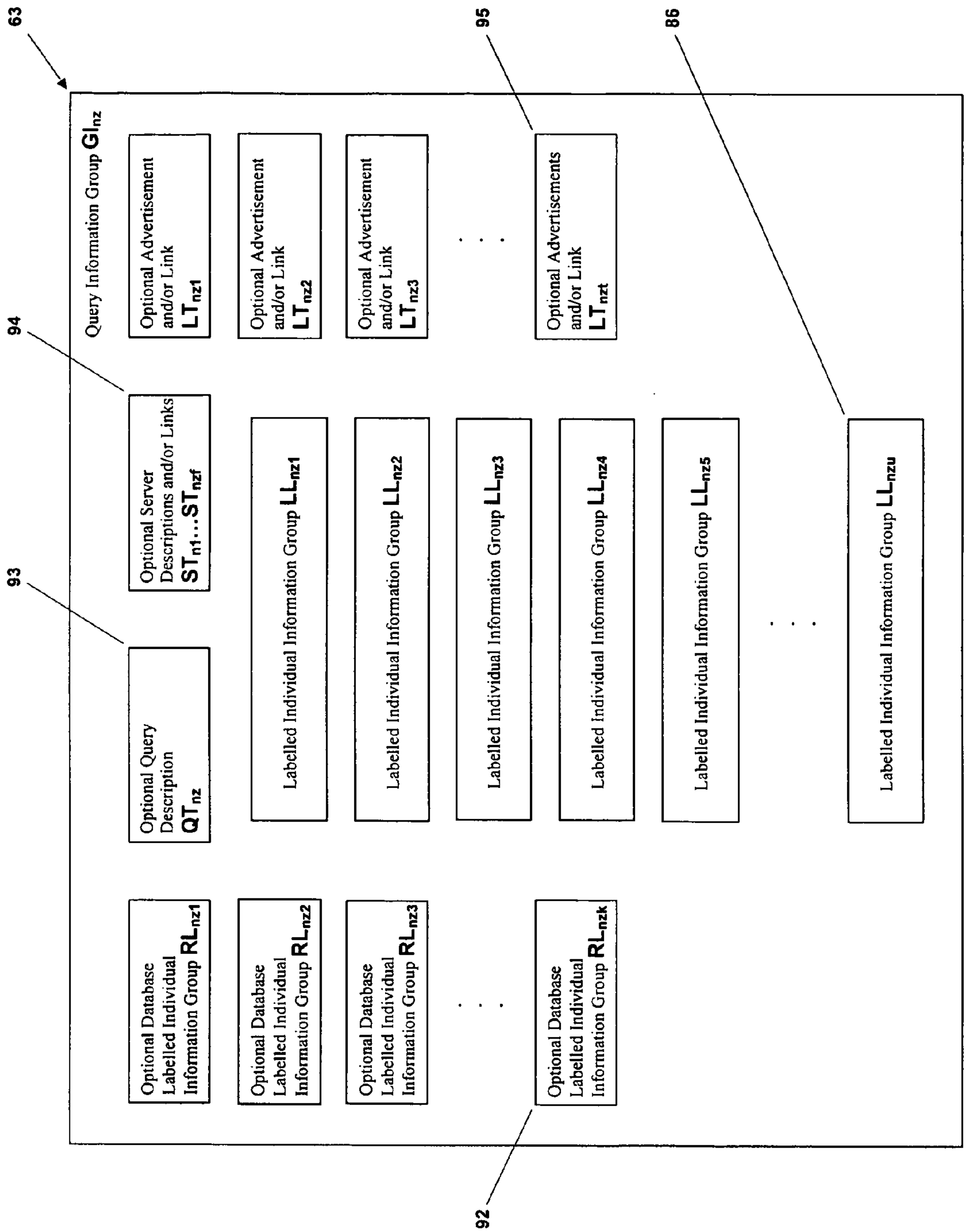
Figure 70:
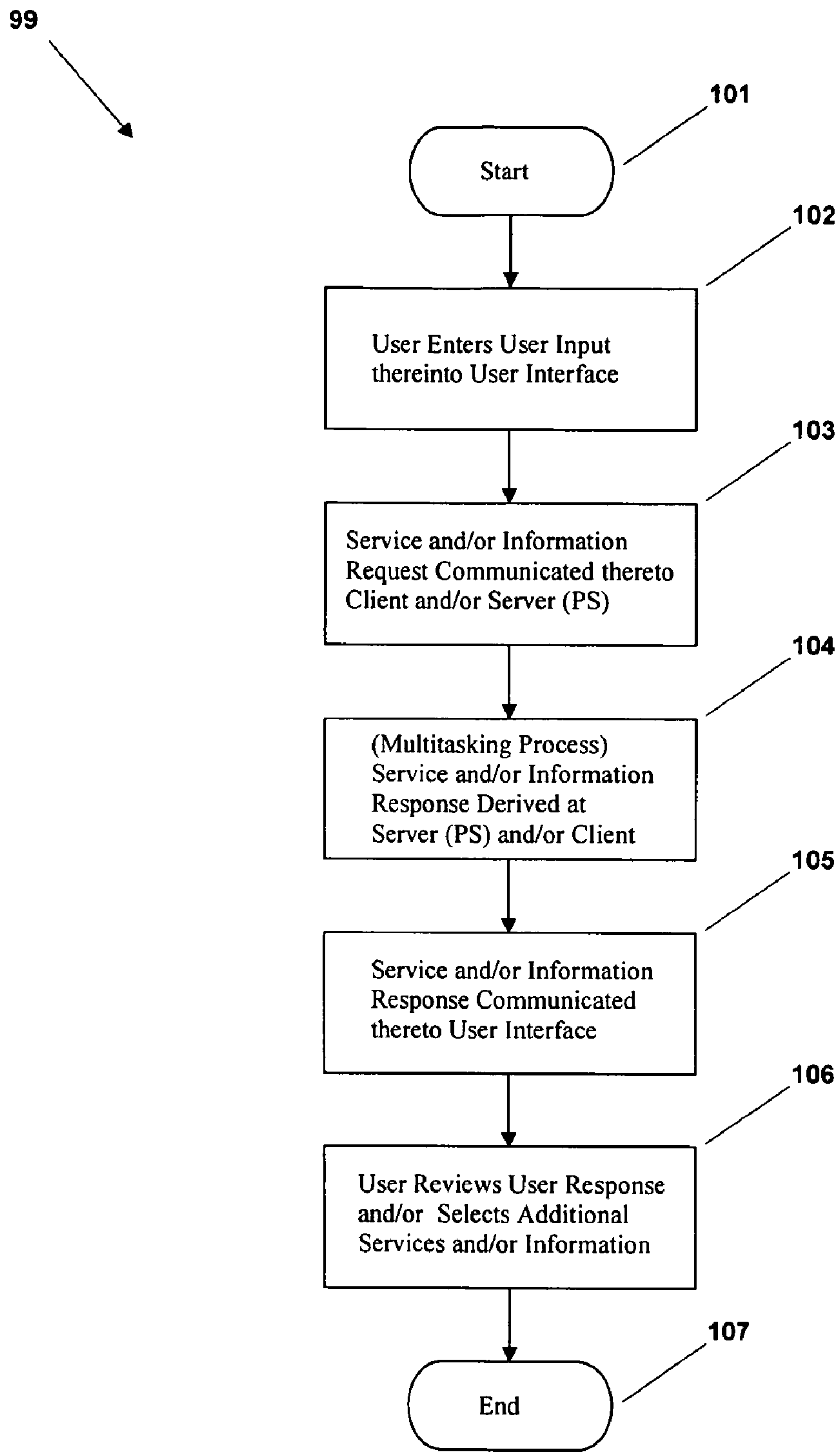
Figure 71:
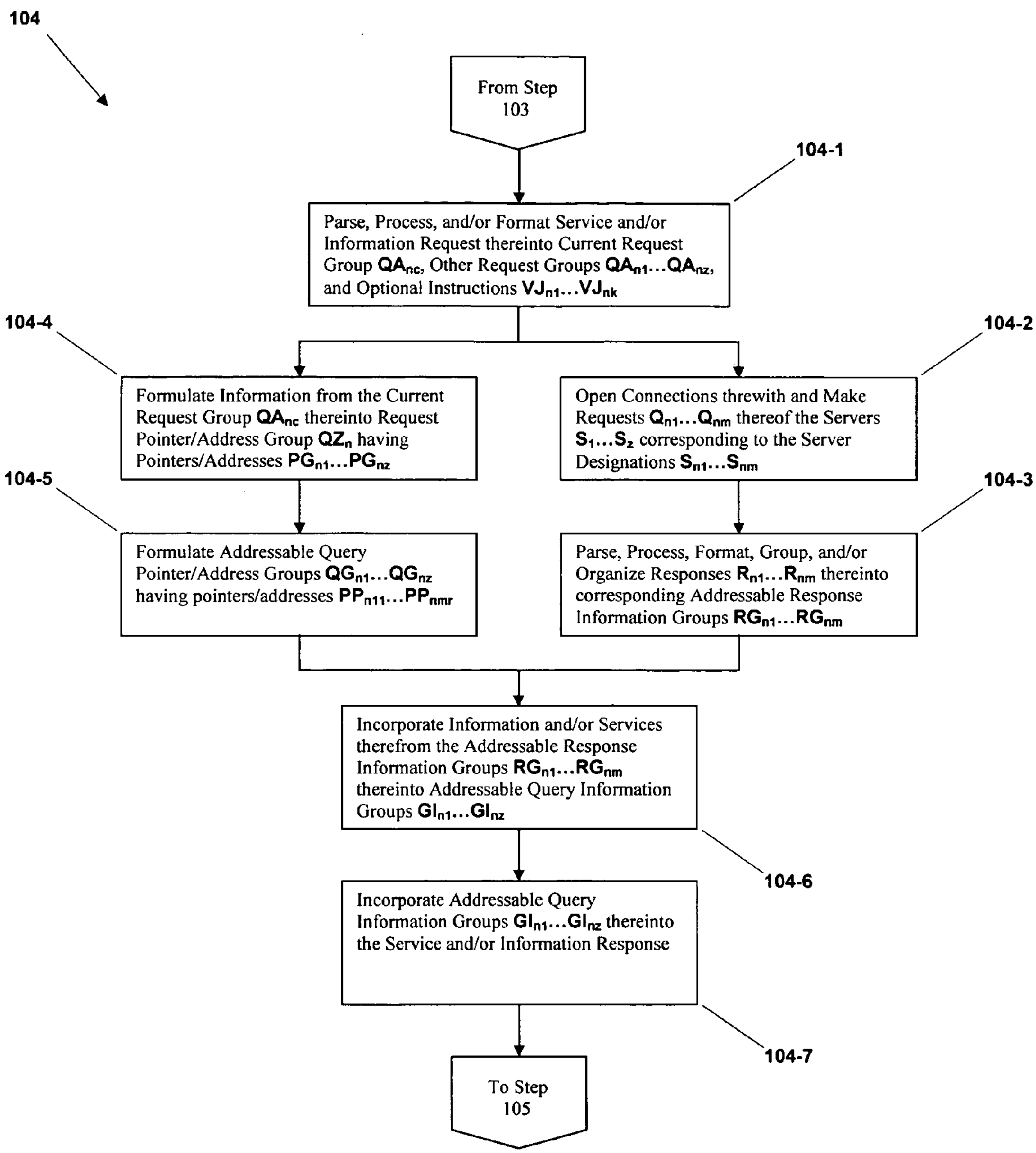
Figure 72:
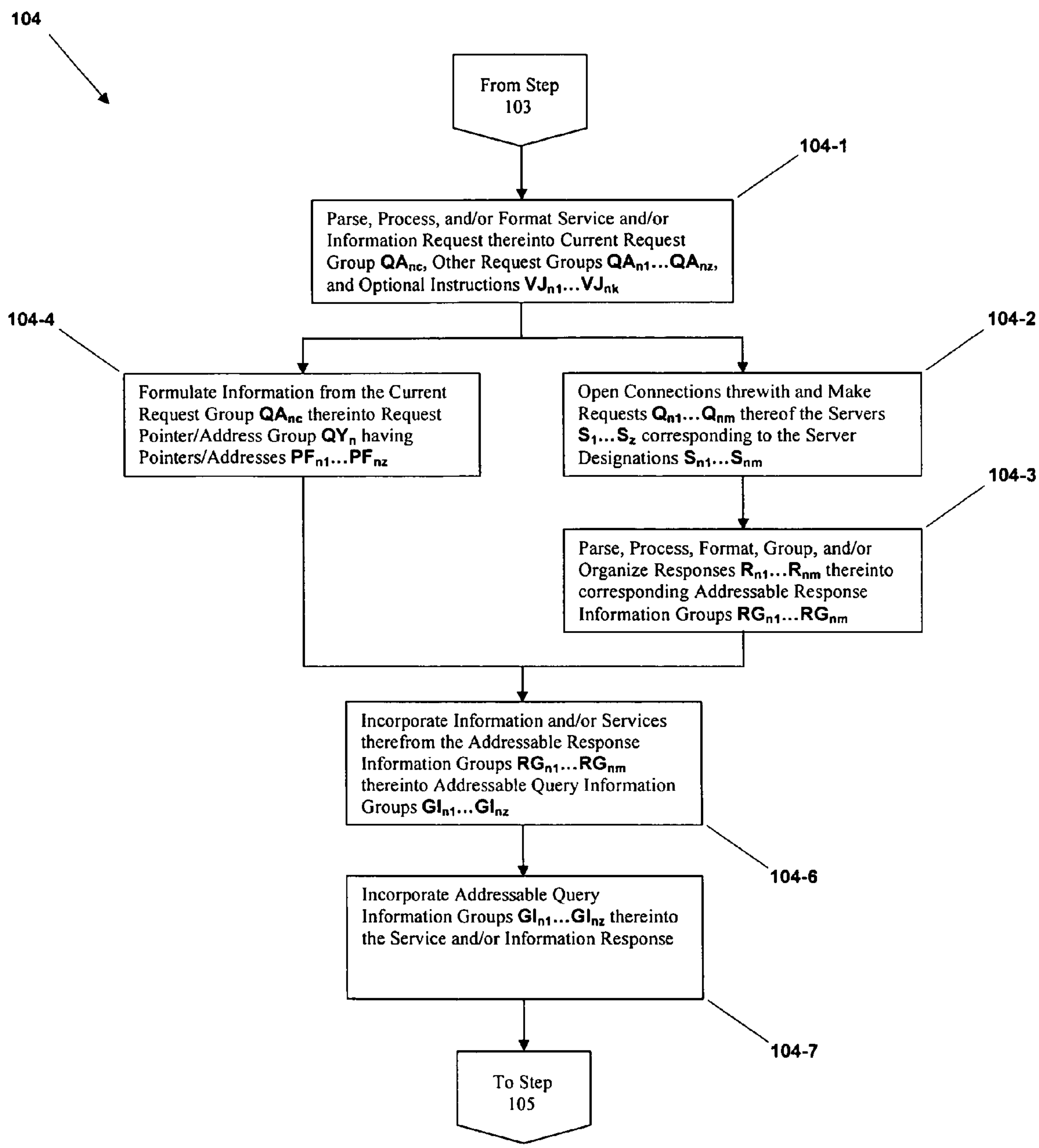
Figure 73:
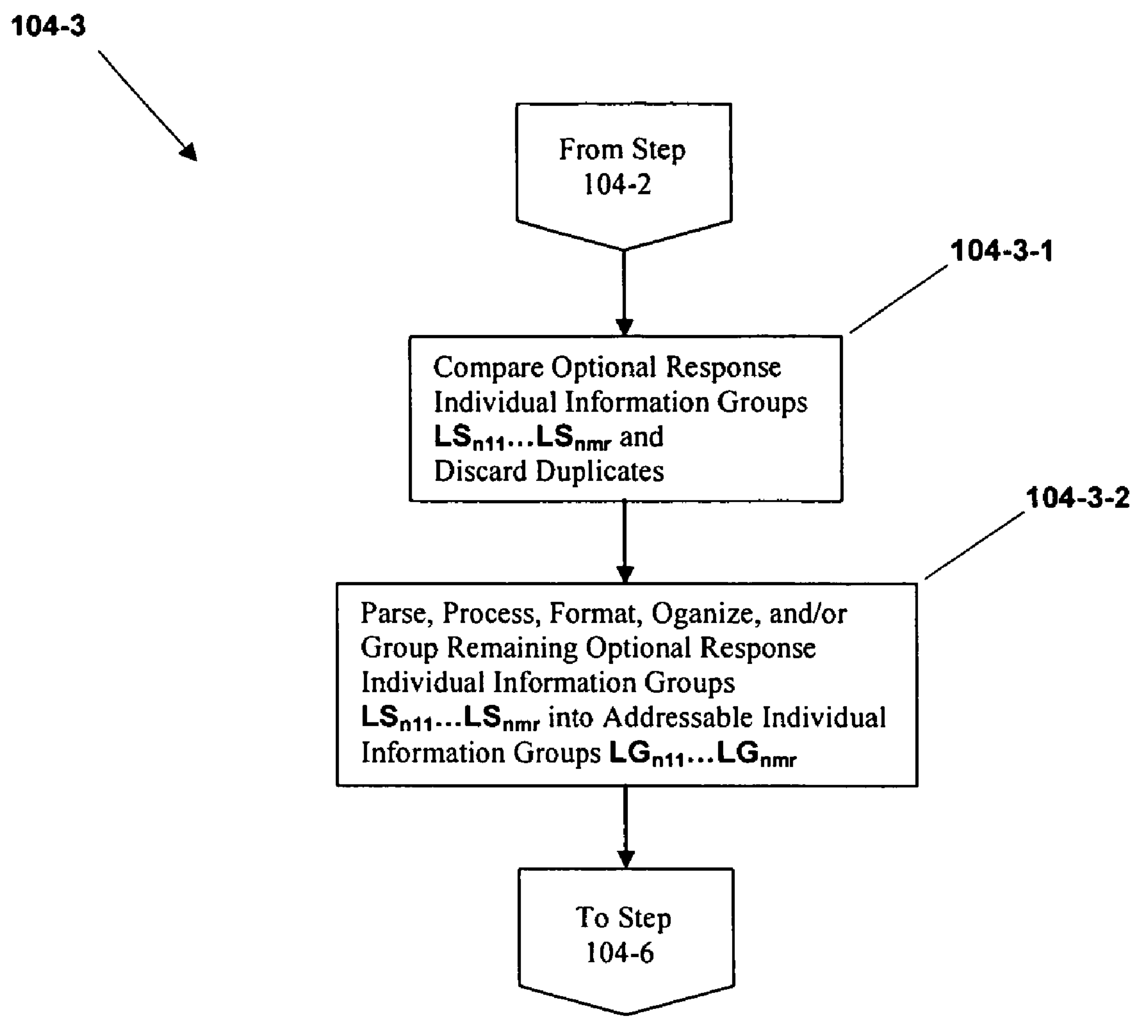
Figure 74:
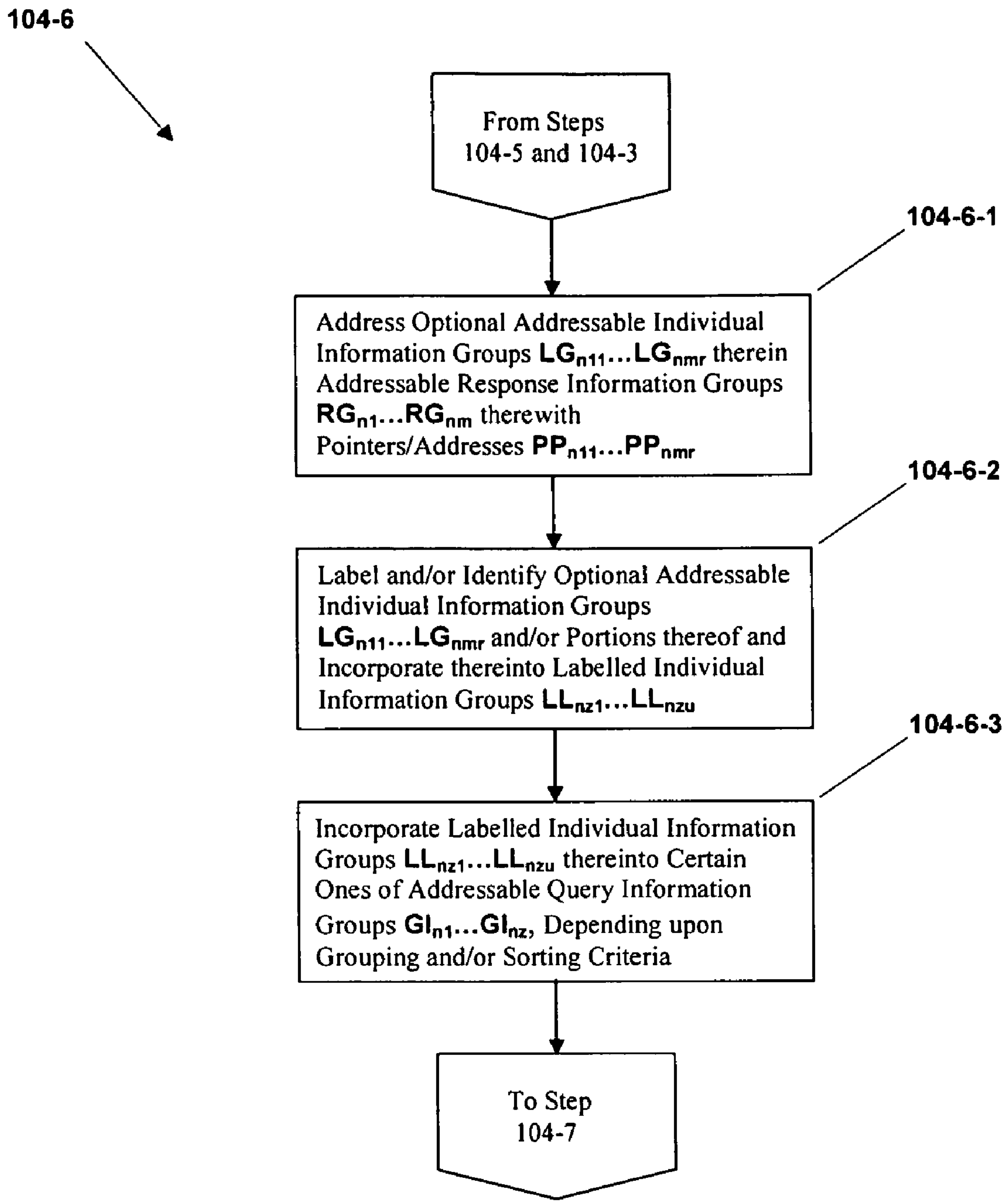
Figure 75:
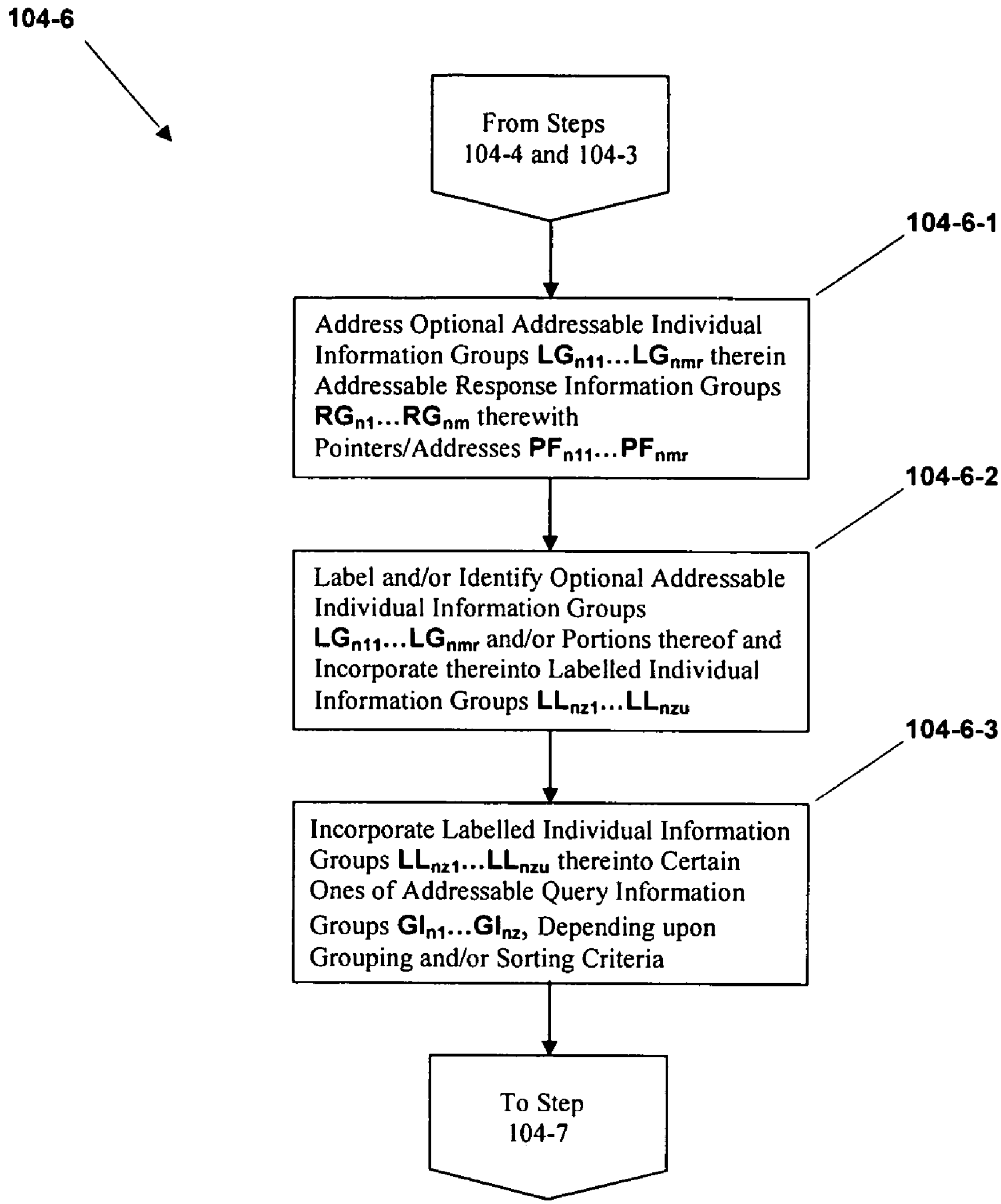
Figure 76:
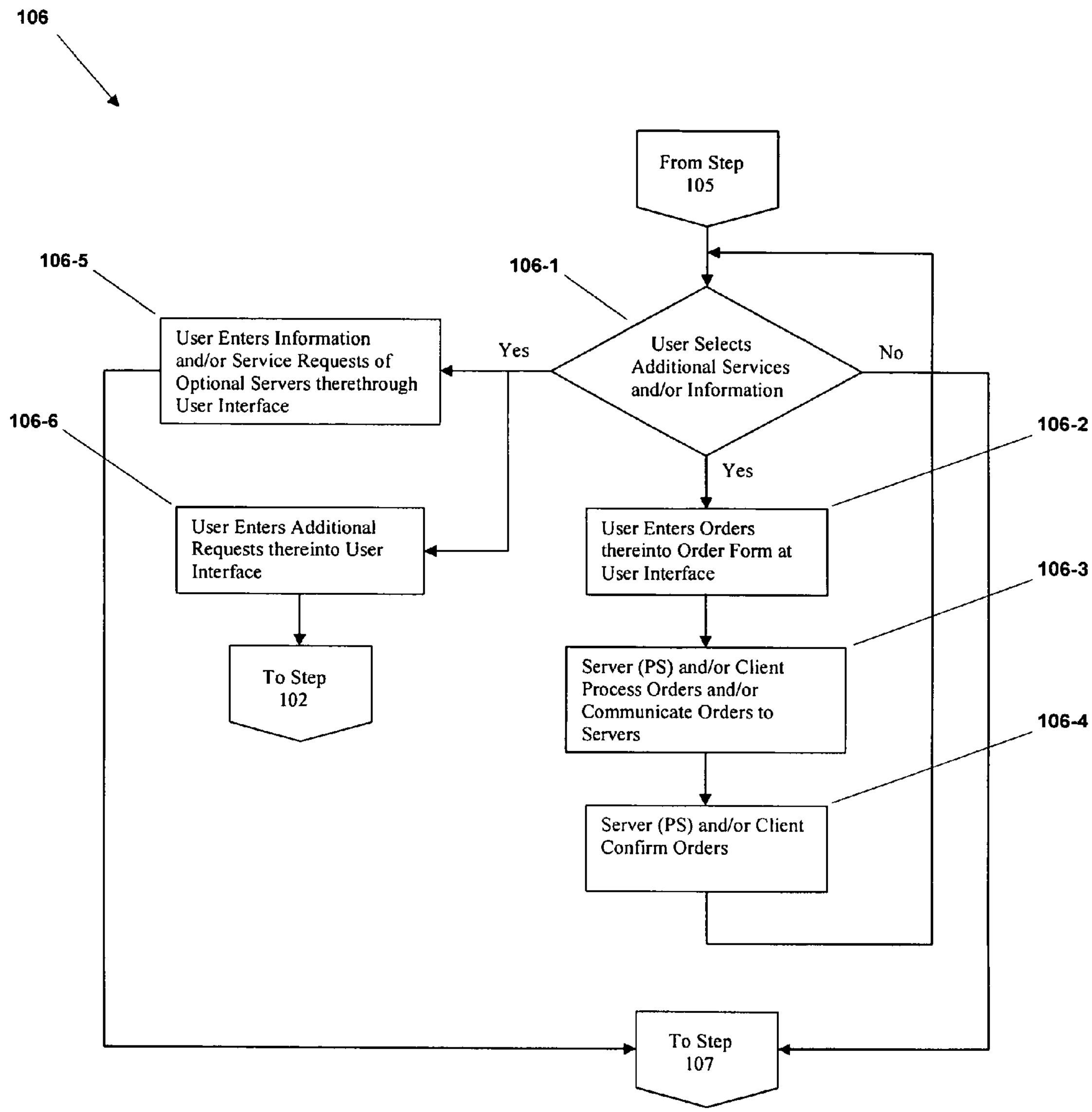
Figure 77:
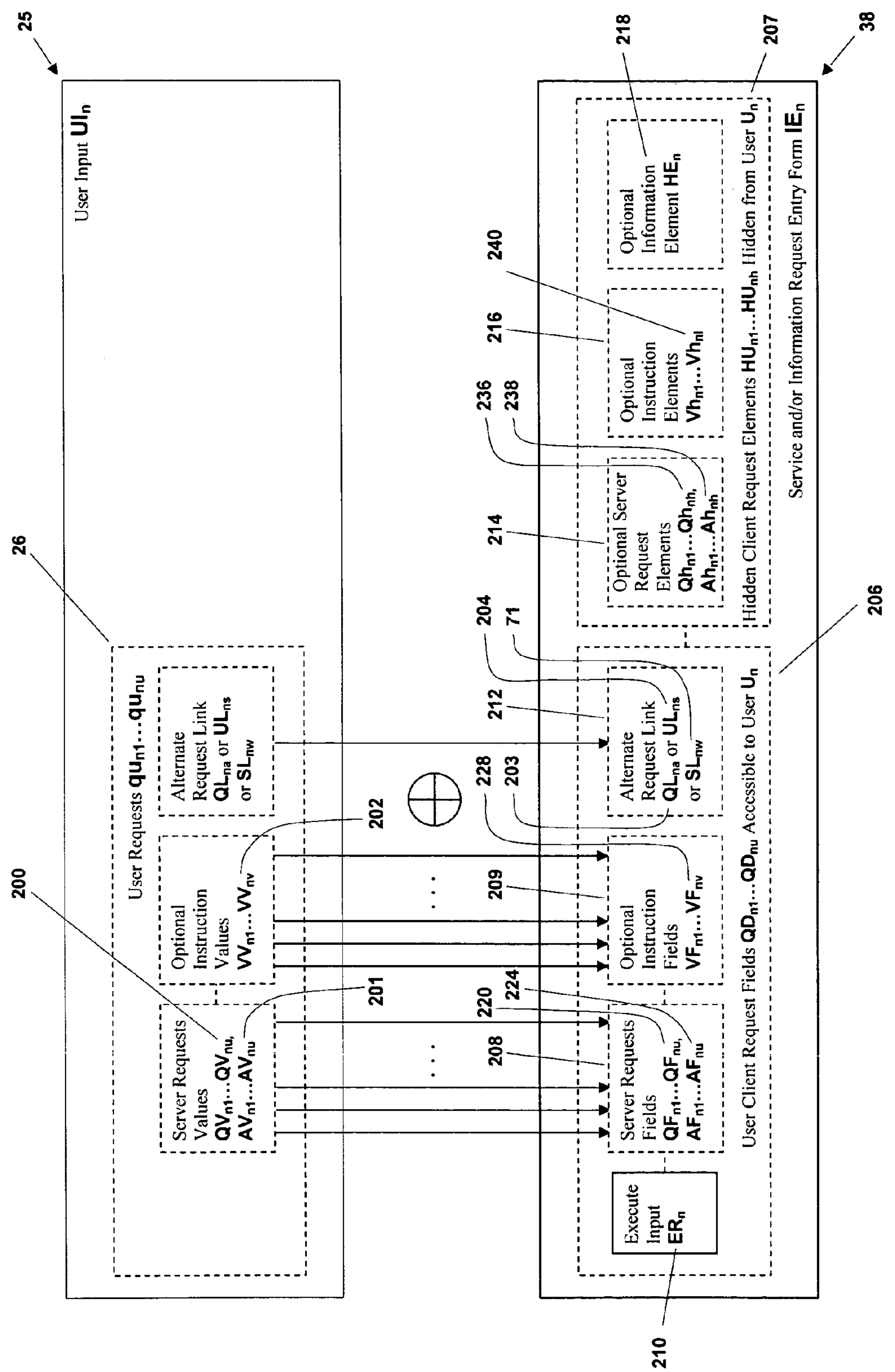
Figure 78:
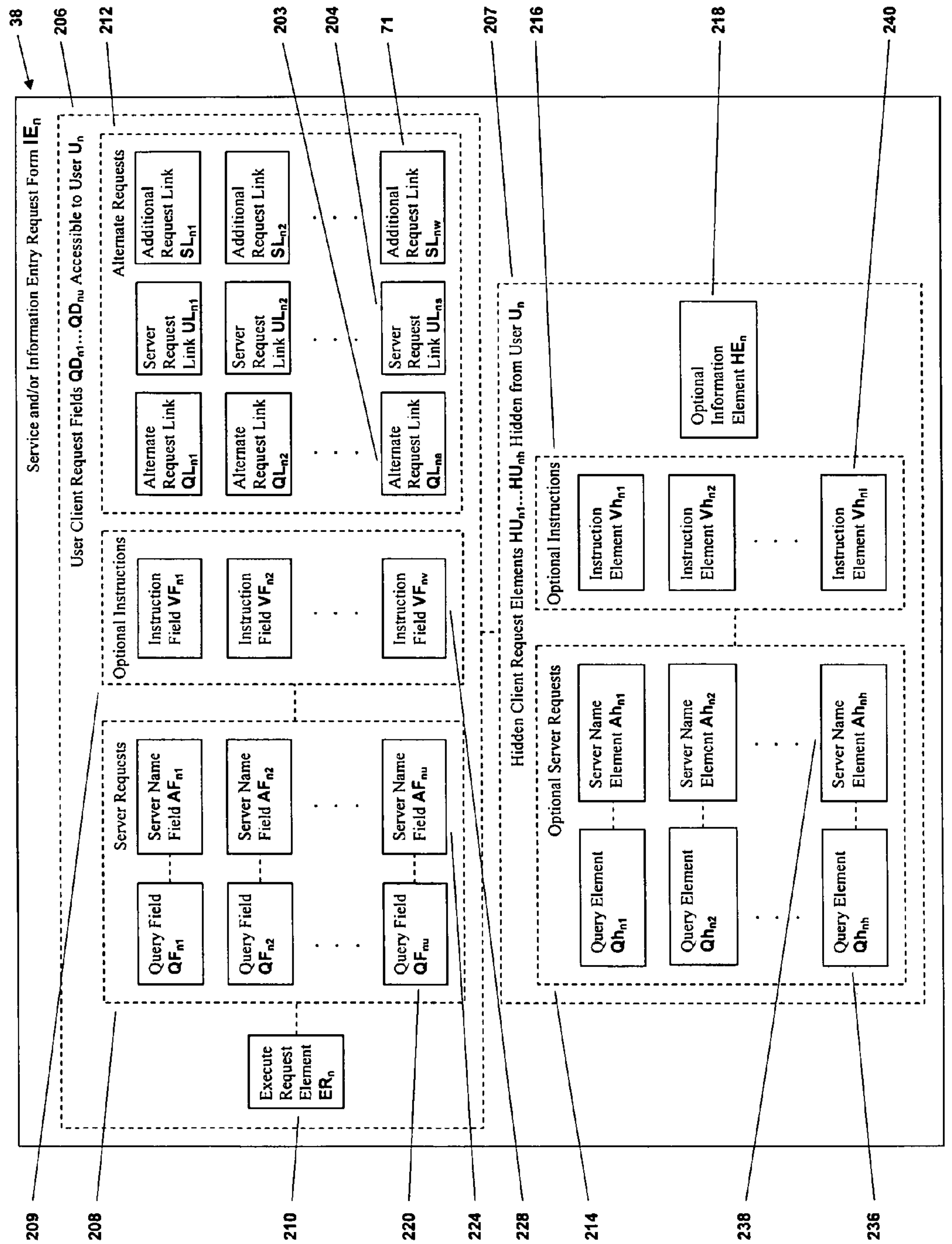
Figure 79:
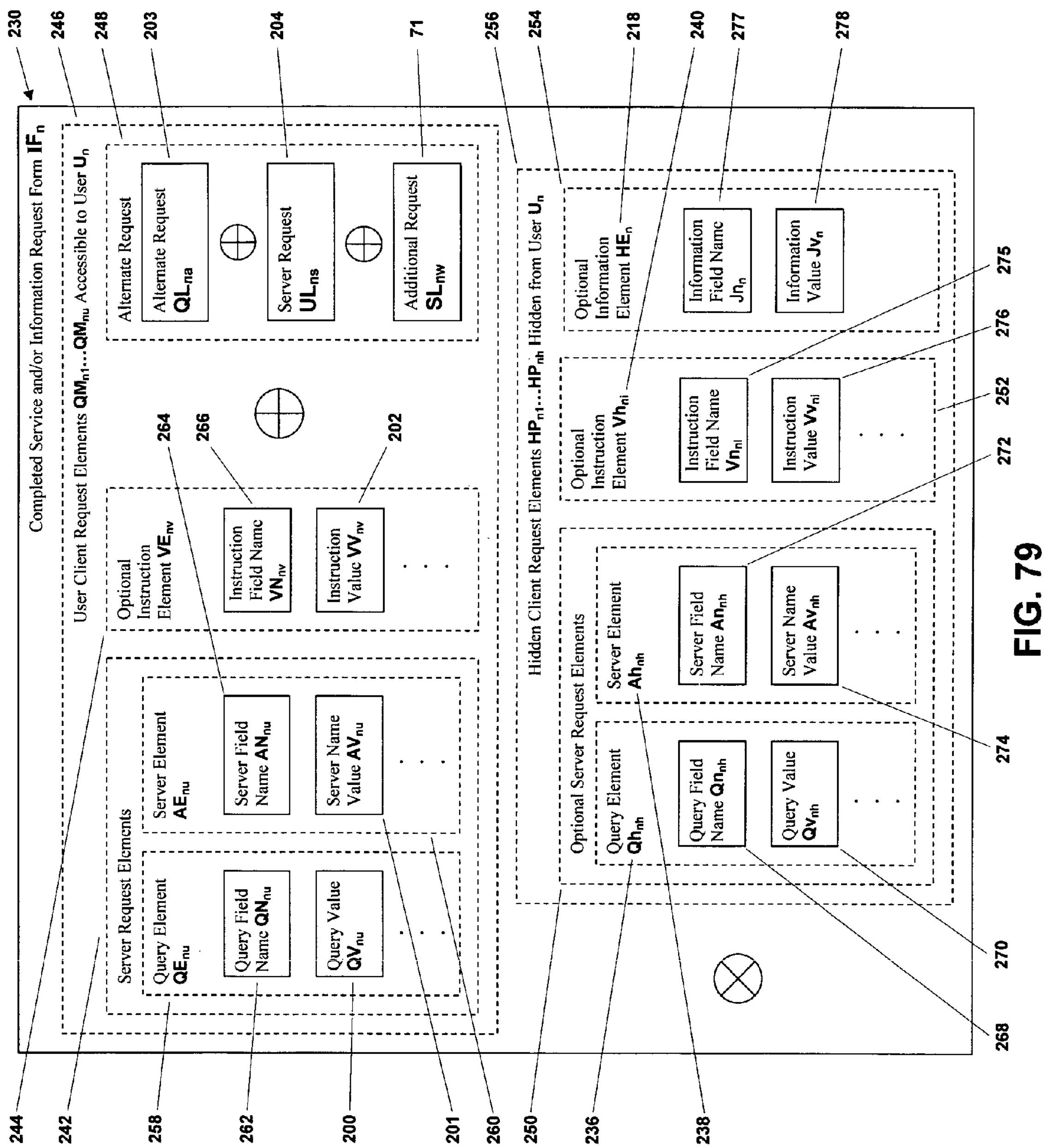
Figure 80:
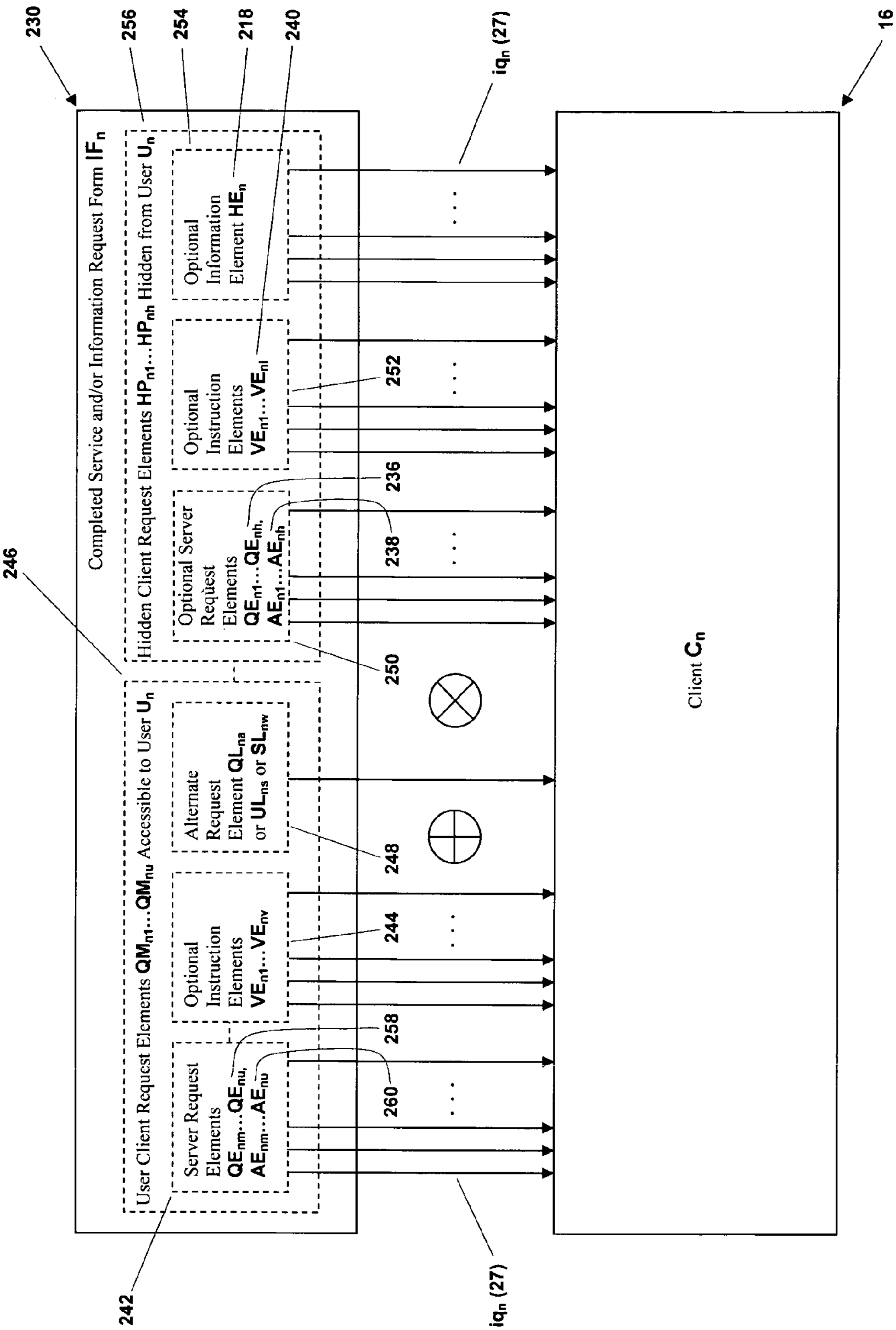
Figure 81:
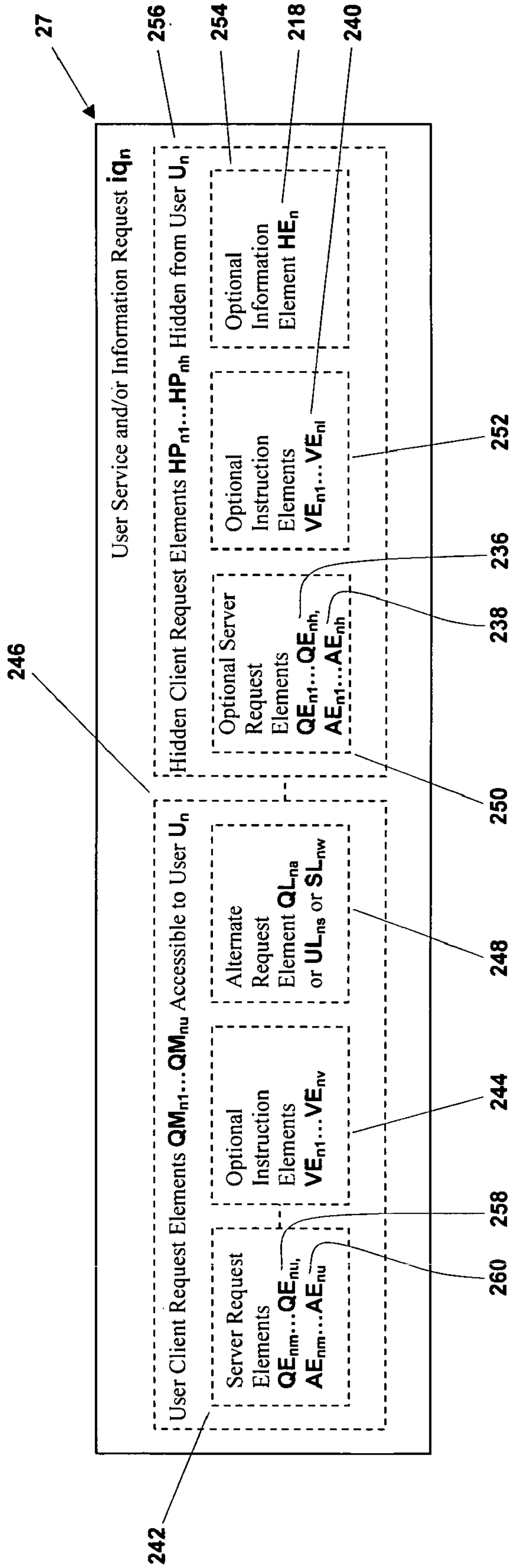
Figure 82:
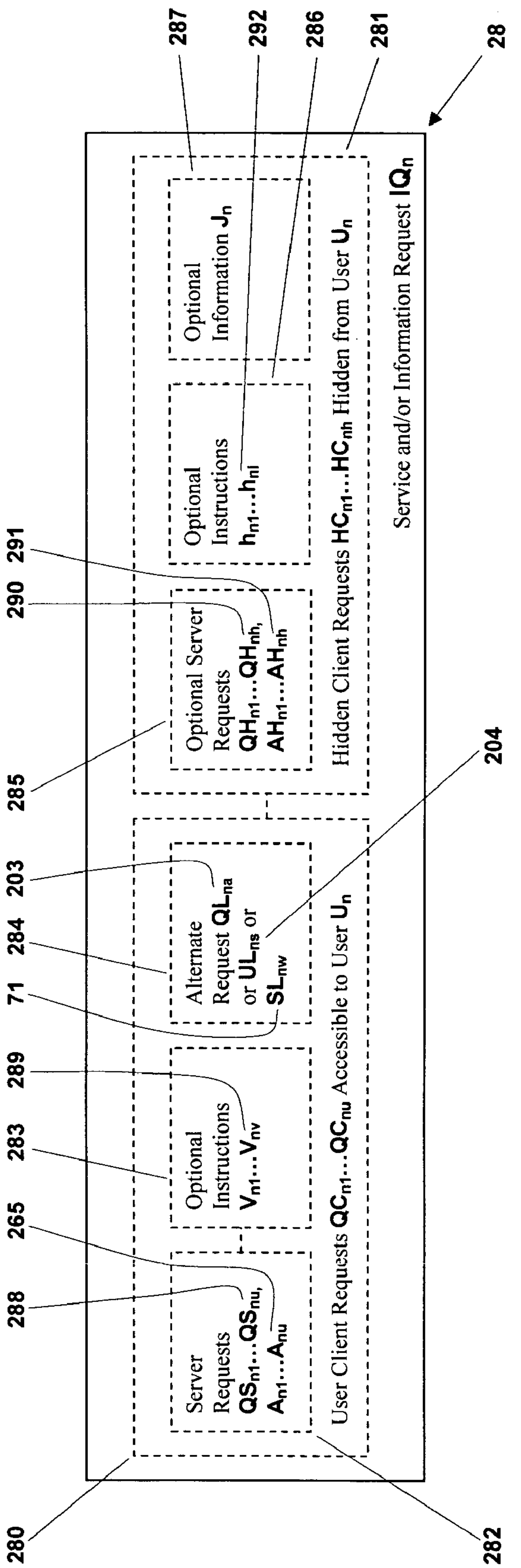
Figure 83:
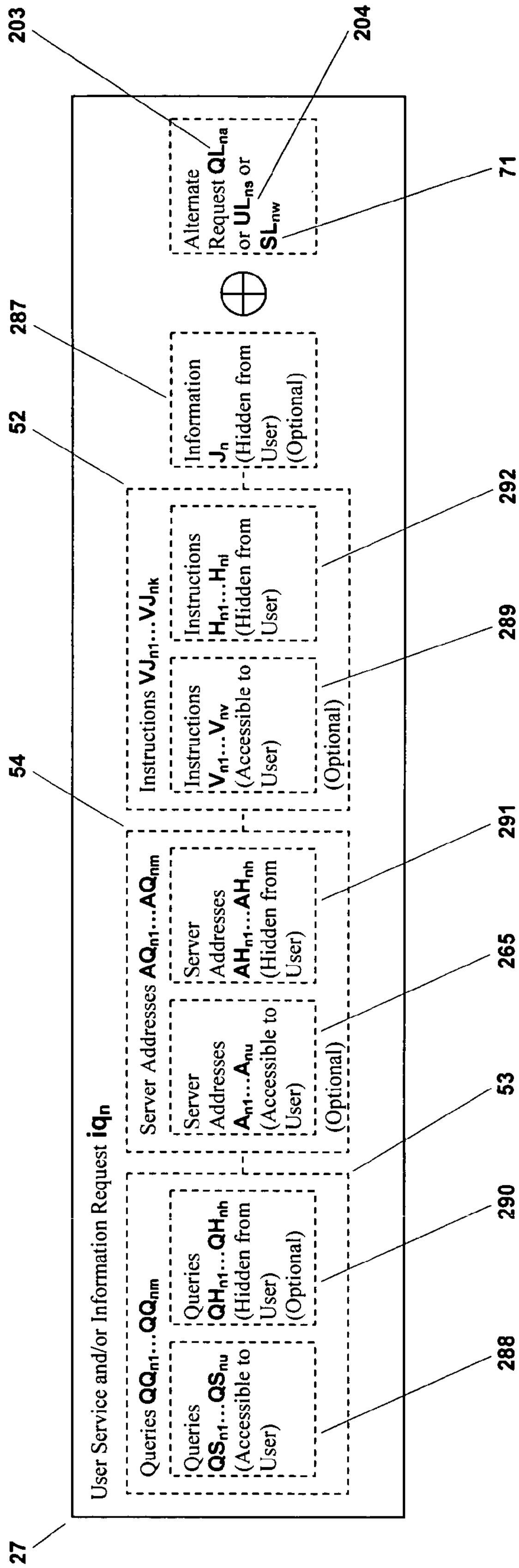
Figure 84:
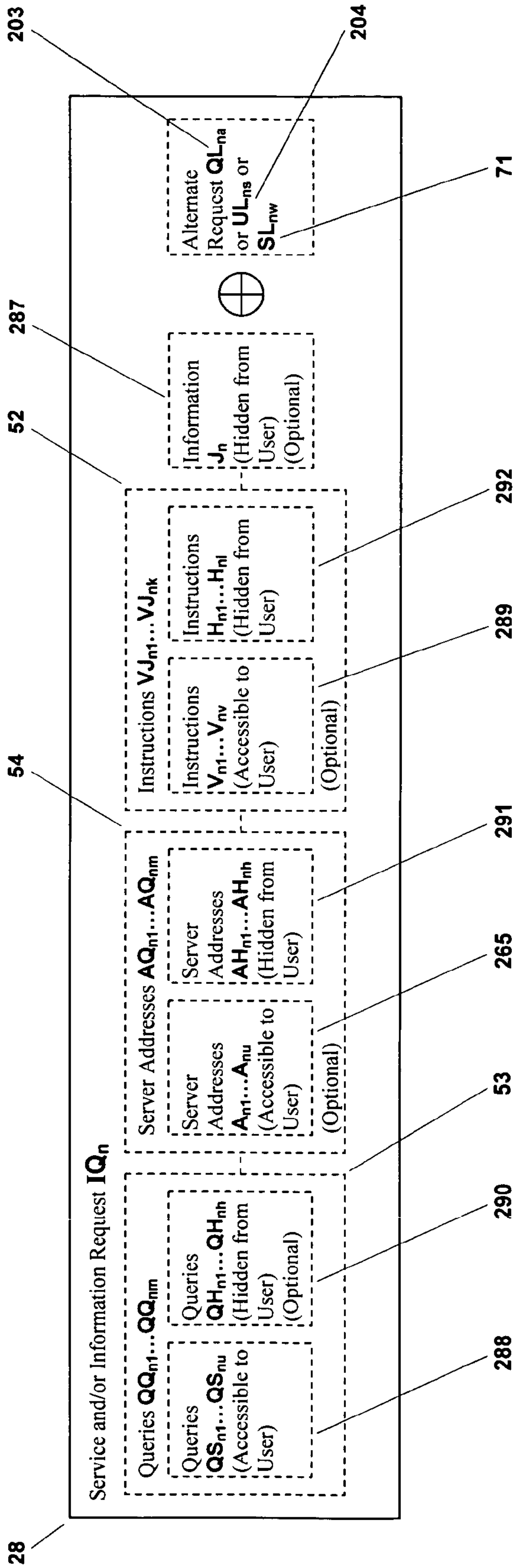
Figure 85:
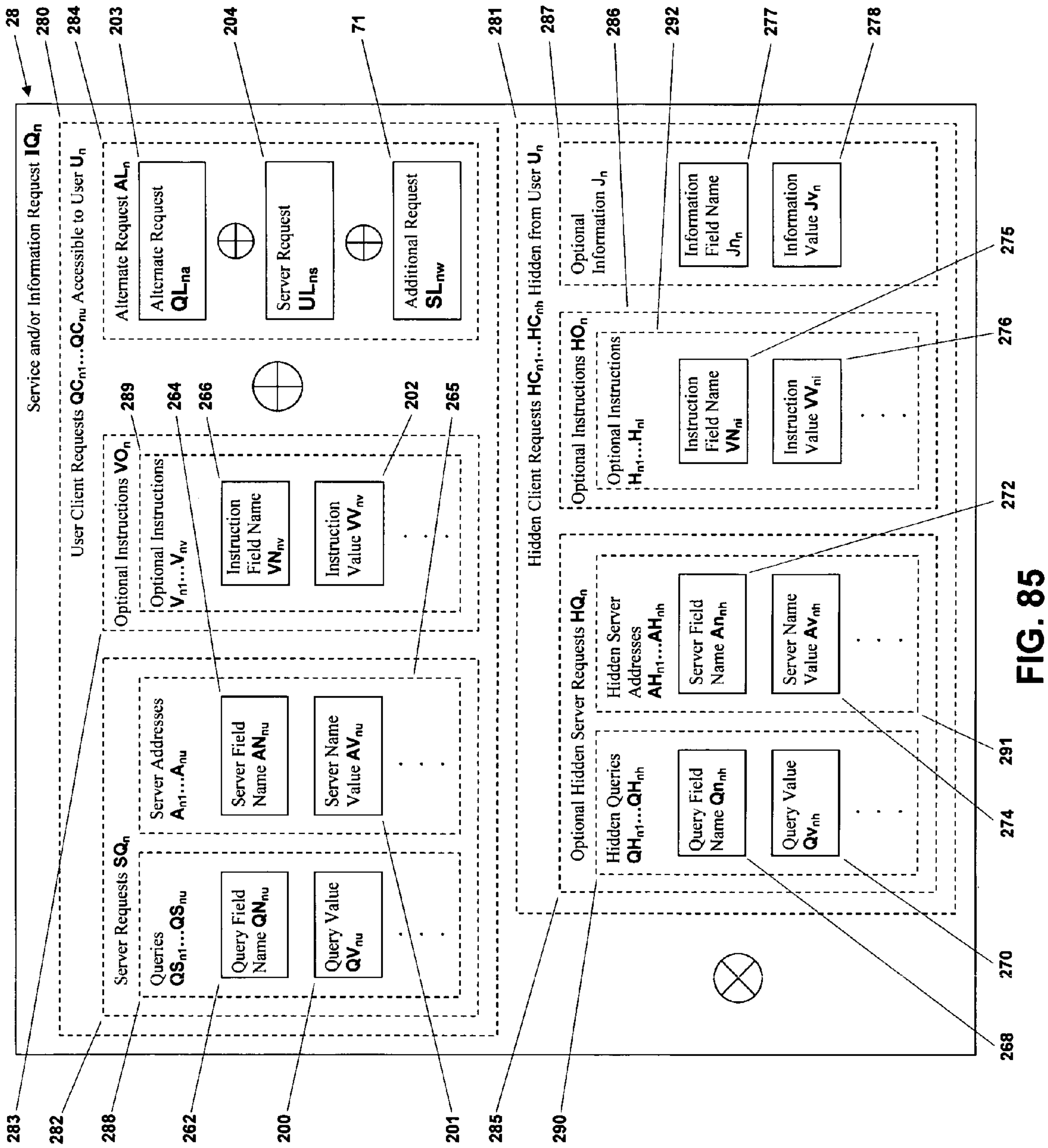
Figure 86:
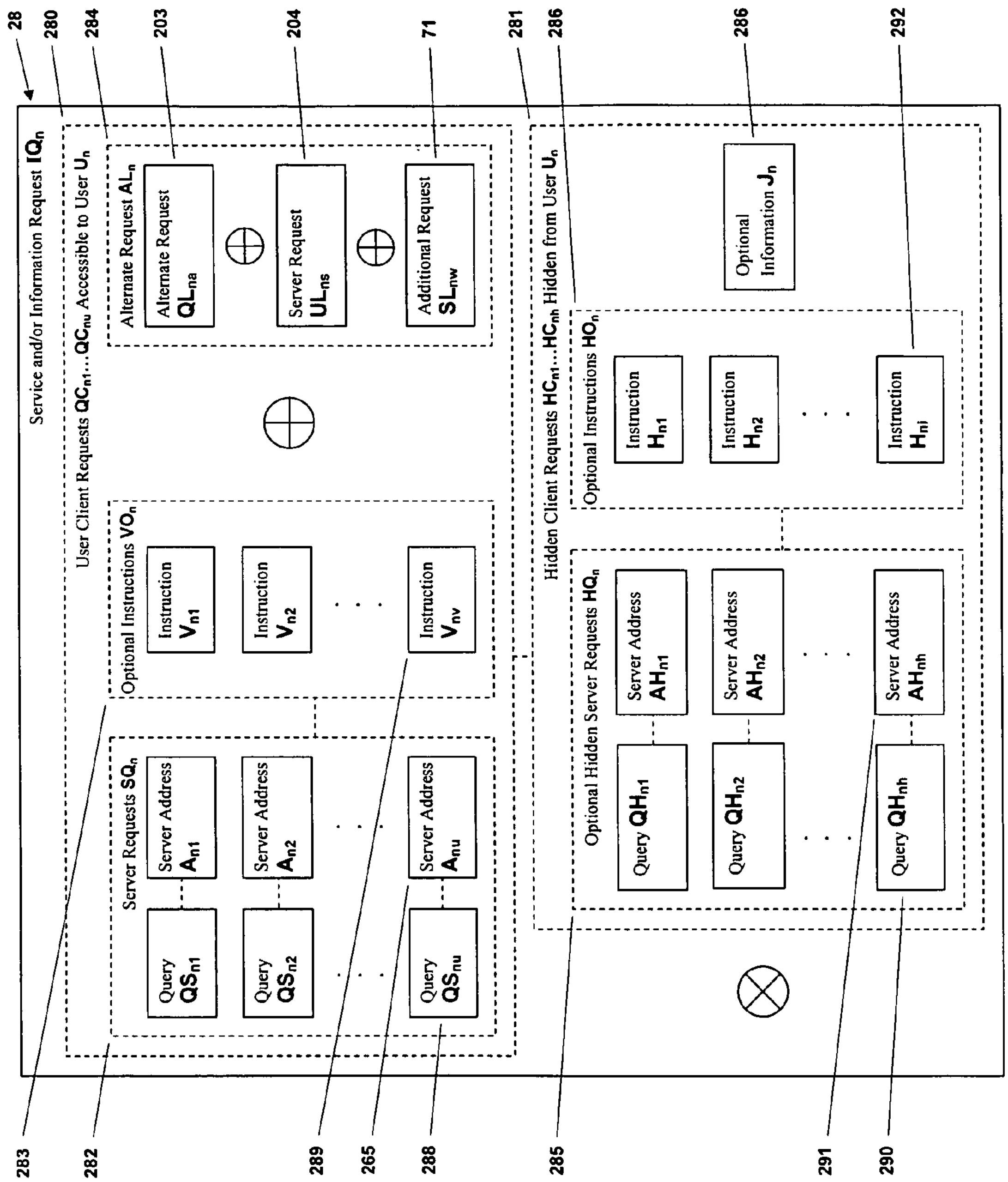
Figure 87:
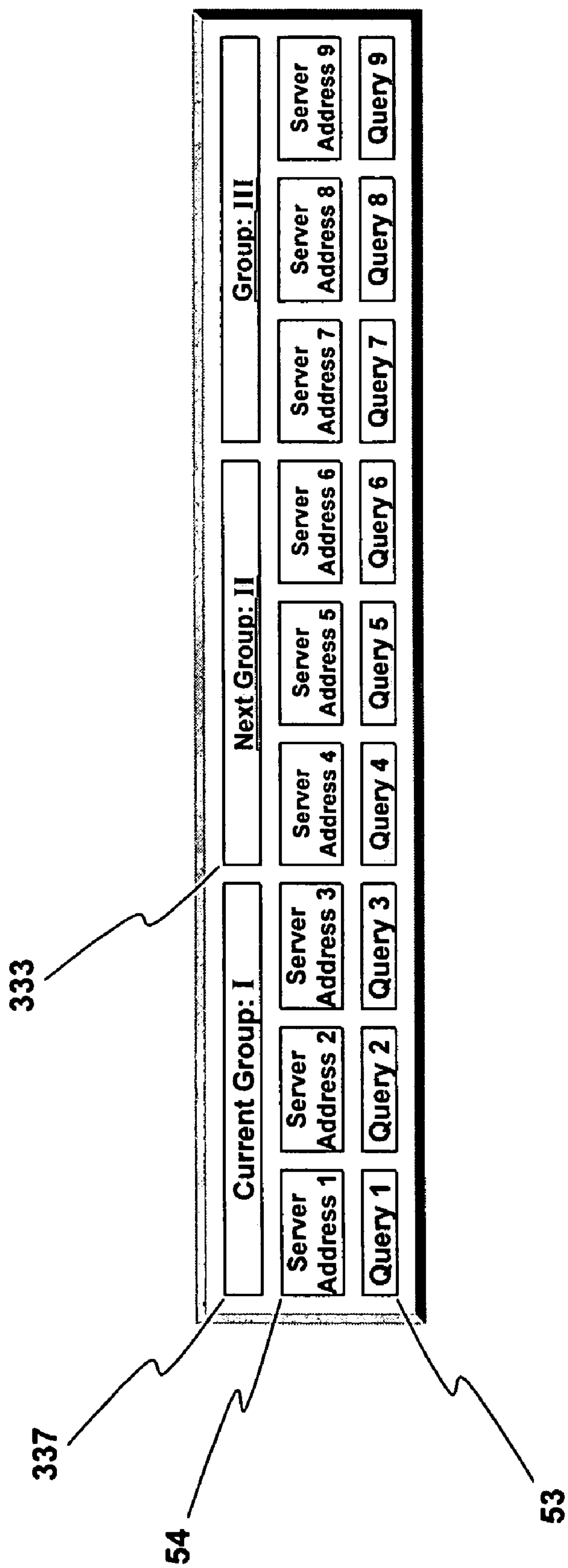
Figure 88:
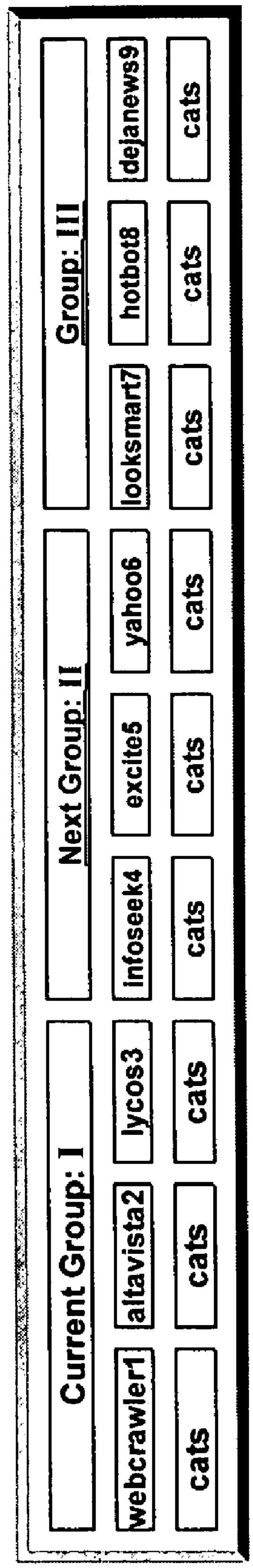
Figure 89:
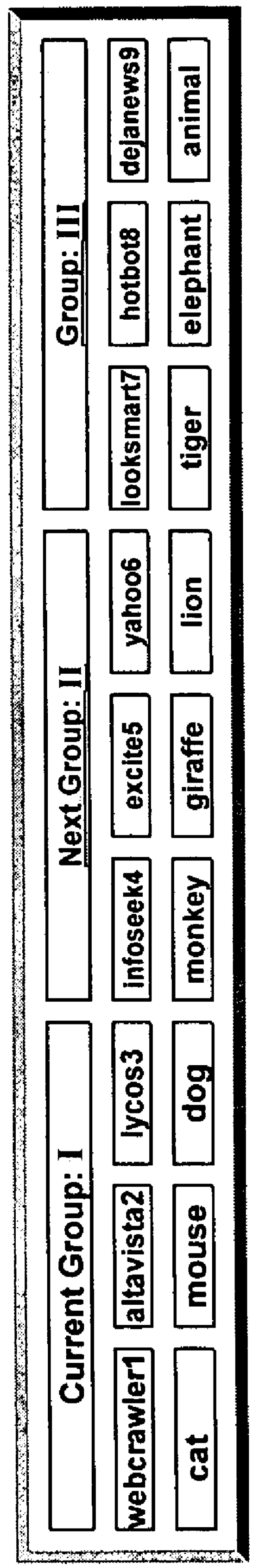
Figure 90:
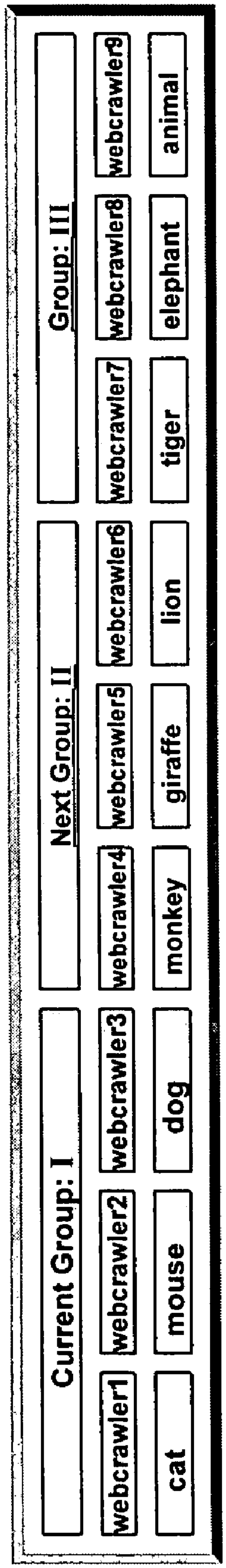
Figure 91:
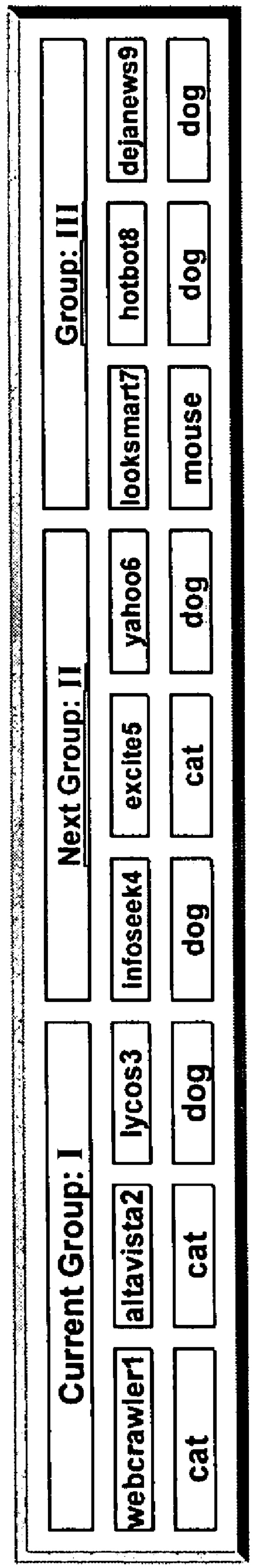
Figure 92:
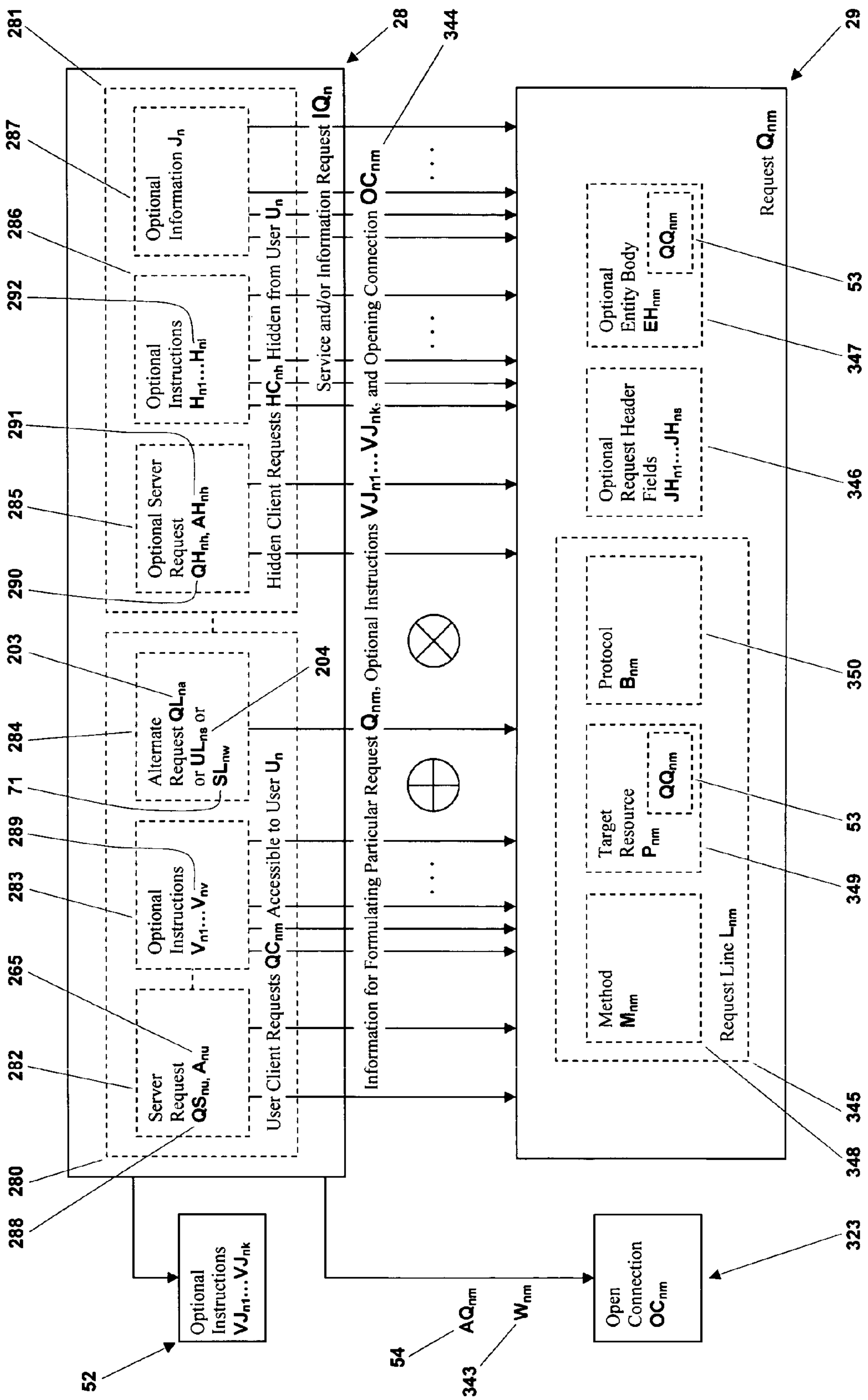
Figure 93:
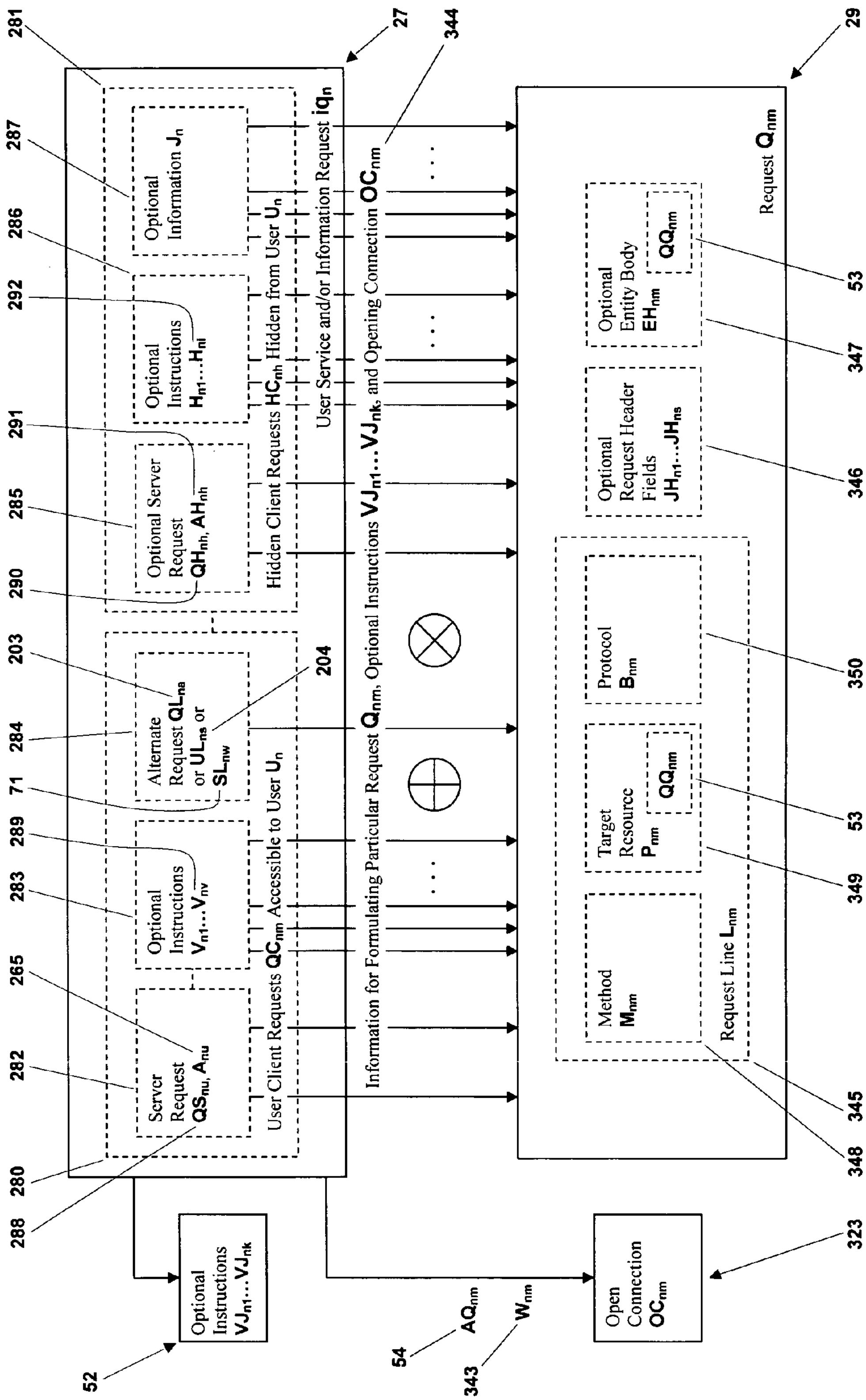
Figure 94:
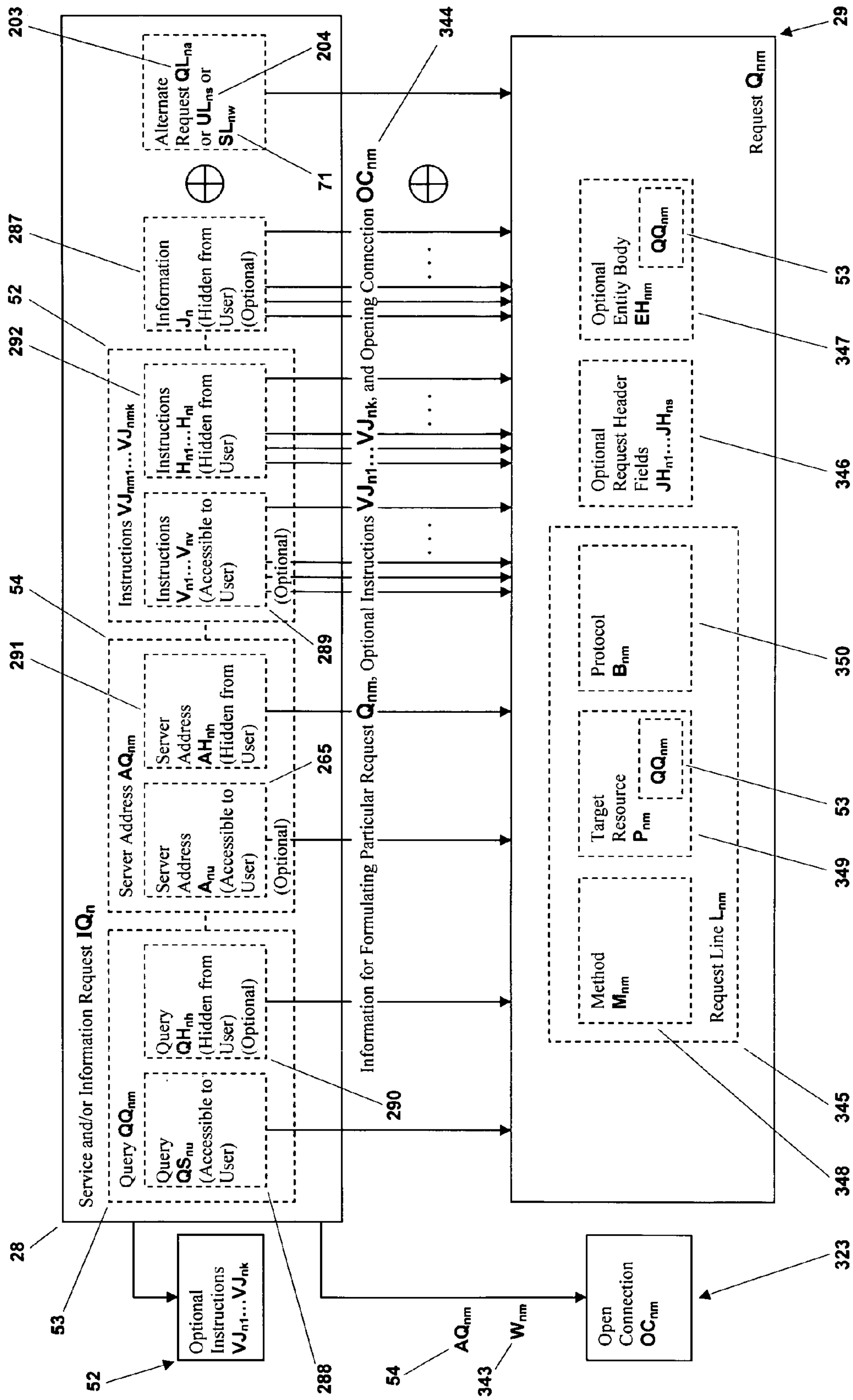
Figure 95:
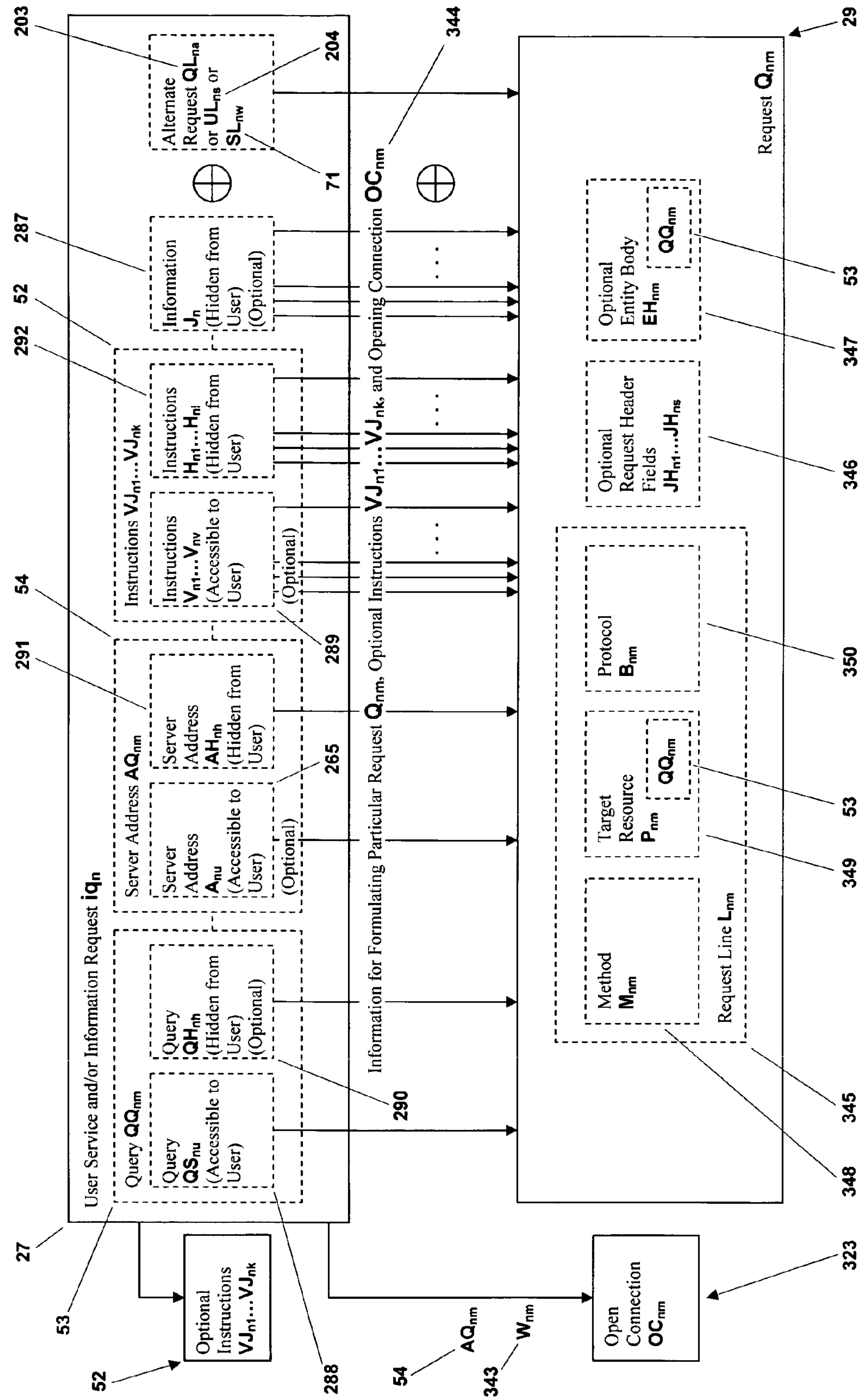
Figure 96:
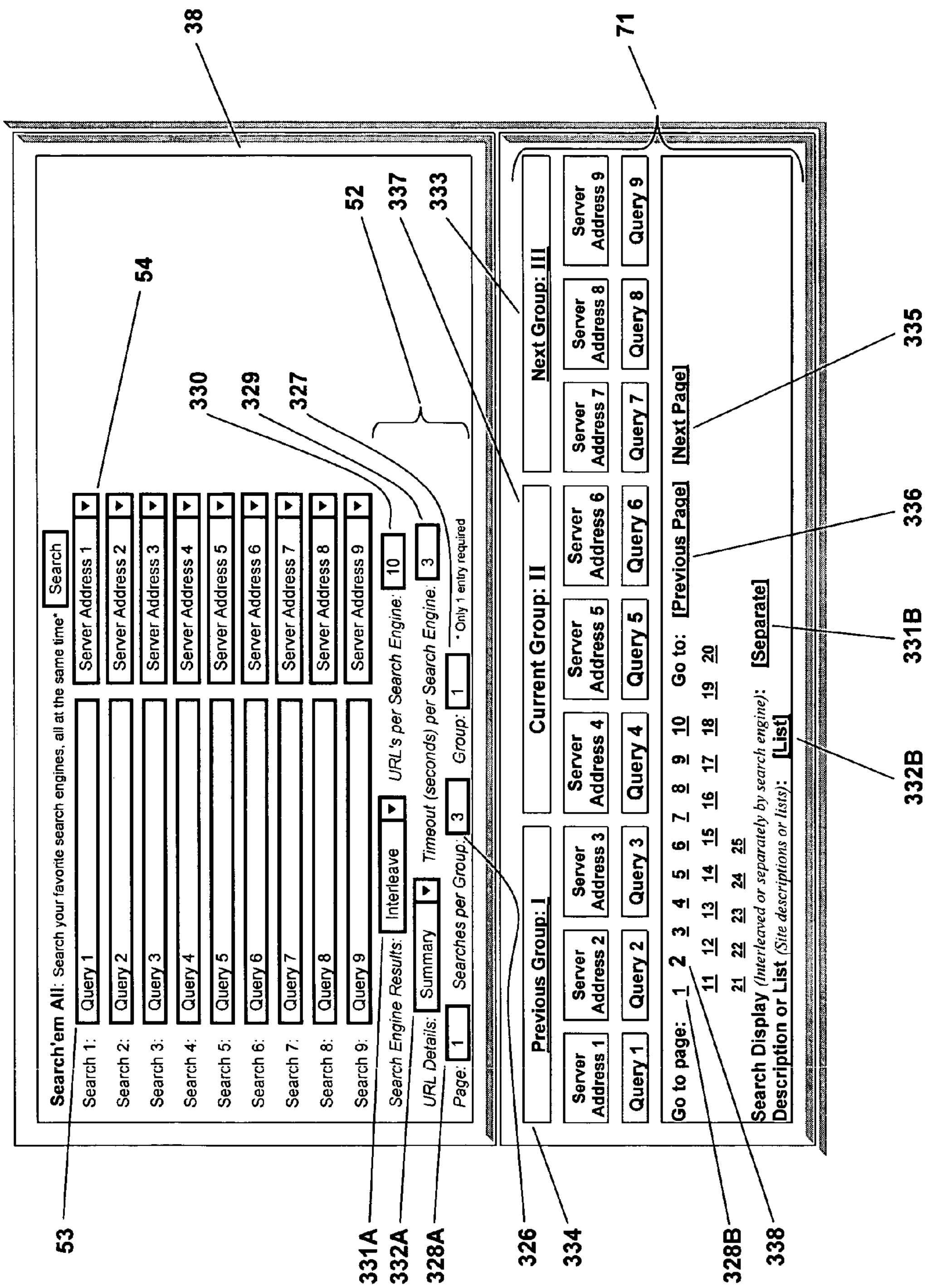
Figure 97:
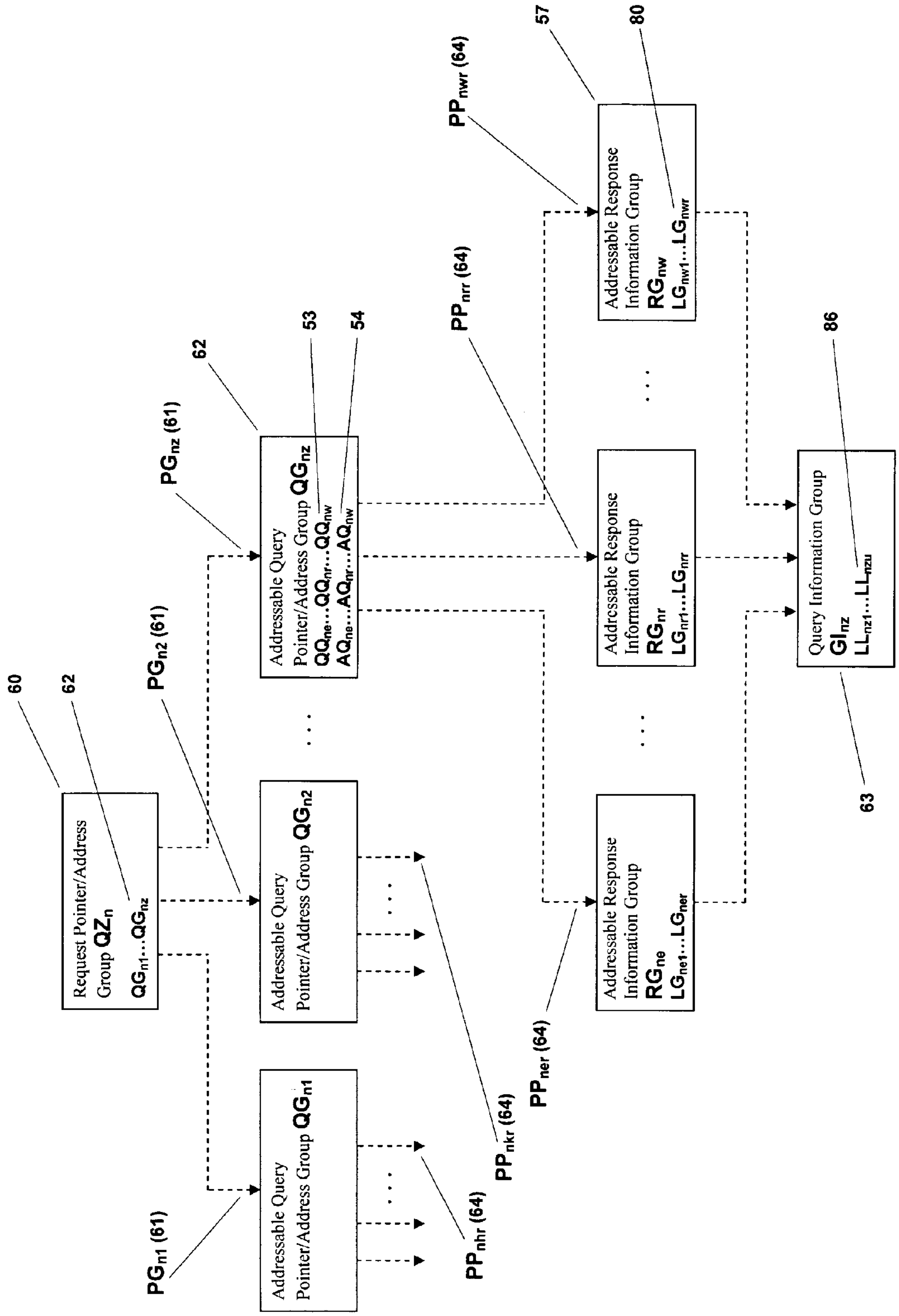
Figure 98:
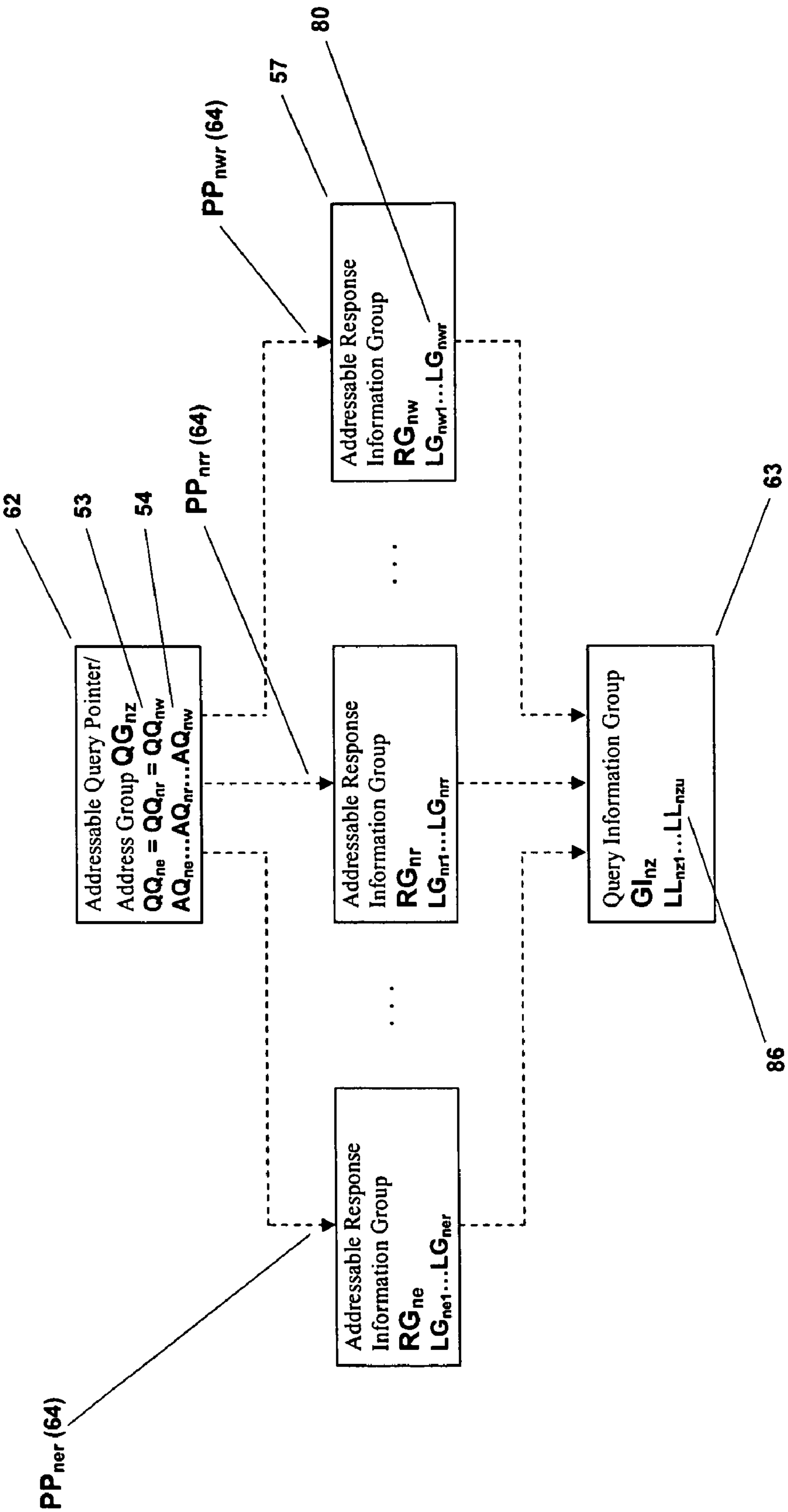
Figure 99:
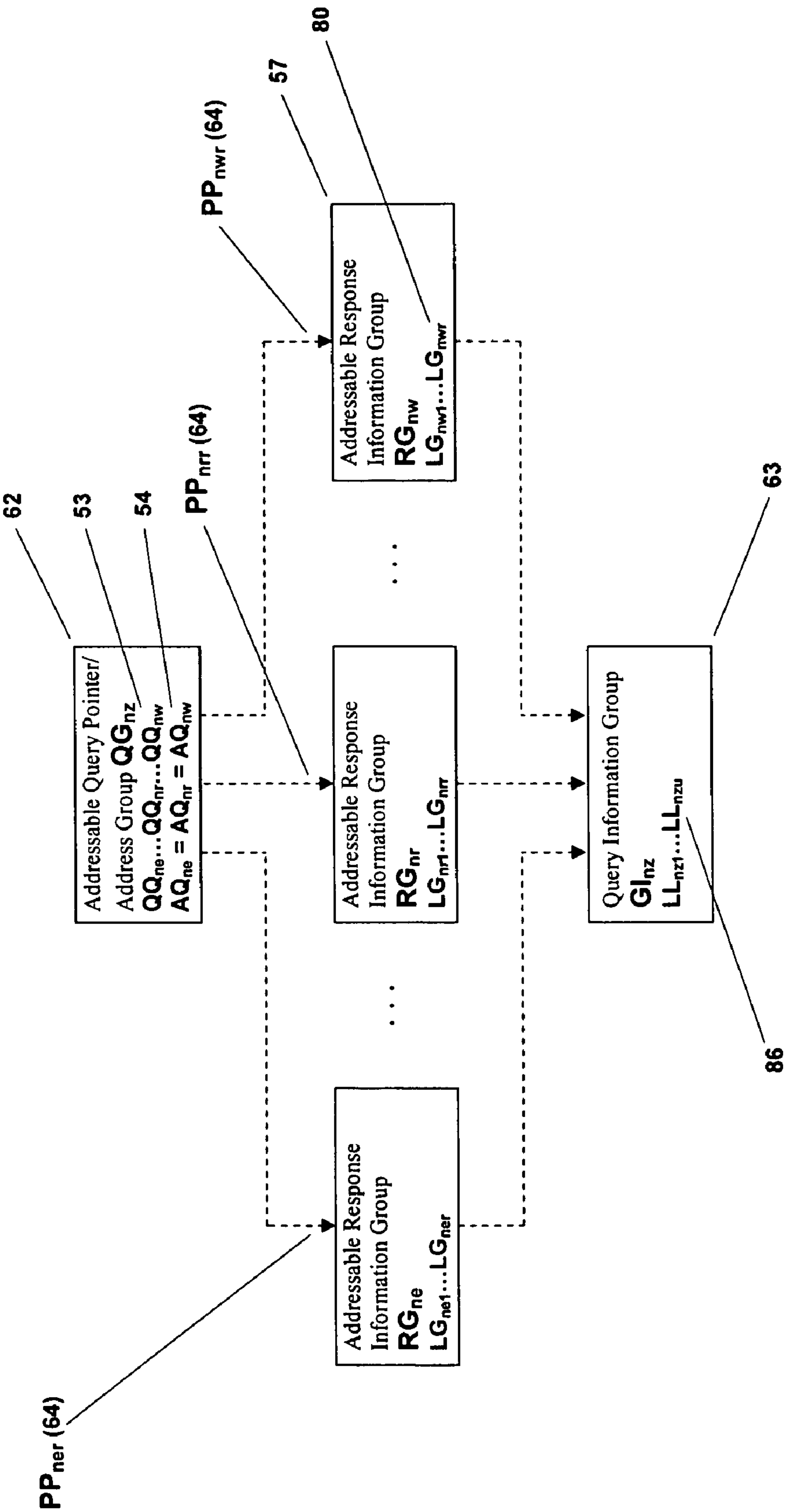
Figure 100:
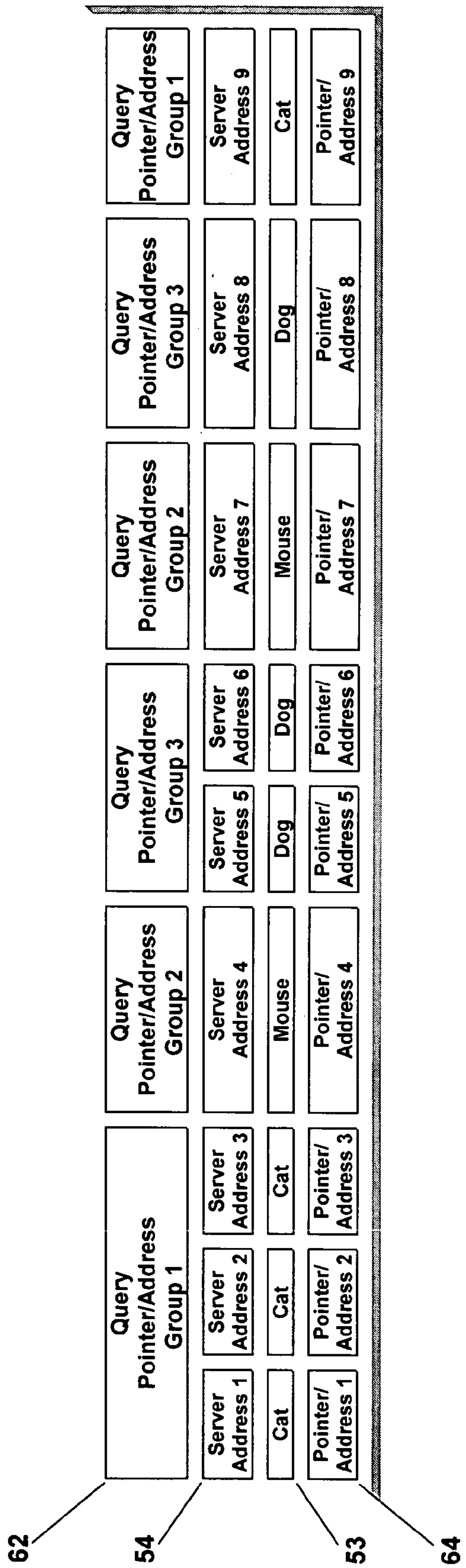
Figure 101:
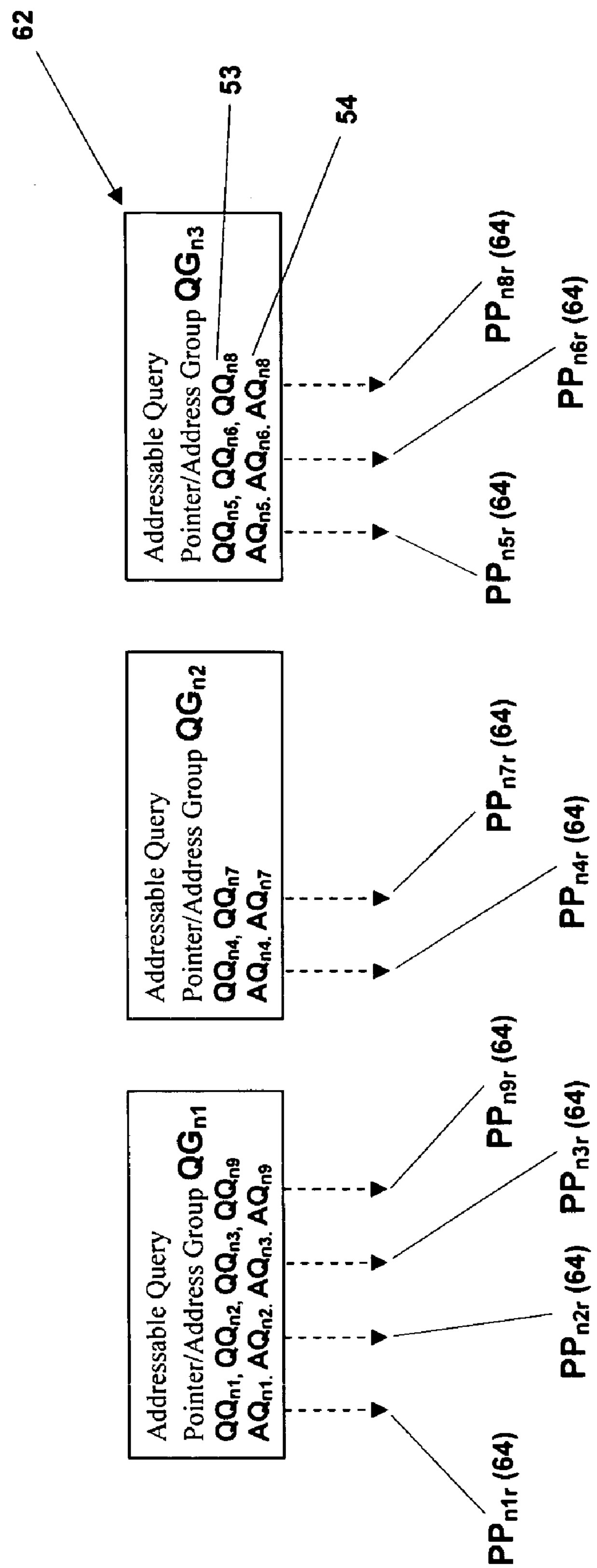
Figure 102:
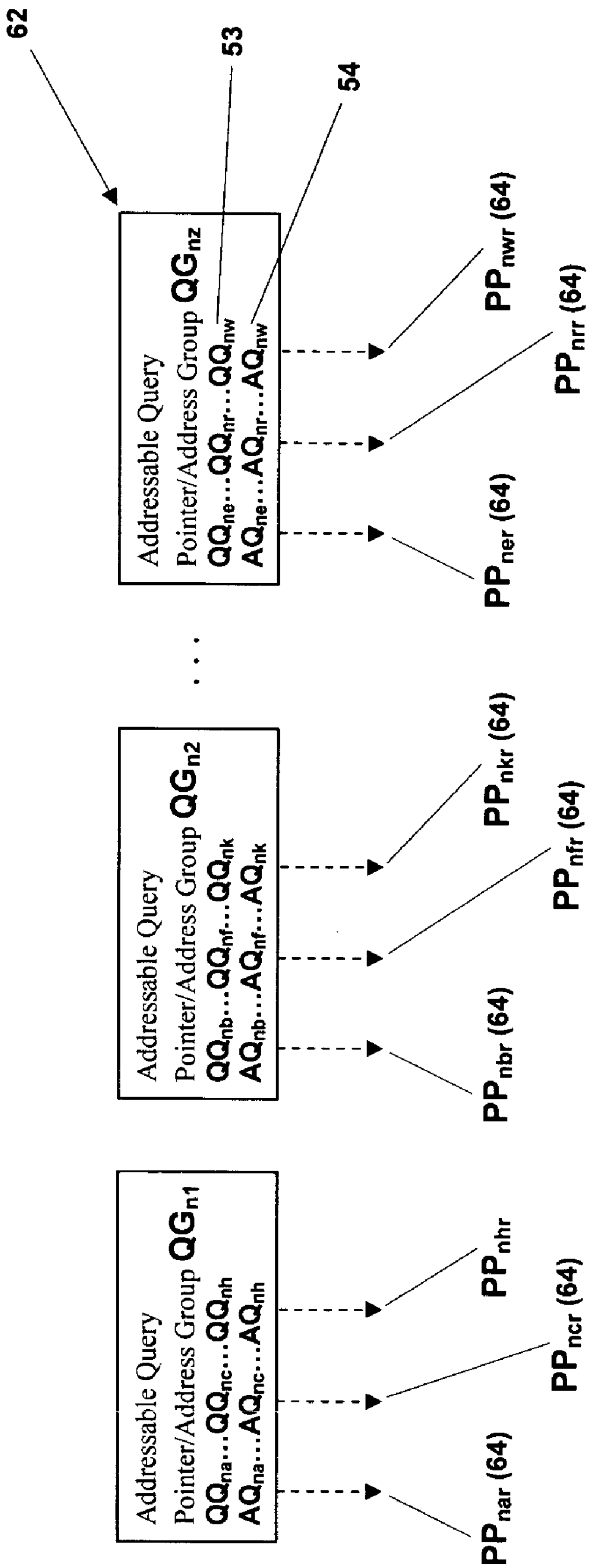
Figure 103:
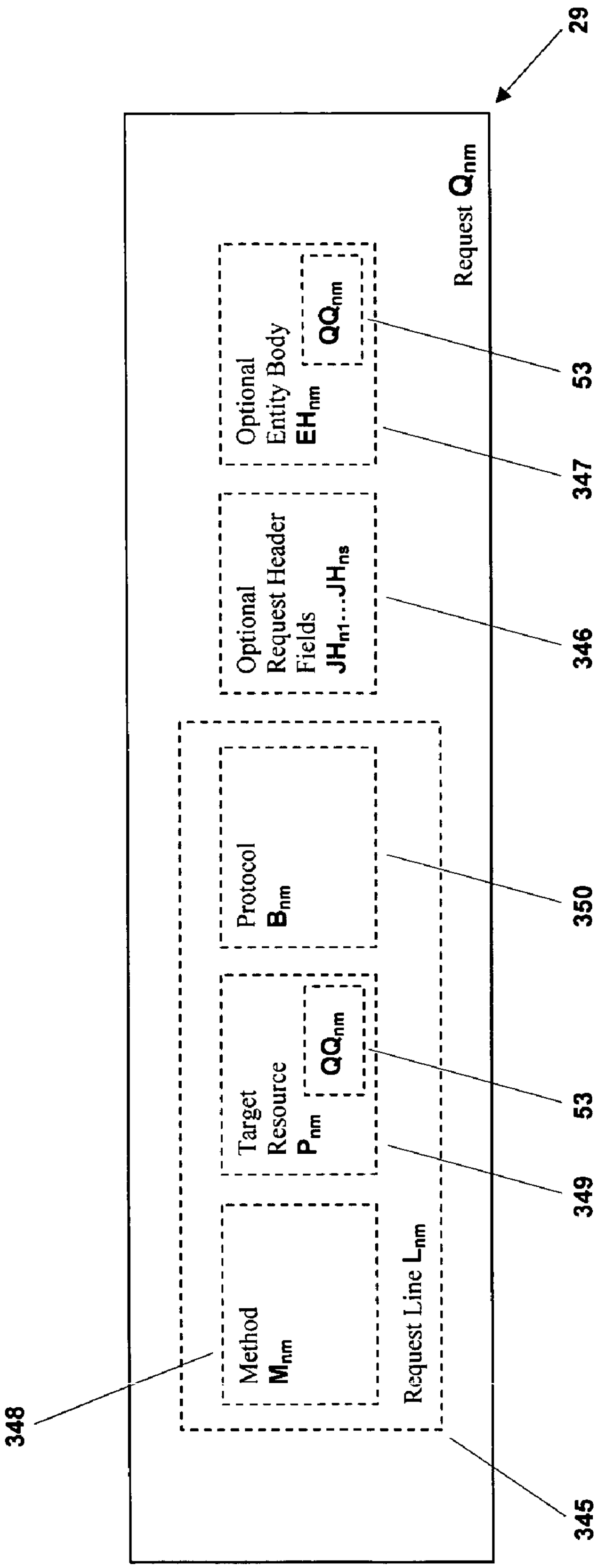
Figure 104:
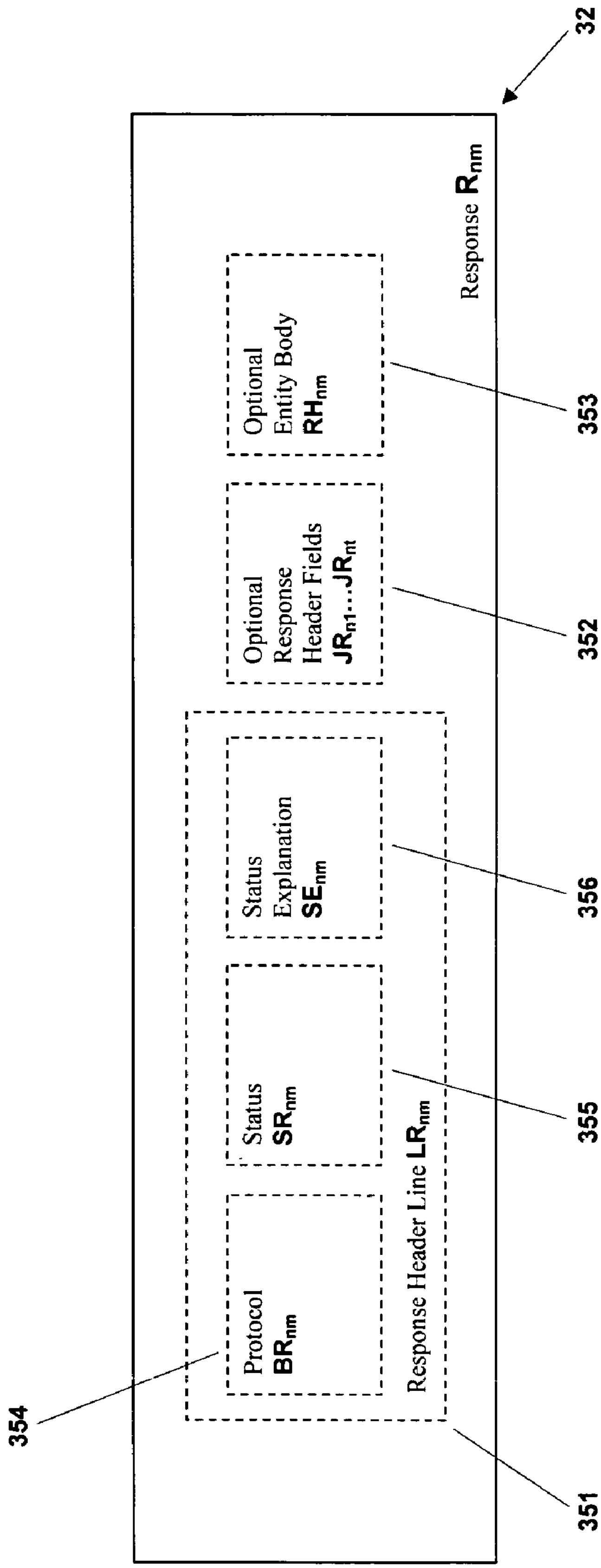
Figure 105:
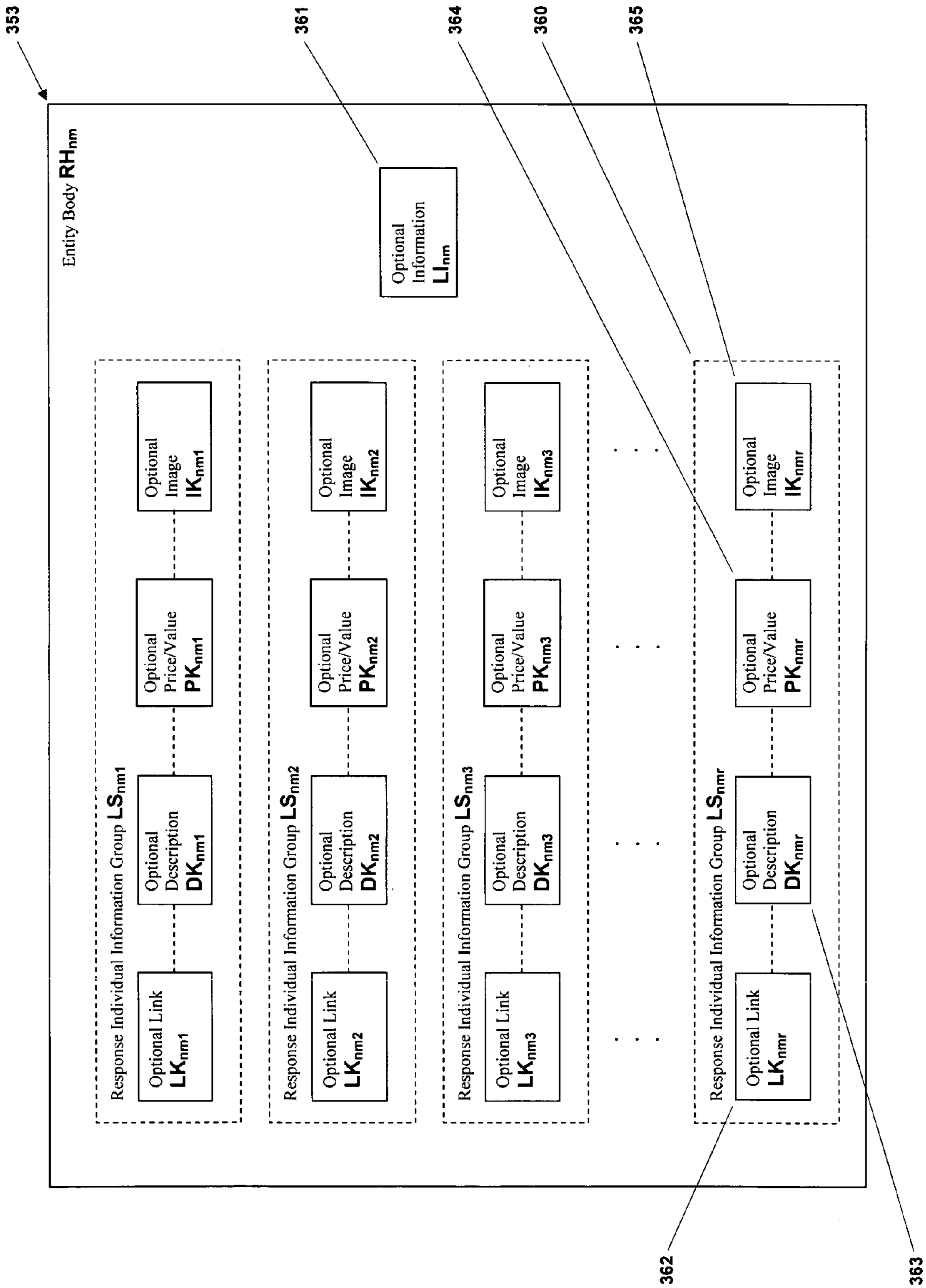
Figure 106:
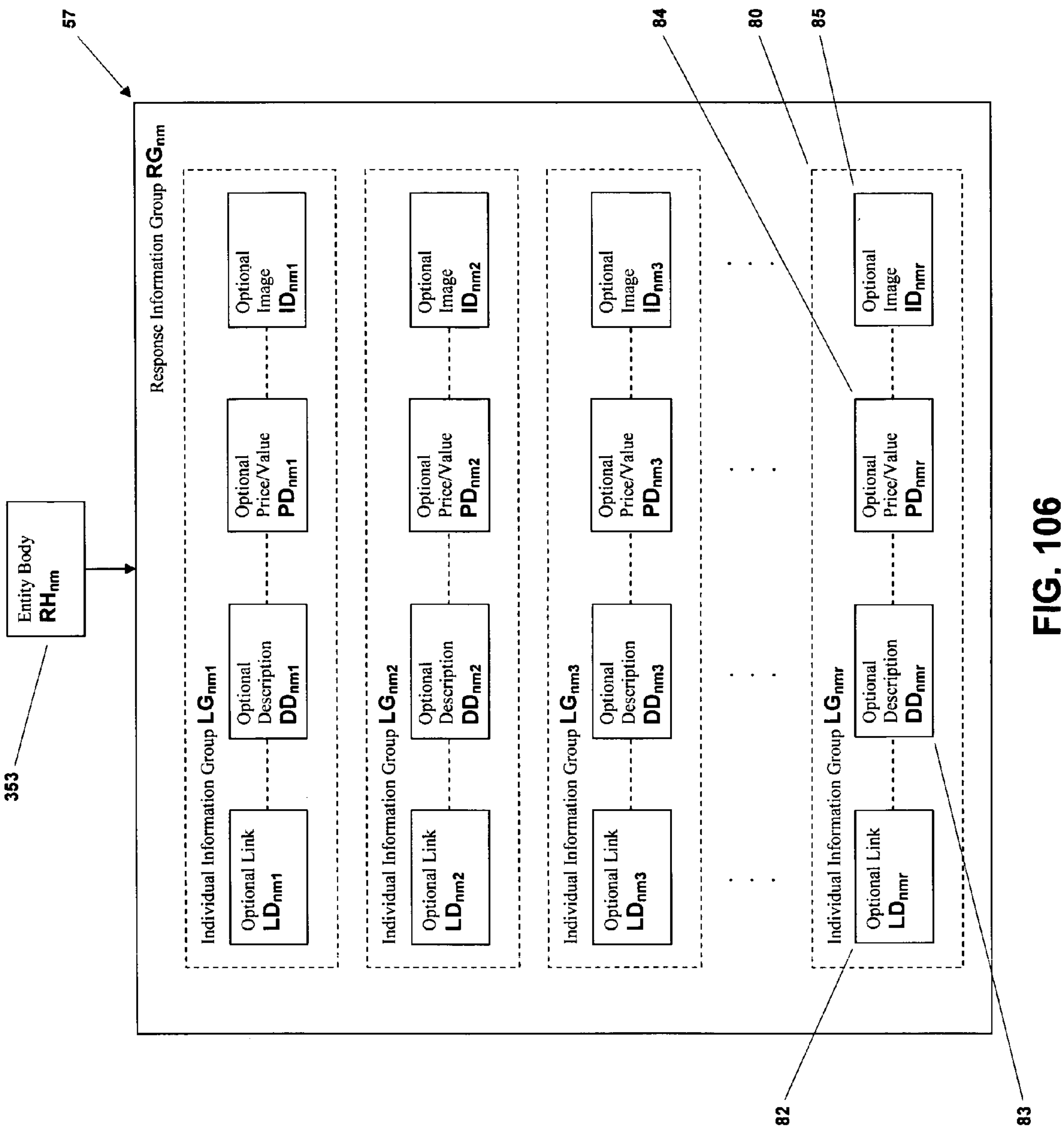
Figure 107:
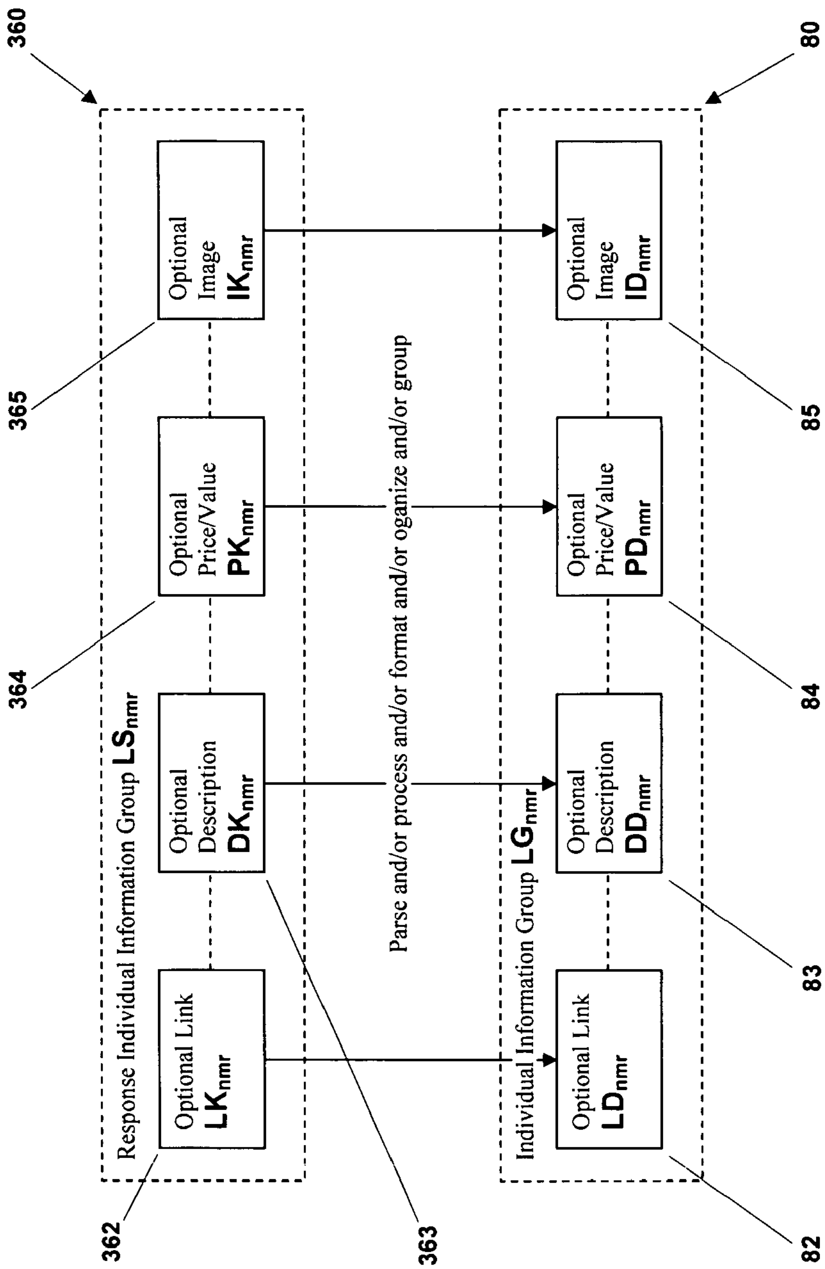
Figure 108:
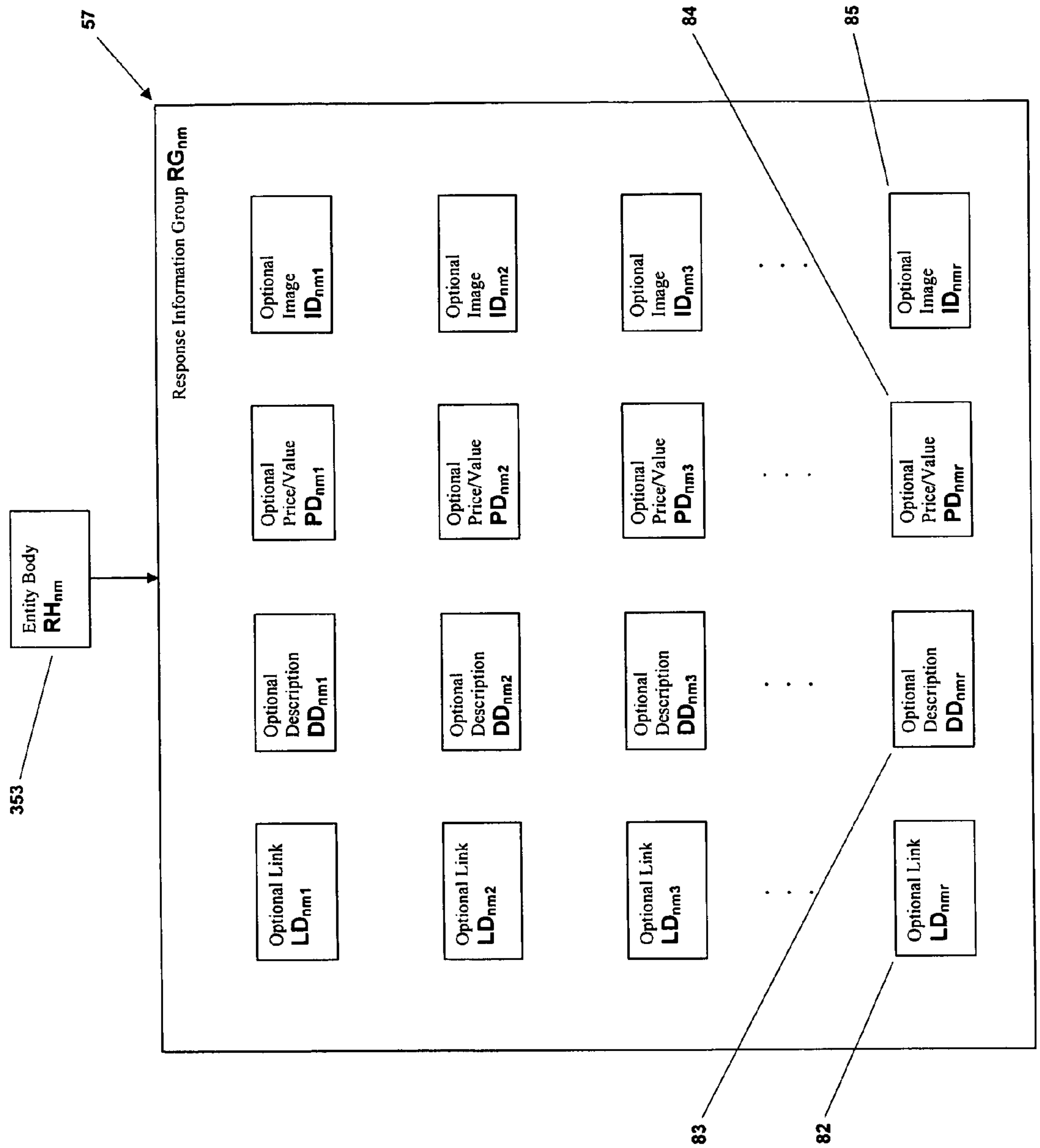
Figure 109:
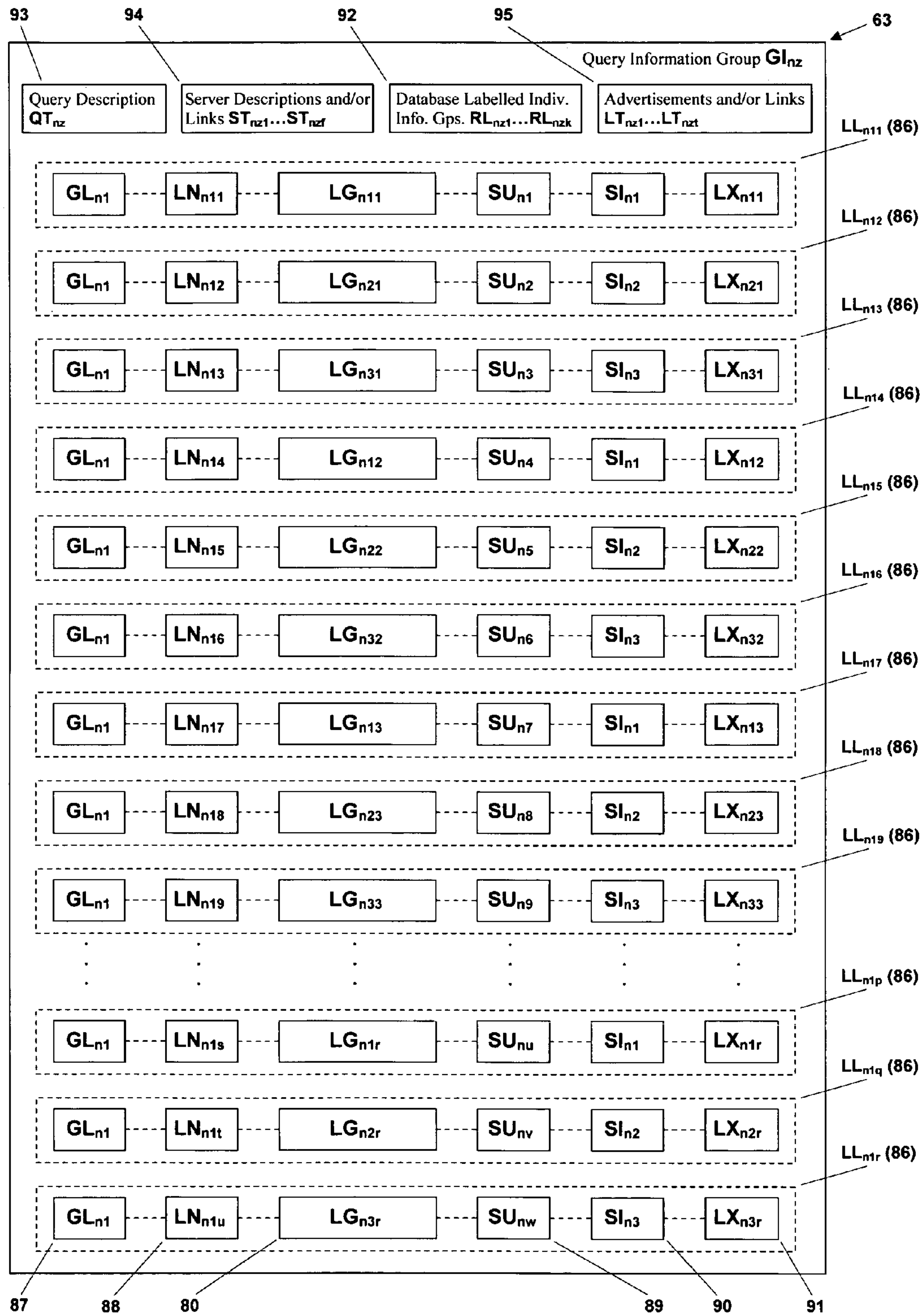

FIGS. 27A, 27B, and 27C depict a typical user response $UR_n$, as a typical service and/or information response form $IS_n$ at the user interface $I_n$, which may be communicated to the user $U_n$, illustrated in partial views;

FIGS. 28A, 28B, and 28C depict another typical user response $UR_n$, as the typical service and/or information response form $IS_n$ at the user interface $I_n$, which may be communicated to the user $U_n$, illustrated in partial views;

FIGS. 29A, 29B, and 29C depict another typical user response $UR_n$, as the typical service and/or information response form $IS_n$ at the user interface $I_n$, which may be communicated to the user $U_n$, illustrated in partial views;

FIGS. 30A and 30B depict another typical user response $UR_n$, as the typical service and/or information response form $IS_n$ at the user interface $I_n$, which may be communicated to the user $U_n$, illustrated in partial views;

FIGS. 31A and 31B depict another typical user response $UR_n$, as the typical service and/or information response form $IS_n$ at the user interface $I_n$, which may be communicated to the user $U_n$, illustrated in partial views;

FIGS. 32A and 32B depict another typical user response $UR_n$, as the typical service and/or information response form $IS_n$ at the user interface $I_n$, which may be communicated to the user $U_n$, illustrated in partial views;

FIGS. 33A, 33B, and 33C depict another typical user response $UR_n$, as the typical service and/or information response form $IS_n$ at the user interface $I_n$, which may be communicated to the user $U_n$, illustrated in partial views;

FIGS. 34A, 34B, and 34C depict another typical user response $UR_n$, as the typical service and/or information response form $IS_n$ at the user interface $I_n$, which may be communicated to the user $U_n$, illustrated in partial views;

FIGS. 35A, 35B, and 35C depict another typical user response $UR_n$, as the typical service and/or information response form $IS_n$ at the user interface $I_n$, which may be communicated to the user $U_n$, illustrated in partial views;

FIGS. 36A, 36B, and 36C depict another typical user response $UR_n$, as the typical service and/or information response form $IS_n$ at the user interface $I_n$, which may be communicated to the user $U_n$, illustrated in partial views;

FIGS. 37A, 37B, 37C, and 37D depict another typical user response $UR_n$, as the typical service and/or information response form $IS_n$ at the user interface $I_n$, which may be communicated to the user $U_n$, illustrated in partial views;

FIGS. 38A, 38B, 38C, and 38D depict another typical user response $UR_n$, as the typical service and/or information response form $IS_n$ at the user interface $I_n$, which may be communicated to the user $U_n$, illustrated in partial views;

FIGS. 39A, 39B, and 39C depict another typical user response $UR_n$, as the typical service and/or information response form $IS_n$ at the user interface $I_n$, which may be communicated to the user $U_n$, illustrated in partial views;

FIGS. 40A, 40B, 40C, 40D, 40E, 40F, 40G, 40H, 40I, 40J, 40K, 40L, and 40M depict another typical user response $UR_n$, as the typical service and/or information response form $IS_n$ at the user interface $I_n$, which may be communicated to the user $U_n$, illustrated in partial views;

FIGS. 41A, 41B, 41C, 41D, 41E, and 41F depict another typical user response $UR_n$, as the typical service and/or information response form $IS_n$ at the user interface $I_n$, which may be communicated to the user $U_n$, illustrated in partial views;

FIGS. 42A, 42B, 42C, 42D, 42E, 42F, 42G, 42H, 42I, 42J, 42K, 42L, 42M, 42N, and 42O depict another typical user response $UR_n$, as the typical service and/or information response form $IS_n$ at the user interface $I_n$, which may be communicated to the user $U_n$, illustrated in partial views;

FIGS. 43A, 43B, 43C, 43D, 43E, 43F, 43G, 43H, 43I, 43J, 43K, 43L, 43M, 43N, and 43O depict another typical user response $UR_n$, as the typical service and/or information response form $IS_n$ at the user interface $I_n$, which may be communicated to the user $U_n$, illustrated in partial views;

FIGS. 44A, 44B, and 44C depict another typical user response $UR_n$, as the typical service and/or information response form $IS_n$ at the user interface $I_n$, which may be communicated to the user $U_n$, illustrated in partial views;

FIGS. 45A, 45B, and 45C depict another typical user response $UR_n$, as the typical service and/or information response form $IS_n$ at the user interface $I_n$, which may be communicated to the user $U_n$, illustrated in partial views;

FIGS. 46A, 46B, 46C, 46D, and 46E depict another typical user response $UR_n$, as the typical service and/or information response form $IS_n$ at the user interface $I_n$, which may be communicated to the user $U_n$, illustrated in partial views;

FIGS. 47A, 47B, and 47C depict another typical user response $UR_n$, as the typical service and/or information response form $IS_n$ at the user interface $I_n$, which may be communicated to the user $U_n$, illustrated in partial views;

FIGS. 48A, 48B, 48C, and 48D depict another typical user response $UR_n$, as the typical service and/or information response form $IS_n$ at the user interface $I_n$, which may be communicated to the user $U_n$, illustrated in partial views;

FIGS. 49A, 49B, 49C, 49D, 49E, 49F, 49G, 49H, and 49I depict another typical user response $UR_n$, as the typical service and/or information response form $IS_n$ at the user interface $I_n$, which may be communicated to the user $U_n$, illustrated in partial views;

FIGS. 50A, 50B, 50C, 50D, 50E, 50F, 50G, 50H, 50I, 50J, and 50K depict another typical user response $UR_n$, as the typical service and/or information response form $IS_n$ at the user interface $I_n$, which may be communicated to the user $U_n$, illustrated in partial views;

FIGS. 51A, 51B, 51C, 51D, 51E, 51F, and 51G depict another typical user response $UR_n$, as the typical service and/or information response form $IS_n$ at the user interface $I_n$, which may be communicated to the user $U_n$, illustrated in partial views;

FIGS. 52A, 52B, and 52C depict another typical user response $UR_n$, as the typical service and/or information response form $IS_n$ at the user interface $I_n$, which may be communicated to the user $U_n$, illustrated in partial views;

FIG. 53A is a schematic representation of a server PS of the client-server multitasking system having an optional database;

FIG. 53B is a schematic representation of a client $C_n$ of the client-server multitasking system having an optional database;

FIG. 54 is a schematic representation of a particular one of the clients $C_1 \ldots C_n$ of the client-server multitasking system, designated as the particular client $C_n$, communicating with ones of the servers $S_1 \ldots S_z$, in accordance with the designation scheme corresponding to the corresponding ones of the server designations $S_{n1} \ldots S_{nm}$, corresponding to the requests $Q_{n1} \ldots Q_{nm}$, through the server PS;

FIG. 55 is a schematic representation of the particular client $C_n$ of the client-server multitasking system communicating with ones of the servers $S_1 \ldots S_z$, in accordance with the designation scheme corresponding to the corresponding ones of the server designations $S_{n1} \ldots S_{nm}$, corresponding to the requests $Q_{n1} \ldots Q_{nm}$;

FIG. 56 is a schematic representation of the particular client $C_n$ of the client-server multitasking system communicating with ones of the servers $S_1 \ldots S_z$, in accordance with the designation scheme corresponding to the corresponding ones of the server designations $S_{n1} \ldots S_{nm}$, corresponding to the requests $Q_{n1} \ldots Q_{nm}$, and also through the server PS;

FIG. 57 is an alternate schematic representation of the client-server multitasking system of FIG. 1, constructed in accordance with the present invention, regrouped diagrammatically and alternatively named for illustrative purposes only, to illustrate and visualize possible typical communication paths;

FIG. 58 is a schematic representation of a particular service and/or information request $IQ_n$;

FIG. 59 is a schematic representation of a particular service and/or information request $IQ_n$ parsed, processed, and/or formatted into a current request group $QA_{nc}$, request groups $QA_{n1} \ldots QA_{nz}$, and corresponding optional instructions $VJ_{n1} \ldots VJ_{nk}$, and utilization of information therefrom to make the requests $Q_{n1} \ldots Q_{nm}$, obtains the responses $R_{n1} \ldots R_{nm}$, and incorporate information therefrom into a particular service and/or information response $IR_n$;

FIG. 60 is a schematic representation of the particular service and/or information request $IQ_n$ parsed, processed, and/or formatted into a current request group $QA_{nc}$, request groups $QA_{n1} \ldots QA_{nz}$, and corresponding optional instructions $VJ_{n1} \ldots VJ_{nk}$, and utilization of information therefrom to make the requests $Q_{n1} \ldots Q_{nm}$, obtain the responses $R_{n1} \ldots R_{nm}$, and incorporate information therefrom into the particular service and/or information response $IR_n$, having other grouping/sorting that may be used additionally and/or alternatively to that of FIG. 59;

FIG. 61 is a schematic representation of the particular service and/or information response $IR_n$ having a service and/or information group $G_n$, additional request links $SL_{n1} \ldots SL_{nw}$, optional order form, optional additional advertisements and/or links, optional hidden information, and the optional service and/or information entry request form;

FIG. 62 is a schematic representation of a particular user service and/or information request $iq_n$;

FIG. 63 is a schematic representation of a particular user service and/or information request $iq_n$ parsed, processed, and/or formatted into the current request group $QA_{nc}$, the request groups $QA_{n1} \ldots QA_{nz}$, and the corresponding optional instructions $VJ_{n1} \ldots VJ_{nk}$, and utilization of information therefrom to make the requests $Q_{n1} \ldots Q_{nm}$, obtain the responses $R_{n1} \ldots R_{nm}$, and incorporate information therefrom into the particular user service and/or information response $ir_n$;

FIG. 64 is a schematic representation of the particular user service and/or information request $iq_n$ parsed, processed, and/or formatted into the current request group $QA_{nc}$, the request groups $QA_{n1} \ldots QA_{nz}$, and the corresponding optional instructions $VJ_{n1} \ldots VJ_{nk}$, and utilization of information therefrom to make the requests $Q_{n1} \ldots Q_{nm}$, obtain the responses $R_{n1} \ldots R_{nm}$, and incorporate information therefrom into the particular user service and/or information response $ir_n$, having other grouping/sorting that may be used additionally and/or alternatively to that of FIG. 63;

FIG. 65 is a schematic representation of the particular user service and/or information response $ir_n$ having the service and/or information group $G_n$, the additional request links $SL_{n1} \ldots SL_{nw}$, the optional order form, the optional additional advertisements and/or links, the optional hidden information, and the optional service and/or information entry request form;

FIG. 66A is a schematic representation of a response information group $RG_{nm}$ having addressable individual information groups $LG_{nm1} \ldots LG_{nmr}$ showing optional addressable pointer/address indices $IN_{nm1} \ldots IN_{nmr}$ correspondingly associated with optional addressable individual information groups $LG_{nm1} \ldots LG_{nmr}$, which may be addressed/pointed with pointer/address $PP_{nm1}$;

FIG. 66B is a schematic representation of the addressable response information group $RG_{nm}$ having the addressable individual information groups $LG_{nm1} \ldots LG_{nmr}$ showing the optional addressable pointer/address indices $IN_{nm1} \ldots IN_{nmr}$ correspondingly associated with the optional addressable individual information groups $LG_{nm1} \ldots LG_{nmr}$, which may be addressed/pointed with the pointer/address $PP_{nm2}$;

FIG. 66C is a schematic representation of the addressable response information group $RG_{nm}$ having the addressable individual information groups $LG_{nm1} \ldots LG_{nmr}$ showing the optional addressable pointer/address indices $IN_{nm1} \ldots IN_{nmr}$ correspondingly associated with the optional addressable individual information groups $LG_{nm1} \ldots LG_{nmr}$, which may be addressed/pointed with the pointer/address $PP_{nmr}$;

FIG. 67 is a schematic representation of the individual information groups $LG_{nm1} \ldots LG_{nmr}$ having corresponding optional links $LD_{nm1} \ldots LD_{nmr}$, and/or corresponding optional descriptions $DD_{nm1} \ldots DD_{nmr}$, and/or corresponding optional prices/values $PD_{nm1}, \ldots PD_{nmr}$, and/or corresponding optional images $ID_{nm1} \ldots ID_{nmr}$;

FIG. 68 is a schematic representation of a labelled individual information group $LL_{nmr}$;

FIG. 69 is a schematic representation of an addressable query information group $GI_{nz}$;

FIG. 70 is a schematic representation of steps of a client-server multitasking process of the present invention;

FIG. 71 is a schematic representation of a multitasking process of deriving the service and/or information response $IR_n$ and/or the user service and/or information response $ir_n$, with reference to FIGS. 59 and 63;

FIG. 72 is a schematic representation of a multitasking process of deriving the service and/or information response $IR_n$ and/or the user service and/or information response $ir_n$ having other grouping/sorting that may be used additionally and/or alternatively to that of FIGS. 59 and 63, as shown with reference to FIGS. 60 and 64;

FIG. 73 is a schematic representation of a step of the multitasking process of FIGS. 71 and 72 shown in more detail;

FIG. 74 is a schematic representation of another step of the multitasking process of FIG. 71 shown in more detail;

FIG. 75 is a schematic representation of another step of the multitasking process of FIG. 72 shown in more detail;

FIG. 76 is a schematic representation of user review of user response $UR_n$ and/or selection of additional services and/or information;

FIG. 77 is a schematic representation of the user input $UI_n$ into the service and/or information entry request form $IE_n$;

FIG. 78 is a schematic representation of the service and/or information entry request form $IE_n$ showing fields, links, and elements of the service and/or information entry request form $IE_n$;

FIG. 79 is a schematic representation of a completed service and/or information entry request form $IF_n$ showing typical elements, values, and field names;

FIG. 80 is a schematic representation of the completed service and/or information entry request form $IF_n$, a user service and/or information request $iq_n$, and the client $C_n$ of the client-server multitasking system;

FIG. 81 is a schematic representation of the user service and/or information request $iq_n$;

FIG. 82 is a schematic representation of the service and/or information request $IQ_n$;

FIG. 83 is an alternate schematic representation of the user service and/or information request $iq_n$ of FIG. 81;

FIG. 84 is an alternate schematic representation of the service and/or information request $IQ_n$ of FIG. 82;

FIG. 85 is a more detailed schematic representation of the service and/or information request $IQ_n$ of FIGS. 82 and 84 showing typical field names and values;

FIG. 86 is an alternate more detailed schematic representation of the service and/or information request $IQ_n$ of FIGS. 82 and 84;

FIG. 87 is a schematic representation showing queries $QQ_{n1} \ldots QQ_{nm}$ and corresponding server addresses $AQ_{n1} \ldots AQ_{nm}$;

FIG. 88 shows the schematic representation of FIG. 87 having typical values;

FIG. 89 shows the schematic representation of FIG. 87 having other typical values;

FIG. 90 shows the schematic representation of FIG. 87 having other typical values;

FIG. 91 shows the schematic representation of FIG. 87 having other typical values;

FIG. 92 is a schematic representation of information that may be used for formulating a typical particular one of the requests $Q_{n1} \ldots Q_{nm}$, designated as the request $Q_{nm}$, and optional instructions $VJ_{nm1} \ldots VJ_{nk}$ from the particular service and/or information request $IQ_n$ and opening a connection $OC_{nm}$;

FIG. 93 is a schematic representation of information that may be used for formulating the typical particular one of the requests $Q_{n1} \ldots Q_{nm}$, designated as the request $Q_{nm}$, and the optional instructions $VJ_{nm1} \ldots VJ_{nk}$ from the particular user service and/or information request $iq_n$ and opening the connection $OC_{nm}$;

FIG. 94 is an alternate schematic representation of information that may be used for formulating the typical particular one of the requests $Q_{n1} \ldots Q_{nm}$, designated as the request $Q_{nm}$, and optional instructions $VJ_{nm1} \ldots VJ_{nk}$ from the particular service and/or information request $IQ_n$ and opening a connection $OC_{nm}$ of FIG. 92;

FIG. 95 is an alternate schematic representation of information that may be used for formulating the typical particular one of the requests $Q_{n1} \ldots Q_{nm}$, designated as the request $Q_{nm}$, and the optional instructions $VJ_{nm1} \ldots VJ_{nk}$ from the particular user service and/or information request $iq_n$ and opening the connection $OC_{nm}$ of FIG. 93;

FIG. 96 is a schematic representation of queries $QQ_{n1} \ldots QQ_{nm}$, corresponding server addresses $AQ_{n1} \ldots AQ_{nm}$, and optional instructions $VJ_{nm1} \ldots VJ_{nk}$ that may be parsed, processed, and/or formatted from the service and/or information request $IQ_n$ and/or the user service and/or information request $iq_n$;

FIG. 97 is a schematic representation of a request pointer/address group $QZ_{ns}$, having a particular one of query pointer/address groups $QG_{n1} \ldots QG_{nz}$, designated as the query pointer/address group $QG_{nz}$, associated ones of the addressable response information groups $RG_{n1} \ldots RG_{nm}$, the pointers/addresses $PP_{n11} \ldots PP_{nmr}$, and the query information group $GI_{nz}$ associated with the query pointer/address group $QG_{nz}$;

FIG. 98 is a schematic representation of a sorting criteria addressing scheme having a particular query pointer/address group $QG_{nz}$, associated ones of response information groups $RG_{nm}$, and query information group $GI_{nz}$ associated with the query pointer/address group $QG_{nz}$;

FIG. 99 is a schematic representation of an alternate sorting criteria addressing scheme having a particular query pointer/address group $QG_{nz}$, associated ones of response information groups $RG_{nm}$, and query information group $GI_{nz}$ associated with the query pointer/address group $QG_{nz}$;

FIG. 100 is a schematic representation of typical ones of the query pointer/address groups $QG_{n1} \ldots QG_{nz}$, having the sorting criteria addressing scheme of FIG. 98, having typical ones of queries $QQ_{n1} \ldots QQ_{nz}$ and corresponding server addresses $AQ_{n1} \ldots AQ_{nz}$ associated therewith;

FIG. 101 is another schematic representation of the typical ones of the query pointer/address groups $QG_{n1} \ldots QG_{nz}$, having the sorting criteria addressing scheme of FIG. 98, having the typical ones of the of queries $QQ_{n1} \ldots QQ_{nz}$ and the corresponding ones of the server addresses $AQ_{n1} \ldots AQ_{nz}$ of FIG. 100 associated therewith;

FIG. 102 is a generic schematic representation of the query pointer/address groups $QG_{n1} \ldots QG_{nz}$, having the sorting criteria addressing scheme of FIG. 98, having the ones of queries $QQ_{n1} \ldots QQ_{nz}$ and the corresponding ones of the server addresses $AQ_{n1} \ldots AQ_{nz}$ associated therewith;

FIG. 103 is a schematic representation of a request $Q_{nm}$ of the client-server multitasking system;

FIG. 104 is a schematic representation of a response $R_{nm}$ of the client-server multitasking system;

FIG. 105 is a schematic representation of an entity body $RH_{nm}$ of the response $R_{nm}$ of FIG. 104 having the optional response individual information groups $LS_{nm1} \ldots LS_{nmr}$, and/or optional information $LI_{nm}$;

FIG. 106 is a schematic representation of the addressable response information group $RG_{nm}$ having the addressable individual information groups $LG_{nm1} \ldots LG_{nmr}$ parsed, and/or processed, and/or formatted, and/or organized, and/or grouped into the addressable response information group $RG_{nm}$ from the optional entity body $RH_{nm}$ of FIG. 105;

FIG. 107 is a schematic representation of the optional response individual information group $LS_{nmr}$ parsed, and/or processed, and/or formatted, and/or organized, and/or grouped into the addressable individual information group $LG_{nmr}$;

FIG. 108 is a schematic representation of the optional links $LD_{nm1}$. . . $LD_{nmr}$, and/or the optional descriptions $DD_{nm1}$. . . $DD_{nmr}$, and/or the optional prices/values $PD_{nm1}$. . . $PD_{nmr}$, and/or the optional images $ID_{nm1}$. . . $ID_{nmr}$ parsed individually and/or separately, and incorporated into the addressable response information group $RG_{nm}$ from the optional entity body $RH_{nm}$;

FIG. 109 is a schematic representation of a typical one of the addressable query information group $GI_{nz}$, based upon certain sorting and/or grouping criteria, having the labelled individual information groups $LL_{nz1}$ . . . $LL_{nzu}$, the optional database labelled individual information groups $RL_{nz1}$ . . . $RL_{nzx}$, the optional query description $QT_{nz}$, the optional server descriptions and/or links $ST_{nz1}$ . . . $ST_{nzf}$, and the optional advertisements and/or links $LT_{nz1}$ . . . $LT_{nzt}$ incorporated into certain typical ones of the typical service and/or information response forms $IS_n$ of FIGS. 27A–52C, inclusive.

Figure 110:
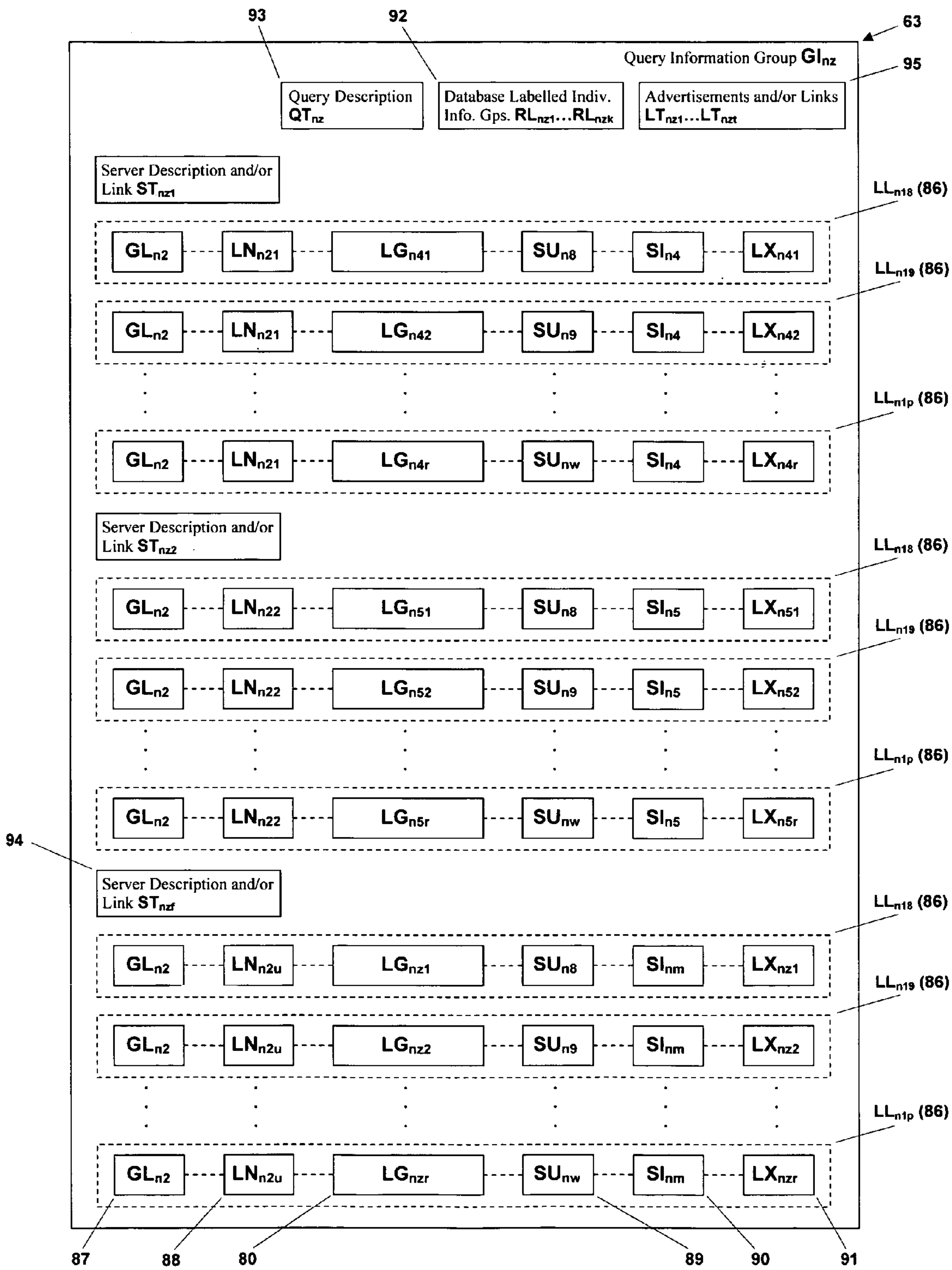
Figure 111:
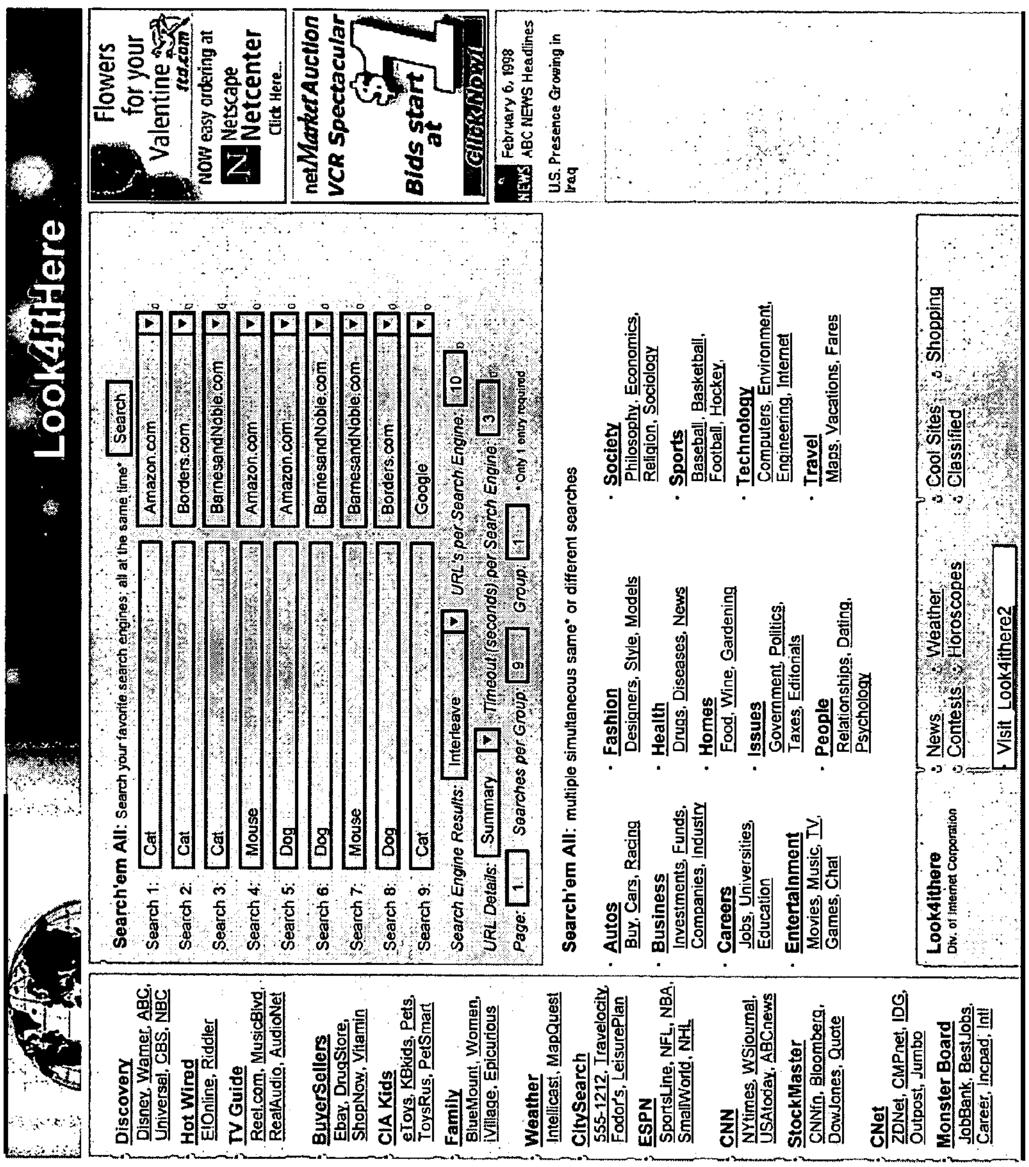
Figure 112A:
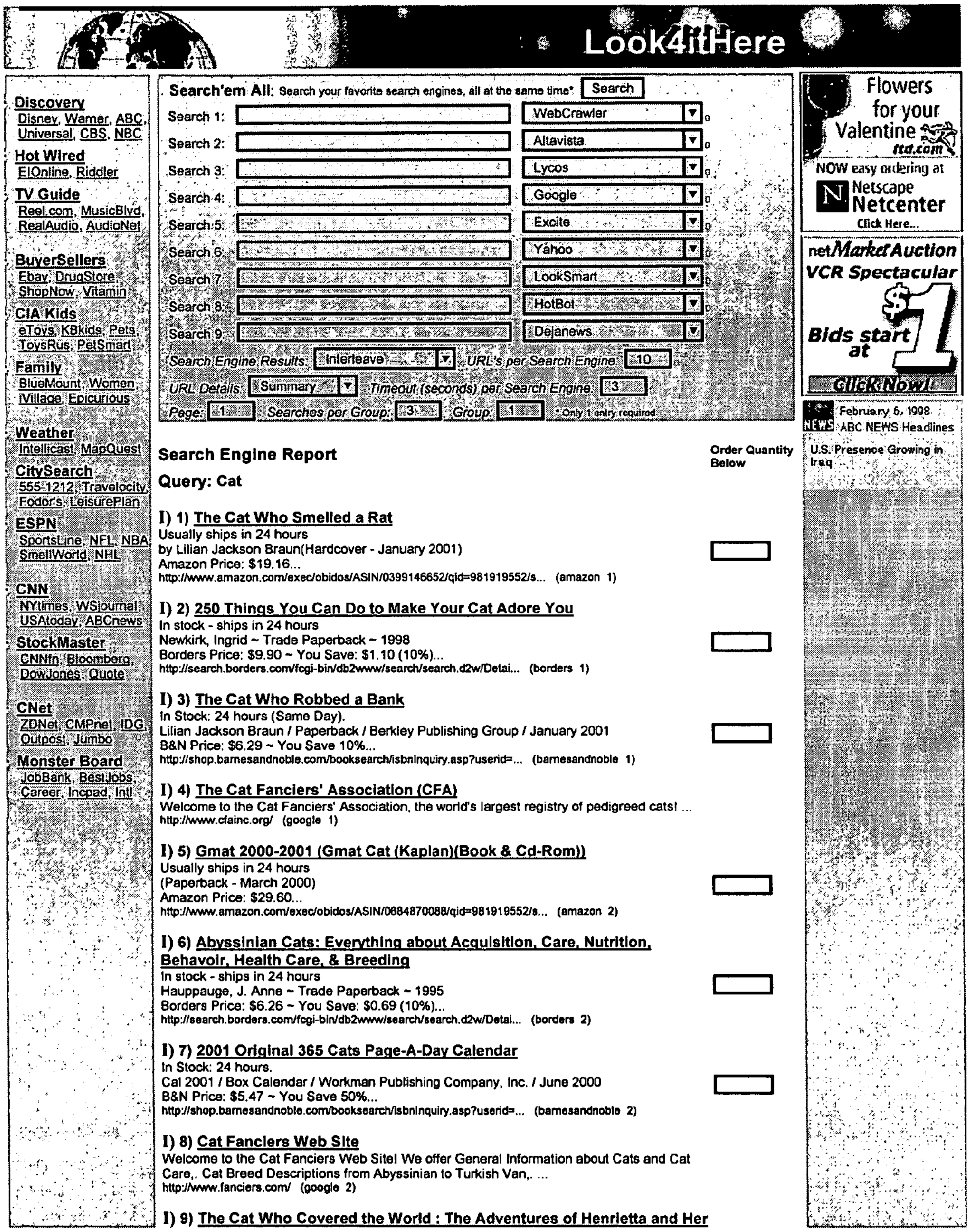
Figure 112H:
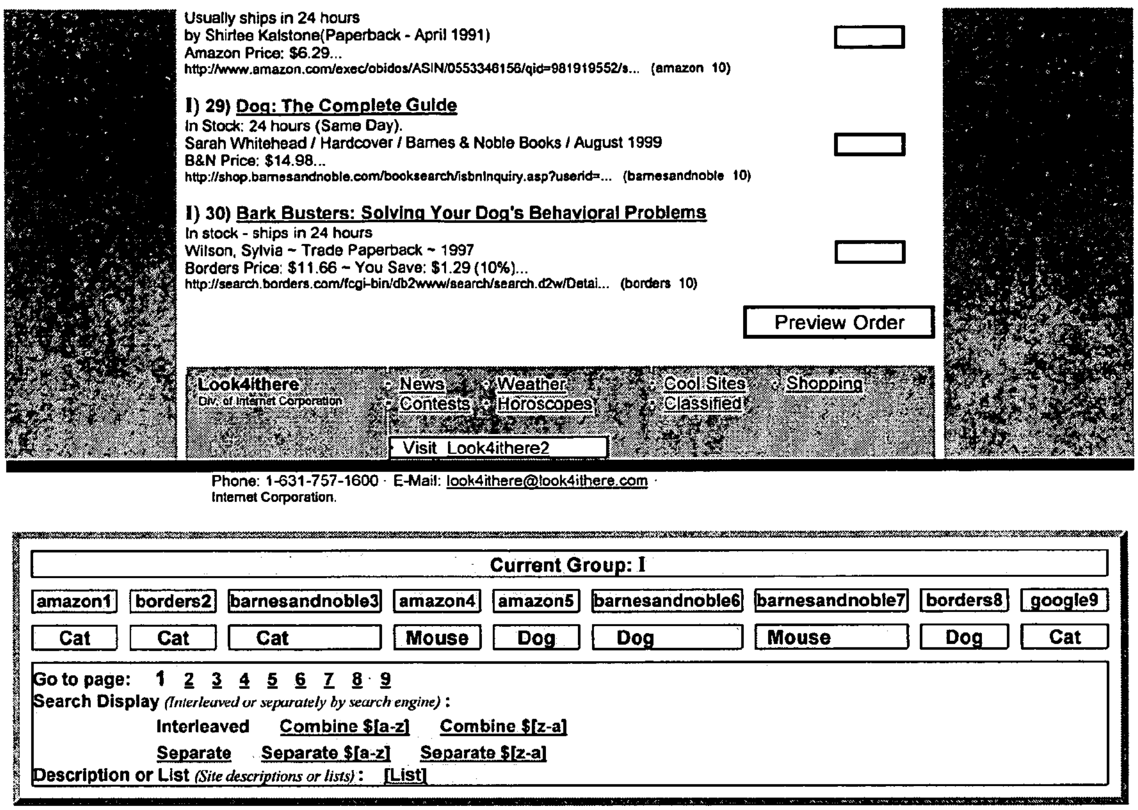
Figure 113:
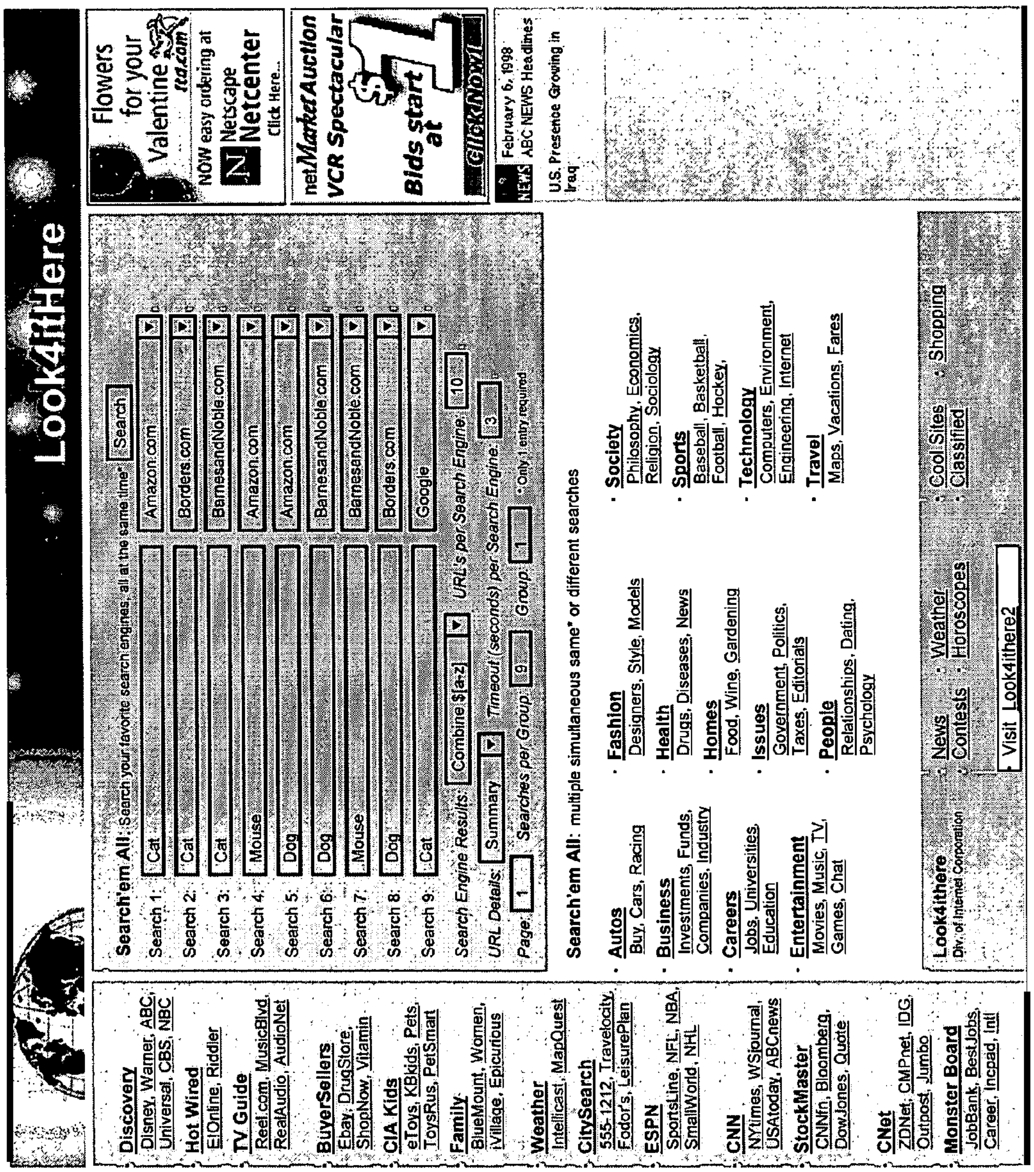
Figure 114A:
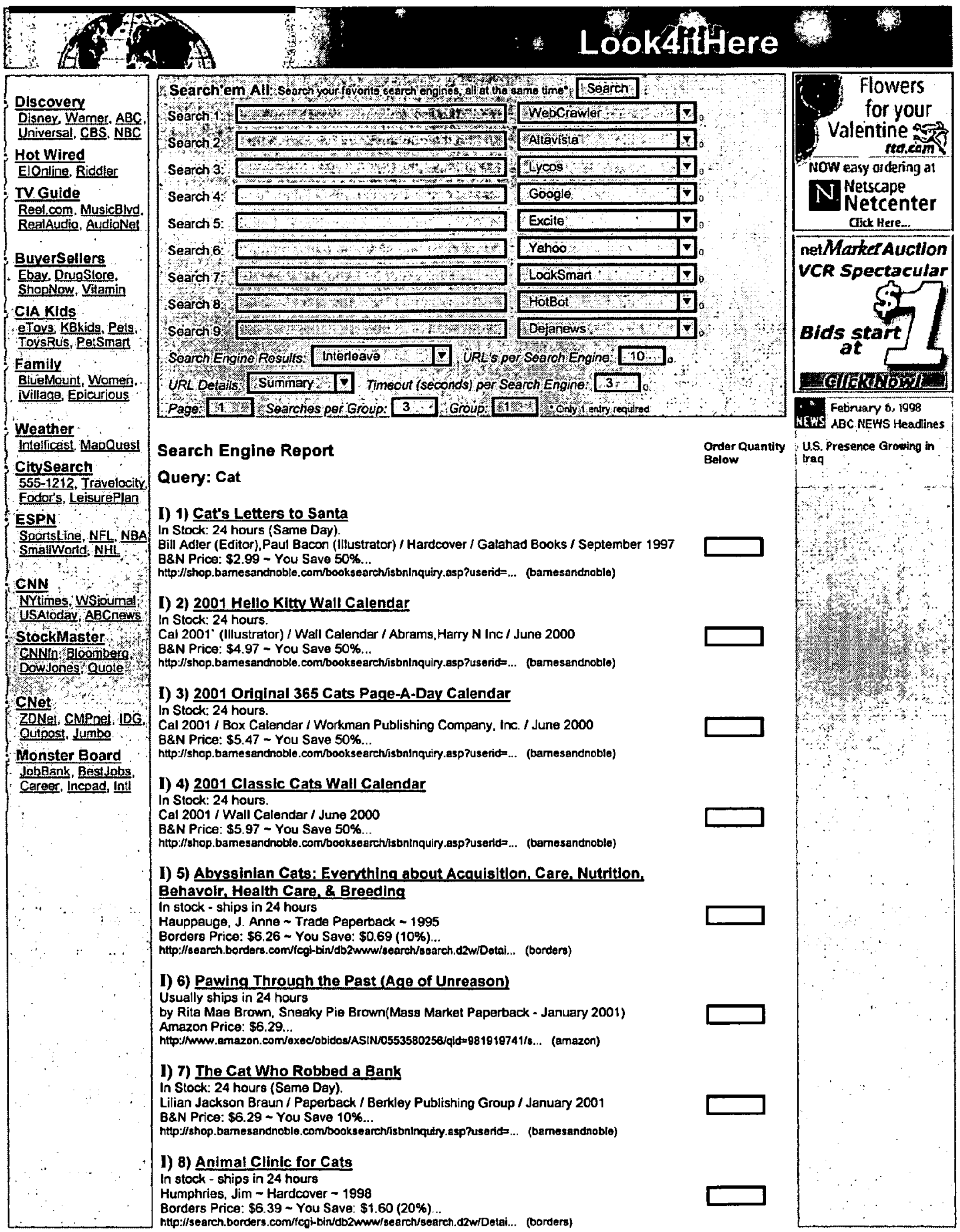
Figure 114H:
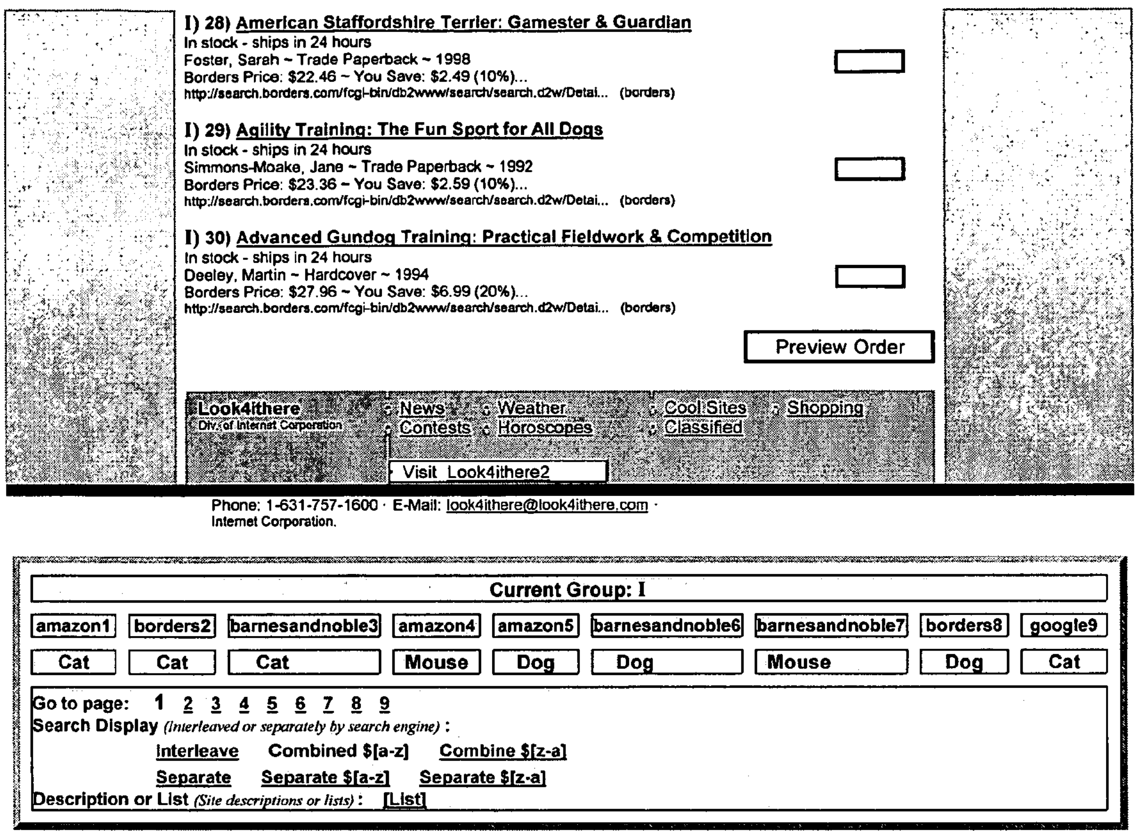
Figure 115:
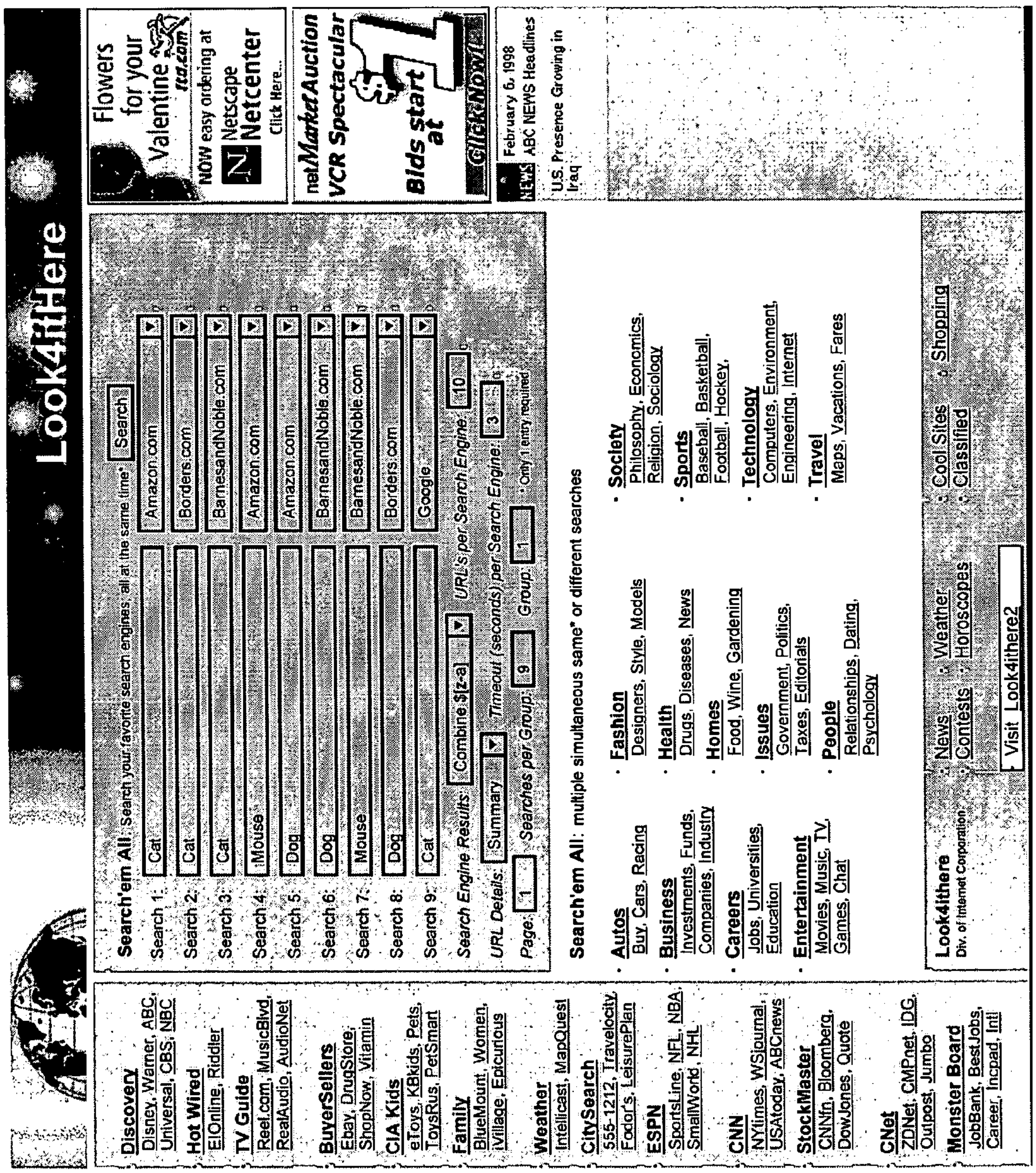
Figure 116A:
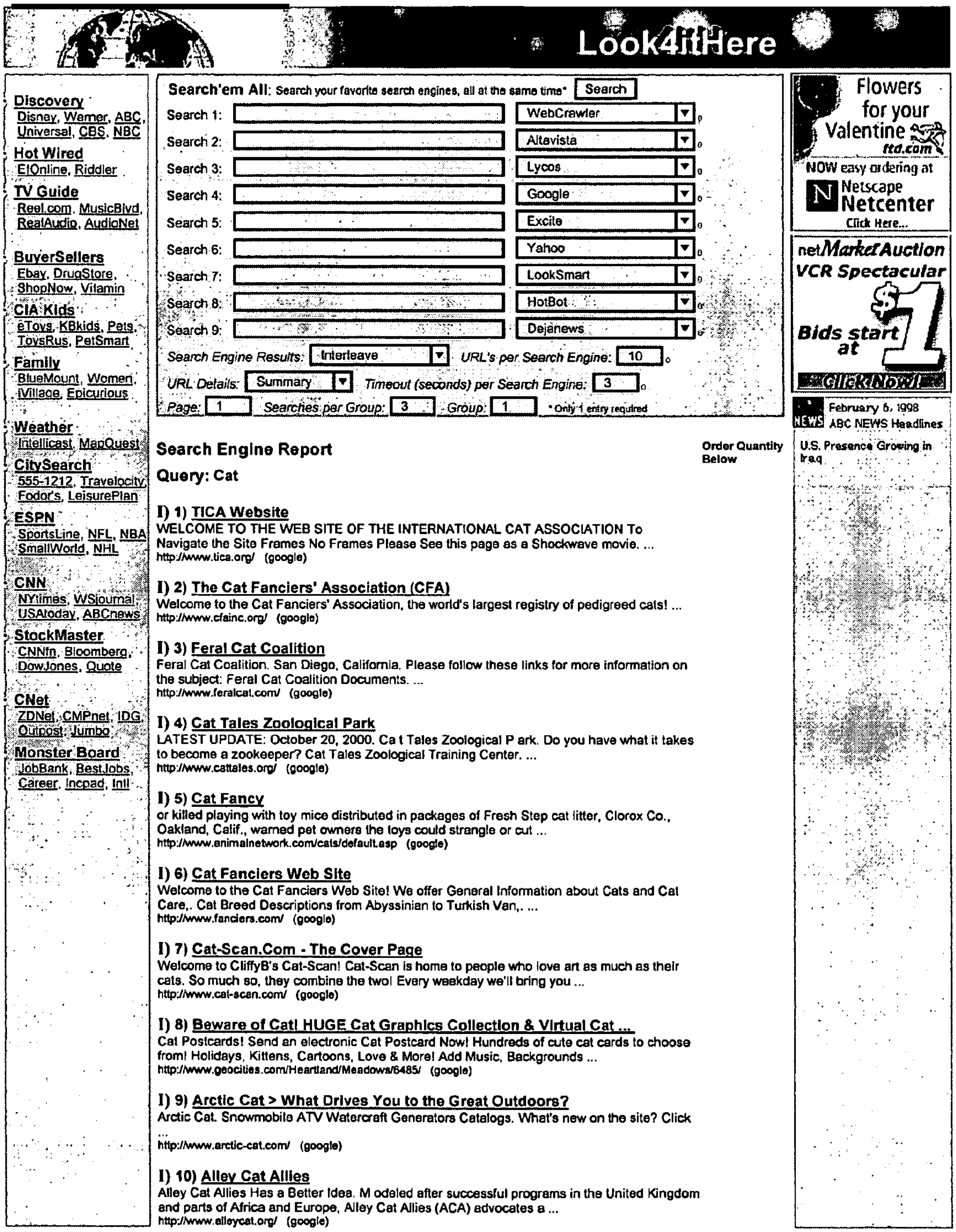
Figure 116H:
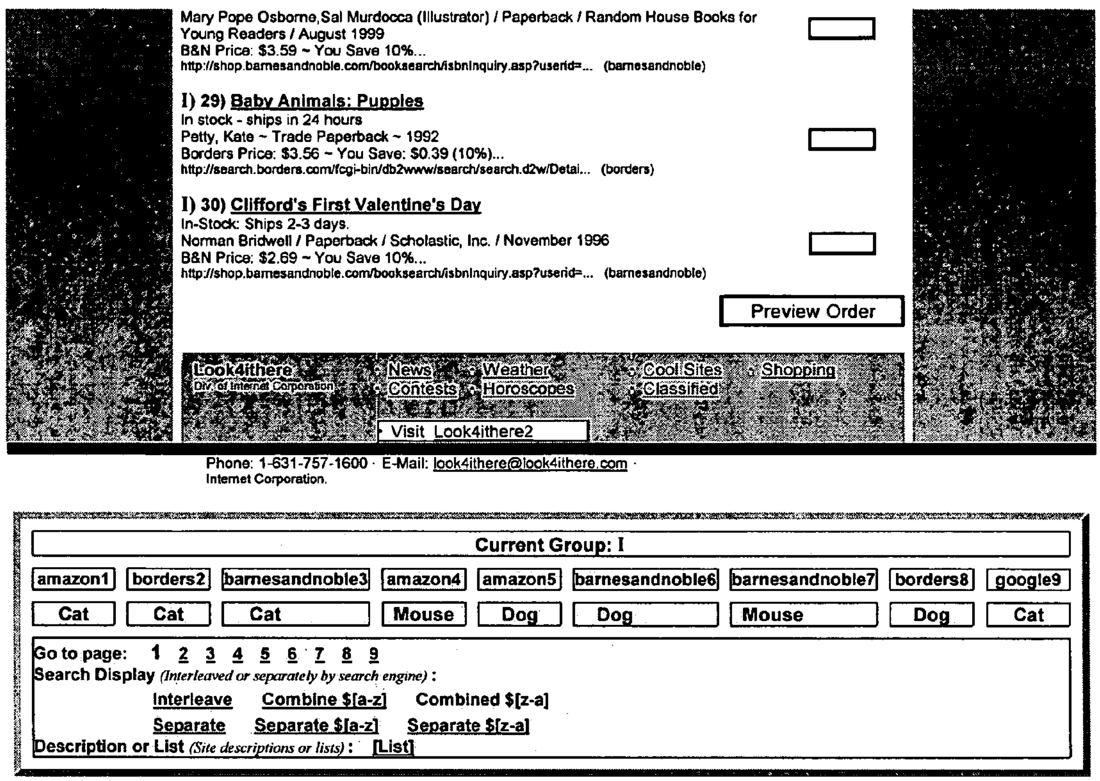
Figure 117:
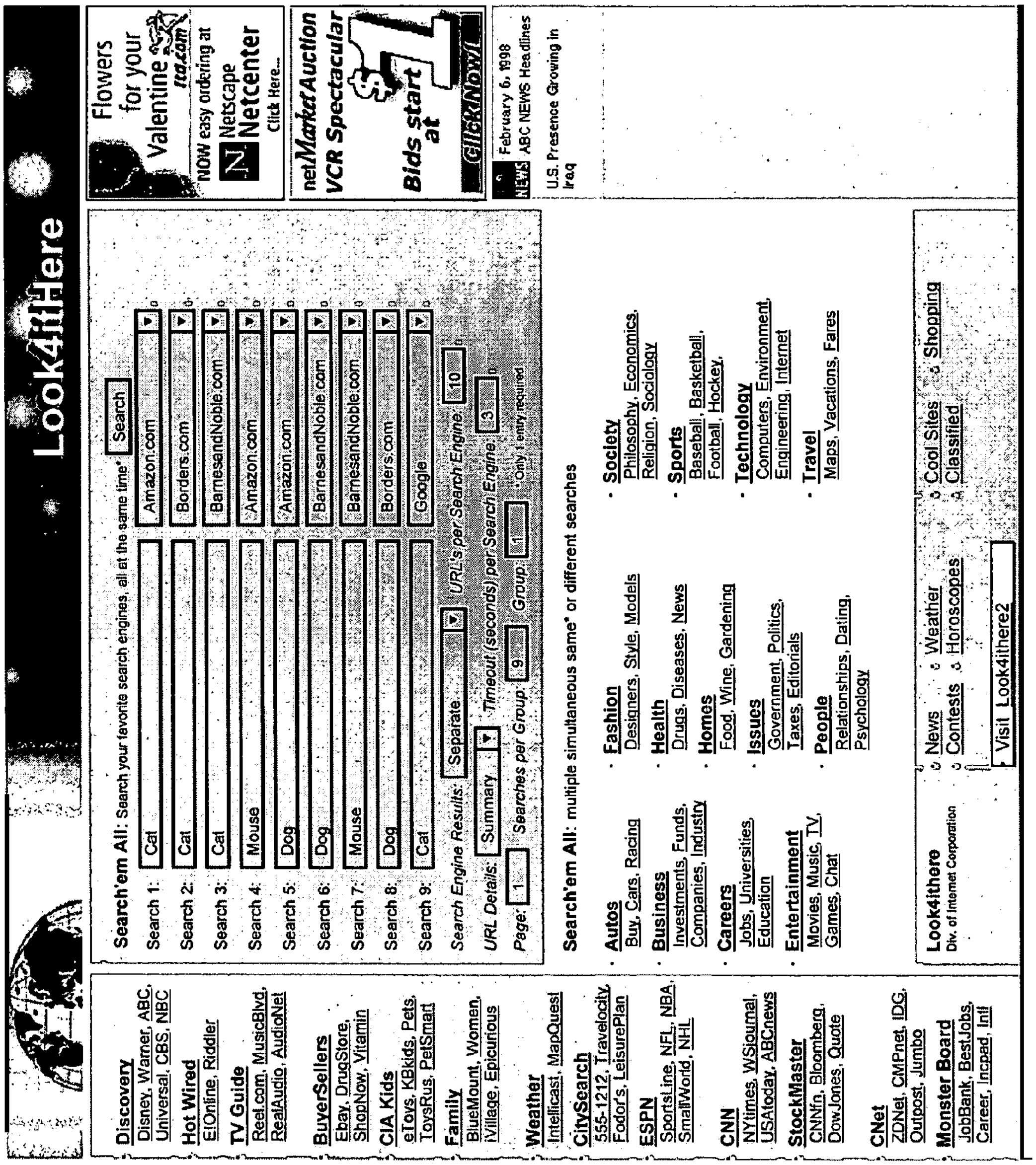
Figure 118A:
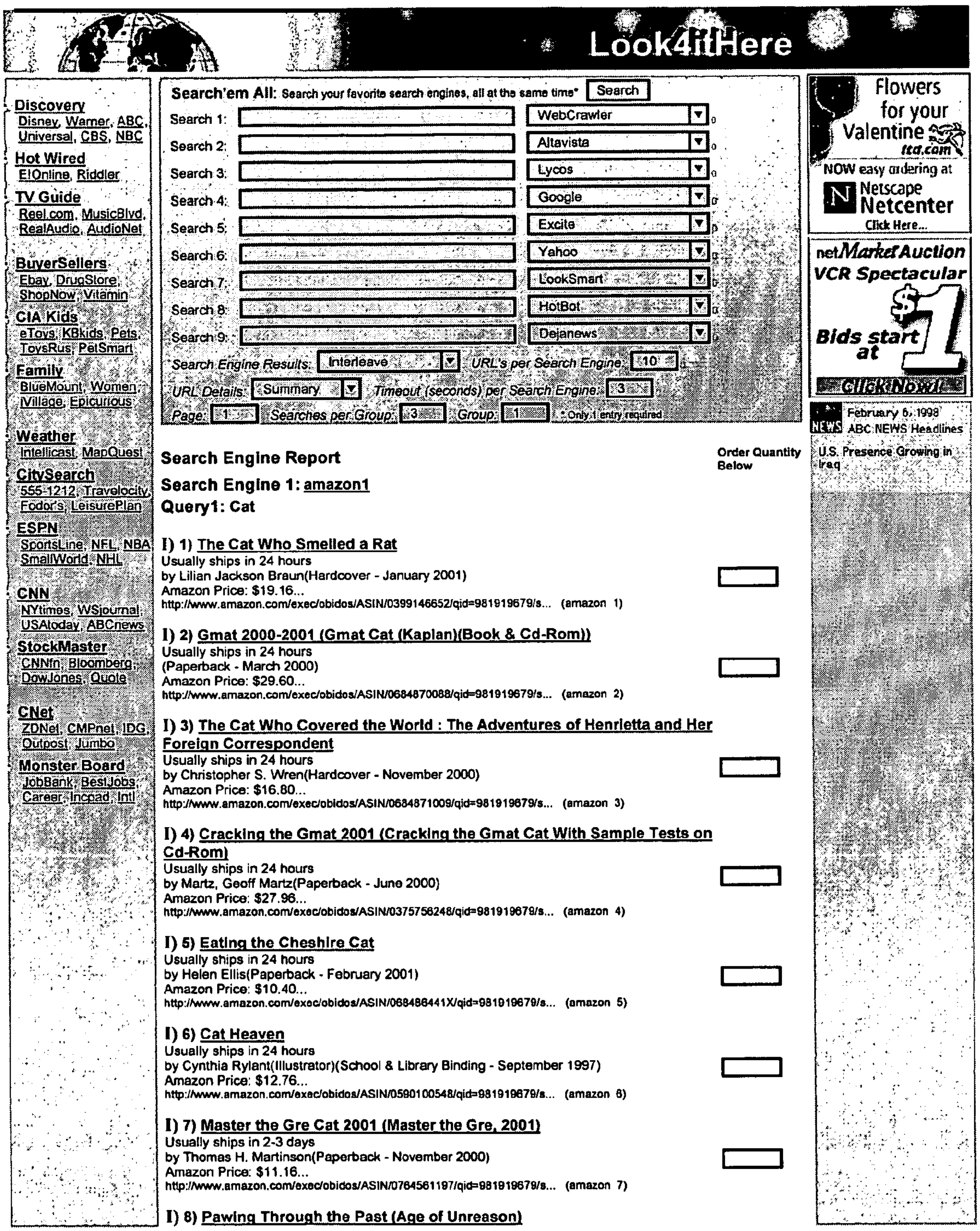
Figure 119:
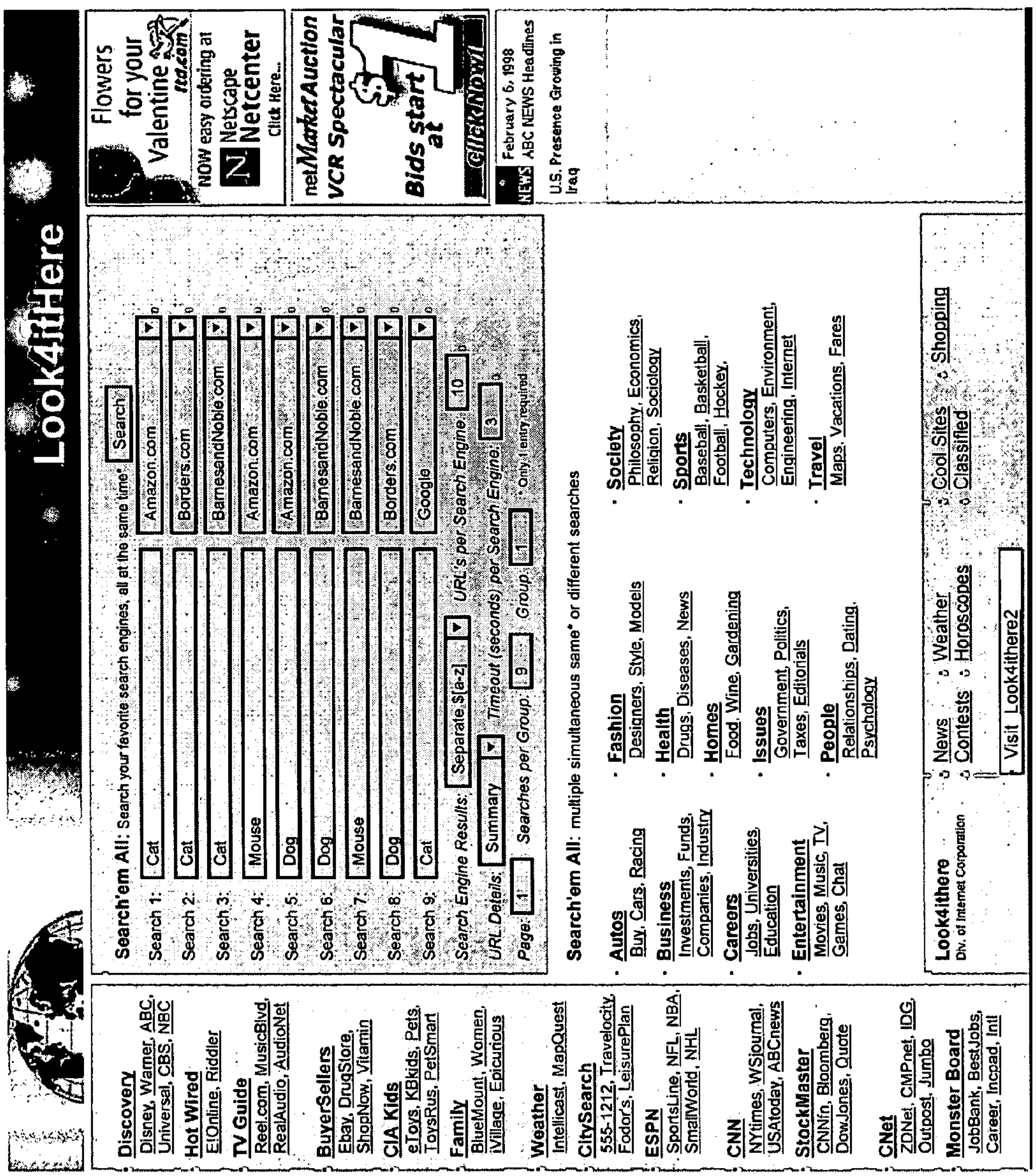
Figure 120A:
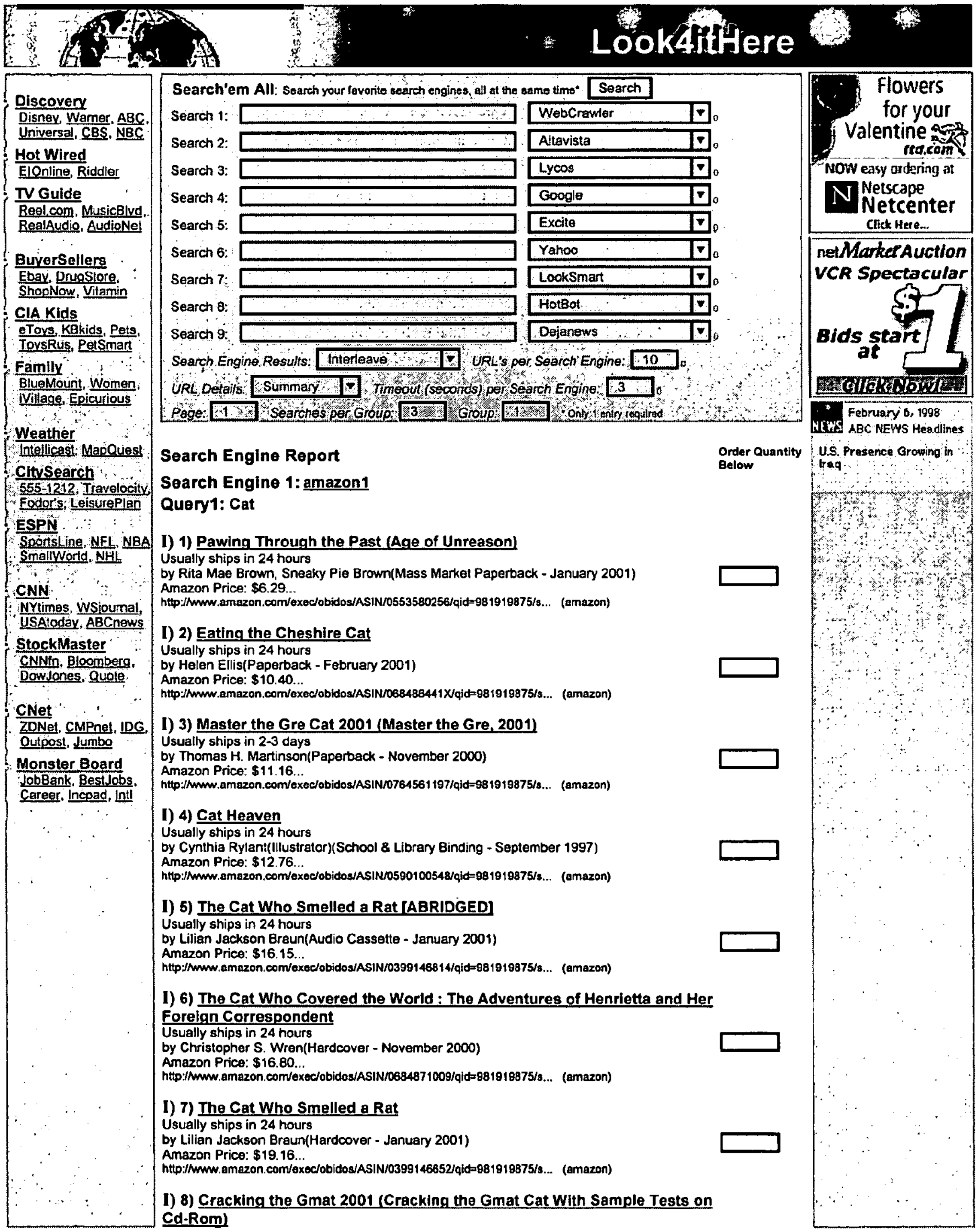
Figure 121:
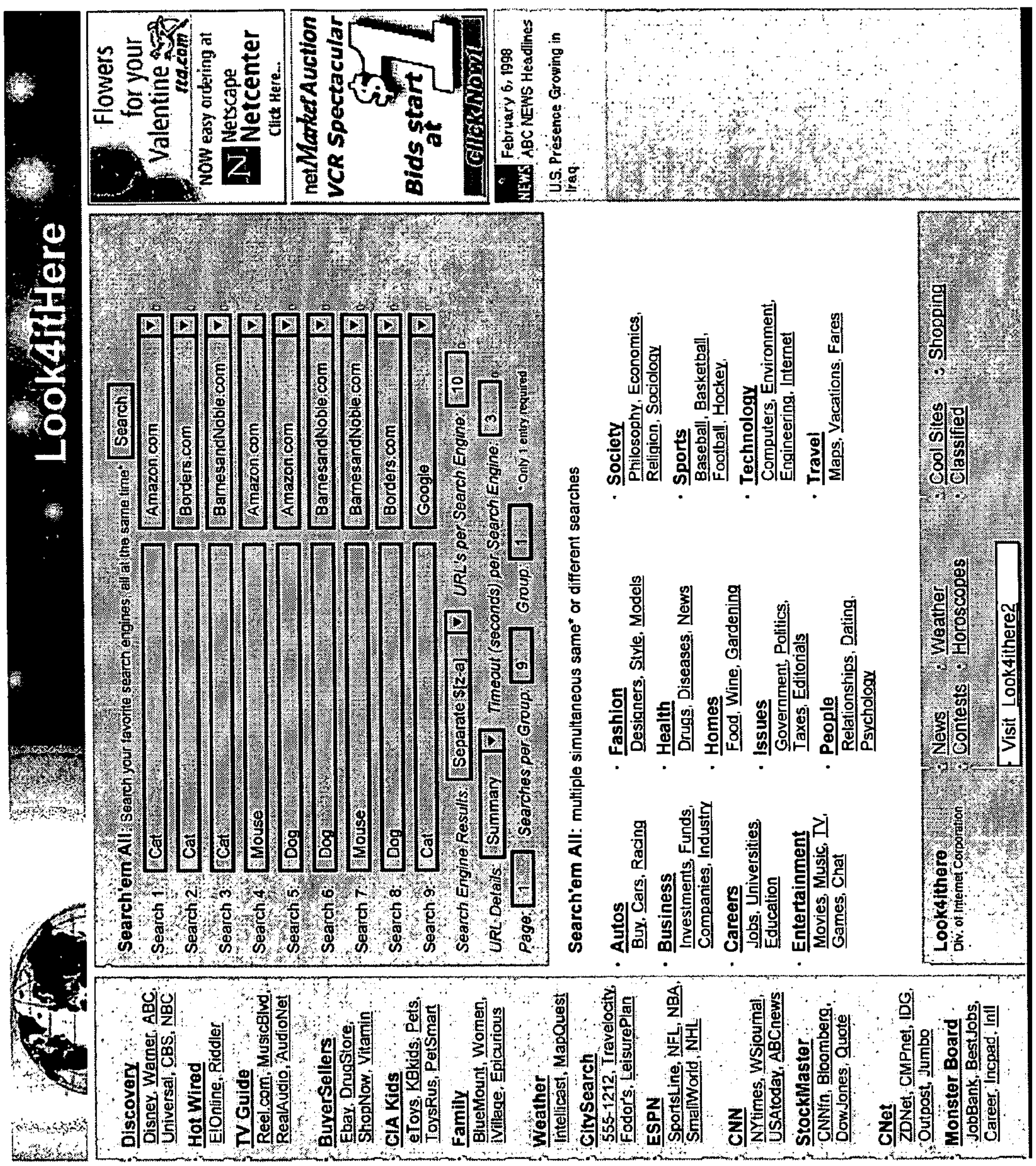
Figure 122A:
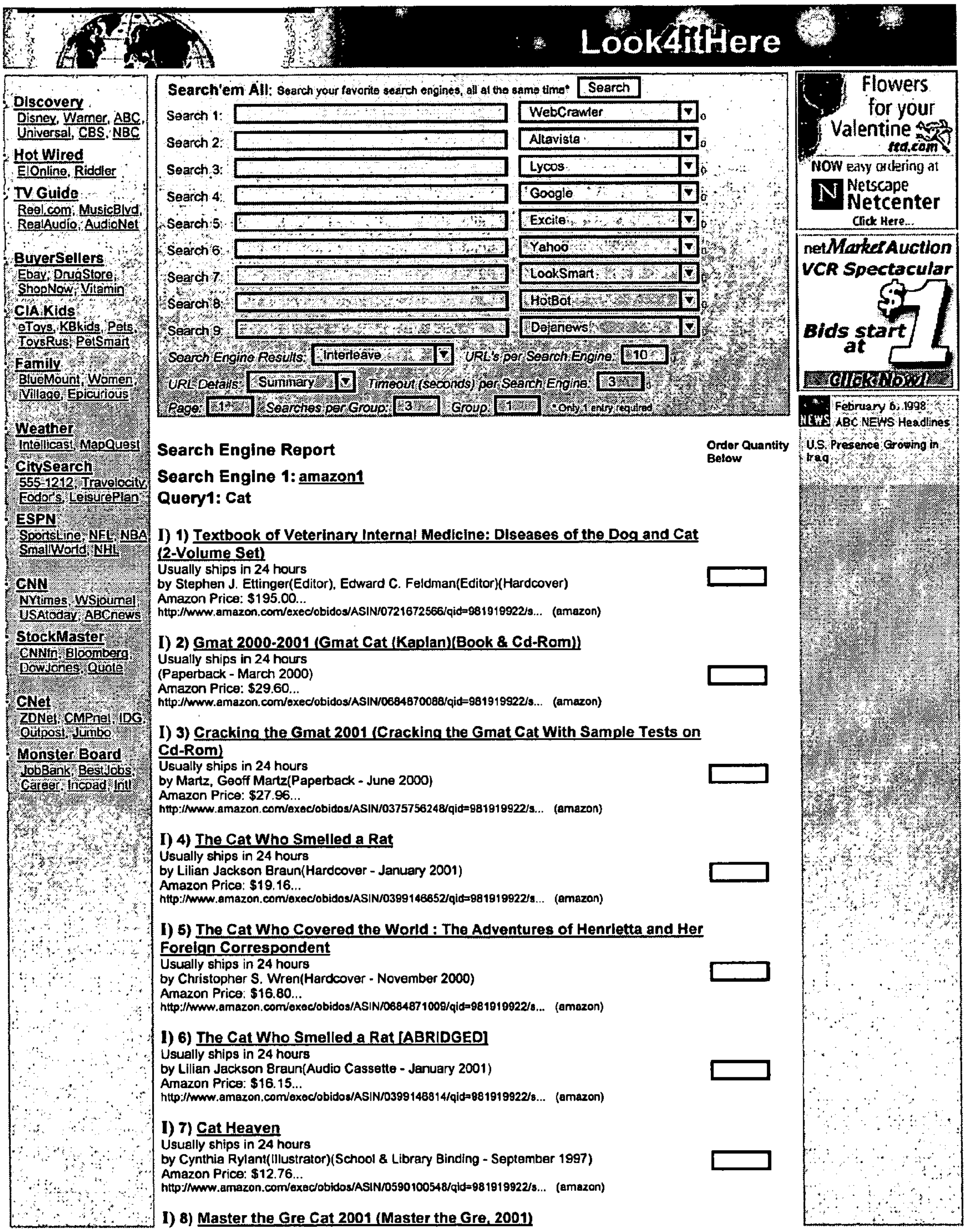
Figure 123A:
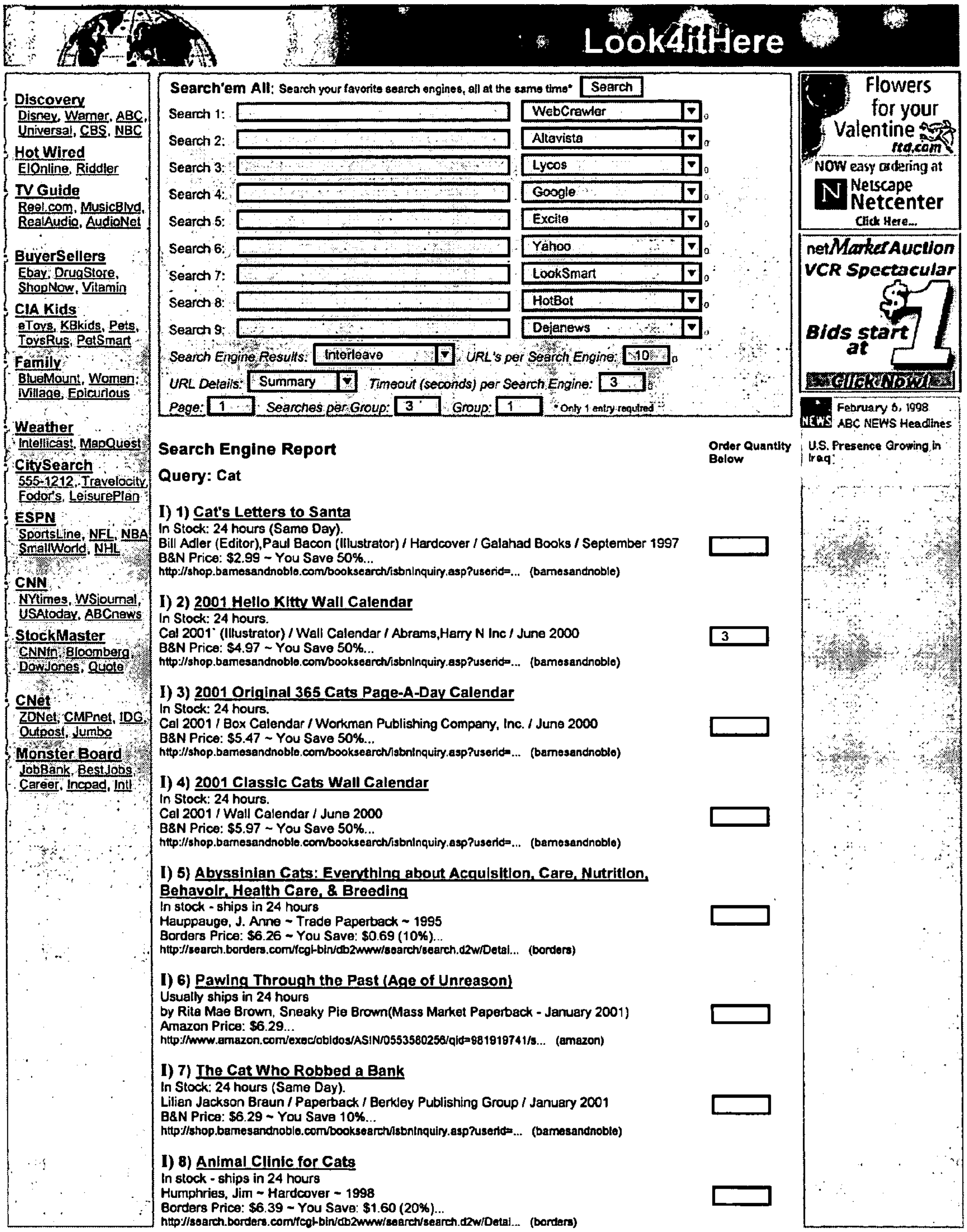
Figure 124A:
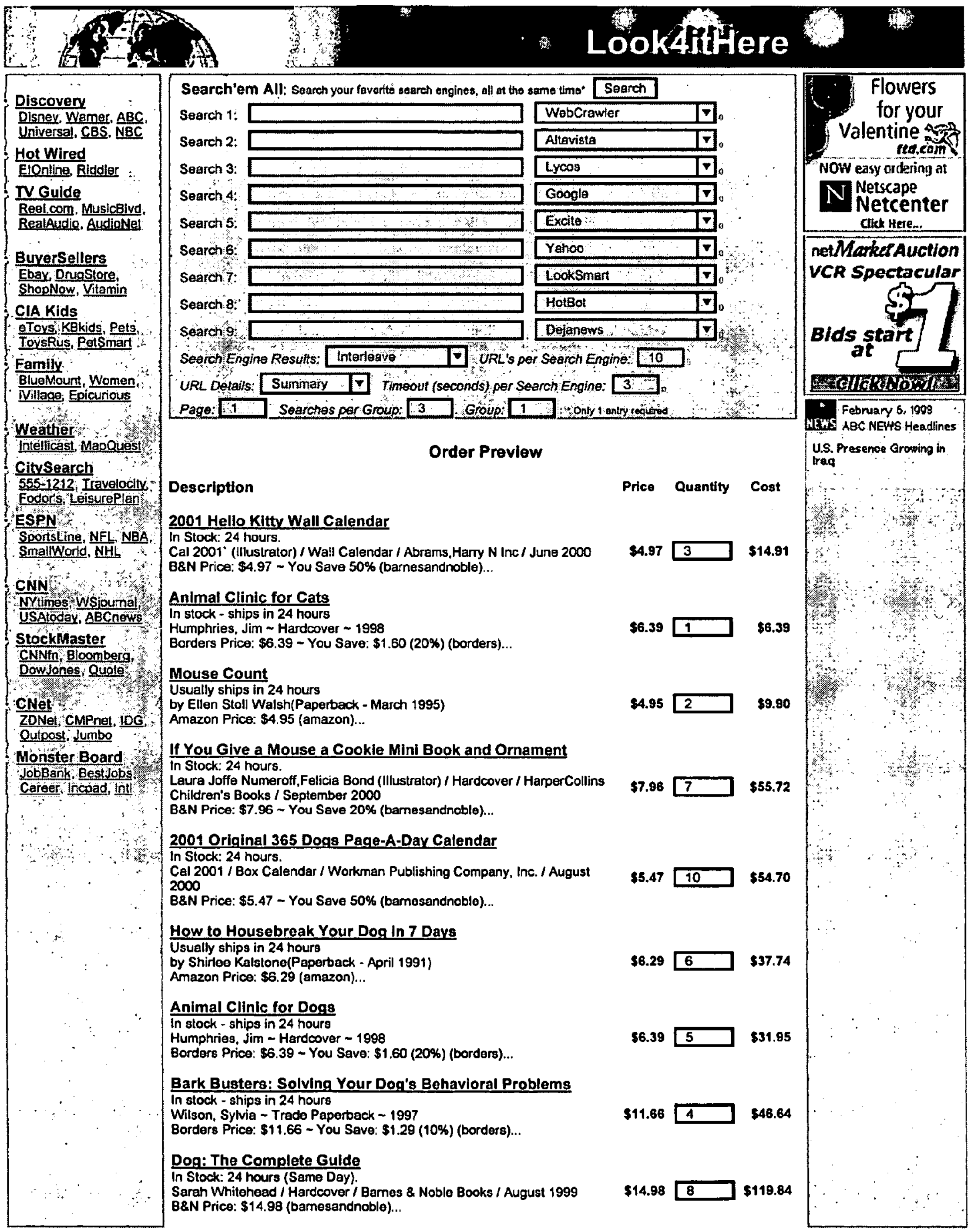
Figure 124B:
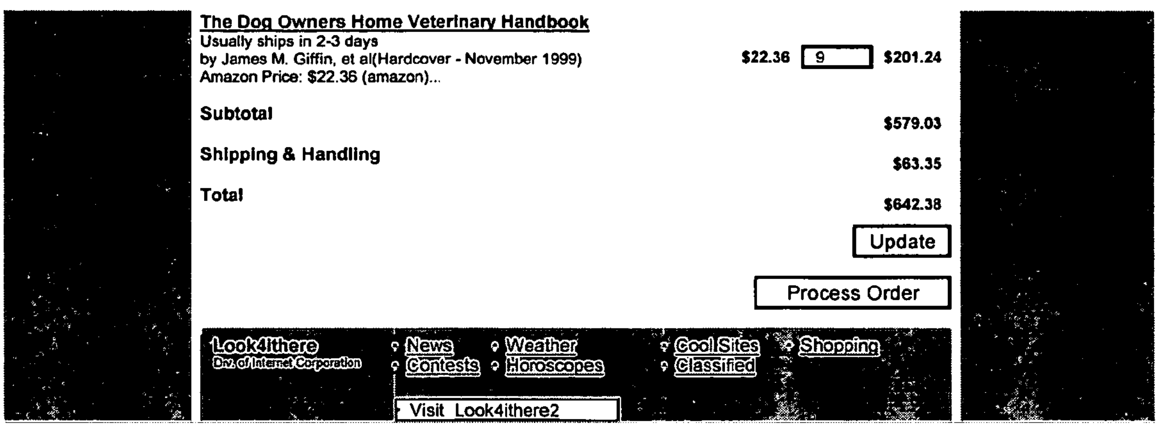
Figure 125A:
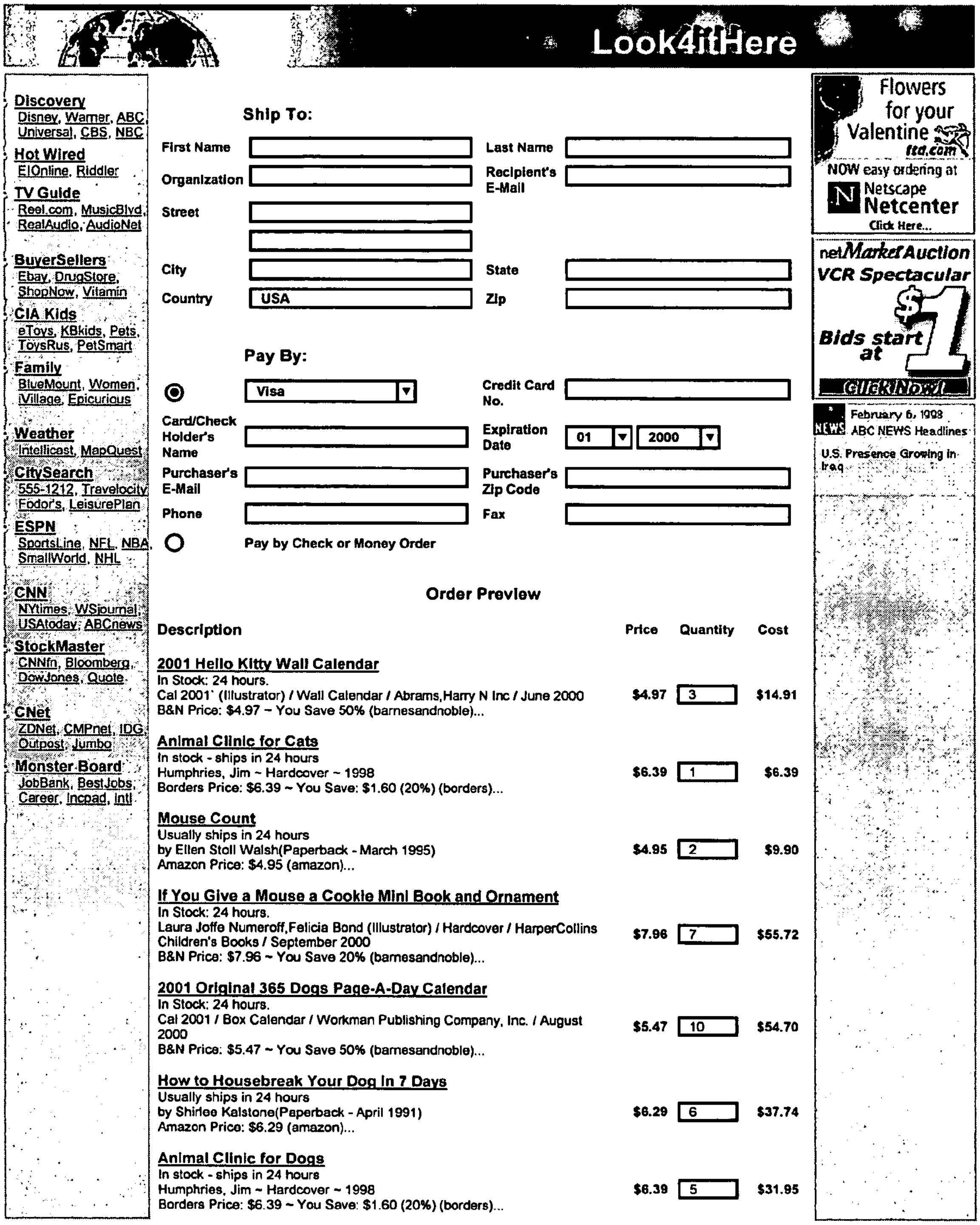
Figure 125B:
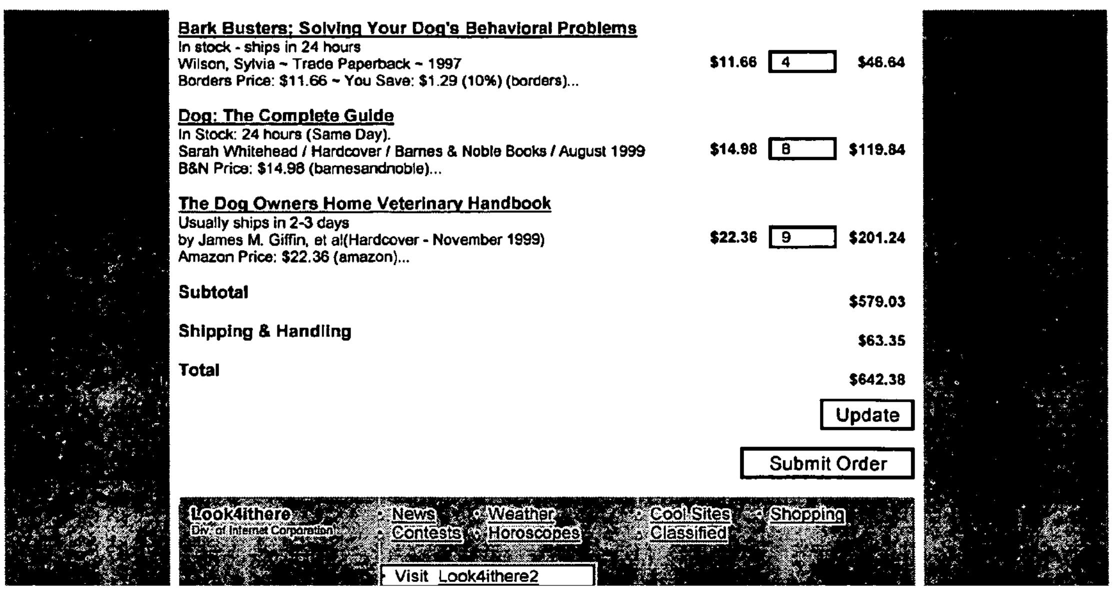
Figure 126A:
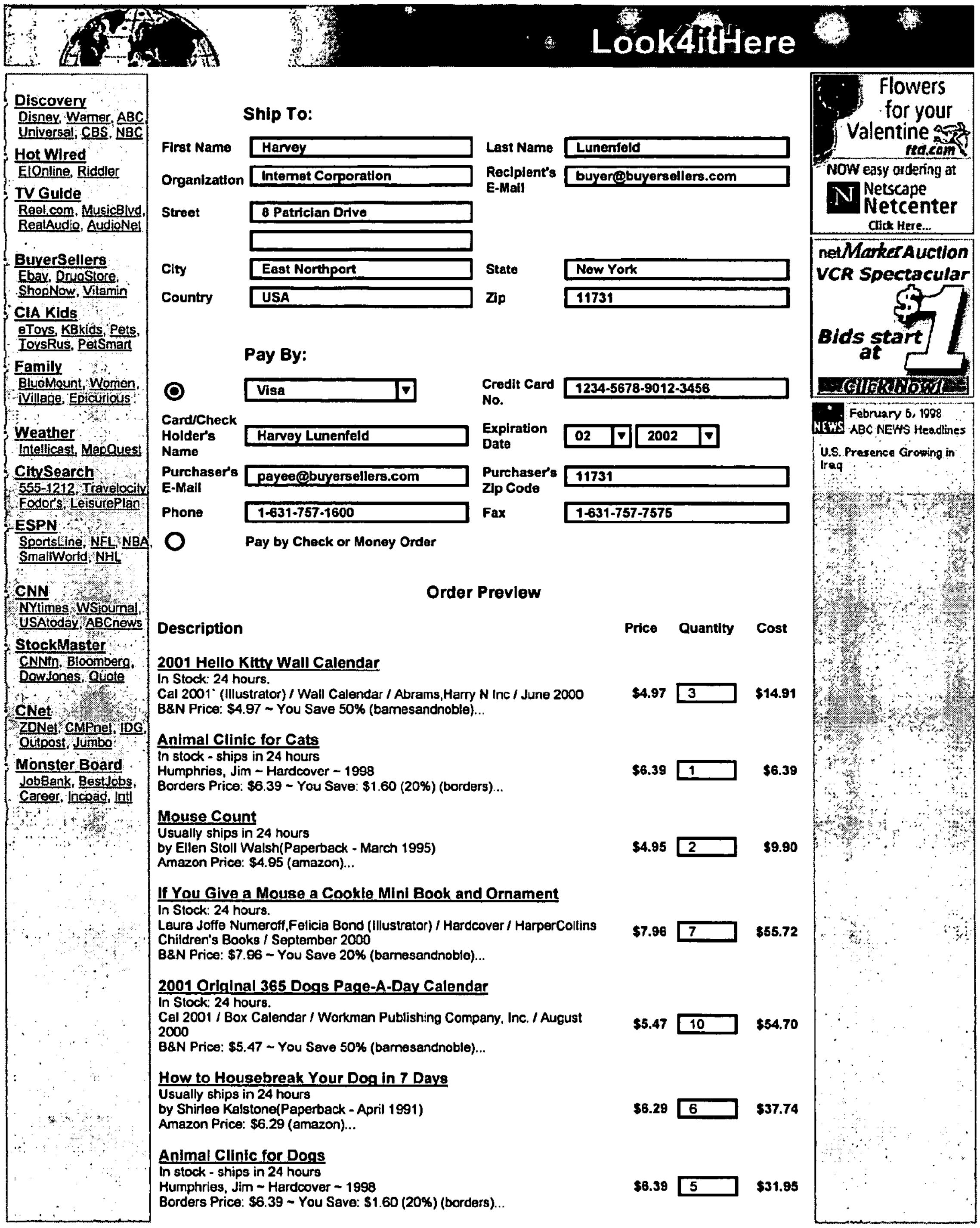
Figure 126B:
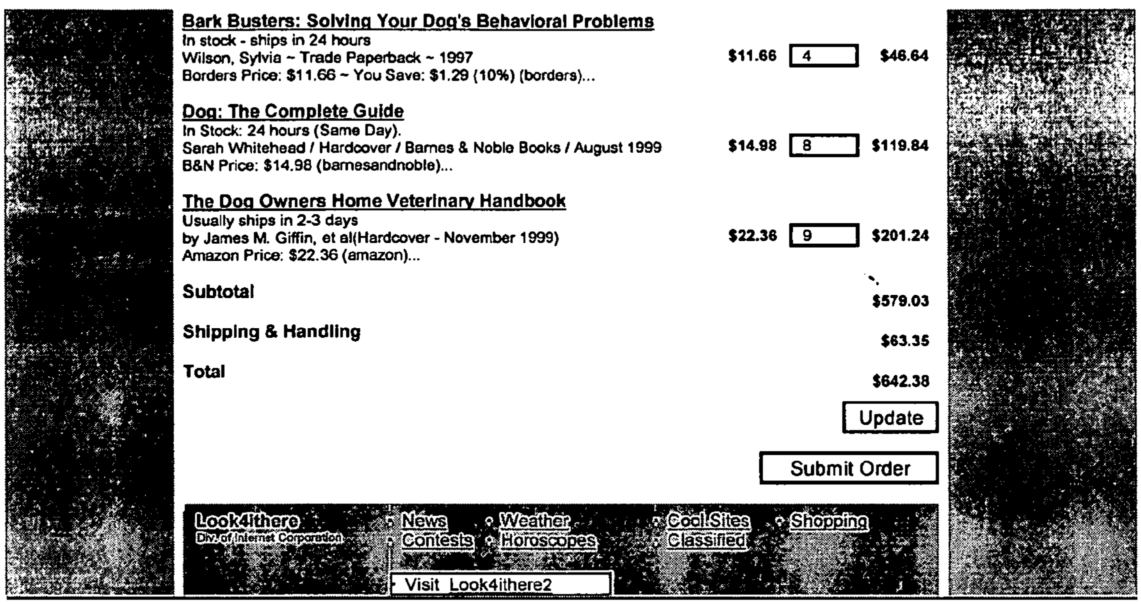
Figure 127B:
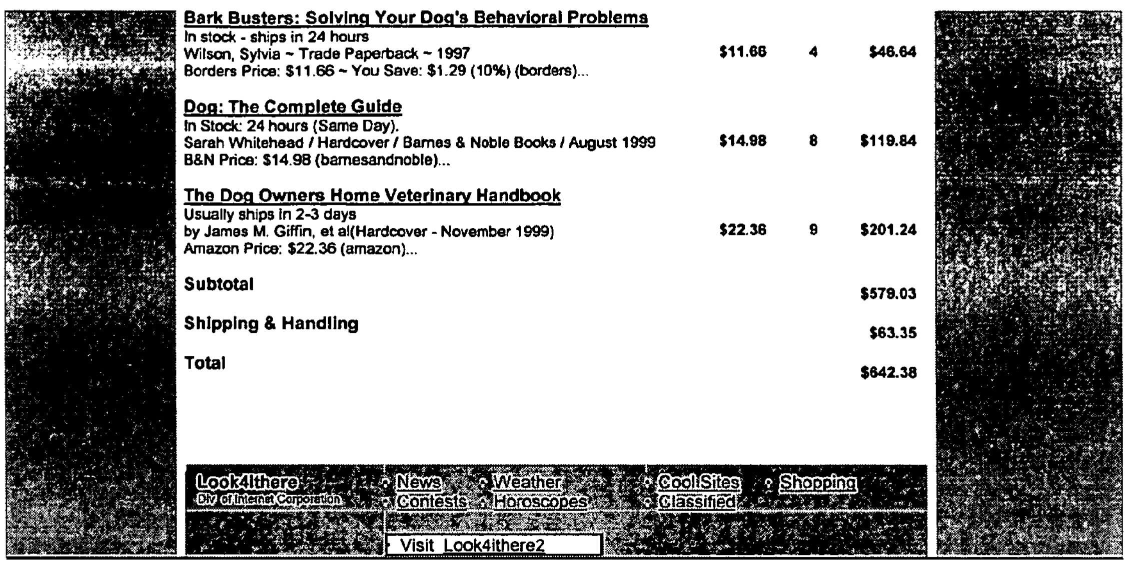
Figure 133:
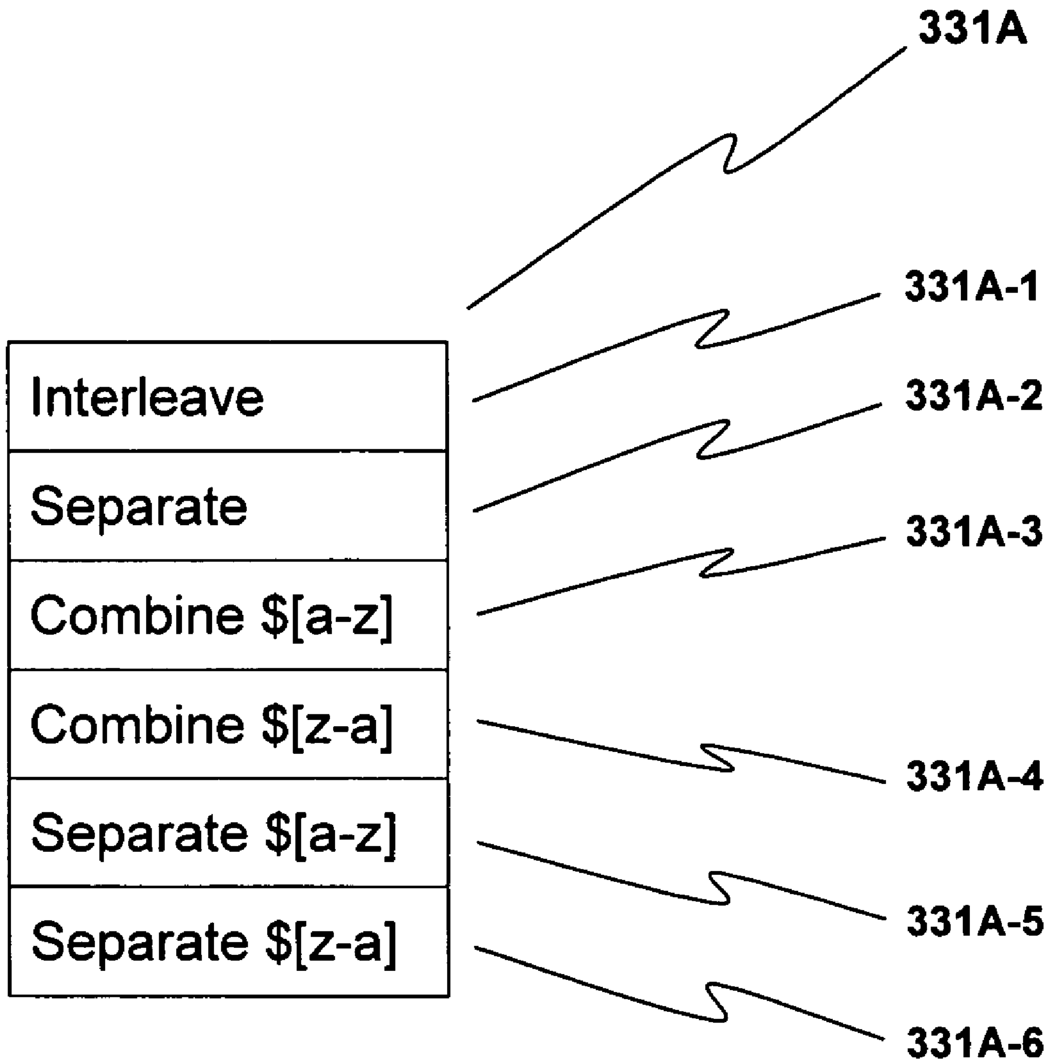
Figure 134:
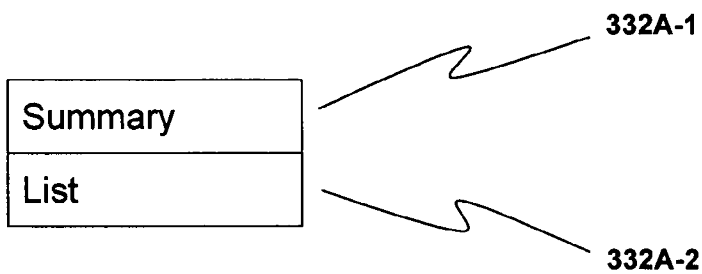
Figure 135:
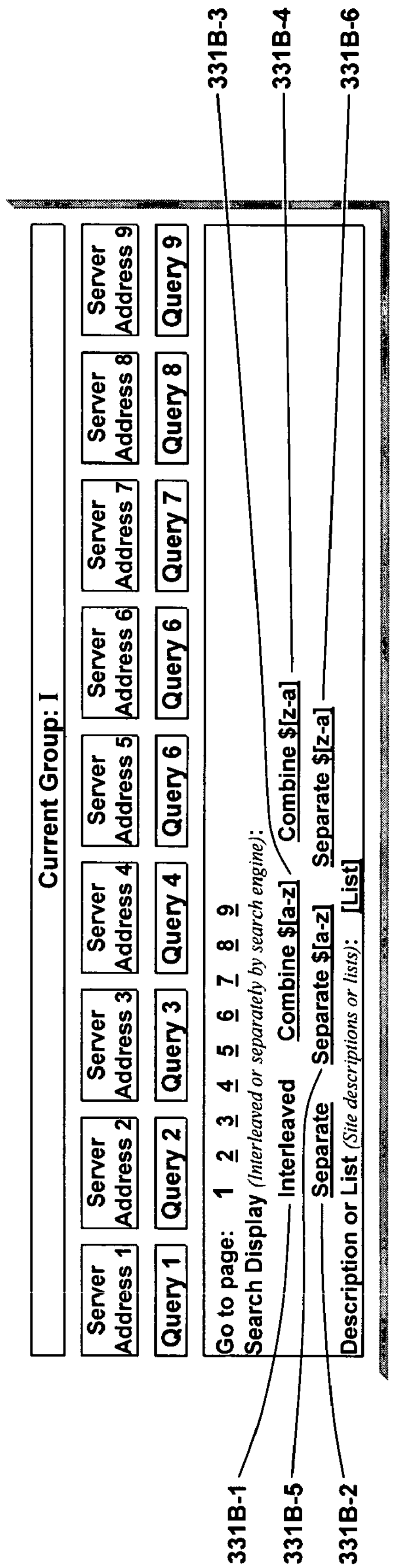
Figure 136:
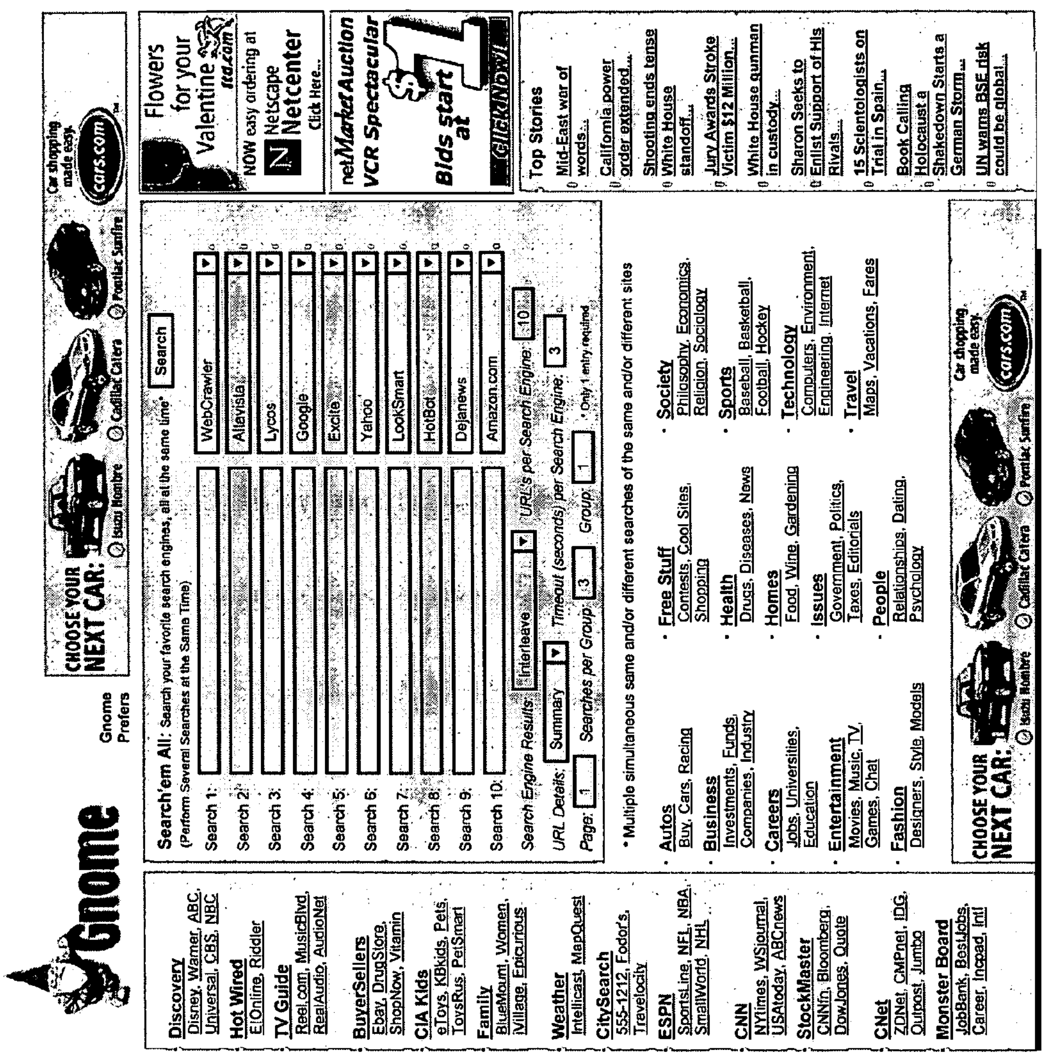
Figure 137:
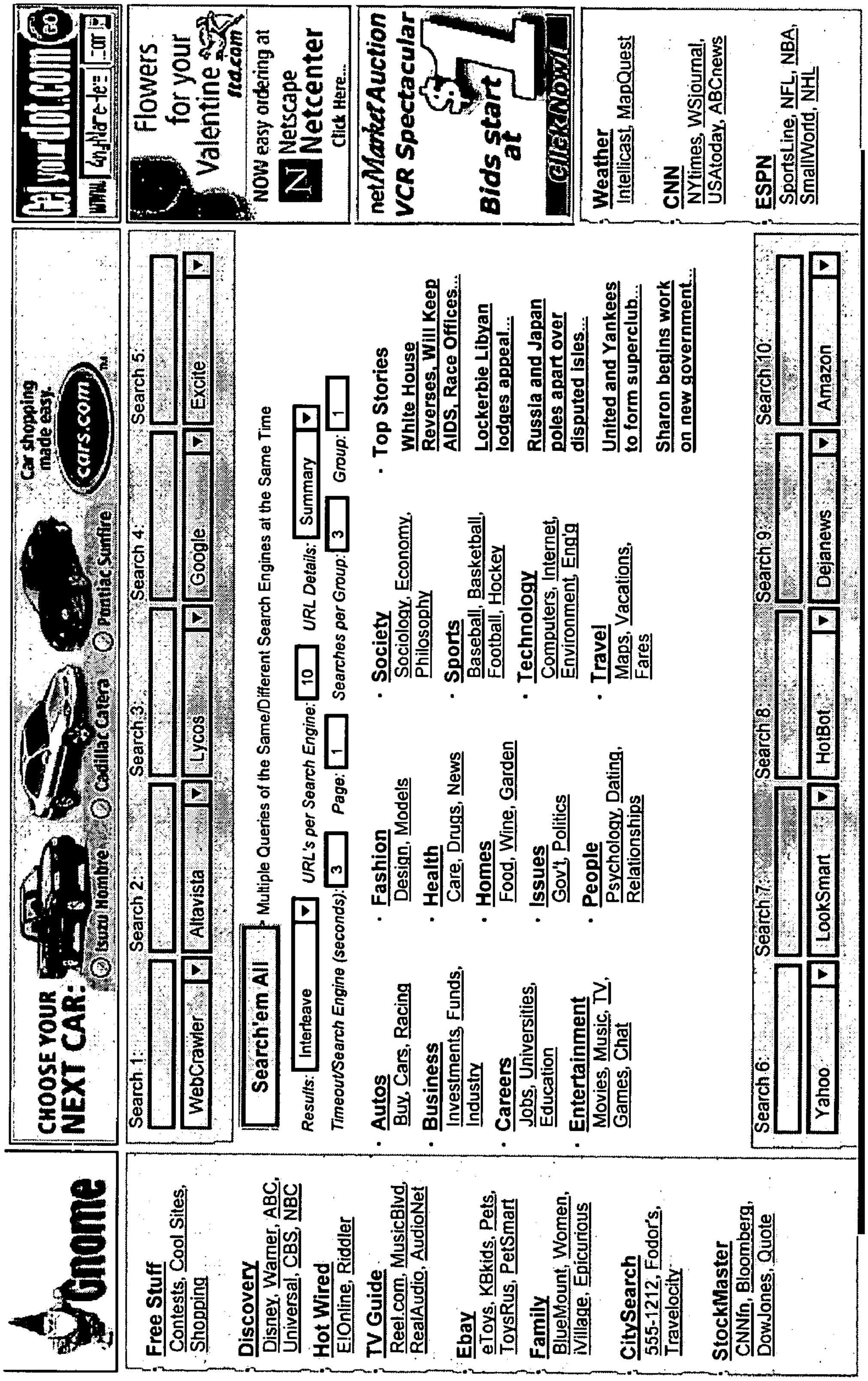
Figure 138:
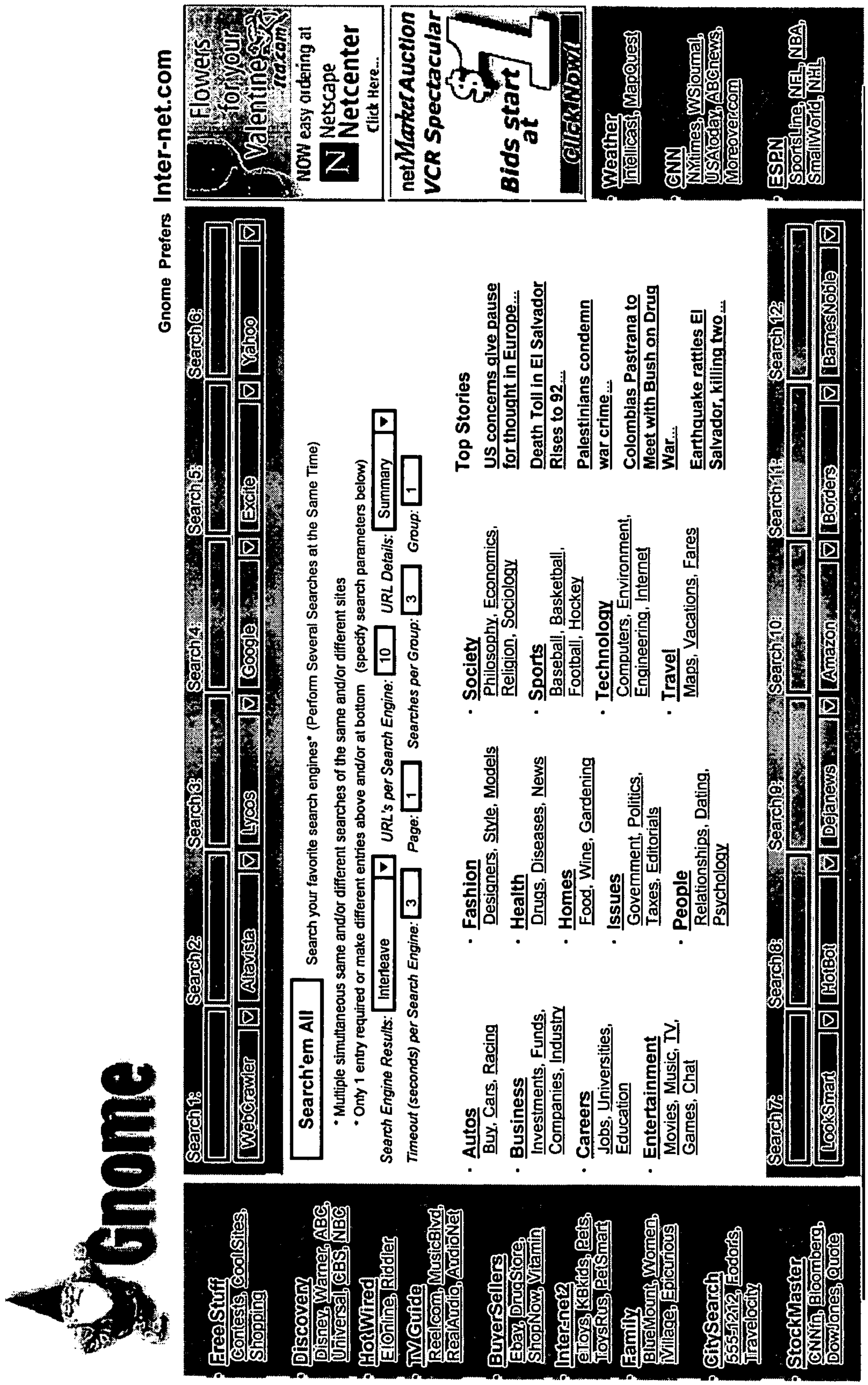
Figure 139:
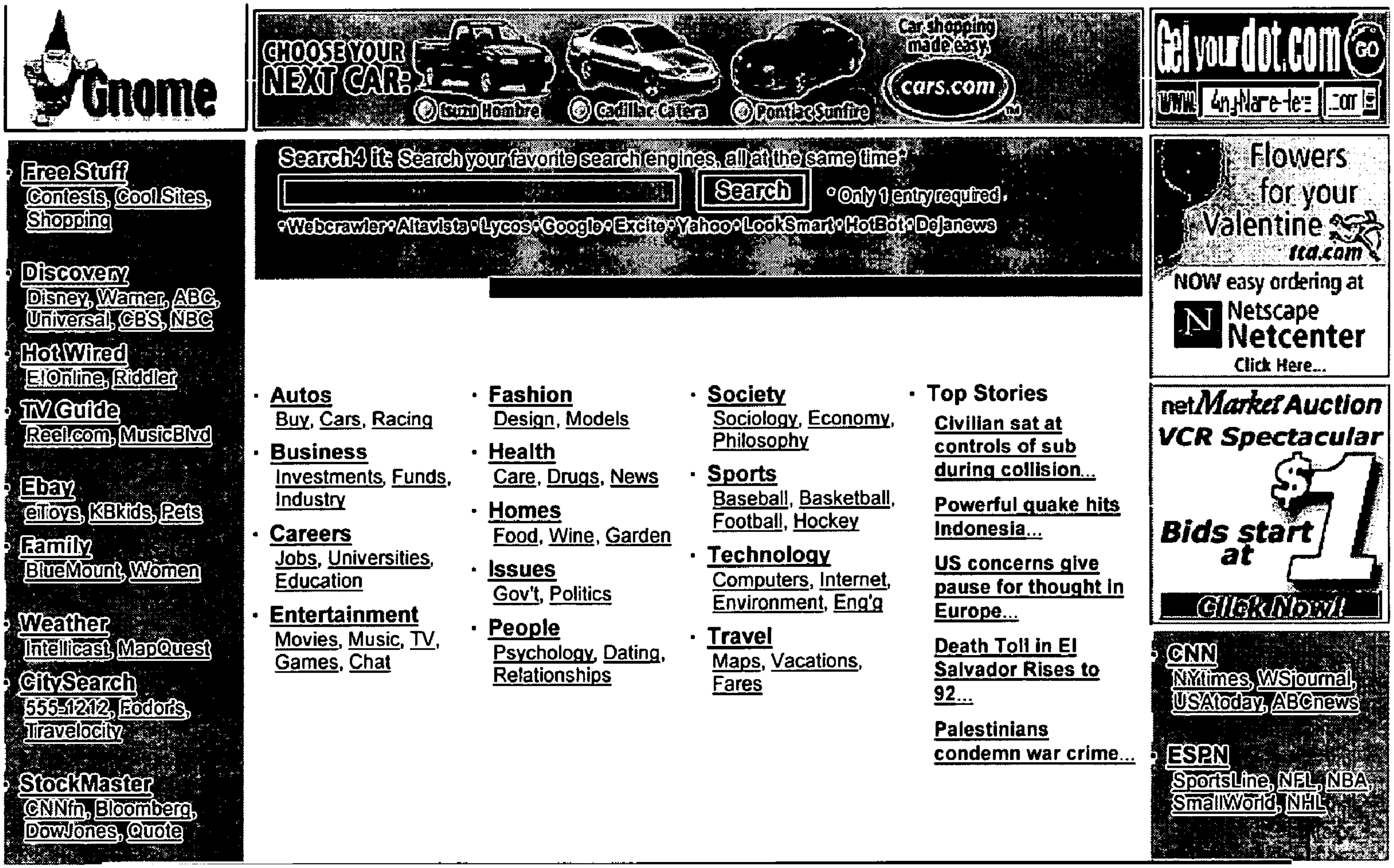
Figure 140:
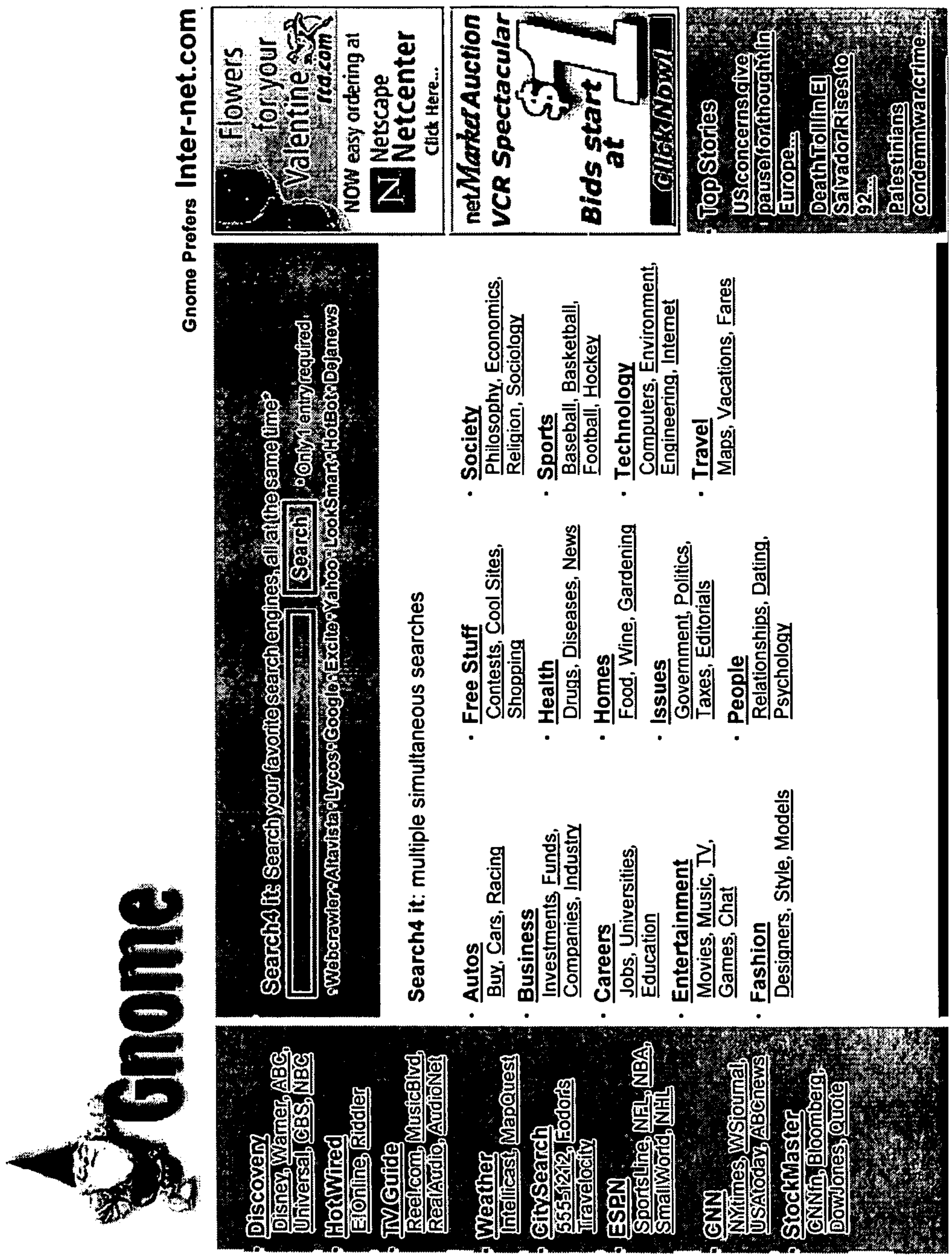
Figure 141:
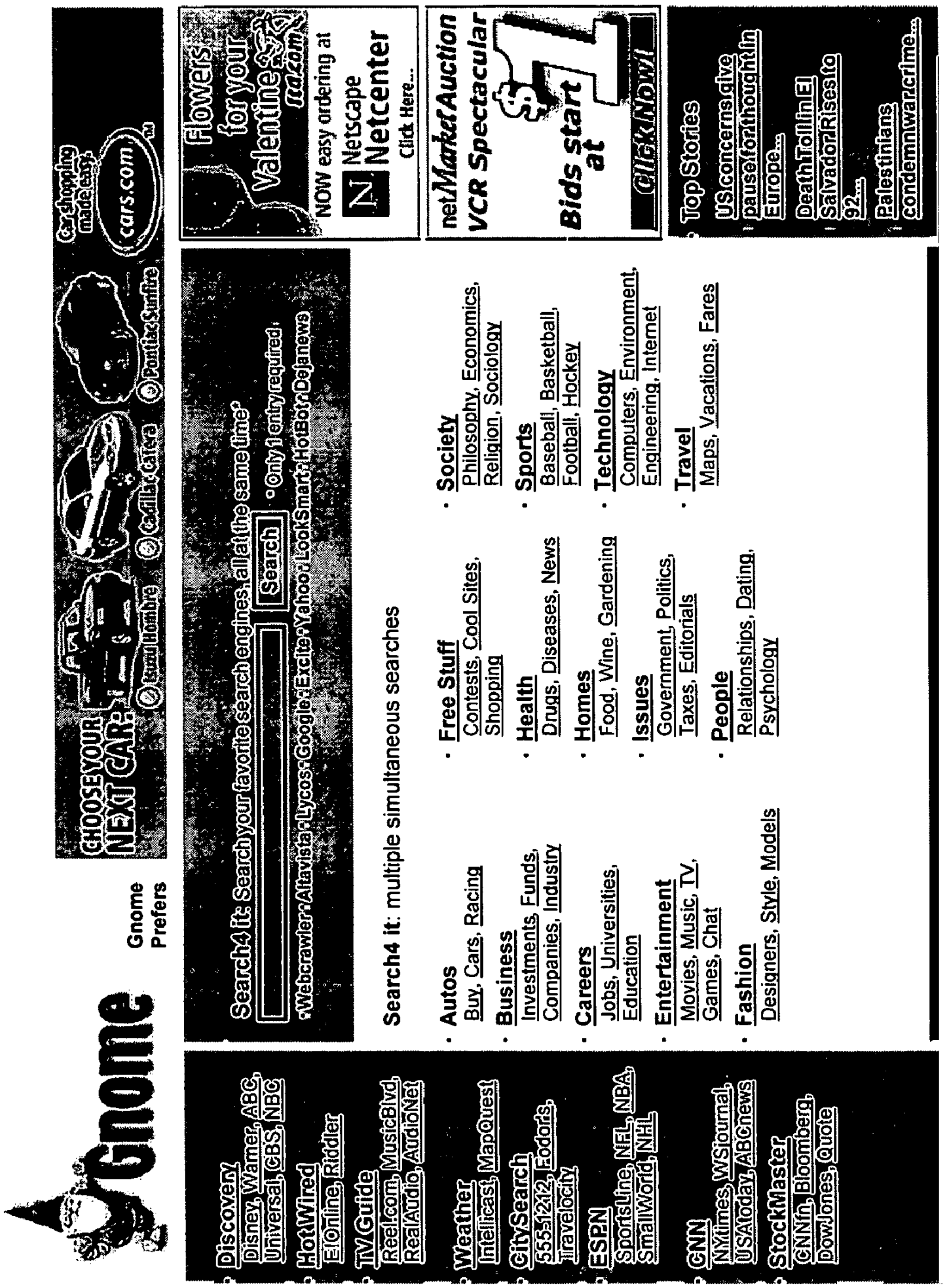
Figure 142:
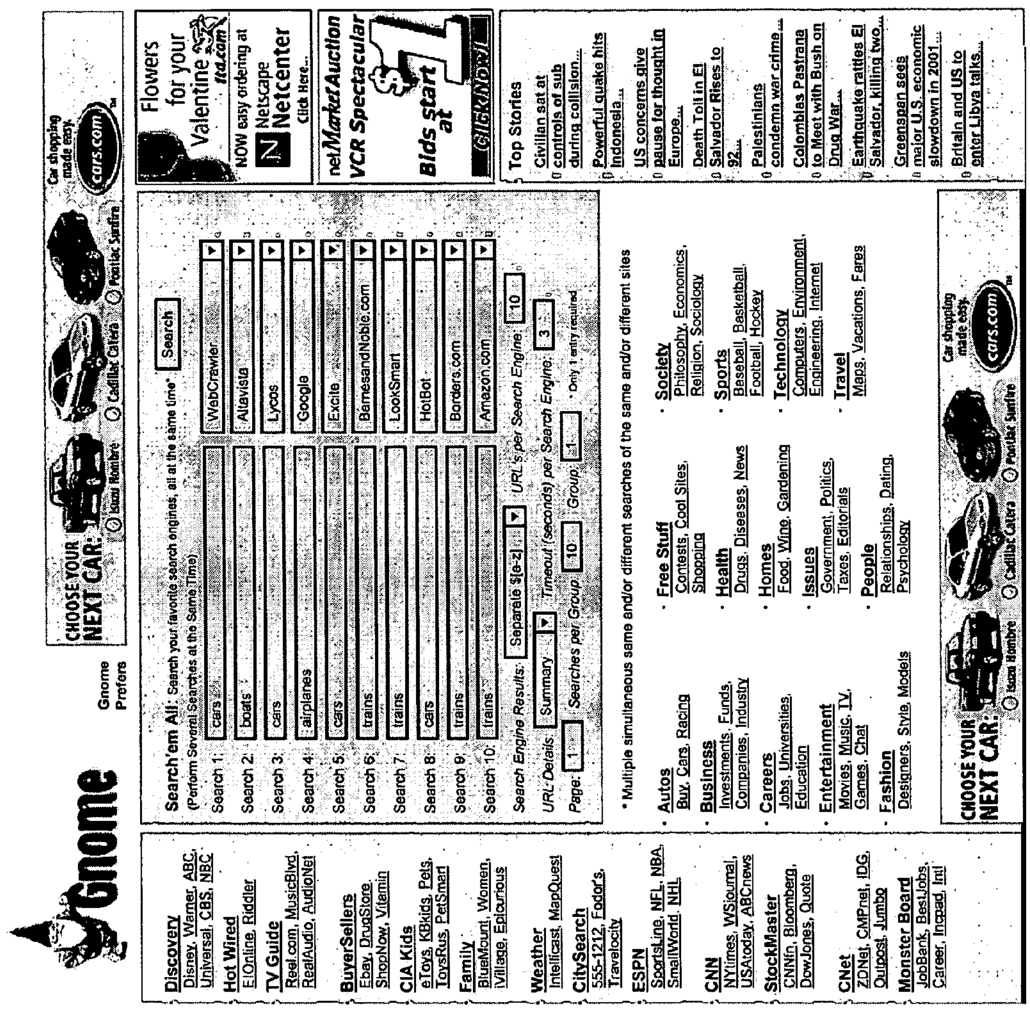
Figure 143A:
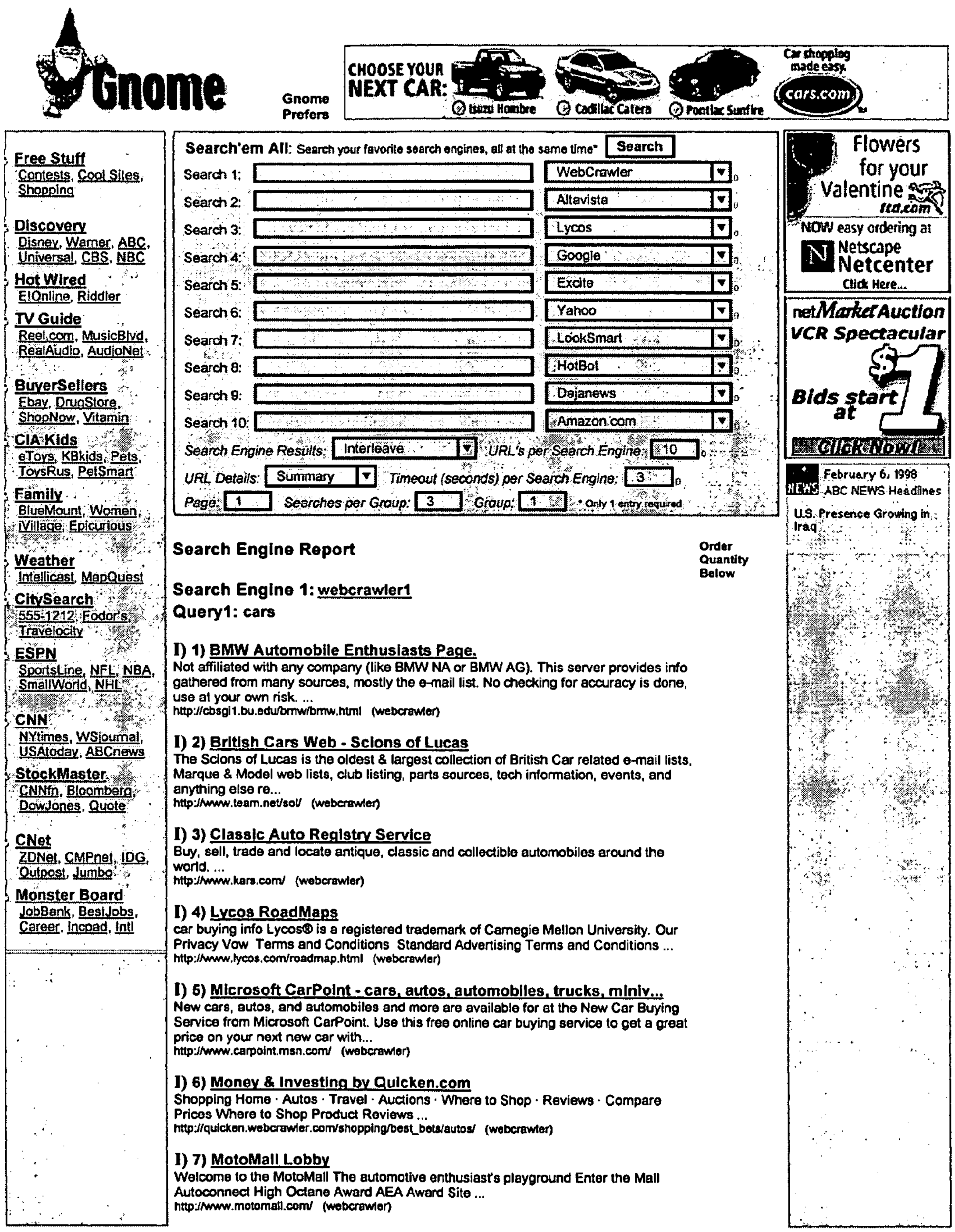
Figure 144:
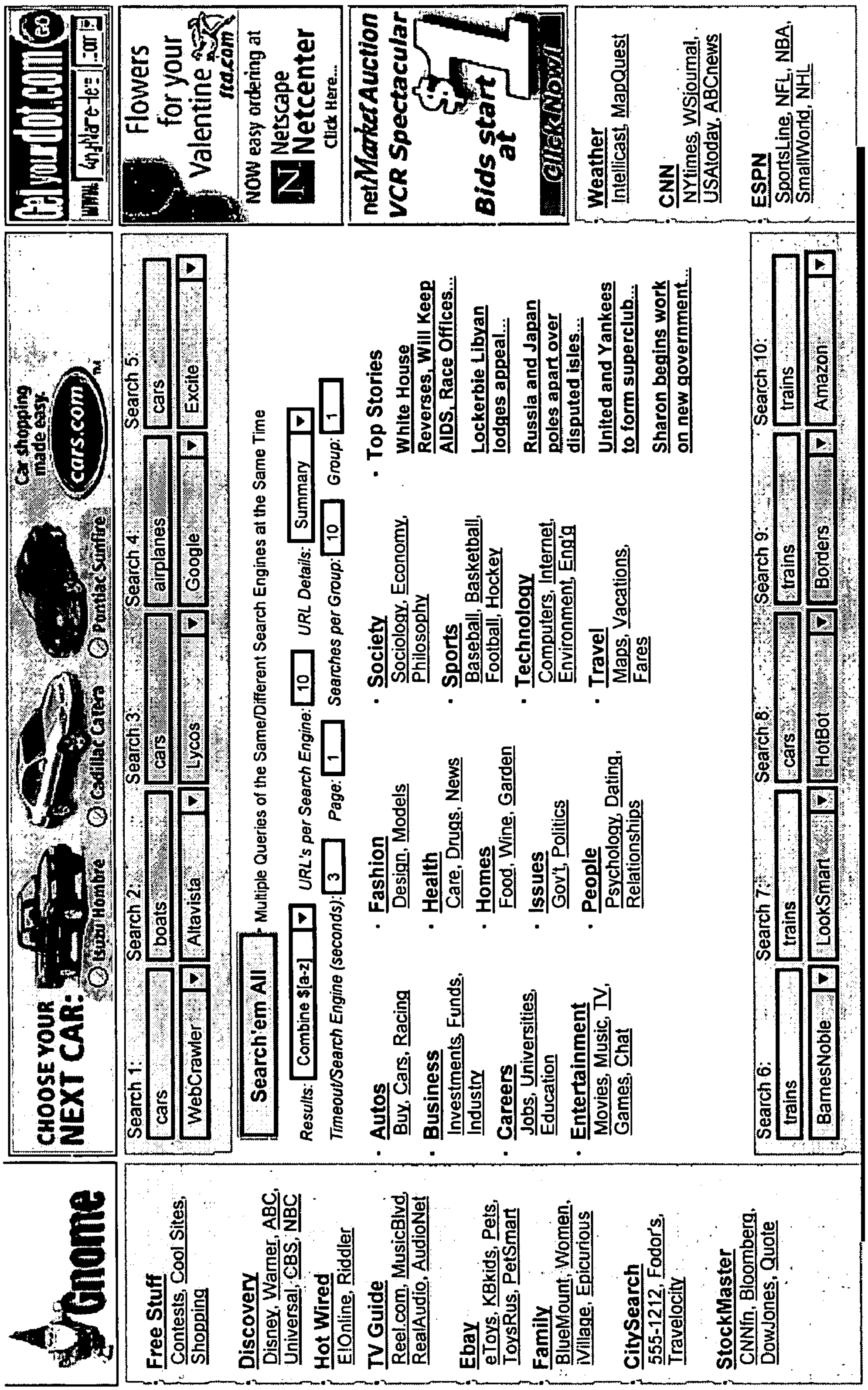
Figure 145A:
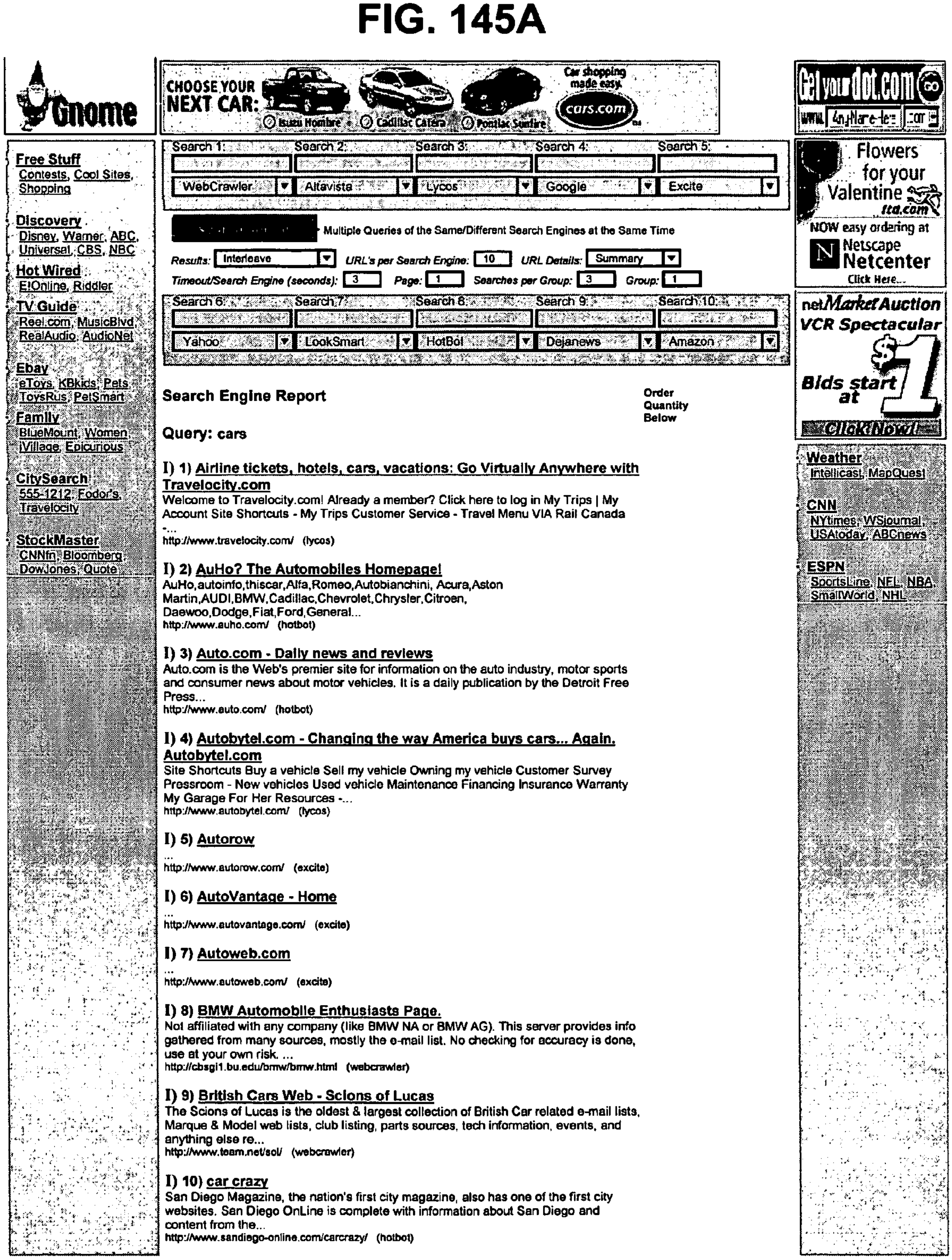
Figure 146:
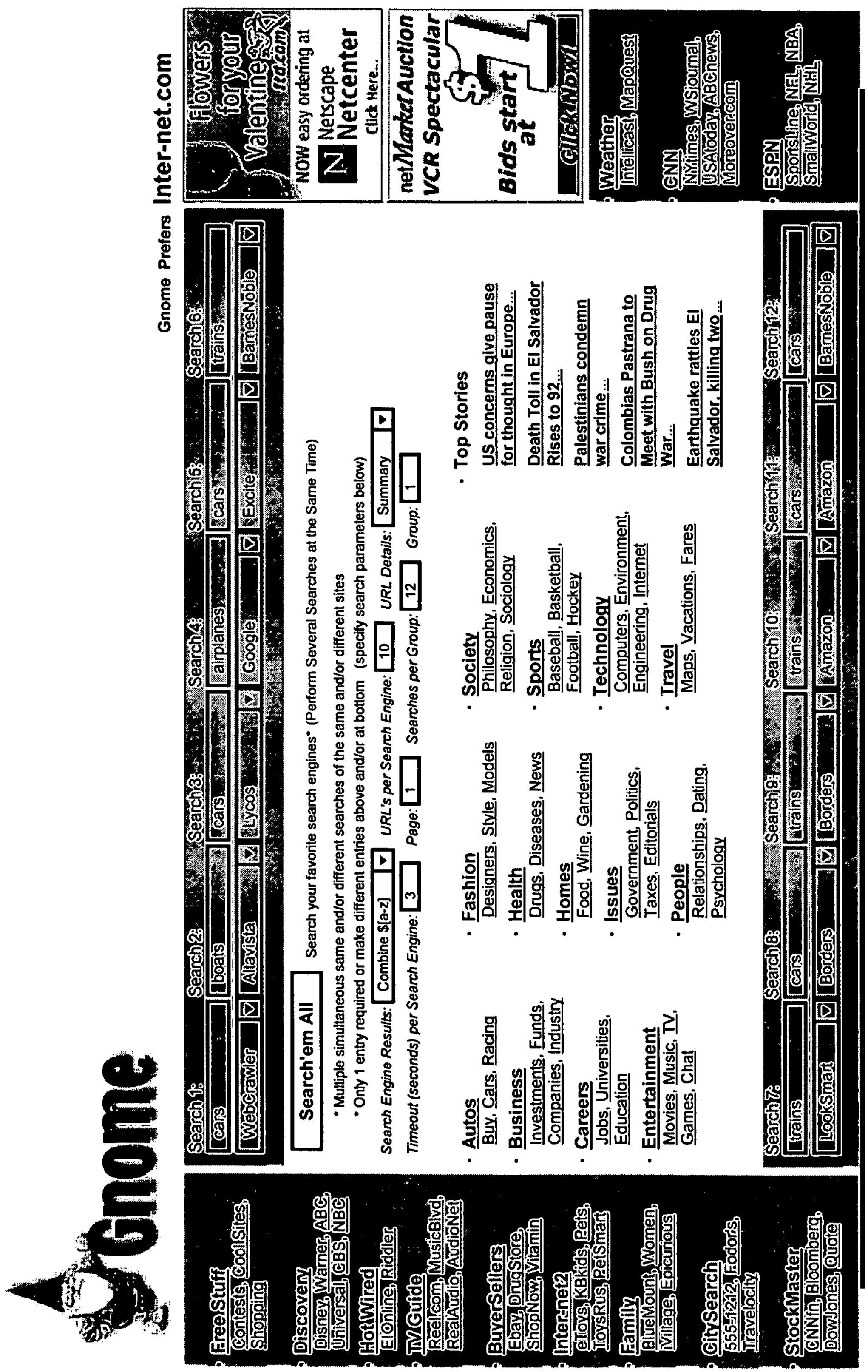
Figure 147A:
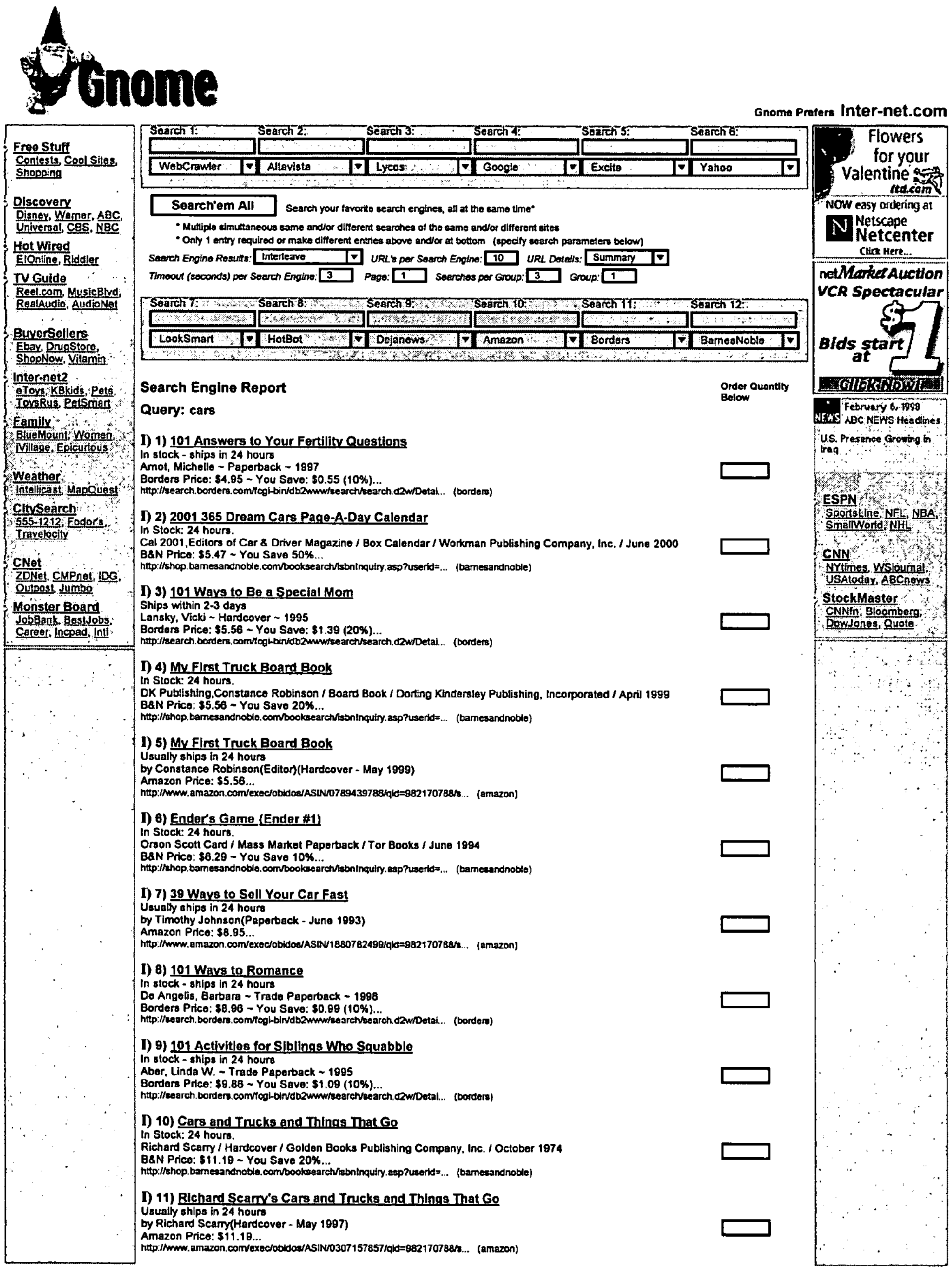

FIG. 110 is another schematic representation of a typical one of the addressable query information group $GI_{nz}$, based upon certain sorting and/or grouping criteria, having the labelled individual information groups $LL_{nz1}$. . . $LL_{nzu}$, the optional database labelled individual information groups $RL_{nz1}$. . . $RL_{nzx}$, the optional query description $QT_{nz}$, the optional server descriptions and/or links $ST_{nz1}$. . . $ST_{nzf}$, and the optional advertisements and/or links $LT_{nz1}$. . . $LT_{nzt}$ incorporated into certain typical ones of the typical service and/or information response forms $IS_n$ of FIGS. 27A–52C, inclusive;

FIG. 111 depicts another typical completed service and/or information entry request form $IF_n$ at the user interface $I_n$;

FIGS. 112A, 112B, 112C, 112D, 112E, 112F, 112G, and 112H depict another typical user response $UR_n$, as the typical service and/or information response form $IS_n$ at the user interface $I_n$, which may be communicated to the user $U_n$, illustrated in partial views;

FIG. 113 depicts another typical completed service and/or information entry request form $IF_n$ at the user interface $I_n$;

FIGS. 114A, 114B, 114C, 114D, 114E, 114F, 114G, and 114H depict another typical user response $UR_n$, as the typical service and/or information response form $IS_n$ at the user interface $I_n$, which may be communicated to the user $U_n$, illustrated in partial views;

FIG. 115 depicts another typical completed service and/or information entry request form $IF_n$ at the user interface $I_n$;

FIGS. 116A, 116B, 116C, 116D, 116E, 116F, 116G, and 116H depict another typical user response $UR_n$, as the typical service and/or information response form $IS_n$ at the user interface $I_n$, which may be communicated to the user $U_n$, illustrated in partial views;

FIG. 117 depicts another typical completed service and/or information entry request form $IF_n$ at the user interface $I_n$;

FIGS. 118A, 118B, 118C, 118D, 118E, 118F, 118G, and 118H depict another typical user response $UR_n$, as the typical service and/or information response form $IS_n$ at the user interface $I_n$, which may be communicated to the user $U_n$, illustrated in partial views;

FIG. 119 depicts another typical completed service and/or information entry request form $IF_n$ at the user interface $I_n$;

FIGS. 120A, 120B, 120C, 120D, 120E, 120F, 120G, and 120H depict another typical user response $UR_n$, as the typical service and/or information response form $IS_n$ at the user interface $I_n$, which may be communicated to the user $U_n$, illustrated in partial views;

FIG. 121 depicts another typical completed service and/or information entry request form $IF_n$ at the user interface $I_n$;

FIGS. 122A, 122B, 122C, 122D, 122E, 122F, 122G, and 122H depict a typical combined user response $UR_n$, as the typical service and/or information response form $IS_n$ at the user interface $I_n$, which may be communicated to the user $U_n$, and an order entry form $OF_n$, which the user $U_n$ may use to enter an order, illustrated in partial views;

FIGS. 123A, 123B, 123C, 123D, 123E, 123F, 123G, and 123H depict the typical combined user response $UR_n$, as the typical service and/or information response form $IS_n$ at the user interface $I_n$, which may be communicated to the user $U_n$, and the order entry form $OF_n$, which the user $U_n$ may use to enter the order, of FIGS. 114A–114H, with typical order information entered therein, illustrated in partial views;

FIGS. 124A and 124B depict a typical preview form of an order $OP_n$, resulting from submission of the order entry form $OF_n$, of the typical combined user response $UR_n$, as the typical service and/or information response form $IS_n$ at the user interface $I_n$, which may be communicated to the user $U_n$, and the order entry form $OF_n$, which the user $U_n$ may use to enter the order, of FIGS. 114A–114H, with the typical order information entered therein, as shown in FIGS. 123A–123H, illustrated in partial views;

FIGS. 125A and 125B depict a typical order placement form $OL_n$, having the typical preview form of the order $OP_n$, resulting from submission of the order entry form $OF_n$, of the typical combined user response $UR_n$, as the typical service and/or information response form $IS_n$ at the user interface $I_n$, which may be communicated to the user $U_n$, and the order entry form $OF_n$, which the user $U_n$ may use to enter the order, of FIGS. 114A–114H, with the typical order information entered therein, as shown in FIGS. 123A–123H, or which the user $U_n$ may enter through the typical preview form of the order $OP_n$ of FIGS. 124A and 124B, illustrated in partial views;

FIGS. 126A and 126B depict a typical completed order placement form $OL_n$, having a preview of the order $OP_n$, resulting from submission of the order entry form $OF_n$, of the typical combined user response $UR_n$, as the typical service and/or information response form $IS_n$ at the user interface $I_n$, which may be communicated to the user $U_n$, and the order entry form $OF_n$, which the user $U_n$ may use to enter the order, of FIGS. 114A–114H, with the typical order information entered therein, as shown in FIGS. 123A–123H, or which the user $U_n$ may enter through the typical preview form of the order $OP_n$ of FIGS. 124A and 124B, illustrated in partial views;

FIGS. 127A and 127B depict a typical order confirmation $OC_n$, resulting from submission of the typical completed order placement form $OL_n$ for FIGS. 126A and 126B, illustrated in partial views;

FIGS. 128A, 128B, and 128C depict a typical e-mail order placement $EP_n$, resulting from submission of the typical completed order placement form $OL_n$ of FIGS. 126A and 126B, illustrated in partial views;

FIGS. 129A, 129B, and 129C depict a typical e-mail confirmation of receipt of order $EC_n$, resulting from submission of the typical completed order placement form $OL_n$ of FIGS. 126A and 126B, illustrated in partial views;

FIGS. 130A and 130B depict a typical e-mail order placement $EP_n$ of a portion of the order, resulting from submission of the typical completed order placement form $OL_n$ of FIGS. 126A and 126B, illustrated in partial views;

FIGS. 131A and 131B depict a typical e-mail order placement $EP_n$ of another portion of the order, resulting from submission of the typical completed order placement form $OL_n$ of FIGS. 126A and 126B, illustrated in partial views;

FIGS. 132A and 132B depict a typical e-mail order placement $EP_n$ of another portion of the order, resulting from submission of the typical completed order placement form $OL_n$ of FIGS. 126A and 126B, illustrated in partial views;

FIG. 133 is a schematic representation of certain typical optional instructions $VJ_{nm1} \ldots VJ_{nk}$ and/or certain additional request links $SL_{n1} \ldots SL_{nw}$;

FIG. 134 is a schematic representation of other certain typical optional instructions $VJ_{nm1} \ldots VJ_{nk}$ and/or other certain additional request links $SL_{n1} \ldots SL_{nw}$;

FIG. 135 depicts certain typical additional request links $SL_{n1} \ldots SL_{nw}$;

FIG. 136 depicts another typical service and/or information entry request form $IE_n$ at the user interface $I_n$, which the user $U_n$ may communicate other typical user input $UI_n$ therethrough;

FIG. 137 depicts another typical service and/or information entry request form $IE_n$ at the user interface $I_n$, which the user $U_n$ may communicate other typical user input $UI_n$ therethrough;

FIG. 138 depicts another typical service and/or information entry request form $IE_n$ at the user interface $I_n$, which the user $U_n$ may communicate other typical user input $UI_n$ therethrough;

FIG. 139 depicts another typical service and/or information entry request form $IE_n$ at the user interface $I_n$, which the user $U_n$ may communicate other typical user input $UI_n$ therethrough;

FIG. 140 depicts another typical service and/or information entry request form $IE_n$ at the user interface $I_n$, which the user $U_n$ may communicate other typical user input $UI_n$ therethrough;

FIG. 141 depicts another typical service and/or information entry request form $IE_n$ at the user interface $I_n$, which the user $U_n$ may communicate other typical user input $UI_n$ therethrough;

FIG. 142 depicts another typical completed service and/or information entry request form $IF_n$ at the user interface $I_n$;

FIGS. 143A, 143B, 143C, 143D, 143E, 143F, 143G, and 143H depict another typical user response $UR_n$, as the typical service and/or information response form $IS_n$ at the user interface $I_n$, which may be communicated to the user $U_n$, illustrated in partial views;

FIG. 144 depicts another typical completed service and/or information entry request form $IF_n$ at the user interface $I_n$;

FIGS. 145A, 145B, 145C, 145D, 145E, 145F, and 145G depict another typical user response $UR_n$, as the typical service and/or information response form $IS_n$ at the user interface $I_n$, which may be communicated to the user $U_n$, illustrated in partial views;

FIG. 146 depicts another typical completed service and/or information entry request form $IF_n$ at the user interface $I_n$; and FIGS. 147A, 147B, 147C, 147D, 147E, 147F, and 147G depict another typical user response $UR_n$, as the typical service and/or information response form $IS_n$ at the user interface $I_n$, which may be communicated to the user $U_n$, illustrated in partial views.

DESCRIPTION

The preferred embodiments of the present invention will be described with reference to FIGS. 1–147 of the drawings, all references to which include FIGS. 1–147G. Identical elements in the various figures are identified with the same reference alphanumerics.

I. SYSTEM

A. Overview

Figure 2:
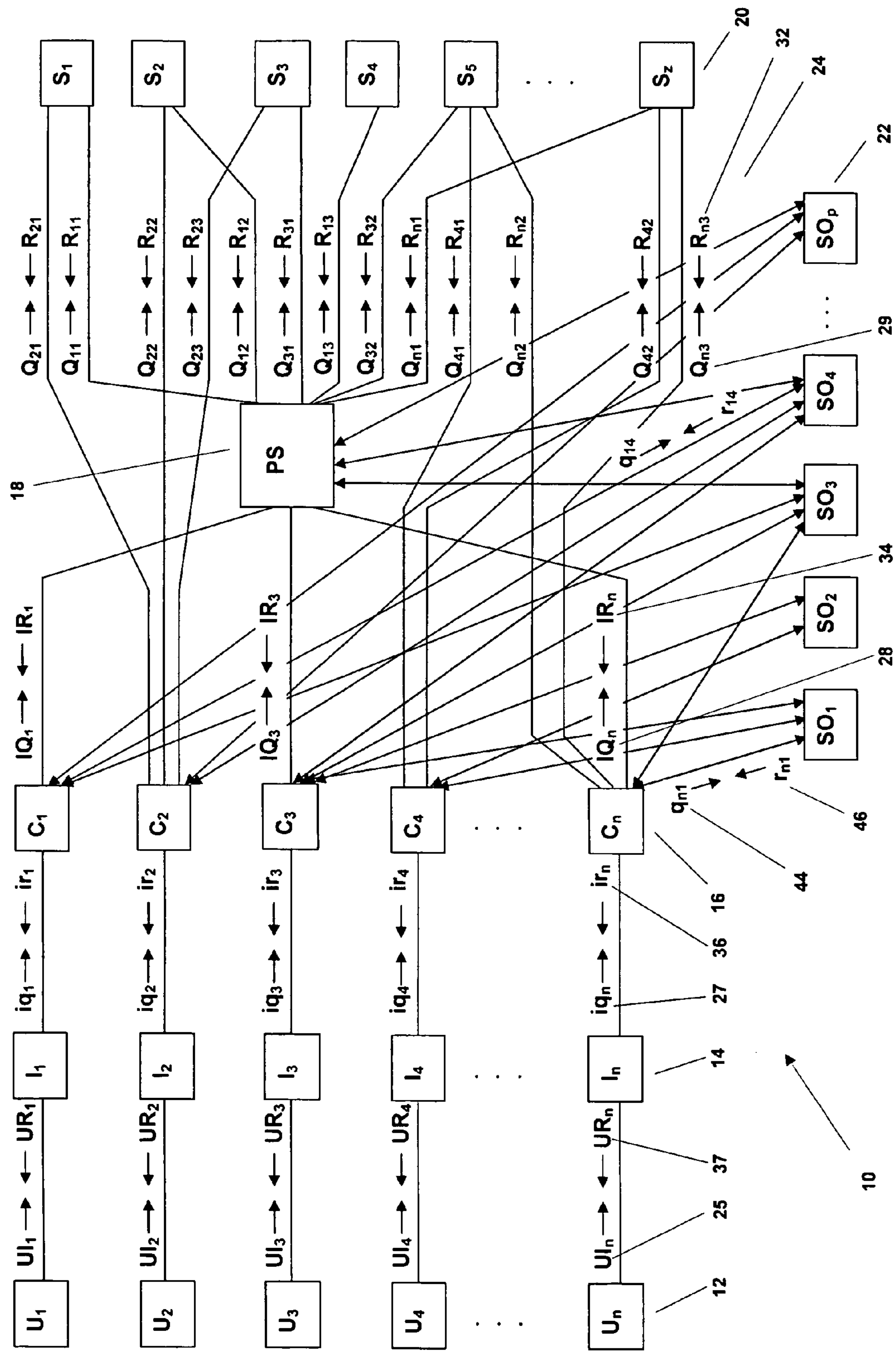
FIG. 2 is a more detailed schematic representation of the client-server multitasking system.

FIGS. 1 and 2 show a client-server multitasking system 10 of the present invention, having requestors $U_1 \ldots U_n$ (12), hereinafter called users $U_1 \ldots U_n$ (12), corresponding user interfaces $I_1 \ldots I_n$ (14), corresponding clients $C_1 \ldots C_n$ (16), server PS (18), servers $S_1 \ldots S_z$ (20), and optional servers $SO_1 \ldots SO_p$ (22), constructed in accordance with the present invention, which reside on a network 24. Each of the users $U_1 \ldots U_n$ (12) communicate with the corresponding clients $C_1 \ldots C_n$ (16) through the corresponding user interfaces $I_1 \ldots I_n$ (14).

Figure 3:
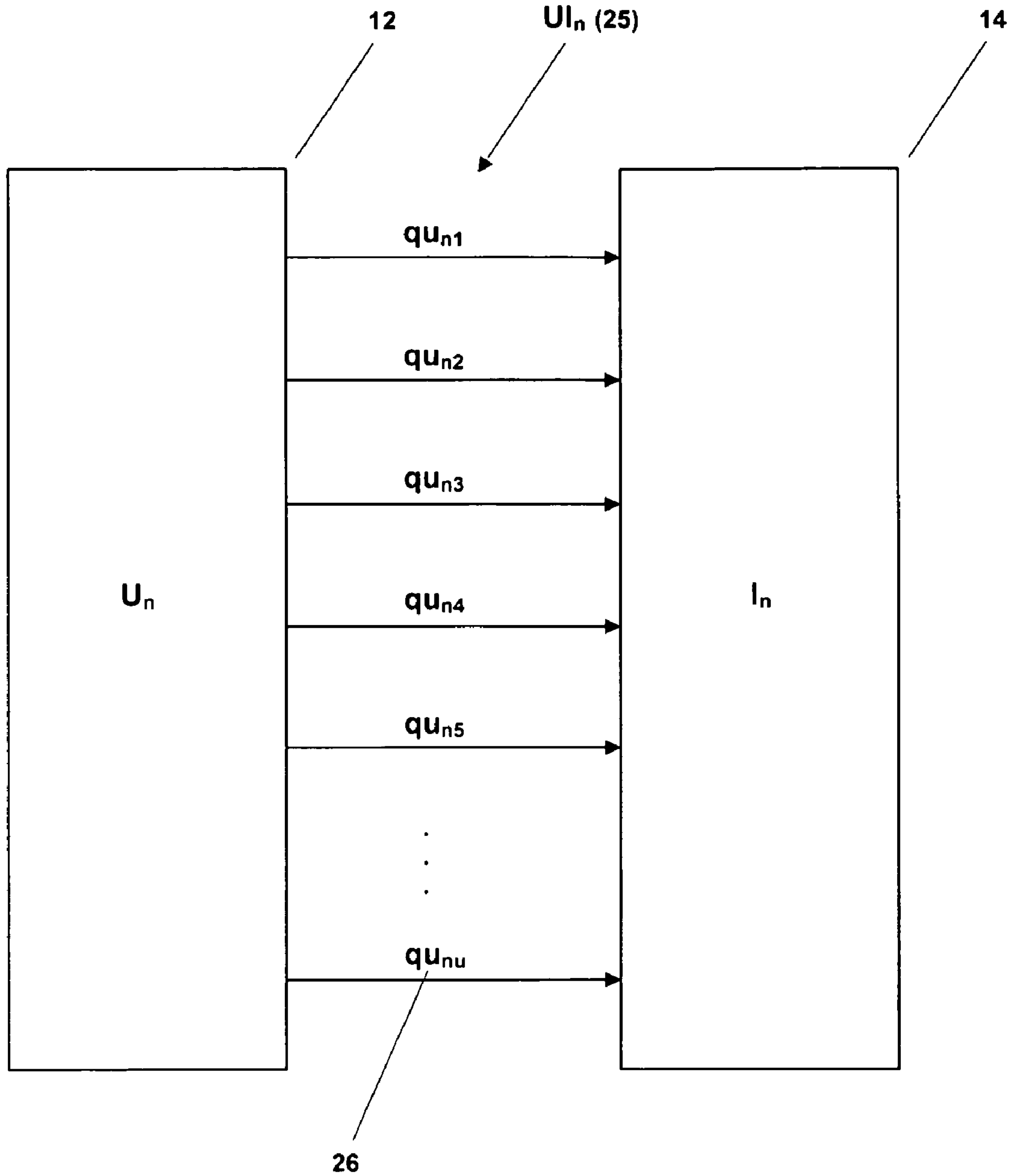
FIG. 3 is a schematic representation of user input $UI_n$ from user $U_n$ into user interface $I_n$ of the client-server multitasking system.

Each of the users $U_1 \ldots U_n$ (12) enter corresponding user inputs $UI_1 \ldots UI_n$ (25) having one or more same and/or different user requests $qu_{11} \ldots qu_{nu}$ (26) into the corresponding user interfaces $I_1 \ldots I_n$ (14), as shown in FIG. 3. The user requests $qu_{11} \ldots qu_{nu}$ (26) are communicated from the user interfaces $I_1 \ldots I_n$ (14) to the corresponding clients $C_1 \ldots C_n$ (16) within corresponding user service and/or information requests $iq_1 \ldots iq_n$ (27), having the user requests $qu_{11} \ldots qu_{nu}$ (26) and other optional information. The users $U_1 \ldots U_n$ (12) may enter the corresponding user inputs $UI_1 \ldots UI_n$ (25) at the same and/or different times.

Figure 4:
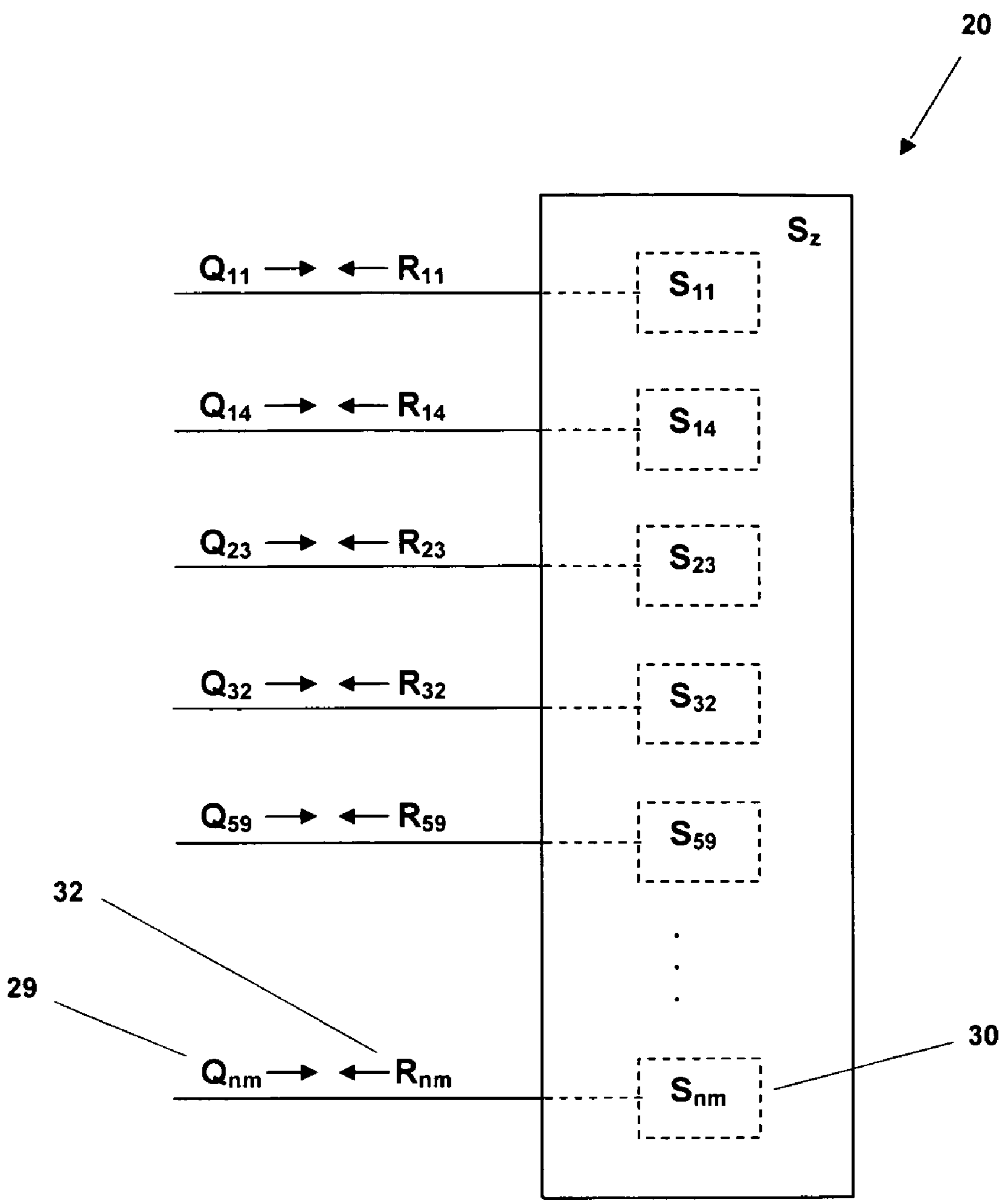
FIG. 4 is a schematic representation of a server $S_z$ of the client-server multitasking system.
Figure 5A:
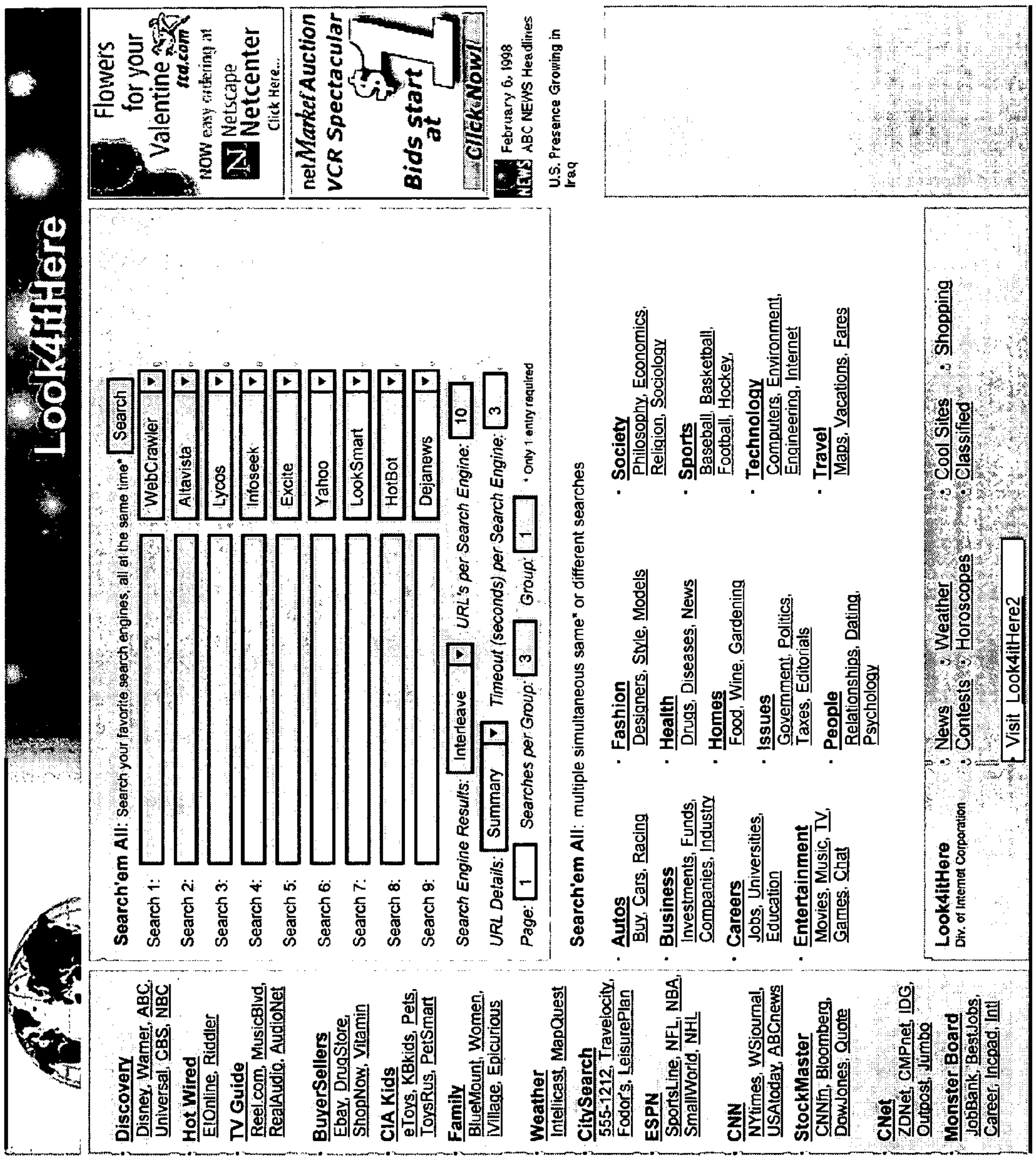
FIG. 5A depicts a typical service and/or information entry request form $IE_n$ at the user interface $I_n$, which the user $U_n$ may communicate typical user input $UI_n$ thereinto.
Figure 5B:
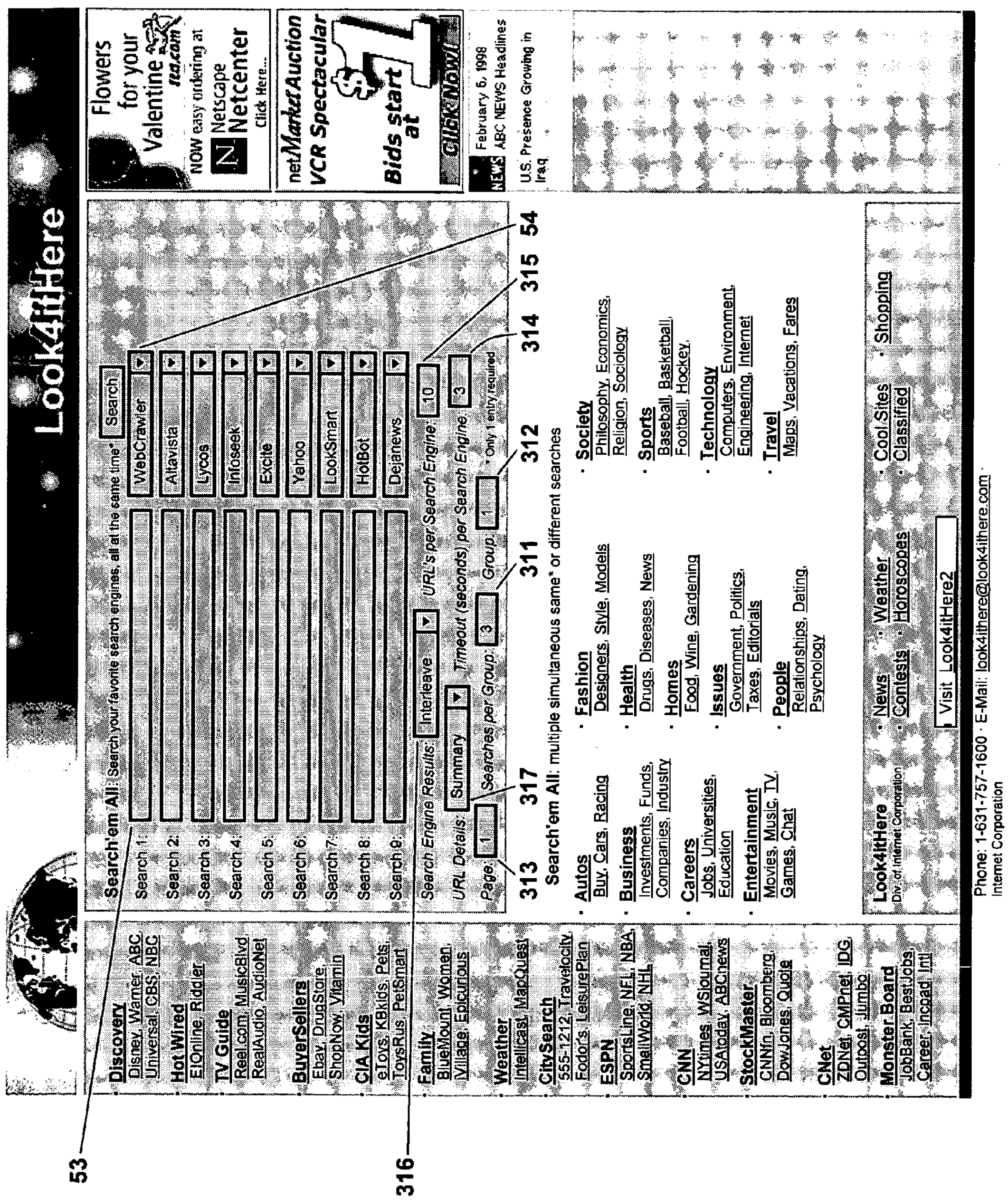
FIG. 5B depicts the typical service and/or information entry request form $IE_n$ at the user interface $I_n$ of FIG. 5B with reference alphanumerics.

Each of the user interfaces $I_1 \ldots I_n$ (14) communicate the user service and/or information requests $iq_1 \ldots iq_n$ (27) to the corresponding clients $C_1 \ldots C_n$ (16), which optionally format the corresponding user service and/or information requests $iq_1 \ldots iq_n$ (27) into corresponding service and/or information requests $IQ_1 \ldots IQ_n$ (28), as required. Each of the service and/or information requests $IQ_1 \ldots IQ_n$ (28) have information therein that may be used to formulate one or more same and/or different requests $Q_{11} \ldots Q_{nm}$ (29) to be made of one or more of the same and/or different ones of the servers $S_1 \ldots S_z$ (20), which may hereinafter be called server designations $S_{11} \ldots S_{nm}$ (30), in accordance with a designation scheme which designates the servers $S_1 \ldots S_z$ (20) to be communicated with corresponding to the requests $Q_{11} \ldots Q_{nm}$ (29) as the corresponding server designations $S_{11} \ldots S_{nm}$ (30), as shown in FIGS. 2 and 4. FIG. 4 shows the server designations $S_{11} \ldots S_{nm}$ (30) for typical ones of the requests $Q_{11} \ldots Q_{nm}$ (29) and a typical one of the servers $S_z$ (20). Each of the requests $Q_{11} \ldots Q_{nm}$ (29) may be the same and/or different one from the other and may be made of the same and/or different ones of the servers $S_1 \ldots S_z$ (20) at the same time and/or different times.

Each of the service and/or information requests $IQ_1 \ldots IQ_n$ (28) may be communicated to the server PS (18), which parses, processes, and/or formats the service and/or information requests $IQ_1 \ldots IQ_n$ (28) into the requests $Q_{11} \ldots Q_{nm}$ (29).

The corresponding clients $C_1 \ldots C_n$ (16) may also and/or alternatively optionally parse, process, and/or format the corresponding user service and/or information requests $iq_1 \ldots iq_n$ (27) into one or more of the same and/or different requests $Q_{11} \ldots Q_{nm}$ (29) to be made of one or more of the same and/or different ones of the servers $S_1 \ldots S_z$ (20), in accordance with the designation scheme corresponding to the corresponding ones of the server designations $S_{11} \ldots S_{nm}$ (30), as required.

Certain ones of the clients $C_1 \ldots C_n$ (16) may communicate corresponding certain ones of the service and/or information requests $IQ_1 \ldots IQ_n$ (28) to the server PS (18), which parses, processes and/or formats the certain ones of the service and/or information requests $IQ_1 \ldots IQ_n$ (28) into certain ones of the requests $Q_{11} \ldots Q_{nm}$ (29), as required, and communicates the certain ones of the requests $Q_{11}$. . . $Q_{nm}$ (29) to the servers $S_1$. . . $S_z$ (20), in accordance with the designation scheme corresponding to the corresponding certain ones of the server designations $S_{11}$. . . $S_{nm}$ (30).

Alternate ones of the clients $C_1$. . .$C_n$ (16) may communicate corresponding alternate ones of the requests $Q_{11}$. . .$Q_{nm}$ (29) to corresponding alternate ones of the servers $S_1$. . . $S_z$ (20), in accordance with the designation scheme corresponding to the corresponding alternate ones of the server designations $S_{11}$. . . $S_{nm}$ (30).

Other alternate ones of the clients $C_1$. . . $C_n$ (16) may communicate corresponding other alternate ones of the service and/or information requests $IQ_1$. . . $IQ_n$ (28) to the server PS (18), which parses, processes and/or formats the other alternate ones of the service and/or information requests $IQ_1$. . . $IQ_n$ (28) into other alternate ones of the requests $Q_{11}$. . . $Q_{nm}$ (29), as required, communicates the other alternate ones of the requests $Q_{11}$. . . $Q_{nm}$ (29) to corresponding other alternate ones of the servers $S_1$. . . $S_z$ (20), in accordance with the designation scheme corresponding to the corresponding other alternate ones of the server designations $S_{11}$. . . $S_{nm}$ (30); and additionally the other alternate ones of the clients $C_1$. . . $C_n$ (16) may also parse, process, and/or format the user service and/or information requests $iq_1$. . . $iq_n$ (27) into one or more of the same and/or different yet other alternate ones of the requests $Q_{11}$. . . $Q_{nm}$ (29), and communicate the yet other alternate ones of the requests $Q_{11}$. . . $Q_{nm}$ (29) to corresponding yet other alternate ones of the servers $S_1$. . . $S_z$ (20), in accordance with the designation scheme corresponding to the corresponding yet other alternate ones of the server designations $S_{11}$. . . $S_{nm}$ (30).

Each of the service and/or information requests $IQ_1$. . . $IQ_n$ (28) may, thus, be communicated from the corresponding clients $C_1$. . . $C_n$ (16) to the server PS (18). The requests $Q_{11}$. . . $Q_{nm}$ (29) may be communicated from the server PS (18) and/or from the corresponding clients $C_1$. . . $C_n$ (16) to the servers $S_1$. . . $S_z$ (20), and may depend upon instructions from and/or generated by the corresponding users $U_1$. . . $U_n$ (12), and/or the corresponding user interfaces $I_1$. . . $I_n$ (14) and/or the corresponding clients $C_1$. . . $C_n$ (16), and/or information generated by the server PS (18) and/or the servers $S_1$. . . $S_z$ (20), and/or ancillary instructions, a combination thereof, and/or other suitable means.

Each of the servers $S_1$. . . $S_z$ (20) corresponding to the designation scheme $S_{11}$. . . $S_{nm}$ (30) replies to the server PS (18) and/or the clients $C_1$. . . $C_n$ (16), accordingly, and communicates corresponding responses $R_{11}$. . . $R_{nm}$ (32), associated with the requests $Q_{11}$. . . $Q_{nm}$ (29), to the server PS (18) and/or the clients $C_1$. . . $C_n$ (16) making the requests $Q_{11}$. . . $Q_{nm}$ (29), as shown in FIG. 2 for typical ones of the requests $Q_{11}$. . . $Q_{nm}$ (29) and the corresponding responses $R_{11}$. . . $R_{nm}$ (32).

The server PS (18) and/or the appropriate clients $C_1$. . . $C_n$ (16) parse, process, format, sort, group, and/or organize the responses $R_{11}$. . . $R_{nm}$ (32) into corresponding service and/or information responses $IR_1$. . . $IR_n$ (34), having corresponding parsed, processed, formatted, sorted, grouped, and/or organized service and/or information groups $G_1$. . . $G_n$ (35) (shown later in FIGS. 27A–52C, inclusive) acceptable to the corresponding clients $C_1$. . . $C_n$ (16) and the corresponding respective user interfaces $I_1$. . . $I_n$ (14). The server PS (18) communicates the appropriate service and/or information responses $IR_1$. . . $IR_n$ (34) to the corresponding clients $C_1$. . . $C_n$ (16).

The clients $C_1$. . . $C_n$ (16) format the service and/or information responses $IR_1$. . . $IR_n$ (34) into corresponding user service and/or information responses $ir_1$. . . $ir_n$ (36), as required, and communicate the user service and/or information responses $ir_1$. . . $ir_n$ (36) to the corresponding user interfaces $I_1$. . . $I_n$ (14). The user interfaces $I_1$. . . $I_n$ (14) incorporate the user service and/or information responses $ir_1$. . . $ir_n$ (36) into corresponding user responses $UR_1$. . . $UR_n$ (37), which are derived at the user interfaces $I_1$. . . $I_n$ (14), and communicated by the user interfaces $I_1$. . . $I_n$ (14) to the corresponding users $U_1$. . . $U_n$ (12). The users $U_1$. . . $U_n$ (12) review the corresponding user responses $UR_1$. . . $UR_n$ (37) at the user interfaces $I_1$. . . $I_n$ (14) and/or select additional services and/or information therefrom.

B. TYPICAL SERVICE AND/OR INFORMATION ENTRY REQUEST FORMS

FIGS. 5A, 5B, and 6–10 show typical ones of service and/or information entry request forms $IE_1$. . . $IE_n$ (38) at the user interfaces $I_1$. . . $I_n$ (14), which the users $U_1$. . . $U_n$ (12) may communicate typical ones of the user inputs $UI_1$. . . $U_n$ (25) thereinto, as requests for information and/or services. The typical ones of the service and/or information entry request forms $IE_1$. . .$IE_n$ (38) at the user interfaces $I_1$. . . $I_n$ (14) shown in FIGS. 5A, 5B, and 6–10 are typical examples of the service and/or information entry request forms $IE_1$. . . $IE_n$ (38) at the user interfaces $I_1$. . . $I_n$ (14), a much larger variety of which is possible. Names and/or links and/or other information are incorporated into the typical ones of the service and/or information entry request forms $IE_1$. . . $IE_n$ (38) shown in FIGS. 5A, 5B, and 6–10 for illustrative purposes, and are not intended to limit the large variety of the service and/or information entry request forms $IE_1$. . . $IE_n$ (38) and the names and/or links and/or information that are possible, and that may be incorporated into the service and/or information entry request forms $IE_1$. . . $IE_n$ (38) at the user interfaces $I_1$. . . $I_n$ (14).

C. TYPICAL COMPLETED SERVICE AND/OR INFORMATION ENTRY REQUEST FORMS

FIGS. 11–26 show typical ones of completed service and/or information entry request forms $IF_1$. . . $IF_n$ (230) at the user interfaces $I_1$. . . $I_n$ (14).

Figure 11:
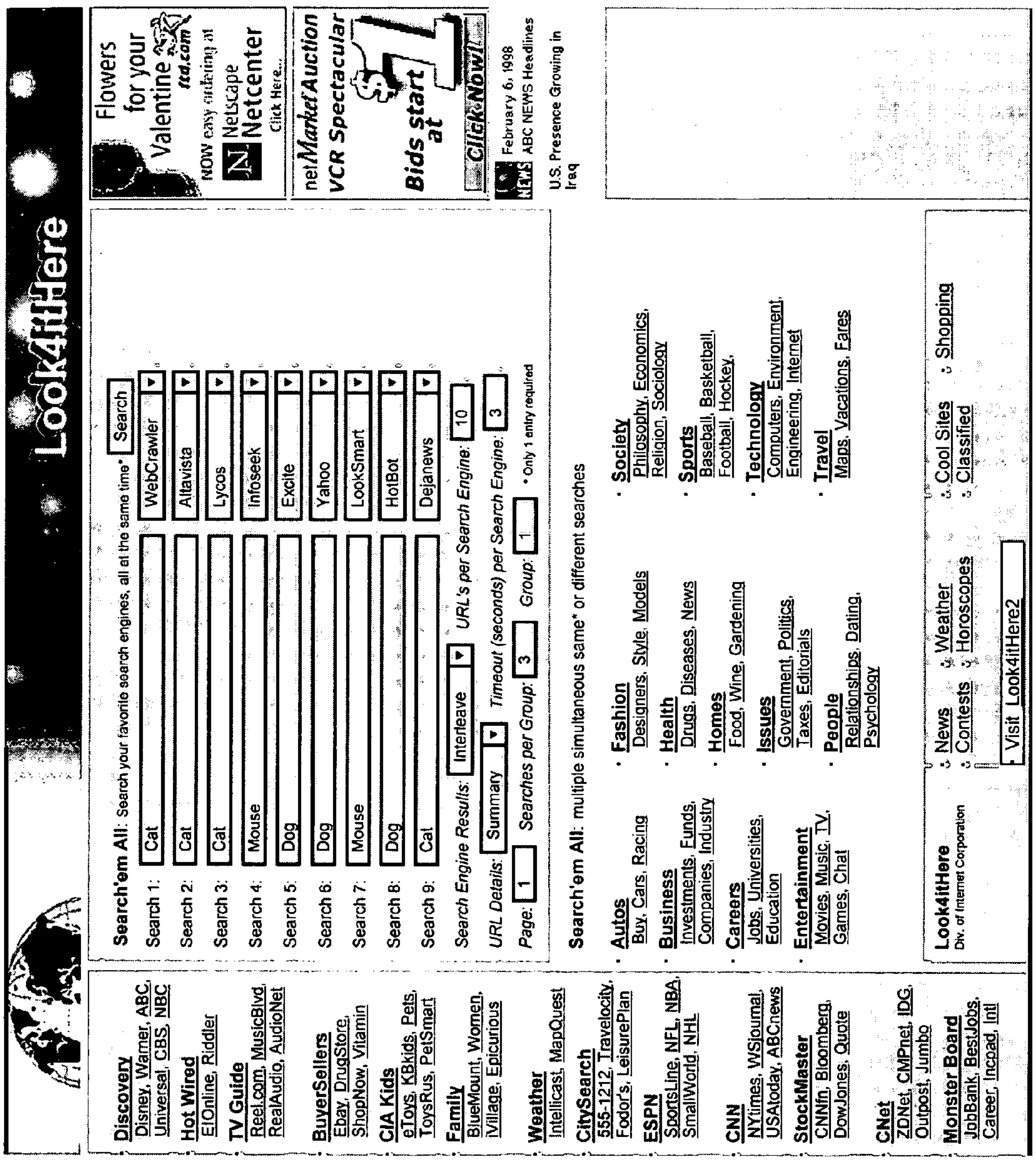
FIG. 11 depicts a typical completed service and/or information entry request form $IF_n$ at the user interface $I_n$.

FIG. 11 shows a typical particular one of the completed service and/or information entry request forms $IF_1$. . . $IF_n$ (230), hereinafter designated the completed service and/or information entry request form $IF_n$ (230), at a particular one of the user interfaces $I_1$. . . $I_n$ (14), hereinafter designated the user interface $I_n$ (14), having same and different ones of the typical queries $QQ_{n1}$. . . $QQ_{nm}$ (53), different ones of the typical server addresses $AQ_{n1}$. . . $AQ_{nm}$ (54), and the typical optional instructions $VJ_{n1}$. . . $VJ_{nk}$ (52). Typical same ones of the typical queries $QQ_{n1}$. . . $QQ_{nm}$ (53), are "Cat", "Dog", and "Mouse", which are different one from the other.

Figure 12:
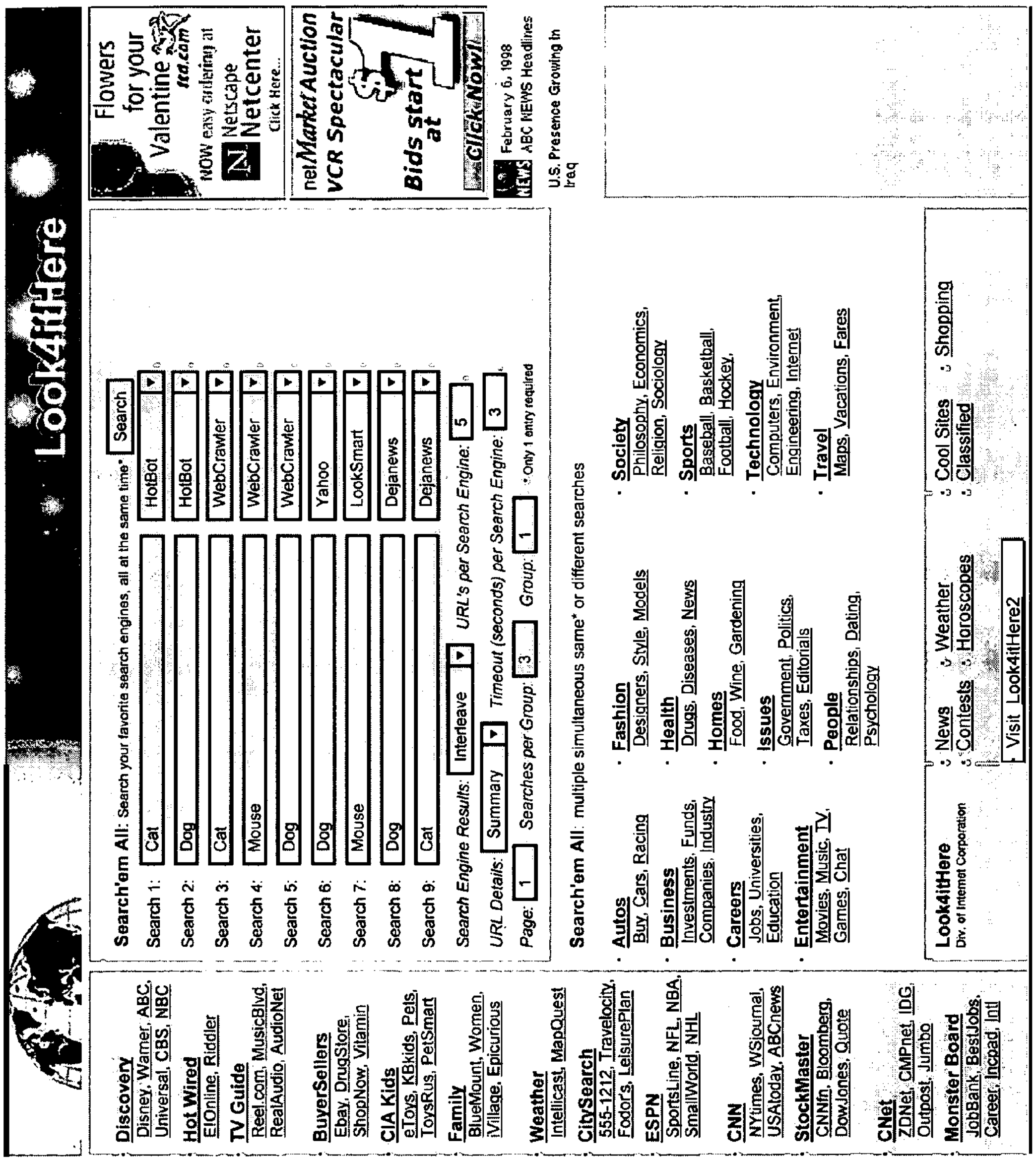
FIG. 12 depicts another typical completed service and/or information entry request form $IF_n$ at the user interface $I_n$.

FIG. 12 shows the typical completed service and/or information entry request forms $IF_n$ (230), at the user interface $I_n$ (14), having same and different ones of the typical queries $QQ_{n1}$. . . $QQ_{nm}$ (53), different ones of the typical server addresses $AQ_{n1}$. . . $AQ_{nm}$ (54), and the typical optional instructions $VJ_{n1}$. . . $VJ_{nk}$ (52). Typical same ones of the typical queries $QQ_{n1}$. . . $QQ_{nm}$ (53) are "Cat", "Dog", and "Mouse", which are different one from the other. Typical same ones of the typical server addresses $AQ_{n1}$. . . $AQ_{nm}$ (54) are HotBot®, WebCrawler®, and Dejanews®, which are different one from the other, and which are also different from Yahoo® and LookSmart®. The typical optional instructions $VJ_{n1}$. . . $VJ_{nk}$ (52) have 5 "URL's per Search Engine", which instruct the client $C_n$ (16) and/or the server PS (18) to return the typical user response $UR_n$ (37), as the typical service and/or information response form $IS_n$ (39) at the user interface $I_n$ (14) having 5 "URL's per Search Engine", rather than 10 "URL's per Search Engine", as instructed in FIG. 11.

Figure 13:
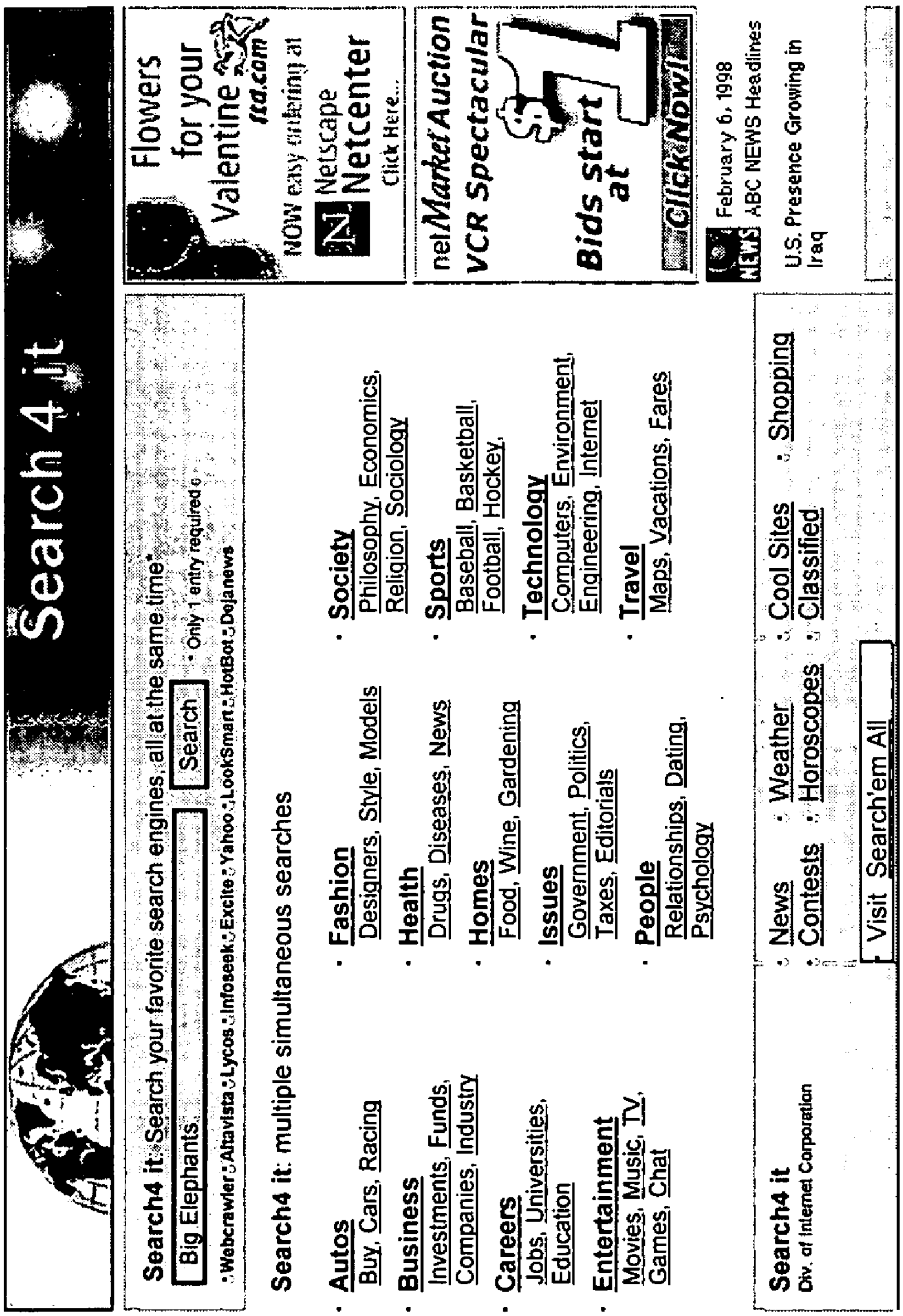
FIG. 13 depicts another typical completed service and/or information entry request form $IF_n$ at the user interface $I_n$.

FIG. 13 shows the typical completed service and/or information entry request forms $IF_n$ (230), at the user interface $I_n$ (14) having a single typical one of the typical queries $QQ_{n1}$. . . $QQ_{nm}$ (53) as "Big Elephants".

Figure 14A:
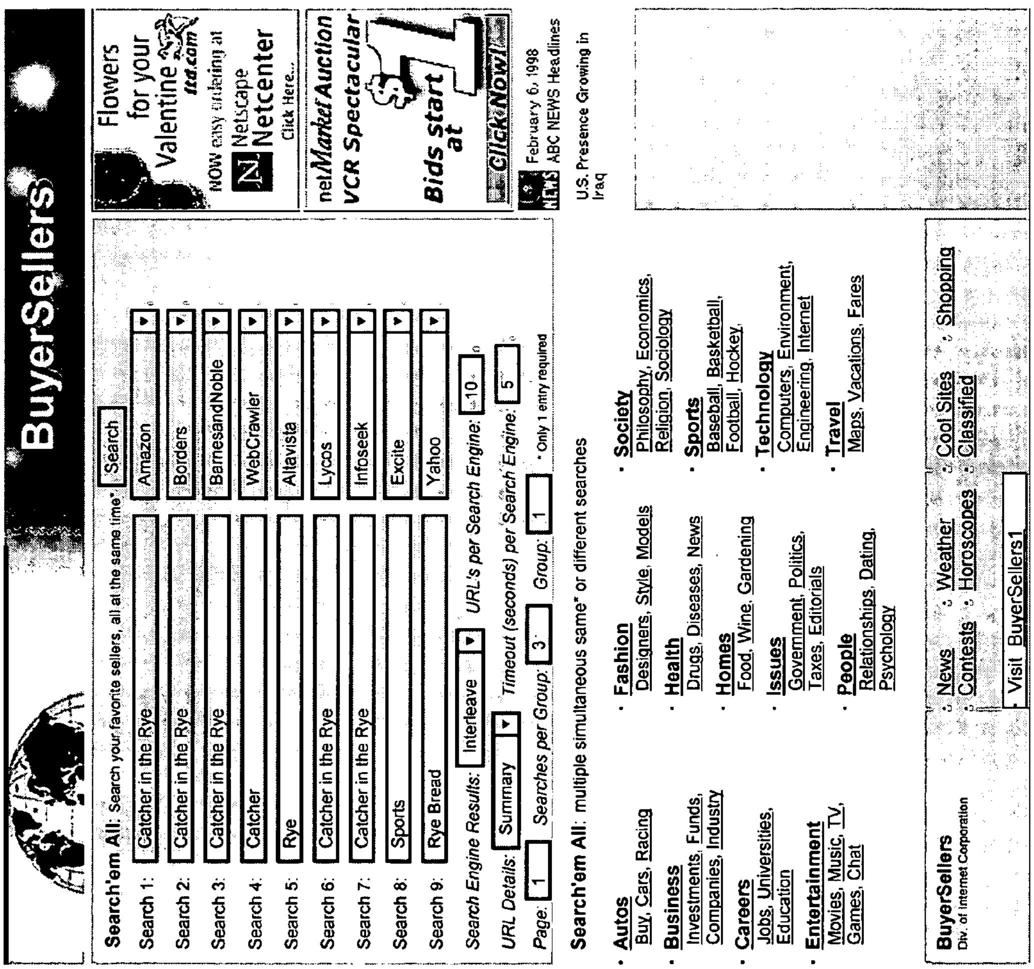
FIG. 14A depicts another typical completed service and/or information entry request form $IF_n$ at the user interface $I_n$.
Figure 14B:
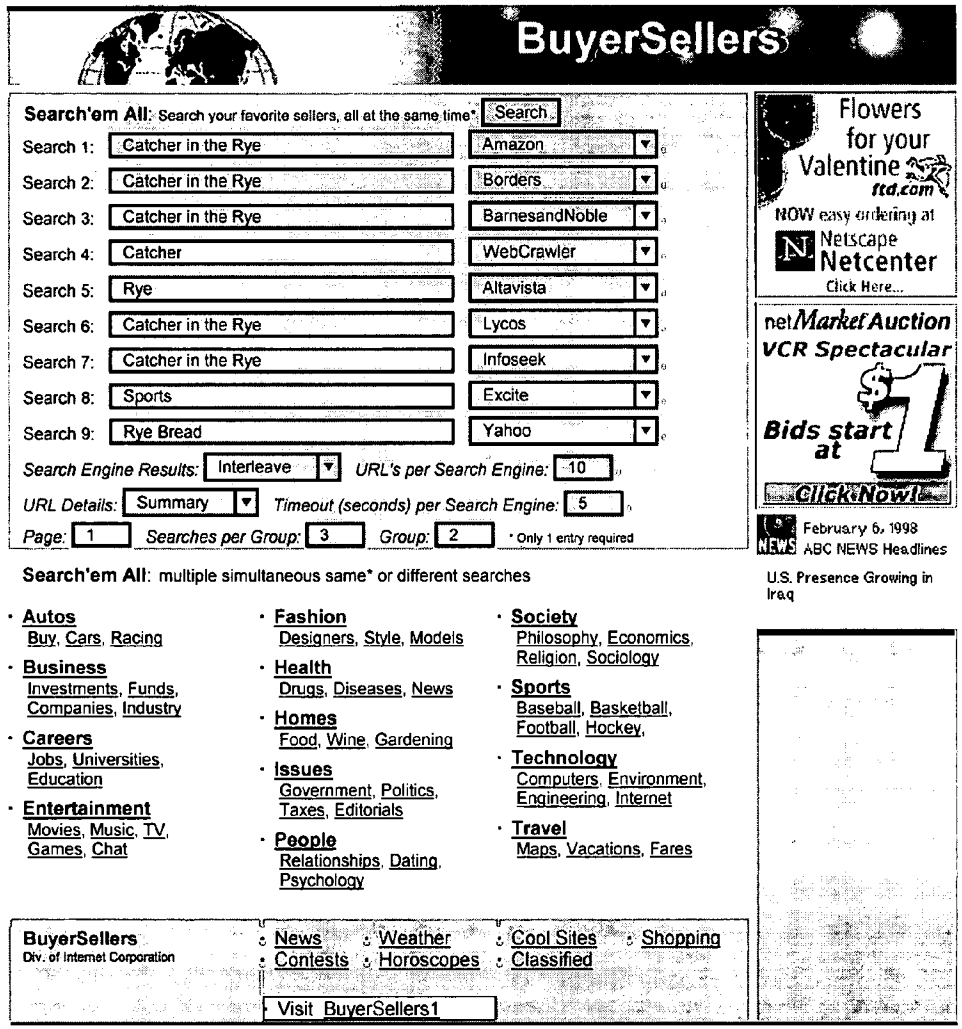
FIG. 14B depicts another typical completed service and/or information entry request form $IF_n$ at the user interface $I_n$.
Figure 14C:
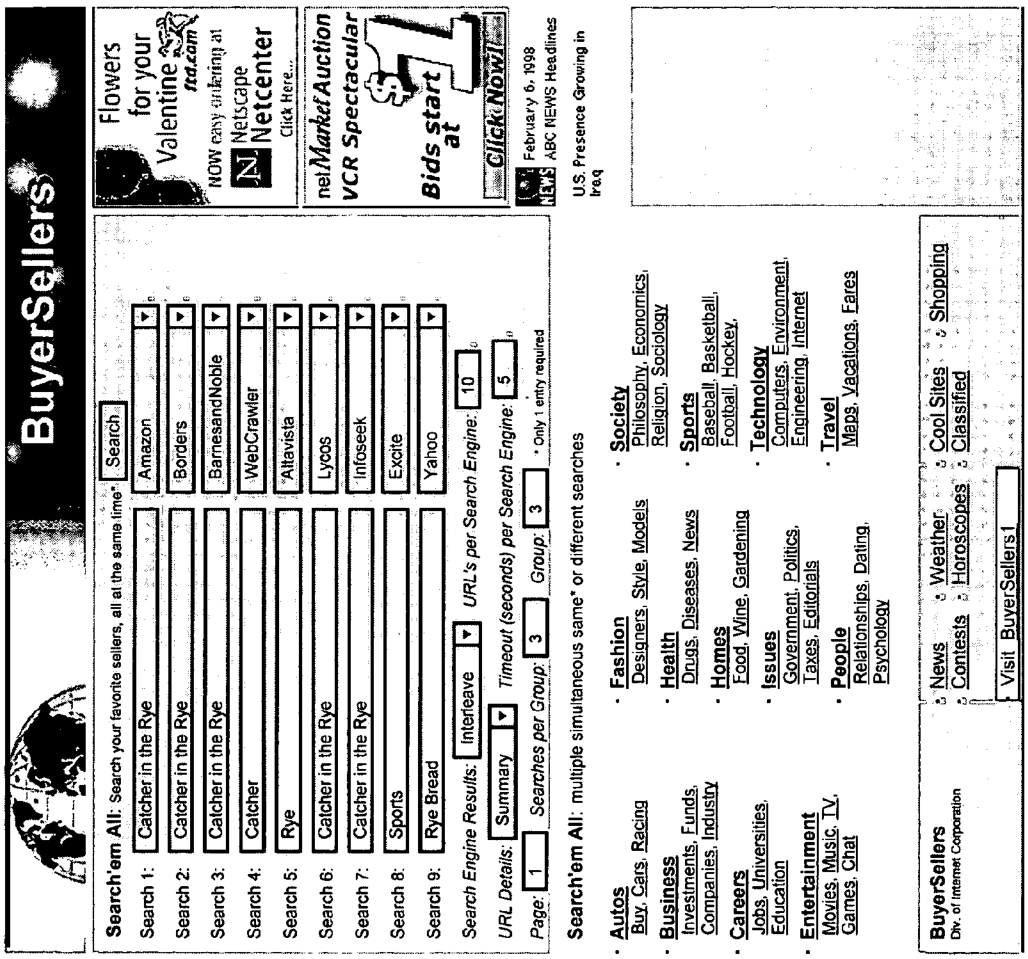
FIG. 14C depicts another typical completed service and/or information entry request form $IF_n$ at the user interface $I_n$.

FIGS. 14A, 14B, and 14C show the typical completed service and/or information entry request form $IF_n$ (230), at the user interface $I_n$ (14), having same and different ones of the typical queries $QQ_{n1}$. . . $QQ_{nm}$ (53), different ones of the typical server addresses $AQ_{n1}$. . . $AQ_{nm}$ (54), and the typical optional instructions $VJ_{n1}$. . . $VJ_{nk}$ (52), showing "Current Group" as "Group I", "Group II", and "Group III", in FIGS. 14A, 14B, and 14C, respectively. Typical same ones of the typical queries $QQ_{n1}$. . . $QQ_{nm}$ (53) are "Catcher in the Rye", "Catcher", "Rye", "Sports", and "Rye Bread", which are different one from the other. The typical server addresses $AQ_{n1}$. . . $AQ_{nm}$ (54) are different one from the other. The typical optional instructions $VJ_{n1}$. . . $VJ_{nk}$ (52) have a 5 second "Timeout (seconds) per Search Engine", rather than a 3 second "Timeout (seconds) per Search Engine" as in FIGS. 11–13. The "Timeout (seconds) per Search Engine" instructs the client $C_n$ (16) and/or the server PS (18) to return the typical user response $UR_n$ (37), as the typical service and/or information response form $IS_n$ (39) at the user interface $I_n$ (14) within a period of less than the "Timeout (seconds) per Search Engine" specified in the typical optional instructions $VJ_{n1}$. . . $VJ_{nk}$ (52). It should be noted that response times of less than one second per search engine are typical, and response times of substantially less than one second are quite common. However, the "Timeout (seconds) per Search Engine" has been incorporated herein for the user $U_1$ (12) to specify in the event of slow ones of the responses $R_{n1}$. . . $R_{nm}$ (32) from certain ones of the servers $S_1$. . . $S_z$ (20).

Figure 15:
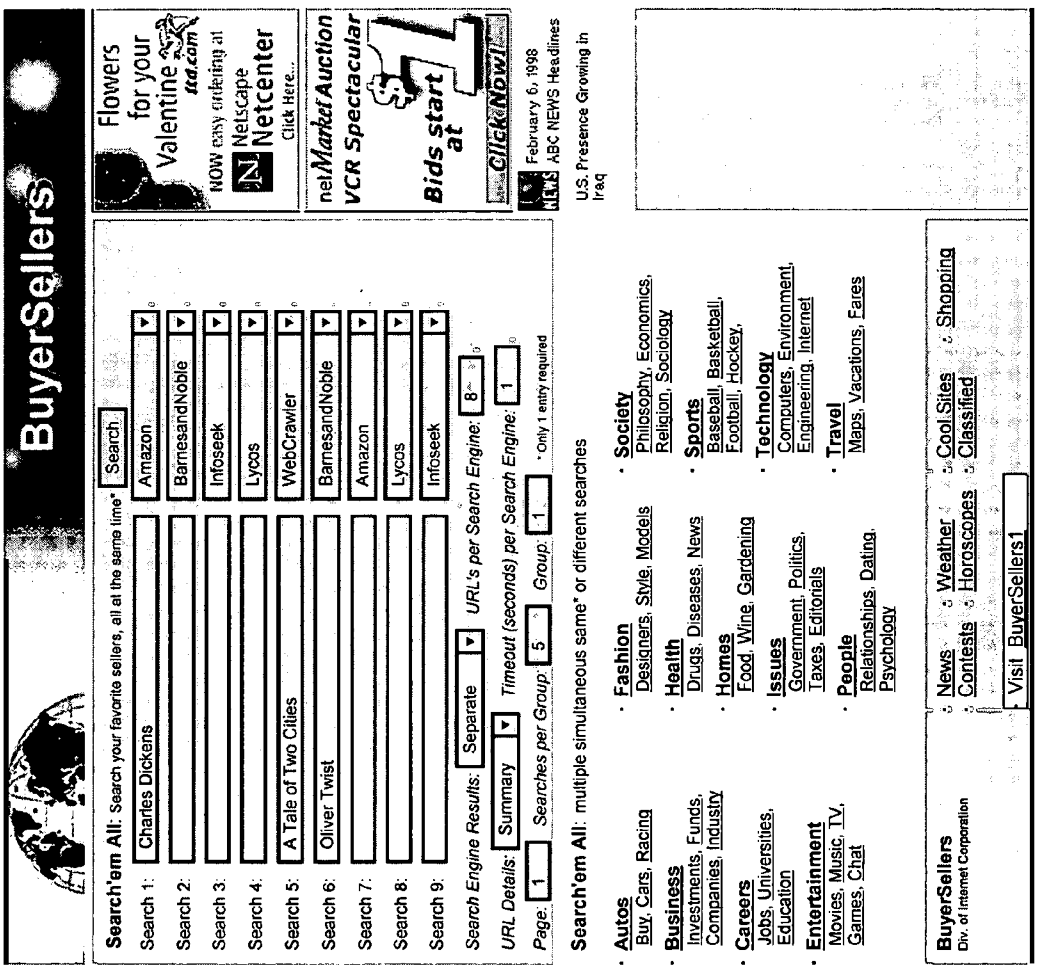
FIG. 15 depicts another typical completed service and/or information entry request form $IF_n$ at the user interface $I_n$.

FIG. 15 shows the typical completed service and/or information entry request forms $IF_n$ (230), at the user interface $I_n$ (14), having same and different ones of the typical queries $QQ_{n1}$. . . $QQ_{nm}$ (53), different ones of the typical server addresses $AQ_{n1}$. . . $AQ_{nm}$ (54), and the typical optional instructions $VJ_{n1}$. . . $VJ_{nk}$ (52). Typical same ones of the typical queries $QQ_{n1}$. . . $QQ_{nm}$ (53) are "Charles Dickens", "A Tale of Two Cities", and "Oliver Twist", which are different one from the other. All blank entries beneath the entry above take on the characteristics of the completed entry above. Therefore, Searches 2, 3, and 4 take on the typical queries $QQ_{n2}$. . . $QQ_{n4}$ (53) of "Charles Dickens" of Search 1, above. Likewise, Searches 7, 8, and 9 take on the typical queries $QQ_{n7}$. . . $QQ_{n9}$ (53) of "Oliver Twist" of Search 6, above. Search 5 takes on the typical query $QQ_{n5}$ (53) of "A Tale of Two Cities".

The typical optional instructions $VJ_{n1}$. . . $VJ_{nk}$ (52) of FIG. 15 have "Separate", which instruct the client $C_n$ (16) and/or the server PS (18) to return the typical user response $UR_n$ (37), as the typical service and/or information response form $IS_n$ (39) at the user interface $I_n$ (14) in separate groups, i.e., grouped by the typical server addresses $AQ_{n1}$. . . $AQ_{nm}$ (54), rather than interleaved one with the other, as instructed in FIGS. 11–14.

The typical optional instructions $VJ_{n1}$. . . $VJ_{nk}$ (52) "Interleaved" of FIGS. 11–14 instruct the client $C_n$ (16) and/or the server PS (18) to return the typical user response $UR_n$ (37), as the typical service and/or information response form $IS_n$ (39) at the user interface $I_n$ (14) having information and/or services in the responses $R_{n1}$. . . $R_{nm}$ (32) to be interleaved one with the other (or alternating one with the other) into the appropriate addressable query information groups $GI_{n1}$. . . $GI_{nz}$ (63). The labelled individual information groups $LL_{n11}$. . . $LL_{nzu}$ (86) in the addressable query information groups $GI_{n1}$. .. $GI_{nz}$ (63) are alternatingly interleaved one with the other and labelled and/or identified and associated correspondingly with the responses $R_{n1}$. . . $R_{nm}$ (32) from the servers $S_1$. . .$S_z$ (20). The "Interleaved" information and/or services may typically be incorporated into the appropriate addressable query information groups $GI_{n1}$. . . $GI_{nz}$ (63) in substantially the same sequence as the information and/or services are in the responses $R_{n1}$. . . $R_{nm}$ (32) communicated from the servers $S_1$. . . $S_z$ (20). However, other sorting/grouping criteria may optionally be used, as will be discussed later.

The typical server addresses $AQ_{n1}$. . . $AQ_{nm}$ (54) are different one from the other in FIG. 15. The typical optional instructions $VJ_{n1}$. . . $VJ_{nk}$ (52) also instruct the client $C_n$ (16) and/or the server PS (18) to return the typical user response $UR_n$ (37), as the typical service and/or information response form $IS_n$ (39) at the user interface $I_n$ (14) having 5 "Searches per Group", rather than 3 "Searches per Group", as in FIGS. 11–14. The typical optional instructions $VJ_{n1}$. . . $VJ_{nk}$ (52) also instruct the client $C_n$ (16) and/or the server PS (18) to return the typical user response $UR_n$ (37), as the typical service and/or information response form $IS_n$ (39) at the user interface $I_n$ (14) having 8 "URL's per Search Engine".

Figure 16:
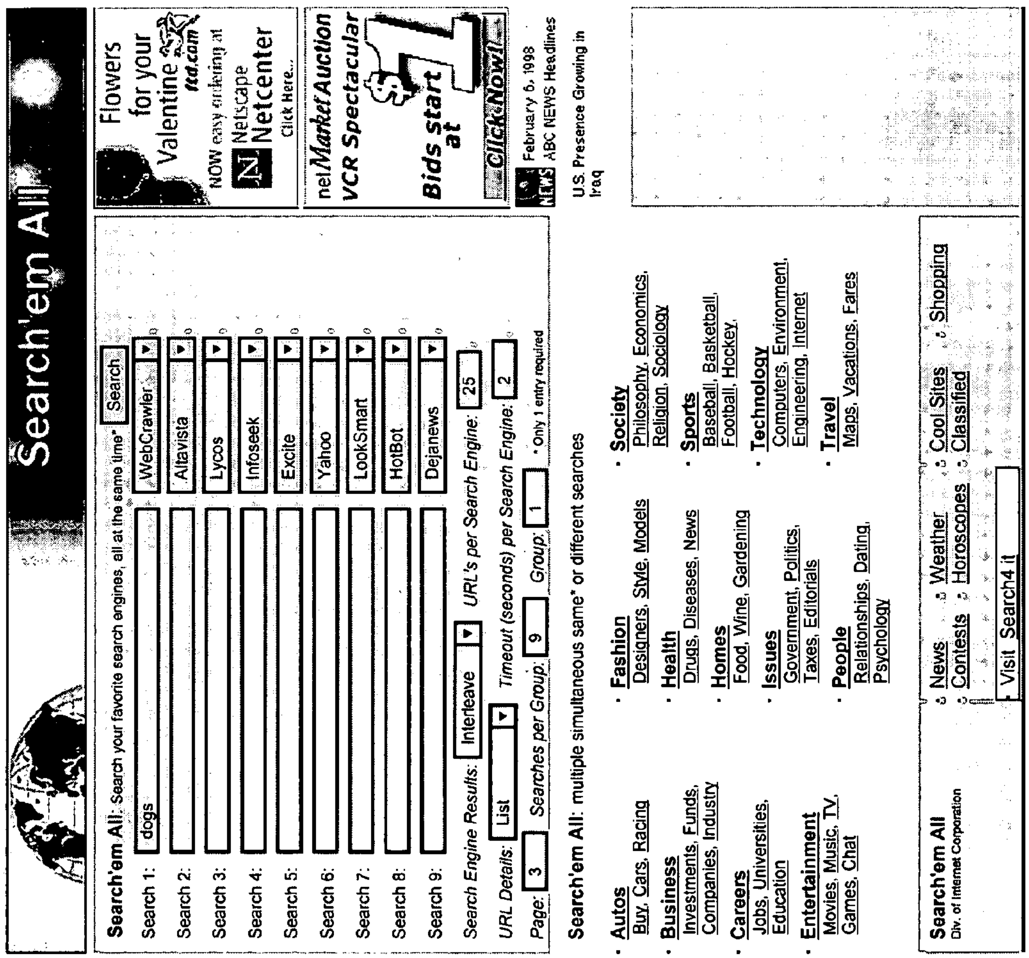
FIG. 16 depicts another typical completed service and/or information entry request form $IF_n$ at the user interface $I_n$.

FIG. 16 shows the typical completed service and/or information entry request form $IF_n$ (230), at the user interface $I_n$ (14), having the same ones of the typical queries $QQ_{n1}$. . . $QQ_{nm}$ (53), different ones of the typical server addresses $AQ_{n1}$. . . $AQ_{nm}$ (54), and the typical optional instructions $VJ_{n1}$. . . $VJ_{nk}$ (52). The typical optional instructions $VJ_{n1}$. . . $VJ_{nk}$ (52) have "URL Details" as "List", which instruct the client $C_n$ (16) and/or the server PS (18) to return the typical user response $UR_n$ (37), as the typical service and/or information response form $IS_n$ (39) at the user interface $I_n$ (14) "List" format rather than "Summary" format, as instructed in FIGS. 11–15. The "URL Details" as "Summary" instruct the client $C_n$ (16) and/or the server PS (18) to return the typical user response $UR_n$ (37) showing descriptions and/or other information and/or services, in addition to links, in the typical ones of the user responses $UR_n$ (37), as the typical service and/or information response forms $IS_n$ (39) at the user interface $I_n$ (14), while "URL Details" as "List" instruct the client $C_n$ (16) and/or the server PS (18) to return the typical user response $UR_n$ (37) showing only links in the typical ones of the user responses $UR_n$ (37), as the typical service and/or information response forms $IS_n$ (39) at the user interface $I_n$ (14).

The typical optional instructions $VJ_{n1}$. . . $VJ_{nk}$ (52) have 25 "URL's per Search Engine", which instruct the client $C_n$ (16) and/or the server PS (18) to return the typical user response $UR_n$ (37), as the typical service and/or information response form $IS_n$ (39) at the user interface $I_n$ (14) having 25 "URL's per Search Engine". The typical optional instructions $VJ_{n1}$. . . $VJ_{nk}$ (52) also instruct the client $C_n$ (16) and/or the server PS (18) to return the typical user response $UR_n$ (37), as the typical service and/or information response form $IS_n$ (39) at the user interface $I_n$ (14) having 9 "Searches per Group". The typical optional instructions $VJ_{n1}$. . . $VJ_{nk}$ (52) also instruct the client $C_n$ (16) and/or the server PS (18) to return the typical user response $UR_n$ (37), as the typical service and/or information response form $IS_n$ (39) at the user interface $I_n$ (14) at "Page" 3 of the "Current Group", rather than "Page" 1 of the "Current Group", as in FIGS. 11–15. The typical optional instructions $VJ_{n1}$. . . $VJ_{nk}$ (52) also instruct the client $C_n$ (16) and/or the server PS (18) to return the typical user response $UR_n$ (37), as the typical service and/or information response form $IS_n$ (39) at the user interface $I_n$ (14) to use a 2 second "Timeout (seconds) per Search Engine".

Figure 17:
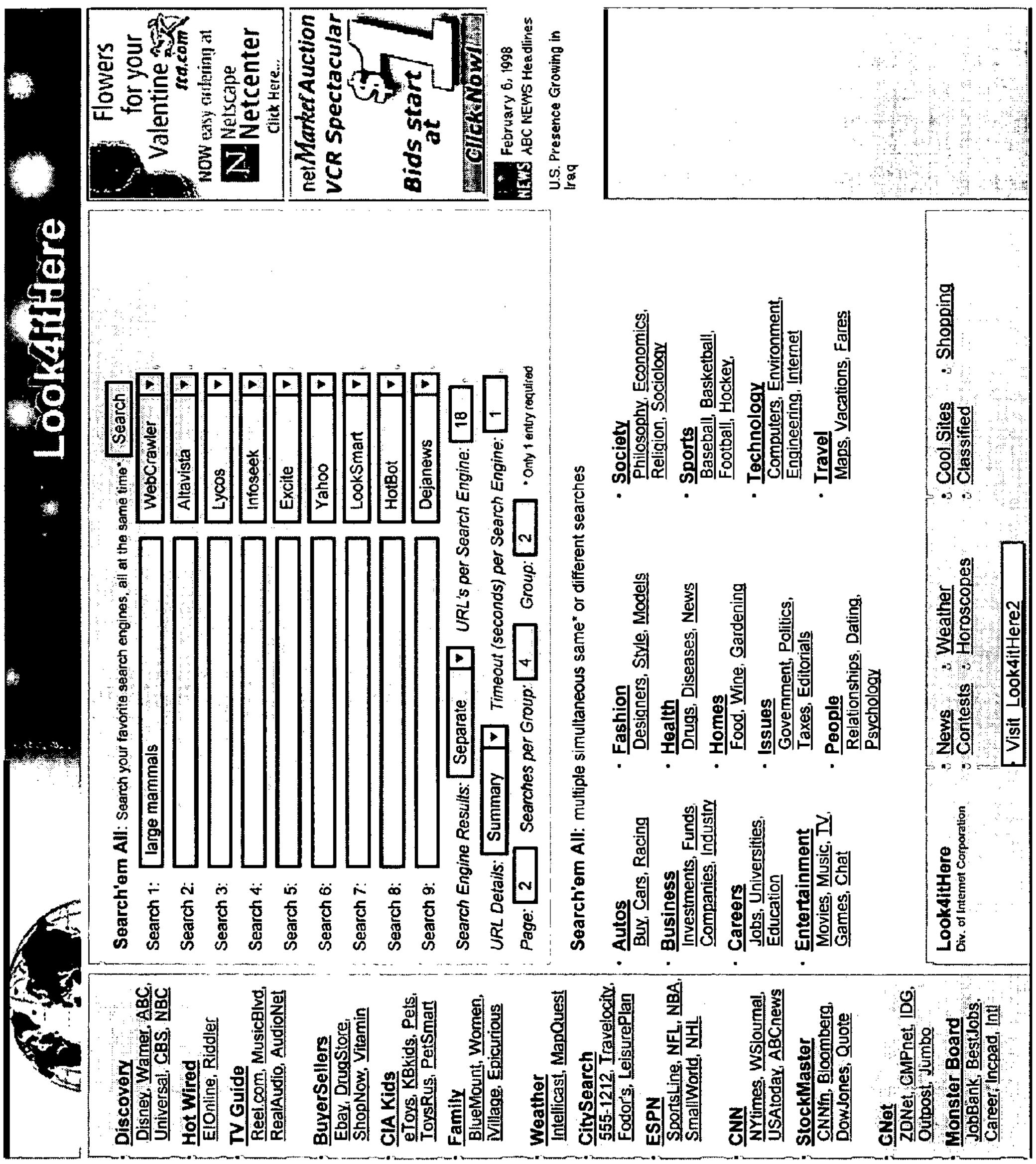
FIG. 17 depicts another typical completed service and/or information entry request form $IF_n$ at the user interface $I_n$.

FIG. 17 shows another one of the typical completed service and/or information entry request form $IF_n$ (230), at the user interface $I_n$ (14), having the same ones of the typical queries $QQ_{n1}$. . . $QQ_{nm}$ (53), different ones of the typical server addresses $AQ_{n1}$. . . $AQ_{nm}$ (54), and the typical optional instructions $VJ_{n1}$. . . $VJ_{nk}$ (52). The typical optional instructions $VJ_{n1}$. . . $VJ_{nk}$ (52) have 18 "URL's per Search Engine", which instruct the client $C_n$ (16) and/or the server PS (18) to return the typical user response $UR_n$ (37), as the typical service and/or information response form $IS_n$ (39) at the user interface $I_n$ (14) having 18 "URL's per Search Engine". The typical optional instructions $VJ_{n1}$. . . $VJ_{nk}$ (52) also instruct the client $C_n$ (16) and/or the server PS (18) to return the typical user response $UR_n$ (37), as the typical service and/or information response form $IS_n$ (39) at the user interface $I_n$ (14) at "Group" 2, having 4 "Searches per Group", at "Page" 2 of the "Current Group", with a 2 second "Timeout (seconds) per Search Engine", and to return the results "Separately".

Figure 18:
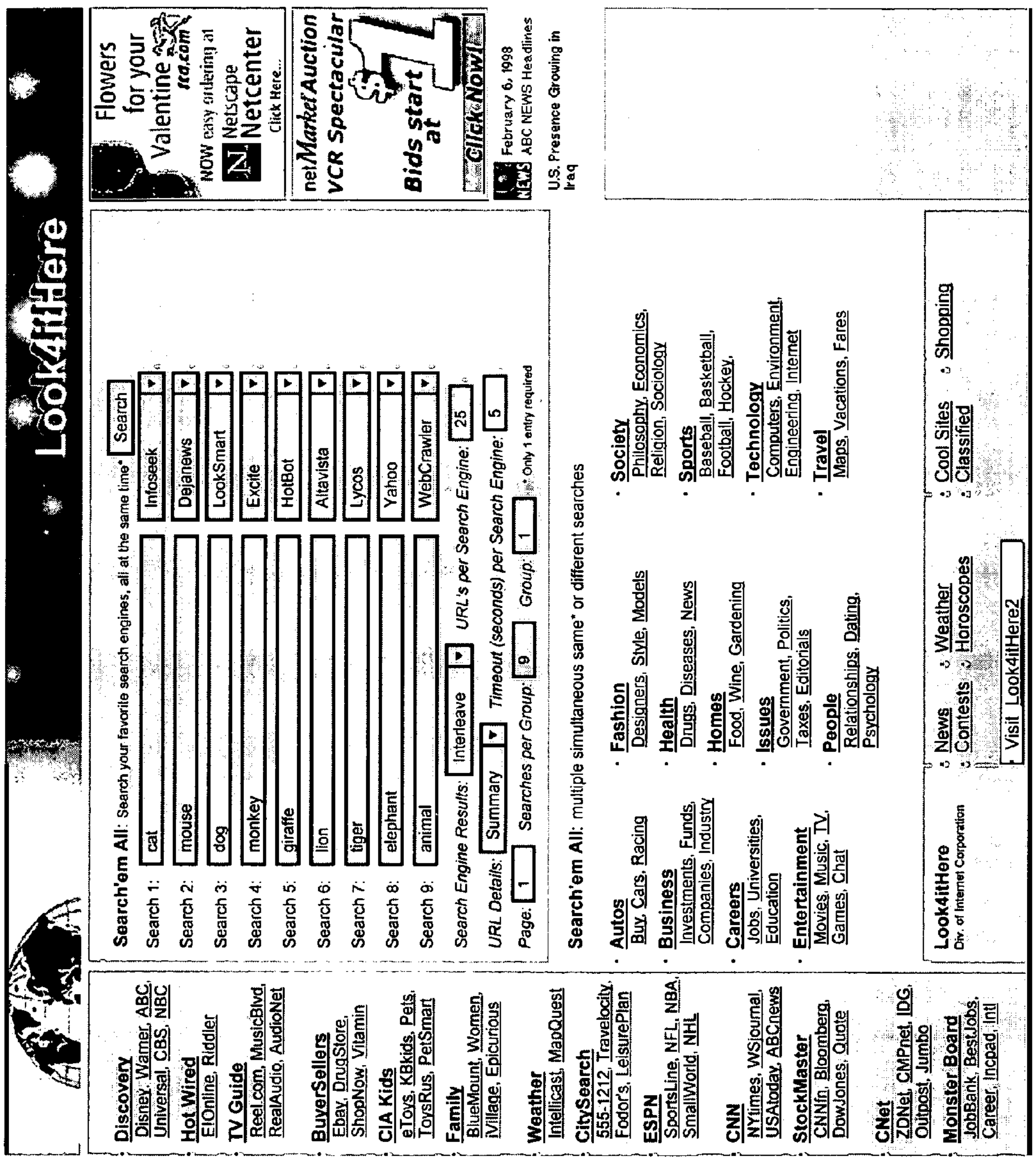
FIG. 18 depicts another typical completed service and/or information entry request form $IF_n$ at the user interface $I_n$.

FIG. 18 shows another one of the typical completed service and/or information entry request form $IF_n$ (230), at the user interface $I_n$ (14), having different ones of the typical queries $QQ_{n1}$. . . $QQ_{nm}$ (53), different ones of the typical server addresses $AQ_{n1}$. . . $AQ_{nm}$ (54), and the typical optional instructions $VJ_{n1}$. . . $VJ_{nk}$ (52).

Figure 19:
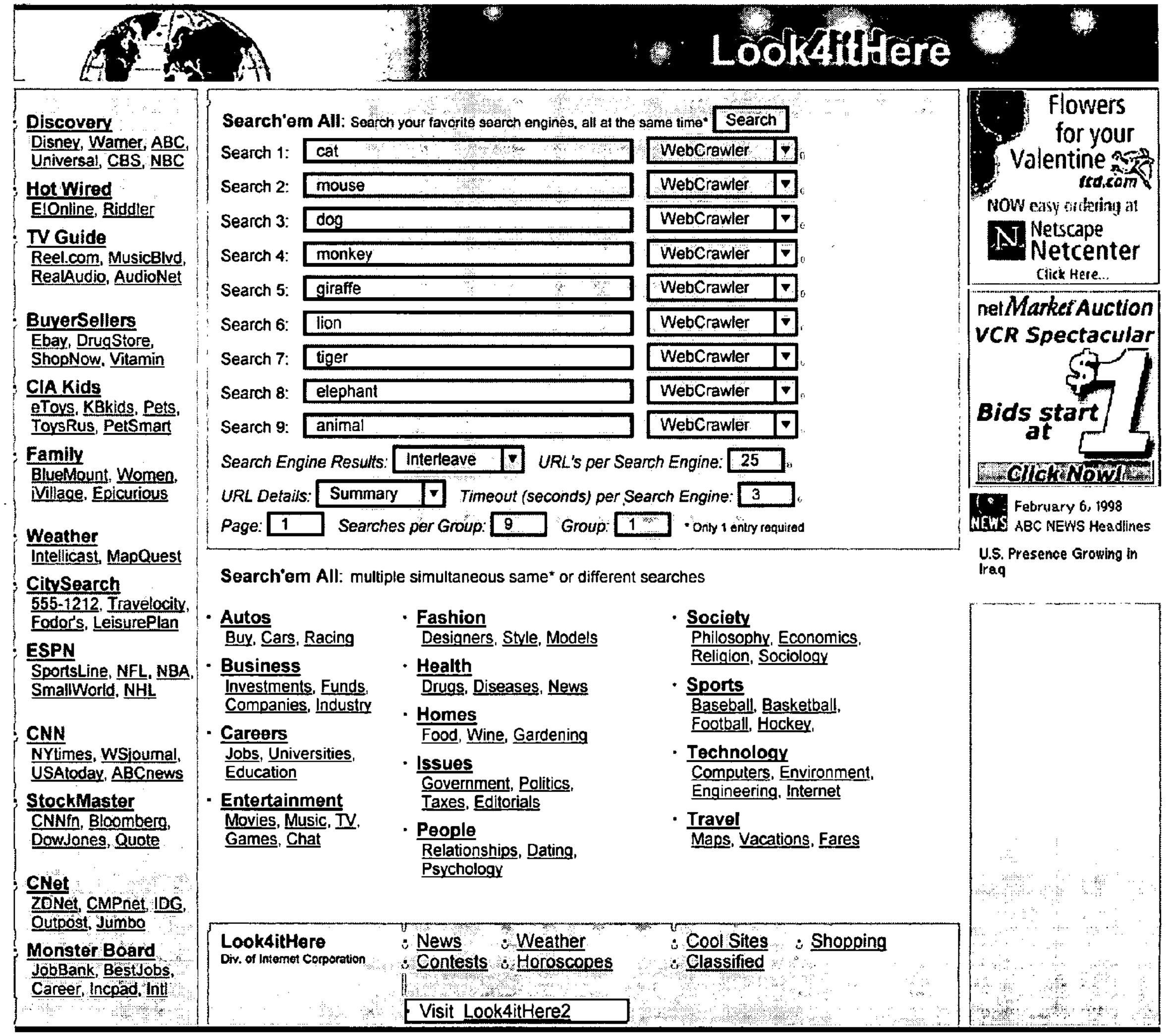
FIG. 19 depicts another typical completed service and/or information entry request form $IF_n$ at the user interface $I_n$.

FIG. 19 shows another one of the typical completed service and/or information entry request form $IF_n$ (230), at the user interface $I_n$ (14), having different ones of the typical queries $QQ_{n1}$. . . $QQ_{nm}$ (53), as in FIG. 18, the same ones of the typical server addresses $AQ_{n1}$. . . $AQ_{nm}$ (54), and the typical optional instructions $VJ_{n1}$. . . $VJ_{nk}$ (52).

Figure 20:
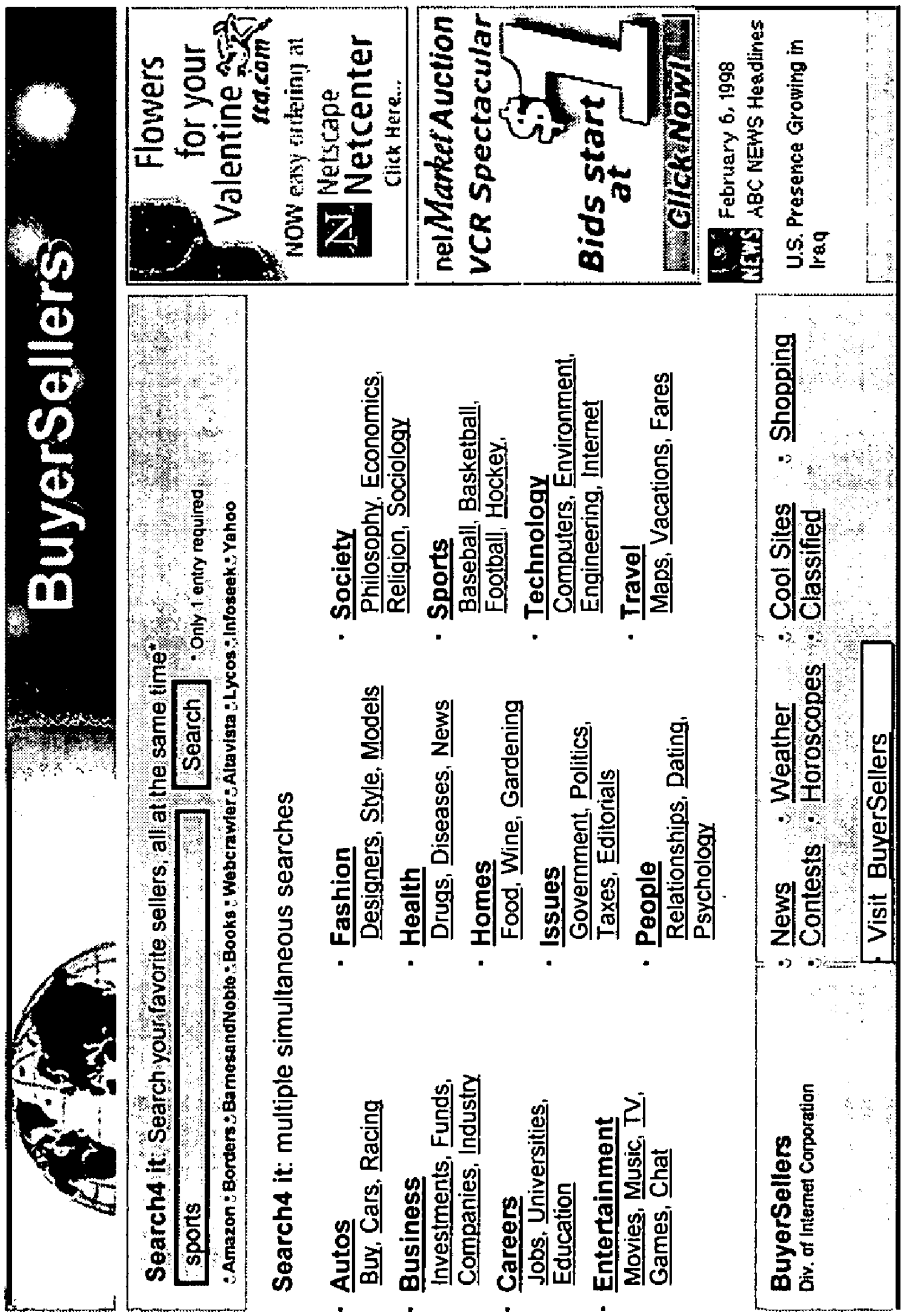
FIG. 20 depicts another typical completed service and/or information entry request form $IF_n$ at the user interface $I_n$.

FIG. 20 shows the typical completed service and/or information entry request forms $IF_n$ (230), at the user interface $I_n$ (14) having a single typical one of the typical queries $QQ_{n1}$. . . $QQ_{nm}$ (53) as "sports".

Figure 21:
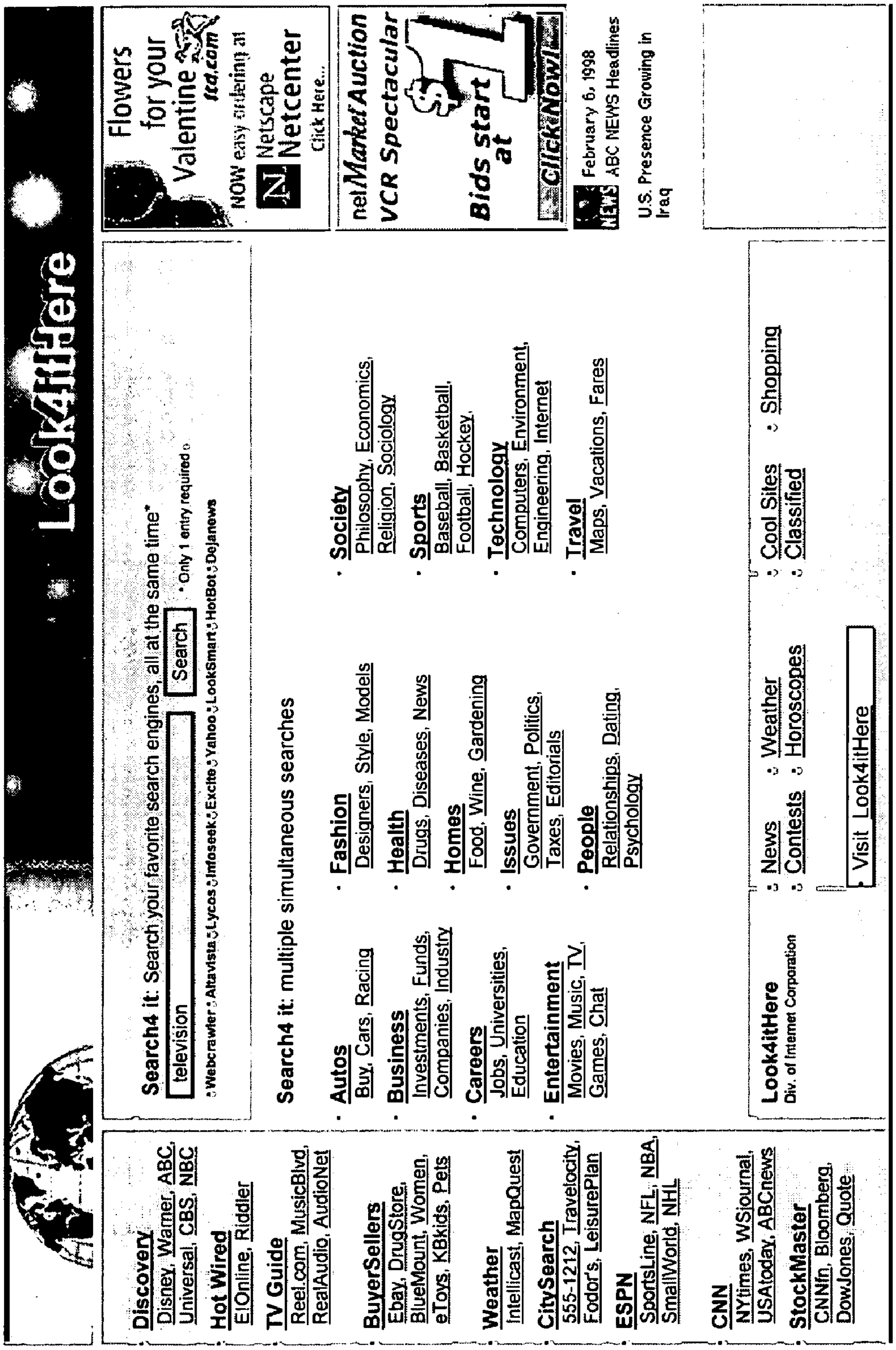
FIG. 21 depicts another typical completed service and/or information entry request form $IF_n$ at the user interface $I_n$.

FIG. 21 show another one of the typical completed service and/or information entry request form $IF_n$ (230), at the user interface $I_n$ (14) having a single typical one of the typical queries $QQ_{n1}$. . . $QQ_{nm}$ (53) as "television".

Figure 22:
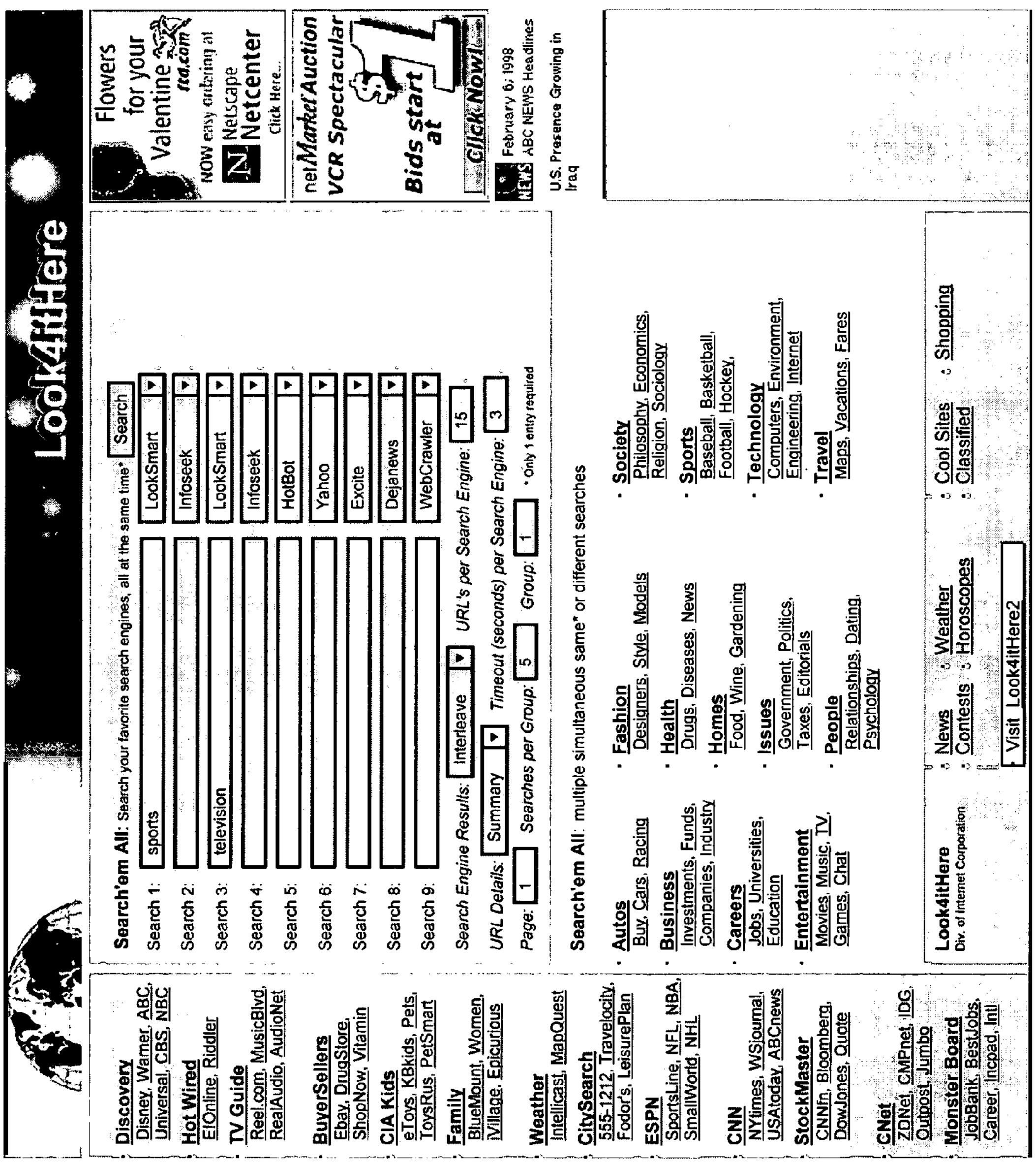
FIG. 22 depicts another typical completed service and/or information entry request form $IF_n$ at the user interface $I_n$.

FIG. 22 shows another one of the typical completed service and/or information entry request form $IF_n$ (230), at the user interface $I_n$ (14), having different ones of the typical queries $QQ_{n1}$. . . $QQ_{nm}$ (53), i.e., "sports" and "television", different ones of the typical server addresses $AQ_{n1}$. . . $AQ_{nm}$ (54), and the typical optional instructions $VJ_{n1}$. . . $VJ_{nk}$ (52).

Figure 23:
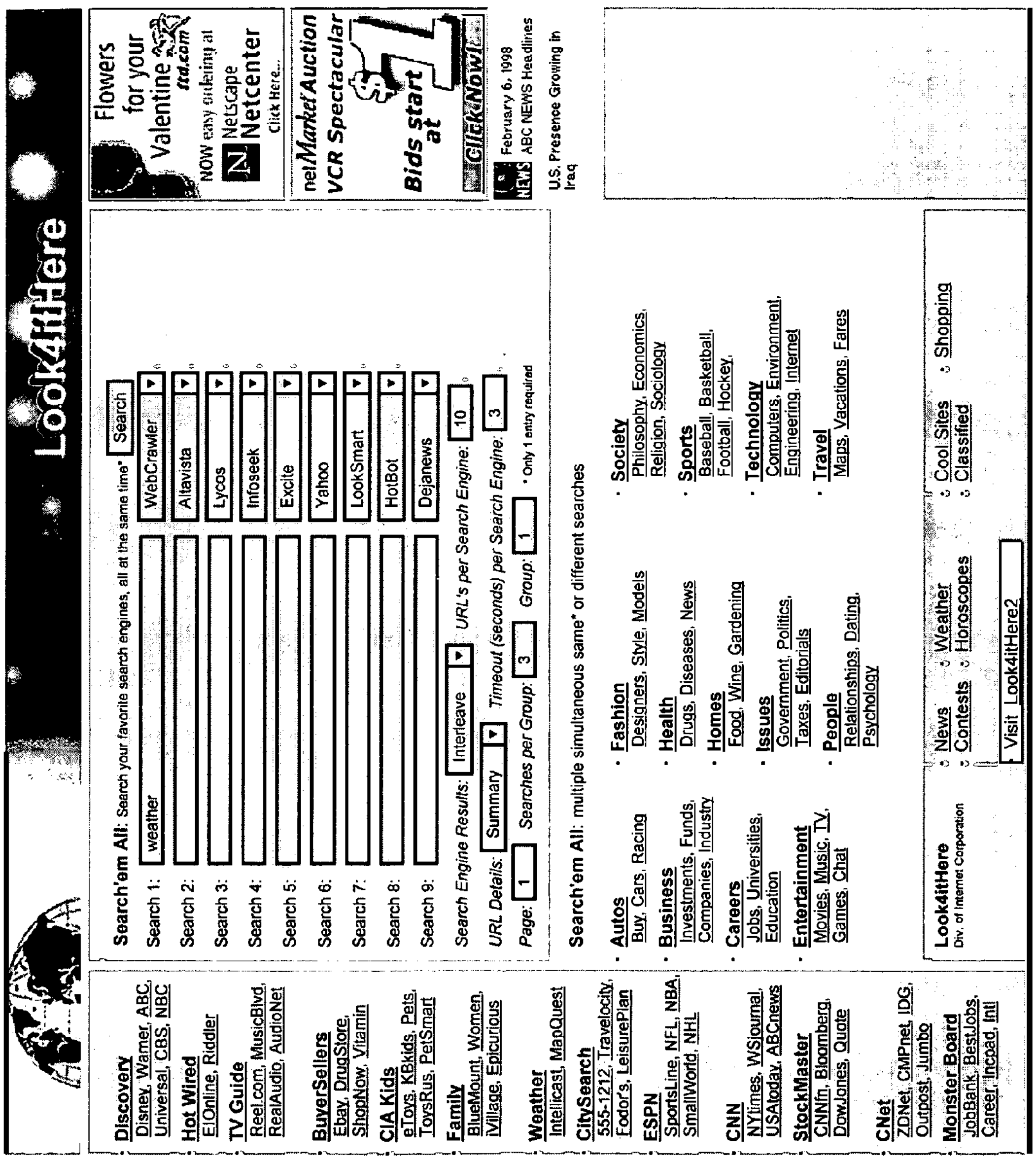
FIG. 23 depicts another typical completed service and/or information entry request form $IF_n$ at the user interface $I_n$.

FIG. 23 shows another one of the typical completed service and/or information entry request form $IF_n$ (230), at the user interface $I_n$ (14), having the same ones of the typical queries $QQ_{n1}$. . . $QQ_{nm}$ (53), i.e., "weather", different ones of the typical server addresses $AQ_{n1}$. . . $AQ_{nm}$ (54), and the typical optional instructions $VJ_{n1}$. . . $VJ_{nk}$ (52).

Figure 24:
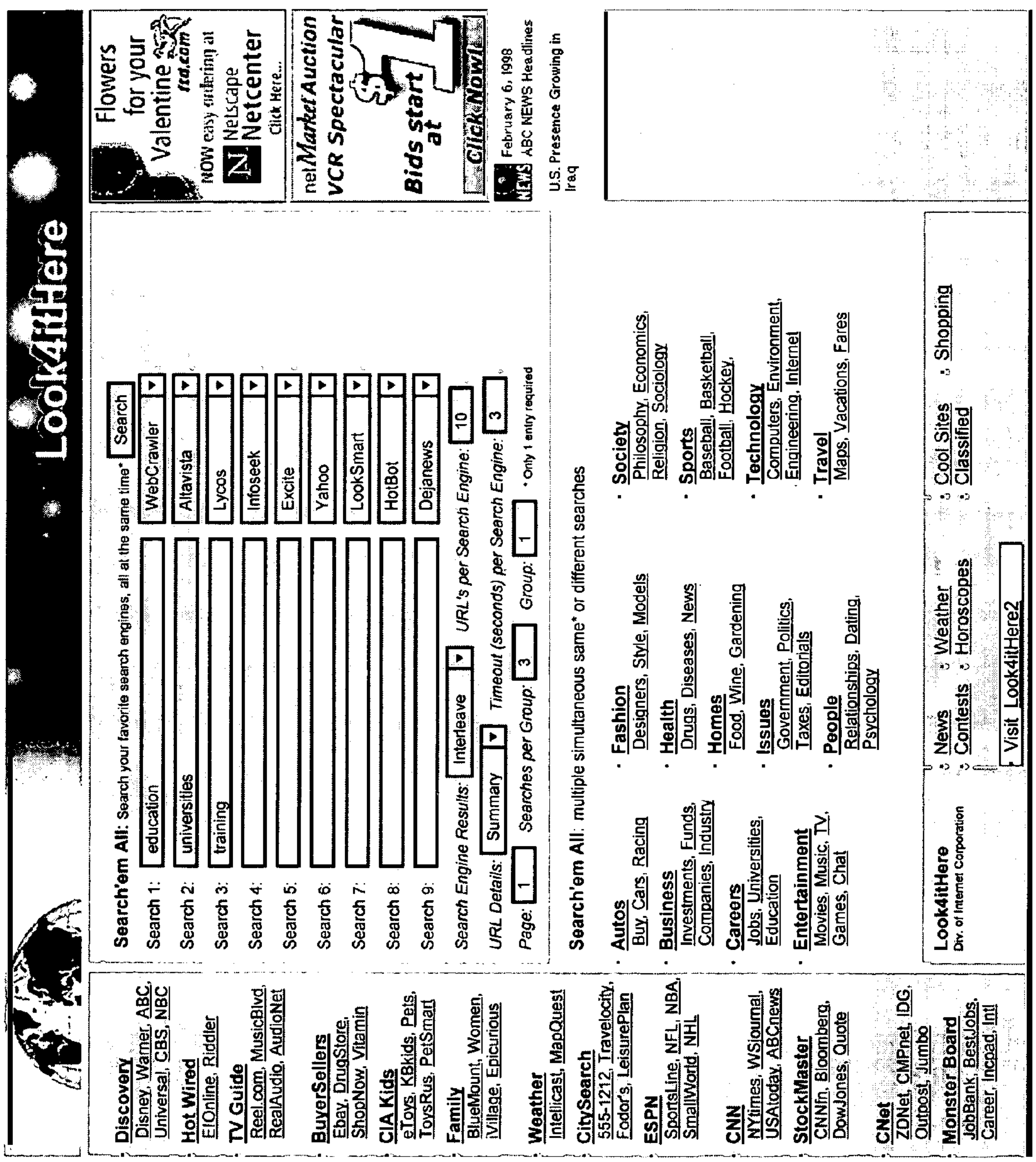
FIG. 24 depicts another typical completed service and/or information entry request form $IF_n$ at the user interface $I_n$.

FIG. 24 shows another one of the typical completed service and/or information entry request form $IF_n$ (230), at the user interface $I_n$ (14), having different ones of the typical queries $QQ_{n1}$. . . $QQ_{nm}$ (53), .i.e., "education", "universities," and "training", different ones of the typical server addresses $AQ_{n1}$. . . $AQ_{nm}$ (54), and the typical optional instructions $VJ_{n1}$. . . $VJ_{nk}$ (52).

Figure 25:
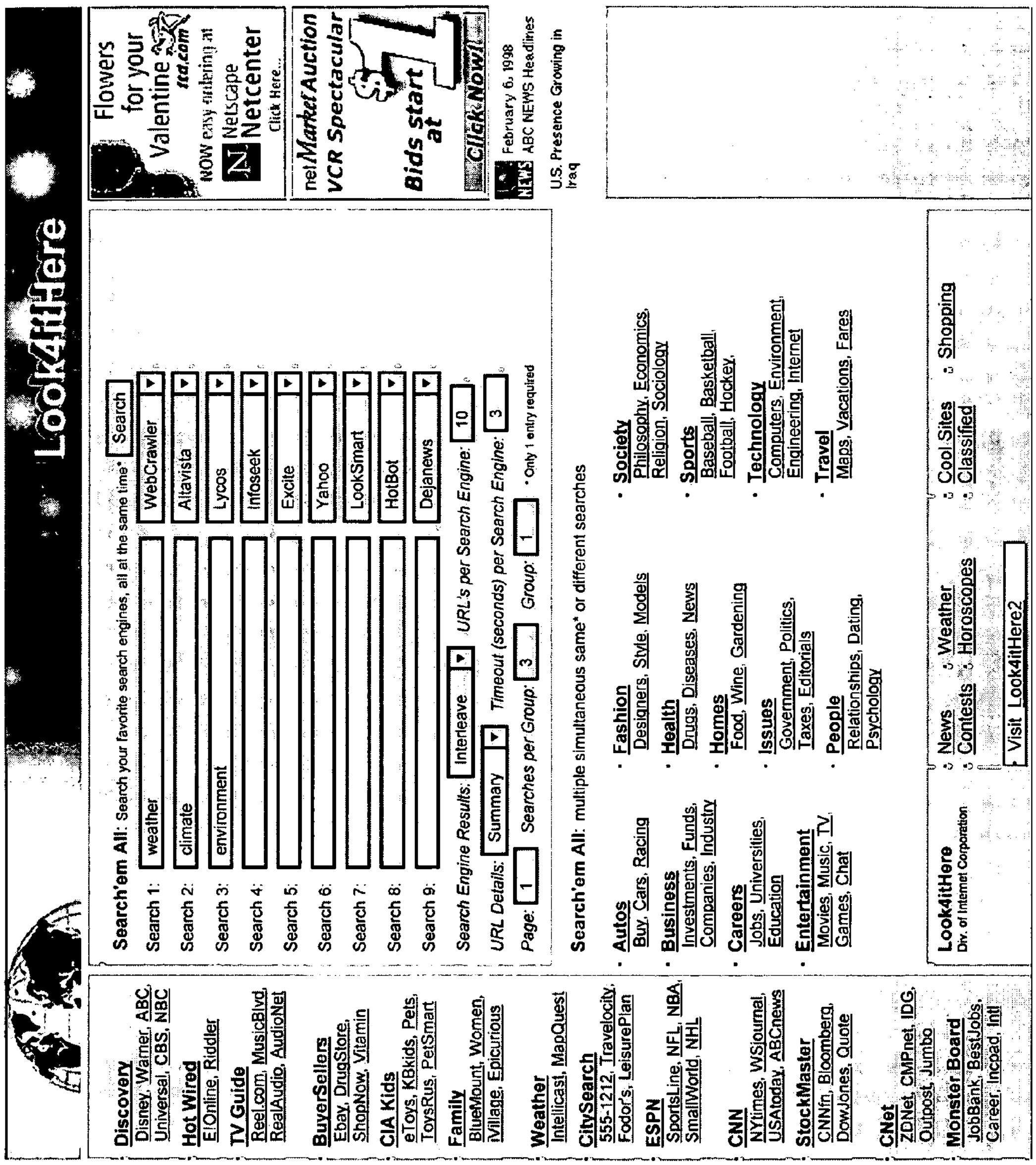
FIG. 25 depicts another typical completed service and/or information entry request form $IF_n$ at the user interface $I_n$.

FIG. 25 shows another one of the typical completed service and/or information entry request form $IF_n$ (230), at the user interface $I_n$ (14), having different ones of the typical queries $QQ_{n1}$. . . $QQ_{nm}$ (53), .i.e., "weather", "climate," "training", different ones of the typical server addresses $AQ_{n1}$. . . $AQ_{nm}$ (54), and the typical optional instructions $VJ_{n1}$. . . $VJ_{nk}$ (52).

Figure 26:
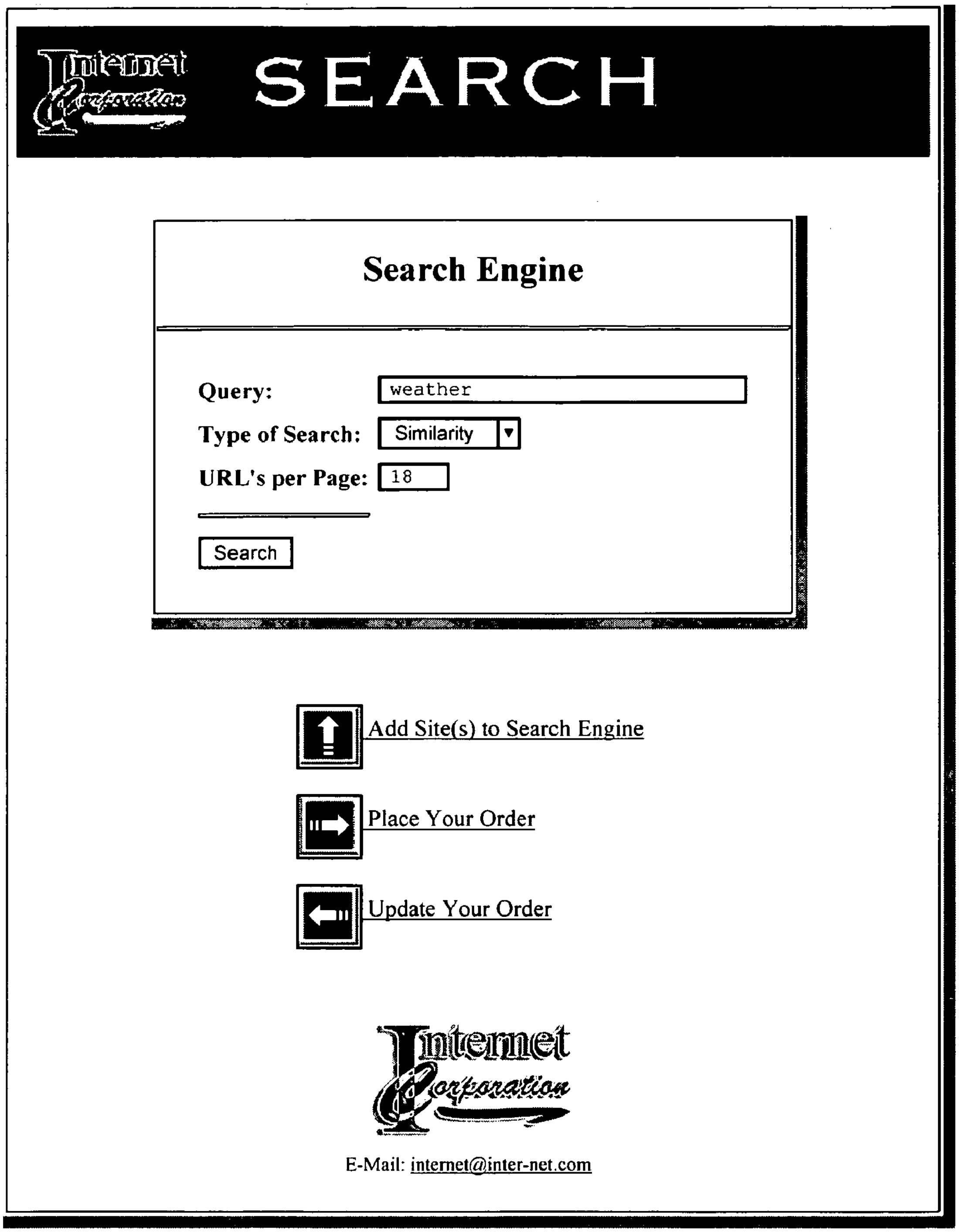
FIG. 26 depicts another typical completed service and/or information entry request form $IF_n$ at the user interface $I_n$.

FIG. 26 shows another one of the typical completed service and/or information entry request form $IF_n$ (230), at the user interface $I_n$ (14) having a single typical one of the typical queries $QQ_{n1}$. . . $QQ_{nm}$ (53) as "weather".

The typical ones of the completed service and/or information entry request forms $IF_1$. . . $IF_n$ (230) at the user interfaces $I_1$. . . $I_n$ (14) shown in FIGS. 11–26 are typical examples of the completed service and/or information entry request forms $IF_1$. . . $IF_n$ (230) at the user interfaces $I_1$. . . $I_n$ (14), a much larger variety of which is possible. Typical queries $QQ_{n1}$. . . $QQ_{nm}$ (53), typical server addresses $AQ_{n1}$. . . $AQ_{nm}$ (54), and typical optional instructions $VJ_{n1}$. . . $VJ_{nk}$ (52) in the typical ones of the completed service and/or information entry request forms $IF_1$. . . $IF_n$ (230) at the user interfaces $I_1$. . . $I_n$ (14) shown in FIGS. 11–26 are typical examples for illustrative purposes, and are not intended to limit the substantially infinite variety of the queries $QQ_{n1}$. . . $QQ_{nm}$ (53), the server addresses $AQ_{n1}$. . . $AQ_{nm}$ (54), and the optional instructions $VJ_{n1}$. . . $VJ_{nk}$ (52) that may be entered into the service and/or information entry request forms $IE_1$. . . $IE_n$ (38), to derive the completed service and/or information entry request forms $IF_1$. . . $IF_n$ (230) at the user interfaces $I_1$. . . $I_n$ (14). Likewise, names and/or links and/or other information are incorporated into the typical ones of the completed service and/or information entry request forms $IF_1$. . . $IF_n$ (230) shown in FIGS. 11–26 for illustrative purposes, and are not intended to limit the large variety of the completed service and/or information entry request forms $IF_1$. . . $IF_n$ (230) and the names and/or links and/or information that are possible, and that may be incorporated into the completed service and/or information entry request forms $IF_1$. . . $IF_n$ (230) at the user interfaces $I_1$. . . $I_n$ (14).

Any ones of the typical queries $QQ_{n1}$. . . $QQ_{nm}$ (53), any values within the ranges allowable for the typical server addresses $AQ_{n1}$. . . $AQ_{nm}$ (54), and any values allowable for the typical optional instructions $VJ_{n1}$. . . $VJ_{nk}$ (52) may be incorporated into the typical ones of service and/or information entry request forms $IE_1$. . . $IE_n$ (38) at the user interfaces $I_1$. . . $I_n$ (14) FIGS. 5A, 5B, and 6–10, which the users $U_1$. . . $U_n$ (12) enter to complete the typical ones of the completed service and/or information entry request forms $IF_1$. . . $IF_n$ (230) at the user interfaces $I_1$. . . $I_n$ (14) of FIGS. 11–26.

Any values within the ranges allowable for "Search Engine Results"; "URL's per Search Engine"; "URL Details"; "Timeout (seconds) per Search Engine"; "Page"; "Searches per Group"; and "Group" may be incorporated into the typical ones of service and/or information entry request forms $IE_1IE_n$ (38) at the user interfaces $I_1$. . . $I_n$ (14) of FIGS. 5A, 5B, and 6–10, which the users $U_1$. . . $U_n$ (12) enter to complete the typical ones of the completed service and/or information entry request forms $IF_1$. . . $IF_n$ (230) at the user interfaces $I_1$. . . $I_n$ (14) of FIGS. 11–26.

The users $U_1$. . . $U_n$ (12), for example, may enter: the typical queries $QQ_{n1}$. . . $QQ_{nm}$ (53); any values within the ranges allowable for the typical server addresses $AQ_{n1}$. . . $AQ_{nm}$ (54); and any values allowable for the typical optional instructions $VJ_{n1}$. . . $VJ_{nk}$ (52), such as, for example, any allowable "Search Engine Results"; "URL's per Search Engine"; "URL Details"; "Timeout (seconds) per Search Engine"; "Page"; "Searches per Group"; and "Group" into the typical ones of service and/or information entry request forms $IE_1 \ldots IE_n$ (38) at the user interfaces $I_1 \ldots I_n$ (14) of FIGS. 5A, 5B, and 6–10, which the users $U_1 \ldots U_n$ (12) enter to complete the typical ones of the completed service and/or information entry request forms $IF_1 \ldots IF_n$ (230) at the user interfaces $I_1 \ldots I_n$ (14). The typical ones of the user responses $UR_1 \ldots UR_n$ (37), as typical service and/or information response forms $IS_1 \ldots IS_n$ (39) at the user interfaces $I_1 \ldots I_n$ (14), may then be communicated to the corresponding ones of the users $U_1 \ldots U_n$ (12), accordingly. FIGS. 27A–52C, inclusive, show typical ones of the user responses $UR_1 \ldots UR_n$ (37), as the typical service and/or information response forms $IS_1 \ldots IS_n$ (39) at the user interfaces $I_1 \ldots I_n$ (14), which may be communicated to the corresponding ones of the users $U_1 \ldots U_n$ (12). The scope of the client-server multitasking system 10 of the present invention, the client-server multitasking process 99, and the multitasking process 104, however, is not limited to such values. Use of such values herein is meant only for illustrative purposes, in teaching certain aspects of the multitasking system 10 of the present invention, the client-server multitasking process 99, and the multitasking process 104 by example.

D. TYPICAL SERVICE AND/OR INFORMATION RESPONSE FORMS

FIGS. 27A–52C, inclusive, show typical ones of the user responses $UR_1 \ldots UR_n$ (37), as typical service and/or information response forms $IS_1 \ldots IS_n$ (39) at the user interfaces $I_1 \ldots I_n$ (14), which may be communicated to the corresponding ones of the users $U_1 \ldots U_n$ (12). A typical particular one of the user responses $UR_1 \ldots UR_n$ (37), as a particular typical one of the service and/or information response forms $IS_1 \ldots IS_n$ (39) at the particular one of the user interfaces $I_1 \ldots I_n$ (14) may hereinafter be designated as the user response $UR_n$ (37), as the typical service and/or information response form $IS_n$ (39) at the user interface $I_n$ (14).

FIGS. 27A–52C, inclusive, also show information in each of the typical ones of the user responses $UR_n$ (37), as the typical service and/or information response forms $IS_n$ (39) at the user interface $I_n$ (14), pertaining to the "Current Group", the "Previous Group", if appropriate, the "Next Group", if appropriate, and each "Group" by alphanumerics. FIGS. 27A–52C, inclusive, also show information in each of the typical ones of the user responses $UR_n$ (37), as the typical service and/or information response forms $IS_n$ (39) at the user interfaces $I_n$ (14), pertaining to links to additional selections, and/or links to previous selections, if appropriate, and/or links to future selections, if appropriate, that may be made by pointing to and clicking on the selections to be made.

FIGS. 27A–29C, inclusive, show typical ones of the user responses $UR_n$ (37), as the typical service and/or information response forms $IS_n$ (39) at the user interface $I_n$ (14), with reference to FIG. 11, having information and/or services from the responses $R_{n1} \ldots R_{nm}$ (32) incorporated therein, and incorporated into Group I, Group II, and Group III, respectively.

The user $U_n$ (12) may optionally select Group II, and/or Group III from the typical one of the user response $UR_n$ (37), as the typical service and/or information response form $IS_n$ (39) at the user interface $I_n$ (14) of FIGS. 27A–27C, and/or Group I and/or Group III at the user interface $I_n$ (14) of FIGS. 28A–28C, and/or Group I, and/or Group II at the user interface $I_n$ (14) of FIGS. 29A–29C. The user $U_n$ (12) may also select Group I, and/or Group II, and/or Group III by entering such into the typical one of the service and/or information entry request form $IE_n$ (38) at the user interfaces $I_1 \ldots I_n$ (14), and completing the typical completed service and/or information entry request form $IF_n$ (230), at the user interface $I_n$ (14) with the appropriate selections to be made.

The user $U_n$ (12) may also make other selections by entering such into the typical one of the service and/or information entry request form $IE_n$ (38) at the user interfaces $I_1 \ldots I_n$ (14), and completing the typical completed service and/or information entry request form $IF_n$ (230), at the user interface $I_n$ (14) with the appropriate selections to be made, and/or by making such selections through the typical ones of the user responses $UR_n$ (37), as the typical service and/or information response forms $IS_n$ (39) at the user interface $I_n$ (14). The user $U_n$ (12) may typically make selections by pointing and clicking on the appropriate selections and/or by entering the desired information. Such information may be entered by any suitable means, including but not limited to mouse, keyboard entry, audible entry, and/or other suitable means.

FIGS. 27A–29C, inclusive, show typical ones of the user responses $UR_n$ (37), as the typical service and/or information response forms $IS_n$ (39) at the user interface $I_n$ (14), having the service and/or query information group $G_n$ (35) having the addressable query information groups $GI_{n1} \ldots GI_{nz}$ (63) therein, the labelled individual information groups $LL_{n11} \ldots LL_{nzu}$ (86) in the addressable query information groups $GI_{n1} \ldots GI_{nz}$ (63), the additional request links $SL_{n1} \ldots SL_{nw}$ (71), the optional service and/or information entry request form $IE_n$ (38), and other information and/or services therein, resulting from the same and different ones of the typical queries $QQ_{n1} \ldots QQ_{nm}$ (53), different ones of the typical server addresses $AQ_{n1} \ldots AQ_{nm}$ (54), and the typical optional instructions $VJ_{n1} \ldots VJ_{nk}$ (52).

FIGS. 27A–29C, inclusive, show typical ones of the user responses $UR_n$ (37), as the typical service and/or information response forms $IS_n$ (39) at the user interface $I_n$ (14), resulting from the typical ones of the queries $QQ_{n1} \ldots QQ_{nm}$ (53), "Cat", "Mouse", and "Dog", the same ones of the typical queries $QQ_{n1} \ldots QQ_{n3}$ (53) and $QQ_{n9}$ (53) being "Cat", other same ones of the typical queries $QQ_{n4}$ (53) and $QQ_{n7}$ (53) being "Mouse", but different from "Cat", and other same ones of the typical queries $QQ_{n5}$, $QQ_{n6}$ (53), and $QQ_{n8}$ (53) being "Dog", but different from "Cat" and/or "Mouse", the typical ones of the queries $QQ_{n1} \ldots QQ_{nm}$ (53), "Cat", "Dog", and "Mouse", being different one from the other.

The typical same ones of the typical queries $QQ_{n1} \ldots QQ_{n3}$ (53) as "Cat" are incorporated into the addressable query information groups $GI_{n1}$ (63) of Group I.

The typical one of the queries $QQ_{n4}$ (53) as "Mouse" is incorporated into the addressable query information groups $GI_{n1}$ (63) of Group II. The other same ones of the typical queries $QQ_{n5}$ and $QQ_{n6}$ (53) as "Dog are incorporated into the addressable query information groups $GI_{n2}$ (63) of Group II.

The typical one of the queries $QQ_{n7}$ (53) as "Mouse" is incorporated into the addressable query information groups $GI_{n1}$ (63) of Group III. The typical one of the queries $QQ_{n8}$ (53) as "Dog" is incorporated into the addressable query information groups $GI_{n2}$ (63) of Group III. The typical one of the queries $QQ_{n9}$ (53) as "Cat" is incorporated into the addressable query information groups $GI_{n3}$ (63) of Group III.

FIGS. 27A–29C, inclusive, show typical ones of the user responses $UR_n$ (37), as the typical service and/or information response forms $IS_n$ (39) at the user interface $I_n$ (14), with reference to FIG. 11 having "Search Engine Results" as "Interleave"; "URL's per Search Engine" as "10"; "URL Details" as "Summary"; "Timeout (seconds) per Search Engine" as "3"; "Page" as "1"; "Searches per Group as "3"; and "Group" as I, II, and III, respectively, for FIGS. 27A–29C, inclusive.

The typical optional instructions $VJ_{n1}$. . . $VJ_{nk}$ (52) "URL's per Search Engine" as "10" instruct the client $C_n$ (16) and/or the server PS (18) to return the typical user response $UR_n$ (37), as the typical service and/or information response form $IS_n$ (39) at the user interface $I_n$ (14) having substantially "10" ones of the typical labelled individual information groups $LL_{n11}$. . . $LL_{nzu}$ (86) per each one of the typical server addresses $AQ_{n1}$. . . $AQ_{nm}$ (54) in the typical "Current Group", retrieved from the responses $R_{n1}$. . . $R_{nm}$ (32). In this case, the typical labelled individual information groups $LL_{n11}$. . . $LL_{nzu}$ (86) may be "Uniform Resource Locators", or "URL's" and/or other services and/or information associated therewith.

The typical optional instructions $VJ_{n1}$. . . $VJ_{nk}$ (52) "Searches per Group" as "3" instruct the client $C_n$ (16) and/or the server PS (18) to return the typical user response $UR_n$ (37), as the typical service and/or information response form $IS_n$ (39) at the user interface $I_n$ (14) having "3 Searches per Group" for the group selected, which is designated in the typical optional instructions $VJ_{n1}$. . . $VJ_{nk}$ (52) having "Group" as "1".

"Group I", which is the "Current Group: I", has the first three searches ("Searches per Group" designated as "3"), i.e., Search 1, Search 2, and Search 3, having the typical queries $QQ_{n1}$. . . $QQ_{n3}$ (53) of "Cat", "Cat", "Cat" and the typical server addresses $AQ_{n1}$. . . $AQ_{n3}$ (54) of WebCrawler®, Altavista®, and Lycos®.

The "Next Group: II" and/or the "Group: III" may be selected from the typical user response $UR_n$ (37), as the typical service and/or information response form $IS_n$ (39) at the user interface $I_n$ (14). If the "Next Group: II" is selected, then Search 4, Search 5, and Search 6, having the typical queries $QQ_{n4}$. . .$QQ_{n6}$ (53) of "Mouse", "Dog", and "Dog" and the typical server addresses $AQ_{n4}$. . . $AQ_{n6}$ (54) of Infoseek®, Excite®, and Yahoo® are selected and returned as the typical service and/or information response forms $IS_n$ (39) at the user interface $I_n$ (14). If the "Group: III" is selected, then Search 7, Search 8, and Search 9, having the typical queries $QQ_{n7}$. . . $QQ_{n9}$ (53) of "Mouse", "Dog", and "Cat" and the typical server addresses $AQ_{n7}$. . . $AQ_{n9}$ (54) of LookSmart®, HotBot®, and Dejanews® are selected and returned as the typical service and/or information response forms $IS_n$ (39) at the user interface $I_n$ (14).

The typical optional instructions $VJ_{n1}$. . . $VJ_{nk}$ (52) having "URL's per Search Engine" as "10" and "Searches per Group" as "3", then returns substantially "10 URL's per Search Engine" multiplied by "3 Searches per Group", which is substantially "30 URL's per Group", and/or other services and/or information associated therewith, returned in the "Current Group".

The actual number of the typical "URL's per Group" may vary from the number of the "URL's per Search Engine" multiplied by the number of the "Searches per Group", as duplicate ones of the "URL's" and/or other services and/or information associated therewith may typically be optionally discarded.

The typical optional instructions $VJ_{n1}$. . . $VJ_{nk}$ (52) "Page" as "1" instruct the client $C_n$ (16) and/or the server PS (18) to return the typical user response $UR_n$ (37), as the typical service and/or information response form $IS_n$ (39) at the user interface $I_n$ (14) having the first "10 URL's per Search Engine" which is substantially the first "30 URL's per Group", and/or other services and/or information associated therewith, in the "Current Group".

The "Next Page" and/or other pages may be selected, which in this typical case may be Pages 1–25, from the typical user response $UR_n$ (37), as the typical service and/or information response form $IS_n$ (39) at the user interface $I_n$ (14). If the "Next Page" is selected, then the next "10 URL's per Search Engine" which is substantially the next "30 URL's per Group", and/or other services and/or information associated therewith, in the "Current Group" are selected and returned as the typical service and/or information response form $IS_n$ (39) at the user interface $I_n$ (14). If, for example, the third "Page" is selected, then the third "10 URL's per Search Engine" which is substantially the third "30 URL's per Group", and/or other services and/or information associated therewith, in the "Current Group" are selected and returned as the typical service and/or information response form $IS_n$ (39) at the user interface $I_n$ (14).

The typical optional instructions $VJ_{n1}$. . . $VJ_{nk}$ (52) of "Search Engine Results" as "Interleave" instruct the client $C_n$ (16) and/or the server PS (18) to return the typical user response $UR_n$ (37), as the typical service and/or information response form $IS_n$ (39) at the user interface $I_n$ (14) having ones of the typical labelled individual information groups $LL_{n11}$. . . $LL_{nzu}$ (86) and/or other services and/or information associated with the typical queries $QQ_{n1}$. . . $QQ_{nm}$ (53) and the typical server addresses $AQ_{n1}$. . . $AQ_{nm}$ (54) in the typical "Current Group", portions of which have been retrieved from the responses $R_{n1}$. . . $R_{nm}$ (32), interleaved one with the other (or alternating one with the other) in the appropriate addressable query information groups $GI_{n1}$. . . $GI_{nz}$ (63). The "Interleaved" information and/or services may typically be incorporated into the appropriate addressable query information groups $GI_{n1}$. . . $GI_{nz}$ (63) in the "Current Group" in substantially the same sequence as the information and/or services are in the responses $R_{n1}$. . . $R_{nm}$ (32) communicated from the servers $S_1$. . . $S_z$ (20). However, other sorting/grouping criteria may optionally be used, as will be discussed later. In this case, the typical labelled individual information groups $LL_{n11}$. . . $LL_{nzu}$ (86) may be "Uniform Resource Locators", or "URL's" and/or other services and/or information associated therewith.

"Separate" may be selected from the typical user response $UR_n$ (37), as the typical service and/or information response form $IS_n$ (39) at the user interface $I_n$ (14), which instructs the client $C_n$ (16) and/or the server PS (18) to return the typical user response $UR_n$ (37), as the typical service and/or information response form $IS_n$ (39) at the user interface $I_n$ (14) in "Separate" groups, i.e., grouped by the typical server addresses $AQ_{n1}$. . . $AQ_{nm}$ (54) incorporated into the appropriate addressable query information groups $GI_{n1}$. . . $GI_{nz}$ (63) in the "Current Group".

The typical optional instructions $VJ_{n1}$. . . $VJ_{nk}$ (52) "URL Details" as "Summary" instruct the client $C_n$ (16) and/or the server PS (18) to return the typical user response $UR_n$ (37) showing the typical labelled individual information groups $LL_{n11}$. . . $LL_{nzu}$ (86) showing descriptions and/or other information and/or services, in addition to links, and/or URL's in the typical ones of the user responses $UR_n$ (37), as the typical service and/or information response forms $IS_n$ (39) at the user interface $I_n$ (14).

"List" may be selected from the typical user response $UR_n$ (37), as the typical service and/or information response form $IS_n$ (39) at the user interface $I_n$ (14), which instructs the client $C_n$ (16) and/or the server PS (18) to return the typical user response $UR_n$ (37), as the typical service and/or information response form $IS_n$ (39) at the user interface $I_n$ (14) typically showing only links to URL's and/or other links in the typical ones of the user responses $UR_n$ (37), as the typical service and/or information response forms $IS_n$ (39) at the user interface $I_n$ (14).

The "Timeout (seconds) per Search Engine" instructs the client $C_n$ (16) and/or the server PS (18) to return the typical user response $UR_n$ (37), as the typical service and/or information response form $IS_n$ (39) at the user interface $I_n$ (14) within a period of less than the "Timeout (seconds) per Search Engine" specified in the typical optional instructions $VJ_{n1}$. . . $VJ_{nk}$ (52). It should be noted that response times of less than one second per search engine are typical, and response times of substantially less than one second are quite common. However, the "Timeout (seconds) per Search Engine" has been incorporated herein for the user $U_1$ (12) to specify in the event of slow ones of the responses $R_{n1}$. . . $R_{nm}$ (32) from certain ones of the servers $S_1$. . . $S_z$ (20).

If the time it takes to retrieve information from certain ones of the servers $S_1$. . . $S_z$ (20) having the typical ones of the queries $QQ_{n1}$. . . $QQ_{nm}$ (53) at the typical ones of the server addresses $AQ_{n1}$. . . $AQ_{nm}$ (54) is greater than the "Timeout" selected, then the client $C_n$ (16) and/or the server PS (18) typically incorporate a message and/or messages, such as "No Results Found for 'Query 'x'' at 'Server Address 'y'' within "z" seconds!" for each of the non-responding certain ones of the servers $S_1$. . . $S_z$ (20), as shown later in FIGS. 44A–44C. Information and/or services only from those ones of the servers $S_1$. . . $S_z$ (20) responding within the "Timeout" period are then incorporated into the typical ones of the user responses $UR_n$ (37), as the typical service and/or information response forms $IS_n$ (39) at the user interface $I_n$ (14).

FIGS. 30A–32B, inclusive, show typical ones of the user responses $UR_n$ (37), as the typical service and/or information response forms $IS_n$ (39) at the user interface $I_n$ (14), with reference to FIG. 12, having information and/or services from the responses $R_{n1}$. . . $R_{nm}$ (32) incorporated therein, and incorporated into Group I, Group II, and Group III, respectively.

FIGS. 30A–32B, inclusive, show typical ones of the user responses $UR_n$ (37), as the typical service and/or information response forms $IS_n$ (39) at the user interface $I_n$ (14), having the service and/or information group $G_n$ (35) having the addressable query information groups $GI_{n1}$. . . $GI_{nz}$ (63) therein, the labelled individual information groups $LL_{n11}$. . . $LL_{nzu}$ (86) in the addressable query information groups $GI_{n1}$. . . $GI_{nz}$ (63), the additional request links $SL_{n1}$. . . $SL_{nw}$ (71), the optional service and/or information entry request form $IE_n$ (38), and other information and/or services therein, resulting from the same and different ones of the typical queries $QQ_{n1}$. . . $QQ_{nm}$ (53), and the same and different ones of the typical server addresses $AQ_{n1}$. . . $AQ_{nm}$ (54), and the typical optional instructions $VJ_{n1}$. . . $VJ_{nk}$ (52), rather than results just from different ones of the typical server addresses $AQ_{n1}$. . . $AQ_{nm}$ (54) as in FIGS. 27A–29C, inclusive.

FIGS. 30A–32B, inclusive, show the typical ones of the user responses $UR_n$ (37), as the typical service and/or information response forms $IS_n$ (39) at the user interface $I_n$ (14), resulting from the typical ones of the queries $QQ_{n1}$. . . $QQ_{nm}$ (53), "Cat", "Dog", and "Mouse", the same ones of the typical queries $QQ_{n1}$. . . $QQ_{n3}$ (53), and $QQ_{n9}$ (53) being "Cat", other same ones of the typical queries $QQ_{n2}$ (53), $QQ_{n5}$ (53), $QQ_{n6}$ (53), and $QQ_{n8}$ (53) being "Dog", but different from "Cat", and other same ones of the typical queries $QQ_{n4}$ and $QQ_{n7}$ (53) being "Mouse", but different from "Cat" and/or "Dog", the typical ones of the queries $QQ_{n1}$. . . $QQ_{nm}$ (53), "Cat", "Dog", and "Mouse", being different one from the other.

FIGS. 30A–32B, inclusive, also show the typical ones of the user responses $UR_n$ (37), as the typical service and/or information response forms $IS_n$ (39) at the user interface $I_n$ (14), resulting from the typical ones of the server addresses $AQ_{n1}$. . . $AQ_{nm}$ (54), HotBot®, WebCrawler®, Yahoo®, LookSmart®, and Dejanews®, the same ones of the typical server addresses $AQ_{n1}$ and $AQ_{n2}$ (54) being Hotbot®, other same ones of the typical server addresses $AQ_{n3}$. . . $AQ_{n5}$ (54), being WebCrawler®, but different from HotBot®, another one of the server addresses $AQ_{n6}$ (54), being Yahoo®, but different from HotBot® and/or WebCrawler®, another one of the server addresses $AQ_{n7}$ (54), being LookSmart®, but different from HotBot® and/or WebCrawler® and/or Yahoo®, and other same ones of the typical server addresses $AQ_{n8}$ (54) and $QQ_{n9}$ (54) being Dejanews®, but different from HotBot® and/or WebCrawler® and/or Yahoo® and/or LookSmart®, the typical ones of the server addresses $AQ_{n1}$ . . . $AQ_{nm}$ (54), HotBot®, WebCrawler®, Yahoo®, LookSmart®, and Dejanews®, being different one from the other.

The typical same ones of the typical queries $QQ_{n1}$ and $QQ_{n3}$ (53) as "Cat" are incorporated into the addressable query information groups $GI_{n1}$ (63) of Group I. The typical one of the queries $QQ_{n2}$ (53) as "Cat" is incorporated into the addressable query information groups $GI_{n2}$ (63) of Group II.

The typical one of the queries $QQ_{n4}$ (53) as "Mouse" is incorporated into the addressable query information groups $GI_{n1}$ (63) of Group II. The other same ones of the typical queries $QQ_{n5}$ and $QQ_{n6}$ (53) as "Dog are incorporated into the addressable query information groups $GI_{n2}$ (63) of Group II.

The typical one of the queries $QQ_{n7}$ (53) as "Mouse" is incorporated into the addressable query information groups $GI_{n1}$ (63) of Group III. The typical one of the queries $QQ_{n8}$ (53) as "Dog" is incorporated into the addressable query information groups $GI_{n2}$ (63) of Group III. The typical one of the queries $QQ_{n9}$ (53) as "Cat" is incorporated into the addressable query information groups $GI_{n3}$ (63) of Group III.

FIGS. 30A–32B, inclusive, show typical ones of the user responses $UR_n$ (37), as the typical service and/or information response forms $IS_n$ (39) at the user interface $I_n$ (14), with reference to FIG. 12 having "Search Engine Results" as "Interleave"; "URL's per Search Engine" as "5"; "URL Details" as "Summary"; "Timeout (seconds) per Search Engine" as "3"; "Page" as "1"; "Searches per Group as "5"; and "Group" as I, II, and III, respectively, for FIGS. 30A–32B, inclusive.

Now again, FIGS. 30A–32B, inclusive, show the typical ones of the user responses $UR_n$ (37), as the typical service and/or information response forms $IS_n$ (39) at the user interface $I_n$ (14), resulting from the same and different ones of the typical queries $QQ_{n1}$. . . $QQ_{nm}$ (53), the same and different ones of the typical server addresses $AQ_{n1}$. . . $AQ_{nm}$ (54), and the typical optional instructions $VJ_{n1}$. . . $VJ_{nk}$ (52), but which also result from the typical optional instructions $VJ_{n1}$. . . $VJ_{nk}$ (52) having 5 "URL's per Search Engine", which instruct the client $C_n$ (16) and/or the server PS (18) to return the typical user response $UR_n$ (37), as the typical service and/or information response form $IS_n$ (39) at the user interface $I_n$ (14) having 5 "URL's per Search Engine", rather than 10 "URL's per Search Engine", as in FIGS. 27A–29C, inclusive.

FIGS. 33A–33C show a typical one of the user response $UR_n$ (37), as the typical service and/or information response form $IS_n$ (39) at the user interface $I_n$ (14), with reference to FIG. 13, having information and/or services from the responses $R_{n1}$. . . $R_{nm}$ (32) incorporated therein, and incorporated into Group I, having the typical ones of the queries $QQ_{n1}$. . . $QQ_{nm}$ (53) as "Big Elephants". The user $U_n$ (12) may optionally select Group II, and/or Group III from the typical one of the user response $UR_n$ (37), as the typical service and/or information response form $IS_n$ (39) at the user interface $I_n$ (14) of FIGS. 33A–33C.

FIGS. 33A–33C show the typical one of the user response $UR_n$ (37), as the typical service and/or information response forms $IS_n$ (39) at the user interface $I_n$ (14), with reference to FIG. 13 having "Search Engine Results" as "Interleave"; "URL's per Search Engine" as "10";"URL Details" as "Summary"; "Timeout (seconds) per Search Engine" as "3"; "Page" as "1"; "Searches per Group as "3"; and "Group" as I. Groups I and/or II may be selected from the typical one of the user response $UR_{n\ 1}$ (37), as the typical service and/or information response forms $IS_n$ (39) at the user interface $I_n$ (14) of FIGS. 33A–33C.

FIGS. 34A–36C, inclusive, show typical ones of the user responses $UR_n$ (37), as the typical service and/or information response forms $IS_n$ (39) at the user interface $I_n$ (14), with reference to FIGS. 14A, 14B, and 14C, respectively, having information and/or services from the responses $R_{n1}$. . . $R_{nm}$ (32) incorporated therein, and incorporated into Group I, Group II, and Group III, respectively, FIGS. 34A–36C, inclusive, show the results "interleaved". Typical ones of links, prices, descriptions, savings, and shipping schedules are indicated for products in Group I. The prices may be compared, for example, one with the other for the same and/or different items, shipping schedules compared, and a decision can be made as to which items to order, as a result of the information provided in the typical one of the user responses $UR_n$ (37), as the typical service and/or information response forms $IS_n$ (39) at the user interface $I_n$ (14). Typical similar items may have the same and/or similar titles, such as for example in book titles, but publication dates, for example, and/or editions may be the same and/or different, and shipping schedules may be the same and/or different. Prices, and cost savings may be traded off against shipping schedules, packaging (i.e., for example, hardcover and/or soft cover), author, publisher, for example, and/or other factors important to the user $U_n$ (12). The user $U_n$ (12) may select the items and/or items to order from such information that the user $U_n$ (12) considers to be important. The user $U_n$ (12) may place the order and/or orders directly through the links and/or URL's in the typical ones of the user responses $UR_n$ (37), as the typical service and/or information response forms $IS_n$ (39) at the user interface $I_n$ (14). The user $U_n$ (12) may additionally and/or alternatively collect the order and/or orders in a shopping cart and/or shopping carts associated with the typical ones of the user responses $UR_n$ (37), as the typical service and/or information response forms $IS_n$ (39) at the user interface $I_n$ (14), and place the order and/or orders through the client $C_n$ (16) and/or the server PS (18).

Now again, FIGS. 34A–36C, inclusive, show typical ones of the user responses $UR_n$ (37), as the typical service and/or information response forms $IS_n$ (39) at the user interface $I_n$ (14), having the service and/or information group $G_n$ (35) having the addressable query information groups $GI_{n1}$. . . $GI_{nz}$ (63) therein, the labelled individual information groups $LL_{n11}$. . . $LL_{nzu}$ (86) in the addressable query information groups $GI_{n1}$. . . $GI_{nz}$ (63), the additional request links $SL_{n1}$. . . $SL_{nw}$ (71), the optional service and/or information entry request form $IE_n$ (38), and other information and/or services therein, resulting from the same and different ones of the typical queries $QQ_{n1}$. . . $QQ_{nm}$ (53), different ones of the typical server addresses $AQ_{n1}$. . . $AQ_{nm}$ (54), and the typical optional instructions $VJ_{n1}$. . . $VJ_{nk}$ (52). Typical same ones of the typical queries $QQ_{n1}$. . . $QQ_{nm}$ (53) are "Catcher in the Rye", "Catcher", "Rye", "Sports", and "Rye Bread", which are different one from the other. The typical server addresses $AQ_{n1}$. . .$AQ_{nm}$ (54) are different one from the other.

FIGS. 34A–36C, inclusive, show typical ones of the user responses $UR_n$ (37), as the typical service and/or information response forms $IS_n$ (39) at the user interface $I_n$ (14), with reference to FIGS. 14A, 14B, and 14C having: "Search Engine Results" as "Interleave"; "URL's per Search Engine" as "10"; "URL Details" as "Summary"; "Timeout (seconds) per Search Engine" as "5"; "Page" as "1"; "Searches per Group as "3"; and "Group" as I, II, and III, respectively, for FIGS. 34A–36C, inclusive.

Now again, the typical optional instructions $VJ_{n1}$. . . $VJ_{nk}$ (52) have a 5 second "Timeout (seconds) per Search Engine", rather than a 3 second "Timeout (seconds) per Search Engine" as in FIGS. 27A–33C, inclusive. The "Timeout (seconds) per Search Engine" instructs the client $C_n$ (16) and/or the server PS (18) to return the typical user response $UR_n$ (37), as the typical service and/or information response form $IS_n$ (39) at the user interface $I_n$ (14) within a period of less than the "Timeout (seconds) per Search Engine" specified in the typical optional instructions $VJ_{n1}$. . . $VJ_{nk}$ (52). It should be noted that response times of less than one second per search engine are typical, and response times of substantially less than one second are quite common. However, the "Timeout (seconds) per Search Engine" has been incorporated herein for the user $U_1$ (12) to specify in the event of slow ones of the responses $R_{n1}$. . . $R_{nm}$ (32) from certain ones of the servers $S_1$. . . $S_z$ (20).

FIGS. 37A–39C, inclusive, show typical ones of the user responses $UR_n$ (37), as the typical service and/or information response forms $IS_n$ (39) at the user interface $I_n$ (14), with reference to FIG. 15, having information and/or services from the responses $R_{n1}$. . . $R_{nm}$ (32) incorporated therein, and incorporated into Group I, Group II, and Group III, respectively. Links, Prices, descriptions, savings, and shipping schedules are indicated for products in Group I, and Group II. FIGS. 38A–38D show the results "Separately" for Group II, and FIGS. 39A–39C show the results "Interleaved" for Group II. Links, Prices, descriptions, savings, and shipping schedules are indicated for products in Groups I and II in FIGS. 37A–39C, inclusive.

FIGS. 37A–39C, inclusive, show typical ones of the user responses $UR_n$ (37), as the typical service and/or information response forms $IS_n$ (39) at the user interface $I_n$ (14), with reference to FIG. 15 having; "Search Engine Results" as "Separate"; "URL's per Search Engine" as "8"; "URL Details" as "Summary"; "Timeout (seconds) per Search Engine" as "1"; "Page" as "1"; "Searches per Group as "5"; and "Group" as I, II, and III, respectively for FIGS. 37A–39C, inclusive.

Now again, the typical optional instructions $VJ_{n1}$. . . $VJ_{nk}$ (52) have "Separate", which instruct the client $C_n$ (16) and/or the server PS (18) to return the typical user response $UR_n$ (37), as the typical service and/or information response form $IS_n$ (39) at the user interface $I_n$ (14) in separate groups, i.e., grouped by the typical server addresses $AQ_{n1} \ldots AQ_{nm}$ (54), rather than interleaved one with the other, as in FIGS. 27A–36C, inclusive.

FIGS. 40A–40M show a typical one of the user response $UR_n$ (37), as the typical service and/or information response form $IS_n$ (39) at the user interface $I_n$ (14), with reference to FIG. 16, having information and/or services from the responses $R_{n1} \ldots R_{nm}$ (32) incorporated therein, and incorporated into a single Group.

FIGS. 40A–40M show the typical one of the user response $UR_n$ (37), as the typical service and/or information response forms $IS_n$ (39) at the user interface $I_n$ (14), with reference to FIG. 16 having: "Search Engine Results" as "Interleave", "URL's per Search Engine" as "25"; "URL Details" as "List"; "Timeout (seconds) per Search Engine" as "2"; "Page" as "3"; "Searches per Group as "9"; and "Group" as I. Groups I and/or II may be selected from the typical one of the user response $UR_n$ (37), as the typical service and/or information response forms $IS_n$ (39) at the user interface $I_n$ (14) of FIGS. 40A–40M.

Now again, the "URL Details" as "Summary" instruct the client $C_n$ (16) and/or the server PS (18) to return the typical user response $UR_n$ (37) showing descriptions and/or other information and/or services, in addition to links, in the typical ones of the user responses $UR_n$ (37), as the typical service and/or information response forms $IS_n$ (39) at the user interface $I_n$ (14), as in FIGS. 27A–39C, inclusive, while "URL Details" as "List" instruct the client $C_n$ (16) and/or the server PS (18) to return the typical user response $UR_n$ (37) showing only links and/or URL's in the typical ones of the user responses $UR_n$ (37), as the typical service and/or information response forms $IS_n$ (39) at the user interface $I_n$ (14), as in FIGS. 40A–40M.

FIGS. 41A–41F show a typical one of the user response $UR_n$ (37), as the typical service and/or information response form $IS_n$ (39) at the user interface $I_n$ (14), with reference to FIG. 17, having information and/or services from the responses $R_{n1} \ldots R_{nm}$ (32) incorporated therein, and incorporated into Group II.

FIGS. 41A–41F show the typical one of the user response $UR_n$ (37), as the typical service and/or information response forms $IS_n$ (39) at the user interface $I_n$ (14), with reference to FIG. 17 having: "Search Engine Results" as "Separate"; "URL's per Search Engine" as "18"; "URL Details" as "Summary"; "Timeout (seconds) per Search Engine" as "1"; "Page" as "2"; "Searches per Group as "4"; and "Group" as "2". Groups I and/or III may be selected from the typical one of the user response $UR_n$ (37), as the typical service and/or information response forms $IS_n$ (39) at the user interface $I_n$ (14) of FIGS. 41A–41F.

Figure 42A:
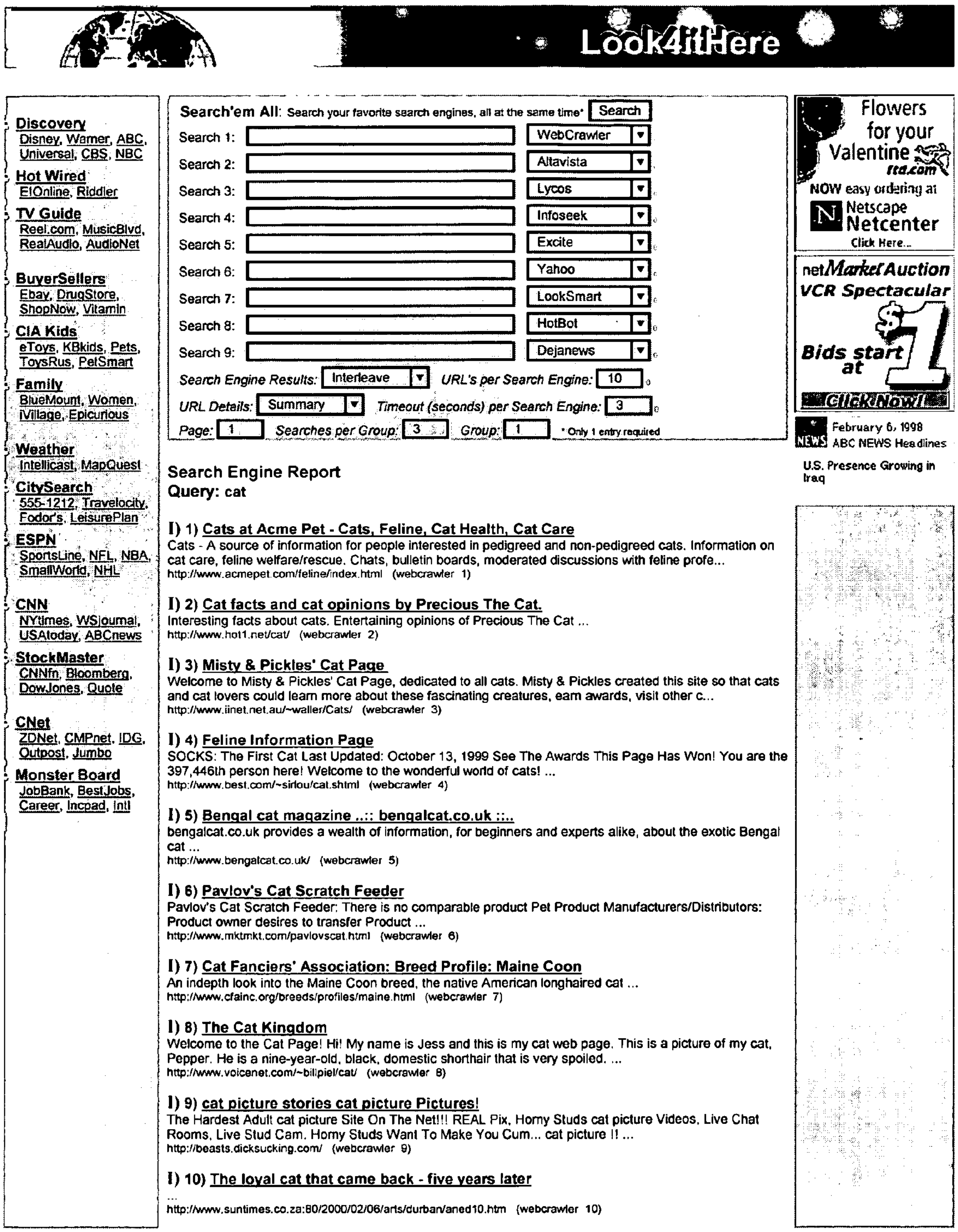
Figure 42O:
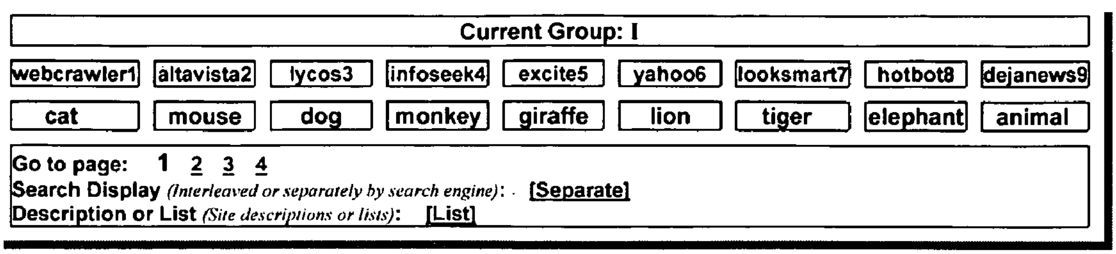

FIGS. 42A–42O show a typical one of the user response $UR_n$ (37), as the typical service and/or information response form $IS_n$ (39) at the user interface $I_n$ (14), with reference to FIG. 18, having information and/or services from the responses $R_{n1} \ldots R_{nm}$ (32) incorporated therein, and incorporated into a single Group.

FIGS. 42A–42O show the typical one of the user response $UR_n$ (37), as the typical service and/or information response forms $IS_n$ (39) at the user interface $I_n$ (14), with reference to FIG. 18 having: "Search Engine Results" as "Interleave"; "URL's per Search Engine" as "25"; "URL Details" as "Summary"; "Timeout (seconds) per Search Engine" as "5"; "Page" as "1"; "Searches per Group as "9"; and "Group" as "1".

Figure 43A:
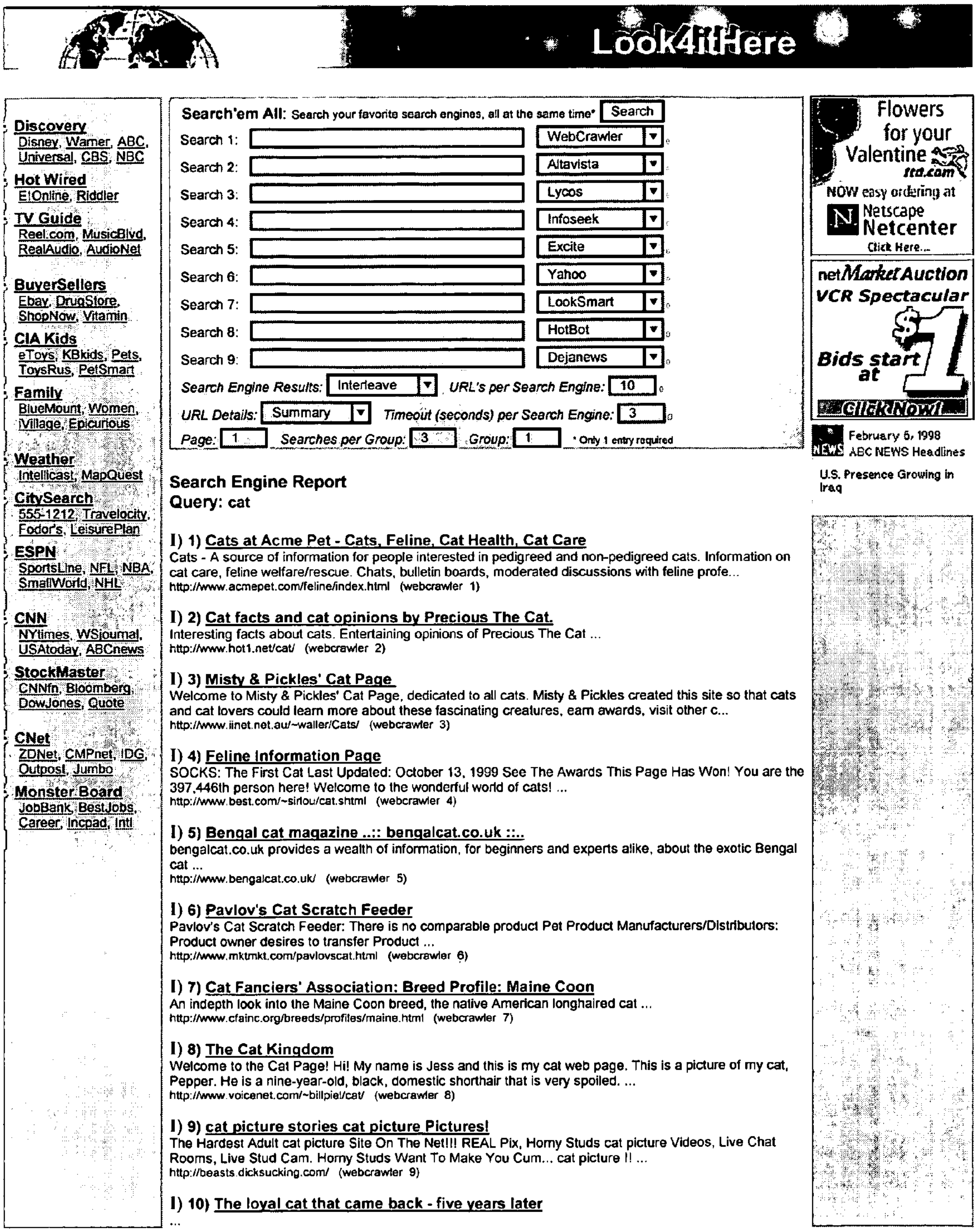

FIGS. 43A–43O show a typical one of the user response $UR_n$ (37), as the typical service and/or information response form $IS_n$ (39) at the user interface $I_n$ (14), with reference to FIG. 19, having information and/or services from the responses $R_{n1} \ldots R_{nm}$ (32) incorporated therein, and incorporated into a single Group.

FIGS. 43A–43O show the typical one of the user response $UR_n$ (37), as the typical service and/or information response forms $IS_n$ (39) at the user interface $I_n$ (14), with reference to FIG. 19 having: "Search Engine Results" as "Interleave"; "URL's per Search Engine" as "25"; "URL Details" as "Summary"; "Timeout (seconds) per Search Engine" as "3"; "Page" as "1"; "Searches per Group as "9"; and "Group" as "1".

FIGS. 44A–44C show a typical one of the user response $UR_n$ (37), as the typical service and/or information response form $IS_n$ (39) at the user interface $I_n$ (14), with reference to FIG. 20, having information and/or services from the responses $R_{n1} \ldots R_{nm}$ (32) incorporated therein, and incorporated into Group I. FIGS. 44A–44C also show the results of a "Timeout" occurring.

FIGS. 44A–44C show the typical one of the user response $UR_n$ (37), as the typical service and/or information response forms $IS_n$ (39) at the user interface $I_n$ (14), with reference to FIG. 20 having: "Search Engine Results" as "Interleave"; "URL's per Search Engine" as "10"; "URL Details" as "Summary"; "Timeout (seconds) per Search Engine" as "3"; "Page" as "1"; "Searches per Group as "3"; and "Group" as I. Groups I and/or II may be selected from the typical one of the user response $UR_n$ (37), as the typical service and/or information response forms $IS_n$ (39) at the user interface $I_n$ (14) of FIGS. 44A–44C.

FIGS. 45A–45C show a typical one of the user response $UR_n$ (37), as the typical service and/or information response form $IS_n$ (39) at the user interface $I_n$ (14), with reference to FIG. 21, having information and/or services from the responses $R_{n1} \ldots R_{nm}$ (32) incorporated therein, and incorporated into Group I.

FIGS. 45A–45C show the typical one of the user response $UR_n$ (37), as the typical service and/or information response forms $IS_n$ (39) at the user interface $I_n$ (14), with reference to FIG. 21 having: "Search Engine Results" as "Interleave"; "URL's per Search Engine" as "10"; "URL Details" as "Summary"; "Timeout (seconds) per Search Engine" as "3"; "Page" as "1"; "Searches per Group as "3"; and "Group" as I. Groups I and/or II may be selected from the typical one of the user response $UR_n$ (37), as the typical service and/or information response forms $IS_n$ (39) at the user interface $I_n$ (14) of FIGS. 45A–45C.

FIGS. 46A–46E show a typical one of the user response $UR_n$ (37), as the typical service and/or information response form $IS_n$ (39) at the user interface $I_n$ (14), with reference to FIG. 22, having information and/or services from the responses $R_{n1} \ldots R_{nm}$ (32) incorporated therein, and incorporated into Group I. FIGS. 46A–46E also show the links/advertisements/images automatically inserted into the typical one of the user response $UR_n$ (37), as the typical service and/or information response form $IS_n$ (39) at the user interface $I_n$ (14), which may be associated with the typical queries $QQ_{n1} \ldots QQ_{nm}$ (53). In the typical case shown in FIGS. 46A–46E, links/advertisements/images associated with the typical queries $QQ_{n1} \ldots QQ_{nm}$ (53) of "sports" and "television" have been automatically inserted into the typical one of the user response $UR_n$ (37), as the typical service and/or information response form $IS_n$ (39) at the user interface $I_n$ (14).

FIGS. 46A–46E show the typical one of the user response $UR_n$ (37), as the typical service and/or information response forms $IS_n$ (39) at the user interface $I_n$ (14), with reference to FIG. 22 having: "Search Engine Results" as "Interleave";

"URL's per Search Engine" as "15"; "URL Details" as "Summary"; "Timeout (seconds) per Search Engine" as "3"; "Page" as "1"; "Searches per Group as "5"; and "Group" as "1". Next Group: II may be selected from the typical one of the user response $UR_n$ (37), as the typical service and/or information response forms $IS_n$ (39) at the user interface $I_n$ (14) of FIGS. 46A–46E.

FIGS. 47A–47C and 48A–48D show a typical ones of the user response $UR_n$ (37), as the typical service and/or information response forms $IS_n$ (39) at the user interface $I_n$ (14), with reference to FIG. 23, having information and/or services from the responses $R_{n1} \ldots R_{nm}$ (32) incorporated therein, and incorporated into Group I. FIGS. 47A–47C and 48A–48D also show the results of a full text search of the optional database 41 and/or the optional database 42, which may be associated with the typical queries $QQ_{n1} \ldots QQ_{nm}$ (53), and which additionally and/or alternatively may function as an internal search engine. The full text search results are incorporated from the additional optional responses $RA_{n1} \ldots RA_{nm}$ (40). The results of the full text search of the optional database 41 and/or the optional database 42 may be additionally and/or alternatively automatically inserted into the typical one of the user response $UR_n$ (37), as the typical service and/or information response form $IS_n$ (39) at the user interface $I_n$ (14), in addition to the typical queries $QQ_{n1} \ldots QQ_{nm}$ (53) at the typical ones of the server addresses $AQ_{n1} \ldots AQ_{nm}$ (54). In the typical case shown in FIGS. 47A–47C and 48A–48D, full text search results associated with the typical query $QQ_{n1} \ldots QQ_{nm}$ (53) of "weather" have been automatically inserted into the typical ones of the user responses $UR_n$ (37), as the typical service and/or information response forms $IS_n$ (39) at the user interface $I_n$ (14), in addition to the typical queries $QQ_{n1} \ldots QQ_{nm}$ (53) at the typical ones of the server addresses $AQ_{n1} \ldots AQ_{nm}$ (54). The typical full text search results start and end with "Hotlist: Weather Science" in FIGS. 47A–47C. The typical full text search results start with "Hotlist: Weather Science" and end with "search for: 'weather'" in FIGS. 48A–48D.

FIGS. 47A–47C and 48A–48D show the typical one of the user response $UR_n$ (37), as the typical service and/or information response forms $IS_n$ (39) at the user interface $I_n$ (14), with reference to FIG. 23 having "Search Engine Results" as "Interleave"; "URL's per Search Engine" as "10"; "URL Details" as "Summary"; "Timeout (seconds) per Search Engine" as "3"; "Page" as "1"; "Searches per Group as "3"; and "Group" as "1". Next Group: I and/or Group: III may be selected from the typical one of the user response $UR_n$ (37), as the typical service and/or information response forms $IS_n$ (39) at the user interface $I_n$ (14) of FIGS. 47A–47C and 48A–48D.

FIGS. 49A–49I show a typical one of the user response $UR_n$ (37), as the typical service and/or information response form $IS_n$ (39) at the user interface $IS_n$ (14), with reference to FIG. 24, having information and/or services from the responses $R_{n1} \ldots R_{nm}$ (32) incorporated therein, and incorporated into Group I. FIGS. 49A–49I also show the typical results of the server PS (18) and/or the client $C_n$ (16) automatically optionally spidering the sites obtained as a result of the typical queries $QQ_{n1} \ldots QQ_{nm}$ (53) at the typical ones of the server addresses $AQ_{n1} \ldots AQ_{nm}$ (54), and incorporating the spidered results into the optional database 41 and/or the optional database 42. The spidered results incorporated into the optional database 41 and/or the optional database 42 may be searched as in FIGS. 47A–47C and 48A–48D with reference to FIG. 23 and/or based upon other ones of the typical queries $QQ_{n1} \ldots QQ_{nm}$ (53) at the typical ones of the server addresses $AQ_{n1} \ldots AQ_{nm}$ (54), and the full text search results may be obtained from the additional optional responses $RA_{n1} \ldots RA_{nm}$ (40).

FIGS. 49A–49I also show the typical one of the user response $UR_n$ (37), as the typical service and/or information response forms $IS_n$ (39) at the user interface $I_n$ (14), with reference to FIG. 24 having: "Search Engine Results" as "Interleave"; "URL's per Search Engine" as "10"; "URL Details" as "Summary"; "Timeout (seconds) per Search Engine" as "3"; "Page" as "1"; "Searches per Group as "3"; and "Group" as "1". Next Group: I and/or Group: III may be selected from the typical one of the user response $UR_n$ (37), as the typical service and/or information response forms $IS_n$ (39) at the user interface $I_n$ (14) of FIGS. 49A–49I.

FIGS. 50A–50K show a typical one of the user response $UR_n$ (37), as the typical service and/or information response form $IS_n$ (39) at the user interface $I_n$ (14), with reference to FIG. 25, having information and/or services from the responses $R_{n1} \ldots R_{nm}$ (32) incorporated therein, and incorporated into Group I. FIGS. 50A–50K also show the typical results of the server PS (18) and/or the client $C_n$ (16) semi-automatically optionally spidering the sites obtained as a result of the typical queries $QQ_{n1} \ldots QQ_{nm}$ (53) at the typical ones of the server addresses $AQ_{n1} \ldots AQ_{nm}$ (54), and incorporating the spidered results into the optional database 41 and/or the optional database 42. The spidered results incorporated into the optional database 41 and/or the optional database 42 may also be searched as in FIGS. 47A–47C and 48A–48D with reference to FIG. 23 and/or based upon other ones of the typical queries $QQ_{n1} \ldots QQ_{nm}$ (53) at the typical ones of the server addresses $AQ_{n1} \ldots AQ_{nm}$ (54), and the full text search results may be obtained from the additional optional responses $RA_{n1} \ldots RA_{nm}$ (40).

The user $U_n$ (12) may optionally select those sites to be spidered and incorporated into the optional database 41 and/or the optional database 42, as in the typical one of the user response $UR_n$ (37), as the typical service and/or information response form $IS_n$ (39) at the user interface $I_n$ (14) in FIGS. 50A–50K. FIGS. 51A–51G show the typical results of the server PS (18) and/or the client $C_n$ (16) optionally spidering the sites obtained as a result of the typical queries $QQ_{n1} \ldots QQ_{nm}$ (53) at the typical ones of the server addresses $AQ_{n1} \ldots AQ_{nm}$ (54), and input resulting from user selection of sites to be spidered from FIGS. 50A–50K, and incorporating the spidered results into the optional database 41 and/or the optional database 42.

The results of the optional spidering typically obtained from the typical process used with FIGS. 50A–50K and 51A–51G may be substantially the same as the typical process used with FIGS. 49A–49I, if all the sites shown in FIGS. 50A–50K are selected for incorporation into the database 41 and/or the optional database 42. The typical process of FIGS. 49A–49I offers and automatic approach to constructing the optional database 41 and/or the optional database 42, and the typical process of FIGS. 50A–50K and 51A–51G offers the flexibility of weeding out and/or selecting sites to be incorporated into the database 41 and/or the optional database 42.

FIGS. 50A–50K also show the typical one of the user response $UR_n$ (37), as the typical service and/or information response forms $IS_n$ (39) at the user interface $I_n$ (14), with reference to FIG. 25 having "Search Engine Results" as "Interleave"; "URL's per Search Engine" as "10"; "URL Details" as "Summary"; "Timeout (seconds) per Search Engine" as "3"; "Page" as "1"; "Searches per Group As "3"; and "Group" as "1". Next Group: I and/or Group: III may be selected from the typical one of the user response $UR_n$ (37), as the typical service and/or information response forms $IS_n$ (39) at the user interface $I_n$(14) of FIGS. 50A–50K.

FIGS. 52A–52C show a typical one of the user response $UR_n$ (37), as the typical service and/or information response form $IS_n$ (39) at the user interface $I_n$ (14), with reference to FIG. 26, having information and/or services from the additional optional responses $RA_{n1}$. . . $RA_{nm}$ (40). FIGS. 52A–52C show the results solely of a full text search of the optional database 41 and/or the optional database 42, which may be associated with the typical queries $QQ_{n1}$. . . $QQ_{nm}$ (53). The full text search results are incorporated from the additional optional responses $RA_{n1}$. . . $RA_{nm}$ (40). The typical full text search results start with "Hotlist: Weather Science" and end with "High Plains Climate Center Home Page" in FIGS. 52A–52C.

The typical ones of the user responses $UR_1$. . . $UR_n$ (37), as typical service and/or information response forms $IS_1$. . . $IS_n$ (39) at the user interfaces $I_1$. . . $I_n$ (14) shown in FIGS. 27A–52C, inclusive, are typical examples of the user responses $UR_1$. . . $UR_n$ (37), as typical service and/or information response forms $IS_1$. . . $IS_n$ (39) at the user interfaces $I_1$. . . $I_n$ (14), a much larger variety of which is possible. FIGS. 27A–52C, inclusive, illustrate typical examples of typical ones of the user responses $UR_1$. . . $UR_n$ (37), as typical service and/or information response forms $IS_1$. . . $IS_n$ (39) at the user interfaces $I_1$. . . $I_n$ (14) to the typical queries $QQ_{n1}$. . . $QQ_{nm}$ (53), the typical ones of the server addresses $AQ_{n1}$. . . $AQ_{nm}$ (54), and the typical optional instructions $VJ_{n1}$. . . $VJ_{nk}$ (52) having been entered into the typical ones of the completed service and/or information entry request forms $IF_1$. . . $IF_n$ (230) at the user interfaces $I_1$. . . $I_n$ (14) shown in FIGS. 11–26.

The typical examples of the typical ones of the user responses $UR_1$. . . $UR_n$ (37), as typical service and/or information response forms $IS_1$. . . $IS_n$ (39) at the user interfaces $I_1$. . . $I_n$ (14) are for illustrative purposes, and are not intended to limit the substantially infinite variety of the user responses $UR_1$. . . $UR_n$ (37), as the service and/or information response forms $IS_1$. . . $IS_n$ (39) at the user interfaces $I_1$. . . $I_n$ (14), and queries $QQ_{n1}$. . . $QQ_{nm}$ (53), the server addresses $AQ_{n1}$. . . $AQ_{nm}$ (54), and the optional instructions $VJ_{n1}$. . . $VJ_{nk}$ (52) that may be entered into the service and/or information entry request forms $IE_1$. . . $IE_n$ (38), to derive the to the completed service and/or information entry request forms $IF_1$. . . $IF_n$ (230), and which result in the user responses $UR_1$. . . $UR_n$ (37), as the service and/or information response forms $IS_1$. . . $IS_n$ (39) at the user interfaces $I_1$. . . $I_n$ (14). Likewise, names and/or links and/or other information are incorporated into the typical ones of the user responses $UR_1$. . . $UR_n$ (37), as the service and/or information response forms $IS_1$. . . $IS_n$ (39) at the user interfaces $I_1$. . . $I_n$ (14), shown in FIGS. 27A–52C, inclusive, for illustrative purposes, and are not intended to limit the large variety of the user responses $UR_1$. . . $UR_n$ (37), as the service and/or information response forms $IS_1$. . . $IS_n$ (39) at the user interfaces $I_1$. . . $I_n$ (14), and the names and/or links and/or information that are possible, and that may be incorporated into the user responses $UR_1$. . . $UR_n$ (37), as the service and/or information response forms $IS_1$. . . $IS_n$ (39) at the user interfaces $I_1$. . . $I_n$ (14).

E. OTHER TYPICAL SERVICE AND/OR INFORMATION ENTRY REQUEST FORMS, OTHER TYPICAL COMPLETED SERVICE AND/OR INFORMATION ENTRY REQUEST FORMS, AND OTHER TYPICAL SERVICE AND/OR INFORMATION RESPONSE FORMS

FIG. 111 shows another typical completed service and/or information entry request form $IF_n$ (230), at the user interface $I_n$ (14), having same and different ones of the typical queries $QQ_{n1}$. . . $QQ_{nm}$ (53), different ones of the typical server addresses $AQ_{n1}$. . . $AQ_{nm}$ (54), and the typical optional instructions $VJ_{n1}$. . . $VJ_{nk}$ (52). Typical same ones of the typical queries $QQ_{n1}$. . . $QQ_{nm}$ (53) are "Cat"; "Dog"; and "Mouse", which are different one from the other. Typical and same ones of the typical server addresses $AQ_{n1}$. . . $AQ_{nm}$ (54) are Amazon®, Borders®, and BarnesandNoble®, which are different one from the other, and which are also different from Google®. The typical optional instructions $VJ_{n1}$. . . $VJ_{nk}$ (52) having "URL's per Search Engine" as "10" and "Searches per Group" as "9", the returns substantially "10 URL's per Search Engine" multiplied by "9 Searches per Group", which is substantially "90 URL's per Group", and/or other services and/or information associated therewith, returned in the "Current Group", and Search Engine Results as "Interleaved". In this case, however, order entry boxes 402 are also returned, which allow the user $U_1$ (12) to order services, merchandise, information, other items and/or objects through the user interface $I_1$ (14), as shown in FIGS. 112A–112H. The user $U_1$(12) can place orders with sites that support such services and also obtain information on queried subjects from sites that support returning information and/or services.

The typical optional instructions $VJ_{n1}$. . . $VJ_{nk}$ (52) "Interleaved" of FIG. 111 instruct the client $C_n$ (16) and/or the server PS (18) to return the typical user response $UR_n$ (37), as the typical service and/or information response form $IS_n$ (39) at the user interface $I_n$ (14) having information and/or services in the responses $R_{n1}$. . . $R_{nm}$ (32) to be interleaved one with the other (or alternating one with the other) in the appropriate addressable query information groups $GI_{n1}$. . . $GI_{nz}$ (63). The labelled individual information groups $LL_{n11}$. . . $LL_{nzu}$ (86) in the addressable query information groups $GI_{n1}$. . . $GI_{nz}$ (63) are alternatingly interleaved one with the other and labelled and/or identified and associated correspondingly with the responses $R_{n1}$. . . $R_{nm}$ (32) from the servers $S_1$. . . $S_z$ (20). The "Interleaved" information and/or services may typically be incorporated into the appropriate addressable query information groups $GI_{n1}$ . . . $GI_{nz}$ (63) in substantially the same sequence as the information and/or services in the responses $R_{n1}$. . . $R_{nm}$ (32) communicated from the servers $S_1$. . . $S_z$ (20). However, other sorting/grouping criteria may optionally be used, as will be discussed.

FIG. 113 shows another typical completed service and/or information entry request form $IF_n$ (230), at the user interface $I_n$ (14), having same and different ones of the typical queries $QQ_{n1}$ . . . $QQ_{nm}$ (53), different ones of the typical server addresses $AQ_{n1}$ . . . $AQ_{nm}$ (54), and the typical optional instructions $VJ_{n1}$ . . . $VJ_{nk}$ (52), with other sorting/grouping criteria selected, i.e., with Search Engine Results as "Combined $[a–z]".

The typical optional instructions $VJ_{n1}$ . . . $VJ_{nk}$ (52) "Combined $[a–z]" of FIG. 113 instruct the client $C_n$ (16) and/or the server PS (18) to return the typical user response $UR_n$ (37), as the typical service and/or information response form $IS_n$ (39) at the user interface $I_n$ (14) having information and/or services in the responses $R_{n1} \ldots R_{nm}$ (32) to be sorted in ascending order first numerically, and then alphabetically, in the appropriate addressable query information groups $GI_{n1} \ldots GI_{nz}$ (63). Items having prices will be sorted numerically by price, with lowest price first. The labelled individual information groups $LL_{n11} \ldots LL_{nzu}$ (86) in the addressable query information groups $GI_{n1} \ldots GI_{nz}$ (63) are grouped and sorted in ascending order one with the other and labelled and/or identified and associated correspondingly with the responses $R_{n1} \ldots R_{nm}$ (32) from the servers $S_1 \ldots S_z$ (20). The "Combined $[a–z]" information and/or services may typically be incorporated into the appropriate addressable query information groups $GI_{n1} \ldots GI_{nz}$ (63) in accordance with the "Combined $[a–z]" optional instructions $VJ_{n1} \ldots VJ_{nk}$ (52), and communicated in the other typical user response $UR_n$, as the typical service and/or information response form $IS_n$ at the user interface $I_n$, which may be communicated to the user $U_n$, as shown in FIGS. 114A–114H.

FIGS. 114A–114H also depict typical order boxes 402 of a typical order entry form $OF_n$, which is communicated with the typical user response $UR_n$, to enter quantities that the user $U_n$ may elect to order, as the typical service and/or information response form $IS_n$ at the user interface $I_n$, which may be communicated to the user $U_n$, which the user $U_n$ may use to enter an order.

FIG. 115 shows another typical completed service and/or information entry request form $IF_n$ (230), at the user interface $I_n$ (14), having same and different ones of the typical queries $QQ_{n1} \ldots QQ_{nm}$ (53), different ones of the typical server addresses $AQ_{n1} \ldots AQ_{nm}$ (54), and the typical optional instructions $VJ_{n1} \ldots VJ_{nk}$ (52), with other sorting/grouping criteria selected, i.e., with Search Engine Results as "Combined $[z–a]".

The typical optional instructions $VJ_{n1} \ldots VJ_{nk}$ (52) "Combined $[z–a]" of FIG. 115 instruct the client $C_n$ (16) and/or the server PS (18) to return the typical user response $UR_n$ (37), as the typical service and/or information response form $IS_n$ (39) at the user interface $I_n$ (14) having information and/or services in the responses $R_{n1} \ldots R_{nm}$ (32) to be sorted in descending order first alphabetically, and then numerically, in the appropriate addressable query information groups $GI_{n1} \ldots GI_{nz}$ (63). Items having prices will be sorted numerically by price, with highest price first. The labelled individual information groups $LL_{n11} \ldots LL_{nm}$ (86) in the addressable query information groups $GI_{n1} \ldots GI_{nz}$ (63) are grouped and sorted in descending order one with the other and labelled and/or identified and associated correspondingly with the responses $R_{n1} \ldots R_{nm}$ (32) from the servers $S_1 \ldots S_z$ (20). The "Combined $[z–a]" information and/or services may typically be incorporated into the appropriate addressable query information groups $GI_{n1} \ldots GI_{nz}$ (63) in accordance with the "Combined $[z–a]" optional instructions $VJ_{n1} \ldots VJ_{nk}$ (52), and communicated in the other typical user response $UR_n$, as the typical service and/or information response form $IS_n$ at the user interface $I_n$, which may be communicated to the user $U_n$, as shown in FIGS. 116A–116H.

FIG. 117 shows another typical completed service and/or information entry request form $IF_n$ (230), at the user interface $I_n$ (14), having same and different ones of the typical queries $QQ_{n1} \ldots QQ_{nm}$ (53), different ones of the typical server addresses $AQ_{n1} \ldots AQ_{nm}$ (54), and the typical optional instructions $VJ_{n1} \ldots VJ_{nk}$ (52), with other sorting/grouping criteria selected, i.e., with Search Engine Results as "Separate". The typical optional instructions $VJ_{n1} \ldots VJ_{nk}$ (52) of FIG. 117 have "Separate", which instruct the client $C_n$ (16) and/or the server PS (18) to return the typical user response $UR_n$ (37), as the typical service and/or information response form $IS_n$ (39) at the user interface $I_n$ (14) in separate groups, i.e., grouped by the typical server addresses $AQ_{n1} \ldots AQ_{nm}$ (54), rather than interleaved one with the other, and communicated in the other typical user response $UR_n$, as the typical service and/or information response form $IS_n$ at the user interface $I_n$, which may be communicated to the user $U_n$, as shown in FIGS. 118A–118H.

FIG. 119 shows another typical completed service and/or information entry request form $IF_n$ (230), at the user interface $I_n$ (14), having same and different ones of the typical queries $QQ_{n1} \ldots QQ_{nm}$ (53), different ones of the typical server addresses $AQ_{n1} \ldots AQ_{nm}$ (54), and the typical optional instructions $VJ_{n1} \ldots VJ_{nk}$ (52), with other sorting/grouping criteria selected, i.e., with Search Engine Results as "Separate $[a–z]". The typical optional instructions $VJ_{n1} \ldots VJ_{nk}$ (52) of FIG. 119 have "Separate $[a–z]", which instruct the client $C_n$ (16) and/or the server PS (18) to return the typical user response $UR_n$ (37), as the typical service and/or information response form $IS_n$ (39) at the user interface $I_n$ (14) in separate groups, sorted in ascending order first numerically, and then alphabetically, in the appropriate addressable query information groups $GI_{n1} \ldots GI_{nz}$ (63), i.e., grouped by the typical server addresses $AQ_{n1} \ldots AQ_{nm}$ (54), and communicated in the other typical user response $UR_n$, as the typical service and/or information response form $IS_n$ at the user interface $I_n$, which may be communicated to the user $U_n$, as shown in FIGS. 120A–120H. Items having prices will be sorted numerically by price, with lowest price first within each of the typical server addresses $AQ_{n1} \ldots AQ_{nm}$ (54) groups.

FIG. 121 shows another typical completed service and/or information entry request form $IF_n$ (230), at the user interface $I_n$ (14), having same and different ones of the typical queries $QQ_{n1} \ldots QQ_{nm}$ (53), different ones of the typical server addresses $AQ_{n1} \ldots AQ_{nm}$ (54), and the typical optional instructions $VJ_{n1} \ldots VJ_{nk}$ (52), with other sorting/grouping criteria selected, i.e., with Search Engine Results as "Separate $[z–a]". The typical optional instructions $VJ_{n1} \ldots VJ_{nk}$ (52) of FIG. 121 have "Separate $[z–a]", which instruct the client $C_n$ (16) and/or the server PS (18) to return the typical user response $UR_n$ (37), as the typical service and/or information response forms $IS_n$ (39) at the user interface $I_n$ (14) in separate groups, sorted in descending order alphabetically, and then numerically, in the appropriate addressable query information groups $GI_{n1} \ldots GI_{nz}$ (63), i.e., grouped by the typical server addresses $AQ_{n1} \ldots AQ_{nm}$ (54), and communicated in the other typical user response $UR_n$, as the typical service and/or information response form $IS_n$ at the user interface $I_n$, which may be communicated to the user $U_n$, as shown in FIGS. 122A–122H. Items having prices will be sorted numerically by price, with highest price first within each of the typical server addresses $AQ_{n1} \ldots AQ_{nm}$ (54) groups.

FIGS. 123A–123H depict the typical combined user response $UR_n$, as the typical service and/or information response form $IS_n$ at the user interface $I_n$, which may be communicated to the user $U_n$, and the order entry form $OF_n$, which the user $U_n$ may use to enter the order, of FIGS. 114A–114H, with typical order information entered therein.

FIGS. 124A–124B depict a typical preview form of an order $OP_n$, resulting from submission of the quantities to be ordered in order boxes 402 of the order entry form $OF_n$ of FIGS. 114A–114H, of the typical user response $UR_n$, as the typical service and/or information response form $IS_n$ at the user interface $I_n$, with the typical order information entered therein, as shown in FIGS. 123A–123H.

FIGS. 125A–125B depict a typical order placement form $OL_n$, having the typical preview form of the order $OP_n$, resulting from submission of the order entry form $OF_n$, of the typical combined user response $UR_n$, as the typical service and/or information response form $IS_n$ at the user interface $I_n$, which may be communicated to the user $U_n$, and the order entry form $OF_n$, which the user $U_n$ may use to enter the order, of FIGS. 114A–114H, with the typical order information entered therein, as shown in FIGS. 123A–123H, or which the user $U_n$ may enter through the typical preview form of the order $OP_n$ of FIGS. 124A–124B.

FIGS. 126A–126B depict a typical completed order placement form $OL_n$, having a preview of the order $OP_n$, resulting from submission of the order entry form $OF_n$, of the typical combined user response $UR_n$ , as the typical service and/or information response form $IS_n$ at the user interface $I_n$, which may be communicated to the user $U_n$, and the order entry form $OF_n$, which the user $U_n$ may use to enter the order, of FIGS. 114A–114H, with the typical order information entered therein, as shown in FIGS. 123A–123H, or which the user $U_n$ may enter through the typical preview form of the order $OP_n$ of FIGS. 124A–124B.

FIGS. 127A–127B depict a typical order confirmation $OC_n$, resulting from submission of the typical completed order placement form $OL_n$ of FIGS. 126A–126B.

The orders are also confirmed automatically by e-mail, with e-mailed confirmations being sent to the user $U_n$ (12), i.e., the buyer, seller, order fulfillment organization, with the total order being totaled, portions of the order being segregated and separated one from the other, and subtotaled, each segregated and subtotaled portion being directed to individual suppliers.

FIGS. 128A–128C depict a typical e-mail order placement $EP_n$, resulting from submission of the typical completed order placement form $OL_n$ of FIGS. 126A–126B. FIGS. 129A–129C depict a typical e-mail confirmation of receipt of order $EC_n$, resulting from submission of the typical completed order placement form $OL_n$ of FIGS. 126A–126B. FIGS. 130A–130B depict a typical e-mail order placement $EP_n$ of a portion of the order, resulting from submission of the typical completed order placement form $OL_n$ of FIGS. 126A–126B, and FIGS. 131A–131B and 132A–132B depict a typical e-mail order placements $EP_n$ of other portions of the order, resulting from submission of the typical completed order placement form $OL_n$ of FIGS. 126A–126B.

FIG. 136 depicts another typical service and/or information entry request form $IE_n$ at the user interface $I_n$, which the user $U_n$ may communicate other typical user input $UI_n$ thereinto, which is substantially the same as the typical service and/or information entry request form $IE_n$ at the user interface $I_n$ of FIG. 111, except the typical service and/or information entry request form $IE_n$ at the user interface $I_n$ of FIG. 136 is adapted to allow 10 different ones of the typical queries $QQ_{n1} \ldots QQ_{nm}$ (53) and 10 different ones of the typical server addresses $AQ_{n1} \ldots AQ_{nm}$ (54) to be entered, whereas the typical service and/or information entry request form $IE_n$ at the user interface $I_n$ of FIG. 111 is adapted to allow 9 different ones of the typical queries $QQ_{n1} \ldots QQ_{nm}$ (53) and 9 different ones of the typical server addresses $AQ_{n1} \ldots AQ_{nm}$ (54) to be entered.

FIG. 137 depicts another typical service and/or information entry request form $IE_n$ at the user interface $I_n$, which the user $U_n$ may communicate other typical user input $UI_n$ thereinto, which is substantially the same as the typical service and/or information entry request form $IE_n$ at the user interface $I_n$ of FIG. 136, except the typical service and/or information entry request form $IE_n$ at the user interface $I_n$ of FIG. 137 is adapted to allow the 10 different ones of the typical queries $QQ_{n1} \ldots QQ_{nm}$ (53) and the 10 different ones of the typical server addresses $AQ_{n1} \ldots AQ_{nm}$ (54) to be entered, aligned vertically one with the other in pairs, in two rows predominantly horizontally adjacent one with the other, whereas the typical service and/or information entry request form $IE_n$ at the user interface $I_n$ of FIG. 136 is adapted to allow the 10 different ones of the typical queries $QQ_{n1} \ldots QQ_{nm}$ (53) and the 10 different ones of the typical server addresses $AQ_{n1} \ldots AQ_{nm}$ (54) to be entered, aligned horizontally one with the other in pairs adjacent one with the other in vertical rows.

FIG. 138 depicts another typical service and/or information entry request form $IE_n$ at the user interface $I_n$, which the user $U_n$ may communicate other typical user input $UI_n$ thereinto, which is substantially the same as the typical service and/or information entry request form $IE_n$ at the user interface $I_n$ of FIG. 137, except the typical service and/or information entry request form $IE_n$ at the user interface $I_n$ of FIG. 138 is adapted to allow 12 different ones of the typical queries $QQ_{n1} \ldots QQ_{nm}$ (53) and 12 different ones of the typical server addresses $AQ_{n1} \ldots AQ_{nm}$ (54) to be entered, whereas the typical service and/or information entry request form $IE_n$ at the user interface $I_n$ of FIG. 138 is adapted to allow 10 different ones of the typical queries $QQ_{n1} \ldots QQ_{nm}$ (53) and 10 different ones of the typical server addresses $AQ_{n1} \ldots AQ_{nm}$ (54) to be entered.

Figure 6:
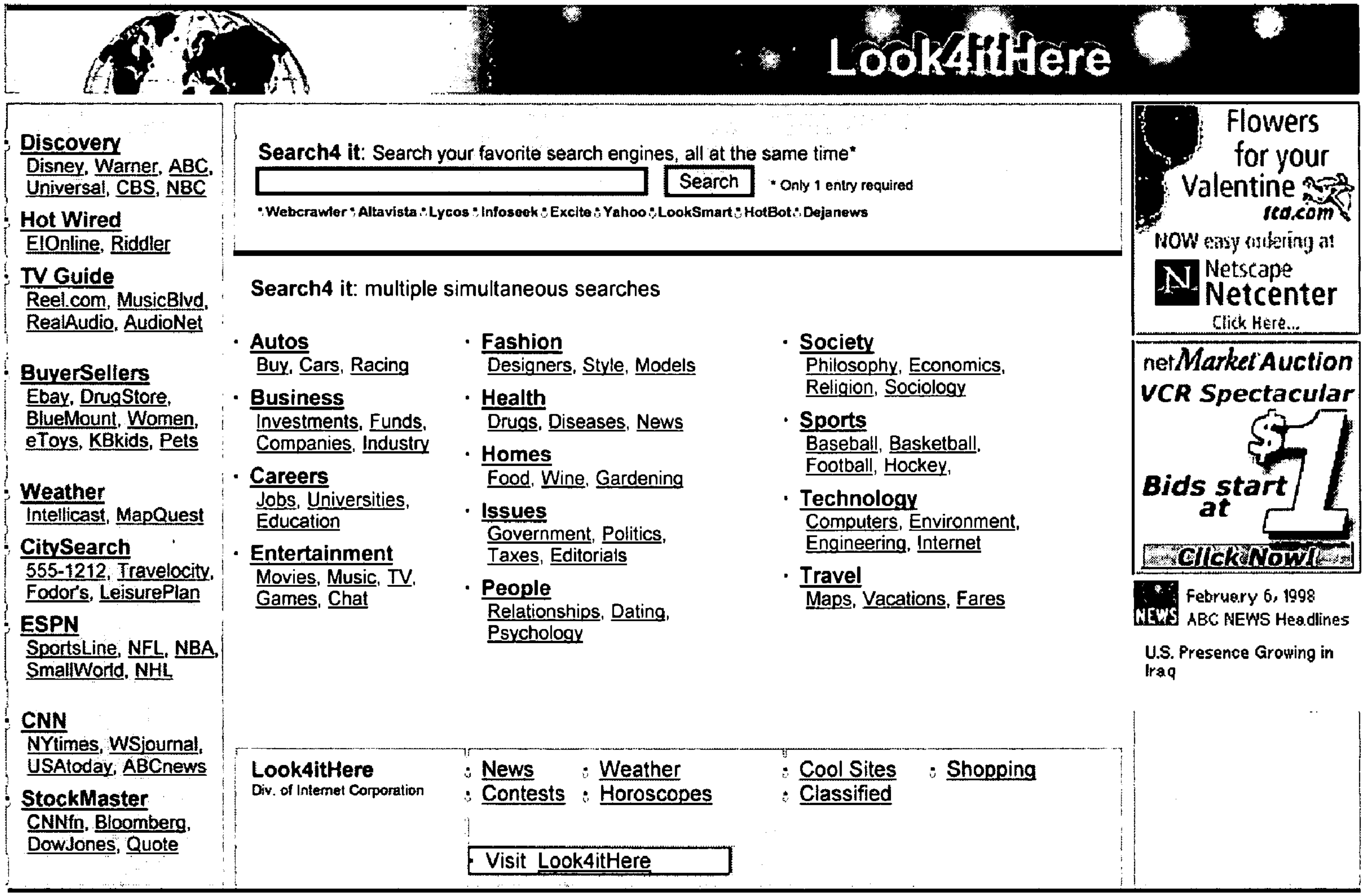
FIG. 6 depicts another typical service and/or information entry request form $IE_n$ at the user interface $I_n$, which the user $U_n$ may communicate other typical user input $UI_n$ thereinto.
Figure 7:
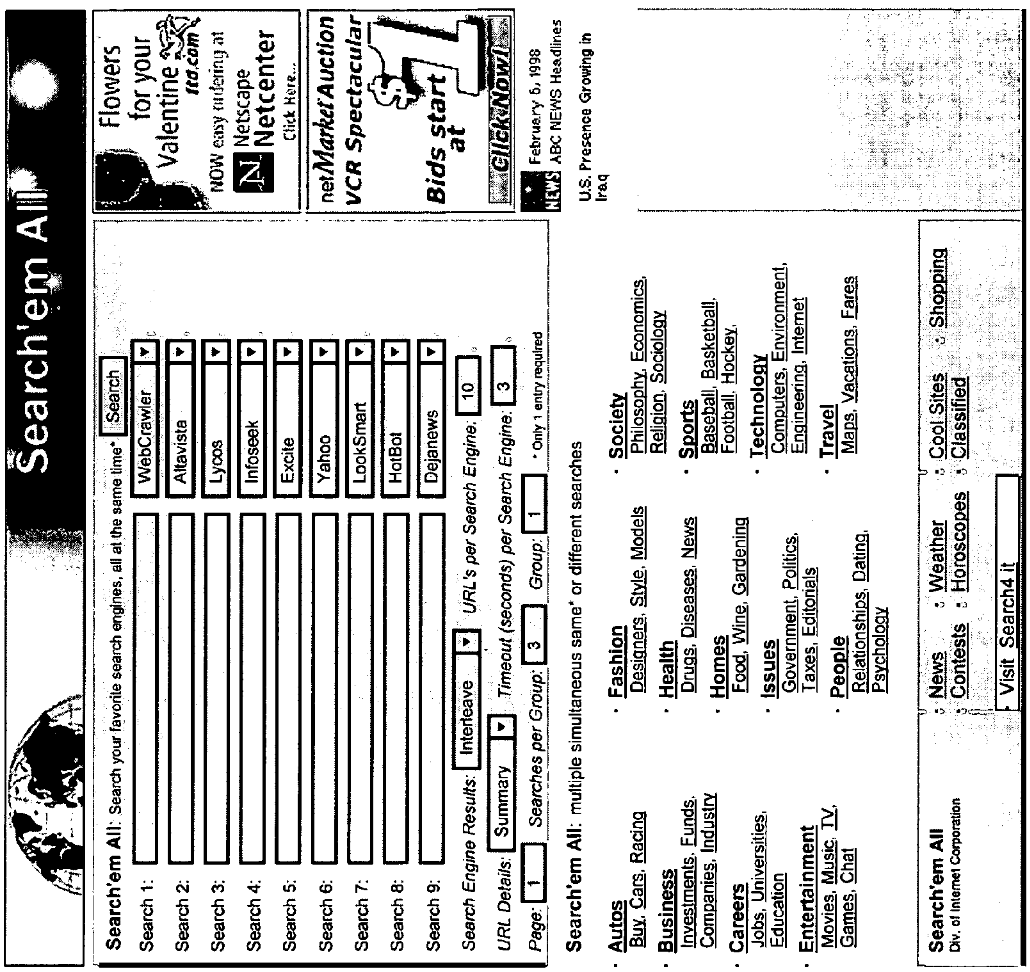
FIG. 7 depicts another typical service and/or information entry request form $IE_n$ at the user interface $I_n$, which the user $U_n$ may communicate other typical user input $UI_n$ thereinto.
Figure 8:
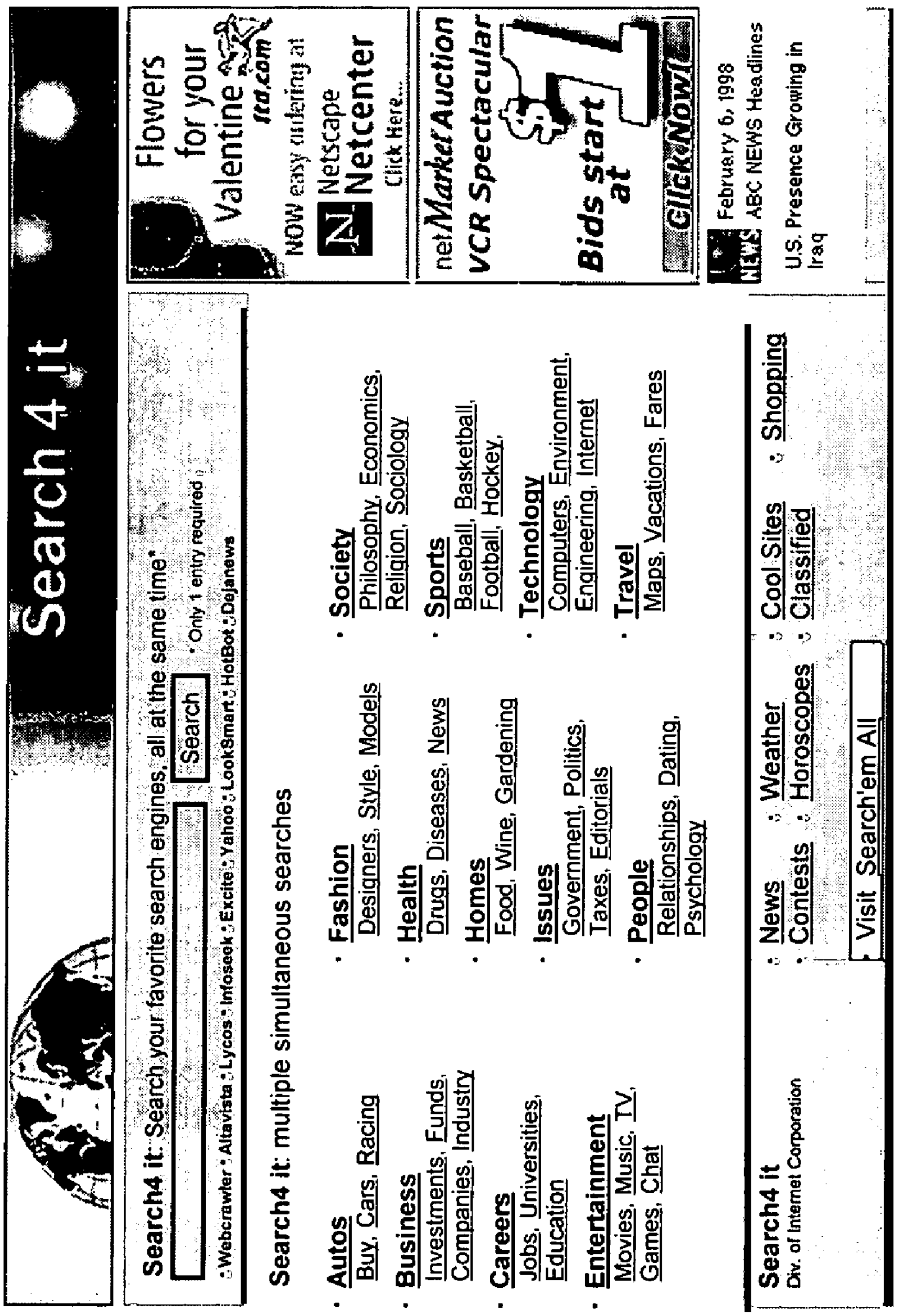
FIG. 8 depicts another typical service and/or information entry request form $IE_n$ at the user interface $I_n$, which the user $U_n$ may communicate other typical user input $UI_n$ thereinto.
Figure 9:
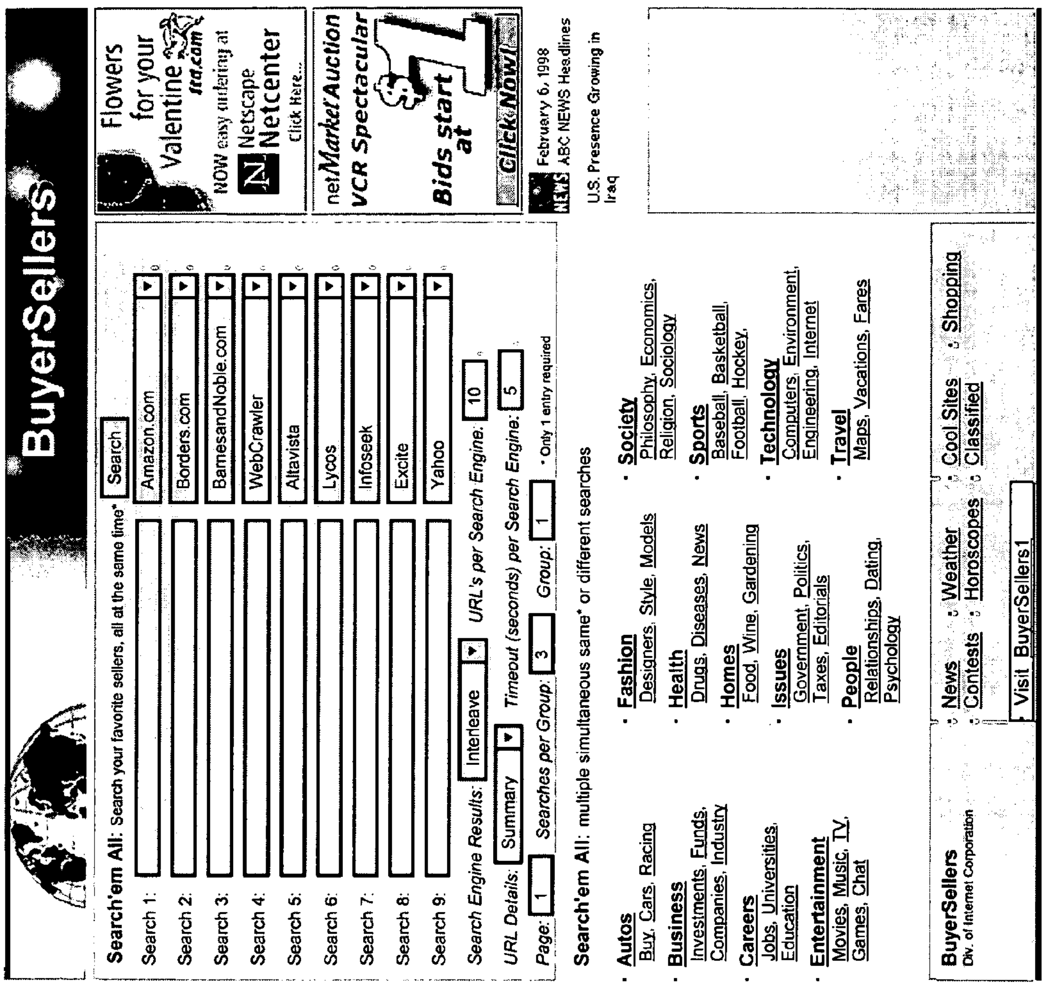
FIG. 9 depicts another typical service and/or information entry request form $IE_n$ at the user interface $I_n$, which the user $U_n$ may communicate other typical user input $UI_n$ thereinto.
Figure 10:
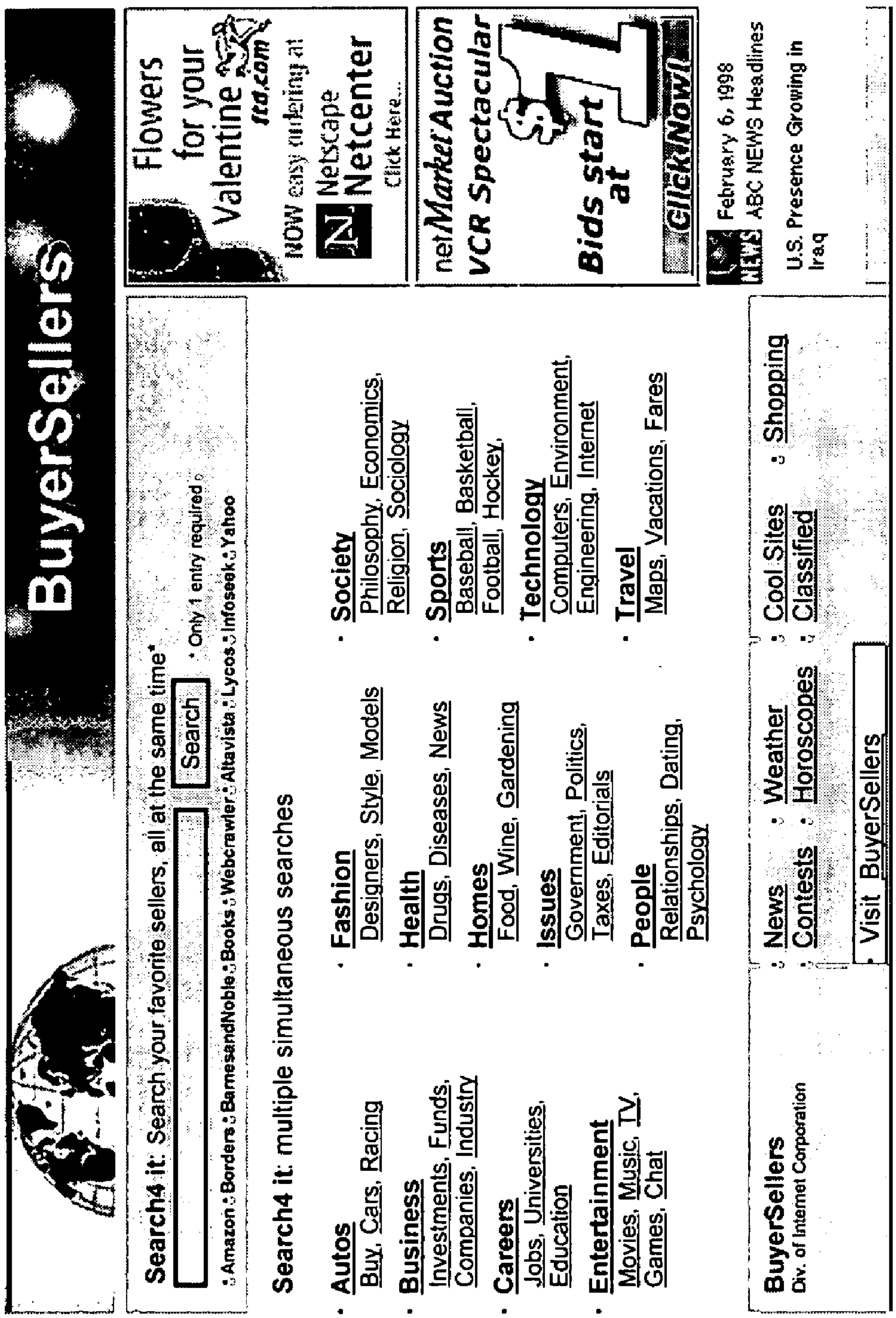
FIG. 10 depicts another typical service and/or information entry request form $IE_n$ at the user interface $I_n$, which the user $U_n$ may communicate other typical user input $UI_n$ thereinto.

FIGS. 139–141 depict yet another typical service and/or information entry request form $IE_n$ at the user interface $I_n$, which the user $U_n$ may communicate other typical user input $UI_n$ thereinto, which are substantially the same as the typical service and/or information entry request forms $IE_n$ at the user interface $I_n$ of FIGS. 6, 8, and 10.

Each of the typical service and/or information entry request form $IE_n$ at the user interface $I_n$, which the user $U_n$ may communicate other typical user input $UI_n$ thereinto, of FIGS. 136–141 also have "Top Stories", which are news stories, and are updated intermittently on a substantially routine basis.

FIG. 142 shows another typical completed service and/or information entry request form $IF_n$ (230), at the user interface $I_n$ (14), having same and different ones of the typical queries $QQ_{n1} \ldots QQ_{nm}$ (53), different ones of the typical server addresses $AQ_{n1} \ldots AQ_{nm}$ (54), and the typical optional instructions $VJ_{n1} \ldots VJ_{nk}$ (52), with other sorting/grouping criteria selected, i.e., with Search Engine Results as "Separate $[a–z]". The typical optional instructions $VJ_{n1} \ldots VJ_{nk}$ (52) of FIG. 142 have "Separate $[a–z]", which instruct the client $C_n$ (16) and/or the server PS (18) to return the typical user response $UR_n$ (37), as the typical service and/or information response form $IS_n$ (39) at the user interface $I_n$ (14) in separate groups, sorted in ascending order first numerically, and then alphabetically, in the appropriate addressable query information groups $GI_{n1} \ldots GI_{nz}$ (63), i.e., grouped by the typical server addresses $AQ_{n1} \ldots AQ_{nm}$ (54), and communicated in the other typical user response $UR_n$, as the typical service and/or information response form $IS_n$ at the user interface $I_n$, which may be communicated to the user $U_n$, as shown in FIGS. 143A–143H. Items having prices will be sorted numerically by price, with lowest price first within each of the typical server addresses $AQ_{n1} \ldots AQ_{nm}$ (54) groups.

FIG. 144 shows another typical completed service and/or information entry request form $IF_n$ (230), at the user interface $I_n$ (14), having same and different ones of the typical queries $QQ_{n1}$ . . . $QQ_{nm}$ (53), different ones of the typical server addresses $AQ_{n1}$ . . . $AQ_{nm}$ (54), and the typical optional instructions $VJ_{n1}$ . . . $VJ_{nk}$ (52), with other sorting/grouping criteria selected, i.e., with Search Engine Results as "Combined \$[a–z]".

The typical optional instructions $VJ_{n1}$ . . . $VJ_{nk}$ (52) "Combined \$[a–z]" of FIG. 144 instruct the client $C_n$ (16) and/or the server PS (18) to return the typical user response $UR_n$ (37), as the typical service and/or information response form $IS_n$ (39) at the user interface $I_n$ (14) having information and/or services in the responses $R_{n1}$ . . . $R_{nm}$ (32) to be sorted in ascending order first numerically, and then alphabetically, in the appropriate addressable query information groups $GI_{n1}$ . . . $GI_{nz}$ (63). Items having prices will be sorted numerically by price, with lowest price first. The labelled individual information groups $LL_{n11}$ . . . $LL_{nzu}$ (86) in the addressable query information groups $GI_{n1}$ . . . $GI_{nz}$ (63) are grouped and sorted in ascending order one with the other and labelled and/or identified and associated correspondingly with the responses $R_{n1}$ . . . $R_{nm}$ (32) from the servers $S_1$ . . . $S_z$ (20). The "Combined \$[a–z]" information and/or services may typically be incorporated into the appropriate addressable query information groups $GI_{n1}$ . . . $GI_{nz}$ (63) in accordance with the "Combined \$[a–z]" optional instructions $VJ_{n1}$ . . . $VJ_{nk}$ (52), and communicated in the other typical user response $UR_n$, as the typical service and/or information response form $IS_n$ at the user interface $I_n$, which may be communicated to the user $U_n$, as shown in FIGS. 145A–145G.

FIG. 146 shows yet another typical completed service and/or information entry request form $IF_n$ (230), at the user interface $I_n$ (14), having same and different ones of the typical queries $QQ_{n1}$ . . . $QQ_{nm}$ (53), different ones of the typical server addresses $AQ_{n1}$ . . . $AQ_{nm}$ (54), and the typical optional instructions $VJ_{n1}$ . . . $VJ_{nk}$ (52), with other sorting/grouping criteria selected, i.e., with Search Engine Results as "Combined \$[a–z]".

The typical optional instructions $VJ_{n1}$ . . . $VJ_{nk}$ (52) "Combined \$[a–z]" of FIG. 146 instruct the client $C_n$ (16) and/or the server PS (18) to return the typical user response $UR_n$ (37), as the typical service and/or information response form $IS_n$ (39) at the user interface $I_n$ (14) having information and/or services in the responses $R_{n1}$ . . . $R_{nm}$ (32) to be sorted in ascending order first numerically, and then alphabetically, in the appropriate addressable query information groups $GI_{n1}$ . . . $GI_{nz}$ (63). Items having prices will be sorted numerically by price, with lowest price first. The labelled individual information groups $LL_{n11}$ . . . $LL_{nm}$ (86) in the addressable query information groups $GI_{n1}$ . . . $GI_{nz}$ (63) are grouped and sorted in ascending order one with the other and labelled and/or identified and associated correspondingly with the responses $R_{n1}$ . . . $R_{nm}$ (32) from the servers $S_1$ . . . $S_z$ (20). The "Combined \$[a–z]" information and/or services may typically be incorporated into the appropriate addressable query information groups $GI_{n1}$ . . . $GI_{nz}$ (63) in accordance with the "Combined \$[a–z]" optional instructions $VJ_{n1}$ . . . $VJ_{nk}$ (52), and communicated in the other typical user response $UR_n$, as the typical service and/or information response form $IS_n$ at the user interface $I_n$, which may be communicated to the user $U_n$, as shown in FIGS. 147A–147G.

Each of the typical service and/or information entry request forms $IE_n$ at the user interface $I_n$, which the user $U_n$ may communicate other typical user input $UI_n$ into, of FIGS. 1–147 may also have news stories, which may be updated intermittently on a substantially routine basis.

The typical ones of the completed service and/or information entry request forms $IF_1$ . . . $IF_n$ (230) at the user interfaces $I_1$ . . . $I_n$ (14) shown in certain ones of the FIGS. 1–147 are typical examples of the completed service and/or information entry request forms $IF_1$ . . . $IF_n$ (230) at the user interfaces $I_1$ . . . $I_n$ (14), a much larger variety of which is possible. Typical queries $QQ_{n1}$ . . . $QQ_{nm}$ (53), typical server addresses $AQ_{n1}$ . . . $AQ_{nm}$ (54), and typical optional instructions $VJ_{n1}$ . . . $VJ_{nk}$ (52) in the typical ones of the completed service and/or information entry request forms $IF_1$ . . . $IF_n$ (230) at the user interfaces $I_1$ . . . $I_n$ (14) shown in certain ones of the FIGS. 1–147 are typical examples for illustrative purposes, and are not intended to limit the substantially infinite variety of the queries $QQ_{n1}$ . . . $QQ_{nm}$ (53), the server addresses $AQ_{n1}$ . . . $AQ_{nm}$ (54), and the optional instructions $VJ_{n1}$ . . . $VJ_{nk}$ (52) that may be entered into the service and/or information entry request forms $IE_1$ . . . $IE_n$ (38), to derive the completed service and/or information entry request forms $IF_1$ . . . $IF_n$ (230) at the user interfaces $I_1$ . . . $I_n$ (14). Likewise, names and/or links and/or other information incorporated in the typical ones of the completed service and/or information entry request forms $IF_1$ . . . $IF_n$ (230) shown in certain ones of the FIGS. 1–147 are for illustrative purposes, and are not intended to limit the large variety of the completed service and/or information entry request forms $IF_1$ . . . $IF_n$ (230) and the names and/or links and/or information that are possible, and that may be incorporated into the completed service and/or information entry request forms $IF_1$ . . . $IF_n$ (230) at the user interfaces $I_1$ . . . $I_n$ (14).

Any ones of the typical queries $QQ_{n1}$ . . . $QQ_{nm}$ (53), any values within the ranges allowable for the typical server addresses $AQ_{n1}$ . . . $AQ_{nm}$ (54), and any values allowable for the typical optional instructions $VJ_{n1}$ . . . $VJ_{nk}$ (52) may be incorporated into the typical ones of service and/or information entry request forms $IE_1$ . . . $IE_n$ (38) at the user interfaces $I_1$ . . . $I_n$ (14) shown in certain ones of the FIGS. 1–147, which the users $U_1$ . . . $U_n$ (12) enter to complete the typical ones of the completed service and/or information entry request forms $IF_1$ . . . $IF_n$ (230) at the user interfaces $I_1$ . . . $I_n$ (14) of shown in certain ones of the FIGS. 1–147.

Any values within the ranges allowable for "Search Engine Results"; "URL's per Search Engine"; "URL Details"; "Timeout (seconds) per Search Engine"; "Page"; "Searches per Group"; and "Group" may be incorporated into the typical ones of service and/or information entry request forms $IE_1$ . . . $IE_n$ (38) at the user interfaces $I_1$ . . . $I_n$ (14) shown in certain ones of the FIGS. 1–147, which the users $U_1$ . . . $U_n$ (12) enter to complete the typical ones of the completed service and/or information entry request forms $IF_1$ . . . $IF_n$ (230) at the user interfaces $I_1$ . . . $I_n$ (14) shown in certain ones of the FIGS. 1–147.

The users $U_1$ . . . $U_n$ (12), for example, may enter: the typical queries $QQ_{n1}$ . . . $QQ_{nm}$ (53); any values within the ranges allowable for the typical server addresses $AQ_{n1}$ . . . $AQ_{nm}$ (54); and any values allowable for the typical optional instructions $VJ_{n1}$ . . . $VJ_{nk}$ (52), such as, for example, any allowable "Search Engine Results"; "URL's per Search Engine"; "URL Details"; "Timeout (seconds) per Search Engine"; "Page"; "Searches per Group"; and "Group" into the typical ones of service and/or information entry request forms $IE_1$ . . . $IE_n$ (38) at the user interfaces $I_1$ . . . $I_n$ (14 shown in certain ones of the FIGS. 1–147, which the users $U_1$ . . . $U_n$ (12) enter to complete the typical ones of the completed service and/or information entry request forms $IF_1$ . . . $IF_n$ (230) at the user interfaces $I_1$ . . . $I_n$ (14). The typical ones of the user responses $UR_1$ . . . $UR_n$ (37), as typical service and/or information response forms $IS_1$ . . . $IS_n$

(39) at the user interfaces $I_1 \ldots I_n$ (14), may then be communicated to the corresponding ones of the users $U_1 \ldots U_n$ (12), accordingly. Certain ones of the FIGS. 1–147 show typical ones of the user responses $UR_1 \ldots UR_n$ (37), as the typical service and/or information response forms $IS_1 \ldots IS_n$ (39) at the user interfaces $I_1 \ldots I_n$ (14), which may be communicated to the corresponding ones of the users $U_1 \ldots U_n$ (12). The scope of the client-server multitasking system 10 of the present invention, the client-server multitasking process 99, and the multitasking process 104, however, is not limited to such values. Use of such values herein is meant only for illustrative purposes, in teaching certain aspects of the multitasking system 10 of the present invention, the client-server multitasking process 99, and the multitasking process 104 by example.

F. OPTIONAL DATABASE

The server PS (18) and/or the clients $C_1 \ldots C_n$ (16) may also incorporate corresponding additional optional responses $RA_{11} \ldots RA_{nm}$ (40) into the service and/or information responses $IR_1 \ldots IR_n$ (34), which may be obtained by accessing optional databases 41 and/or 42, shown in FIGS. 53A and 53B, which may be optionally resident within the server PS (18) and/or the clients $C_1 \ldots C_n$ (16), respectively.

The server PS (188) and/or the clients $C_1 \ldots C_n$ (16) may optionally store the responses $R_{11} \ldots R_{nm}$ (32) communicated from the servers $S_1 \ldots S_z$ (20), in accordance with the designation scheme corresponding to the server designations $S_{11} \ldots S_{nm}$ (30) in the optional databases 41 and/or 42, optionally resident within the server PS (18) and/or the clients $C_1 \ldots C_n$ (16), respectively, which may be optionally retrieved from the optional databases 41 and/or 42, and/or optionally incorporated into the service and/or information responses $IR_1 \ldots IR_n$ (34), and accessed as the additional optional responses $RA_{11} \ldots RA_{nm}$ (40).

The server PS (18) and/or the clients $C_1 \ldots C_n$ (16) may optionally communicate with the optional servers $SO_1 \ldots SO_p$ (22), and obtain information from each of the optional servers $SO_1 \ldots SO_p$ (22), which may also be stored in the optional databases 41 and/or 42, which may be optionally resident within the server PS (18) and/or the clients $C_1 \ldots C_n$ (16), respectively, and which may be optionally incorporated into the service and/or information responses $IR_1 \ldots IR_n$ (34), and accessed as the additional optional responses $RA_{11} \ldots RA_{nm}$ (40).

Each of the users $U_1 \ldots U_n$ (12) may optionally communicate corresponding additional optional requests $q_{11} \ldots q_{np}$ (44) through the corresponding user interfaces $I_1 \ldots I_n$ (14) and the corresponding clients $C_1 \ldots C_n$ (16) to the optional servers $SO_1 \ldots SO_p$ (22), based upon information in the service and/or information responses $IR_1 \ldots IR_n$ (34) and/or other information presented to and/or available and/or known to the users $U_1 \ldots U_n$ (12) through the corresponding user interfaces $I_1 \ldots I_n$ (14). The optional servers $SO_1 \ldots SO_p$ (22) reply to the clients $C_1 \ldots C_n$ (16) with corresponding responses $r_{11} \ldots r_{np}$ (46), which the clients $C_1 \ldots C_n$ (16) communicate through the corresponding user interfaces $I_1 \ldots I_n$ (14) to the corresponding user $U_1 \ldots U_n$ (12), as shown in FIG. 2 for typical ones of the requests $q_{11} \ldots q_{np}$ (44) and the corresponding responses $r_{11} \ldots r_{np}$ (46).

G. ADDITIONAL DETAILS

Now, in more detail, the clients $C_1 \ldots C_n$ (16) and the servers $S_1 \ldots S_z$ (20) reside on the network 24. The users $U_1 \ldots U_n$ (12) and the corresponding clients $C_1 \ldots C_n$ (16) communicate one with the other through the corresponding user interfaces $I_1 \ldots I_n$ (14). The user $U_1$ (12), thus, communicates with the client $C_1$ (16), one with the other, through the user interface $I_1$ (14); the user $U_2$ (12), thus, communicates with the client $C_2$ (16), one with the other, through the user interface $I_2$ (14); the user $U_n$ (12), thus, communicates with the client $C_n$ (16), one with the other, through the user interface $I_n$ (14); and so on. Any particular user, designated user $U_n$ (12), thus, communicates with corresponding client $C_n$ (16), one with the other, through corresponding user interface $I_n$ (14), as best shown later in FIGS. 54–56. The user $U_n$ (12) may be used to designate any one of the users $U_1 \ldots U_n$ (12); the user interface $I_n$ (14) may be used to designate any one of the user interfaces $I_1 \ldots I_n$ (14); the client $C_n$ (16) may be used to designate any one of the users clients $C_1 \ldots C_n$ (16); and so on. The client-server multitasking system 10 may also have the server PS (18) and the optional servers $SO_1 \ldots SO_p$ (22) residing on the network 24.

There may be n different or same the service and/or information requests $IQ_1 \ldots IQ_n$ (28) present on the network 24 at any time. Each of the service and/or information requests $IQ_1 \ldots IQ_n$ (28) may have one or more of the same and/or different requests $Q_{11} \ldots Q_{nm}$ (29) to be made of one or more of the same and/or different ones of the servers $S_1 \ldots S_z$ (20), which are called server designations $S_{11} \ldots S_{nm}$ (30), in accordance with the designation scheme which designates the servers $S_1 \ldots S_z$ (20) to be communicated with corresponding to the requests $Q_{11} \ldots Q_{nm}$ (29) as the corresponding server designations $S_{11} \ldots S_{nm}$ (30). The service and/or information request $IQ_n$ (28) may be used to designate any particular one of the service and/or information requests $IQ_1 \ldots IQ_n$ (28). Requests $Q_{n1} \ldots Q_{nm}$ (29) may be used to designate the particular requests $Q_{11} \ldots Q_{nm}$ (29) associated with and corresponding to the service and/or information request $IQ_n$ (28).

Each of the requests $Q_{11} \ldots Q_{1m}$ from the client $C_1$ (16) may each be different one from the other or the same; each of the requests $Q_{21} \ldots Q_{2m}$ from the client $C_2$ (16) may each be different one from the other or the same; and each of the requests $Q_{n1} \ldots Q_{nm}$ (29) from the client $C_n$ (16) may each be different one from the other or the same, and so on. The requests $Q_{11} \ldots Q_{1m}$ (29), the requests $Q_{21} \ldots Q_{2m}$ (29), and the requests $Q_{n1} \ldots Q_{nm}$ (29), thus, may each be different one from the other, or the same, and so on. The requests $Q_{11} \ldots Q_{nm}$ (29) from the clients $C_1 \ldots C_n$ (14), thus, may each be different, one from the other, or the same, and may be made of the same and/or different ones of the servers $S_1 \ldots S_z$ (20) at the same time and/or different times, in accordance with the corresponding server designations $S_{11} \ldots S_{nm}$ (30). There may be m different or same ones of the requests $Q_{n1} \ldots Q_{nm}$ (29) from the client $C_n$ (16) at any time, and n×m different and/or same ones of the requests $Q_{11} \ldots Q_{nm}$ (29) of the same and/or different ones of the servers $S_1 \ldots S_z$ (20) present on the network 24 at any time.

This designation format, in which the first alphanumeric subscript after the parameter of interest, for example, as in the parameters $Q_{n1} \ldots Q_{nm}$ representing the requests $Q_{n1} \ldots Q_{nm}$ (29), represents the particular parameters corresponding to the user $U_n$ (12), and the second alphanumeric subscript after the parameter of interest represents the $1^{st}$, $2^{nd}$, $3^{rd}$, through the mth one of the particular parameters, which will be used as a designation scheme throughout. In this particular instance, for example, there are then m distinctly the same and/or different ones of the requests $Q_{n1} \ldots Q_{nm}$ (29) associated with the nth user $U_n$, which is designated as the user $U_n$ (12). There are then the same and/or different m distinctly the same and/or different server designations $S_{n1} \ldots S_{nm}$ (30) associated with the nth user $U_n$, which is designated as the user $U_n$ (12). The same and/or different requests $Q_{n1} \ldots Q_{nm}$ (29), then, may be made of the same and/or different ones of the servers $S_1 \ldots S_z$ (20), in accordance with the designation scheme corresponding to the corresponding certain ones of the server designations $S_{n1} \ldots S_{nm}$ (30), associated with and corresponding to the user $U_n$ (12).

Each of the clients $C_1 \ldots C_n$ (16) may optionally also function as servers. Certain ones of the clients $C_1 \ldots C_n$ (16) may, therefore, function only as clients, while alternate ones of the clients $C_1 \ldots C_n$ (16) may function as clients and as servers. Each of the user interfaces $I_1 \ldots I_n$ (14) may be integral with the clients $C_1 \ldots C_n$ (16) or separate from the clients $C_1 \ldots C_n$ (16). Therefore, certain ones of the user interfaces $I_1 \ldots I_n$ (14) may be integral with the clients $C_1 \ldots C_n$ (16), while yet other ones of the user interfaces $I_1 \ldots I_n$ (14) may be separate from the clients $C_1 \ldots C_n$ (16).

The client-server multitasking system 10 of the present invention, the client-server multitasking process 99, and the multitasking process 104, the server PS (18) and/or the clients $C_1 \ldots C_n$ (16) are capable of retrieving, parsing, processing, formatting, organizing, grouping, sorting, and consolidating services and/or information from the same and/or different ones of the servers $S_1 \ldots S_z$ (20), and/or the optional servers $SO_1 \ldots SO_p$ (22), and/or the clients $C_1 \ldots C_n$ (16), having the same and/or different structures, formats, organizations, groupings, and/or data structures, and incorporating the parsed, processed, formatted, organized, grouped, sorted, and consolidated services and/or information into the user responses $UR_1 \ldots UR_n$ (37) for delivery to the user interfaces $I_1 \ldots I_n$ (14) and use by the users $U_1 \ldots U_n$ (12).

Now, the user interfaces $I_1 \ldots I_n$ (14) may each be different, one from the other, or the same, and may change characteristics over time. Each of the user interfaces $I_1 \ldots I_n$ (14) may change characteristics as a function of time, information, and/or instructions, and/or other means, which may be derived by the users $U_1 \ldots U_n$ (12) and/or the clients $C_1 \ldots C_n$ (16) and/or the servers $S_1 \ldots S_z$ (20), and/or the server PS (18), and/or the optional servers $SO_1 \ldots SO_p$ (22), and/or derived within the user interfaces $I_1 \ldots I_n$ (14). The user interface $I_1 \ldots I_n$ (14) may change state.

The user interface $I_1 \ldots I_n$ (14) may also change as a function of optional timers and/or timed instructions associated with the user interfaces $I_1 \ldots I_n$ (14), and/or associated with the clients $C_1 \ldots C_n$ (16) and/or associated with the servers $S_1 \ldots S_z$ (20), and/or associated with the server PS (18), and/or associated with the optional servers $SO_1 \ldots SO_p$ (22), and/or instructions from the user $U_1 \ldots U_n$ (12). Changes in the user interface $I_n$ (14) may appear continuous to the user $U_n$ (12), spaced in time, staccato, or static depending upon the optional timers and/or the timed instructions. Other conditions may change the user interface $I_1 \ldots I_n$ (14), as well.

The user interfaces $I_1 \ldots I_n$ (14) may be updated continuously, intermittently, manually, randomly, semi-automatically, automatically, repetitively, non-repetitively, singly, plurally, multiplexed, and/or a combination thereof or other suitable manner.

The user interfaces $I_1 \ldots I_n$ (14) may be visual, such as graphical user interfaces, aural, and/or tactile, a combination thereof, and/or other suitable means. The user interfaces $I_1 \ldots I_n$ (14) may be integral with the clients $C_1 \ldots C_n$ (16) or separate.

II. A PARTICULAR USER, USER INTERFACE, AND CLIENT ON THE NETWORK

A. Overview

FIGS. 54–56 show typical particular ones of the users $U_n$ (12), the corresponding ones of the user interfaces $U_n$ (12), the corresponding ones of the clients $C_n$ (16), the server PS (18), the servers $S_1 \ldots S_z$ (20) designated by the server designations $S_{n1} \ldots S_{mm}$ (30) corresponding to the requests $Q_{n1} \ldots Q_{nm}$ (29) associated with the corresponding ones of the users $U_n$ (12), and the optional servers $SO_1 \ldots SO_p$ (22) of the client-server multitasking system 10 of the present invention, which reside on the network 24. The user $U_n$ (12) communicates with the corresponding client $C_n$ (16) through the corresponding user interface $I_n$ (14).

The user $U_n$ (12) enters the corresponding user input $UI_n$ (25) having one or more same and/or different user requests $qu_{n1} \ldots qu_{nu}$ (26) into the user interface $I_n$ (14). The user requests $qu_{n1} \ldots qu_{nm}$ (26) are communicated from the user interface $I_n$ (14) to the client $C_n$ (16) within the user service and/or information request $iq_n$ (27), having the user requests $qu_{n1} \ldots qu_{nu}$ (26) and other optional information.

The user interface $I_n$ (14) communicates the user service and/or information request $iq_n$ (27) to the client $C_n$ (16), which optionally formats the corresponding user service and/or information request $iq_n$ (27) into the corresponding service and/or information request $IQ_n$ (28), as required. The service and/or information request $IQ_n$ (28) may have one or more the same and/or different requests $Q_{n1} \ldots Q_{nm}$ (29) to be made of the servers $S_1 \ldots S_z$ (20) designated by the server designations $S_{n1} \ldots S_{nm}$ (30) at the same time.

The client $C_n$ (16) may communicate the corresponding service and/or information request $IQ_n$ (28) to the server PS (18). The server PS (18) parses, processes and/or formats the service and/or information request $IQ_n$ (28) received from the client $C_n$ (16) into the certain requests $Q_{n1} \ldots Q_{nm}$ (29), and communicates the certain requests $Q_{n1} \ldots Q_{nm}$ (29) to the corresponding certain ones of the servers $S_1 \ldots S_z$ (20) designated by the server designations $S_{n1} \ldots S_{nm}$ (30), as shown for typical ones of the certain requests $Q_{n1} \ldots Q_{nm}$ (29) in FIG. 54.

The client $C_n$ (16) may alternatively parse, process and/or format the user service and/or information request $iq_n$ (27) into the alternate requests $Q_{n1} \ldots Q_{nm}$ (29), and communicate the alternate requests $Q_{n1} \ldots Q_{nm}$ (29) to the corresponding alternate ones of the servers $S_1 \ldots S_z$ (20) designated by the server designations $S_{n1} \ldots S_{nm}$ (30), as shown for typical alternate ones of the requests $Q_{n1} \ldots Q_{nm}$ (29) in FIG. 55.

The client $C_n$ (16) may alternatively communicate the corresponding other alternate one of the service and/or information request $IQ_n$ (28) to the server PS (18), which parses, processes and/or formats the other alternate one of the service and/or information request $IQ_n$ (28) into the other alternate ones of the requests $Q_{n1} \ldots Q_{nm}$ (29), and communicates the other alternate ones of the requests $Q_{n1} \ldots Q_{nm}$ (29) to the corresponding other alternate ones of the servers $S_{11} \ldots S_{nm}$ (30), and additionally the client $C_n$ (16) may also parse, process and/or format the user service and/or information request $iq_n$ (27) into yet other alternate ones of the requests $Q_{n1} \ldots Q_{nm}$ (29), and communicate the yet other alternate ones of the requests $Q_{n1} \ldots Q_{nm}$ (29) to the corresponding yet other alternate ones of the servers $S_{n1} \ldots S_{nm}$ (30), as shown for typical other alternate ones of the requests $Q_{n1} \ldots Q_{nm}$ (29) and typical yet other alternate ones of the requests $Q_{n1} \ldots Q_{nm}$ (29) in FIG. 56.

Each of the servers $S_1 \ldots S_z$ (20) designated by the server designations $S_{n1} \ldots S_{nm}$ (30) replies to the server PS (18) and/or the client $C_n$ (16), in accordance with the designation scheme corresponding to the corresponding certain ones of the server designations $S_{11} \ldots S_{nm}$ (30), accordingly, and communicates the corresponding responses $R_{n1} \ldots R_{nm}$ (32), associated with the requests $Q_{n1} \ldots Q_{nm}$ (29), to the server PS (18) and/or the client $C_n$ (16), accordingly. The server PS (18) and/or the client $C_n$ (16) parse, format, process, group, and organize the responses $R_{n1} \ldots R_{nm}$ (32) into the corresponding service and/or information response $IR_n$ (34) and/or the user service and/or information response $ir_n$ (36) having the corresponding parsed, processed, formatted, grouped, and organized service and/or information group $G_n$ (35) acceptable to the client $C_n$ (16) and the user interface $I_n$ (14). The server PS (18) communicates the service and/or information response $IR_n$ (34) to the client $C_n$ (16), as required.

The client $C_n$ (16) formats the service and/or information responses $IR_1 \ldots IR_n$ (34) into the corresponding user service and/or information response $ir_n$ (36), as required, and communicates the user service and/or information responses $ir_n$ (36) to the user interfaces $I_n$ (14). The user interface $I_n$ (14) incorporates the user service and/or information response $ir_n$ (36) into the user response $UR_n$ (37), which is communicated by the user interfaces $I_n$ (14) to the user $U_n$ (12).

The server PS (18) and/or the client $C_n$ (16) may optionally also incorporate the optional additional corresponding responses $RA_{n1} \ldots RA_{nm}$ (40) (shown later in FIGS. 59, 60, 63, and 64) into the service and/or information response $IR_n$ (34), which may be obtained by accessing the optional databases 41 and/or 42, which may be optionally resident within the server PS (18) and/or the client $C_n$ (16), respectively.

The server PS (18) and/or the client $C_n$ (16) communicate the service and/or information response $IR_n$ (34) through the user interface $I_n$ (14) to the user $U_n$ (12).

The server PS (18) and/or the clients $C_n$ (16) may optionally store the responses $R_{n1} \ldots R_{nm}$ (32) communicated from the servers $S_1 \ldots S_z$ (20) designated by the server designations $S_{n1} \ldots S_{nm}$ (30) in the optional databases 41 and/or 42, optionally resident within the server PS (18) and/or the client $C_n$ (16), respectively, which may be optionally retrieved from the optional databases 41 and/or 42, and/or optionally incorporated into the service and/or information response $IR_n$ (34), and accessed as the additional optional responses $RA_{n1} \ldots RA_{nm}$ (40).

The server PS (18) and/or the client $C_n$ (16) may optionally communicate with the optional servers $SO_1 \ldots SO_p$ (22), and obtain information from each of the optional servers $SO_1 \ldots SO_p$ (22), which may also be stored in the optional databases 41 and/or 42, which may be optionally resident within the server PS (18) and/or the client $C_n$ (16), respectively, and which may be optionally incorporated into the service and/or information response $IR_n$ (34), and accessed as the additional optional responses $RA_{n1} \ldots RA_{nm}$ (40).

The user $U_n$ (12) may optionally communicate the corresponding additional optional requests $q_{n1} \ldots q_{np}$ (44) through the user interface $I_n$ (14) and the client $C_n$ (16) to the optional servers $SO_1 \ldots SO_p$ (22), based upon information in the service and/or information response $IR_n$ (34) and/or other information presented to and/or available and/or known to the user $U_n$ (12) through the user interface $I_n$ (14). The optional servers $SO_1 \ldots SO_p$ (22) reply to the client $C_n$ (16) with the corresponding responses $r_{n1} \ldots r_{np}$ (46), which the client $C_n$ (16) communicates through the user interface $I_n$ (14) to the user $U_n$ (12), as shown in FIGS. 54–56 for typical ones of the requests $q_{n1} \ldots q_{np}$ (44) and the corresponding responses $r_{n1} \ldots r_{np}$ (46).

B. DIAGRAMMATIC REGROUPING

Now, in more detail, FIG. 57 shows a schematic representation of ones of the users $U_1 \ldots U_n$ (12), the corresponding user interfaces $I_1 \ldots I_n$ (14), the corresponding clients $C_1 \ldots C_n$ (16), the server PS (18), the servers $S_1 \ldots S_z$ (20), and the optional servers $SO_1 \ldots SO_p$ (22) of the client-server multitasking system 10 of the present invention, constructed in accordance with the present invention, which reside on the network 24, regrouped diagrammatically and alternatively named for illustrative purposes only, to illustrate and visualize possible typical communication paths. Other than FIG. 57, the nomenclature previously described and utilized will be used throughout.

Now, as shown in FIG. 57, for illustrative purposes only, ones of the clients $C_1 \ldots C_n$ (16) communicating with the server PS (18), as in FIG. 54, may optionally be designated clients $CA_1 \ldots CA_w$ (16A), and so on. Ones of the clients $C_1 \ldots C_n$ (16) communicating with the servers $S_1 \ldots S_z$ (20), as in FIG. 55, may optionally be designated clients $CB_1 \ldots CB_x$ (16B), and so on. Ones of the clients $C_1 \ldots C_n$ (16) communicating with the server PS (18) and with the servers $S_1 \ldots S_z$ (20), as in FIG. 56, may optionally be designated clients $CC_1 \ldots CC_y$ (16C), and so on.

The users $U_1 \ldots U_n$ (12) and the corresponding user interfaces $I_1 \ldots I_n$ (14) corresponding to the clients $C_1 \ldots C_n$ (16) may, likewise, optionally be designated in FIG. 57 only: correspondingly to the clients $CA_1 \ldots CA_w$ (16A), as users $UA_1 \ldots UA_w$ (12A) and user interfaces $IA_1 \ldots IA_w$ (14A), respectively; correspondingly to the clients $CB_1 \ldots CB_x$ (16B), as users $UB_1 \ldots UB_x$ (12B) and user interfaces $IB_1 \ldots IB_x$ (14B), respectively; and correspondingly to the clients $CC_1 \ldots CC_y$ (16C), as users $UC_1 \ldots UC_y$ (12C) and $IC_1 \ldots IC_y$ (14C), respectively.

The clients $C_1 \ldots C_n$ (16) being accounted for, the total of the clients $CA_1 \ldots CA_w$ (16A), $CB_1 \ldots CB_x$ (16B), and $CC_1 \ldots CC_y$ (16C) of FIG. 57 add up to n, where n may be any number greater or equal to one, such that the subscripts $$w+x+y=n.$$

III. A PARTICULAR SERVICE AND/OR INFORMATION REQUEST AND ASSOCIATED SERVICE AND/OR INFORMATION RESPONSE ON THE NETWORK

B. The Server PS (18)

FIG. 58 shows a typical particular one of the service and/or information requests $IQ_1 \ldots IQ_n$ (28), designated as the service and/or information request $IQ_n$ (28), having queries $QQ_{n1} \ldots QQ_{nm}$ (53), corresponding server addresses $AQ_{n1} \ldots AQ_{nm}$ (54), and optional instructions $VJ_{n1} \ldots VJ_{nk}$ (52). The server addresses $AQ_{n1} \ldots AQ_{nm}$ (54) and the optional instructions $VJ_{n1} \ldots VJ_{nk}$ (52) may be optional, and may depend upon the user interface $I_n$ (14), and/or other information resident within the server PS (18).

FIG. 59 shows the particular service and/or information request $IQ_n$ (28) parsed, processed, and/or formatted into current request group $QA_{nc}$ (50), request groups $QA_{n1}$ . . . $QA_{nz}$ (51), and optional instructions $VJ_{n1}$ . . . $VJ_{nk}$ (52), and utilization of information therefrom to make the requests $Q_{n1}$ . . . $Q_{nm}$ (29), obtain the responses $R_{n1}$ . . . $R_{nm}$ (32), and incorporate information therefrom into the particular service and/or information response $IR_n$ (34). The current request group $QA_{nc}$ (50) may be any particular one the request groups $QA_{n1}$ . . . $QA_{nz}$ (51), which may be selected by the user $U_n$ (12).

Upon receipt of the service and/or information requests $IQ_1$ . . . $IQ_n$ (28) at the server PS (18), communicated from the corresponding clients $C_1$ . . . $C_n$ (16), the server PS (18) parses, processes, and/or formats each of the service and/or information requests $IQ_1$ . . . $IQ_n$ (28) into the corresponding current request groups $QA_{1c}$ . . . $QA_{nc}$ (50) having corresponding queries $QQ_{11}$ . . . $QQ_{nm}$ (53) and corresponding server addresses $AQ_{11}$ . . . $AQ_{nm}$ (54) to open connections with and make the requests $Q_{11}$ . . . $Q_{nm}$ (29) of the servers $S_1$ . . . $S_z$ (20), in accordance with the designation scheme which designates the certain ones of the servers $S_1$ . . . $S_z$ (20) to be communicated with corresponding to the requests $Q_{11}$ . . . $Q_{nm}$ (29) as the corresponding server designations $S_{11}$ . . . $S_{nm}$ (30), shown for a particular one of the service and/or information requests $IQ_n$ (28) in FIG. 59.

The server PS (18) also parses, processes, and/or formats each of the service and/or information requests $IQ_1$ . . . $IQ_n$ (28) into the corresponding request groups $QA_{11}$ . . . $QA_{nz}$ (51) having corresponding other queries $QQ_{1a}$ . . . $QQ_{nz}$ (55) and corresponding other server addresses $AQ_{1a}$ . . . $AQ_{nz}$ (56), and the corresponding optional instructions $VJ_{111}$ . . . $VJ_{nk}$ (52), also shown for a particular one of the service and/or information requests $IQ_n$ (28) in FIG. 59.

The server PS (18) opens connections with and makes the requests $Q_{n1}$ . . . $Q_{nm}$ (29) of the servers $S_1$ . . . $S_z$ (20), in accordance with the designation scheme which designates the certain ones of the servers $S_1$ . . . $S_z$ (20) to be communicated with corresponding to the requests $Q_{n1}$ . . . $Q_{nm}$ (29) as the corresponding server designations $S_{11}$ . . . $S_{nm}$ (30), shown for the particular one of the service and/or information requests $IQ_n$ (28) corresponding to the corresponding queries $QQ_{n1}$ . . . $QQ_{nm}$ (53) and the corresponding server addresses $AQ_{n1}$ . . . $AQ_{nm}$ (54) in the current request group $QA_{nc}$ (50).

The servers $S_1$ . . . $S_z$ (20) corresponding to the server designations $S_{11}$ . . . $S_{nm}$ (30), designated in accordance with the designation scheme which designates the certain ones of the servers $S_1$ . . . $S_z$ (20) to be communicated with corresponding to the requests $Q_{n1}$ . . . $Q_{nm}$ (29) as the corresponding server designations $S_{11}$ . . . $S_{nm}$ (30), respond to the requests $Q_{n1}$ . . . $Q_{nm}$ (29) with the corresponding responses $R_{n1}$ . . . $R_{nm}$ (32).

The server PS (18) parses, and/or processes, and/or formats, and/or groups, and/or organizes each of the responses $R_{n1}$ . . . $R_{nm}$ (32) received from the servers $S_1$ . . . $S_z$ (20) corresponding to the server designations $S_{n1}$ . . . $S_{nm}$ (30) into corresponding addressable response information groups $RG_{n1}$ . . . $RG_{nm}$ (57).

The server PS (18) may also make additional optional requests $QP_{n1}$ . . . $QP_{nm}$ (58) of the optional database 41, which may be optionally resident within the server PS (18), and which may reply with the corresponding additional optional responses $RA_{n1}$ . . . $RA_{nm}$ (40). The server PS (18) parses, and/or processes, and/or formats, and/or groups, and/or organizes each of the additional optional responses $RA_{n1}$ . . . $RA_{nm}$ (40) into corresponding response information groups $RC_{n1}$ . . . $RC_{nm}$ (59).

Information from the current request group $QA_{nc}$ (50) having the corresponding queries $QQ_{n1}$ . . . $QQ_{nm}$ (53) and the corresponding server addresses $AQ_{n1}$ . . . $AQ_{nm}$ (54) is formulated into a corresponding request pointer/address group $QZ_n$ (60) having pointers/addresses $PG_{n1}$ . . . $PG_{nz}$ (61) associated therewith.

Each of the pointers/addresses $PG_{n1}$ . . . $PG_{nz}$ (61) are directed to point/address corresponding addressable query pointer/address groups $QG_{n1}$ . . . $QG_{nz}$ (62) associated therewith, which aid in obtaining information and/or services from certain ones of addressable response information groups $RG_{n1}$ . . . $RG_{nm}$ (57) to be incorporated into addressable query information groups $GI_{n1}$ . . . $GI_{nz}$ (63).

Grouping and/or sorting criteria may be incorporated into the optional instructions $VJ_{n1}$ . . . $VJ_{nk}$ (52), which may be entered into the user interface $I_n$ (14) through the user input $UI_n$ (25) by the user $U_n$ (12). Grouping and/or sorting criteria may additionally and/or alternatively be optionally resident within the server PS (18) and/or the client $C_n$ (16).

The grouping and/or sorting criteria gives the user $U_n$ (12) the ability to formulate the query information groups $GI_{n1}$ . . . $GI_{nz}$ (63) and the way in which the information and/or services from the addressable response information groups $RG_{n1}$ . . . $RG_{nm}$ (57) is presented to the user $U_n$ (12) through the user interface $I_n$ (14).

Each of the addressable query pointer/address groups $QG_{n1}$ . . . $QG_{nz}$ (62) are associated with the corresponding ones of the addressable query information groups $GI_{n1}$ . . . $GI_{nz}$ (63). The addressable query pointer/address group $QG_{n1}$ (62) is, thus, associated with the addressable query information group $GI_{n1}$ (63); the addressable query pointer/address group $QG_{n2}$ (62) is, thus, associated with the addressable query information group $GI_{n2}$ (63); the addressable query pointer/address group $QG_{nz}$ (62) is, thus, associated with the addressable query information group $GI_{nz}$ (63), and so on.

Each of the addressable query pointer/address groups $QG_{n1}$ . . . $QG_{nz}$ (62) is formulated based upon the grouping and/or sorting criteria, which may be incorporated into the optional instructions $VJ_{n1}$ . . . $VJ_{nk}$ (52), and/or which may additionally and/or alternatively optionally be resident within the server PS (18) and/or the client $C_n$ (16), and/or information within the current request group $QA_{nc}$ (50).

Each of the addressable query pointer/address groups $QG_{n1}$ . . . $QG_{nz}$ (62) has pointers/addresses $PP_{n11}$ . . . $PP_{nmr}$ (64) directed to address/point information in the addressable response information groups $RG_{n1}$ . . . $RG_{nm}$ (57) based upon the grouping and/or sorting criteria, which may be incorporated into the optional instructions $VJ_{n1}$ . . . $VJ_{nk}$ (52), and/or which may additionally and/or alternatively optionally be resident within the server PS (18) and/or the client $C_n$ (16), and/or the corresponding queries $QQ_{n1}$ . . . $QQ_{nm}$ (53), and/or the corresponding server addresses $AQ_{n1}$ . . . $AQ_{nm}$ (54) within the current request group $QA_{nc}$ (50).

Information and/or services within each of the addressable response information groups $RG_{n1}$ . . . $RG_{nm}$ (57) is addressed with the pointers/addresses $PP_{n11}$ . . . $PP_{nmr}$ (64) from the query pointer/address groups $QG_{n1}$ . . . $QG_{nz}$ (62), and the information and/or services from the addressable response information groups $RG_{n1}$ . . . $RG_{nm}$ (57) is incorporated into the addressable query information groups $GI_{n1}$ . . . $GI_{nz}$ (63) corresponding to the pointers/addresses $PP_{n11}$ . . . $PP_{nmr}$ (64), which are formulated by the addressable query pointer/address groups $QG_{n1} \ldots QG_{nz}$ (62), in accordance with the grouping and/or sorting criteria.

The corresponding other queries $QQ_{nm} \ldots QQ_{nz}$ (55) and the corresponding other server addresses $AQ_{nm} \ldots AQ_{nz}$ (56) in the corresponding request groups $QA_{n1} \ldots QA_{nz}$ (51) may be used for other ones of the requests $Q_{n1} \ldots Q_{nm}$ (29), and may be incorporated into the service and/or information response $IR_n$ (34), as part of other information $OI_n$ (65), for further use.

Each of the addressable query information groups $GI_{n1} \ldots GI_{nz}$ (63) is incorporated into the service and/or information group $G_n$ (35). The service and/or information group $G_n$ (35) and the other information $OI_n$ (65) are incorporated into the service and/or information response $IR_n$ (34).

The optional instructions $VJ_{n1} \ldots VJ_{nk}$ (52) may be used by the server PS (18) in making the requests $Q_{n1} \ldots Q_{nm}$ (29) and/or the additional optional requests $QP_{n1} \ldots QP_{nm}$ (58) of the optional database 41, and/or in processing, formatting, grouping, and organizing the responses $R_{n1} \ldots R_{nm}$ (32) from the ones of the servers $S_1 \ldots S_z$ (20) corresponding to the server designations $S_{n1} \ldots S_{nm}$ (30), and/or the additional optional responses $RA_{n1} \ldots RA_{nm}$ (40), into the corresponding service and/or information responses $IR_1 \ldots IR_n$ (34), for grouping and/or sorting criteria instructions, and/or may be used for other purposes.

FIG. 60 is a schematic representation of the particular service and/or information request $IQ_n$ (28) parsed, processed, and/or formatted into a current request group $QA_n$ (50), request groups $QA_{n1} \ldots QA_{nz}$ (51), and corresponding optional instructions $VJ_{n1} \ldots VJ_{nk}$ (52), and utilization of information therefrom to make the requests $Q_{n1} \ldots Q_{nm}$ (29), obtain the responses $R_{n1} \ldots R_{nm}$ (32), and incorporate information therefrom into the particular service and/or information response $IR_n$ (34), having simpler grouping/sorting that may be used additionally and/or alternatively to that of FIG. 59.

The user $U_n$ (12) is typically given the option through the optional instructions $VJ_{n1} \ldots VJ_{nk}$ (52) as to the grouping and/or sorting criteria to be entered into the user interface $I_n$ (14) through the user input $UI_n$ (25) by the user $U_n$ (12). The user $U_n$ (12) is typically given the choice as to the grouping and/or sorting criteria to be used as in FIG. 59, and/or the grouping and/or sorting criteria of FIG. 60.

Information from the current request group $QA_{nc}$ (50) having the corresponding queries $QQ_{n1} \ldots QQ_{nm}$ (53) and the corresponding server addresses $AQ_{n1} \ldots AQ_{nm}$ (54) is formulated into a corresponding request pointer/address group $QY_n$ (68) having pointers/addresses $PF_{n11} \ldots PF_{nmr}$ (69) associated therewith, as shown in FIG. 60.

Each of the pointers/addresses $PF_{n11} \ldots PF_{nmr}$ (69) are directed to point/address the corresponding addressable response information groups $RG_{n1} \ldots RG_{nm}$ (57), and aid in obtaining information and/or services from the corresponding addressable response information groups $RG_{n1} \ldots RG_{nm}$ (57) to be incorporated into the addressable query information groups $GI_{n1} \ldots GI_{nz}$ (63), as shown in FIG. 60.

The grouping and/or sorting criteria allow the user $U_n$ (12) to direct the server PS (18) and/or the client $C_n$ (16) to sort information and/or services from the responses $R_{n1} \ldots R_{nm}$ (32) and/or the additional optional responses $RA_{n1} \ldots RA_{nm}$ (40) from the optional database 41, such as, for example, by category, query, group, page, order of importance, ascending and/or descending order, alphabetically and/or numerically, value, price, and/or other characteristics, and/or to combine and/or interleave the information and/or services from the responses $R_{n1} \ldots R_{nm}$ (32) and/or the additional optional responses $RA_{n1} \ldots RA_{nm}$ (40) one with the other, such as, for example, by order of relevance and/or other parameters.

FIG. 61 shows the particular service, and/or information response $IR_n$ (34) having a service and/or information group $G_n$ (35), additional request links $SL_{n1} \ldots SL_{nw}$ (71), optional order form 72, optional additional advertisements and/or links 73, optional hidden information 74, and the optional service and/or information entry request form $IE_n$ (38).

The service and/or information group $G_n$ (35) has the query information groups $GI_{n1} \ldots GI_{nz}$ (63), optional database response groups 75, and optional additional advertisements and/or links 76.

The additional request links $SL_{n1} \ldots SL_{nw}$ (71) allow the user $U_n$ (12) to make additional optional selections, based upon information and/or services previously requested by the user $U_n$ (12). The additional request links $SL_{n1} \ldots SL_{nw}$ (71), which are optional, may typically have Current Group/Next Group/Previous Group/Group Number Links, Server Names in Each Group, Queries in Each Group, Current Page/Next Page/Previous Page/Page Number Links, Search Display/Link and/or Description Placement/Interleave/Separate, and Link Description Options/Summary/Minimize. Other additional ones of the additional requests links $SL_{n1} \ldots SL_{nw}$ (71) and/or combinations thereof may also be incorporated into the service and/or information response $IR_n$ (34).

the optional order form 72 allows direct placement and/or confirmation of orders and/or purchases with the servers S=hd 1 . . . $S_z$ (20) and/or the optional servers $SO_1 \ldots SO_p$ (22), which reside on the network 24. The user $U_n$ (12) may enter the order placement into the user interface $I_n$ (14) through the user input $UI_n$ (25), and receive order confirmation through the user interface $I_n$ (14). The client $C_n$ (16) may communicate the order placement from the user interface $I_n$ (14) to the server PS (18), which may communicate the order placement to the servers $S_1 \ldots S_z$ (20) and/or the optional servers $SO_1 \ldots SO_p$ (22). The server PS (18) may alternatively and/or additionally communicate the order confirmation received from the servers $S_1 \ldots S_z$ (20) and/or the optional servers $SO_1 \ldots SO_p$ (22) to the client $C_n$ (16), which may communicate the order confirmation to the user interface $I_n$ (14) for presentation to the user $U_n$ (12). The order placement and/or the order confirmation may be stored within the server PS (18) and/or the client $C_n$ (16). The order placement and/or the order confirmation is typically secure, and may be encrypted, and is typically communicated using secure communications means.

C. CERTAIN ONES OF THE CLIENTS

Certain ones of the clients $C_1 \ldots C_n$ (16) may alternatively and/or additionally make the requests $Q_{11} \ldots Q_{nm}$ (29) of the servers $S_1 \ldots S_z$ (20), in accordance with the designation scheme which designates the certain ones of the servers $S_1 \ldots S_z$ (20) to be communicated with corresponding to the requests $Q_{11} \ldots Q_{nm}$ (29), and formulate the corresponding user service and/or information response $ir_1 \ldots ir_n$ (36), as previously described.

FIG. 62 shows a typical particular one of the user service and/or information requests $iq_1 \ldots iq_n$ (27), designated as the user service and/or information request $iq_n$ (27), having the queries $QQ_{n1} \ldots Q_{nm}$ (53), the corresponding server addresses $AQ_{n1} \ldots AQ_{nm}$ (54), and the optional instructions $VJ_{n1} \ldots VJ_{nk}$ (52). The server addresses $AQ_{n1} \ldots AQ_{nm}$ (54) and the optional instructions $VJ_{n1} \ldots VJ_{nk}$ (52) may be optional, and may depend upon the user interface $I_n$ (14), and/or other information resident within the client $C_n$ (16).

FIG. 63 shows the particular user service and/or information request $iq_n$ (27) parsed, processed, and/or formatted into the current request group $QA_{nc}$ (50), the request groups $QA_{n1} \ldots QA_{nz}$ (51), and the corresponding optional instructions $VJ_{n1} \ldots VJ_{nk}$ (52), and utilization of information therefrom to make the requests $Q_{n1} \ldots Q_{nm}$ (29), obtain the responses $R_{n1} \ldots R_{nm}$ (32), and incorporate information therefrom into the particular user service and/or information response $ir_n$ (36);

The server PS (18) makes the requests $Q_{11} \ldots Q_{nm}$ (29) of the servers $S_1 \ldots S_z$ (20), in accordance with the designation scheme which designates the certain ones of the servers $S_1 \ldots S_z$ (20) to be communicated with corresponding to the requests $Q_{11} \ldots Q_{nm}$ (29) as the corresponding server designations $S_{11} \ldots S_{nm}$ (30), as shown in FIG. 59, and certain ones of the clients $C_1 \ldots C_n$ (16) may additionally and/or alternatively make the requests $Q_{11} \ldots Q_{nm}$ (29) of the servers $S_1 \ldots S_z$ (20), in accordance with the designation scheme which designates the certain ones of the servers $S_1 \ldots S_z$ (20) to be communicated with corresponding to the requests $Q_{11} \ldots Q_{nm}$ (29) as the corresponding server designations $S_{11} \ldots S_{nm}$ (30), as shown in FIG. 63.

The clients $C_n$ (16) may parse, process, and/or format the user service and/or information requests $iq_n$ (27) and/or organize and/or group information and/or services from the addressable response information groups $RG_{n1} \ldots RG_{nm}$ (57) into the addressable query information groups $GI_{n1} \ldots GI_{nz}$ (63) substantially the same as the server PS (18) parses, processes, and/or formats the service and/or information requests $IQ_n$ (28) from the addressable response information groups $RG_{n1} \ldots RG_{nm}$ (57) into the addressable query information groups $GI_{n1} \ldots GI_{nz}$ (63), except that the client $C_n$ (16) may organize the addressable query information groups $GI_{n1} \ldots GI_{nz}$ (63) into the user service and/or information response $ir_n$ (36), as in FIG. 63, and the server PS (18) organizes the addressable query information groups $GI_{n1} \ldots GI_{nz}$ (63) into the corresponding service and/or information response $IR_n$ (34), as in FIG. 59.

Upon receipt of the user service and/or information requests $iq_1 \ldots iq_n$ (27) at the corresponding clients $C_1 \ldots C_n$ (16), certain ones of the corresponding clients $C_1 \ldots C_n$ (16) may parse, process, and/or format the corresponding user service and/or information requests $iq_1 \ldots iq_n$ (27) into the corresponding current request groups $QA_{1c} \ldots QA_{nc}$ (50) having the corresponding queries $QQ_{11} \ldots QQ_{nm}$ (53) and the corresponding server addresses $AQ_{11} \ldots AQ_{nm}$ (54) to open connections with and make the requests $Q_{11} \ldots Q_{nm}$ (29) of the servers $S_1 \ldots S_z$ (20), in accordance with the designation scheme which designates the certain ones of the servers $S_1 \ldots S_z$ (20) to be communicated with corresponding to the requests $Q_{11} \ldots Q_{nm}$ (29) as the corresponding server designations $S_{11} \ldots S_{nm}$ (30), shown for a particular one of the user service and/or information requests $iq_1 \ldots iq_n$ (27) in FIG. 63.

The corresponding clients $C_1 \ldots C_n$ (16) may also parse, process, and/or format the corresponding user service and/or information response $ir_1 \ldots ir_n$ (36) into the corresponding request groups $QA_{11} \ldots QA_{nz}$ (51) having the corresponding other queries $QQ_{1a} \ldots QQ_{nz}$ (56) and the corresponding optional instructions $VJ_{111} \ldots VJ_{nk}$ (52), also shown for a particular one of the user service and/or information request $iq_n$ (27) in FIG. 63.

A particular one of the corresponding clients $C_1 \ldots C_n$ (16), designated as the client $C_n$ (16), may open connections with and make the requests $Q_{n1} \ldots Q_{nm}$ (29) of the servers $S_1 \ldots S_z$ (20), in accordance with the designation scheme which designates the certain ones of the servers $S_1 \ldots S_z$ (20) to be communicated with corresponding to the requests $Q_{n1} \ldots Q_{nm}$ (29) as the corresponding server designations $S_{11} \ldots S_{nm}$ (30), shown for the particular one of the user service and/or information requests $iq_n$ (27) corresponding to the corresponding queries $QQ_{n1} \ldots QQ_{nm}$ (53) and the corresponding server addresses $AQ_{n1} \ldots AQ_{nm}$ (54) in the current request group $QA_{nc}$ (50).

The servers $S_1 \ldots S_z$ (20) corresponding to the server designations $S_{11} \ldots S_{nm}$ (30), designated in accordance with the designation scheme which designates the certain ones of the servers $S_1 \ldots S_z$ (20) to be communicated with corresponding to the requests $Q_{n1} \ldots Q_{nm}$ (29) as the corresponding server designations $S_{11} \ldots S_{nm}$ (30), respond to the requests $Q_{n1} \ldots Q_{nm}$ (29) with the corresponding responses $R_{n1} \ldots R_{nm}$ (32).

The client $C_n$ (16) may parse, and/or process, and/or format, and/or group, and/or organize each of the responses $R_{n1} \ldots R_{nm}$ (32) received from the servers $S_1 \ldots S_z$ (20) corresponding to the server designations $S_{n1} \ldots S_{nm}$ (30) into the corresponding addressable response information groups $RG_{n1} \ldots RG_{nm}$ (57).

The client $C_n$ (16) may also make additional optional requests $QP_{n1} \ldots QP_{nm}$ (58) of the optional database 42, which may be optionally resident within the client $C_n$ (16), and which may reply with the corresponding additional optional responses $RA_{n1} \ldots RA_{nm}$ (40). The client $C_n$ (16) may parse, and/or process, and/or format, and/or group, and/or organize each of the additional optional responses $RA_{n1} \ldots RA_{nm}$ (40) into the corresponding response information groups $RC_{n1} \ldots RC_{nm}$ (59).

Now again, for the client $C_n$ (16), information from the current request group $QA_{nc}$ (50) having the corresponding queries $QQ_{n1} \ldots QQ_{nm}$ (53) and the corresponding server addresses $AQ_{n1} \ldots AQ_{nm}$ (54) is formulated into the corresponding request pointer/address group $QZ_n$ (60) having the pointers/addresses $PG_{n1} \ldots PG_{nz}$ (61) associated therewith.

Now again, for the client $C_n$ (16), each of the pointers/addresses $PG_{n1} \ldots PG_{nz}$ (61) are directed to point/address the corresponding addressable query pointer/address groups $QG_{n1} \ldots QG_{nz}$ (62) associated therewith, which aid in obtaining information and/or services from certain ones of the addressable response information groups $RG_{n1} \ldots RG_{nm}$ (57) to be incorporated into the addressable query information groups $GI_{n1} \ldots GI_{nz}$ (63).

Yet again, for the client $C_n$ (16), grouping and/or sorting criteria may be incorporated into the optional instructions $VJ_{n1} \ldots VJ_{nk}$ (52), which may be entered into the user interface $I_n$ (14) through the user input $UI_n$ (25) by the user $U_n$ (12). Grouping and/or sorting criteria may additionally and/or alternatively optionally resident within the server PS (18) and/or the client $C_n$ (16).

Now again, the grouping and/or sorting criteria gives the user $U_n$ (12) the ability to formulate the query information groups $GI_{n1} \ldots GI_{nz}$ (63) and the way in which information from the addressable response information groups $RG_{n1} \ldots RG_{nm}$ (57) is presented to the user $U_n$ (12) through the user interface $I_n$ (14).

Now again, for the client $C_n$ (16), each of the addressable query pointer/address groups $QG_{n1} \ldots QG_{nz}$ (62) are associated with the corresponding ones of the addressable query information groups $GI_{n1} \ldots GI_{nz}$ (63). Each of the addressable query pointer/address groups $QG_{n1} \ldots QG_{nz}$ (62) is formulated base upon the grouping and/or sorting criteria, which may be incorporated into the optional instructions $VJ_{n1} \ldots VJ_{nk}$ (52), and/or which may additionally and/or alternatively optionally be resident within the server PS (18) and/or the client $C_n$ (16), and/or information within the current request group $QA_{nc}$ (50).

Now again, for the client $C_n$ (16), each of the addressable query pointer/address groups $QG_{n1}$ . . . $QG_{nz}$ (62) has pointers/addresses $PP_{n11}$ . . . $PP_{nmr}$ (64) directed to address/point services and/or information in the addressable response information groups $RG_{n1}$ . . . $RG_{nm}$ (57) based upon the grouping and/or sorting criteria, which may be incorporated into the optional instructions $VJ_{n1}$. . . $VJ_{nk}$ (52), and/or which may additionally and/or alternatively optionally be resident within the server PS (18) and/or the client $C_n$ (16) and/or the corresponding queries $QQ_{n1}$ . . . $QQ_{nm}$ (53), and/or the corresponding server addresses $AQ_{n1}$ . . . $AQ_{nm}$ (54) within the current resident group $QA_{nc}$ (50).

Yet again, for the client $C_n$ (16), the information and/or services in each of the addressable response information groups $RG_{n1}$ . . . $RG_{nm}$ (57) is addressed with the pointers/addresses $PP_{n11}$ . . . $PP_{nmr}$ (64) from the query pointer/address groups $QG_{n1}$ . . . $QG_{nz}$ (62), and information and/or services from the addressable response information groups $RG_{n1}$ . . . $RG_{nm}$ (57) is incorporated into the addressable query information groups $GI_{n1}$ . . . $GI_{nz}$ (63) corresponding to the pointer/addresses $PP_{n11}$ . . . $PP_{nmr}$ (64), which are formulated by the addressable query pointer/address groups $QG_{n1}$ . . . $QG_{nz}$ (62), in accordance with the grouping and/or sorting criteria.

Yet again, for the client $C_n$ (16), the corresponding other queries $QQ_{na}$ . . . $QQ_{nz}$ (55) and the corresponding other server addresses $AQ_{na}$ . . . $AQ_{nz}$ (56) in the corresponding request groups $QA_{n1}$ . . . $QA_{nz}$ (51) may be used for other ones of the requests $Q_{n1}$ . . . $Q_{nm}$ (29), and may be incorporated into the user service and/or information response $ir_n$ (36), as part of other information $OI_n$ (65), for future use.

Now again, for the client $C_n$ (16), each of the addressable query information groups $GI_{n1}$ . . . $GI_{nz}$ (63) is incorporated into the service and/or information group $G_n$ (35). The service and/or information group $G_n$ (35) and the other information $OI_n$ (65) are incorporated into the service and/or information response $IR_n$ (34).

The optional instructions $VJ_{n1}$ . . . $VJ_{nk}$ (52) may be used by the client $C_n$ (16), in making the requests $Q_{n1}$ . . . $Q_{nm}$ (29) and/or the additional optional requests $QP_{n1}$ . . . $QP_{nm}$ (58) of the optional database 42, and/or in processing, formatting, grouping, and organizing the responses $R_{n1}$ . . . $R_{nm}$ (32) from the ones of the servers $S_1$ . . . $S_z$ (20) corresponding to the server designations $S_{n1}$ . . . $S_{nm}$ (30), and/or the additional optional responses $RA_{n1}$ . . . $RA_{nm}$ (40), into user service and/or information response $ir_n$ (36), for grouping and/or sorting criteria instructions, and/or may be used for other purposes.

FIG. 64 is a schematic representation of the particular user service and/or information request $iq_n$ (27) parsed, processed, and/or formatted into the current request group $QA_{nc}$ (50), the request groups $QA_{n1}$ . . . $QA_{nz}$ (51), and the corresponding optional instructions $VJ_{n1}$ . . . $VJ_{nk}$ (52), and utilization of information therefrom to make the requests $Q_{n1}$ . . . $Q_{nm}$ (29), obtain the responses $R_{n1}$ . . . $R_{nm}$ (32), and incorporate information therefrom into the particular user service and/or information response $ir_n$ (36), having simpler grouping/sorting that may be used additionally and/or alternatively to that of FIG. 63.

The user $U_n$ (12) is typically given the option through the optional instructions $VJ_{n1}$ . . . $VJ_{nk}$ (52) as to the grouping and/or sorting criteria to be entered into the user interface $I_n$ (14) through the user input $UI_n$ (25) by the user $U_n$ (12). The user $U_n$ (12) is typically given the choice as to the grouping and/or sorting criteria of FIG. 63, and/or the grouping and/or sorting criteria of FIG. 64.

Now again, the client $C_n$ (16) may parse, process, and/or format the user service and/or information requests $iq_n$ (27) and/or organize and/or group information and/or services from the addressable response information groups $RG_{n1}$ . . . $RG_{nm}$ (57) into the addressable query information groups $GI_{n1}$ . . . $GI_{nz}$ (63) substantially the same as the server PS (18) parses, processes, and/or formats the service and/or information requests $IQ_n$ (28) from the addressable response information groups $RG_{n1}$ . . . $RG_{nm}$ (57) into the addressable query information groups $GI_{n1}$ . . . $GI_{nz}$ (63), except that the client $C_n$ (16) may organize the addressable query information groups $GI_{n1}$ . . . $GI_{nz}$ (63) into the user service and/or information response $ir_n$ (36), as in FIG. 64, and the server PS (18) organizes the addressable query information groups $GI_{n1}$ . . . $GI_{nz}$ (63) into the corresponding service and/or information response $IR_n$ (34), as in FIG. 60.

Now again, for the client $C_n$ (16), information from the current request group $QA_{nc}$ (50) having the corresponding queries $QQ_{n1}$ . . . $QQ_{nm}$ (53) and the corresponding server addresses $AQ_{n1}$ . . . $AQ_{nm}$ (54) is formulated into the corresponding request pointer/address group $QY_n$ (68) having the pointers/addresses $PF_{n11}$ . . . $PF_{nmr}$ (69) associated therewith, as shown in FIG. 64.

Now again, for the client $C_n$ (16), each of the pointers/addresses $PF_{n11}$ . . . $PF_{nmr}$ (69) are directed to point/address the corresponding addressable response information groups $RG_{n1}$ . . . $RG_{nm}$ (57), and aid in obtaining information and/or services from the corresponding addressable response information groups $RG_{n1}$ . . . $RG_{nm}$ (57) to be incorporated into the addressable query information groups $GI_{n1}$ . . . $GI_{nz}$ (63), as shown in FIG. 64.

Again, the grouping and/or sorting criteria allow the user $U_n$ (12) to direct the server PS (18) and/or the client $C_n$ (16) to sort information and/or services from the responses $R_{n1}$ . . . $R_{nm}$ (32) and/or the additional optional responses $RA_{n1}$ . . . $RA_{nm}$ (40) from the optional database 41, such as, for example, by category, query, group, page, order of importance, ascending and/or descending order, alphabetically and/or numerically, value, price, and/or other characteristics, and/or to combine and/or interleave the information and/or services from the responses $R_{n1}$ . . . $R_{nm}$ (32) and/or the additional optional responses $RA_{n1}$ . . . $RA_{nm}$ (40) one with the other, such as, for example, by order of relevance and/or other parameters.

FIG. 65 shows the particular user service and/or information response $ir_n$ (36) having the service and/or information group $G_n$ (35), the additional request links $SL_{n1}$ . . . $SL_{nw}$ (71), the optional order form 72, the optional additional advertisements and/or links 73, the optional hidden information 74, and the optional service and/or information entry request form $IE_n$ (38).

Now again, the service and/or information group $G_n$ (35) has the query information groups $GI_{n1}$ . . . $GI_{nz}$ (63), the optional database response groups 75, and the optional additional advertisements and/or links 76.

Yet again, the additional request links $SL_{n1}$ . . . $SL_{nw}$ (71) allow the user $U_n$ (12) to make additional optional selections, based upon information and/or services previously requested by the user $U_n$ (12). The additional request links $SL_{n1}$ . . . $SL_{nw}$ (71), which are optional, may typically have Current Group/Next Group/Previous Group/Group Number Links, Server Names in Each Group, Queries in Each Group, Current Page/Next Page/Previous Page/Page Number Links, Search Display/Link and/or Description Placement/Interleave/Separate, and Link Description Options/Summary/Minimize. Other additional ones of the additional request links $SL_{n1} \ldots SL_{nw}$ (71) and/or combination thereof may also be incorporated into the user service and/or information response $ir_n$ (36).

Now again, for the client $C_n$ (16), the optional order form 72 allows direct placement and/or confirmation of order and/or purchases with the servers $S_1 \ldots S_z$ (20) and/or the optional servers $SO_1 \ldots SO_p$ (22), which reside on the network 24. The user $U_n$ (12) may enter the order placement into the user interface $I_n$ (14) through the user input $UI_n$ (25), and receive order confirmation through the user interface $I_n$ (14). The client $C_n$ (16) may communicate the order placement from the user interface $I_n$ (14) to the servers $S_1 \ldots S_z$ (20) and/or the optional servers $SO_1 \ldots SO_p$ (22), and/or receive the order confirmation therefrom, and communicate the order confirmation from the servers $S_1 \ldots S_z$ (20) and/or the optional servers $SO_1 \ldots SO_p$ (22) to the user interface $I_n$ (14) for presentation to the user $U_n$ (12). The order placement and/or the order confirmation may be stored within the server PS (18) and/or the client $C_n$ (16). The order placement and/or the order confirmation is typically secure, and may be encrypted, and is typically communicated using secure communication means.

D. FORMULATING QUERY INFORMATION GROUPS

Each of the particular addressable response information groups $RG_{n1} \ldots RG_{nm}$ (57), designated as the addressable response information group $RG_{nm}$ (57), has optional addressable individual information groups $LG_{nm1} \ldots LG_{nmr}$ (80), which may be addressed with the pointers/addresses $PP_{nm1} \ldots PP_{nmr}$ (64), as shown in FIGS. 59, 63, 66A, 66B, and 66C.

Each of the addressable response information groups $RG_{n1} \ldots RG_{nm}$ (57) and each of the optional addressable individual information groups $LG_{n11} \ldots LG_{nmr}$ (80) in each of the addressable response information groups $RG_{n1} \ldots RG_{nm}$ (57) may be addressed with the pointers/addresses $PP_{n11} \ldots PP_{nmr}$ (64).

Now again, the addressable response information group $RG_{nm}$ (57) has the optional addressable individual information groups $LG_{nm1} \ldots LG_{nmr}$ (80), which may be addressed with the pointers/addresses $PP_{nm1} \ldots PP_{nmr}$ (64). Each of the addressable individual information groups $LG_{nm1} \ldots LG_{nmr}$ (80) in the addressable response information group $RG_{nm}$ (57) may be pointed/addressed by the server PS (18) and/or the client $C_n$ (16) to retrieve all and/or a portion and/or combinations of specific ones of the addressable individual information groups $LG_{nm1} \ldots LG_{nmr}$ (80), from the addressable response information group $RG_{nm}$ (57), and incorporate information and/or services from the addressable individual information groups $LG_{nm1} \ldots LG_{nmr}$ (80) into certain ones of the addressable query information groups $GI_{n1} \ldots GI_{nz}$ (63), in accordance with the grouping and/or sorting criteria addressing scheme.

The addressable response information group $RG_{nm}$ (57) having the optional addressable individual information groups $LG_{nm1} \ldots LG_{nmr}$ (80) may have optional addressable pointer/address indices $IN_{nm1} \ldots IN_{nmr}$ (81) correspondingly associated with the optional addressable individual information groups $LG_{nm1} \ldots LG_{nmr}$ (80), which may be addressed/pointed with the pointers/addresses $PP_{nm1} \ldots PP_{nmr}$ (64), and which may be pointed/addressed by the server PS (18) and/or the client $C_n$ (16) to retrieve all and/or a portion and/or combinations of specific ones of the addressable individual information groups $LG_{nm1} \ldots LG_{nmr}$ (80), and incorporate information and/or services from the addressable individual information groups $LG_{nm1} \ldots LG_{nmr}$ (80) into the certain ones of the addressable query information groups $GI_{n1} \ldots GI_{nz}$ (63), in accordance with the grouping and/or sorting criteria addressing scheme.

FIGS. 66A, 66B, and 66C show the addressable response information group $RG_{nm}$ (57) having the addressable individual information groups $LG_{nm1} \ldots LG_{nmr}$ (80) showing the optional addressable pointer/address indices $IN_{nm1} \ldots IN_{nmr}$ (81) correspondingly associated with the optional addressable individual information groups $LG_{nm1} \ldots LG_{nmr}$ (80), which may be addressed/pointed with the pointer/addresses $PP_{nm1}$ (64), $PP_{nm2}$ (64), and $PP_{nmr}$ (64), respectively.

The optional addressable pointer/address index $IN_{nm1}$ (81) correspondingly associated with the optional addressable individual information group $LG_{nm1}$ (80). The optional addressable pointer/address index $IN_{nm2}$ (81) is correspondingly associated with the optional addressable individual information group $LG_{nm2}$ (80), and so on. The optional addressable pointer/address index $IN_{nmr}$ (81), is, thus, correspondingly associated with the optional addressable individual information group $LG_{nm1}$ (80).

The pointers/addresses $PG_{n1} \ldots PG_{nz}$ (61) may be formulated as arrays and/or lists. The pointers/addresses $PP_{nm1} \ldots PP_{nmr}$ (64) and/or the pointers/addresses $PF_{nm1} \ldots PF_{nmr}$ (69) may be formulated as arrays and/or lists. The arrays may be multidimensional arrays, and the lists may be lists within lists.

The optional addressable individual information group $LG_{nmr}$ (80) is associated with and corresponds to a particular one of the addressable individual information groups $LG_{nm1} \ldots LG_{nmr}$ (80) in a particular one of the addressable response information groups $RG_{n1} \ldots RG_{nm}$ (57), designated as the addressable response information group $RG_{nm}$ (57). The first subscript of the optional addressable individual information groups $LG_{nmr}$ (80) is associated with and corresponds to the particular service and/or information request $IQ_n$ (28) and/or the user service and/or information request $iq_n$ (27). The second subscript of the optional addressable individual information groups $LG_{nmr}$ (80) is associated with and corresponds to a particular one of "1" through "m" i.e., 1 . . . m, of the addressable response information group $RG_{n1} \ldots RG_{nm}$ (57). The third subscript of the optional addressable individual information groups $LG_{nmr}$ (80) is associated with and corresponds to a particular one of "1" through "r" i.e., 1 . . . r, of the optional addressable individual information group $LG_{nm1} \ldots LG_{nmr}$ (80) within the addressable response information group $RG_{nm}$ (57).

The subscripts of the optional addressable pointer/address indices $IN_{nm1} \ldots IN_{nmr}$ (81), are correspondingly associated with the subscripts of the corresponding addressable individual information groups $LG_{nm1} \ldots LG_{nmr}$ (80).

A number and variety of pointing/addressing schemes are possible, which may be used for a variety of grouping and sorting criteria schemes and addressing/pointing schemes.

For example, the pointers/addresses $PG_{n1} \ldots PG_{nz}$ (61) of the request pointer/address group $QZ_n$ (60) may be pointed/addressed to certain ones of the addressable query pointer/address groups $QG_{n1} \ldots QG_{nz}$ (62), in accordance with certain grouping and/or sorting criteria schemes and/or pointing/addressing schemes. The pointers/addresses $PP_{n11} \ldots PP_{nmr}$ (64) of each of the pointed/addressed addressable query pointer/address groups $QG_{n1} \ldots QG_{nz}$ (62) may be pointed to the pointer/address indices $IN_{n11} \ldots IN_{nmr}$ (81) of the optional addressable individual information groups $LG_{nm1}$ . . . $LG_{nmr}$, i.e., 1 . . . r, and the pointers/addresses $PP_{n11}$ . . . $PP_{nmr}$ (64), i.e., 1 . . . m, corresponding to the addressable response information groups $RG_{n1}$ . . . $RG_{nm}$ (57) formulated by the addressable query pointer/address groups $QG_{n1}$ . . . $QG_{nz}$ (62) may be pointed to certain ones of the addressable response information groups $RG_{n1}$ . . . $RG_{nm}$ (57), in accordance with certain grouping and/or sorting criteria schemes and/or addressing schemes. This subprocess may be repeated until the information and/or services from the optional addressable individual information groups $LG_{nm1}$ . . . $LG_{nmr}$ from the addressable response information groups $RG_{n1}$ . . . $RG_{nm}$ (57) is incorporated into the certain ones of the addressable query information groups $GI_{n1}$ . . . $GI_{nz}$ (63), in accordance with the grouping and/or sorting criteria addressing scheme, as formulated by the addressable query pointer/address groups $QG_{n1}$ . . . $QG_{nz}$ (62) and the request pointer/address group $QZ_n$ (60).

Alternatively and/or additionally, the pointers/addresses $PG_{n1}$ . . . $PG_{nz}$ (61) of the request pointer/address group $QZ_n$ (60) may be incremented through each of the addressable query pointer/address groups $QG_{n1}$ . . . $QG_{nz}$ (62). The pointers/addresses $PP_{n11}$ . . . $PP_{nmr}$ (64) of each of the pointed/addressed addressable query pointer/address groups $QG_{n1}$ . . . $QG_{nz}$ (62) may be pointed to the pointer/address indices $IN_{n11}$ . . . $IN_{nmr}$ (81) of the optional addressable individual information groups $LG_{nm1}$ . . . $LG_{nmr}$, i.e., 1 . . . r, and incremented once, and then the pointers/addresses $PP_{n11}$ . . . $PP_{nmr}$ (64), i.e., 1 . . . m, corresponding to the addressable response information groups $RG_{n1}$ . . . $RG_{nm}$ (57) formulated by the addressable query pointer/address groups $QG_{n1}$ . . . $QG_{nz}$ (62) may be incremented through each of the addressable response information groups $RG_{n1}$ . . . $RG_{nm}$ (57). This subprocess may be repeated until the information and/or services from the optional addressable individual information groups $LG_{nm1}$ . . . $LG_{nmr}$ from the addressable response information groups $RG_{n1}$ . . . $RG_{nm}$ (57) is incorporated into the certain ones of the addressable query information groups $GI_{n1}$ . . . $GI_{nz}$ (63), in accordance with the grouping and/or sorting criteria addressing scheme, and as formulated by the addressable query pointer/address groups $QG_{n1}$ . . . $QG_{nz}$ (62).

Alternatively and/or additionally, the pointers/addresses $PP_{n11}$ . . . $PP_{nmr}$ (64), i.e., 1 . . . m, may be incremented, corresponding to the addressable response information groups $RG_{n1}$ . . . $RG_{nm}$ (57) formulated by the addressable query pointer/address groups $QG_{n1}$ . . . $QG_{nz}$ (62), and then the pointers/addresses $PP_{n11}$ . . . $PP_{nmr}$ (64), i.e., 1 . . . r, pointing to the pointer/address indices $IN_{n11}$ . . . $IN_{nmr}$ (81) of the optional addressable individual information groups $LG_{nm1}$ . . . $LG_{nmr}$ may then be incremented. This subprocess may be repeated until the information and/or services from the optional addressable individual information groups $LG_{nm1}$ . . . $LG_{nmr}$ from the addressable response information groups $RG_{n1}$ . . . $RG_{nm}$ (57) is incorporated into the certain ones of the addressable query information groups $GI_{n1}$ . . . $GI_{nz}$ (63), in accordance with the grouping and/or sorting criteria addressing scheme, and as formulated by the addressable query pointer/address groups $QG_{n1}$ . . . $QG_{nz}$ (62).

Alternatively and/or additionally, the pointers/addresses $PF_{nm1}$ . . . $PF_{nmr}$ (69), i.e., 1 . . . m, may be incremented, corresponding to the addressable response information groups $RG_{n1}$ . . . $RG_{nm}$ (57) formulated by the addressable query pointer/address groups $QG_{n1}$ . . . $QG_{nz}$ (62), and then the pointers/addresses $PF_{nm1}$ . . . $PF_{nmr}$ (69), i.e., 1 . . . r, pointing to the pointer/address indices $IN_{n11}$ . . . $IN_{nmr}$ (81) of the optional addressable individual information groups $LG_{nm1}$ . . . $LG_{nmr}$ may then be incremented. This subprocess may be repeated until the information and/or services from the optional addressable individual information groups $LG_{nm1}$ . . . $LG_{nmr}$ from the addressable response information groups $RG_{n1}$ . . . $RG_{nm}$ (57) is incorporated into the certain ones of the addressable query information groups $GI_{n1}$ . . . $GI_{nz}$ (63), in accordance with the grouping and/or sorting criteria addressing scheme, and as formulated by the addressable query pointer/address groups $QG_{n1}$ . . . $QG_{nz}$ (62).

The typical sorting and/or grouping criteria and the addressing/pointing schemes mentioned immediately above, for example, may group certain ones of the queries $QQ_{n1}$ . . . $QQ_{nm}$ (53) having the same and/or substantially the same values into a particular one of the query information groups $GI_{nz}$ . . . $GI_{nz}$ (63), designated as the query information group $GI_{nz}$ (63), as shown in certain ones of FIGS. 27A–52C, inclusive.

The grouping and/or sorting criteria and schemes and the addressing/pointing schemes mentioned herein are but only a small portion of a much larger variety of grouping and/or sorting criteria and schemes and addressing/pointing schemes and/or combinations thereof that the client-server multitasking system 10 of the present invention may use and is capable of. The above mentioned examples are included herein to illustrate but a few examples of the capabilities of the client-server multitasking system 10 of the present invention.

The addressable individual information groups $LG_{nm1}$ . . . $LG_{nmr}$ (80) are typically parsed, and/or processed, and/or formatted for consistency of presentation and/or appearance one with the other, as the addressable individual information groups $LG_{nm1}$ . . . $LG_{nmr}$ (80) are incorporated into the addressable response information groups $RG_{n1}$ . . . $RG_{nm}$ (57) from the responses $R_{n1}$ . . . $R_{nm}$ (32).

Alternatively and/or additionally the addressable individual information groups $LG_{nm1}$ . . . $LG_{nmr}$ (80) may be incorporated into the addressable response information groups $RG_{n1}$ . . . $RG_{nm}$ (57) from the responses $R_{n1}$ . . . $R_{nm}$ (32) in an as-is condition and/or in raw form.

The optional addressable individual information groups $LG_{nm1}$ . . . $LG_{nmr}$ (80) in the addressable response information group $RG_{nm}$ (57) having information and/or services parsed and/or processed, and/or formatted, and/or grouped from the response $R_{nm}$ (32), may be correspondingly associated with the locations of the information and/or services in the response $R_{nm}$ (32).

Each of the addressable individual information groups $LG_{nm1}$ . . . $LG_{nmr}$ (80) may have and/or be parsed, and/or processed, and/or formatted, and/or organized, and/or grouped into corresponding optional links $LD_{nm1}$ . . . $LD_{nmr}$ (82), and/or corresponding optical descriptions $DD_{nm1}$ . . . $DD_{nmr}$ (83), and/or corresponding optional prices/values $PD_{nm1}$ . . . $PD_{nmr}$ (84), and/or corresponding optical images $ID_{nm1}$ . . . $ID_{nmr}$ (85), as shown in FIG. 67.

The optional links $LD_{nm1}$ . . . $LD_{nmr}$ (82), the corresponding optional descriptions $DD_{nm1}$ . . . $DD_{nmr}$ (83), the corresponding optional prices/values $PD_{nm1}$ . . . $PD_{nmr}$ (84), and the corresponding optional images $ID_{nm1}$ . . . $ID_{nmr}$ (85), corresponding to the addressable individual information groups $LG_{nm1}$ . . . $LG_{nmr}$ (80) are typically associated correspondingly one with the other.

The optional link $LD_{nm1}$ (82), the corresponding optional description $DD_{nm1}$ (83), the corresponding optional price/value $PD_{nm1}$ (84), and the corresponding optional image $ID_{nm1}$ (85), corresponding to the optional individual information group $LG_{nm1}$ (80) are typically associated correspondingly one with the other. The optional link $LD_{nm2}$ (82), the corresponding optional description $DD_{nm2}$ (83), the corresponding optional price/value $PD_{nm2}$ (84), and the corresponding optional image $ID_{nm2}$ (85), corresponding to the addressable individual information group $LG_{nm2}$ (80) are typically associated correspondingly one with the other, and so on. The optional link $LD_{nmr}$ (82), the corresponding optional description $DD_{nmr}$ (83), the corresponding optional price/value $PD_{nmr}$ (84), and the corresponding optional image $ID_{nmr}$ (85), corresponding to the addressable individual information group $LG_{nmr}$ (80) are, thus, typically associated correspondingly one with the other.

The addressable individual information groups $LG_{nm1}$ . . . $LG_{nmr}$ (80), which may have the corresponding optional links $LD_{nm1}$ . . . $LD_{nmr}$ (82), and/or the corresponding optional descriptions $DD_{nm1}$ . . . $DD_{nmr}$ (83), and/or the corresponding optional prices/values $PD_{nm1}$ . . . $PD_{nmr}$ (84), and/or the corresponding optional images $ID_{nm1}$ . . . $ID_{nmr}$ (85) are appended with labels/identifiers, as shown in FIG. 68, and incorporated into certain ones of the addressable query information groups $GI_{n1}$ . . . $GI_{nz}$ (63), depending upon the grouping and/or sorting criteria. FIG. 69 shows a particular one of the addressable query information groups $GI_{n1}$ . . . $GI_{nz}$ (63), designated as the query information group $GI_{nz}$ (63).

Now again, the optional addressable individual information group $LG_{nmr}$ (80) is associated with and corresponds to a particular one of the addressable individual information groups $LG_{nm1}$ . . . $LG_{nmr}$ (80) in a particular one of the addressable response information groups $RG_{n1}$ . . . $RG_{nm}$ (57), designated as the addressable response information group $RG_{nm}$ (57). The first subscript of the optional addressable individual information groups $LG_{nmr}$ (80) is associated with and corresponds to the particular service and/or information request $IQ_n$ (28) and/or the user service and/or information request $iq_n$ (27). The second subscript of the optional addressable individual information groups $LG_{nmr}$ (80) is associated with and corresponds to a particular one of "1" through "m" i.e., 1 . . . m, of the addressable response information group $RG_{n1}$ . . . $RG_{nm}$ (57). The third subscript of the optional addressable individual information groups $LG_{nmr}$ (80) is associated with and corresponds to a particular one of "1" through "r", i.e., 1 . . . r, of the optional addressable individual information group $LG_{nm1}$ . . . $LG_{nmr}$ (80) within the addressable response information group $RG_{nm}$ (57).

FIG. 68 shows a labelled individual information group $LL_{nzu}$ (86) associated with a particular one of the addressable query information groups $GI_{n1}$ . . . $GI_{nz}$ (63), designated as the addressable query information group $GI_{nz}$ (63), having optional group identifier $GL_{nc}$ (87), optional query link identifier $LN_{ncu}$ (88), optional resource location identifier $SU_{nw}$ (89), optional server and/or query identifier $SI_{nm}$ (90), and/or optional server link identifier $LX_{nmr}$ (91) appended to the addressable individual information group $LG_{nmr}$ (80).

The first alphanumeric subscript of the labelled individual information group $LL_{nzu}$ (86) is associated with and corresponds to the service and/or information response $IR_n$ (34) and/or the user service and/or information response $ir_n$ (36). The second alphanumeric subscript of the labelled individual information group $LL_{nzu}$ (86) is associated with and corresponds to a particular one of "1" through "z", i.e., 1 . . . z, of the addressable query information groups $GI_{n1}$ . . . $GI_{nz}$ (63), designated as the addressable query information group $GI_{nz}$ (63), which the labelled individual information group $LL_{nzu}$ (86) is incorporated in. The third alphanumeric subscript of the labelled individual information group $LL_{nzu}$ (86) is associated with and corresponds to a particular one of "1" through "u", i.e. , 1 . . . u, of labelled individual information groups $LL_{nz1}$ . . . $LL_{nzu}$ (86) within the addressable query information group $GI_{nz}$ (63).

The optional group identifier $GL_{nc}$ (87) labels and/or identifies the current request group $QA_{nc}$ (50). The optional group identifier $GL_{nc}$ (87) is associated with and corresponds to the current request group $QA_{nc}$ (50), which may be any particular one of the request groups $QA_{n1}$ . . . $QA_{nz}$ (51) selected by the user $U_n$ (12). The first alphanumeric subscript of the optional group identifier $GL_{nc}$ (87) is associated with and corresponds to the service and/or information response $IR_n$ (34) and/or the user service and/or information response $ir_n$ (36). The second subscript of the optional group identifier $GL_{nc}$ (87) is associated with and corresponds to the particular one of the request groups $QA_{n1}$ . . . $QA_{nz}$ (51) selected by the user $U_n$ (12) as the current request group $QA_{nc}$ (50).

The optional query link identifier $LN_{ncu}$ (88) is also associated with and corresponds to the current request group $AQ_{nc}$ (50). The optional query link identifier $LN_{ncu}$ (88) labels and/or identifies the labelled individual information group $LL_{nm}$ (86). The first alphanumeric subscript of the optional query link identifier $LN_{ncu}$ (88) is associated with and corresponds to the service and/or information response $IR_n$ (34) and/or the user service and/or information response $ir_n$ (36). The second subscript of the optional query link identifier $LN_{ncu}$ (88) is also associated with and corresponds to the particular one of the request groups $QA_{n1}$ . . . $QA_{nz}$ (51) selected by the user $U_n$ (12) as the current request group $QA_{nc}$ (50). The third alphanumeric subscript of the optional query link identifier $LN_{ncu}$ (88) is associated with and corresponds to a particular one of "1" through "u", i.e., 1 . . . u, of the labelled individual information groups $LL_{nz1}$ . . . $LL_{nzu}$ (86) in the addressable query information group $GI_{nz}$ (63).

The optional resource location identifier $SU_{nw}$ (89) labels and/or identifies resource locations of information and/or services associated with and corresponding to the optional addressable individual information group $LG_{nmr}$ (80) in the labelled individual information group $LL_{nzu}$ (86). The optional resource location identifier $SU_{nw}$ (89) indicates and is associated with and corresponds to resource locations of information and/or services associated with certain ones of the optional servers $SO_1$ . . . $SO_p$ (22) and/or certain ones of the servers $S_1$ . . . $S_z$ (20). The optional resource location identifier $SU_{nw}$ (89) may be obtained from certain information in the optional addressable individual information group $LG_{nmr}$ (80). The first alphanumeric subscript of the optional resource location identifier $SU_{nw}$ (89) is associated with and corresponds to the service and/or information response $IR_n$ (34) and/or the user service and/or information response $ir_n$ (36). The second alphanumeric subscript of the optional resource location identifier $SU_{nw}$ (89) is associated with and corresponds to a particular one of "1" through "w", i.e., 1 . . . w, of the optional resource location identifiers $SU_{n1}$ . . . $SU_{nw}$ (89) in the labelled individual information group $LL_{nzu}$ (86).

The optional server and/or query identifier $SI_{nm}$ (90) labels and/or identifies the query $QQ_{nm}$ (53) and/or the corresponding server address $AQ_{nm}$ (54) associated with and corresponding to the optional addressable individual information group $LG_{nmr}$ (80) in the corresponding labelled individual information group $LL_{nzu}$ (86) of the current request group $QA_{nc}$ (50). The first alphanumeric subscript of the optional server and/or query identifier $SI_{nm}$ (90) is associated with and corresponds to the service and/or information response $IR_n$ (34) and/or the user service and/or information response $ir_n$ (36). The second alphanumeric subscript of the optional server and/or query identifier $SI_{nm}$ (90) is associated with and corresponds to a particular one of "1" through "m", i.e., 1 . . . m, of the optional server and/or query identifiers $SI_{n1}$ . . . $SI_{nm}$ (90), which may be correspondingly associated with the corresponding ones of the queries $QQ_{n1}$ . . . $QQ_{nm}$ (53) and/or the corresponding ones of the server addresses $AQ_{n1}$ . . . $AQ_{nm}$ (54).

The optional server link identifier $LX_{nmr}$ (91) labels and/or identifies the location of the optional addressable individual information group $LG_{nmr}$ (80) in the corresponding addressable response information groups $RG_{nm}$ (57). The first alphanumeric subscript of the optional server link identifier $LX_{nmr}$ (91) is associated with and corresponds to the service and/or information response $IR_n$ (34) and/or the user service and/or information response $ir_n$ (36). The second alphanumeric subscript of the optional server link identifier $LX_{nmr}$ (91) is associated with and corresponds to the addressable response information group $RG_{nm}$ (57). The third alphanumeric subscript of the optional server link identifier $LX_{nmr}$ (91) is associated with and corresponds to a particular one of "1" through "r", i.e., 1 . . . r, of the optional server link identifiers $LX_{nm1}$ . . . $LX_{nmr}$ (91), which may be correspondingly associated with the locations of certain ones of the optional addressable individual information group $LG_{nm1}$ . . . $LG_{nmr}$ (80) in the addressable response information groups $RG_{nm}$ (57). The certain ones of the optional addressable individual information groups $LG_{nm1}$ . . . $LG_{nmr}$ (80) in the addressable response information group $RG_{nm}$ (57), having information and/or services parsed and/or processed, and/or formatted, and/or grouped from the response $R_{nm}$ (32), which are labelled and/or identified with the optional server link identifiers $LX_{nm1}$ . . . $LX_{nmr}$ (91), are correspondingly associated with the locations of the information and/or services in the response $R_{nm}$ (32). The optional server link identifiers $LX_{nm1}$ . . . $LX_{nmr}$ (91), thus, identify and/or label the location of services and/or information in the response $R_{nm}$ (32).

FIG. 69 shows the addressable query information group $GI_{nz}$ (63) having the labelled individual information groups $LL_{nz1}$ . . . $LL_{nzu}$ (86), optional database labelled individual information groups $RL_{nz1}$ . . . $RL_{nzx}$ (92), optional query description $QT_{nz}$ (93), optional server descriptions and/or links $ST_{nz1}$ . . . $ST_{nzf}$ (94), and optional advertisements and/or links $LT_{nz1}$ . . . $LT_{nzt}$ (95). The first and second subscripts of the optional database labelled individual information groups $RL_{nz1}$ . . . $RL_{nzx}$ (92), the optional query description $QT_{nz}$ (93), the optional server descriptions and/or links $ST_{nz1}$ . . . $ST_{nzf}$ (94), and the optional advertisement and/or links $LT_{nz1}$ . . . $LT_{nzt}$ (95) are associated with and correspond to the addressable query information group $GI_{nz}$ (63). The third subscripts of the optional database labelled individual information groups $RL_{nz1}$ . . . $RL_{nzx}$ (92), the optional server descriptions and/or links $ST_{nz1}$ . . . $ST_{nzf}$ (94), and the optional advertisements and/or links $LT_{nz1}$ . . . $LT_{nzt}$ (95) are associated with and correspond to ones of the optional database labelled individual information groups $RL_{nz1}$ . . . $RL_{nzx}$ (92), the optional server descriptions and/or links $ST_{nz1}$ . . . $ST_{nzf}$ (94), and the optional advertisements and/or links $LT_{nz1}$ . . . $LT_{nzt}$ (95), respectively.

IV PROCESS

FIG. 70 shows steps of a client-server multitasking process 99 of the present invention. The client-server multitasking process 99 is shown for the client-server multitasking system 10 for a particular one of the users U . . . $U_n$ (12), designated as the user $U_n$ (12), the corresponding particular one of the user interfaces I . . . $I_n$ (14), designated as the user interface $I_n$ (14), the corresponding particular one of the clients C . . . $C_n$ (16), designated as the client $C_n$ (16), the server PS (18), the servers $S_1$ . . . $S_z$ (20), and the optional servers $SO_1$ . . . $SO_p$ (22), which reside on the network 24.

The client-server multitasking process 99 starts at step 101. The user $U_n$ (12) enters the user input $UI_n$ (25) into the user interface $I_n$ (14) (step 102). The user input $UI_n$ (25) is formulated into the user service and/or information request $iq_n$ (27) at the user interface $I_n$ (14) and communicated to the client $C_n$ (16) (step 103). The user service and/or information request $iq_n$ (27) may be formulated into the service and/or information request $IQ_n$ (28) at the client $C_n$ (16) and communicated to the server PS (18) (also step 103).

The service and/or information response $IR_n$ (34) and/or the user service and/or information response $ir_n$ (36) are derived at the server PS (18) and/or the client $C_n$ (16), respectively, at step 104, which in itself is a process, and may hereinafter be referred to as the multitasking process 104. The multitasking process 104 will be discussed in more detail later with reference to FIGS. 71 and 72.

Now, continuing with FIG. 70, the user service and/or information response $ir_n$ (36) may be derived at the client $C_n$ (16) (step 104) from the service and/or information response $IR_n$ (34), which may be communicated to the client $C_n$ (16) from the server PS (18) (also step 104), and/or alternatively and/or additionally from the responses $R_{n1}$ . . . $R_{nm}$ (32), which may be communicated to the client $C_{n\ 1}$ (16) (step 104).

Now, the client $C_n$ (16) may communicate the service and/or information request $IQ_n$ (28) to the server PS (18) (step 103). The service and/or information response $IR_n$ (34) is then derived at the server PS (18) (step 104) and communicated to the client $C_n$ (16) (also step 104). The user service and/or information response $ir_n$ (36) may be derived from the service and/or information response $IR_n$ (34) (also step 104).

Now, in more detail, if the service and/or information request $IQ_n$ (28) is communicated to the server PS (18) (step 103), then the server PS (18) makes the requests $Q_{n1}$ . . . $Q_{nm}$ (29) and/or certain ones of the requests $Q_{n1}$ . . . $Q_{nm}$ (29) of the servers $S_1$ . . . $S_2$ (20), in accordance with the designation scheme which designates the certain ones of the servers $S_1$ . . . $S_z$ (20) to be communicated with corresponding to the requests $Q_{n1}$ . . . $Q_{nm}$ (29) as the corresponding server designations $S_{n1}$ . . . $S_{nm}$ (30), utilizing information from the service and/or information request $IQ_n$ (28). The service and/or information response $IR_n$ (34) is then derived at the server PS (18) (step 104) from the responses $R_{n1}$ . . . $R_{nm}$ (32) received from the servers $S_1$ . . . $S_z$ (20) corresponding to the server designations $S_{n1}$ . . . $S_{nm}$ (30), and communicated to the client $C_n$ (16). Now, again, the user service and/or information response $ir_n$ (36) may be derived from the service and/or information response $IR_n$ (34) (also step 104).

Now, also in more detail, alternatively and/or additionally, the client $C_n$ (16) may make the requests $Q_{n1}$ . . . $Q_{nm}$ (29) and/or certain other ones of the requests $Q_{n1}$ . . . $Q_{nm}$ (29) of the servers $S_1$ . . . $S_z$ (20), in accordance with the designation scheme which designates the certain ones of the servers $S_1$ . . . $S_z$ (20) to be communicated with corresponding to the requests $Q_{n1}$ . . . $Q_{nm}$ (29) as the corresponding server designations $S_{n1}$ . . . $S_{nm}$ (30), utilizing information from the user service and/or information request $iq_n$ (27). Now, again, the user service and/or information response $ir_n$ (36) may also be derived at the client $C_n$ (16) (step 104) from the responses $R_{n1} \ldots R_{nm}$ (32) communicated to the client $C_n$ (16) (step 104) and/or alternatively and/or additionally from the service and/or information response $IR_n$ (34) communicated to the client $C_n$ (16) from the server PS (18) (also step 104).

The user service and/or information response $ir_n$ (36), thus, may be derived from the service and/or information response $IR_n$ (34) communicated from the server PS (18) to the client $C_n$ (16) and/or alternatively and/or additionally from the responses $R_{n1} \ldots R_{nm}$ (32) communicated to the client $C_n$ (16) (step 104).

The user service and/or information response $ir_n$ (36) is communicated to the user interface $I_n$ (14) (step 105) and incorporated into the user response $UR_n$ (37).

The user $U_n$ (12) reviews the user response $UR_n$ (37) and/or selects additional services and/or information (step 106). Step 106 will be discussed in more detail later with reference to FIG. 76. The process 99 ends at step 107. The process 99 will be described in more detail with reference to FIGS. 1–147 of the drawings.

The service and/or information response $IR_n$ (34) and/or the user service and/or information response $ir_n$ (36) are derived at the server PS (18) and/or the client $C_n$ (16), respectively, at step 104 in FIG. 70, and shown in more detail in FIGS. 71 and 72.

FIG. 71 shows the multitasking process 104 of deriving the service and/or information response $IR_n$ (34) and/or the user service and/or information response $ir_n$ (36), with reference to FIGS. 59 and 63. FIG. 72 shows the multitasking process 104 of deriving the service and/or information response $IR_n$ (34) and/or the user service and/or information response $ir_n$ (36) having other grouping/sorting that may be used additionally and/or alternatively to that of FIGS. 59 and 63, as shown with reference to FIGS. 60 and 64. The multitasking process 104 will also be described in more detail with reference to FIGS. 1–147 of the drawings.

The server PS (18) and/or the client $C_n$ (16) parse, process, and/or format the service and/or information request $IQ_n$ (28) and/or the user service and/or information request $iq_n$ (27) into the current request group $QA_{nc}$ (50), the request groups $QA_{n1} \ldots QA_{nc}$ (51), and the optional instructions $VJ_{n1} \ldots VJ_{nk}$ (52) (step 104-1), as shown in FIGS. 71 and 72.

Information from the current group $QA_{nc}$ (50) and the optional instructions $VJ_{n1} \ldots VJ_{nk}$ (52) may be used to make the requests $Q_{n1} \ldots Q_{nm}$ (29), obtain the responses $R_{n1} \ldots R_{nm}$ (32), and incorporate information therefrom into the service and/or information response $IR_n$ (34) and/or the user service and/or information response $ir_n$ (36), as shown in FIGS. 71 and 72 with reference to FIGS. 59, 60, 63, and 64. The current request group $QA_{nc}$ (50) may be any particular one the request groups $QA_{n1} \ldots QA_{nz}$ (51), which may be selected by the user $U_n$ (12).

The current request group $QA_{nc}$ (50) has the corresponding queries $QQ_{n1} \ldots QQ_{nm}$ (53) and the corresponding server addresses $AQ_{n1} \ldots AQ_{nm}$ (54) to open connections with and make the requests $Q_{n1} \ldots Q_{nm}$ (29) of the servers $S_1 \ldots S_z$ (20), in accordance with the designation scheme which designates the certain ones of the servers $S_1 \ldots S_z$ (20) to be communicated with corresponding to the requests $Q_{n1} \ldots Q_{nm}$ (29) as the corresponding server designations $S_{n1} \ldots S_{nm}$ (30), shown for the particular service and/or information request $IQ_n$ (28) and/or the particular user service and/or information request $iq_n$ (27).

The server PS (18) and/or the client $C_n$ (16) open connections with and make the requests $Q_{n1} \ldots Q_{nm}$ (29) having the corresponding queries $QQ_{n1} \ldots Q_{nm}$ (53) and the corresponding server addresses $AQ_{n1} \ldots AQ_{nm}$ (54) in the current request group $QA_{nc}$ (50) of the servers $S_1 \ldots S_z$ (20) (step 104-2) as shown in FIGS. 71 and 72, in accordance with the designation scheme which designates the certain ones of the servers $S_1 \ldots S_z$ (20) to be communicated with corresponding to the requests $Q_{n1} \ldots Q_{nm}$ (29) as the corresponding server designations $S_{n1} \ldots S_{nm}$ (30).

The servers $S_1 \ldots S_z$ (20) corresponding to the server designations $S_{n1} \ldots S_{nm}$ (30), designated in accordance with the designation scheme which designates the certain ones of the servers $S_1 \ldots S_z$ (20) to be communicated with corresponding to the requests $Q_{n1} \ldots Q_{nm}$ (29) as the corresponding server designations $S_{11} \ldots S_{nm}$ (30), respond to the requests $Q_{n1} \ldots Q_{nm}$ (29) with the corresponding responses $R_{n1} \ldots R_{nm}$ (32).

The server PS (18) and/or the client $C_n$ (16) parse, and/or process, and/or format, and/or group, and/or organize each of the responses $R_{n1} \ldots R_{nm}$ (32) received from the servers $S_1 \ldots S_z$ (20) (step 104-3), as shown in FIGS. 71 and 72 with reference to FIGS. 105–107, corresponding to the server designations $S_{n1} \ldots S_{nm}$ (30) into the corresponding addressable response information groups $RG_{n1} \ldots RG_{nm}$ (57).

The server PS (18) and/or the client $C_n$ (16) may also make additional optional requests $QP_{n1} \ldots QP_{nm}$ (58) of the optional databases 41 and/or 42 (also step 104-2 of FIGS. 71 and 72), which may be optionally resident within the server PS (18) and/or the client $C_n$ (16), and which may reply with the corresponding additional optional responses $RA_{n1} \ldots RA_{nm}$ (40). The server PS (18) and/or the client $C_n$ (16) parse, and/or process, and/or format, and/or group, and/or organize each of the additional optional responses $RA_{n1} \ldots RA_{nm}$ (40) into the corresponding response information groups $RC_{n1} \ldots RC_{nm}$ (59) (also step 104-3 of FIGS. 71 and 72).

Now, step 104-3 of FIGS. 71 and 72 is shown in more detail in FIG. 73.

As discussed later, and shown in FIGS. 105–107, entity body $RH_{nm}$ (353) of the response $R_{nm}$ (32) has optional response individual information groups $LS_{nm1} \ldots LS_{nmr}$ (360).

Each of the optional response individual information groups $LS_{n11} \ldots LS_{nmr}$ (360) and/or portions thereof from the entity bodies $RH_{n1} \ldots RH_{nm}$ (353) of the responses $R_{n1} \ldots R_{nm}$ (32) may be optionally compared one with the other, and duplicate ones of the optional response individual information groups $LS_{n11} \ldots LS_{nmr}$ (360) may be optionally discarded (step 104-3-1), as shown in FIG. 73.

The remaining optional response individual information groups $LS_{n11} \ldots LS_{nmr}$ (360) are parsed, and/or processed, and/or formatted, and/or organized, and/or grouped into corresponding ones of the addressable individual information groups $LG_{n11} \ldots LG_{nmr}$ (80) as the addressable individual information groups $LG_{n11} \ldots LG_{nmr}$ (80) are incorporated into the addressable response information groups $RG_{n1} \ldots RG_{nm}$ (57) from the responses $R_{n1} \ldots R_{nm}$ (32) (step 104-3-2), as shown in FIG. 73.

The addressable individual information groups $LG_{n11} \ldots LG_{nmr}$ (80) are typically parsed, and/or processed, and/or formatted for consistency of presentation and/or appearance one with the other, as the addressable individual information groups $LG_{n11} \ldots LG_{nmr}$ (80) are incorporated into the addressable response information groups $RG_{n1} \ldots RG_{nm}$ (57) from the responses $R_{n1} \ldots R_{nm}$ (32).

The server PS (18) and/or the client $C_n$ (16) may formulate information from the current request group $QA_{nc}$ (50) having the corresponding queries $QQ_{n1} \ldots QQ_{nm}$ (53) and the corresponding server addresses $AQ_{n1} \ldots AQ_{nm}$ (54) into the corresponding request pointer/address group $QZ_n$ (60) having the pointers/addresses $PG_{n1} \ldots PG_{nz}$ (61) associated therewith (step 104-4 of FIG. 71 with reference to FIGS. 59, 63, and 97). Alternatively and/or additionally, the server PS (18) and/or the client $C_n$ (16) may formulate information from the current request group $QA_{nc}$ (50) having the corresponding queries $QQ_{n1} \ldots QQ_{nm}$ (53) and the corresponding server addresses $AQ_{n1} \ldots AQ_{nm}$ (54) into a corresponding request pointer/address group $QY_n$ (68) having the pointers/addresses $PF_{n11} \ldots PF_{nmr}$ (69) associated therewith (step 104-4 of FIG. 72 with reference to FIGS. 60 and 64).

The server PS (18) and/or the client $C_n$ (16) may formulate the addressable query pointer/address groups $QG_{n1} \ldots QG_{nz}$ (62) (step 104-5 of FIG. 71 with reference to FIGS. 59, 63, 97, 102, and typical ones of the addressable query pointer/address groups $QG_{n1} \ldots QG_{nz}$ (62) in FIGS. 98 and 99), depending upon the grouping and/or sorting criteria used. Each of the pointers/addresses $PG_{n1} \ldots PG_{nz}$ (61) may be directed to point/address the corresponding addressable query pointer/address groups $QG_{n1} \ldots QG_{nz}$ (62) associated therewith, which aid in obtaining information and/or services from certain ones of addressable response information groups $RG_{n1} \ldots RG_{nm}$ (57) to be incorporated into addressable query information groups $GI_{n1} \ldots GI_{nz}$ (63).

Each of the addressable query pointer/address groups $QG_{n1} \ldots QG_{nz}$ (62) has the pointers/addresses $PP_{n11} \ldots PP_{nmr}$ (64) directed to address/point information in the addressable response information groups $RG_{n1} \ldots RG_{nm}$ (57) based upon the grouping and/or sorting criteria.

The grouping and/or sorting criteria may be incorporated into the optional instructions $VJ_{n1} \ldots VJ_{nk}$ (52), which may be entered into the user interface $I_n$ (14) through the user input $UI_n$ (25) by the user $U_n$ (12). Grouping and/or sorting criteria may additionally and/or alternatively optionally resident within the server PS (18) and/or the client $C_n$ (16).

The grouping and/or sorting criteria gives the user $U_n$ (12) the ability to formulate the query information groups $GI_{n1} \ldots GI_{nz}$ (63) and the way in which information and/or services from the addressable response information groups $RG_{n1} \ldots RG_{nm}$ (57) is presented to the user $U_n$ (12) through the user interface $I_n$ (14).

Information and/or services within each of the addressable response information groups $RG_{n1} \ldots RG_{nm}$ (57) is addressed with the pointers/addresses $PP_{n11} \ldots PP_{nmr}$ (64) from the query pointer/address groups $QG_{n1} \ldots QG_{nz}$ (62), and information and/or services from the addressable response information groups $RG_{n1} \ldots RG_{nm}$ (57) is incorporated into the addressable query information groups $GI_{n1} \ldots GI_{nz}$ (63) corresponding to the pointers/addresses $PP_{n11} \ldots PP_{nmr}$ (64) (step 104-6 of FIG. 71), which are formulated by the addressable query pointer/address groups $QG_{n1} \ldots QG_{nz}$ (62), in accordance with the grouping and/or sorting criteria, as shown in FIG. 71 with reference to FIGS. 59, 63, 66A, 66B, 66C, 67–69, 97, 102, typical ones of the addressable query pointer/address groups $QG_{n1} \ldots QG_{nz}$ (62) in FIGS. 98 and 99, and a typical one of the addressable query information groups $GI_{n1} \ldots GI_{nz}$ (63), designated as the addressable query information group $GI_{nz}$ (63), in FIG. 109.

Alternatively and/or additionally, each of the pointers/addresses $PF_{n11} \ldots PF_{nmr}$ (69) may directed to point/address the corresponding addressable response information groups $RG_{n1} \ldots RG_{nm}$ (57), and aid in obtaining information and/or services from the corresponding addressable response information groups $RG_{n1} \ldots RG_{nm}$ (57) to be incorporated into the addressable query information groups $GI_{n1} \ldots GI_{nz}$ (63) (step 104-6) as shown in FIG. 72 with reference to FIGS. 60, 64, 66A, 66B, 66C, 67–69, and another typical one of the addressable query information groups $GI_{n1} \ldots GI_{nz}$ (63), designated as the addressable query information group $GI_{nz}$ (63), in FIG. 110.

Now, step 104-6 of FIG. 71 is shown in more detail in FIG. 74 with reference to FIGS. 59, 63, 66A, 66B, 66C, 67–69, 97, 102, typical ones of the addressable query pointer/address groups $QG_{n1} \ldots QG_{nz}$ (62) in FIGS. 98 and 99, and a typical one of the addressable query information groups $GI_{n1} \ldots GI_{nz}$ (63), designated as the addressable query information group $GI_{nz}$ (63), in FIG. 109. Step 104-6 of FIG. 72 is shown in more detail in FIG. 75 with reference to FIGS. 60, 64, 66A, 66B, 66C, 67–69, and another typical one of the addressable query information groups $GI_{n1} \ldots GI_{nz}$ (63), designated as the addressable query information group $GI_{nz}$ (63), in FIG. 110.

The optional addressable individual information groups $LG_{n11} \ldots LG_{nmr}$ (80) in each of the addressable response information groups $RG_{n1} \ldots RG_{nm}$ (57) may be addressed with the pointers/addresses $PP_{n11} \ldots PP_{nmr}$ (64) (step 104-6-1) as shown in FIG. 74 with reference to FIGS. 59 and 63 and FIG. 71.

The optional addressable individual information groups $LG_{n11} \ldots LG_{nmr}$ (80) in each of the addressable response information groups $RG_{n1} \ldots RG_{nm}$ (57) may be addressed with the pointers/addresses $PP_{n11} \ldots PP_{nmr}$ (64) (step 104-6-1) as shown in FIG. 74 with reference to FIGS. 59 and 63 and FIG. 71.

The optional addressable individual information groups $LG_{n11} \ldots LG_{nmr}$ (80) in each of the addressable response information groups $RG_{n1} \ldots RG_{nm}$ (57) may alternatively and/or additionally be addressed with the pointers/addresses $PF_{n11} \ldots PF_{nmr}$ (69) (step 104-6-1) as shown in FIG. 75 with reference to FIGS. 60 and 64 and FIG. 72.

The addressed optional addressable individual information groups $LG_{n11} \ldots LG_{nmr}$ (80) in each of the addressable response information groups $RG_{n1} \ldots RG_{nm}$ (57) may alternatively and/or additionally be addressed with the pointers/addresses $PF_{n11} \ldots PF_{nmr}$ (69) (step 104-6-1) as shown in FIG. 75 with reference to FIGS. 60 and 64 and FIG. 72.

The addressed optional addressable individual information groups $LG_{n11} \ldots LG_{nmr}$ (80) and/or portions thereof may be optionally labelled with labels and/or identifiers and incorporated into the labelled individual information groups $LL_{nz1} \ldots LL_{nzu}$ (86) (step 104-6-2), as shown in FIGS. 74 and 75.

The labelled individual information groups $LL_{nz1} \ldots LL_{nzu}$ (86) may be incorporated into certain ones of the addressable query information groups $GI_{n1} \ldots GI_{nz}$ (63), depending upon the grouping and/or sorting criteria (step 104-6-3), as shown in FIGS. 74 and 75.

The addressed optional addressable individual information groups $LG_{n11} \ldots LG_{nmr}$ (80) and/or portions thereof are typically appended with the labels and/or identifiers, thus creating the labelled individual information groups $LL_{nz1} \ldots LL_{nzu}$ (86), as each of the labelled individual information groups $LL_{nz1} \ldots LL_{nzu}$ (86) are incorporated into the certain ones of the addressable query information groups $GI_{n1} \ldots GI_{nz}$ (63). The steps 104-6-2 and 104-6-3 are thus typically consolidated into a single step.

The addressable query information groups $GI_{n1} \ldots GI_{nz}$ (63) may then be incorporated into the service and/or information response $IR_n$ (34) (step 104-7), as shown in FIGS. 71 and 72 with reference to FIG. 61, and/or the user service and/or information response $ir_n$ (36) (also step 104-7), as also shown in FIGS. 71 and 72 but with reference to FIG. 65.

The user $U_n$ (12) reviews the user response $UR_n$ (37) the user interface $I_n$ (14) and/or selects additional services and/or information at step 106 in FIG. 70, and shown in more detail in FIG. 76. The step 106 will also be described in more detail with reference to FIGS. 1–147 of the drawings.

The user $U_n$ (12) selects additional services and/or information through the user interface $I_n$ (14) (step 106-1) or exits to the end of the process 99 at step 107. If the user $U_n$ (12) selects additional services and/or information through the user interface $I_n$ (14) (step 106-1), the user $U_n$ (12) may optionally enter one or more orders into an order form and/or order forms at and through the user interface $I_n$ (14) (step 106-2). The order and/or orders may be, for example, for purchases, and/or instructions, and/or payment, and/or other information and/or services to be directed to and/or requested of third parties, and/or combinations thereof, of the optional servers $SO_1 \ldots SO_p$ (22), and/or the servers $S_1 \ldots S_z$ (20), and/or other ones of the clients $C_1 \ldots C_n$ (16) through the server PS (18) and/or the client $C_n$ (16). The order and/or orders may, thus, be placed through and by the server PS (18) and/or the client $C_n$ (16), eliminating the need for the user $U_n$ (12) to place separate ones of the order with the third parties, the optional servers $SO_1 \ldots SO_p$ (22), and/or the servers $S_1 \ldots S_z$ (20) separately and/or individually.

The server PS (18) and/or the client $C_n$ (16) process the orders and/or communicate the orders to the third parties, the optional servers $SO_1 \ldots SO_p$ (22), and/or the servers $S_1 \ldots S_z$ (20), and/or other ones of the clients $C_1 \ldots C_n$ (16) (step 106-3). The server PS (18) and/or the client $C_n$ (16) confirm the order (step 106-4). The user $U_n$ (12) may select additional services and/or information through the user interface $I_n$ (14) (step 106-1) or exit to the end of the process 99 at step 107.

If the user $U_n$ (12) selects additional services and/or information through the user interface $I_n$ (14) (step 106-1), the user $U_n$ (12) may alternatively and/or additionally optionally enter information and/or service requests of the optional servers $SO_1 \ldots SO_p$ (22), and/or the servers $S_1 \ldots S_z$ (20) through the suer interface $I_n$ (14) (step 106-5) and/or exit to the end of the process 99 at step 107.

If the user $U_n$ (12) selects additional services and/or information through the user interface $I_n$ (14) (step 106-1), the user $U_n$ (12) may alternatively and/or additionally optionally enter additional requests as the user input $UI_n$ (25) at and through the user interface $I_n$ (14) (step 106-6) and enter the process 99 at step 102.

V. ADDITIONAL DETAILS

A. User Input

The user input $UI_n$ (25), which the user $U_n$ (12) makes through the user interface $I_n$ (14), may have one or a plurality of the same and/or different ones of the queries $QQ_{n1} \ldots QQ_{nm}$ (53) to be made by the server PS (18) and/or the client $C_n$ (16) of the same and/or different ones of the servers $S_1 \ldots S_z$ (20), in accordance with the designation scheme which designates the servers $S_1 \ldots S_z$ (20) to be communicated with corresponding to the requests $Q_{n1} \ldots Q_{nm}$ (29) as the corresponding server designations $S_{n1} \ldots S_{nm}$ (30) at the corresponding server addresses $AQ_{n1} \ldots AQ_{nm}$ (54).

The server PS (18) and/or the client $C_n$ (16) parse, process, format, sort, group, and/or organize each of the responses $R_{n1} \ldots R_{nm}$ (32) to the corresponding requests $Q_{n1} \ldots Q_{nm}$ (29), received from the servers $S_1 \ldots S_z$ (20) designated by the server designations $S_{n1} \ldots S_{nm}$ (30), and/or each of the additional optional responses $RA_{n1} \ldots RA_{nm}$ (40) from the server PS (18) and/or the client $C_n$ (16). The parsed, processed, formatted, sorted, grouped, and/or organized results from the server PS (18) and/or the client $C_n$ (16) are communicated to the user $U_n$ (12) through the user interface $I_n$ (14) as the user response $UR_n$ (37), which the user $U_n$ (12) may review, interact with, and/or select additional services and/or information therefrom.

The user $U_n$ (12) enters the user input $UI_n$ (25) having one or more of the same and/or different user requests $qu_{n1} \ldots qu_{nu}$ (26) into the user interface $I_n$ (14), as shown in FIG. 3. The user requests $qu_{n1} \ldots qu_{nu}$ (26) are communicated from the user interface $I_n$ (14) to the client $C_n$ (16) within the suer service and/or information request $iq_n$ (27), having the user requests $qu_{n1} \ldots qu_{nu}$ (26) and other optional information.

The user $U_n$ (12) may enter the user input $UI_n$ (25) having one or more of the same and/or different user request $qu_{n1} \ldots qu_{nu}$ (26) into the service and/or information entry request form $IE_n$ (38) at the user interface $I_n$ (14), or into the user interface $I_n$ (14) through other suitable means.

The user interfaces $I_1 \ldots I_n$ (14) have suitable input means and/or suitable presentation and/or display means, which allow the corresponding users $U_1 \ldots U_n$ (12) to communicate with the corresponding clients $C_1 \ldots C_n$ (16). FIGS. 5A, 5B, and 6–10 show typical ones of the service and/or information entry request forms $IE_1 \ldots IE_n$ (38) at the user interfaces $I_1 \ldots I_n$ (14), as graphical user interfaces (GUI's), which the users $U_1 \ldots U_n$ (12) may enter the corresponding user inputs $UI_1 \ldots UI_n$ (25) thereinto. FIGS. 77 and 78 are schematic representations of the service and/or information entry request form $IE_n$ (38) showing fields, links, and elements of the service and/or information entry request form $IE_n$ (38).

The user $U_n$ (12) may enter the user input $UI_n$ (25) into the service and/or information entry request form $IE_n$ (38) at the user interface $I_n$ (14), as shown schematically in FIG. 77. The user input $UI_n$ (25) may be entered as user input values into fields or alternate request links of the service and/or information entry request form $IE_n$ (38).

The user $U_n$ (12) may enter the user input $UI_n$ (25) as one or more of the same and/or different user requests $qu_{n1} \ldots qu_{nu}$ (26), which may have the query values $QV_{n1} \ldots QV_{nu}$ (200), server name values $AV_{n1} \ldots AV_{nu}$ (201), optional instruction values $VV_{n1} \ldots VV_{nv}$ (202), and/or alternate request links $QL_{n1} \ldots QL_{nm}$ (203), and/or server request links $UL_{n1} \ldots UL_{ns}$ (204), and/or the additional request links $SL_{n1} \ldots SL_{nw}$ (71) into the service and/or information entry request form $IE_n$ (38).

The user input $UI_n$ (25), thus, has one or more of the same and/or different user requests $qu_{n1} \ldots qu_{nm}$ (26), which may be entered as the query values $QV_{n1} \ldots QV_{nu}$ (200) of the same and/or different servers $S_1 \ldots S_z$ (20), designated in accordance with the designation scheme corresponding to the corresponding certain ones of the server designations $S_{11} \ldots S_{nm}$ (30) having the corresponding server name values $AV_{n1} \ldots AV_{nm}$ (201), the optional instruction values $VV_{n1} \ldots VV_{nv}$ (202), and/or the alternate request links $QL_{n1} \ldots QL_{nm}$ (203), and/or the server request links $UL_{n1} \ldots UL_{ns}$ (204), and/or the additional request links $SL_{n1} \ldots SL_{nw}$ (71) into the service and/or information entry request form $IE_n$ (38).

Each of the different user requests $qu_{n1} \ldots qu_{nu}$ (26) may be the same and/or different one from the other. Each of the query values $QV_{n1} \ldots QV_{nu}$ (200) may be the same and/or different one from the other. The query values $QV_{n1} \ldots QV_{nu}$ (200) may be entered for the same and/or different ones of the servers $S_1 \ldots S_z$ (20). The optional instruction values $VV_{n1} \ldots VV_{nv}$ (202) may be the same and/or different one from the other.

The user $U_n$ (12) may also enter the user input $UI_n$ (25) and request services and/or information through one of the alternate request links $QL_{n1} \ldots QL_{na}$ (203), or one of the server request links $UL_{n1} \ldots UL_{ns}$ (204), or one of the additional request links $SL_{n1} \ldots SL_{nw}$ (71) at the user interface $I_n$ (14).

B. USER INTERFACE DETAILS

The client-server multitasking system 10 of the present invention may have any suitable user interface $I_n$ (14) acceptable to and/or preferred by the user $U_n$ (12), and acceptable to the client $C_n$ (16). The user interface $I_n$ (14) may be, for example, a graphical user interface, visual, aural, and/or tactile user interface, and/or combination thereof, or other suitable interface. The user interface $I_n$ (14) may be integral with the client $C_n$ (16) or separate therefrom.

The user interface $I_n$ (14) may be hardware based, and/or computer based, and/or process based, and/or a combination thereof, and may be a graphical user interface, such as, for example, a browser and/or combination thereof, varieties of which are commonly used on the internet.

The service and/or information entry request form $IE_n$ (38) may be optionally available to the user $U_n$ (12) at the suer interface $I_n$ (14), or the user $U_n$ (12) may optionally request the service and/or information entry request form $IE_n$ (38) through the user interface $I_n$ (14).

Now, as shown in FIGS. 5A, 5B, and 6–10 and schematically in FIGS. 77 and 78, the service and/or information entry request form $IE_n$ (38) at the user interface $I_n$ (14) has user client request fields $QD_{n1} \ldots QD_{nu}$ (206) accessible to the user $U_n$ (12) and hidden client request elements $HU_{n1} \ldots HU_{nh}$ (207) hidden from the user $U_n$ (12). The user client request fields $QD_{n1} \ldots QD_{nu}$ (206) accessible to the user $U_n$ (12) has server requests portion 208, optional instructions portion 209, an optional execute request element 210, and alternate requests portion 212. The hidden client request elements $HU_{n1} \ldots HU_{nh}$ (207) hidden from the user $U_n$ (12) have optional server requests portion 214, optional instructions portion 216, and optional information element $HE_n$ (218).

The server requests portion 208 of the user client request fields $QD_{n1} \ldots QD_{nu}$ (206) accessible to the user $U_n$ (12) has server query fields $QF_{n1} \ldots QF_{nu}$ (220), which the user $U_n$ (12) may enter corresponding server query values $QV_{n1} \ldots QV_{nu}$ (200) thereinto, as a portion of the user input $UI_n$ (25).

The user $U_n$ (12) may also optionally enter the server name values $AV_{n1} \ldots AV_{nu}$ (201) into server name fields $AF_{n1} \ldots AF_{nu}$ (224). The user $U_n$ (12) may enter the server name values $AV_{n1} \ldots AV_{nu}$ (201) as another portion of the user input $UI_n$ (25).

The user $U_n$ (12) may also optionally enter the optional instructions values $VV_{n1} \ldots VV_{nv}$ (202) into optional instruction fields $VF_{n1} \ldots VF_{nv}$ (228) of the optional instructions portion 209 of the user client request fields $QD_{n1} \ldots QD_{nu}$ (206) accessible to the user $U_n$ (12). The user $U_n$ (12) may enter the optional instruction values $VV_{n1} \ldots VV_{nv}$ (202) as yet another portion of the user input $UI_n$ (25).

Upon the user $U_n$ (12) entering the user input $UI_n$ (25) of the server query values $QV_{n1} \ldots QV_{nu}$ (200) and/or the server name values $AV_{n1} \ldots AV_{nu}$ (201) and/or the optional instruction values $VV_{n1} \ldots VV_{nv}$ (202) into the service and/or information entry request form $IE_n$ (38) at the user interface $I_n$ (14), the completed service and/or information request form $IF_n$ (230) results, shown schematically in FIGS. 79 and 80.

The user $U_n$ (12) may instruct the user interface $I_n$ (14) to communicate the user service and/or information requests $iq_n$ (27), shown in FIG. 80, having the server query values $QV_{n1} \ldots QV_{nu}$ (200) and/or the server name values $AV_{n1} \ldots AV_{nu}$ (201) and/or the optional instruction values $VV_{n1} \ldots VV_{nv}$ (202), from the already completed service and/or information request form $IF_n$ (230) at the user interface $I_n$ (14) to the client $C_n$ (16) by entering the optional execute request element 210, using a point and click device, such as a mouse, light pen, tactile monitor, by entering a carriage return, through other user interface controls, or through other suitable means. FIG. 81 shows a schematic representation of the user service and/or information request $iq_n$ (27).

The user U=hd n (12) may alternatively enter the alternate request links $QL_{n1} \ldots QL_{na}$ (203) or the server request links $UL_{n1} \ldots UL_{ns}$ (204) or the additional request links $SL_{n1} \ldots SL_{nw}$ (71) into the service and/or information entry request form $IE_n$ (38) with a point and click device, such as a mouse, a light pen, tactile monitor, or with alternative and/or other user interface controls or other suitable means, and instruct the user interface $I_n$ (14) to communicate the user service and/or information request $iq_n$ (27), having information associated with the alternate request links $QL_{n1} \ldots QL_{na}$ (203) or the server request links $UL_{n1} \ldots UL_{ns}$ (204) or the additional request links $SL_{n1} \ldots SL_{nw}$ (71), to the client $C_n$ (16).

The server name fields $AF_{n1} \ldots AF_{nu}$ (224) and the optional instruction fields $VF_{n1} \ldots VF_{nv}$ (228) of the service and/or information entry request form $IE_n$ (38) may optionally have the server name values $AV_{n1} \ldots AV_{nu}$ (201) and/or the optional instruction values $VV_{n1} \ldots VV_{nv}$ (202) entered thereinto, respectively, as changeable and/or fixed pre-set or preselected values, drop down menu selections, and/or as blank fields, or a combination thereof. The preselected values may be replaced with values of the user's $U_n$ (12) choice or may remain fixed, depending upon choices offered in the service and/or information entry request form $IE_n$ (38). The drop down menu selections may be changed to ones of a number of preselected choices offered in the drop down menu selections, which the user $U_n$ (12) may optionally scroll through to determine which choice to make. Blank ones of the server name fields $AF_{n1} \ldots AF_{nu}$ (224) and/or blank ones of the optional instruction fields $VF_{n1} \ldots VF_{nv}$ (228) allow the user $U_n$ (12) to optionally enter the server name values $AV_{n1} \ldots AV_{nu}$ (201) and/or the optional instruction values $VV_{n1} \ldots VV_{nv}$ (202), respectively, therein, accordingly.

The server query fields $QF_{n1} \ldots QF_{nu}$ (220), which the user $U_n$ (12) enters the corresponding server query values $QV_{n1} \ldots QV_{nu}$ (200) thereinto, through the user input $UI_n$ (25), may also have changeable and/or fixed preselected values, drop down menu selections, and/or blank fields, or a combination thereof. However, the server query fields $QF_{n1} \ldots QF_{nu}$ (220) may generally be presented to the user $U_n$ (12) as blank fields, at least for the first user input $UI_n$ (25).

The alternate requests portion 212 of the user client request fields $QD_{n1} \ldots QD_{nu}$ (206) accessible to the user $U_n$ (12) had the alternate request links $QL_{n1} \ldots QL_{na}$ (203), the server request links $UL_{n1} \ldots UL_{ns}$ (204), and the additional request links $SL_{n1} \ldots SL_{nw}$ (71). The user $U_n$ (12) may alternatively request services and/or information through one of the alternate request links $QL_{n1} \ldots QL_{na}$ (203), or one of the server request links $UL_{n1}$ . . . $UL_{ns}$ (204), or one of the additional request links $SL_{n1}$ . . . $SL_{nw}$ (71).

The alternate request links $QL_{n1}$ . . . $QL_{na}$ (203) allow the user $U_n$ (12) to make the service and/or information request $IQ_1$ . . . $IQ_a$ (28) with preconfigured optional default selections already placed in the service and/or information request $IQ_1$ . . . $IQ_n$ (28) for the user $U_n$ (12). The server request links $UL_{n1}$ . . . $UL_{nw}$ (204) may be advertisements, advertising links, and/or links to ones of the optional servers $SO_1$ . . . $SO_p$ (22). The user $U_n$ (12) may, for example, make requests for additional services and/or information from ones of the optional servers $SO_1$ . . . $SO_p$ (22), using the server request links $UL_{n1}$ . . . $UL_{nw}$ (204). The additional request links $SL_{n1}$ . . . $SL_{nw}$ (71) allow the user $U_n$ $_n$(12) to make additional optional selections, based upon information and/or services previously requested by the user $U_n$ (12).

The optional server requests portion 214 of the hidden client request elements $HU_{n1}$ . . . $HU_{nh}$ (207) hidden from the user $U_n$ (12) has hidden query elements $Qh_{n1}$ . . . $Qh_{nh}$ (236) and corresponding associated hidden server name elements $Ah_{n1}$ . . . $Ah_{nh}$ (238). The optional instructions portion 216 of the hidden client request elements $HU_{n1}$ . . . $HU_{nh}$ (207) hidden from the user $U_n$ (12) may have optional hidden instruction elements $Vh_{n1}$ . . . $VH_{ni}$ (240). The hidden client request elements $HU_{n1}$ . . . $HU_{nh}$ (207) hidden from the user $U_n$ (12) may also have the hidden optional information element $HE_n$ (218), which may have optional information and/or statistics.

The user $U_n$ (12) may, thus, request the service and/or information by completing entry of the server requests portion 208 and the optional instructions portion 209 with the optional execute request element 210, after entering the server query values $QV_{n1}$ . . . $QV_{nu}$ (200) and/or the server name values $AV_{n1}$ . . . $AV_{nu}$ (201) and/or the optional instruction values $VV_{n1}$ . . . $VV_{nv}$ (202), or by alternatively requesting the services and/or information through one of the alternate requests links $QL_{n1}$ . . . $QL_{na}$ (203), or one of the server request links $UL_{n1}$ . . . $UL_{ns}$ (204), or one of the additional request links $SL_{n1}$ . . . $SL_{nw}$ (71).

Upon completion of the user input $UI_n$ (25), the completed service and/or information request form $IF_n$ (230), as shown in FIGS. 79 and 80, has user client request elements $QM_{n1}$ . . . $QM_{nu}$ (246) accessible to the user $U_n$ (12) having server request elements 242 and optional instruction elements $VE_{n1}$ . . . $VE_{nv}$ (244); and/or alternate request elements 248 of the user client request elements $QM_{n1}$ . . . $QM_{nu}$ (246) accessible to the user $U_n$ (12); and/or optional server request elements 250, optional instruction elements 252, and/or hidden client request elements $HP_{n1}$ . . . $HP_{nh}$ (256) hidden from the user $U_n$ (12).

The user $U_n$ (12) may instruct the user interface $I_n$ (14) to communicate the user service and/or information request $iq_n$ (27) derived from the service and/or information request form $IF_n$ (230) to the client $C_n$ (16), as shown in FIG. 81, with the optional execute request element 210 or with the other suitable means; or the user $U_n$ (12) may alternatively communicate the user service and/or information request $iq_n$ (27) by entering the alternate request links $QL_{n1}$ . . . $QL_{na}$ (203) or the server request links $UL_{n1}$ . . . $UL_{ns}$ (204) or the additional request links $SL_{n1}$ . . . $SL_{nw}$ (71) into the service and/or information entry request form $IE_n$ (38) or into the completed service and/or information request form $IF_n$ (230) with a point and click device, such as a mouse, a light pen, tactile monitor, or with alternative and/or other user interface controls or other suitable means, and instruct the user interface $I_n$ (14) to communicate the user service and/or information request $iq_n$ (27), having information associated with the alternate request links $QL_{n1}$ . . . $QL_{na}$ (203) or the server request links $UL_{n1}$ . . . $UL_{ns}$ (204) or the additional request links $SL_{n1}$ . . . $SL_{nw}$ (71), to the client $C_n$ (16).

FIGS. 79 and 80 are schematic representations of the completed service and/or information entry request form $IF_n$ (230) showing typical elements, values, field names, name-value pairs, optional instructions, and alternate requests, resulting from the user $U_n$ (12) entering the user input $UI_n$ (25) of the server query values $QV_{n1}$ . . . $QV_{nu}$ (200) and/or the server name values $AV_{n1}$ . . . $AV_{nu}$ (201) and/or the optional instruction values $VV_{n1}$ . . . $VV_{nv}$ (202) into the service and/or information entry request form $IE_n$ (38) at the user interface $I_n$ (14).

Now, the completed service and/or information entry request form $IF_n$ (230) has the user client request elements $QM_{n1}$ . . . $QM_{nu}$ (246) accessible to the user $U_n$ (12) having the server request elements 242, which has query elements $QE_{n1}$ . . . $QE_{nu}$ (258) and corresponding associated server name elements $AE_{n1}$ . . . $AE_{nu}$ (260).

Each of the query elements $QE_{n1}$ . . . $QE_{nu}$ (258) have query field names $QN_{n1}$ . . . $QN_{nu}$ (262) of the associated corresponding server query fields $QF_{n1}$ . . . $QF_{nu}$ (220) and the corresponding server query values $QV_{n1}$ . . . $QV_{nu}$ (200) associated therewith, which the requests $Q_{11}$ . . . $Q_{nm}$ (29) may be derived therefrom.

Each of the server name elements $AE_{n1}$ . . . $AE_{nu}$ (260) have server field names $AN_{n1}$ . . . $AN_{nm}$ (264) of the associated corresponding server name fields $AF_{n1}$ . . . $AF_{nu}$ (224) and the corresponding server name values $AV_{n1}$ . . . $AV_{nu}$ (201) associated therewith, which server addresses $A_{n1}$ . . . $A_{nu}$ (265) may be derived therefrom.

The user client request elements $QM_{n1}$ . . . $QM_{nu}$ (246) accessible to the user $U_n$ (12) also have the optional instruction elements $VE_{n1}$ . . . $VE_{nv}$ (244) having optional instruction field names $VN_{n1}$ . . . $VN_{nv}$ (266) of the associated corresponding optional instruction fields $VF_{n1}$ . . . $VF_{nv}$ (228) and the corresponding optional instruction values $VV_{n1}$ . . . $VV_{nv}$ (202) associated therewith.

The user client request elements $QM_{n1}$ . . . $QM_{nu}$ (246) accessible to the user $U_n$ (12) also have the alternate request elements 246 having the alternate request links $QL_{n1}$ . . . $QL_{nu}$ (203), or the server request links $UL_{n1}$ . . . $UL_{ns}$ (204), or the additional request links $SL_{n1}$ . . . $SL_{nw}$ (71).

The hidden client request elements $HP_{n1}$ . . . $HP_{nh}$ (256) hidden from the user $U_n$ (12) have the hidden query elements $Qh_{n1}$ . . . $Qh_{nh}$ (236), which may have hidden query field names $Qn_{n1}$ . . . $Qn_{nh}$ (268) and corresponding hidden query values $Qv_{n1}$ . . . $Qv_{nh}$ (270) associated therewith. The hidden server name elements $Ah_{n1}$ . . . $Ah_{nh}$ (238) may have hidden server field names $An_{n1}$ . . . $An_{nh}$ (272) and corresponding server hidden request name values $Av_{n1}$ . . . $Av_{nh}$ (274) associated therewith.

The hidden client request elements $HP_{n1}$ . . . $HP_{nh}$ (256) hidden from the user $U_n$ (12) may also have the optional hidden instruction elements $Vh_{n1}$ . . . $Vh_{ni}$ (240), which may have optional hidden instruction field names $Vn_{n1}$ . . . $Vn_{ni}$ (275) and corresponding optional hidden instruction values $Vv_{n1}$ . . . $V_{ni}$ (276) associated therewith. The hidden client request elements $HP_{n1}$ . . . $HP_{nh}$ (256) hidden from the user $U_n$ (12) may also have the hidden optional information element $HE_n$ (218), which may have optional hidden information element field name $Jn_n$ (277) and optional hidden information element value $Jv_n$ (278) associated therewith.

Now again, the user interfaces $I_1$ . . . $I_n$ (14) may each be different, one from the other, or the same, and may change characteristics over time. Each of the user interfaces $I_1$ . . . $I_n$ (14) may change characteristics as a function of time, information, and/or instructions, and/or other means, which may be derived by the users $U_1 \ldots U_n$ (12) and/or the clients $C_{n1} \ldots C_n$ (16) and/or the servers $S_1 \ldots S_z$ (20), and/or the server PS (18), and/or the optional servers $SO_1 \ldots SO_p$ (22), and/or derived within the user interfaces $I_1 \ldots I_n$ (14). The user interface $I_1 \ldots I_n$ (14) may change state.

The user interface $I_1 \ldots I_n$ (14) may also change as a function of optional times and/or timed instructions associated with the user interfaces $I_1 \ldots I_n$ (14), and/or associated with the clients $C_1 \ldots C_n$ (16) and/or associated with the servers $S_1 \ldots S_z$ (20), and/or associated with the server PS (18), and/or associated with the optional servers $SO_1 \ldots SO_p$ (22), and/or instructions from the user $U_1 \ldots U_n$ (12). Changes in the user interface $I_n$ (14) may appear continuous to the user $U_n$ (12), spaced in time, staccato, or static depending upon the optional timers and/or the timed instructions. Other conditions may change the user interface $I_1 \ldots I_n$ (14), as well.

The user interfaces $I_1 \ldots I_n$ (14) may be visual, such as graphical user interfaces, aural, and/or tactile, a combination thereof, and/or other suitable means. The user interfaces $I_1 \ldots I_n$ (14) may be integral with the clients $C_1 \ldots C_n$ (16) or separate therefrom.

The user interfaces $I_1 \ldots I_n$ (14) may change in response to the user inputs $UI_1 \ldots UI_n$ (25), the service and/or information entry request forms $IE_1 \ldots IE_n$ (38) at the user interfaces $I_1 \ldots I_n$ (14), the completed service and/or information request forms $IF_n$ (230), the user service and/or information requests $iq_1 \ldots iq_n$ (27), the optional execute request elements 210, accessing the alternate request links $QL_{11} \ldots QL_{1a}$ (203), accessing the server request links $UL_{11} \ldots UL_{1s}$ (204), accessing the additional request links $SL_{11} \ldots SL_{1w}$ (71), the service and/or information responses $IR_1 \ldots IR_n$ (34), the service and/or information response forms $IS_1 \ldots IS_n$ (39). Other conditions may change the user interface $I_1 \ldots I_n$ (14), as well.

Portions of the user responses $UR_1 \ldots UR_n$ (37) may be mapped into and/or onto different portions of the user interfaces $I_1 \ldots I_n$ (14) to facilitate interaction with and the needs of each of the users $U_1 \ldots U_n$ (12). Such mappings may be optionally customized by the users $U_1 \ldots U_n$ (12).

C. SERVICE AND/OR INFORMATION REQUEST DETAILS

Each of the users $U_1 \ldots U_n$ (12) communicate the corresponding user service and/or information requests $iq_1 \ldots iq_n$ (27) through the corresponding user interfaces $I_1 \ldots I_n$ (14) to the corresponding clients $C_1 \ldots C_n$ (16), which optionally format the corresponding user service and/or information requests $iq_1 \ldots iq_n$ (27) into the corresponding service and/or information requests $IQ_1 \ldots IQ_n$ (28), as required.

Now, again, the user $U_n$ (12) may instruct the user interface $I_n$ (14) to communicate the user service and/or information requests $iq_n$ (27) having the server query values $QV_{n1} \ldots QV_{nu}$ (200) and/or the server name values $AV_{n1} \ldots AV_{nu}$ (201) and/or the optional instruction values $VV_{n1} \ldots VV_{nv}$ (202), from the already completed service and/or information request form $IF_n$ (230) at the user interface $I_n$ (14) to the client $C_n$ (16) by entering the optional execute request element 210, using a point and click device, such as a mouse, light pen, tactile monitor, by entering a carriage return, through other user interface controls, or through other suitable means. FIG. 81 shows a schematic representation of the user service and/or information request $iq_n$ (27).

The user U=hd n (12) may alternatively enter the alternate request links $QL_{n1} \ldots QL_{na}$ (203) or the server request links $UL_{n1} \ldots UL_{ns}$ (204) or the additional request links $SL_{n1} \ldots SL_{nw}$ (71) into the service and/or information entry request form $IE_n$ (38) with a point and click device, such as a mouse, a light pen, tactile monitor, or with alternative and/or other user interface controls or other suitable means, and instruct the user interface $I_n$ (14) to communicate the user service and/or information request $iq_n$ (27), having information associated with the alternate request links $QL_{n1} \ldots QL_{na}$ (203) or the server request links $UL_{n1} \ldots UL_{ns}$ (204) or the additional request links $SL_{n1} \ldots SL_{nw}$ (71), to the client $C_n$ (16).

The user service and/or information request $iq_n$ (27) is communicated from the user interface $I_n$ (14) to the client $C_n$ (16), which acts upon the user service and/or information request $iq_n$ (27) to derive the service and/or information request $IQ_n$ (28) therefrom. FIGS. 81–86 are schematic representations of the service and/or information request $IQ_n$ (28) and/or the user service and/or information request $iq_n$ (27).

The service and/or information request $IQ_n$ (28) has information and/or elements, which may be used by the server PS (18) to make the requests $Q_{n1} \ldots Q_{nm}$ (29) of the servers $S_1 \ldots S_z$ (20), in accordance with the designation scheme with designates the ones of the servers $S_1 \ldots S_z$ (20) to be communicated with corresponding to the requests $Q_{11} \ldots Q_{nm}$ (29) as the corresponding server designations $S_{11} \ldots S_{nm}$ (30). The client $C_n$ (16) may additionally and/or alternatively make the requests $Q_{n1} \ldots Q_{nm}$ (29) of the servers $S_1 \ldots S_z$ (20), using information and/or elements within the user service and/or information request $iq_n$ (27).

The service and/or information request $IQ_n$ (28) has user client requests $QC_{n1} \ldots QC_{nu}$ (280) accessible to the user $U_n$ (12) and hidden client requests $HC_{n1} \ldots HC_{nh}$ (281) hidden from the user $U_n$ (12).

The user client requests $QC_{n1} \ldots QC_{nu}$ (280) accessible to the user $U_n$ (12) and/or the hidden client requests $HC_{n1} \ldots HC_{nh}$ (281) hidden from the user $U_n$ (12) have address and/or location information and/or instructions, and/or other information corresponding to information and/or services to be requested of the servers $S_1 \ldots S_z$ (20), and/or information and/or instructions to be utilized by the server PS (18) and/or ones of the clients $C_1 \ldots C_n$ (16).

The user client requests $QC_{n1} \ldots QC_{nu}$ (280) accessible to the user $U_n$ (12) have server requests portion $SQ_n$ (282), optional instructions portion $V_n$ (283), and alternate request portion $AL_n$ (284).

The hidden client requests $HC_{n1} \ldots HC_{nh}$ (281) hidden from the user $U_n$ (12) has optional hidden server requests portion $HQ_n$ (285), optional hidden instructions portion $HO_n$ (286), and optional hidden information portion $J_n$ (287).

The server requests portion $SQ_n$ (282) of the service and/or information request $IQ_n$ (28) has queries $QS_{n1} \ldots QS_{nu}$ (288), which may be derived from the query field names $QN_{n1} \ldots QN_{nu}$ (262) and the corresponding server query values $QV_{n1} \ldots QV_{nu}$ (200) of the query elements $QE_{n1} \ldots QE_{nu}$ (258).

The server requests portion $SQ_n$ (282) of the service and/or information request $IQ_n$ (28) may also have the server addresses $A_{n1} \ldots A_{nu}$ (265), which may be derived from the server field names $AN_{n1} \ldots AN_{nm}$ (264) and the corresponding server name values $AV_{n1} \ldots AV_{nu}$ (201) of the server name elements $AE_{n1} \ldots AE_{nu}$ (260).

The optional instructions portion $VO_n$ (283) of the user client request $QC_{n1} \ldots QC_{nu}$ (280) accessible to the user $U_n$ (12) of the service and/or information request $IQ_n$ (28) may have optional instructions $V_{n1} \ldots V_{nv}$ (289), which may be derived from the optional instructions field names $VN_{n1} \ldots VN_{nv}$ (266) and the corresponding optional instruction values $VV_{n1} \ldots VV_{nv}$ (202). The optional instructions $V_{n1} \ldots V_{nv}$ (289) may optionally be used by the client $C_n$ (16) and/or the server PS (18), and/or incorporated into the requests $Q_{n1} \ldots Q_{nm}$ (29) to be made of the servers $S_1 \ldots S_z$ (20) designated by the server designations $S_{n1} \ldots S_{nm}$ (30), corresponding to the requests $Q_{n1} \ldots Q_{nm}$ (29) associated with the user $U_n$ (12).

The alternate request portion $AL_n$ (284) of the user client requests $QC_{n1} \ldots QC_{nu}$ (280) accessible to the user $U_n$ 912) of the service and/or information request $IQ_n$ (28) may be derived from one of the alternate request links $QL_{n1} \ldots QL_{na}$ (203), or one of the server request links $UL_{n1} \ldots UL_{ns}$ (204), or one of the additional request links $SL_{n1} \ldots SL_{nw}$ (71).

The optional hidden server requests portion $HQ_{n1} \ldots HQ_{nh}$ (281) of the hidden client requests $HC_{n1} \ldots HC_{nh}$ (281) hidden from the user $U_n$ (12) may have hidden queries $QH_{n1} \ldots QH_{nh}$ (290) and corresponding hidden server addresses $AH_{n1} \ldots AH_{nh}$ (291).

The hidden queries $QH_{n1} \ldots QH_{nh}$ (290) of the optional hidden server requests portion $HQ_{n1} \ldots HQ_{nh}$ (281) of the service and/or information request $IQ_n$ (28) may be derived from the hidden query field names $Qn_{n1} \ldots Qn_{nh}$ (268) and the corresponding hidden query values $Qv_{n1} \ldots Qv_{nh}$ (270).

The hidden server addresses $AH_{n1} \ldots AH_{nh}$ (291) of the optional hidden server requests portion $HQ_{n1} \ldots HQ_{nh}$ (281) of the service and/or information request $IQ_n$ (28) may be derived from the hidden server field names $An_{n1} \ldots An_{nh}$ (272) and the corresponding server hidden server name values $Av_{n1} \ldots Av_{nh}$ (274).

The hidden queries $QH_{n1} \ldots QH_{nh}$ (290) may optionally be appended to the queries $QS_{n1} \ldots QS_{nu}$ (288) to be made of the servers $S_1 \ldots S_z$ (20). The hidden server addresses $AH_{n1} \ldots AH_{nh}$ (291) may optionally be appended to the server addresses $A_{n1} \ldots A_{nu}$ (265). The appended queries $QS_{n1} \ldots QS_{nu}$ (288) may then be made of the servers $S_1 \ldots S_z$ (20) designated by the server designations $S_{n1} \ldots S_{nm}$ (30), corresponding to the resulting appended requests $Q_{n1} \ldots Q_{nm}$ (29) associated with the user $U_n$ (12), in accordance with the appended server addresses $A_{n1} \ldots A_{nu}$ (265).

The appended requests $Q_{n1} \ldots Q_{nm}$ (29) will hereinafter be used synonymously with the requests $Q_{n1} \ldots Q_{nm}$ (29), the appended queries $QS_{n1} \ldots QS_{nu}$ (288) will hereinafter be used synonymously with the queries $QS_{n1} \ldots QS_{nu}$ (288), and the appended server addresses $A_{n1} \ldots A_{nu}$ (265) will hereinafter be used synonymously with the server addresses $A_{n1} \ldots A_{nu}$ (265).

The optional hidden instructions portion $HO_n$ (286) of the hidden client requests $HC_{n1} \ldots HC_{nh}$ (281) hidden from the user $U_n$ (12) of the service and/or information request $IQ_n$ (28) have optional hidden instructions $H_{n1} \ldots H_{ni}$ (292), which may be derived form the hidden instruction field names $Vn_{n1} \ldots Vn_{ni}$ (275) and the corresponding optional hidden instruction values $Vv_{n1} \ldots Vv_{ni}$ (276). The optional hidden instructions $H_{n1} \ldots H_{ni}$ (292) may optionally be appended to the optional instructions $V_{n1} \ldots V_{nv}$ (289) and/or may optionally be used by the client $C_n$ (16) and/or the server PS (18), and/or incorporated into the requests $Q_{n1} \ldots Q_{nm}$ (29) to be made of the servers $S_1 \ldots S_z$ (29) associated with the user $U_n$ (12). The appended instructions $V_{n1} \ldots V_{nv}$ (289) will hereinafter be used synonymously with the instructions $V_{n1} \ldots V_{nv}$ (289).

The optional hidden information portion $J_n$ (287) of the hidden client requests $HC_{n1} \ldots HC_{nh}$ (281) hidden from the user $U_n$ (12) of the service and/or information request $IQ_n$ (28) may be derived from the optional hidden information element field name $Jn_n$ (277) and the optional hidden information element value $Jv_n$ (278), and may optionally be used by the client $C_n$ (16) and/or the server PS (18), and/or incorporated into the requests $Q_{n1} \ldots Q_{nm}$ (29) to be made of the servers $S_1 \ldots S_z$ 920) designated by the server designations $S_{n1} \ldots S_{nm}$ (30), corresponding to the requests $Q_{n1} \ldots Q_{nm}$ (29) associated with the user $U_n$ (12).

Now, again, each of the users $U_1 \ldots U_n$ (12) communicate the corresponding user service and/or information request $iq_1 \ldots iq_n$ (27) through the corresponding user interfaces $I_1 \ldots I_n$ (14) to the corresponding clients $C_1 \ldots C_n$ 916), which optionally format the corresponding user service and/or information requests $iq_1 \ldots iq_n$ (27) into the corresponding service and/or information requests $IQ_1 \ldots IQ_n$ (28), as required.

The user service and/or information requests $iq_1 \ldots iq_n$ (27) may be communicated from the completed service and/or information entry request forms $IF_1 \ldots IF_n$ (230) at the user interfaces $I_1 \ldots I_n$ 914) to the clients $C_1 \ldots C_n$ (16) or alternatively from the service and/or information entry request forms $IE_1 \ldots IE_n$ (38) at the corresponding user interfaces $I_1 \ldots I_n$ (14) through the alternate request links $QL_{11} \ldots QL_{nm}$ (203) or the server request links $UL_{11} \ldots UL_{ns}$ (204) or the additional request links $SL_{11} \ldots SL_{nw}$ (71).

The user service and/or information requests $iq_1 \ldots iq_n$ (27) may be communicated as the elements, values, field names, optional instructions, and/or alternate requests entered into the completed service and/or information entry request form $IF_n$ (230) from the corresponding user interfaces $I_1 \ldots I_n$ 914) to the corresponding clients $C_1 \ldots C_n$ (16).

The users $U_1 \ldots U_n$ (12) may, thus, communicate the corresponding user service and/or information requests $iq_1 \ldots iq_n$ (27) to the clients $C_1 \ldots C_n$ (16) through the user interfaces $I_1 \ldots I_n$ (14), upon entering the corresponding user inputs $UI_1 \ldots UI_n$ (25) into the corresponding service and/or information entry request forms $IE_1 \ldots IE_n$ (38) at the corresponding user interfaces $I_1 \ldots I_n$ (14). The completed service and/or information entry request forms $IF_1 \ldots IF_n$ (230) are derived from the user inputs $UI_1 \ldots UI_n$ (25) having the corresponding user service and/or information requests $iq_1 \ldots iq_n$ (27), which may be entered as values or alternate requests thereinto the corresponding service and/or information entry request forms $IE_1 \ldots IE_n$ (38).

The user $U_1 \ldots U_n$ (12) may alternatively communicate the user service and/or information requests $iq_1 \ldots iq_n$ (27) by entering the alternate request links $QL_{11} \ldots QL_{na}$ (203) or the server request links $UL_{11} \ldots UL_{ns}$ (204) or the additional request links $SL_{11} \ldots SL_{nw}$ (71) into the service and/or information entry request form $IE_1 \ldots IE_n$ (38) or into the completed service and/or information request form $IF_1 \ldots IF_n$ (230).

The server PS (18) and/or the $C_n$ 916) may alternatively and/or additionally use information resident within the server PS (18) and/or the client $C_n$ 916), such as default information, and/or information communicated from the user $U_n$ 912) through the user interface $I_n$ 914) to the client $C_n$ (16) to make the requests $Q_{n1} \ldots Q_{nm}$ (29) of the servers $S_1 \ldots S_z$ (20), in accordance with the designation scheme which designates the ones of the servers $S_1 \ldots S_z$ (20) to be communicated with corresponding to the requests $Q_{11} \ldots Q_{nm}$ (29) as the corresponding server designations $S_{11} \ldots S_{nm}$ (30).

FIG. 87 is a schematic representation showing queries $QQ_{n1}$ . . . $QQ_{nm}$ (53) and corresponding server addresses $AQ_{n1}$ . . . $AQ_{nm}$ (54). FIGS. 88–91 show the schematic representation of FIG. 87 having typical values.

D. OPTIONAL INSTRUCTIONS

Typically, information within the optional instructions $V_{11}$ . . . $V_{nv}$ (289), and/or the optional hidden instructions $H_{11}$ . . . $H_{ni}$ (292), and/or the optional hidden information portion $J_n$ (287) are used by the server PS (18) and/or specific ones of the clients $C_1$ . . . $C_n$ (16), but may also be used by the servers $S_1$ . . . $S_z$ (20).

Now, in yet more detail, the user inputs $UI_1$ . . . $UI_n$ (25) may have one or more of the same and/or different optional instruction values $VV_{11}$ . . . $VV_{nv}$ (202). The optional instruction values $VV_{11}$ . . . $VV_{nv}$ (202) may typically have instructions, which may be used by the server PS (18) and/or the clients $C_1$ . . . $C_n$ (16), such as, for example, as instructions on how to request, organize, present and/or display, and/or retrieve services and/or information from the servers $S_1$ . . . $S_z$ (20) and/or other suitable instructions.

Typical information that may be incorporated into the optional instruction values $VV_{n1}$ . . . $VV_{nv}$ (202) may include, for example, Searches per Group 311 and Group 312, shown in FIGS. 5A, 5B, and 6–10 for a particular one of the service and/or information entry request forms $IE_n$ (38) at the user interface $I_n$ (14) shown in FIGS. 81–86.

The Searches per Group 311 is considered to be the number of the server query values $QV_{n1}$ . . . $QV_{nu}$ (200), associated with corresponding ones of the server name values $AV_{n1}$ . . . $AV_{nu}$ (201), corresponding to the requests $Q_{n1}$ . . . $Q_{nm}$ (29) to make of the servers $S_1$ . . . $S_z$ (20). The Group 312 is considered to be the group of the server query values $QV_{n1}$ . . . $QV_{nu}$ (200) to communicate to the ones of the servers $S_1$ . . . $S_z$ (20) associated with the corresponding ones of the server name values $AV_{n1}$ . . . $AV_{nu}$ (201), in accordance with the designation scheme corresponding to the corresponding ones of the server designations $S_{n1}$ . . . $S_{nm}$ (30), corresponding to the request $Q_{n1}$ . . . $Q_{nm}$ (29).

Page 313, which includes certain service and/or information location information, which may be incorporated into the requests $Q_{n1}$ . . . $Q_{nm}$ (29) to be made of the associated corresponding ones of the servers $S_1$ . . . $S_z$ (20), in accordance with the designation scheme corresponding to the corresponding ones of the server designations $S_{n1}$ . . . $S_{nm}$ (30), may also be typically incorporated into the optional instruction values $VV_{n1}$ . . . $VV_{nv}$ (202).

Timeout per Search Engine 314, which is substantially the maximum time for the server PS (18) and/or the particular client $C_n$ (16) making the requests $Q_{n1}$ . . . $Q_{nm}$ (29) to wait for each of the responses $R_{n1}$ . . . $R_{nm}$ (32) from certain ones of the servers $S_1$ . . . $S_z$ 920), in accordance with the designation scheme which designates the certain ones of the servers $S_1$ . . . $S_z$ (20) to be communicated with corresponding to the requests $Q_{n1}$ . . . $Q_{nm}$ (29) as the corresponding server designations $S_{n1}$ . . . $S_{nm}$ 930), may also be typically incorporated into the optional instruction values $VV_{n1}$ . . . $VV_{nv}$ (202).

URL's per Search Engine 315, which is the number of links and/or descriptions to be returned to the user interface $I_n$ (14) from each of the responses $R_{n1}$ . . . $R_{nm}$ (32), may also be typically incorporated into the optional instruction values $VV_{n1}$ . . . $VV_{nv}$ (202). Search Engine Results 316 and URL Details 317, each of which designate different presentation and/or display schemes to be presented at the user interface $I_n$ (14), may also be typically incorporated into the optional instruction values $VV_{n1}$ . . . $VV_{nv}$ (202).

In those instance in which, for example, the service and/or information entry request form $IE_n$ (38) at the user interface $I_n$ (14) has only one entry field for one of the requests $Q_{n1}$ (29), as in FIGS. 6, 8, and 10, and the optional instruction values $VV_{11}$ . . . $VV_{nv}$ (202) are not visible, the server PS (18) and/or the particular client $C_n$ (16) may then have default values resident therein for the Searches per Group 311, and/or the Group 312, and/or the Page 313, and/or the Timeout per Search Engine 314, and/or the URL's per Search Engine 315, and/or the Search Engine Results 316, and/or the URL Details 317, and/or other suitable ones of the optional instruction values $VV_{11}$ . . . $VV_{nv}$ (202), and/or the server PS (18) and/or the particular client $C_n$ (16) may establish the default values, and/or the default values may be incorporated into the optional hidden instruction values $Vv_{n1}$ . . . $Vv_{ni}$ (276).

The server PS (18) and/or the particular client $C_n$ (16) may make the requests $Q_{n1}$ . . . $Q_{nm}$ (29) of the servers $S_1$ . . . $S_z$ 920), according to the designation scheme corresponding to the corresponding ones of the server designations $S_{n1}$ . . . $S_{nm}$ (30), and the optional instruction values $VV_{n1}$ . . . $VV_{nv}$ (202), typically having the Searches per Group 311, and/or the Group 312, and/or the Page 313, and/or the Timeout per Search Engine 314, and/or the URL's per Search Engine 315, and/or the Search Engine Results 316, and/or the URL Details 317, and/or the default values which may be established or to be resident within the server PS (18) and/or the particular client $C_n$ (16), and/or the optional hidden instruction values $Vv_{n1}$ . . . $Vv_{ni}$ (276), and/or other information incorporated into the hidden client request elements $HP_{n1}$ . . . $HP_{nh}$ (256) hidden from the user $U_n$ (12).

E. COMMUNICATING THE SERVICE AND/OR INFORMATION REQUESTS

Now, each of the users $U_1$ . . . $U_n$ (12) communicate the corresponding user service and/or information requests $iq_1$ . . . $iq_n$ (27) through the corresponding user interfaces $I_1$ . . . $I_n$ (14) to the corresponding clients $C_1$ . . . $C_n$ (16), which optionally format the corresponding user service and/or information requests $iq_1$ . . . $iq_n$ (27) into the corresponding service and/or information requests $IQ_1$ . . . $IQ_n$ (28). The clients $C_1$ . . . $C_n$ (16) communicate the corresponding service and/or information requests $IQ_1$ . . . $IQ_n$ 928) to the server PS (18) and/or use the corresponding user service and/or information requests $iq_1$ . . . $iq_n$ (27) internally to formulate the requests $Q_{11}$ . . . $Q_{nm}$ (29).

F. PARING, PROCESSING, AND/OR FORMATTING THE SERVICE AND/OR INFORMATION REQUESTS

The server PS (18) and/or the clients $C_1$ . . . $C_n$ 916) parse, process, and/or format the service and/or information requests $IQ_1$ . . . $IQ_n$ (28) into the requests $Q_{11}$ . . . $Q_{nm}$ (29), the optional instructions $VJ_{11}$ . . . $VJ_{nk}$ (52), and information to open connections $OC_{11}$ . . . $OC_{nm}$ (323). FIG. 92 shows a particular one of the requests $Q_{nm}$ (29), the optional instructions $VJ_{n1}$ . . . $VJ_{nk}$ (52), and the information to open connections $OC_{11}$ . . . $OC_{nm}$ (323), which may be parsed, processed, and/or formatted from a particular one of the service and/or information requests $IQ_n$ (28). The clients $C_1$ . . . $C_n$ (16) may alternatively and/or additionally parse, process, and/or format the user service and/or information requests $iq_1$ . . . $iq_n$ (27) directly into the requests $Q_{11}$ . . . $Q_{nm}$ (29), and/or the optional instructions $VJ_{11} \ldots VJ_{nk}$ (52) and the information required to open the connections $OC_{11} \ldots OC_{nm}$ (323), as required.

Upon receipt of the service and/or information requests $IQ_1 \ldots IQ_n$ (28) at the server PS (18), communicated form the clients $C_1 \ldots C_n$ (16), the server PS (18) parses, processes, and/or formats each of the corresponding service and/or information requests $IQ_1 \ldots IQ_n$ (28) into the corresponding queries $QQ_{11} \ldots QQ_{nm}$ (53) and the corresponding server addresses $AQ_{11} \ldots AQ_{nm}$ (54) to open connections $OC_{11} \ldots OC_{nm}$ (323) with and make the requests $Q_{11} \ldots Q_{nm}$ (29) of the servers $S_1 \ldots S_z$ (20), in accordance with the designation scheme which designates the certain ones of the servers $S_1 \ldots S_z$ 920) to be communicated with corresponding to the requests $Q_{11} \ldots Q_{nm}$ (29), and/or the optional instructions $VJ_{11} \ldots VJ_{nk}$ (52) to be used by the server PS (18) in making the request $Q_{11} \ldots Q_{nm}$ (29) and/or in processing, formatting, grouping, and organizing the responses $R_{11} \ldots R_{nm}$ (32) from the ones of the servers $S_1 \ldots S_z$ 920) corresponding to the server designations $S_{11} \ldots S_{nm}$ (30), and/or the additional optional responses $RA_{11} \ldots RA_{nm}$ (40), into the corresponding service and/or information responses $IR_1 \ldots IR_n$ (34), as shown in FIG. 92.

Alternatively and/or additionally, upon receipt of the user service and/or information requests $iq_1 \ldots iq_n$ (27) at the corresponding clients $C_1 \ldots C_n$ (16), the corresponding clients $C_1 \ldots C_n$ (16) may parse, process, and/or format each of the user service and/or information requests $iq_1 \ldots iq_n$ (27) into corresponding queries $QQ_{11} \ldots QQ_{nm}$ (53) and corresponding server addresses $AQ_{11} \ldots AQ_{nm}$ (54) to open connections $OC_{11} \ldots OC_{nm}$ (323) with and make the requests $Q_{11} \ldots Q_{nm}$ (29) of the servers $S_1 \ldots S_z$ (20), in accordance with the designation scheme which designates the certain ones of the servers $S_1 \ldots S_z$ (20) to be communicated with corresponding to the requests $Q_{11} \ldots Q_{nm}$ (29), and/or the optional instructions $VJ_{11} \ldots VJ_{nk}$ (52) to be used by the corresponding clients $C_1 \ldots C_n$ (16) in making the requests $Q_{11} \ldots Q_{nm}$ (29) and/or in processing, formatting, grouping, and organizing the responses $R_{11} \ldots R_{nm}$ (32) from the ones of the servers $S_1 \ldots S_z$ (20) corresponding to the server designations $S_{11} \ldots S_{nm}$ (30), and/or the additional optional responses $RA_{11} \ldots RA_{nm}$ (40), into the corresponding user service and/or information responses $ir_1 \ldots ir_n$ (36).

The server PS (18) parses, processes, and/or formats each of the service and/or information requests $IQ_1 \ldots IQ_n$ (28) into queries, server addresses to make the queries of, query groups and/or server groups, and instructions to be used by the server PS (18), typically when the server PS (18) makes the requests $Q_{11} \ldots Q_{nm}$ (29) of the servers $S_1 \ldots S_z$ (20) corresponding to the server designations $S_{11} \ldots S_{nm}$ 930) and/or the server PS (18) processes, formats, groups, and organizes the responses $R_{11} \ldots R_{nm}$ (32) from the ones of the servers $S_1 \ldots S_z$ (20) corresponding to the server designations $S_{11} \ldots S_{nm}$ (30) at the server PS (18). Otherwise, the clients $C_1 \ldots C_n$ 916) may parse, process, and/or format each of the user service and/or information requests $iq_1 \ldots iq_n$ (27) into queries, server addresses to make the queries of, query groups and/or server groups, and instructions, typically when the clients $C_1 \ldots C_n$ (16) make the requests $Q_{11} \ldots Q_{nm}$ (29) of the servers $S_1 \ldots S_z$ 920) corresponding to the server designations $S_{11} \ldots S_{nm}$ (30) and/or the clients $C_1 \ldots C_n$ (16) process, format, group, and organize the responses $R_{11} \ldots R_{nm}$ (32) from the ones of the servers $S_1 \ldots S_z$ (20) corresponding to the server designations $S_{11} \ldots$ (30) at the corresponding clients $C_1 \ldots C_n$ (16). Choice as to whether the server PS (18) and/or the clients $C_1 \ldots C_n$ 916) makes the requests $Q_{11} \ldots Q_{nm}$ (29) of the servers $S_1 \ldots S_z$ (20) corresponding to the server designations $S_{11} \ldots S_{nm}$ 930) and/or process, format, group, and organize the responses $R_{11} \ldots R_{nm}$ (32) are dependent on processing capabilities of the server PS (18) and/or the clients $C_1 \ldots C_n$ (16) and other factors.

Ones of the requests $Q_{11} \ldots Q_{nm}$ (29) may require further formatting and/or processing by the server PS (18) and/or the corresponding clients $C_1 \ldots C_n$ 916) and/or other ones of the requests $Q_{11} \ldots Q_{nm}$ (29) may already be formatted in accordance with requirements with respect to communications protocols, the service and/or information requests $IQ_1 \ldots IQ_n$ (28), the servers $S_1 \ldots S_z$ (20), and/or the optional servers $SO_1 \ldots SO_p$ (22), and/or the server PS (18), and/or other requirements of the network 24 of the client-server multitasking system 10. The server PS (18) and/or the clients $C_1 \ldots C_n$ (16) parse, process, and/or format the requests $Q_{11} \ldots Q_{nm}$ (29), as required.

G. FORMULATING THE REQUESTS

Each of the optional instructions $VJ_{11} \ldots VJ_{nk}$ (52) is typically parsed, and/or processed, and/or formatted, and/or grouped, and/or organized into particular ones of the optional instructions $VJ_{n1} \ldots VJ_{nk}$ (52) for use by the server PS (18) and/or particular ones of the clients $C_1 \ldots C_n$ (16), a particular one of the clients $C_1 \ldots C_n$ 916) being designated as the client $C_n$ (16).

Each of the alternate request links $QL_{n1} \ldots QL_{na}$ (203) and the additional request links $SL_{11} \ldots SL_{nw}$ (71) are also typically parsed, and/or processed, and/or formatted, and/or grouped, and/or organized for use by the server PS (18) and/or particular ones of the clients $C_1 \ldots C_n$ 916), a particular one of the clients $C_1 \ldots C_n$ (16) being designated as the client $C_n$ (16).

The alternate request links $QL_{n1} \ldots QL_{na}$ (203) allow the user $U_n$ (12) to make the service and/or information request $IQ_1 \ldots IQ_n$ (28) with preconfigured optional default selections already placed in the service and/or information request $IQ_1 \ldots IQ_n$ (28) for the user $U_n$ (12). The additional request links $SL_{n1} \ldots SL_{nw}$ (71) allow the user $U_n$ (12) to make additional optional selections, based upon information and/or services previously requested by the user $U_n$ (12).

Typical ones of the optional instructions $VJ_{n1} \ldots VJ_{nk}$ (52) and the additional request links $SL_{n1} \ldots SL_{nw}$ (71) that may be parsed, processed, and/or formatted from the service and/or information request $IQ_n$ (28) and/or the user service and/or information request $iq_n$ (27) are shown in FIG. 96.

The requests $Q_{11} \ldots Q_{nm}$ (29) may be made by the server PS (18) and/or the corresponding clients $C_1 \ldots C_n$ (16) of the associated corresponding ones of the servers $S_1 \ldots S_z$ (20), according to the designation scheme corresponding to the corresponding ones of the server designations $S_{11} \ldots S_{nm}$ (30), in accordance with the optional instructions $VJ_{11} \ldots VJ_{nk}$ (52) and/or default values for the optional instructions $VJ_{11} \ldots VJ_{nk}$ (52) resident within the server PS (18) and/or the corresponding clients $C_1 \ldots C_n$ 916).

The service and/or information responses $IR_1 \ldots IR_n$ (34) and/or the corresponding user service and/or information responses $ir_1 \ldots ir_n$ (36) may be formulated by the server PS (18) and/or the corresponding clients $C_1 \ldots C_n$ (16), in accordance with the optional instructions $VJ_{11} \ldots VJ_{nk}$ (52) and/or default values for the optional instructions $VJ_{11} \ldots VJ_{nk}$ (52) resident within the server PS (18) and/or the corresponding clients $C_1 \ldots C_n$ (16).

The optional instructions $VJ_{n1}$ . . . $VJ_{nk}$ (52) and the additional request links $SL_{11}$ . . . $SL_{nw}$ (71) for a particular one of the service and/or information requests $IQ_n$ (28) may typically have Searches per Group 326, and/or Group 327, and/or Page 328A, and/or Page 328B, and/or Timeout per Search Engine 329, and/or URL's per Search Engine 330, and/or Search Engine Results 331A and/or Search Display 331B, and/or URL Details 332A and/or Description and/or List 332B, as shown in FIG. 96. Default values may additionally and/or alternatively be established or be resident for any and/or all of the optional instructions $VJ_{11}$ . . . $VJ_{nk}$ 952) within the server PS (18) and/or the clients $C_1$ . . . $C_n$ (16).

The Searches per Group 326 are typically considered to be the number of the queries $QQ_{n1}$ . . . $QQ_{nm}$ (53) to make of the servers $S_1$ . . . $S_z$ 920) at the corresponding server addresses $AQ_{n1}$ . . . $AQ_{nm}$ (54), in accordance with the designation scheme which designates the certain ones of the servers $S_1$ . . . $S_z$ 920) to make the requests $Q_{n1}$ . . . $Q_{nm}$ (29) of as the corresponding ones of the server designations $S_{n1}$ . . . $S_{nm}$ (30).

The group 327 is considered to be the group of the queries $QQ_{n1}$ . . . $QQ_{nm}$ (53) to make of the servers $S_1$ . . . $S_z$ 920) at the corresponding server addresses $AQ_{n1}$ . . . $AQ_{nm}$ (54), in accordance with the designation scheme which designates the certain ones of the servers $S_1$ . . . $S_z$ (20) to make the requests $Q_{n1}$ . . . $Q_{nm}$ (29) of as the corresponding ones of the server designations $S_{n1}$ . . . $S_{nm}$ (30).

The Page 328A and the Page 328B have certain service and/or information location information, which may be incorporated into the requests $Q_{n1}$ . . . $Q_{nm}$ (29) to be made of the associated corresponding ones of the servers $S_1$ . . . $S_z$ (20), at the corresponding server addresses $AQ_{n1}$ . . . $AQ_{nm}$ (54), in accordance with the designation scheme corresponding to the corresponding ones of the server designations $S_{n1}$ . . . $S_{nm}$ (30).

The Timeout per Search Engine 329 is considered to be substantially the maximum time for the server PS (18) and/or the particular client $C_n$ 916) making the requests $Q_{n1}$ . . . $Q_{nm}$ (29) to wait for each of the responses $R_{n1}$ . . . $R_{nm}$ (32) from certain ones of the servers $S_1$ . . . $S_z$ (20), in accordance with the designation scheme which designates the certain ones of the servers $S_1$ . . . $S_z$ (20) to be communicated with corresponding to the requests $Q_{n1}$ . . . $Q_{nm}$ (29) as the corresponding server designations $S_{n1}$ . . . $S_{nm}$ (30).

The URL's per Search Engine 330, is considered to be the number of links, and/or descriptions, and/or prices/values, and/or images to be returned to the user interface $I_n$ (14) from each of the responses $R_{n1}$ . . . $R_{nm}$ (32).

The Search Engine Results 331A and the Search Display 331B each designate presentation and/or display schemes to be presented at the user interface $I_n$ 914). The URL Details 332A and the Description and/or List 332B each also designate presentation and/or display schemes to be presented at the user interface $I_n$ (14).

FIG. 133 is a schematic representation of certain typical optional instructions $VJ_{nm1}$ . . . $VJ_{nk}$ 952) and/or certain additional request links $SL_{n1}$ . . . $SL_{nw}$ (71), referred to as the Search Engine Results 331A, which are shown to Interleave 331A-1, Separate 331A-2, Combine $[a–z] 331A-3, Combine $[z–a] 331A-4, Separate $[a–z] 331A-5, Separate $[z–a] 331A-6, which are instructions for parsing, processing, sorting, and/or formatting the service and/or information response $IR_n$ (34).

FIG. 134 is a schematic representation of other certain typical optional instructions $VJ_{nm1}$ . . . $VJ_{nk}$ (52) and/or other certain additional request links $SL_{n1}$ . . . $SL_{nw}$ (71), referred to as the URL Details 332A, which are other instructions for parsing, processing, sorting, and/or formatting the service and/or information response $IR_n$ (34) in Summary 332A-1 or List 332A-2 formats.

FIG. 135 depicts certain typical additional request links $SL_{n1}$ . . . $SL_{nw}$ (71), and also shows the Search Display 331B, which are shown to be Interleave 331B-1, Separate 331B-2, Combine $[a–z] 331B-3, Combine $[z–a] 331B-4, Separate $[a–z] 331B-5, Separate $[z–a] 331B-6, which are instructions for parsing, processing, sorting, and/or formatting the service and/or information response $IR_n$ (34) and the Description and/or List 332B, which are other instructions for parsing, processing, sorting, and/or formatting the service and/or information response $IR_n$ (34) in Summary of List formats.

The optional instructions $VJ_{n1}$ . . . $VJ_{nk}$ (52) may also typically have Next Group 333 and Previous Group 334, which are considered to be the next group and the previous group, respectively, to make the queries $QQ_{n1}$ . . . $Q_{nm}$ (53) thereof at the next and previous ones of the corresponding groups of the queries $QQ_{n1}$ . . . $QQ_{nm}$ (53) to make of the servers $S_1$ . . . $S_z$ (20) thereof at the corresponding server addresses $AQ_{n1}$ . . . $AQ_{nm}$ (54), in accordance with the designation scheme which designates the certain ones of the servers $S_1$ . . . $S_z$ (20) to make the requests $Q_{n1}$ . . . $Q_{nm}$ (29) thereof as the corresponding ones of the server designations $S_{n1}$ . . . $S_{nm}$ (30). Information about Current Group 337 having the queries $QQ_{n1}$ . . . $QQ_{nm}$ (53) and the server addresses $AQ_{n1}$ . . . $AQ_{nm}$ (54) is also shown. Current Page Number 338 is also indicated.

The optional instructions $VJ_{n1}$ . . . $VJ_{nk}$ (52) for a particular one of the service and/or information requests $IQ_n$ (28) may also typically have Next Page 335 and Previous Page 336, each of which has certain different service and/or information location information, which may be incorporated into the requests $Q_{n1}$ . . . $Q_{nm}$ (29) to be made of the associated corresponding ones of the servers $S_1$ . . . $S_z$ (20), in accordance with the designation scheme corresponding to the corresponding ones of the server designations $S_{n1}$ . . . $S_{nm}$ (30).

H. DETERMINING QUERIES AND SERVERS TO MAKE THE REQUESTS THEREOF

The server PS (18) and/or the clients $C_1$ . . . $C_n$ (16) evaluate the optional instructions $VJ_{11}$ . . . $VJ_{nk}$ (52), determine the queries $QQ_{11}$ . . . $QQ_{nm}$ (53) and the servers $S_1$ . . . $S_z$ (20) to make the requests $Q_{11}$ . . . $Q_{nm}$ (29) thereof at the corresponding server addresses $AQ_{11}$ . . . $AQ_{nm}$ (54), in accordance with the designation scheme which designates the certain ones of the servers $S_1$ . . . $S_z$ (20) to be communicated with as the server designations $S_{11}$ . . . $S_{nm}$ (30), corresponding to the requests $Q_{11}$ . . . $Q_{nm}$ (29), and group the queries $QQ_{11}$ . . . $QQ_{nm}$ (53) and the corresponding server addresses $AQ_{11}$ . . . $AQ_{nm}$ (54) associated therewith.

FIG. 96 shows typical ones of the queries $QQ_{n1}$ . . . $QQ_{nm}$ (53), the corresponding server addresses $AQ_{n1}$ . . . $AQ_{nm}$ (54), and the optional instructions $VJ_{n1}$ . . . $VJ_{nk}$ (52) that may be parsed, processed, and/or formatted from the service and/or information request $IQ_n$ (28) and/or the user service and/or information request $iq_n$ (27).

The queries $QQ_{11}$ . . . $QQ_{nm}$ (53) and the servers $S_1$ . . . $S_z$ (20) to make the requests $Q_{11}$ . . . $Q_{nm}$ (29) thereof are typically based upon the values designated in and parsed from the queries $QQ_{11}$ . . . $QQ_{nm}$ (53) and the values designated in and parsed from the corresponding server addresses $AQ_{11}$ . . . $AQ_{nm}$ (54), in accordance with the designation scheme which designates the certain ones of the servers $S_1 \ldots S_z$ (20) to be communicated with as the server designations $S_{11} \ldots S_{nm}$ (30), corresponding to the requests $Q_{11} \ldots Q_{nm}$ (29), and the Searches per Group 326, the Group 327, the Page 328A and/or the Page 328B within the optional instructions $VJ_{11} \ldots VJ_{nk}$ (52).

The server PS (18) and/or the clients $C_1 \ldots C_n$ (16) evaluate the values in the Group 327, the Searches per Group 326, the queries $QQ_{11} \ldots QQ_{nm}$ (53), and the corresponding server addresses $AQ_{11} \ldots AQ_{nm}$ (54), and determine the servers $S_1 \ldots S_z$ (20) corresponding to the corresponding server addresses $AQ_{11} \ldots AQ_{nm}$ (54) within the Group 327, in accordance with the designation scheme which designates the certain ones of the servers $S_1 \ldots S_z$ (20) to be communicated with as the server designations $S_{11} \ldots S_{nm}$ (30) to make the requests $Q_{11} \ldots Q_{nm}$ (29) thereof, and the Page 328A, and/or the Page 328B.

The Group 327 and the Searches per Group 326 are used to determine which of the servers $S_1 \ldots S_z$ (20) to make the requests $Q_{11} \ldots Q_{nm}$ (29) thereof.

The server PS (18) and/or the clients $C_1 \ldots C_n$ (16) determine the size of the Group 327 from the Searches per Group 326 and the Group 327, and the servers $S_1 \ldots S_z$ (20) associated with the corresponding server addresses $AQ_{11} \ldots AQ_{nm}$ (54) within the Group 327, in accordance with the designation scheme which designates the certain ones of the servers $S_1 \ldots S_z$ (20) to be communicated with as the server designations $S_{11} \ldots S_{nm}$ (30).

The Searches per Group 326 and the Group 327 are used to formulate the current request groups $QA_{1c} \ldots QA_{nc}$ (50) having the corresponding queries $QQ_{11} \ldots QQ_{nm}$ (53) and the corresponding server addresses $AQ_{11} \ldots AQ_{nm}$ (54) to open connections with and make the requests $Q_{11} \ldots Q_{nm}$ (29) of the servers $S_1 \ldots S_z$ (20), in accordance with the designation scheme which designates the certain ones of the servers $S_1 \ldots S_z$ (20) to be communicated with corresponding to the requests $Q_{11} \ldots Q_{nm}$ (29) thereof as the server designations $S_{11} \ldots S_{nm}$ (30), corresponding to the requests $Q_{11} \ldots Q_{nm}$ (29), for corresponding ones of the service and/or information requests $IQ_1 \ldots IQ_n$ (28) and/or the user service and/or information requests $iq_1 \ldots iq_n$ (27).

The queries $QQ_{11} \ldots QQ_{nm}$ (53), the server addresses $AQ_{11} \ldots AQ_{nm}$ (54), and the Page 328A and/or the Page 328B provide the location of information and/or services to the server PS (18) and/or the clients $C_1 \ldots C_n$ (16) within the Group 327, in accordance with the Searches per Group 326, to make the requests $Q_{11} \ldots Q_{nm}$ (29) thereof, in accordance with the designation scheme which designates the ones of the servers $S_1 \ldots S_z$ (20) to make the requests $Q_{11} \ldots Q_{nm}$ (29) thereof as the server designations $S_{11} \ldots S_{nm}$ (30), corresponding to the requests $Q_{11} \ldots Q_{nm}$ (29).

The URL's per Search Engine 330 determine whether the server PS (18) and/or the clients $C_1 \ldots C_n$ (16) communicate additional ones of the requests $Q_{11} \ldots Q_{nm}$ (29) of the servers $S_1 \ldots S_z$ (20), depending upon the number of the links, and/or descriptions, and/or prices/values, and/or images requested by ones of the user $U_1 \ldots U_n$ (12) to be returned to the user interfaces $I_1 \ldots I_n$ (14), and the number of links, and/or descriptions, and/or prices/values, and/or images available within each of the corresponding ones of the responses $R_{11} \ldots R_{nm}$ (32). If insufficient ones of the links, and/or descriptions, and/or prices/values, and/or images are not available within the responses $R_{11} \ldots R_{nm}$ (32) to satisfy deliver of the number of the URL's per Search Engine 330 requested by certain ones the users $U_1 \ldots U_n$ (12), the server PS (18) and/or the clients $C_1 \ldots C_n$ (16) may yet make additional ones of the requests $Q_{11} \ldots Q_{nm}$ (29) of the servers $S_1 \ldots S_z$ (20), in order deliver the number of links, and/or descriptions, and/or prices/values, and/or images requested in the number of the URL's per Search Engine 330 to the user interfaces $I_1 \ldots I_n$ (14) requested by certain ones of the user $U_1 \ldots U_n$ (12).

If the optional instructions do not indicate which ones of the servers $S_1 \ldots S_z$ (20) to make the requests $Q_{11} \ldots Q_{nm}$ (29) thereof, in accordance with the designation scheme which designates the certain ones of the servers $S_1 \ldots S_z$ (20) to be communicated with as the server designations $S_{11} \ldots S_{nm}$ (30), corresponding to the requests $Q_{11} \ldots Q_{nm}$ (29), default values may be used. The default values may be resident within the server PS (18) and/or the client $C_1 \ldots C_n$ (16).

If all and/or a portion of the optional instructions $VJ_{11} \ldots VJ_{nk}$ (52) are absent and/or are not communicated to the server PS (18) and/or the clients $C_1 \ldots C_n$ (16), default values may be used. The default values may be resident within the server PS (18) and/or the clients $C_1 \ldots C_n$ (16).

I. GROUPING THE QUERIES AND SORTING/GROUPING CRITERIA

Upon receipt of the service and/or information requests $IQ_1 \ldots IQ_n$ (28) at the server PS (18), communicated from the corresponding clients $C_1 \ldots C_n$ (16), the server PS (18) parses, processes, and/or formats each of the service and/or information requests $IQ_1 \ldots IQ_n$ (28) into the corresponding current request groups $QA_{1c} \ldots QA_{nc}$ (50) having the corresponding queries $QQ_{11} \ldots QQ_{nm}$ (53) and the corresponding server addresses $AQ_{11} \ldots AQ_{nm}$ (54) to open connection with and make the requests $Q_{11} \ldots Q_{nm}$ (29) of the servers $S_1 \ldots S_z$ (20), in accordance with the designation scheme which designates the certain ones of the servers $S_1 \ldots S_z$ (20) to be communicated with corresponding to the requests $Q_{11} \ldots Q_{nm}$ (29) as the corresponding server designations $S_{11} \ldots S_{nm}$ (30), shown for a particular one of the service and/or information requests $IQ_n$ (28) in FIG. 59. The process 104 of deriving the service and/or information response $IR_n$ (34) for the grouping and/or sorting criteria of FIG. 59 is shown in FIG. 71.

The server PS (18) also parses, processes, and/or formats each of the service and/or information requests $IQ_1 \ldots IQ_n$ (28) into the corresponding request groups $QA_{11} \ldots QA_{nz}$ (51) having the corresponding other queries $QQ_{1n} \ldots QQ_{nz}$ (55) and the corresponding other server addresses $AQ_{1a} \ldots AQ_{nz}$ (56), and the corresponding optional instructions $VJ_{11} \ldots VJ_{nk}$ (52), also shown for a particular one of the service and/or information requests $IQ_n$ (28) in FIG. 59.

Certain ones of the clients $C_1 \ldots C_n$ (16) may alternatively and/or additionally make the requests $Q_{11} \ldots Q_{nm}$ (29) of the servers $S_1 \ldots S_z$ (20), in accordance with the designation scheme which designates the certain ones of the servers $S_1 \ldots S_z$ (20) to be communicated with corresponding to the requests $Q_{11} \ldots Q_{nm}$ (29) as the corresponding server designations $S_{11} \ldots S_{nm}$ (30), and formulate the corresponding user service and/or information response $ir_1 \ldots ir_n$ (36), as previously described, as shown in FIG. 63. The process 104 of deriving the user service and/or information response $ir_n$ (36) for the grouping and/or sorting criteria of FIG. 59 is shown in FIG. 71.

Upon receipt of the user service and/or information requests $iq_1 \ldots iq_n$ (27) at the corresponding clients $C_1 \ldots C_n$ (16), certain ones of the corresponding clients $C_1 \ldots C_n$ (16) may parse, process, and/or format the corresponding user service and/or information requests $iq_1 \ldots iq_n$ (27) into the corresponding current request groups $QA_{1c} \ldots QA_{nc}$ (50) having the corresponding queries $QQ_{11} \ldots QQ_{nm}$ (53) and the corresponding server addresses $AQ_{11} \ldots AQ_{nm}$ (54) to open connections with and make the requests $Q_{11} \ldots Q_{nm}$ (29) of the servers $S_1 \ldots S_z$ (20), in accordance with the designation scheme which designates the certain ones of the servers $S_1 \ldots S_z$ (20) to be communicated with corresponding to the requests $Q_{11} \ldots Q_{nm}$ (29), shown for a particular one of the user service and/or information requests $iq_n$ (27) in FIG. 63. The corresponding clients $C_1 \ldots C_n$ 916) may also parse, process, and/or format the corresponding user service and/or information response $ir_1 \ldots ir_n$ (36) into the corresponding request groups $QA_{11} \ldots QA_{nz}$ (51) having the corresponding other queries $QQ_{1a} \ldots QQ_{nz}$ (55) and the corresponding other server addresses $AQ_{1a} \ldots AQ_{nz}$ (56), and the corresponding optional instructions $VJ_{11} \ldots VJ_{nk}$ (52), also shown for a particular one of the user service and/or information requests $iq_n$ (27) in FIG. 63.

The server PS (18) makes the requests $Q_{11} \ldots Q_{nm}$ (29) of the servers $S_1 \ldots S_z$ (20), in accordance with the designation scheme which designates the certain ones of the servers $S_1 \ldots S_z$ 920) to be communicated with corresponding to the requests $Q_{11} \ldots Q_{nm}$ (29) as the corresponding server designations $S_{11} \ldots S_{nm}$ (30), as shown in FIG. 59, and certain ones of the client $C_1 \ldots C_n$ (16) may additionally and/or alternatively make the requests $Q_{11} \ldots Q_{nm}$ (29) of the servers $S_1 \ldots S_z$ (20), in accordance with the designation scheme which designates the certain ones of the servers $S_1 \ldots S_z$ (20) to be communicated with corresponding to the requests $Q_{11} \ldots Q_{nm}$ (29) as the corresponding server designations $S_{11} \ldots S_{nm}$ (30), as shown in FIG. 63.

The Searches per Group 326 and the Group 327 are used to formulate the current request group $QA_{nc}$ (50) having the corresponding queries $QQ_{n1} \ldots QQ_{nm}$ (53) and the corresponding server addresses $AQ_{n1} \ldots AQ_{nm}$ (54) to open connections with and make the requests $Q_{n1} \ldots Q_{nm}$ (29) of the servers $S_1 \ldots S_z$ (20), in accordance with the designation scheme which designates the certain ones of the servers $S_1 \ldots S_z$ (20) to be communicated with corresponding to the requests $Q_{n1} \ldots Q_{nm}$ (29) thereof as the server designations $S_{11} \ldots S_{nm}$ (30), corresponding to the requests $Q_{11} \ldots Q_{nm}$ (29), for the service and/or information request $IQ_n$ (28) and/or the user service and/or information request $iq_n$ (27).

Information from the current request group $QA_{nc}$ (50) having the corresponding queries $QQ_{n1} \ldots QQ_{nm}$ (53) and the corresponding server addresses $AQ_{n1} \ldots AQ_{nm}$ (54) is formulated into the corresponding request pointer/address group $QZ_n$ (60) having the pointers/addresses $PG_{n1} \ldots PG_{nz}$ (61) associated therewith, as shown in FIGS. 59 and 63.

Each of the pointer/addresses $PG_{n1} \ldots PG_{nz}$ (61) are directed to point/address the corresponding addressable query pointer/address groups $QG_{n1} \ldots QG_{nz}$ (62) associated therewith, which aid in obtaining service and/or information from the certain ones of the addressable response information groups $RG_{n1} \ldots RG_{nm}$ (57) to be incorporated into the query information groups $GI_{n1} \ldots GI_{nz}$ (63).

Ones of the addressable query information groups $GI_{n1} \ldots GI_{nz}$ (63) may be associated with corresponding ones of the addressable query pointer/address groups $QG_{n1} \ldots QG_{nz}$ (62).

Each of the addressable query pointer/address groups $QG_{n1} \ldots QG_{nz}$ (62) associated with the service and/or information request $IQ_n$ has the pointers/addresses $PP_{n11} \ldots PP_{nmr}$ (64) directed to address/point services and/or information in the addressable response information groups $RG_{n1} \ldots RG_{nm}$ (57), based upon the grouping and/or sorting criteria.

Information and/or services in the addressable response information groups $RG_{n1} \ldots RG_{nm}$ (57) is addressed with the pointers/addresses $PP_{n11} \ldots PP_{nmr}$ (64) from the query pointer/address groups $QG_{n1} \ldots QG_{nz}$ (62), and information and/or services from the addressable response information groups $RG_{n1} \ldots RG_{nm}$ (57) is incorporated into the addressable query information groups $GI_{n1} \ldots GI_{nz}$ (63) corresponding to the pointer/addresses $PP_{n11} \ldots PP_{nmr}$ (64), which are formulated by the addressable query pointer/address groups $QG_{n1} \ldots QG_{nz}$ (62), in accordance with the grouping and/or sorting criteria.

FIGS. 59 and 63 show the request pointer/address group $QZ_n$ (60), the addressable query pointer/address groups $QG_{n1} \ldots QG_{nz}$ (62), the pointers/addresses $PP_{n11} \ldots PP_{nmr}$ (64), associated ones of the addressable response information groups $RG_{n1} \ldots RG_{nm}$ (57), and the query information group $GI_{nz}$ (63) associated with the query pointer/address group $QG_{nz}$ (62). FIGS. 59 and 63 show the rth pointers/addresses $PP_{n1r} \ldots PP_{nmr}$ (64), which point to the rth optional addressable pointer/address indices $IN_{nmr} \ldots IN_{nmr}$ (81) of the corresponding rth individual information groups $LG_{n1r} \ldots LG_{nmr}$ (80) of the addressable response information groups $RG_{n1} \ldots RG_{nm}$ (57) associated with the query pointer/address group $QG_{nz}$ (62) and the associated query information group $GI_{nz}$ (63).

FIG. 97 shows the request pointer/address group $QZ_n$ (60), a particular one of the addressable query pointer/address groups $QG_{n1} \ldots QG_{nz}$ (62), designated as the query pointer/address group $QG_{nz}$ (62), the pointers/addresses $PP_{n11} \ldots PP_{nmr}$ (64), associated ones of the addressable response information groups $RG_{n1} \ldots RG_{nm}$ (57), and the query information group $GI_{nz}$ (63) associated with the query pointer/address group $QG_{nz}$ (62).

The addressable query pointer/address groups $QG_{n1} \ldots QG_{nz}$ (62) each have corresponding ones of query information groups $GI_{n1} \ldots GI_{nz}$ (63) associated therewith. Each of the query information groups $GI_{n1} \ldots GI_{nz}$ (63) have information and/or services therein, which are derived from information and/or services obtained from the certain ones of the addressable response information groups $RG_{n1} \ldots RG_{nm}$ (57), which are addressed to provide such information with the aid of the corresponding pointers/addresses $PP_{n11} \ldots PP_{nmr}$ (64). Each of the pointers/addresses $PP_{n11} \ldots PP_{nmr}$ (64) are directed to point/address information and/or services in the corresponding response information groups $RG_{n1} \ldots RG_{nm}$ (57) associated therewith, which the information and/or services incorporated into the ones of the query information groups $GI_{n1} \ldots GI_{nz}$ (63) associated with the corresponding addressable query pointer/address groups $QG_{n1} \ldots QG_{nz}$ (62) is obtained therefrom.

The addressable query pointer/address groups $QG_{n1} \ldots QG_{nz}$ (62) may be used to aid in formulating the query information groups $GI_{n1} \ldots GI_{nz}$ (63), having information obtained from the addressable response information groups $RG_{nm}$ (57), resulting from certain ones of the queries $QQ_{n1} \ldots QQ_{nm}$ (53) grouped one with the other and/or the associated ones of the corresponding server addresses $AQ_{n1} \ldots AQ_{nm}$ (54). The query information groups $GI_{n1} \ldots GI_{nz}$ (63) may be presented to the user $U_n$ (12) through the user interface $I_n$ (14). The addressable query pointer/address groups $QG_{n1} \ldots QG_{nz}$ (62) may be derived from query criteria in the optional instructions $VJ_{11} \ldots VJ_{nk}$ (52) and/or using default criteria resident within the server PS (18) and/or the client $C_n$ (16).

Query grouping criteria giving the user $U_n$ (12) the ability to formulate the addressable query pointer/address groups $QG_{n1} \ldots QG_{nz}$ (62) may be incorporated into the optional instructions $VJ_{11} \ldots VJ_{nk}$ (52), which may be entered into the user interface $I_n$ (14) through the user input $UI_n$ (25) by the user $U_n$ 912). Typically, however, the queries $QQ_{n1} \ldots QQ_{nm}$ (53) having the same and/or substantially the same values are grouped one with the other in individual ones of the addressable query pointer/address groups $QG_{n1} \ldots QG_{nz}$ (62). Default criteria may be resident within the server PS (18) and/or the client $C_n$ (16).

The size of the request pointer/address group $QZ_n$ (60) and which particular ones of the queries $QQ_{n1} \ldots QQ_{nm}$ (53) and the corresponding ones of the server addresses $AQ_{n1} \ldots QG_{nm}$ (54) to use in the requests $Q_{n1} \ldots Q_{nm}$ (29), and thus construction and/or formulation of the addressable query pointer/address groups $QG_{n1} \ldots QG_{nz}$ (62) to incorporate into the particular request pointer/address group $QZ_n$ (60), and, thus, delivery of information in the query information groups $GI_{n1} \ldots GI_{nz}$ (63) is determined by the current request groups $QA_{1c} \ldots QA_{nc}$ (50), which may be determined from the Group 327 and the Searches per Group 326, the queries $QQ_{n1} \ldots QQ_{nm}$ (53) and the corresponding ones of the server addresses $AQ_{n1} \ldots AQ_{nm}$ (54) therein.

Certain ones of the queries $QQ_{n1} \ldots QQ_{nm}$ (53) may be grouped one with the other in the addressable query pointer/address groups $QG_{n1} \ldots QG_{nz}$ (62), which have the certain ones of the queries $QQ_{n1} \ldots QQ_{nm}$ (53) and the corresponding ones of the server addresses $AQ_{n1} \ldots AQ_{nm}$ (54) associated therewith, and the corresponding pointers/addresses $PP_{n11} \ldots PP_{nmr}$ (64) associated with the certain ones of the queries $QQ_{n1} \ldots QQ_{nm}$ (53), the corresponding ones of the server addresses $AQ_{n1} \ldots AQ_{nm}$ (54), and certain ones of response information groups $RG_{n1} \ldots RG_{nm}$ (57).

Typical sorting and/or grouping criteria, for example, may group certain ones of the queries $QQ_{n1} \ldots QQ_{nm}$ (53) having the same and/or substantially the same values grouped in a particular one of the query information groups $GI_{nz} \ldots GI_{nz}$ (63), designated as the query information group $GI_{nz}$ (63), as shown in FIG. 98 and in certain ones of FIGS. 27A–52C, inclusive.

Alternatively and/or additionally, other typical sorting and/or grouping criteria, for example, may group certain ones of the server addresses $AQ_{n1} \ldots AQ_{nm}$ (54), having the same and/or substantially the same values grouped in a particular one of the query information groups $GI_{nz} \ldots GI_{nz}$ (63), designated as the query information group $GI_{nz}$ (63), as shown in FIG. 99.

FIGS. 97–99 show the rth pointers/addresses $PP_{ner}$ (64), $PP_{nrr}$ (64), and $PP_{nwr}$ (64), which point to the rth optional addressable pointer/address indices $IN_{ner}$ (81), $IN_{nrr}$ (81), and $IN_{nwr}$ (81) of the corresponding rth individual information groups $LG_{ner}$ (80), $LG_{nrr}$ (80), and $LG_{nwr}$ (80) of the addressable response information groups $RG_{ne}$ (57), $RG_{nr}$ (57), and $RG_{nw}$ (57) associated with the query pointer/address group $QG_{nz}$ (62) and the associated query information group $GI_{nz}$ (63).

Alternatively and/or additionally, the user $U_n$ 912) may select query grouping criteria, which simply provides information to the user interface $I_n$ (14), separately with respect to the individual server addresses $AQ_{n1} \ldots AQ_{nm}$ (54), as shown in FIGS. 60 and 64 and in certain ones of FIGS. 27A–52C, inclusive. For example, the query information groups $GI_{n1} \ldots GI_{nz}$ (63), may alternatively and/or additionally be correspondingly associated with the server address $AQ_{n1} \ldots AQ_{nm}$ (54), and, thus, may be correspondingly associated with the addressable response information groups $RG_{n1} \ldots RG_{nm}$ (57). The query information group $GI_{n1}$ (63) may, thus, be associated with the server address $AQ_{n1}$ (54), the addressable response information group $RG_{n1}$ (57), and the query information group $GI_{n1}$ (63); the query information group $GI_{n2}$ (63) may, thus, be associated with the server address $AQ_{n2}$ (54), the addressable response information group $RG_{n2}$ (57), and the query information group $GI_{n2}$ (63), and so on; and the query information group $GI_{nz}$ (63) may, thus, be associated with the server address $AQ_{nz}$ (54), the addressable response information group $RG_{n2}$ (57), and the query information group $GI_{nz}$ (63), as shown in FIGS. 60 and 64. The process 104 of deriving the service and/or information response $IR_n$ (34) and/or the user service and/or information response $ir_n$ (36) for the grouping and/or sorting criteria of FIGS. 60 and 64 is shown in FIG. 72.

The pointing/addressing scheme of FIGS. 60 and 64 is, of course, a much simpler pointing/addressing scheme than the pointing/addressing scheme of FIGS. 59 and 63, and does not require incorporating the addressable query pointer/address groups $QG_{n1} \ldots QG_{nz}$ (62) into the request pointer/address group $QZ_n$ (60). Each of the pointers/addresses $PF_{n11} \ldots PF_{nmr}$ (69), of FIGS. 60 and 64, may then be directed to point/address the corresponding response information groups $RG_{n1} \ldots RG_{nm}$ (57) directly from the request pointer/address group $QY_{ns}$ (68), to obtain information from the corresponding response information groups $RG_{n1} \ldots RG_{nm}$ (57) and incorporating into corresponding ones of the corresponding query information groups $GI_{n1} \ldots GI_{nz}$ (63), as shown in FIGS. 60 and 64. In this case, the addressable query pointer/address groups $QG_{n1} \ldots QG_{nz}$ (62) may be bypassed and/or eliminated completely, thus simplifying the process. OF course, then, in this case, the resulting sorting and grouping is not as sophisticated, and allows for such simplification.

The above sorting criteria addressing schemes are meant only as typical examples of sorting criteria addressing schemes that may be used. Yet other sorting criteria addressing schemes and/or combinations thereof may be used.

FIG. 100 shows typical ones of the addressable query pointer/address groups $QG_{n1} \ldots QG_{nz}$ (62) having the typical ones of the queries $QQ_{n1} \ldots QQ_{nm}$ (53), the typical ones of the server addresses $AQ_{n1} \ldots AQ_{nm}$ (54), and the corresponding ones of typical ones of the pointers/addresses $PP_{n11} \ldots PP_{nmr}$ (64) having the same ones of the queries $QQ_{n1} \ldots QQ_{nm}$ (53) grouped one with the other in individual ones of the addressable query pointer/address groups $QG_{n1} \ldots QG_{nz}$ (62).

More particularly, FIG. 100 shows the query pointer/address group $QG_{n1}$ (62), the query pointer/address group $QG_{n2}$ (62), and the query pointer/address group $QG_{n3}$ (62). The query pointer/address group $QG_{n1}$ (62) of FIG. 100 has the same ones of the queries $QQ_{n1}$ (53), $QQ_{n2}$ (53), $QQ_{n3}$ (53), and $QQ_{n9}$ (53), the ones of the server addresses $AQ_{n1}$ (54), $AQ_{n2}$ (54), $AQ_{n3}$ (54), and $AQ_{n9}$ (54), and the ones of the pointers/addresses $PP_{n1r}$ (64), $PP_{n2r}$ (64), $PP_{n3r}$ (64), nd $PP_{n9r}$ (64) associated therewith. The query pointer/address group $QG_{n2}$ (62) of FIG. 100 has the same ones of the queries $QQ_{n4}$ (53) and $QQ_{n7}$ (53), the ones of the server addresses $AQ_{n4}$ (54) and $AQ_{n7}$ (54) the ones of the pointer/addresses $PP_{n4r}$ (64) and $PP_{n7r}$ (64) associated therewith. The query pointer/address group $QG_{n3}$ (62) of FIG. 100 has the same ones of the query values $QQ_{n5}$ (53), $QQ_{n6}$ (53), and $QQ_{n8}$ (53), the ones of the server addresses $AQ_{n5}$ (54), $AQ_{n6}$ (54), and $AQ_{n8}$ (54) and the ones of the pointers/addresses $PP_{n5r}$ (64), $PP_{n6r}$ (64), and $PP_{n8r}$ (64) associated therewith.

The addressable query pointer/address groups $QG_{n1} \ldots QG_{nz}$ (62), however, may alternatively and/or additionally be grouped, for example, by the server addresses $AQ_{n1} \ldots AQ_{nm}$ (54) and have the corresponding query values $QQ_{n1}$ . . . $QQ_{nm}$ (53) associated therewith. Ones of the same and/or substantially the same ones of the server addresses $AQ_{n1}$ . . . $AQ_{nm}$ (54), for example, having the corresponding queries $QQ_{n1}$ . . . $QQ_{nm}$ (53) associated therewith may be used as the grouping criteria.

FIG. 101 shows another schematic representation of the typical ones of the addressable query pointer/address groups $QG_{n1}$ . . . $QG_{nz}$ (62) having the typical ones of the queries $QQ_{n1}$ . . . $QQ_{nm}$ (53), the typical ones of the server addresses $AQ_{n1}$ . . . $AQ_{nm}$ (54), and the typical the ones of the pointer/addresses $PP_{n11}$ . . . $PP_{nmr}$ (64) of FIG. 100 associated therewith.

FIG. 102 is a generic schematic representation of the addressable query pointer/address groups $QG_{n1}$ . . . $QG_{nz}$ (62) having the queries $QQ_{n1}$ . . . $QQ_{nm}$ (53), the server addresses $AQ_{n1}$ . . . $AQ_{nm}$ (54), and the pointers/addresses $PP_{n11}$ . . . $PP_{nmr}$ (64) associated therewith.

Certain information in the addressable response information groups $RG_{n1}$ . . . $RG_{nm}$ (57) may be associated with the corresponding queries $QQ_{n1}$ . . . $QQ_{nm}$ (53) and/or the corresponding server addresses $AQ_{n1}$ . . . $AQ_{nm}$ (54) within the current request group $QA_{nc}$ (50), and may optionally be used by the server PS (18) and/or the client $C_n$ (16).

Certain information in the addressable response information groups $RG_{n1}$ . . . $RG_{nm}$ (57) may also be incorporated into the optional instructions $VJ_{n1}$ . . . $VJ_{nk}$ (52). Such information may be incorporated into the optional instructions $VJ_{n1}$ . . . $VJ_{nk}$ 952) and/or may also be additionally and/or alternatively optionally resident within the server PS (18) and/or the client $C_n$ (16).

J. COMMUNICATING THE REQUESTS TO THE SERVERS

The server PS (18) and/or the clients $C_1$ . . . $C_n$ (16) contact and open the connections $OC_{11}$ . . . $OC_{nm}$ (323) with ones of the servers $S_1$ . . . $S_z$ (20), according to the server designations $S_{11}$ . . . $S_{nm}$ (30) at the corresponding server addresses $A_{11}$ . . . $A_{nu}$ (265) at corresponding ports $W_{11}$ . . . $W_{nm}$ (343). The server PS (18) and/or the clients $C_1$ . . . $C_n$ (16) communicate the requests $Q_{11}$ . . . $Q_{nm}$ (29) of one or more of the same and/or different ones of the servers $S_1$ . . . $S_z$ (20), designated within the Group 327 and the Searches per Group 326 to make the requests $Q_{11}$ . . . $Q_{nc}$ (29) thereof, in accordance with the designation scheme corresponding to the corresponding ones of the server designations $S_{11}$ . . . $S_{nmm}$ (30), corresponding to the requests $Q_{11}$ . . . $Q_{nm}$ (29). If the Group 327 is not specified and/or the Searches per Group 326 are not specified by the users $U_1$ . . . $U_n$ (12), default values may additionally and/or alternatively values be used.

A particular one of the requests $Q_{11}$ . . . $Q_{nm}$ 929), hereinafter designated as the request $Q_{nm}$ (29), corresponding to one request within the requests $Q_{n1}$ . . . $Q_{nm}$ (29) corresponding to the user $U_n$ (12), is shown schematically in FIG. 103.

Information 344 that may be used for formulating a typical particular one of the requests $Q_{nm}$ (29) from the service and/or information request $IQ_n$ (28), and parsing, processing, and/or formatting the optional instructions $VJ_{n1}$ . . . $VJ_{nk}$ (52), and opening the connection $OC_{nm}$ (323) is shown in FIGS. 92–95.

Now, in more detail, the request $Q_{nm}$ (29) may have a corresponding request line $L_{nm}$ (345), corresponding optional request header fields $JH_{n1}$ . . . $JH_{ns}$ (346), and a corresponding optional entity body $EH_{nm}$ (347). The request line $L_{nm}$ (345) may have a corresponding method $M_{nm}$ (348), a corresponding target resource $P_{nm}$ (349), which may have information associated with the corresponding query $QQ_{nm}$ (53), and corresponding protocol $B_{nm}$ (350).

The user $U_n$ 912), the server PS (18) and/or the client $C_n$ (16) may optionally specify the port $W_{nm}$ (343) to communicate the request $Q_{nm}$ (29) therethrough, and/or the method $M_{nm}$ (348), and/or the protocol $B_{nm}$ (350). The port $W_{nm}$ (343), and/or the method $M_{nm}$ (348), and/or the protocol $B_{nm}$ (350) may optionally be resident within the server PS (18) and/or the client $C_n$ (16). Default values may also be used for the port $W_{nm}$ (343) and/or the protocol $B_{nm}$ (350).

Typically, information within or from any and/or all or a portion of the queries $QQ_{nm}$ (53) may be incorporated into the corresponding ones of the target resources $P_{11}$ . . . $P_{nm}$ (349) and/or the corresponding ones of the optional entity bodies $EH_{11}$ . . . $EH_{nm}$ (347), and may in certain instances depend upon the method $M_{11}$ . . . $M_{nm}$ (348).

However, information that may be used for opening the connections $OC_{11}$ . . . $OC_{nm}$ (323) and formulating the requests $Q_{11}$ . . . $Q_{nm}$ (29) from the service and/or information requests $IQ_1$ . . . $IQ_n$ (28) may be derived from any and/or all or a portion of the user client requests $QC_{11}$ . . . $QC_{nu}$ (280) accessible to the users $U_1$ . . . $U_n$ (12) and/or the hidden client requests $HC_{n1}$ . . . $HC_{nh}$ (281) hidden from the users $U_1$ . . . $U_n$ (12), and/or a combination thereof, and/or may also have information and/or instructions to be utilized by the server PS (18) and/or ones of the clients $C_1$ . . . $C_n$ 916).

Alternatively information from the alternate request links $QL_{11}$ . . . $QL_{na}$ (203), and/or the server request links $UL_{11}$ . . . $UL_{ns}$ (204), and/or the additional request links $SL_{11}$ . . . $SL_{nw}$ (71), and/or a combination thereof, may be used by the server PS (18) and/or ones of the clients $C_1$ . . . $C_n$ (16) to formulate the requests $Q_{11}$ . . . $Q_{nm}$ (29).

There may be m different or same ones of the requests $Q_{n1}$ . . . $Q_{nm}$ (29) from the client $C_n$ (16) at any time, and n×m different and/or same ones of the requests $Q_{11}$ . . . $Q_{nm}$ (29) of the same and/or different ones of the servers $S_1$ . . . $S_z$ 920) present on the network 24 at any time.

The queries $QQ_{n1}$ . . . $QQ_{nm}$ (53) may each be different, one from the other, or the same. The queries $QS_{n1}$ . . . $QS_{nu}$ (288) accessible to the user $U_n$ (12) may each be different, one from the other, or the same. The hidden queries $QH_{n1}$ . . . $QH_{nh}$ (290) may each be different, one from the other, or the same. The number of the queries $QQ_{n1}$ . . . $QQ_{nm}$ (53) "m" may be substantially the sum of the queries $QS_{n1}$ . . . $QS_{nu}$ (288) accessible to the user $U_n$ 912) and the hidden queries $QH_{n1}$ . . . $QH_{nh}$ (290), i.e., m=u+h.

There may be m different or same ones of the queries $QQ_{n1}$ . . . $QQ_{nm}$ (53) corresponding to the requests $Q_{n1}$ . . . $Q_{nm}$ (29) from the client $C_n$ (16) at any time, and n×m different and/or same ones of the queries $QQ_{11}$ . . . $QQ_{nm}$ (53) corresponding to the requests $Q_{11}$ . . . $Q_{nm}$ (29) of the same and/or different ones of the servers $S_1$ . . . $S_z$ (20) present on the network 24 at any time.

The server addresses $AQ_{n1}$ . . . $AQ_{nm}$ (54) may each be different, one from the other, or the same. The server addresses $A_{n1}$ . . . $A_{nu}$ (265) accessible to the user $U_n$ (12) may each be different, one from the other, or the same. The hidden server addresses $AH_{n1}$ . . . $AH_{nh}$ (291) may each be different, one from the other, or the same. The number of the server addresses $AQ_{n1}$ . . . $AQ_{nm}$ (54) "m" may be substantially the sum of the server addresses $A_{n1}$ . . . $A_{nu}$ (265) accessible to the user $U_n$ 912) and the hidden server addresses $AH_{n1}$ . . . $AH_{nh}$ (291), i.e., m=u+h.

There may be m different or same ones of the server addresses $AQ_{n1}$ . . . $AQ_{nm}$ (54) corresponding to the request $Q_{n1} \ldots Q_{nm}$ 929) from the client $C_n$ 916) at any time, and n×m different and/or same ones of the server addresses A $Q_{11} \ldots AQ_{nm}$ (54) corresponding to the requests $Q_{11} \ldots Q_{nm}$ (29) of the same and/or different ones of the servers $S_1 \ldots S_z$ (20) present on the network 24 at any time.

The optional instructions $VJ_{n1} \ldots VJ_{nk}$ (52) may each be different, one from the other, or the same. The optional instructions $V_{n1} \ldots V_{nv}$ (289) accessible to the user $U_n$ (12) may each be different, one from the other, or the same. The optional hidden instructions $H_{n1} \ldots H_{ni}$ (292) may each be different, one form the other, or the same. The number of the optional instructions $VJ_{n1} \ldots VJ_{nk}$ (52) "k" may be substantially the sum of the optional instructions $V_{n1} \ldots V_{nv}$ (289) accessible to the user $U_n$ 912) and The optional hidden instructions $H_{n1} \ldots H_{ni}$ (292), i.e., k=v+i.

There may be m×k different or same ones of the optional instructions $VJ_{n1} \ldots VJ_{nk}$ (52) corresponding to the requests $Q_{n1} \ldots Q_{nm}$ (29) from the client $C_n$ (16) at any time, and n×m×k different and/or same ones of the optional instructions $VJ_{11} \ldots VJ_{nk}$ (52) corresponding to the requests $Q_{11} \ldots Q_{nm}$ 929) of the same and/or different ones of the servers $S_1 \ldots S_z$ (20) present on the network 24 at any time.

The requests $Q_{11} \ldots Q_{nm}$ (29) of the servers $S_1 \ldots S_z$ 920) may be made at the same and/or different times. One or more of the requests $Q_{11} \ldots Q_{nm}$ (29) may be made of each of the servers $S_1 \ldots S_z$ (20) by the same/and or different ones of the clients $C_1 \ldots C_n$ 916) and/or the server PS (18) at the same and/or different times.

The server PS (18) and/or the client $C_n$ (16) may make one or more of the requests $Q_{n1} \ldots Q_{nm}$ (29) of the same and/or different ones of the servers $S_1 \ldots S_z$ 920), in accordance with the designation scheme corresponding to the corresponding ones of the server designations $S_{n1} \ldots S_{nm}$ (30), in order to fulfill the services and/or information requirements of the user $U_n$ (12).

K. REPLIES FROM THE SERVERS

Each of the servers $S_1 \ldots S_z$ 920) communicated therewith replies to the server PS (18) and/or the clients $C_1 \ldots C_n$ (16), in accordance with the designation scheme which designates the servers $S_1 \ldots S_z$ 920) being communicated with corresponding to the requests $Q_{11} \ldots Q_{nm}$ (29) as the corresponding server designations $S_{11} \ldots S_{nm}$ 930), and communicates the corresponding responses $R_{11} \ldots R_{nm}$ (32), associated with the requests $Q_{11} \ldots Q_{nm}$ (29), to the server PS (18) and/or the clients $C_1 \ldots C_n$ (16) making the requests $Q_{11} \ldots Q_{nm}$ (29).

Now, ones of the servers $S_1 \ldots S_z$ 920) having been contacted by the server PS (18) and/or the clients $C_1 \ldots C_n$ 916) and the connections $OC_{11} \ldots OC_{nm}$ (323) opened therewith, corresponding to the requests $Q_{11} \ldots Q_{nm}$ 929), according to the server designations $S_{11} \ldots S_{nm}$ (30) at the corresponding server addresses $A_{11} \ldots A_{nu}$ (265) at the corresponding ports $W_{11} \ldots W_{nm}$ (343) reply to the server PS (18) and/or the contacting clients $C_1 \ldots C_n$ 916) with the corresponding responses $R_{11} \ldots R_{nm}$ (32).

A particular one of the responses $R_{n1} \ldots R_{nm}$ (32), hereinafter designated as the response $R_{nm}$ (32), corresponding to one response within the responses $R_{n1} \ldots R_{nm}$ (32), the response $R_{nm}$ (32) corresponding to the request $Q_{nm}$ 929), and the responses $R_{n1} \ldots R_{nm}$ (32) corresponding to the requests $Q_{n1} \ldots Q_{nm}$ (29), is shown schematically in FIG. 104.

Now, the response $R_{nm}$ (32) may have a corresponding response header line $LR_{nm}$ (351), corresponding optional response header fields $JR_{n1} \ldots JR_{nt}$ (352), and a corresponding optional entity body $RH_{nm}$ (353). The optional entity body $RH_{nm}$ (353) typically has links, and/or descriptions, and/or the information. The request header line $LR_{nm}$ (351) may have a corresponding protocol $BR_{nm}$ (354), a corresponding status $SR_{nm}$ (355), and a corresponding status explanation $SE_{nm}$ (356).

Ones of the connection may be closed after ones of the responses $R_{11} \ldots R_{nm}$ (32) are communicated to the PS (18) and/or to the requesting corresponding ones of the clients $C_1 \ldots C_n$ (16). Again, the Timeout per Search Engine 329 is considered to be substantially the maximum time for the server PS (18) and/or the particular client $C_n$ (16) making the requests $Q_{n1} \ldots Q_{nm}$ (29) to wait for each of the responses $R_{n1} \ldots R_{nm}$ (32) from certain ones of the servers $S_1 \ldots S_z$ (20), in accordance with the designated scheme which designates the certain ones of the servers $S_1 \ldots S_z$ (20) to be communicated with corresponding to the requests $Q_{11} \ldots Q_{nm}$ (29) as the corresponding server designations $S_{11} \ldots S_{nm}$ (30).

If certain ones of the servers $S_1 \ldots S_z$ (20) do not open connections $OC_{11} \ldots OC_{nm}$ (323) with and/or communicate the responses $R_{11} \ldots R_{nm}$ (32) to the server PS (18) and/or the clients $C_1 \ldots C_n$ (16), and/or if certain ones of the servers $S_1 \ldots S_z$ (20) do not communicate the responses $R_{11} \ldots R_{nm}$ (32) to the server PS (18) and/or the client $C_1 \ldots C_n$ (16) once connections $OC_{11} \ldots OC_{nm}$ (323) therewith may have opened, corresponding to the requests $Q_{11} \ldots Q_{nm}$ (29), according to the server designations $S_{11} \ldots S_{nm}$ 930), within the timeout set by the Timeout per Search Engine 329, the certain ones of requests $Q_{n1} \ldots Q_{nm}$ (29) of such nonresponding ones of the servers $S_1 \ldots S_z$ (20) may then be cancelled by the server PS (18) and/or the clients $C_1 \ldots C_n$ (16). Information about such ones of the nonresponding ones of the servers $S_1 \ldots S_z$ (20) may then be communicated from the server PS (18) and/or the clients $C_1 \ldots C_n$ (16) through the corresponding ones of the user interfaces $I_1 \ldots I_n$ (14) to the corresponding ones of the users $U_1 \ldots U_n$ (12), according to the server designations $S_{11} \ldots S_{nm}$ (30) corresponding to the certain ones of requests $Q_{n1} \ldots Q_{nm}$ (29) of such nonresponding ones of the servers $S_1 \ldots S_z$ (20).

In certain instances, the server PS (18) and/or certain ones of the clients $C_1 \ldots C_n$ (16) may contact certain ones of the servers $S_1 \ldots S_z$ (20) and open the connections $OC_{11} \ldots OC_{nm}$ (323) therewith, corresponding to the requests $Q_{11} \ldots Q_{nm}$ (29), according to the server designations $S_{11} \ldots S_{nm}$ (30), one or more additional times, in order to satisfy the needs of the users $U_1 \ldots U_n$ (12), and/or certain requirements within the optional instructions $VJ_{n1} \ldots VJ_{nk}$ (52), such as, for example, the URL's per Search Engine 330, and/or as a result of certain information communicated to the PS (18) and/or certain ones of the clients $C_1 \ldots C_n$ 916) within the responses $R_{11} \ldots R_{nm}$ (32).

If, for example, less links, and/or descriptions, and/or prices/values, and/or images are returned within certain ones of the responses $R_{11} \ldots R_{nm}$ (32), which may be considered to be first ones of the responses $R_{11} \ldots R_{nm}$ (32), than are requested by certain ones of the users $U_1 \ldots U_n$ (12) within certain ones of the URL's per Search Engine 330, the server PS (18) and/or certain ones of the clients $C_1 \ldots C_n$ (16) may contact certain ones of the servers $S_1 \ldots S_z$ (20), open the connections $OC_{11} \ldots OC_{nm}$ (323) therewith, and make additional ones of the requests $Q_{11} \ldots Q_{nm}$ (29), according to the server designations $S_{11} \ldots S_{nm}$ (30), one or more additional times, in order to satisfy the needs of the users $U_1 \ldots U_n$ (12). The links, and/or the descriptions, and/or the images returned within and/or parsed from additional ones of the responses $R_{11} \ldots R_{nm}$ (32) to the additional ones of the requests $Q_{11} \ldots Q_{nm}$ 929) may then be appended to the corresponding ones of the links, and/or the corresponding ones of the descriptions, and/or the corresponding ones of the images returned within and parsed form the first ones of the responses $R_{11} \ldots R_{nm}$ (32)

The servers $S_1 \ldots S_z$ (20) communicate the responses $R_{11} \ldots R_{nm}$ (32) to the requests $Q_{11} \ldots Q_{nm}$ (29) to the server PS (18) and/or specified ones of the clients $C_1 \ldots C_n$ (16), in accordance with the designation scheme corresponding to the corresponding ones of the server designations $S_{11} \ldots S_{nm}$ (30). Alternatively, and/or additionally, in certain instances, certain ones of the servers $S_1 \ldots S_z$ (20), corresponding to certain ones of the server designations $S_{11} \ldots S_{nm}$ (30), may request additional information of the server PS (18) and/or specific ones of the clients $C_1 \ldots C_n$ (16), prior to communicating the responses $R_{11} \ldots R_{nm}$ (32) to the requests $Q_{11} \ldots Q_{nm}$ (29). Upon receiving such additional information from the server PS (18) and/or the specific ones of the clients $C_1 \ldots C_n$ (16), the certain ones of the servers $S_1 \ldots S_z$ (20), corresponding to the certain ones of the server designations $S_{11} \ldots S_{nm}$ (30), may then communicate the responses $R_{11} \ldots R_{nm}$ (32) to the requests $Q_{11} \ldots Q_{nm}$ (29) to the server PS (18) and/or the specific ones of the clients $C_1 \ldots C_n$ (16).

In certain such instances, in more detail, the server PS (18) and/or certain ones of the clients $C_1 \ldots C_n$ (16) may contact certain ones of the servers $S_1 \ldots S_z$ (20) and open the connections $OC_{11} \ldots OC_{nm}$ (323) therewith, corresponding to the requests $Q_{11} \ldots Q_{nm}$ (29), according to the server designations $S_{11} \ldots S_{nm}$ (30), one or more additional times, as a result of certain information communicated to the PS (18) and/or certain ones of the clients $C_1 \ldots C_n$ (16) within the responses $R_{11} \ldots R_{nm}$ (32), such as, for example, information obtained from and/or parsed from the responses $R_{11} \ldots R_{nm}$ (32). This information is typically within certain ones of the response header fields $JR_{11} \ldots JR_{nt}$ (352), but may also be within the corresponding optional entity bodies $RH_{11} \ldots RH_{nm}$ (353) and/or the corresponding response header lines $LR_{11} \ldots LR_{nm}$ (351).

Now, in such certain instances, the certain ones of the servers $S_1 \ldots S_z$ 920) request the information from the server PS (18) and/or certain ones of the clients $C_1 \ldots C_n$ (16), prior to communicating the responses $R_{11} \ldots R_{nm}$ (32) to the server PS (18) and/or the certain ones of the clients $C_1 \ldots C_n$ (16). The server PS (18) and/or the certain ones of the clients $C_1 \ldots C_n$ (16) being requested such information may then respond to the requests for such information, by communicating the requested information to the ones of the requesting servers $S_1 \ldots S_z$ (20). Upon receipt of the requested information at the ones of the requesting servers $S_1 \ldots S_z$ (20), the requesting ones of the servers $S_1 \ldots S_z$ (20) reply to the server PS (18) and/or the certain ones of the clients $C_1 \ldots C_n$ (16) with the responses $R_{11} \ldots R_{nm}$ (32). Such requests for information from the servers $S_1 \ldots S_z$ (20) may occur not at all, and/or one or more times.

L. PARSING, PROCESSING, FORMATTING, SORTING, GROUPING, AND ORGANIZING RESPONSES INTO SERVICE AND/OR INFORMATION RESPONSES

A particular one of the optional entity bodies $RH_{11} \ldots RH_{nm}$ (353), designated as the entity body $RH_{nm}$ (353), of a particular one of the responses $R_{11} \ldots R_{nm}$ (32), designated as the response $R_{nm}$ (32), may have optional response individual information groups $LS_{nm1} \ldots LS_{nmr}$ (360) and optional information $LL_{nm}$ (361), as shown in FIG. 105.

Each of the optional response individual information groups $LS_{nm1} \ldots LS_{nmr}$ (360) may have and/or be parsed into corresponding optional response links $LK_{nm1} \ldots LK_{nmr}$ (363), and/or corresponding optional response descriptions $DK_{nm1} \ldots DK_{nmr}$ (363), and/or corresponding optional response prices/values $PK_{nm1} \ldots PK_{nmr}$ (364), and/or corresponding optional response images $IK_{nm1} \ldots IK_{nmr}$ (365), as shown in FIG. 105.

The optional response links $LK_{nm1} \ldots LK_{nmr}$ (362), the corresponding optional response descriptions $DK_{nm1} \ldots DK_{nmr}$ (363), the corresponding optional response prices/values $PK_{nm1} \ldots PK_{nmr}$ (364), and the corresponding optional response image $IK_{nm1} \ldots IK_{nmr}$ (365), corresponding to the optional response individual information groups $LS_{nm1} \ldots LS_{nmr}$ (360) are typically associated correspondingly one with the other.

The optional response link $LK_{nm1}$ (362), the corresponding optional response description $DK_{nm1}$ (363), the corresponding optional response price/value $PK_{nm1}$ (364), and the corresponding optional response image $IK_{nm1}$ (365), corresponding to the optional response individual information group $LS_{nm1}$ (360) are typically associated correspondingly one with the other. The optional response link $LK_{nm2}$ (362), the corresponding optional response description $DK_{nm2}$ (363), the corresponding optional response price/value $PK_{nm2}$ (364), and the corresponding optional response image $IK_{nm2}$ (365), corresponding to the optional response individual information group $LS_{nm2}$ (360) are typically associated correspondingly one with the other, and so on. The optional response link $LK_{nmr}$ (362), the corresponding optional response description $DK_{nmr}$ (363), the corresponding optional response price/value $PK_{nmr}$ (364), and the corresponding optional response image $IK_{nmr}$ (365), corresponding to the optional response individual information group $LS_{nmr}$ (360) are, thus, typically associated correspondingly one with the other.

The optional information $LI_{nm}$ (361) may have additional links, and/or additional descriptions, and/or additional images, and/or prices/values, and/or other information, and/or services, and/or media, all and/or a portion of which may be used and/or discarded by the server PS (18) and/or the clients $C_1 \ldots C_n$ (16). The optional information $LI_{nm}$ (361) is typically filtered from the optional entity body $RH_{nm}$ (353) and discarded, and/or other unwanted information and/or media is also typically filtered from the response $R_{nm}$ (32), and/or the optional entity body $RH_{nm}$ (353), and discarded.

The optional response individual information groups $LS_{nm1} \ldots LS_{nmr}$ (360) are typically parsed and/or processed and/or formatted from the entity body $RH_{nm}$ (353) of the response $R_{nm}$ (32), and/or parsed, and/or processed, and/or formatted, and/or organized, and/or grouped into the addressable individual information groups $LG_{nm1} \ldots LG_{nmr}$ (80) of the addressable response information group $RG_{nm}$ (57), corresponding associated with the response $R_{nm}$ (32), as shown in FIGS. 106 and 107.

FIG. 106 shows the addressable response information group $RG_{nm}$ (57) having the addressable individual information groups $LG_{nm1} \ldots LG_{nmr}$ (80) parsed, and/or processed, and/or formatted, and/or organized, and/or grouped into the addressable response information group $RG_{nm}$ (57) from the optional entity body $RH_{nm}$ (353) of FIG. 105.

FIG. 107 shows a particular one of the optional response individual information groups $LS_{nm1} \ldots LS_{nmr}$ (360), designated as the optional response individual information group $LS_{nmr}$ (360), parsed, and/or processed, and/or formatted, and/or organized, and/or grouped into a particular one of the addressable individual information groups $LG_{nm1}$ . . . $LG_{nmr}$ (80), designated as the addressable individual information group $LG_{nmr}$ (80).

The addressable individual information groups $LG_{nm1}$ . . . $LG_{nmr}$ (80) are typically parsed, and/or processed, and/or formatted for consistency of presentation and/or appearance one with the other, as the addressable individual information groups $LG_{nm1}$ . . . $lG_{nmr}$ (80) are incorporated into the addressable response information groups $RG_{n1}$ . . . $RG_{nm}$ (57) from the responses $R_{n1}$ . . . $R_{nm}$ (32).

Alternatively and/or additionally the addressable individual information groups $LG_{nm1}$ . . . $LG_{nmr}$ (80) may be incorporated into the addressable response information groups $RG_{n1}$ . . . $RG_{nm}$ (57) from the responses $R_{n1}$ . . . $R_{nm}$ (32) in an as-is condition and/or in raw form.

The optional response links $LK_{nm1}$ . . . $LK_{nmr}$ (362) are typically parsed, and/or processed, and/or formatted into the corresponding optional links $LD_{nm1}$ . . . $LD_{nmr}$ (82). The optional response description $DK_{nm1}$ . . . $DK_{nmr}$ (363) are typically parsed, and/or processed, and/or formatted into the optional descriptions $DD_{nm1}$ . . . $DD_{nmr}$ (83). The optional response prices/values $PK_{nm1}$ . . . $PK_{nmr}$ (364) are typically parsed, and/or processed, and/or formatted into the corresponding optional prices/values $PD_{nm1}$ . . . $PD_{nmr}$ (84). The optional response images $IK_{nm1}$ . . . $IK_{nmr}$ (365) are typically parsed, and/or processed, and/or formatted into the corresponding optional images $ID_{nm1}$ . . . $ID_{nmr}$ (85).

Each of the optional links $LD_{n1}$ . . . $LD_{nr}$ (82) are also typically parsed, and/or processed, and/or formatted for consistency of presentation and/or appearance one with the other. Alternatively and/or additionally the optional links $LD_{nm1}$ . . . $LD_{nmr}$ (82) may be retained in an as-is condition and/or in raw form.

Each of the optional descriptions $DD_{nm1}$ . . . $DD_{nmr}$ (83) are also typically parsed, and/or processed, and/or formatted for consistency of presentation and/or appearance one with the other. Alternatively and/or additionally the optional links optional descriptions $DD_{nm1}$ . . . $DD_{nmr}$ (83) may be retained in an as-is condition and/or in raw form.

Each of the optional prices/values $PD_{nm1}$ . . . $PD_{nmr}$ (84) are also typically parsed, and/or processed, and/or formatted for consistency of presentation and/or appearance one with the other. Alternatively and/or additionally the optional prices/values $PD_{nm1}$ . . . $PD_{nmr}$ (84) may be retained in an as-is condition and/or in raw form.

Each of the optional images $ID_{nm1}$ . . . $ID_{nmr}$ (85) are also typically parsed, and/or processed, and/or formatted for consistency of presentation and/or appearance one with the other. Alternatively and/or additionally the optional images $ID_{nm1}$ . . . $ID_{nmr}$ (85) may be retained in an as-is condition and/or in raw form.

The optional links $LD_{nm1}$ . . . $LD_{nmr}$ (82), and/or the optional descriptions $DD_{nm1}$ . . . $DD_{nmr}$ (83), and/or the optional prices/values $PD_{nm1}$ . . . $PD_{nmr}$ (84), and/or the optional images $ID_{nm1}$ . . . $ID_{nmr}$ (85), correspondingly associated with the response $R_{nm}$ (32), may additionally and/or alternatively be parsed individually and/or separately, and incorporated into the addressable response information group $RG_{nm}$ (57) from the optional entity body $RH_{nm}$ (353), as shown in FIG. 108.

The response header line $LR_{nm}$ (351) and/or the optional response header fields $JR_{n1}$ . . . $JR_{nt}$ (352) may also have information, which the serve PS (18) and/or the clients $C_1$ . . . $C_n$ (16) may use.

The optional information $LL_{nm}$ (361) and/or certain information and/or media within the response $R_{nm}$ (32), particularly within the optional entity body $RH_{nm}$ (353), may be optionally used by the server PS (18) and/or the clients $C_1$ . . . $C_n$ (16), and/or optionally incorporated into the addressable response information group $RG_{nm}$ (57).

Each of the optional response individual information groups $LS_{nm1}$ . . . $LS_{nmr}$ (360) from each of the responses $R_{n1}$ . . . $R_{nm}$ (32) may be compared one with the other, and duplicate ones of the of the optional response individual information groups $LS_{nm1}$ . . . $LS_{nmr}$ (360) may be discarded.

Alternatively and/or additionally, each of the optional addressable individual information groups $LG_{n11}$ . . . $LG_{nmr}$ (80) from each of the addressable response information groups $RG_{n1}$ . . . $RG_{nm}$ (57) may be compared one with the other, and duplicate ones of the optional addressable individual information groups $LG_{n11}$ . . . $LG_{nmr}$ (80) may be discarded.

Each of the optional response individual information groups $LS_{111}$ . . . $LS_{nmr}$ (360) and/or portions thereof from the entity bodies $RH_{11}$ . . . $RH_{nm}$ (353) of the responses $R_{11}$ . . . $R_{nm}$ (32) may also be optionally compared one with the other, and duplicate ones of the of the optional response individual information groups $LS_{111}$ . . . $LS_{nmr}$ (360) may be optionally discarded.

Alternatively and/or additionally, each of the optional links $LK_{n11}$ . . . $LK_{nmr}$ (362), and/or the optional descriptions $DK_{n11}$ . . . $DK_{nmr}$ (363), and/or the optional prices/values $PK_{nm1}$ . . . $PK_{nmr}$ (364), and/or the optional images $IK_{n11}$ . . . $IK_{nmr}$ (365), from each of the responses $R_{n1}$ . . . $R_{nm}$ (32) may be compared one with the other of like kind, and duplicate ones of the optional links $LK_{n11}$ . . . $LK_{nmr}$ (362), and/or the optional descriptions $DK_{n11}$ . . . $DK_{nmr}$ (363), and/or the optional prices/values $PK_{nm1}$ . . . $PK_{nmr}$ (365), and/or the optional images $IK_{n11}$ . . . $IK_{nmr}$ (365), and/or a combination thereof may be discarded.

Alternatively and/or additionally, each of the optional links $LD_{n11}$ . . . $LD_{nmr}$ (82), and/or the optional descriptions $DD_{n11}$ . . . $DD_{nmr}$ (83), and/or the optional prices/values $PD_{nm1}$ . . . $PD_{nmr}$ (84), and/or the optional images $ID_{n11}$ . . . $ID_{nmr}$ (85) from each of the addressable response information groups $RG_{n1}$ . . . $RG_{nm}$ (57) may be compared one with the other of like kind, and duplicate ones of the optional links $LD_{n11}$ . . . $LD_{nmr}$ (82), and/or the optional descriptions $DD_{n11}$ . . . $DD_{nmr}$ (83), and/or the optional prices/values $PD_{nm1}$ . . . $PD_{nmr}$ (84), and/or the optional images $ID_{n11}$ . . . $ID_{nmr}$ (85), and/or a combination thereof may be discarded.

The optional links $LK_{n11}$ . . . $LK_{nmr}$ (362) are typically compared one with the other, and duplicate ones of the corresponding optional links $LK_{n11}$ . . . $LK_{nmr}$ (362), and/or the corresponding optional descriptions $DK_{n11}$ . . . $DK_{nmr}$ (363), and/or the corresponding optional images $IK_{n11}$ . . . $IK_{nmr}$ (365), and/or the corresponding optional prices/values $PK_{nm1}$ . . . $PK_{nmr}$ (364) are discarded, leaving only one of any ones of the duplicate optional links $LK_{n11}$ . . . $LK_{nmr}$ (362) and/or the corresponding optional descriptions $DK_{n11}$ . . . $DK_{nmr}$ (363), and/or the corresponding optional images $IK_{n11}$ . . . $IK_{nmr}$ (365), and/or the optional prices/values $PK_{nm1}$ . . . $PK_{nmr}$ (364) remaining.

The optional prices/values $PD_{nm1}$ . . . $PD_{nmr}$ (84) and/or the corresponding optional links $LD_{n11}$ . . . $LD_{nmr}$ (82) and/or the corresponding optional description $DD_{n11}$ . . . $DD_{nmr}$ (83), and/or the corresponding optional images $ID_{n11}$ . . . $ID_{nmr}$ (85) may be sorted with respect to the optional prices/values $PD_{nm1}$ . . . $PD_{nmr}$ (84), in accordance with sorting criteria in the optional instructions $VJ_{n1}$ . . . $VJ_{nk}$ (52) and/or in accordance with default criteria resident within the server PS (18) and/or the client $C_n$ (16).

The optional links $LD_{n11}$ . . . $LD_{nmr}$ (82), and/or the corresponding optional descriptions $DD_{n11}$ . . . $DD_{nmr}$ (83), and/or the corresponding optional prices/values $PD_{nm1}$ . . . $PD_{nmr}$ (84), and/or the corresponding optional images $ID_{n11}$ . . . $ID_{nmr}$ (85) may be sorted, for example, in ascending order with respect to the optional prices/values $PD_{nm1}$ . . . $PD_{nmr}$ (84) having the lowest price therein being presented to the user $U_n$ (12) at the user interface $I_n$ (14) first and the highest price therein last.

Alternatively and/or additionally, the optional links $LD_{n11}$ . . . $LD_{nmr}$ (82), and/or the corresponding optional descriptions $DD_{n11}$ . . . $DD_{nmr}$ (83), and/or the corresponding optional prices/values $PD_{nm1}$ . . . $PD_{nmr}$ (84), and/or the corresponding optional images $ID_{n11}$ . . . $ID_{nmr}$ (85) may be sorted, for example, in ascending or descending alphabetical order with respect to the optional links $LD_{n11}$ . . . $LD_{nmr}$ (82) and/or the corresponding optional descriptions $DD_{n11}$ . . . $DD_{nmr}$ (83) being presented to the user $U_n$ (12) at the user interface $I_n$ (14).

Other sorting criteria may be used for the optional links $LD_{n11}$ . . . $LD_{nmr}$ (82), and/or the optional descriptions $DD_{n11}$ . . . $DD_{nmr}$ (83), and/or the optional prices/values $PD_{nm1}$ . . . $PD_{nmr}$ (84), and/or the optional images $ID_{n11}$ . . . $ID_{nmr}$ (85), and may depend upon needs of the user $U_n$ (12). The sorting criteria may be determined by the user $U_n$ (12).

Sorting criteria gives the user $U_n$ 912) the ability to formulate how information is presented to the user $U_n$ (12) at the user interface $I_n$ (14), and may be incorporated into the optional instructions $VJ_{n1}$ . . . $VJ_{nk}$ (52), which may be entered into the user interface $I_n$ (14) through the user input $UI_n$ (25) by the user $U_n$ (12). The sorting criteria may additionally and/or alternatively be resident within the server PS (18) and/or the client $C_n$ (16).

Now again, the labelled individual information group $LL_{nzu}$ (86) associated with the addressable query information group $GI_{nz}$ (63) has the optional group identifier $GL_{nc}$ (87), the optional query link identifier $LN_{ncu}$ (88), the optional resource location identifier $SU_{nw}$ (89), the optional server and/or query identifier $SI_{nm}$ (90), and/or the optional server link identifier $LX_{nmr}$ (91) appended to the addressable individual information group $LG_{nmr}$ (80), as shown in FIG. 68.

FIGS. 109 and 110 show typical ones of the addressable query information group $GI_{nz}$ (63), based upon certain sorting and/or grouping criteria, having the labelled individual information groups $LL_{nz1}$ . . . $LL_{nzu}$ (86), the optional database labelled individual information groups $RL_{nz1}$ . . . $RL_{nzx}$ (92), the optional query description $QT_{nz}$ (93), the optional server descriptions and/or links $ST_{nz1}$ . . . $ST_{nzf}$ (94), and the optional advertisements and/or links $LT_{nz1}$ . . . $LT_{nzt}$ (95) incorporated into certain typical ones of the typical service and/or information response forms $IS_n$ (39) of FIGS. 27A–52C, inclusive.

The client-server multitasking system 10 of the present invention, the client-server multitasking process 99, and the multitasking process 104, the server PS (18) and/or the clients $C_1$ . . . $C_n$ (16), then, are capable of retrieving, parsing, processing, formatting, organizing, grouping, sorting, and consolidating services and/or information from the same and/or different ones of the servers $S_1$ . . . $S_z$ (20), and/or the optional servers $SO_1$ . . . $SO_p$ (22), and/or the clients $C_1$ . . . $C_n$ 916), having the same and/or different structures, formats, organizations, groupings, and/or data structures, and incorporating the parsed, processed, formatted, organized, grouped, sorted, and consolidated service and/or information into the user responses $UR_1$ . . . $UR_n$ (37) for delivery to the user interfaces $I_1$ . . . $I_n$ (14) and use by the users $U_1$ . . . $U_n$ (12).

The client-server multitasking system 10 of the present invention, the client-server multitasking process 99, and the multitasking process 104, the server PS (18) and/or the clients $C_1$ . . . $C_n$ (16), then, are capable of retrieving, parsing, processing, formatting, organizing, grouping, sorting, and consolidating service and/or information from the same and/or different ones of each of the optional response individual information groups $LS_{111}$ . . . $LS_{nmr}$ ((360), and/or the optional response links $LK_{111}$ . . . $LK_{nmr}$ (362), and/or the optional response descriptions $DK_{111}$ . . . $DK_{nmr}$ (363), and/or the optional response prices/values $PK_{111}$ . . . $PK_{nmr}$ (364), and/or the optional response images $IK_{nm1}$ . . . $IK_{nmr}$ (365) from the entity bodies $RH_{11}$ . . . $RH_{nm}$ (353) of the responses $R_{11}$ . . . $R_{nm}$ (32), having the same and/or different structures, formats, organizations, groupings, and/or data structures, and incorporating the parsed, processed, formatted, organized, grouped, sorted, and consolidated services and/or information into the user responses $UR_1$ . . . $UR_n$ (37) for delivery to the user interfaces $I_1$ . . . $I_n$ (14) and use by the users $U_1$ . . . $U_n$ (12).

M. ADDITIONAL FEATURES AND/OR OTHER CONSIDERATIONS

The present invention is directed to a client-server multitasking system and process capable of information and/or service retrieval from the same and/or different ones of servers substantially simultaneously and on-the-fly, using the same and/or different ones of queries of the same and/or different ones of the servers, and sorting, grouping, and/or organizing responses therefrom substantially on-the-fly, and communicating service and/or information responses to the requestors and/or users substantially simultaneously and on-the-fly. The client-server multitasking system and process are capable of use on a variety of networks, such as global area networks, and in particular, the internet, metropolitan area networks, wide area networks, and local area networks, and be capable of searching search engines and/or other sites substantially simultaneously and on-the-fly.

The client-server multitasking system and process are capable of retrieving substantially multiple simultaneous services and/or information having the same and/or different criteria from the same and/or different servers, sorting, grouping, and/or organizing the responses form the servers and/or the clients into information and/or services responses, and communicating the service and/or information responses to the requestors and/or users substantially simultaneously. The requestors and/or the users may make substantially simultaneous service and/or information requests of servers and clients, using the same and/or different queries, and/or the same and/or different instructions. The same and/or different uniform resource locators, target resource, and/or paths may be used.

The client-server multitasking system and process are capable of making multiple substantially simultaneous same and/or different requests of the same and/or different servers, organizing responses from the servers into service and/or information responses, and communicating the service and/or information responses to the requestors and/or the users substantially simultaneously.

The client-server multitasking system and process are also capable of sorting, grouping, and/or organizing results form the servers, search engines, and/or sites, in accordance with instructions from the requestors, and/or the users, and/or instructions resident within the client-server multitasking system and/or process. The client-server multitasking system is capable of use in a variety of applications, and is capable of information comparison and/or trend analysis of information from the same and/or different sources substantially simultaneously. The client-server multitasking system and process are also capable of building a client-server multitasking system search engine and/or database from responses returned form the servers, search engines, and/or sites being queried and/or searched, and/or having requests made thereof, are capable of being searched and/or queried, querying sites referenced in the client-server multitasking system search engine and/or database, and updating information and/or services stored therein.

The client-server multitasking system and process are capable of information and/or service retrieval from the same and/or different ones of servers substantially simultaneously and on-the-fly, using the same and/or different ones of queries, and sorting, grouping, and/or organizing responses therefrom substantially on-the-fly.

A requestor and/or user is capable of making substantially multiple simultaneous same and/or different requests of the same and/or different servers. The client server-multitasking system and process are capable of organizing responses from the servers into service and/or information responses, and communicating the service and/or information responses to the requestors and/or the users substantially simultaneously, and on-the-fly.

The requestors and/or users are capable of making substantially simultaneously service and/or information requests of the same and/or different ones of servers and/or clients, using the same and/or different queries, and/or the same and/or different instructions. The client-server multitasking system and process are capable of retrieving substantially multiple simultaneous services and/or information having the same and/or different criteria form the same and/or different servers, sorting, grouping, and/or organizing the responses from the servers and/or the clients into information and/or services responses, and communicating the service and/or information responses to the requestors and/or the users substantially simultaneously. The same and/or different ones of uniform resource locators, target resources, and/or paths may be used.

The requestors and/or users are capable of making multiple simultaneous searches. The searches may have at least one or a plurality of same or different queries of the same and/or different servers and/or clients. The responses from the servers and/or the clients may be of being organized into the service and/or information response in a variety of formats. The responses may be sorted within the service and/or information response, such as, for example, by category, query, group, page, order of importance, ascending and/or descending order, alphabetically and/or numerically, or other characteristics, as determined by the requestor, and/or the user, and/or the client-server multitasking system, and/or the responses may be combined within the service and/or information response, such as, for example, interleaving the responses one with the other, such as, for example, by order of relevance or other parameters. The responses may also be capable of being grouped by search criteria, server, order of importance, or by numerical factors such as value, price, or other numerical quantifier. The responses may be presentable, for example, in ascending or descending order in interleaved format, such as top ones, twos, threes, and so on, or presentable separately to the requestor and/or the user. The order may be order of importance or relevance related, or, for example, numerically valued, such as price or stock marked value.

The client-server multitasking system and process are capable of information and/or service retrieval from the same and/or different ones of the servers substantially simultaneously and on-the-fly, using the same and/or different ones of the queries, and sorting, grouping, and/or organizing responses therefrom substantially on-the-fly.

The client-server multitasking system and process are capable of substantially multiple simultaneous searching, using the same and/or different ones of queries of the same and/or different ones of the clients and/or servers, which may be search engines, and/or sites, and/or servers, and/or location on the network, and additionally and/or alternatively building a client-server multitasking search engine and/or database. The client-server multitasking search engine and/or database are capable of storing the information and/or services retrieved from the search engines, and/or sites, and/or servers, and/or locations being queried on the network therein, and building the client-server search engine and/or database. The client-server multitasking search engine is also capable of being queried either directly and/or in combination with the substantially simultaneous searching, using the same and/or different queries of the same and/of different search engines, sites, servers, and/or databases. The client-server multitasking search engine and/or database are also capable of updating information and/or services stored therein by querying sites, servers, search engines, and/or databases containing information and/or services referenced in the client-server multitasking search engine and/or database.

The client-server multitasking system and process are also capable of use on a variety of networks, such as global area networks, and in particular, the internet, metropolitan area networks, wide area networks, and local area networks.

The client-server multitasking system and process are capable of substantially simultaneous searching of the same and/or different ones of search engines and/or sites on the network substantially on-the-fly, with the same and/or different ones of the queries, and sorting, grouping, and/or organizing responses therefrom substantially on-the-fly.

The client-server multitasking system and process are also capable of sorting, grouping, and/or organizing results from the servers, search engines, and/or sites, in accordance with instructions from the requestors and/or the users, and/or instructions resident within the client-server multitasking system and/or process. The client-server multitasking system and process are also capable of drilling down and/or up to different levels within the search engines, sites, and/or servers being queried.

The client-server multitasking system and process are capable of providing manual and/or timed updates. Such timed updates allow for motion related presentation to the requestor and/or the user.

The client-server multitasking system and process are capable of incorporating information and/or services into a variety of user interfaces at different location sin the user interfaces, grouping, and/or organizing the information and/or services, and optionally eliminating duplicate information and/or services.

The client-server multitasking system and process are capable of incorporating links, graphics, video, text, and audio, and/or combinations thereof, and selective advertising, according to selectable search, query, sorting, and/or grouping criteria, and/or combinations thereof into the information and/or services to be delivered to the user interfaces. The requestor and/or the user may place order, such as purchases, and/or other types of orders, payments, confirmations thereof, and/or combinations thereof, either directly and/or through servers and/or sites on the network.

The client-server multitasking system is capable of use in a variety of applications, and is capable of information comparison and/or trend analysis of information from the same and/or different sources substantially simultaneously. The client-server multitasking system is capable of, for example, determining best query results, with respect to a plurality of search engine results; purchasing and/or price comparisons, viewing and/or reviewing prices/values and trends for different sits, determining lowest costs and lowest cost analyses for wholesale and retail purposes; product availability, e.g., airline tickets, pricing, and ticket availability, from different airlines to the same and/or different locations; purchasing of commodities and/or stocks form the same and/or different sites with updates every few seconds and/or minutes; obtaining prices and/or values in different stock markets substantially simultaneously; and searching for jobs on the same and/or different job sites, using the same and/or different job criteria, for example, on a daily basis, the job sites having changing job availability; and/or a combination thereof, all substantially simultaneously. The client-server multitasking system is capable of presenting information and/or services for review and/or updating from the same and/or different ones of sites, servers, and/or applications substantially simultaneously, and trend analysis thereof, using a variety of sorting, grouping and/or organizing criteria, according to the needs of the requestor, and/or the user, and/or resident within the client-server multitasking system.

The client server-multitasking system and process are capable of service and/or information retrieval from at least one server, organization, communication, and presentation of such services and/or information to at least one requestor and/or user, and/or optional storage, and/or retrieval of such services and/or information from the optional storage. The client-server multitasking system and process are capable of building a client-server multitasking system search engine and/or database from responses returned from the servers, search engines, and/or sites being queried and/or searched, and/or having requests made thereof. The client-server multitasking system search engine and/or database having stored information and/or services therein are also searchable, are capable of full text searches thereof, and are searchable by the servers and/or the clients on the network, either separately and/or in combination with the substantially simultaneous multiple same and/or different searches and/or queries of the same and/or different servers on the network. Information in the client-server multitasking system search engine and/or database are also searchable and/or retrievable, and are capable of being incorporated into the service and/or information responses delivered to the user interfaces, according to search criteria, selectively and/or automatically, by the requestor and/or the user. The client-server multitasking system search engine and/or database are capable of spidering, and/or roboting, and/or querying sites, services and/or information to be stored therein and/or stored in the client-server multitasking system search engine and/or database, and updating the service and/or information to be stored and/or stored in the client-server multitasking system search engine and/or database.

The client-server multitasking system and process, then, are capable of information and/or service retrieval from the same and/or different ones of servers substantially simultaneously and on-the-fly, using the same and/or different ones of queries of the same and/or different ones of the servers, and sorting, grouping, and/or organizing responses therefrom substantially on-the-fly, and communicating service and/or information responses to the requestors and/or users substantially simultaneously and on-the-fly. The client-server multitasking system and process are capable of use on a variety of networks, such as global area networks, and in particular, the internet, metropolitan area networks, wide area networks, and local area networks, and are capable of searching search engines and/or other sites substantially simultaneously and on-the-fly. The client-server multitasking system and process are capable of sorting, grouping, and/or organizing results from the servers, search engines, and/or sites, in accordance with instructions from the requestors, and/or users, and/or instructions resident within the client-server multitasking system and/or process. The client-server multitasking system is capable of use in a variety of applications, and is capable of information comparison and/or trend analysis of information from the same and/or different sources substantially simultaneously. The client-server multitasking system and process are capable of building a client-server multitasking system search engine and/or database from responses returned from the servers, search engines, and/or sites being queries and/or searched, and/or having requests made thereof, is capable of being searched and/or queried, querying sites referenced in the client-server multitasking system search engine and/or database, and updating information and/or services stored therein.

The client-server multitasking system and process are capable of retrieving, parsing, processing, formatting, organizing, grouping, sorting, and consolidating service and/or information from the same and/or different ones of the servers and/or clients having the same and/or different structures, formats, organizations, groupings, and/or data structures, and incorporating the parsed, processed, formatted, organized, grouped, sorted, and consolidated services and/or information into user responses for delivery to and use by the requestors and/or users.

The client-server multitasking system 10 of the present invention, the client-server multitasking process 99, and the multitasking process 104, the server PS (18) and/or the clients $C_1 \ldots C_n$ 916), then, are capable of retrieving, parsing, processing, formatting, organizing, grouping, sorting, and consolidating services and/or information from the same and/or different ones of the servers $S_1 \ldots S_z$ (20), and/or the optional servers $SO_1 \ldots SO_p$ (22), and/or the client $C_1 \ldots C_n$ 916), having the same and/or different structures, formats, organizations, groupings, and/or data structures, and incorporating the parsed, processed, formatted, organized, grouped, sorted, and consolidated services and/or information into the user responses $UR_1 \ldots UR_n$ (37), for delivery to the user interfaces $I_1 \ldots I_n$ 914) and use by the users $U_1 \ldots U_n$ (12).

The client-server multitasking system 10 of the preset invention, the client-server multitasking process 99, and the multitasking process 104, which in itself is a process, the user interfaces $I_1 \ldots I_n$ 914), and/or the clients $C_1 \ldots C_n$ (16), and/or the server PS (18), and/or the servers $S_1 \ldots S_z$ (20), and/or the optional servers $SO_1 \ldots SO_p$ (22) may be constructed of hardware, firmware, software, machines, and/or operating systems, and/or combinations thereof, and/or other suitable means, and/or other components and/or systems, and/or combinations thereof. Such hardware, firmware, software, machines, and/or operating systems, and/or combinations thereof, other components and/or systems, and/or other suitable means, and/or combinations thereof may have therein and/or be resident therein, but are not limited to computer components and/or systems, television and/or telecommunications components and/or systems, merger of television and computer systems, and/or merger of television and/or computer and/or telecommunications systems, networks, simulators, interactive technologies and/or systems, cybernetics and/or cybernetic systems, and/or combinations thereof.

The clients $C_1 \ldots C_n$ 916), the server PS (18), the servers $S_1 \ldots S_z$ (20), and/or the optional servers $SO_1 \ldots SO_p$ (22) may be search engines, and/or sites, and/or servers, and/or clients, and/or URL's, and/or databases, and/or locations on the network, and/or other suitable components and/or systems, and/or other suitable means, and/or combinations thereof, which may be capable of communicating on the network 24. The scope of the client-server multitasking system 10 of the present invention, the client-server multitasking process 99, and the multitasking process 104, however, is not limited to search engines, and/or sites, and/or servers, and/or clients, and/or URL's, and/or databases, and/or locations on the network, and/or other suitable components and/or systems, and/or other suitable means, and/or combinations thereof, which may be capable of communicating on the network 24, as it is recognized that other components, systems, technologies, and/or operating systems exist and/or emerge that may make use of the benefits of the present invention, and are either on the horizon and/or are recognized to be forthcoming.

The client-server multitasking system 10 of the present invention, the client-server multitasking process 99, and the multitasking process 104, which in itself is a process, the user interfaces $I_1 \ldots I_n$ 914), and/or the clients $C_1 \ldots C_n$ (16), and/or the server PS (18), and/or the servers $S_1 \ldots S_z$ (20), and/or the optional servers $SO_1 \ldots SO_p$ (22), may then be hardware, firmware, software, and/or machines, and or operating systems, and/or other suitable means, and/or combinations thereof, and may have and/or be resident within general purpose computers, special purpose computers, televisions, computer-television combinations, telecommunications systems, networks, mergers of computer and/or television technology and/or telecommunications technology and/or network technology, media, film, entertainment, interactive technologies and/or systems, cybernetics and/or cybernetic systems and/or technology, components, and/or systems, and/or other suitable means, and/or combinations thereof, and may be integrated one with the other and/or with other components and/or systems of one another, and may each be substantially the same and/or different one from the other.

The client-server multitasking system 10 of the present invention, the client server multitasking process 99, and the multitasking process 104, which in itself is a process, the user interfaces $I_1 \ldots I_n$ 914), and/or the clients $C_1 \ldots C_n$ (16), and/or the server PS (18), and/or the servers $S_1 \ldots S_z$ (20), and/or the optional servers $SO_1 \ldots SO_p$ (22) may each have the same and/or different hardware, firmware, software, and/or ones of operating systems, and/or other suitable means, and/or combinations thereof. The optional databases 41 and/or 42 may also be hardware, firmware, software, and/or machine based, and/or other suitable means, and/or combinations thereof, have the same and/or different ones of operating systems and/or combinations thereof, and may have memory components associated therewith.

The client-server multitasking system and process are capable of use on a variety of networks, such as global area networks, and in particular, the internet, metropolitan area networks, wide are networks, and local area networks. Such networks may be Earth based, satellite based, and/or space based, and/or other suitable means, and/or combinations thereof.

The scope of the client-server multitasking system 10 of the present invention, the client-server multitasking process 99, and the multitasking process 104, however, is not limited to such components, systems, technologies, operating system and/or networks, as other components, systems, technologies, and/or operating systems exist and/or emerge that may make use of the benefits of the present invention, and are either on the horizon and/or are recognized to be forthcoming.

Determination as to whether the server PS (18) performs the multitasking process 104, and/or whether particular ones of the clients $C_1 \ldots C_n$ (16) perform the multitasking process 104, may optionally be made at the particular ones of the clients $C_1 \ldots C_n$ (16) and/or the server PS (18). Such determination may optionally be made by the users $U_1 \ldots U_n$ (12), and/or be based upon processing power, capabilities, and/or configurations of the particular ones of the clients $C_1 \ldots C_n$ (16), the server PS (18), and the network 24 considerations (traffic, load, and/or other considerations).

The client-server multitasking search engine and/or database are capable of updating information and/or services stored therein by querying sites, servers, search engines, and/or databases containing information and/or services referenced in the client-server multitasking search engine and/or database.

The client-server multitasking system and process are capable of use on a variety of networks, such as global area networks, and in particular, the internet, metropolitan area networks, wide area networks, and local area networks, and is capable of searching search engines and/or other sites substantially simultaneously and on-the-fly.

The client-server multitasking system and process are capable of substantially simultaneous searching of the same and/or different ones of search engines and/or sites on the network substantially on-the-fly, with the same and/or different ones of the queries, and sorting, grouping, and/or organizing responses therefrom substantially on-the-fly.

The client-server multitasking system and process are also capable of sorting, grouping, and/or organizing results from the servers, search engines, and/or sites, in accordance with instructions from the requestors, and/or instructions resident within the client-server multitasking system and/or process. The client-server multitasking system and process are also capable of drilling down and/or up to different levels within the search engines, sites, and/or servers being queried.

Now again, the typical ones of the service and/or information entry request forms $IE_1 \ldots IE_n$ (38) at the user interfaces $I_1 \ldots I_n$ (14) shown in FIGS. 5A, 5B, and 6–10 are typical examples of the service and/or information entry request forms $IE_1 \ldots IE_n$ (38) at the user interfaces $I_1 \ldots I_n$ (14), a much larger variety of which is possible. Names and/or links and/or other information are incorporated in the typical ones of the service and/or information entry request forms $IE_1 \ldots IE_n$ (38) shown in FIGS. 5A, 5B, and 6–10 for illustrative purposes, and are not intended to limit the large variety of the service and/or information entry request forms $IE_1 \ldots IE_n$ (38) and the names and/or links and/or information that are possible, and that may be incorporated into the service and/or information entry request forms $IE_1 \ldots IE_n$ (38) at the user interfaces $I_1 \ldots I_n$ (14).

Now again, The typical ones of the completed service and/or information entry request forms $IF_1 \ldots IF_n$ (230) at the user interfaces $I_1 \ldots I_n$ (14) shown in FIGS. 11–26 are typical examples of the completed service and/or information entry request forms $IF_1 \ldots IF_n$ (230) at the user interfaces $I_1 \ldots I_n$ (14), a much larger variety of which is possible. Typical queries $QQ_{n1} \ldots QQ_{nm}$ (53), typical server addresses $AQ_{n1} \ldots AQ_{nm}$ (54), and typical optional instructions $VJ_{n1} \ldots VJ_{nk}$ (52) in the typical ones of the completed service and/or information entry request forms $IF_1 \ldots IF_n$ (230) at the user interfaces $I_1 \ldots I_n$ (14) shown in FIGS. 11–26 are typical examples for illustrative purposes, and are not intended to limit the substantially infinite variety of the queries $QQ_{n1} \ldots QQ_{nm}$ (53), the server addresses $AQ_{n1} \ldots AQ_{nm}$ (54), and the optional instructions $VJ_{n1} \ldots VJ_{nk}$ (52) that may be entered into the service and/or information entry request forms $IE_1 \ldots IE_n$ (38), to derive the completed service and/or information entry request forms $IF_1 \ldots IF_n$ (230) at the user interfaces $I_1 \ldots I_n$ (14). Likewise, names and/or links and/or other information are incorporated in the typical ones of the completed service and/or information entry request forms $IF_1 \ldots IF_n$ (230) shown in FIGS. 11–26 for illustrative purposes, and are not intended to limit the large variety of the completed service and/or information entry request forms $IF_1 \ldots IF_n$ (230) and the names and/or links and/or information that are possible, and that may be incorporated into the completed service and/or information entry request forms $IF_1 \ldots IF_n$ (230) at the user interfaces $I_1 \ldots I_n$ (14).

Now again, the typical ones of the user responses $UR_1 \ldots UR_n$ (37), as typical service and/or information response forms $IS_1 \ldots IS_n$ (39) at the user interfaces $I_1 \ldots I_n$ (14) shown in FIG. 27A–52C, inclusive, are typical examples of the user responses $UR_1 \ldots UR_n$ (37), as typical service and/or information response forms $IS_1 \ldots IS_n$ (39) at the user interfaces $I_1 \ldots I_n$ (14), a much larger variety of which is possible. FIGS. 27A–52C, inclusive, illustrate typical examples of typical ones of the user responses $UR_1 \ldots UR_n$ (37), as typical service and/or information response forms $IS_1 \ldots IS_n$ (39) at the user interfaces $I_1 \ldots I_n$ (14) to the typical queries typical queries $QQ_{n1} \ldots QQ_{nm}$ (53), the typical ones of the server addresses $AQ_{n1} \ldots AQ_{nm}$ (54), and the typical optional instructions $VJ_{n1} \ldots VJ_{nk}$ (52) having been entered into the typical ones of the completed service and/or information entry request forms $IF_1 \ldots IF_n$ (230) at the user interfaces $I_1 \ldots I_n$ (14) shown in FIGS. 11–26.

The typical examples of the typical ones of the user responses $UR_1 \ldots UR_n$ (37), as typical service and/or information response forms $IS_1 \ldots IS_n$ (39) at the user interfaces $I_1 \ldots I_n$ 914) are for illustrative purposes, and are not intended to limit the substantially infinite variety of the user responses $UR_1 \ldots UR_n$ (37), as the service and/or information response forms $IS_1 \ldots IS_n$ (39) at the user interfaces $I_1 \ldots I_n$ (14), the queries $QQ_{n1} \ldots QQ_{nm}$ (53), the server addresses $AQ_{n1} \ldots AQ_{nm}$ (54), and the optional instructions $VJ_{n1} \ldots VJ_{nk}$ (52) that may be entered into the service and/or information entry request forms $IE_1 \ldots IE_n$ (38), to derive the to the completed service and/or information entry request forms $IF_1 \ldots IF_n$ (230), and which result in the user responses $UR_1 \ldots UR_n$ (37), as the service and/or information response forms $IS_1 \ldots IS_n$ (39) at the user interfaces $I_1 \ldots I_n$ (14). Likewise, names and/or links and/or other information are incorporated into the typical ones of the user responses $UR_1 \ldots UR_n$ (37), as the service and/or information response forms $IS_1 \ldots IS_n$ (39) at the user interfaces $I_1 \ldots I_n$ 914), shown in FIGS. 27A–52C, inclusive, for illustrative purposes, and are not intended to limit the large variety of the user responses $UR_1 \ldots UR_n$ (37), as the service and/or information response forms $IS_1 \ldots IS_n$ (39), at the user interfaces $I_1 \ldots I_n$ (14), and the names and/or links and/or information that are possible, and that may be incorporated into the user responses $UR_1 \ldots UR_n$ (37), as the service and/or information response forms $IS_1 \ldots IS_n$ (39) at the user interfaces $I_1 \ldots I_n$ (14).

The server addresses $AQ_{n1} \ldots AQ_{nm}$ (54), such as WebCrawler®, Altavista®, Lycos®, Infoseek®, Excite®, Yahoo®, LookSmart®, HotBot®, Dejanews®, Amazon®, Borders®, BarnesandNoble®, Google®, and/or others that may have been used herein are for illustrative purposes, to illustrate typical ones of the service and/or information entry request forms $IE_1 \ldots IE_n$ (38) at the user interfaces $I_1 \ldots I_n$ (14) shown in FIGS. 5A, 5B, and 6–10, typical ones of the completed service and/or information entry request forms $IF_1 \ldots IF_n$ (230) at the user interfaces $I_1 \ldots I_n$ 914) shown in FIG. 11–26, and/or typical ones of the user responses $UR_1 \ldots UR_n$ (37), as the service and/or information response forms $IS_1 \ldots IS_n$ (39) at the user interfaces $I_1 \ldots I_n$ (14), shown in FIGS. 27A–52C, inclusive, and other examples used herein, are used merely to illustrate typical examples of the server addresses $AQ_{n1} \ldots AQ_{nm}$ (54) and results therefrom that may be possible. The examples shown in FIGS. 5A, 5B, and 6–10, 11–26, and FIGS. 27A–52C, inclusive, and other examples used herein, are examples of the substantially infinite variety of the server addresses $AQ_{n1} \ldots AQ_{nm}$ (54) that may be used with the client-server multitasking system 10 of the present invention and the results that may be obtained therefrom. The typical server addresses $AQ_{n1} \ldots AQ_{nm}$ (54), such as WebCrawler®, Altavista®, Lycos®, Infoseek®, Excite®, Yahoo®, LookSmart®, HotBot®, Dejanews®, Amazon®, Borders®, BarnesandNoble®, Google®, and/or others that may have been used herein are for illustrative purposes only and are not intended to limit the scope of the client-server multitasking system 10 of the present invention.

It should also be obvious that the typical queries $QQ_{n1} \ldots QQ_{nm}$ (53) used in the examples shown in FIGS. 5A, 5B, and 6–10, 11–26, and FIGS. 27A–52C, inclusive, and other examples used herein are for illustrative purposes and are merely typical examples of the substantially infinite variety of the queries $QQ_{n1} \ldots QQ_{nm}$ (53) that may be used with the client-server multitasking system 10 of the present invention and the results that may be obtained therefrom, and are not intended to limit the substantially infinite variety of the queries $QQ_{n1} \ldots QQ_{nm}$ (53) that may be used with the client-server multitasking system 10 of the present invention and the results that may be obtained therefrom. The typical queries $QQ_{n1} \ldots QQ_{nm}$ (53) used in the examples shown in FIGS. 5A, 5B, and 6–10, 11–26, and FIGS. 27A–52C, inclusive, and other examples used herein are for illustrative purposes only and are not intended to limit the scope of the client-server multitasking system 10 of the present invention.

The typical labelled individual information groups $LL_{n11} \ldots LL_{nzu}$ (86), the typical optional links $LD_{nm1} \ldots LD_{nmr}$ (82), and/or the typical optional descriptions $DD_{nm1} \ldots DD_{nmr}$ (83), and/or the typical optional prices/values $PD_{nm1} \ldots PD_{nmr}$ (84), and/or the typical optional images $ID_{nm1} \ldots ID_{nmr}$ (85), and/or advertisements and/or advertisement links, and/or URL's, and/or locations, and/or other items and/or objects shown in FIGS. 5A, 5B, and 6–10, 11–26, and FIGS. 27A–52C, inclusive, and other examples used herein are typical examples for illustrative purposes only and are not intended to limit the scope of the client-server multitasking system 10 of the present invention. A substantially infinite variety of the labelled individual information groups $LL_{n11} \ldots LL_{nzu}$ (86), the optional links $LD_{nm1} \ldots LD_{nmr}$ (82), and/or the optional descriptions $DD_{nm1} \ldots DD_{nmr}$ (83), and/or the optional prices/values $PD_{nm1} \ldots PD_{nmr}$ (84), and/or the optional images $ID_{nm1} \ldots ID_{nmr}$ (85), and/or advertisement links and/or URL's, and/or locations, and/or other items and/or objects may result from the substantially infinite varieties and combinations of the queries $QQ_{n1} \ldots QQ_{nm}$ (53) and the substantially infinite varieties and combinations of the server addresses $AQ_{n1} \ldots AQ_{nm}$ (54) of the client-server multitasking system 10 of the present invention, the client-server multitasking process 99, and the multitasking process 104, which in itself is a process.

Likewise, the e typical grouping/sorting criteria shown herein in the examples is for illustrative purposes only and is not intended to limit the scope of the client-server multitasking system 10 of the present invention. It is possible to sort the responses within the service and/or information response, such as, for example, by category, query, group, page, order of importance, ascending and/or descending order, alphabetically and/or numerically, or other characteristics, as determined by the requestor, and/or the user, and/or the client-server multitasking system, or to combine the responses within the service and/or information response, such as, for example, interleaving the responses one with the other, such as, for example, by order of relevance or other parameters. The responses then are capable of being grouped by search criteria, server, order of importance, or by numerical factors such as value, price, or other numerical quantifier. The responses may be presentable, for example, in ascending or descending order in interleaved format, such as top ones, twos, threes, and so on, or presentable separately to the requestor and/or the user. The order may be order of importance or relevance related, or, for example, numerically valued, such as price or stock market value. A substantially infinite variety of results may be generated from the substantially infinite variety of grouping/sorting criteria possible with the client-server multitasking system 10 of the present invention.

A substantially infinite variety of URL's, links, locations, sites, servers, and/or clients, other items and/or objects may be used with the client-server multitasking system 10 of the present invention, the client-server multitasking process 99, and the multitasking process 104, which in itself is a process. Examples of URL's links, locations, sites, servers, and/or clients, other items and/or objects shown in FIGS. 5A, 5B, and 6–52C, inclusive, are typical examples of URL's, links, locations, sites, servers, and/or clients, other items and/or objects that may be of used with the client-server multitasking system 10 of the present invention, the client-server multitasking process 99, and the multitasking process 104, and are used herein for illustrative purposes only, and are not intended to limit the scope of the client-server multitasking system 10 of the present invention, the client-server multitasking process 99, and/or the multitasking process 104.

A substantially infinite variety of advertisements and/or links may be used with the client-server multitasking system 10 of the present invention. The advertisements and/or links to such sites as Netscape® and/or "ABC NEWS"®, Disney®, Discovery®, Warner®, ABC®, Universal®, CBS®, NBC®, "TV Guide"®, NYtimes®, ESPN®, WSjournal®, CNN®, and/or other sites used in the examples shown in FIGS. 5A, 5B, and 6–10, 11–26, and FIGS. 27A–52C, inclusive, and other examples used herein are for illustrative purposes only and are not intended to limit the scope of the client-server multitasking system 10 of the present invention.

It should also be obvious that advertisements and/or links to such sites as Netscape® and/or "ABC News"®, and/or other sites that may be used herein are for illustrative purposes only and are not intended to limit the scope of the client-server multitasking system 10 of the present invention.

Each of the typical service and/or information entry request forms $IE_n$ at the user interface $I_n$, which the user $U_n$ may communicate other typical user input $UI_n$ thereinto, may also have news stories, which may be updated intermittently on a substantially routine basis.

The client-server multitasking system and process are also capable of performing as a multiple query search engine, which performs multiple queries of multiple sites, and performing as a single point of sale for purchasing multiple products from multiple sources.

Although the present invention has been described in considerable detail with reference to certain preferred versions thereof, other versions are possible. Therefore, the spirit and scope of the appended claims should not be limited to the description of the preferred versions contained herein.

What is claimed is:

1. A process for metasearching on a distributed network activated by a request executed by a user on a client device to request a metasearch engine to send a plurality of search queries to a plurality of search engines, the request specifying to which of the plurality of search engines each of the plurality of search queries specified in the request by the user is to be sent to, each of the plurality of search queries comprising a keyword phrase, each of the keyboard phrases comprising at least one keyword specified in the request by the user, at least two of the keyword phrases of the plurality of search queries being different from each other, comprising the steps of:

(a) receiving, at the metasearch engine, the request from the client device for the metasearch engine to send the plurality of search queries comprising the at least two keyword phrases to the plurality of search engines;

(b) sending, by the metasearch engine, the plurality of search queries comprising the at least two keyword phrases to the plurality of search engines, each as specified in the request executed by the user;

(c) receiving, at the metasearch engine, search results from the plurality of search engines in response to the plurality of search queries comprising the at least two keyword phrases sent to the plurality of search engines, wherein at least one of the received search results comprises information about at least one item that may be ordered;

(d) incorporating, by the metasearch engine, the received search results into at least two different display lists corresponding to the at least two different keyword phrases and incorporating, by the metasearch engine, means for inputting at least one quantity of the at least one item that may be ordered into each of the at least two different display lists that comprise the at least one of the received search results comprising the information about the at least one item that may be ordered, the at least one quantity of the at least one item to be ordered to be input on the client device, wherein:

each different one of the at least two different display lists comprises the received search results in response to the plurality of search queries comprising a different one of the at least two keyword phrases, each same one of the at least two different display lists comprises the received search results therein in response to the plurality of search queries comprising a same one of the at least two keyword phrases;

(e) incorporating, by the metasearch engine, the at least two different display lists of received search results into a response for communicating to the client device and incorporating, by the metasearch engine, into the response for communicating to the client device means for executing on the client device another request to be activated by the user for ordering the at least one quantity of the at least one item that may be ordered.

(f) communicating, by the metasearch engine, the response from the metasearch engine to the client device.

2. The process of claim 1, wherein the request executed by the user on the client device comprises a sorting order specified by the user that specifies the order of each of the search results to be returned in each of the at least tow different display lists, step (d) further comprises:

sorting, by the metasearch engine, the received search results in each of the at least two different display lists into the sorting order specified in the request executed by the user.

3. The process of claim 2, wherein the sorting order specified by the user on the client device comprises sorting the search results alphanumerically, the sorting comprises:

sorting, by the metasearch engine, the search results within each of the at least two different display lists into alphanumeric order.

4. The process of claim 3, wherein the alphanumerical order is from the group consisting of ascending and descending.

5. The process of claim 2, wherein the sorting order specified by the user on the client device comprises interleaving the search results, the sorting comprises:

sorting, by the metasearch engine, by interleaving the search results within each of the at least two different display lists by rank of the search results as received from each of the plurality of search engines and alternating each of the search results from each of the plurality of search engines from which the search results were received with each other.

6. The process of claim 1, wherein step (d) further comprises:

identifying, by the metasearch engine, the at least two different display lists with information that identifies which of the at least two different keyword phrases each of the at least two different display lists corresponds to.

7. The process of claim 6, wherein step (d) further comprises:

identifying, by the metasearch engine, each of the received search results with information that identifies which of the plurality of search engines the received search results were received from.

8. The process of claim 7, wherein step (d) further comprises:

identifying, by the metasearch engine, the rank of each of the received search results within each of the plurality of search engines.

9. The process of claim 1, further comprising the steps of:

(g) inputting on the client device, by the user, the at least one quantity of the at least one item to be ordered;

(h) activating the other request, by executing on the client device, by the user, the other request for the metasearch engine to order the at least one quantity of the at least one item;

(i) receiving, at the metasearch engine, the other request from the client device for the metasearch engine to order the at least one quantity of the at least one item;

(j) processing, by the metasearch engine, an order for the at least one quantity of the at least one item.

10. The process of claim 9, prior to activating the other request, by executing on the client device, by the user, the other request for the metasearch engine to order the at least one quantity of the at least one item, further comprising the steps of:

incorporating, by the metasearch engine, into another response for communicating to the client device means for executing on the client device yet another request to be activated by the user for previewing the order;

activating the yet other request, by executing on the client device, by the user, the yet other request for the metasearch engine to communicate, by the metasearch engine, to the client device a preview of the order;

receiving, at the metasearch engine, the yet other request from the client device for the metasearch engine to communicate to the client device the preview of the order;

communicating, by the metasearch engine, to the client device the preview of the order.

11. The process of claim 9, prior to activating the other request, by executing on the client device, by the user, the other request for the metasearch engine to order the at least one quantity of the at least one item, further comprising the steps of:

incorporating by the metasearch engine, into yet another response for communicating to the client device means for executing on the client device yet another additional request to be activated by the user for updating the order;

updating at the client device, by the user, the order; activating the yet other additional request, by executing on the client device, by the user, the yet other request for the metasearch engine to communicate, by the metasearch engine, to the client device the updated order;

receiving, at the metasearch engine, the yet other additional request from the client device for the metasearch engine to communicate to the client device the updated order;

communicating, by the metasearch engine, to the client device the updated order.

12. The process of claim 9, further comprising the step of:

(k) confirming, by the metasearch engine, the order.

13. The process of claim 9, further comprising the step of:

(k) confirming, by the metasearch engine, the order by e-mail.

14. The process of claim 9, further comprising the step of:

(k) placing, by the metasearch engine, the order with at least one server device on the distributed network and/or at least one third party for the at least one quantity of the at least one item..

15. The process of claim 9, further comprising the step of:

(k) placing, by the metasearch engine, the order with at least one server device on the distributed network and/or at least one third party for the at least one quantity of the at least one item by e-mail.

16. The process of claim 9, wherein the step of activating the other request, by executing on the client device, by the user, the other request for the metasearch engine to order the at least one quantity of the at least one item comprises activating the other request, by executing on the client device, by the user, the other request for the metasearch engine to purchase the at least one quantity of the at least one item.

17. The process of claim 1, wherein the incorporating, by the metasearch engine, the means for inputting the at least one quantity of the at least one item that may be ordered into the each of the at least two different display lists that comprise the at least one of the receive search results comprising the information about the at least one item that may be ordered, of step (d) comprises:

appending, by the metasearch engine, at least one input element for inputting the at least one quantity of the at least one item that may be ordered to the at least one of the received search results comprising the information about the at least one item that may be ordered and incorporating, by the metasearch engine, the appended at least one input element into the each of the at least two different display lists that comprise the at least one of the received search results comprising the information about the at least one item that may be ordered.

18. The process of claim 17, wherein the at least one input element comprises at least one text entry field for inputting the at least one quantity of the at least one item that may be ordered.

19. The process of claim 1, wherein the at least one item that may be ordered comprises at least two items that may be ordered and the incorporating, by the metasearch engine, of the received search results into the at least two different display lists corresponding to the at least two different keyword phrases comprises incorporating the at least two items that may be ordered into any one of the at least two different display lists, step (d) further comprises:

sorting, by the metasearch engine, the received search results into the any one of the at least two different display lists according to price of the at least two items that may be ordered.

20. The process of claim 19, wherein the request executed by the user on the client device comprises a sorting order specified by the user that specifies the order of each of the search results to be returned in each of the at least two different display lines, wherein the sorting order is selected from the group consisting of ascending price and descending price, step (d) further comprises:

sorting, by the metasearch engine, the received search results into the any one of the at least two different display lists into the sorting order specified in the request executed by the user according to the price of the at least two items that may be ordered.

21. The process of claim 1, wherein step (d) further comprises:

eliminating, by the metasearch engine, any duplicates of the received search results in any particular one of the at least two different display lists comprising the received search results corresponding to the same one of the at least two keyword phrases.

22. The process of claim 1, wherein step (e) further comprises:

incorporating, by the metasearch engine, into the response for communicating to the client device means for inputting on the client device, by the user, payment and/or shipping information.

23. The process of claim 1, wherein:

at least one of the at least two different display lists comprises the received search results therein in response to at least two of the plurality of search queries comprising a same one of the at least two keyword phrases.

24. The process of claim 1, wherein prior to sending, by the metasearch engine, the plurality of search queries comprising the at least two keyword phrases to the plurality of search engines, step (b) further comprises:

opening connections, by the metasearch engine, substantially simultaneously with the plurality of search engines.

25. The process of claim 1, wherein step (b) further comprises:

opening connections, by the metasearch engine, substantially simultaneously with the plurality of search engines, and sending, by the metasearch engine, the plurality of search queries comprising the at least two keyword phrases substantially simultaneously to the plurality of search engines.

26. The process of claim 1, wherein step (b) further comprises:

sending, by the metasearch engine, the plurality of search queries comprising the at least two keyword phrases substantially simultaneously to the plurality of search engines.

27. A system for metasearching on a distributed network activated by a request executed by a user on a client device to request a metasearch engine to send a plurality of search queries to a plurality of search engines, the request specifying to which of the plurality of search engines each of the plurality of search queries specified in the request by the user is to be sent to, each of the plurality of search queries comprising a keyword phrase, each of the keyword phrases comprising at least one keyword specified in the request by the user, at least two of the keyword phrases of the plurality of search queries being different from each other, comprising:

(a) means for receiving, at the metasearch engine, the request from the client device for the metasearch engine to send the plurality of search queries comprising the at least two keyword phrases to the plurality of search engines;

(b) means for sending, by the metasearch engine, the plurality of search queries comprising the at least two keyword phrases to the plurality of search engines, each as specified in the request executed by the user;

(c) means for receiving, at the metasearch engine, search results from the plurality of search engines in response to the plurality of search queries comprising the at least two keyword phrases sent to the plurality of search engines, wherein at least one of the received search results comprises information about at least one item that may be ordered;

(d) means for incorporating, by the metasearch engine, the received search results into at least two different display lists corresponding to the at least two different keyword phrases and means for incorporating, by the metasearch engine, means for inputting at least one quantity of the at least one item that may be ordered into each of the at least two different display lists that comprise the at least one of the received search results comprising the information about the at least one item that may be ordered, the at least one quantity of the at least one item to be ordered to be input on the client device, wherein:

each different one of the at least two different display lists comprises the received search results in response to the plurality of search queries comprising a different one of the at least two keyword phrases, each same on of the at least two different display lists comprise the received search results therein in response to the plurality of search queries comprising a same one of the at least two keyword phrases;

(e) means for incorporating, by the metasearch engine, the at least two different display lists of received search results into a response for communicating to the client device and means for incorporating, by the metasearch engine, into the response for communicating to the client device means for executing on the client device another request to be achieved by the user for ordering the at least one quantity of the at least one item that may be ordered.

(f) means for communicating, by the metasearch engine, the response from the metasearch engine to the client device.

28. The system of claim 27, wherein the means for incorporating, by the metasearch engine, the received search results into the at least two different display lists corresponding to the at least two different keyword phrases further comprises:

means for identifying, by the metasearch engine, the at least two different display lists with information that identifies which of the at least two different keyword phrases each of the at least two different display lists corresponds to.

29. The system of claim 28, wherein the means for incorporating, by the metasearch engine, the received search results into the at least two different display lists corresponding to the at least two different keyword phrases further comprises:

means for identifying, by the metasearch engine, each of the received search results with information that identifies which of the plurality of search engines the received search results were received from.

30. The system of claim 29, wherein the means for incorporating, by the metasearch engine, the received search results into the at least two different display lists corresponding to the at least two different keyword phrases further comprises:

means for identifying, by the metasearch engine, the rank of each of the received search results within each of the plurality of search engines.

31. The system of claim 27, wherein the request executed by the user on the client device comprises a sorting order specified by the user that specifies the order of each of the search results to be returned in each of the at least two different display lists, the means for incorporating, by the metasearch engine, the received search results into the at least two different display lists corresponding to the at least two different keyword phrases further comprises:

means for sorting, by the metasearch engine, the received search results in each of the at least two different display lists into the sorting order specified in the request executed by the user.

32. The system of claim 31, wherein the sorting order specified by the user on the client device comprises sorting the search results alphanumerically, the means for sorting comprises:

means for sorting, by the metasearch engine, the search results within each of the at least two different display lists into alphanumeric order.

33. The system of claim 27, further comprising:

(g) means for inputting on the client device, by the user, the at least one quantity of the at least one item to be ordered.

(h) means for activating the other request, by executing on the client device, by the user, the other request for the metasearch engine to order the at least one quantity of the at least one item;

(i) means for receiving, at the metasearch engine, the other request from the client device for the metasearch engine to order the at least one quantity of the at least one item;

(j) means for processing, by the metasearch engine, an order for the at least one quantity of the at least one item.

34. The system of claim 33, further comprising:

(k) means for placing, by the metasearch engine, the order with at least one server device on the distributed network and/or at least one third party for the at least one quantity of the at least one item.

35. The system of claim 27, wherein prior to the means for sending, by the metasearch engine, the plurality of search queries comprising the at least two keyword phrases to the plurality of search engines, the system further comprises:

means for opening connections, by the metasearch engine, substantially simultaneously with the plurality of search engines.

36. The system of claim 35, wherein the means for sending, by the metasearch engine, the plurality of search queries comprising the at least two keyword phrases to the plurality of search engines, each as specified in the request executed by the user further comprises:

means for sending, by the metasearch engine, the plurality of search queries comprising the at least two keyword phrases substantially simultaneously to the plurality of search engines.

37. The system of claim 27, wherein the means for incorporating, by the metasearch engine, the means for inputting the at least one quantity of the at least one item that may be ordered into the each of the at least two different display lists that comprise the at least one of the received search results comprising the information about the at least one item that may be ordered, of (d) comprises:

means for appending, by the metasearch engine, at least one input element for inputting the at least one quantity of the at least one item that may be ordered to the at least one of the received search results comprising the information about the at least one item that may be ordered and means for incorporating, by the metasearch engine, the appended at least one input element into the each of the at least two different display lists that comprise the at least one of the received search results comprising the information about the at least one item that may be ordered.

38. The system of claim 27, wherein the at least one item that may be order comprises at least two items that may be ordered and the means for incorporating, by the metasearch engine, the received search results into the at least two different display lists corresponding to the at least two different keyword phrases comprises means for incorporating the at least two items that may be ordered into any one of the at least two different display lists, (d) further comprises:

means for sorting, by the metasearch engine, the received search results into the any one of the at least two different display lists according to price of the at least two item that may be ordered.

39. The system of claim 27, wherein:

at least one of the at least two different display lists comprises the received search results therein in response to at least two of the plurality of search queries comprising a same one of the at least two keyword phrases.

40. The system of claim 27, wherein the means for sending, by the metasearch engine, the plurality of search queries comprising the at least two keyword phrases to the plurality of search engines, each as specified in the request executed by the user further comprises:

means for sending, by the metasearch engine, the plurality of search queries comprising the at least two keyword phrases substantially simultaneously to the plurality of search engines.

41. A computer readable storage medium containing computer executable instructions for metasearching on a distributed network activated by a request executed by a user on a client device to request a metasearch engine to send a plurality of search queries to a plurality of search engines, the request specifying to which of the plurality of search engines each of the plurality of search queries specified in the request by the user is to be sent to, each of the plurality of search queries comprising a keyword phrase, each of the keyword phrases comprising at least one keyword specified in the request by the user, at least two of the keyword phrases of the plurality of search queries being different from each other, causing one or more computers to:

(a) receive, at the metasearch engine, the request from the client device for the metasearch engine to send the plurality of search queries comprising the at least two keyword phrases to the plurality of search engines;

(b) send, by the metasearch engine, the plurality of search queries comprising the at least two keyword phrases to the plurality of search engines, each as specified in the request executed by the user;

(c) receive, at the metasearch engine, search results from the plurality of search engines in response to the plurality of search queries comprising the at least two keyword phrases sent to the plurality of search engines, wherein at least one of the received search results comprises information about at least one item that may be ordered;

(d) incorporate, by the metasearch engine, the received search results into at least two different display lists corresponding to the at least two different keyword phrases and incorporate, by the metasearch engine, means for inputting at least one quantity of the at least one item that may be ordered into each of the at least two different display lists that comprise the at least one of the received search results comprising the information about the at least one item that may be ordered, the at least one quantity of the at least one item to be ordered to be input on the client device, wherein:

each different one of the at least two different display lists comprises the received search results in response to the plurality of search queries comprising a different one of the at least two keyword phrases, each same one of the at least two different display lists comprises the received search results therein in response to the plurality of search queries comprising a same one of the at least two keyword phrases;

(e) incorporate, by the metasearch engine, the at least two different display lists of received search results into a response for communicating to the client device incorporate, by the metasearch engine, into the response for communicating to the client device means for executing on the client device another request to be activated by the user for ordering the at least one quantity of the at least one item that may be ordered;

(f) communicate, by the metasearch engine, the response from the metasearch engine to the client device.

42. The computer readable storage medium containing computer executable instructions of claim 41, further causing one or more computers to:

incorporate, by the metasearch engine, the received search results into the at least two different display lists corresponding to the at least two different keyword phrases and identify, by the metasearch engine, the at least two different display lists with information that identifies which of the at least two different keyword phrases each of the at least two different display lists corresponds to.

43. The computer readable storage medium containing computer executable instructions of claim 42, further causing one or more computers to:

incorporate, by the metasearch engine, the received search results into the at least two different display lists corresponding to the at least two different keyword phrases and identify, by the metasearch engine, each of the received search results with information that identifies which of the plurality of search engines the received search results were received from.

44. The computer readable storage medium containing computer executable instructions of claim 43, further causing one or more computers to:

incorporate, by the metasearch engine, the received search results into the at least two different display lists corresponding to the at least two different keyword phrases and identify, by the metasearch engine, the rank of each of the received search results within each of the plurality of search engines.

45. The computer readable storage medium containing computer executable instructions of claim 41, wherein the request executed by the user one the client device comprises a sorting order specified by the user that specifies the order of each of the search results to be returned in each of the at least two different display lists, further causing one or more computers to:

incorporate, by the metasearch engine, the received search results into the at least two different display lists corresponding to the at least two different keyword phrases and sort, by the metasearch engine, the received search results in each of the at least two different display lists into the sorting order specified in the request executed by the user.

46. The computer readable storage medium containing computer executable instructions of claim 45, wherein the sorting order specified by the user on the client device comprises sorting the search results alphanumerically, further causing one or more computers to:

sort, by the metasearch engine, the search results within each of the at least two different display lists into alphanumeric order.

47. The computer readable storage medium containing computer executable instructions of claim 41, which further comprises the other request activated by the user on the client device for the metasearch engine to order the at least one quantity of the at least one item, the other request comprising the input inputted by the user onto the client device into the means for inputting the at least one quantity of the at least one item to be ordered, further causing one or more computers to:

(g) receive, at the metasearch engine, the other request from the client device for the metasearch engine to order the at least one quantity of the at least one item;

(h) process, by the metasearch engine, an order for the at least one quantity of the at least one item.

48. The computer readable storage medium containing computer executable instructions of claim 47, further causing one or more computers to:

(i) place, by the metasearch engine, the order with at least one server device on the distributed network and/or at least one third party for the at least one quantity of the at least one item.

49. The computer readable storage medium containing computer executable instructions of claim 41, further causing one or more computers to:

open connections, by the metasearch engine, substantially simultaneously with the plurality of search engines and send, by the metasearch engine, the plurality of search queries comprising the at least two keyword phrases to the plurality of search engines.

50. The computer readable storage medium containing computer executable instructions of claim 49, further causing one or more computers to:

send, by the metasearch engine, the plurality of search queries comprising the at least two keyword phrases substantially simultaneously to the plurality of search engines.

51. The computer readable storage medium containing computer executable instructions of claim 41, causing one or more computers at (d) to incorporate, by the metasearch engine, into the response for communicating to the client device means for executing on the client device another request to be activated by the user for ordering the at least one quantity of the at least one item that may be ordered, further causing one or more computers at (d) to:

append, by the metasearch engine, at least one input element for inputting the at least one quantity of the at least one item that may be ordered to the at least one of the received search results comprising the information about the at least one item that may be ordered and incorporate, by the metasearch engine, the appended at least one input element into the each of the at least two different display lists that comprise the at least one of the received search results comprising the information about the at least one item that may be ordered.

52. The computer readable storage medium containing computer executable instructions of claim 41, wherein the at least one item that may be ordered comprises at least two items that may be ordered causing one or more computers at (d) to incorporate, by the metasearch engine, the received search results into the at least two different display lists corresponding to the at least two different keyword phrases and causing one or more computers at (d) to incorporate that at least two items that may be ordered into any one of the at least two different display lists, further causing one or more computers at (d) to:

sort, by the metasearch engine, the received search results into the any one of the at least two different display lists according to price of the at least two items that may be ordered.

53. The computer readable storage medium containing computer executable instructions of claim 41, wherein:

at least one of the at least two different display lists comprises the received search results therein in response to at least two of the plurality of search queries comprising a same one of the at least two keyword phrases.

54. The computer readable storage medium containing computer executable instructions of claim 41, further causing one or more computers to:

send, by the metasearch engine, the plurality of search queries comprising the at least two keyword phrases substantially simultaneously to the plurality of search engines.

55. An apparatus for metasearching on a distributed network activated by a request executed by a user on a client device to request a metasearch engine to send a plurality of search queries to a plurality of search engines, the request specifically to which of the plurality of search engines each of the plurality of search queries specified in the request by the user it to be sent to, each of the plurality of search queries comprising a keyword phrase, each of the keyword phrases comprising at least one keyword specified in the request by the user, at least two of the keyword phrases of the plurality of search queries being different from each other, comprising:

(a) a receiver receiving, at the metasearch engine, the request from the client device for the metasearch engine to send the plurality of search queries comprising the at least two keyword phrases to the plurality of search engines;

(b) a sender sending, by the metasearch engine, the plurality of search queries comprising the at least two keyword phrases to the plurality of search engines, each as specified in the request executed by the user;

(c) the receiver receiving, at the metasearch engine, search results from the plurality of search engines in response to the plurality of search queries comprising the at least two keyword phrases send to the plurality of search engines, wherein at least one of the received search results comprises information about at least one item that may be ordered;

(d) an incorporator incorporating, by the metasearch engine, the received search results into at least two different display lists corresponding to the at least two different keyword phrases and the incorporator incorporating, by the metasearch engine, means for inputting at least one quantity of the at lest one item that may be ordered into each of the at least two different display lists that comprise the at least one of the received search results comprising the information about the at least one items that may be ordered, the at least one quantity of the at least one item to be ordered to be input on the client device, wherein:

each different one of the at least two different display lists comprises the received search results in response to the plurality of search queries comprising a different one of the at least two keyword phrases, each same one of the at least two different display lists comprises the received search results therein in response to the plurality of search queries comprising a same one of the at least two keyword phrases;

(e) the incorporated incorporating, by the metasearch engine, the at least two different display lists of received search results into a response for communicating to the client device and the incorporator incorporating, by the metasearch engine, into the response for communicating to the client device means for executing on the client device another request to be activated by the user for ordering the at least one quantity of the at least one item that may be ordered;

(f) a communicator communicating, by the metasearch engine, the response from the metasearch engine to the client device.

56. The apparatus of claim 55, wherein the incorporator incorporating, by the metasearch engine, the received search results into the at least two different display lists corresponding to the at least two different keyword phrases further comprises:

an identifier identifying, by the metasearch engine, the at least two different display lists with information that identifies which of the at least two different keyword phrases each of the at least two different display lists corresponds to.

57. The apparatus of claim 56, wherein the incorporator incorporating, by the metasearch engine, the received search results into the at least two different display lists corresponding to the at least two different keyword phrases further comprises:

the identifier identifying, by the metasearch engine, each of the received search results with information that identifies which of the plurality of search engines that received search results were received from.

58. The apparatus of claim 57, wherein the incorporator incorporating, by the metasearch engine, the received search results into the at least two different display lists corresponding to the at least two different keyword phrases further comprises:

the identifier identifying, by the metasearch engine, the rank of each of the received search results within each of the plurality of search engines.

59. The apparatus of claim 55, where the request executed by the user on the client device comprises a sorting order specified by the user that specifies the order of each of the search results to be returned in each of the at least two different display lists, the incorporator incorporating, by the metasearch engine, the received search results into the at least two different display lists corresponding to the at least two different keyword phrases further comprises:

a sorter sorting, by the metasearch engine, the receive search results in each of the at least two different display lists into the sorting order specified in the request executed by the user.

60. The apparatus of claim 59, wherein the sorting order specified by the user on the client device comprises sorting the search results alphanumerically, the sorter comprises:

the sorter sorting, by the metasearch engine, the search results within each of the at least two different display lists into alphanumeric order.

61. The apparatus of claim 55, which further comprises the other request activated by the user on the client device for the metasearch engine to order the at least one quantity of the at least one item the other request comprising the input inputted by the user onto the client device into the means for inputting the at least one quantity of the at least one item to be ordered, further comprising:

(g) the receiver receiving, at the metasearch engine, the other request from the client device for the metasearch engine to order the at least one quantity of the at least one item;

(h) a processor processing, by the metasearch engine, an order for the at least one quantity of the at least one item.

62. The apparatus of claim 61, further comprising:

(i) a placer placing, by the metasearch engine, the order with at least one server device on the distributed network and/or at least one third party for the at least one quantity of the at least one item.

63. The apparatus of claim 55, wherein prior to the sender sending, by the metasearch engine, the plurality of search queries comprising the at least two keyword phrases to the plurality of search engines, the apparatus further comprises:

an opener opening connections, by the metasearch engine, substantially simultaneously with the plurality of search engines.

64. The apparatus of claim 63, wherein the sender sending, by the metasearch engine, the plurality of search queries comprising the at least tow keyword phrases to the plurality of search engines, each as specified in the request executed by the user further comprisies:

the sender sending, by the metasearch engine, the plurality of search queries comprising the at least two keyword phrases substantially simultaneously to the plurality of search engines.

65. The apparatus of claim 55, wherein the incorporator incorporating, by the metasearch engine, the means for inputting the at least one quantity of the at least one item that may be ordered into the each of the at least two different display lists that comprise the at least one of the received search results comprising the information about the at least one item that may be ordered, (d) comprises:

an appended appending, by the metasearch engine, at least one input element for inputting the at least one quantity of the at least one item that may be order to the at least one of the received search results comprising the information about the at least one item that may be ordered and the incorporator incorporating, by the metasearch engine, the appended at least one input element into the each of the at least two different display lists that comprise the at least one of the received search results comprising the information about the at least one item that may be ordered.

66. The apparatus of claim 55, wherein the at least one item that may be ordered comprises at least two items that may be ordered and the incorporator incorporating, by the metasearch engine, the received search results into the at least two different display lists corresponding to the at least two different keyword phrases comprises the incorporator incorporating that at least two items that may be ordered into any one of the at least two different display lists, (d) further comprises:

a sorter sorting, by the metasearch engine, the received search results into the any one of the at least two different display lists according to price of the at least two items that may be ordered.

67. The apparatus of claim 55, wherein:

at least one of the at least two different display lists comprises the received search results therein in response to tat least to of the plurality of search queries comprising a same one of the at least two keyword phrases.

68. The system of claim 55, wherein the sender sending, by the metasearch engine, the plurality of search queries comprising the at least two keyword phrases to the plurality of search engines, each as specified in the request executed by the user further comprises:

the sender sending, by the metasearch engine, the plurality of search queries comprising the at least two keyword phrases substantially simultaneously to the plurality of search engines.

* * * * *